| FLIP FLOP | FF. | FF* | FF* OUT |
|---|---|---|---|
| I | 0V | -6V | "1" |
| II | 0V | -6V | "1" |
| III | 0V | -6V | "1" |
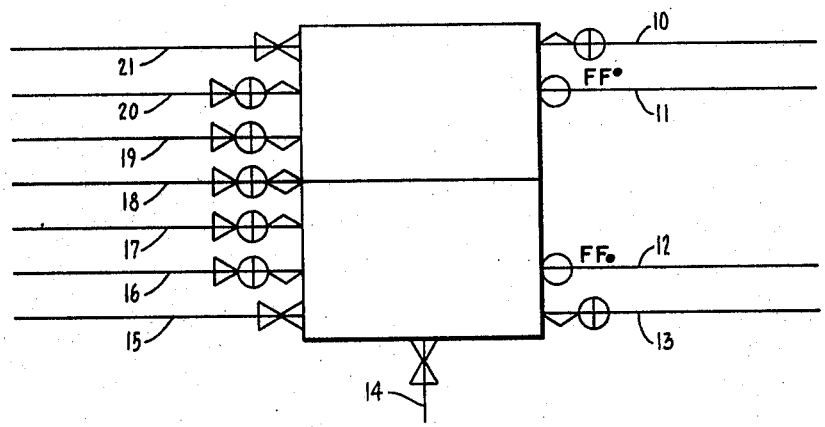
FIG_8
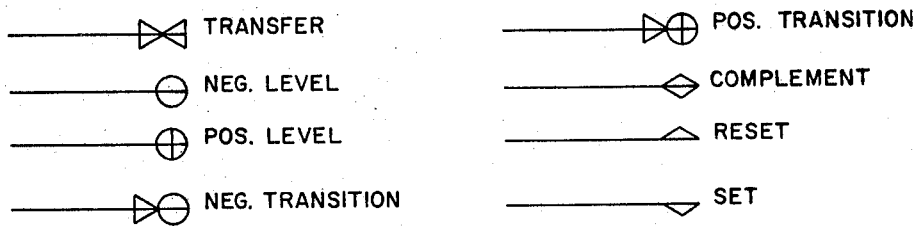
FIG_9
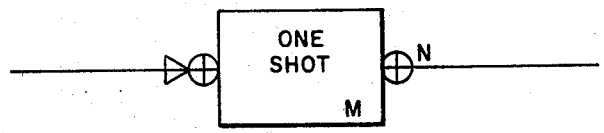
FIG_10

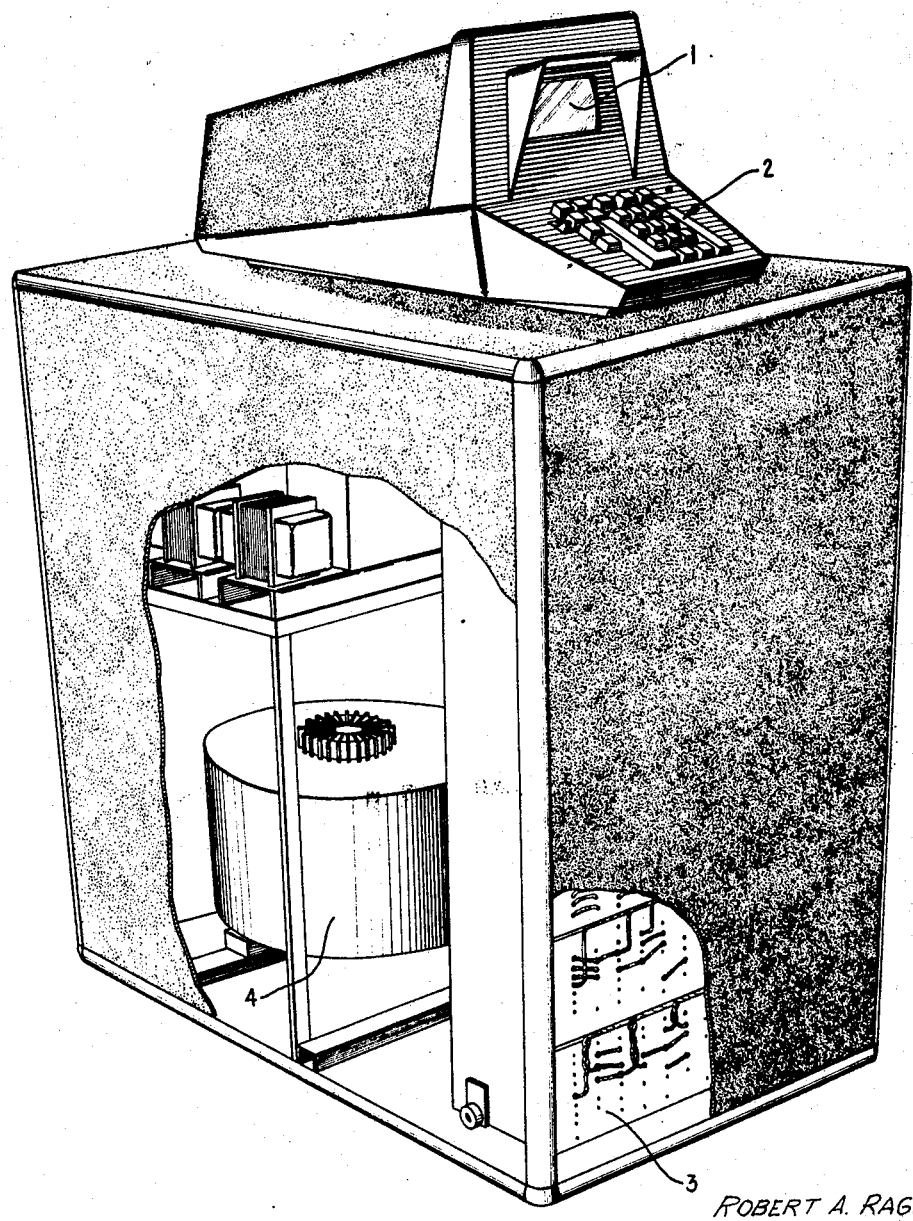
FIG_1

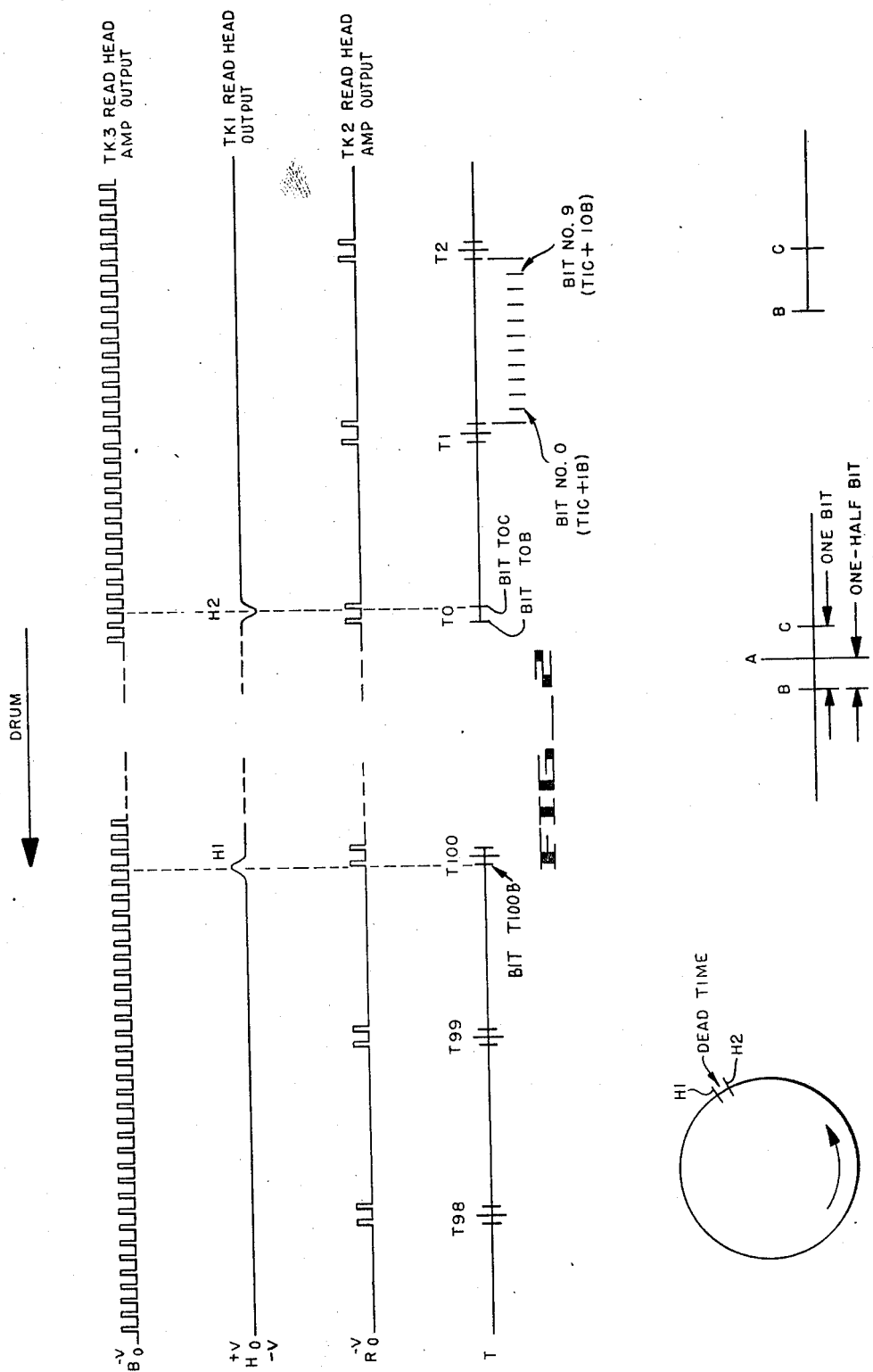

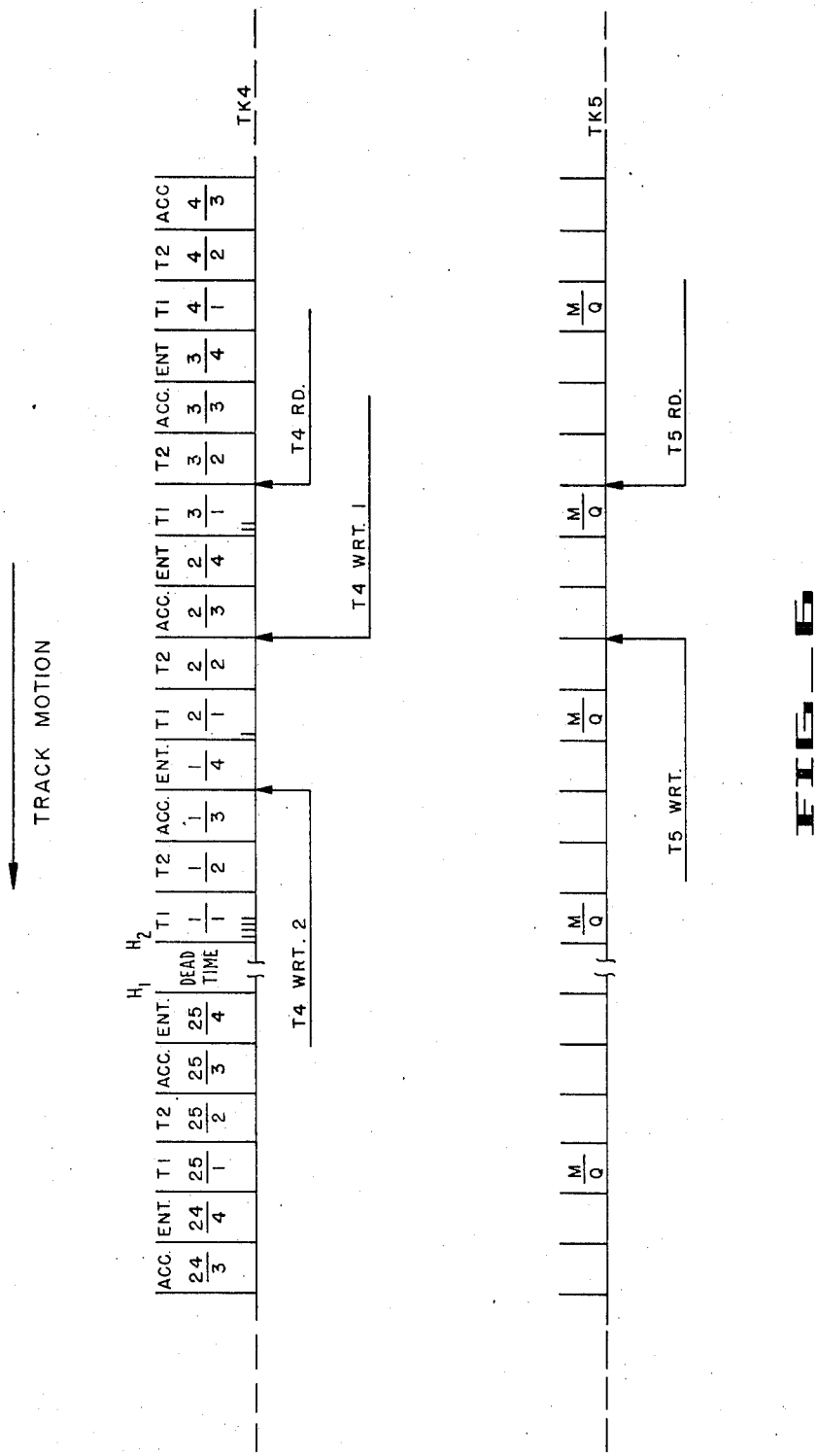
FIG_6

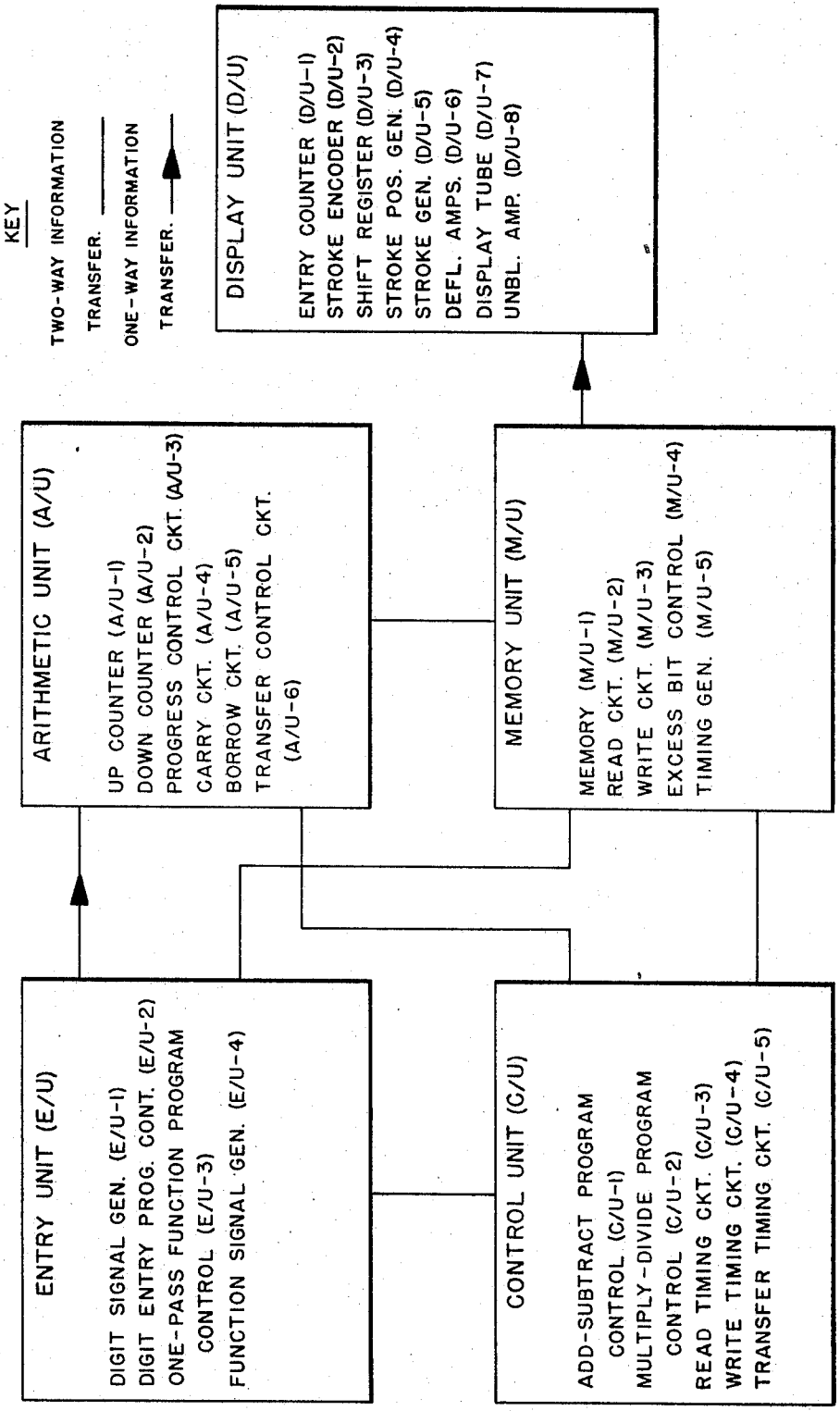
FIG_11

FIG_12

KEY

① NUMBER TO LEFT OF COLON INDICATES COLUMN.
② NUMBER TO RIGHT OF COLON INDICATES ROW.

EXAMPLE: 5:3

↑ FIFTH VERTICAL COLUMN OF SHEETS FROM LEFT WHEN ARRANGED AS SHOWN.
↓ THIRD HORIZONTAL ROW OF SHEETS FROM TOP WHEN ARRANGED AS SHOWN.

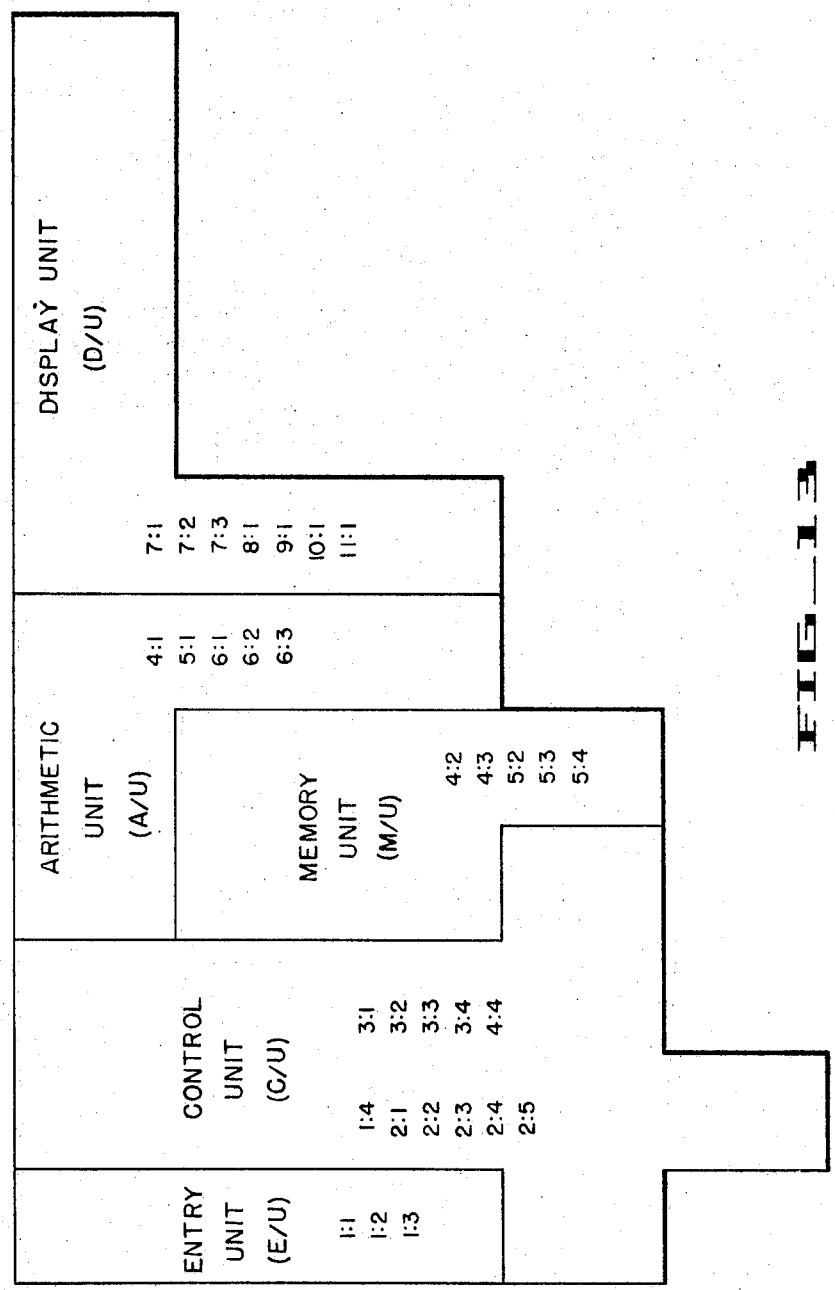
FIG_13

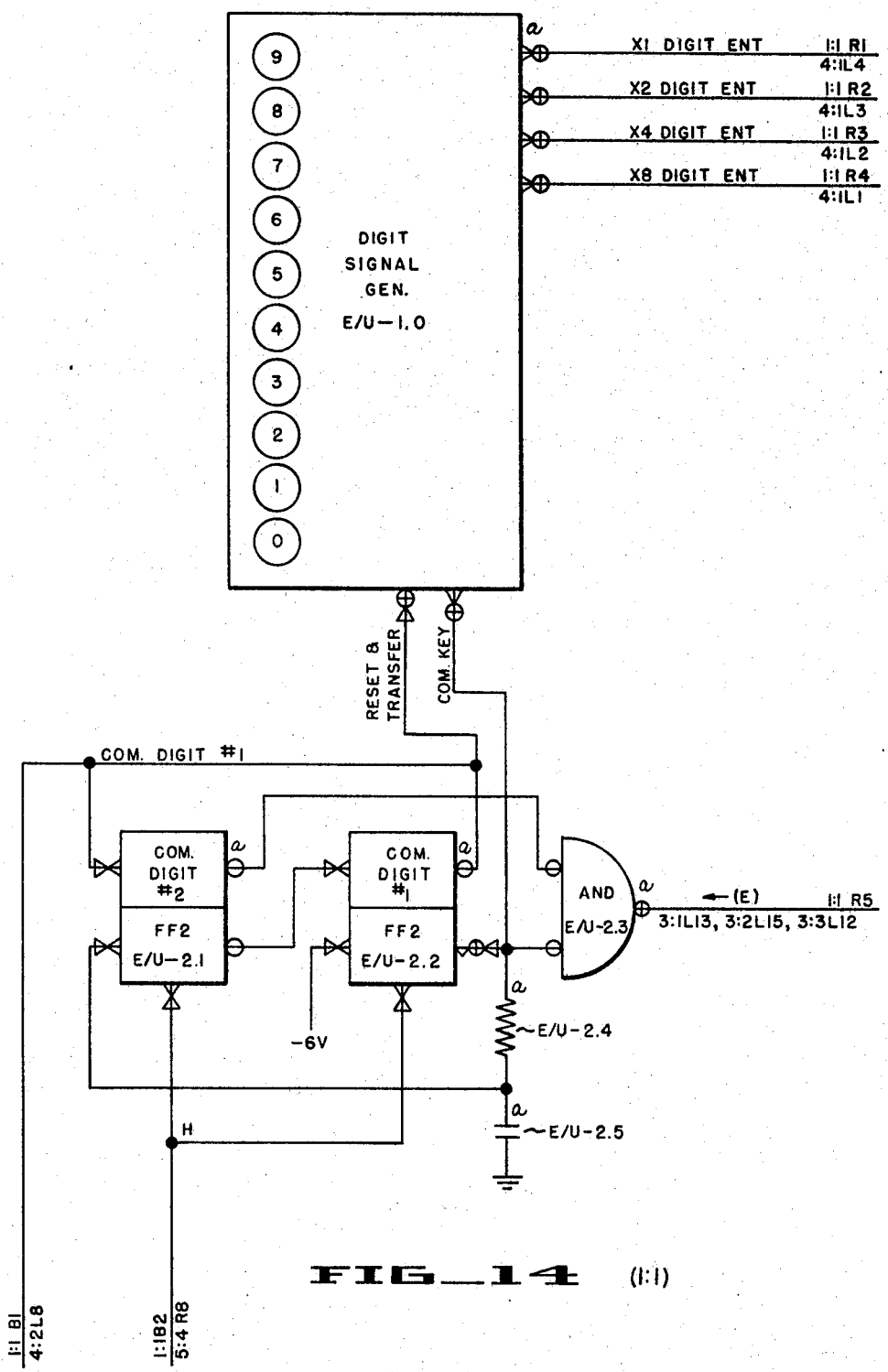

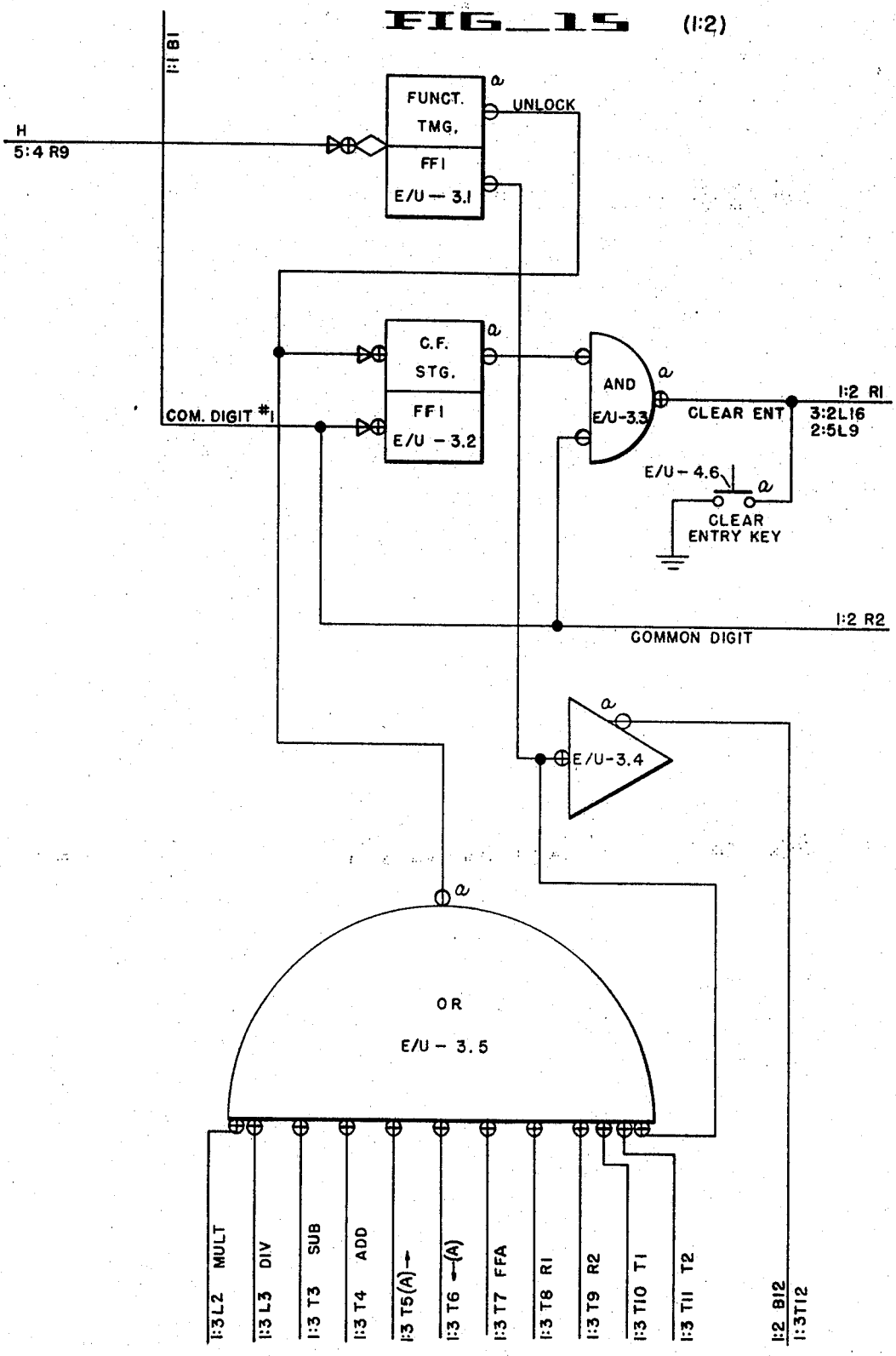

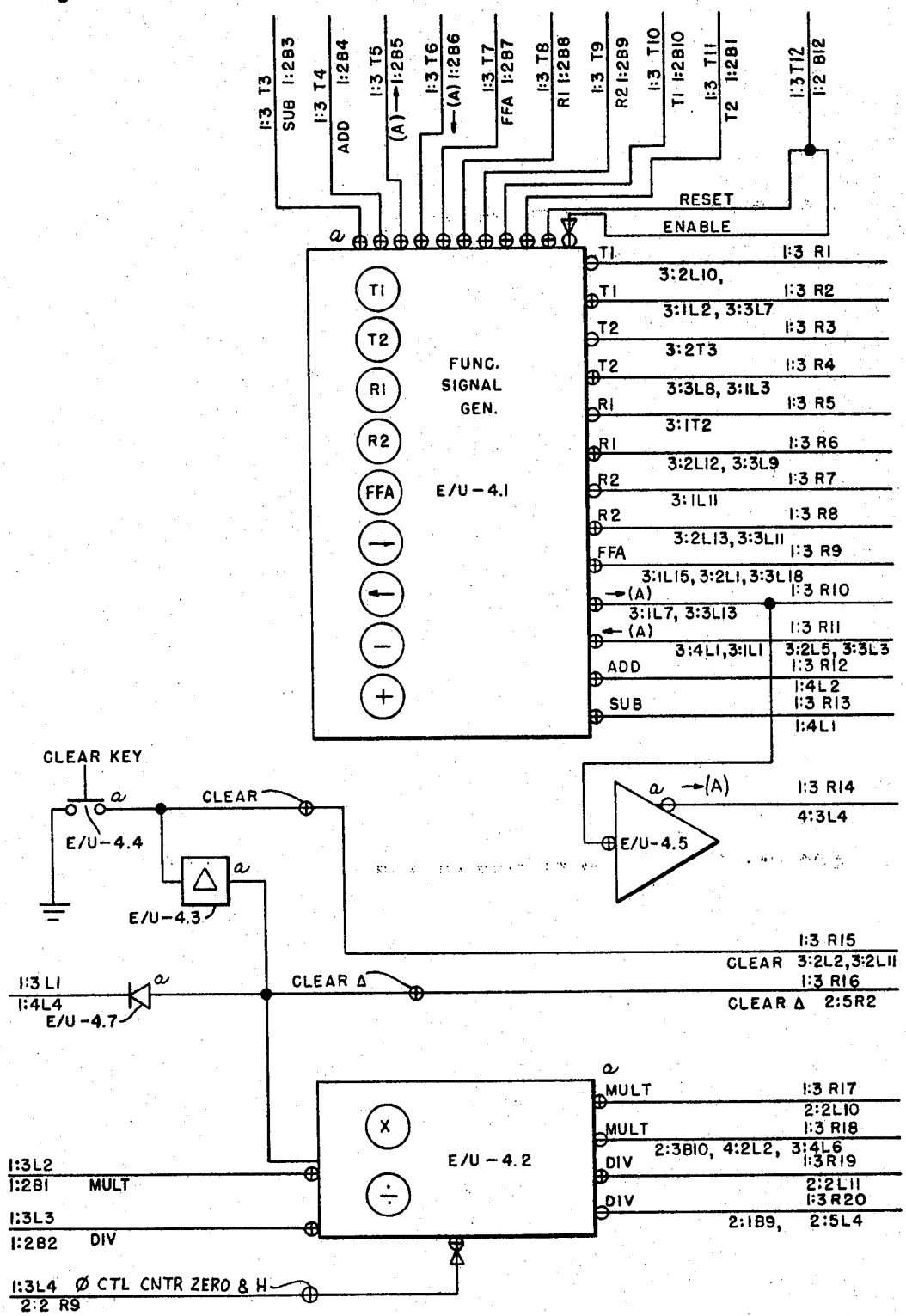
FIG_16 (1:3)

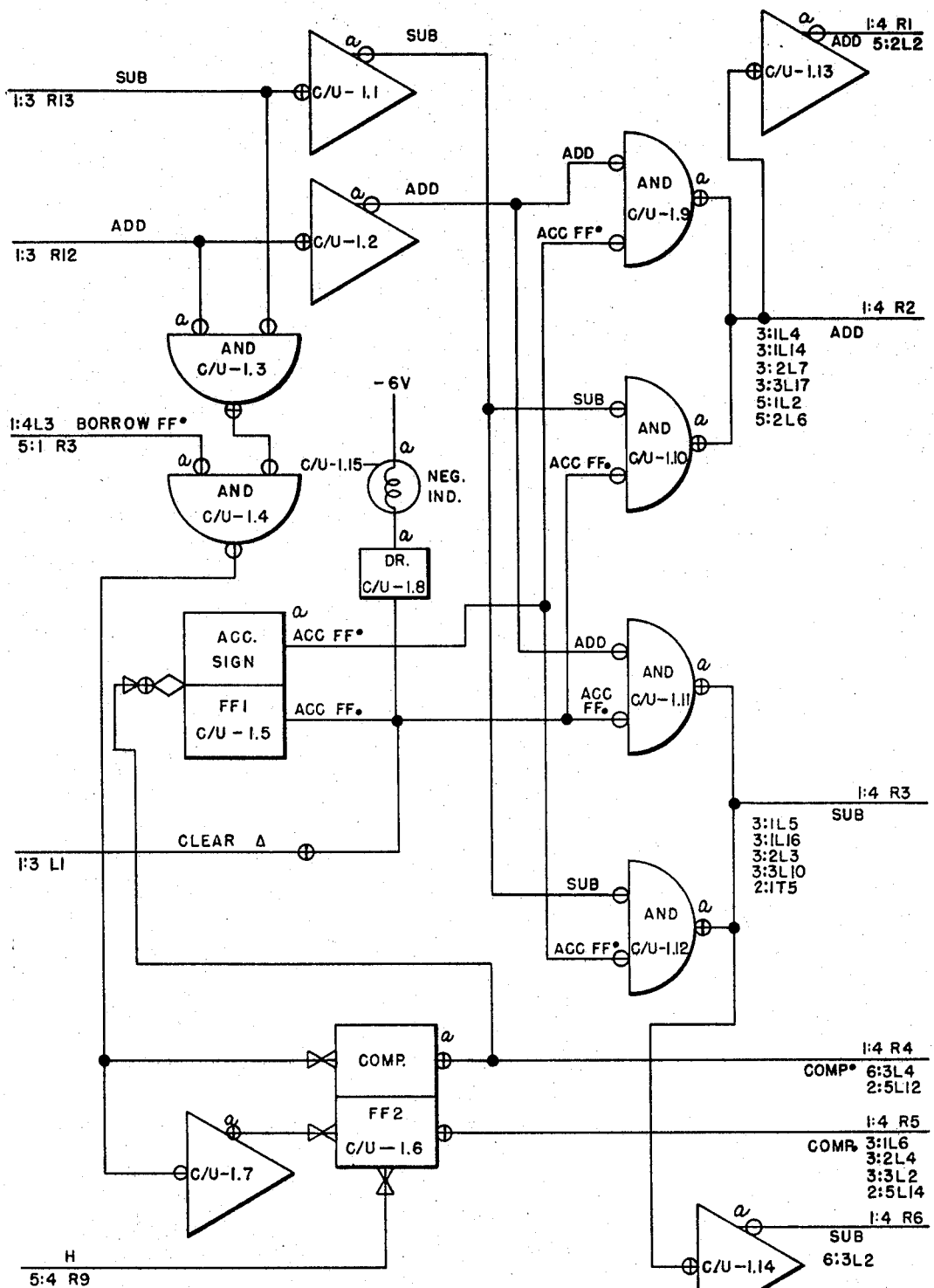
FIG_12 (1:4)

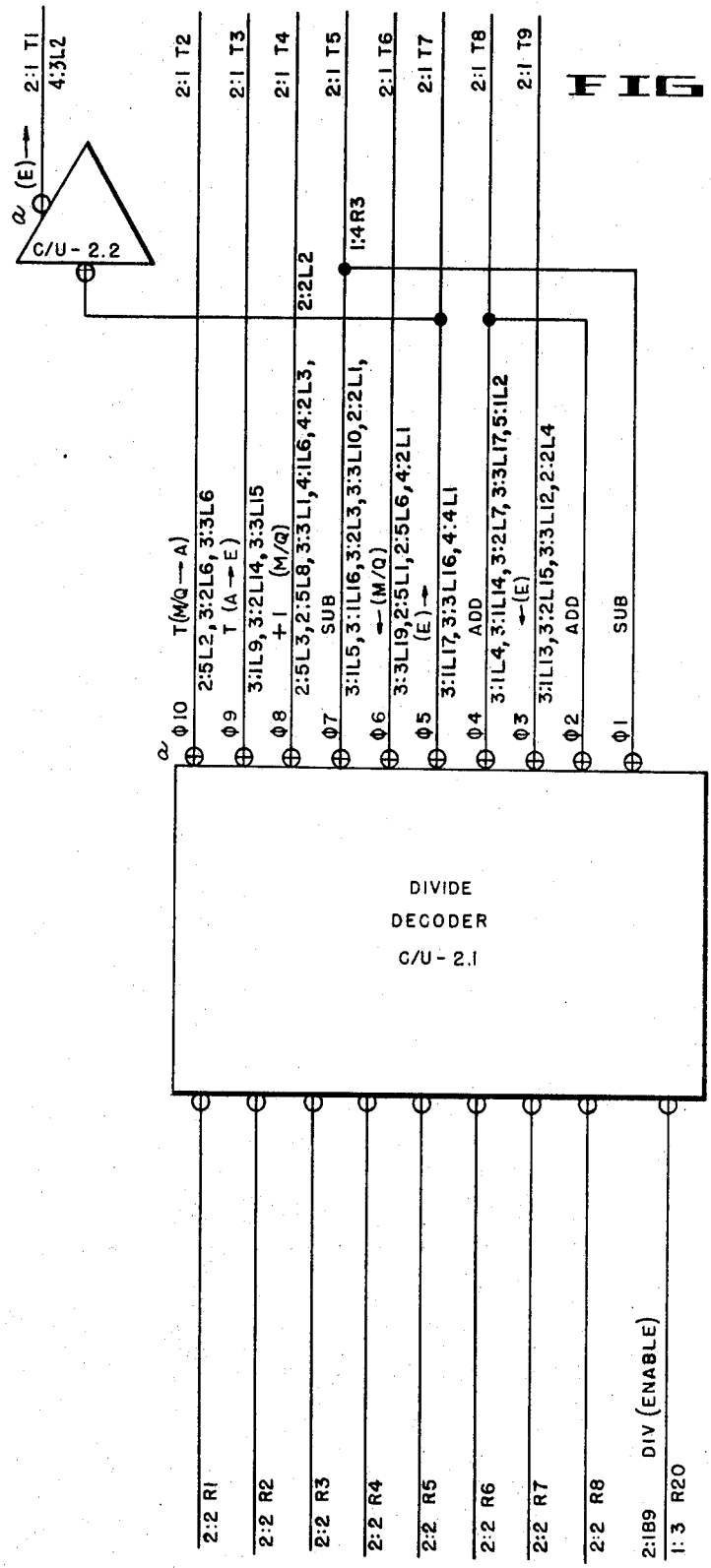

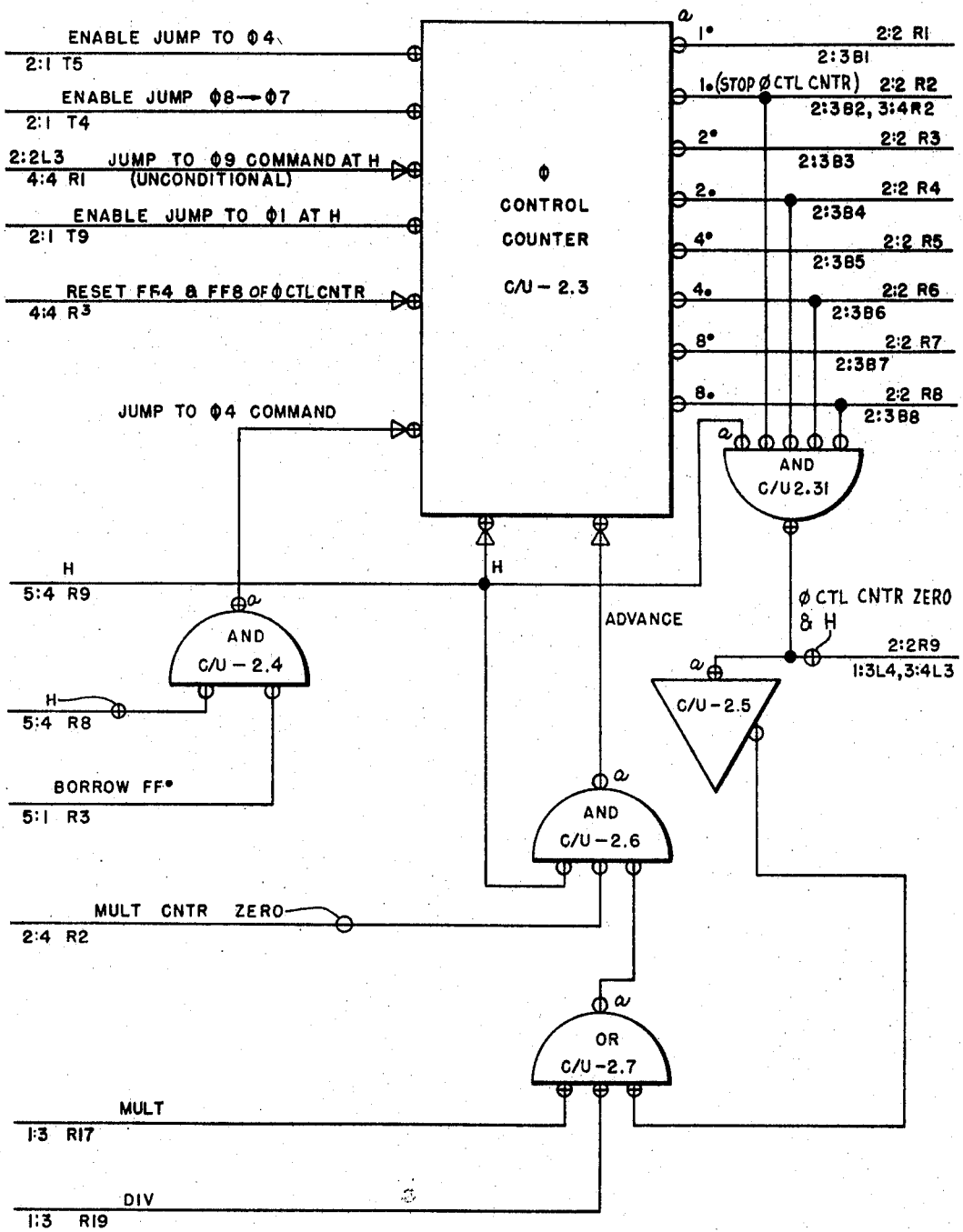
FIG_19 (2:2)

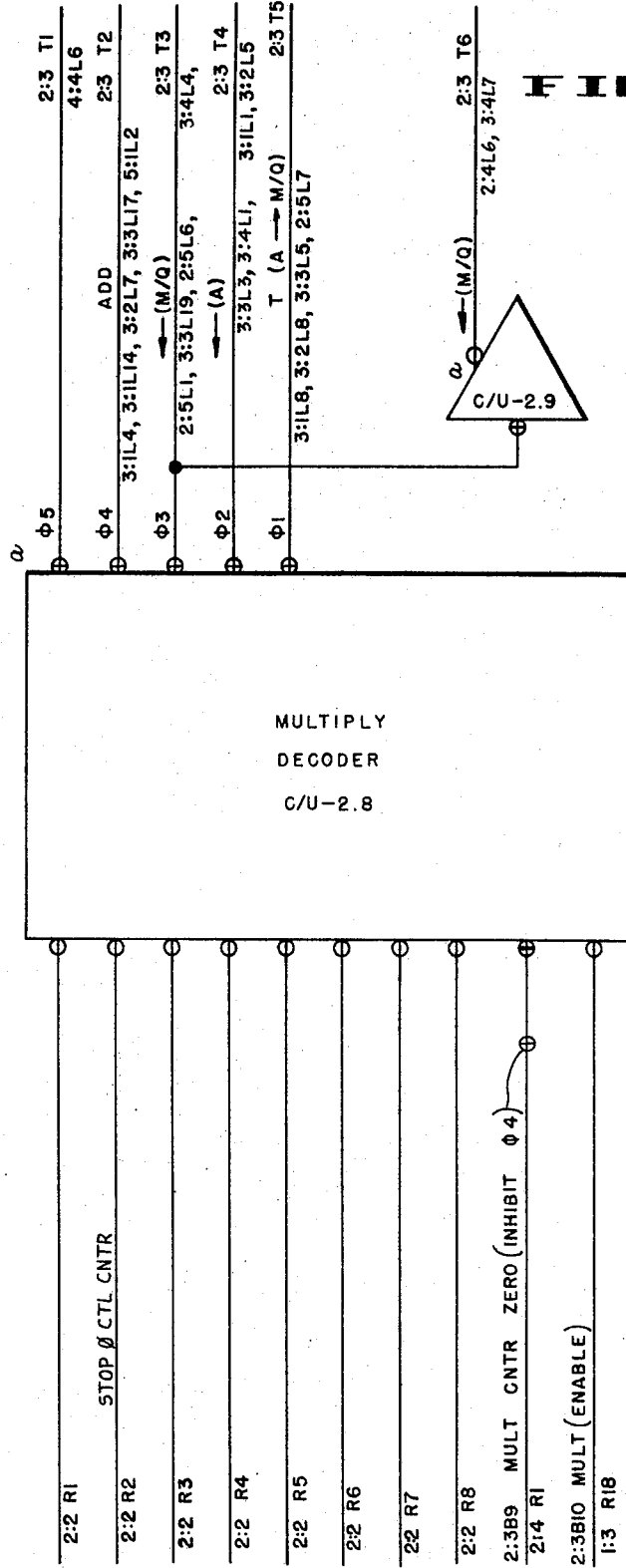
FIG_20
(2:3)

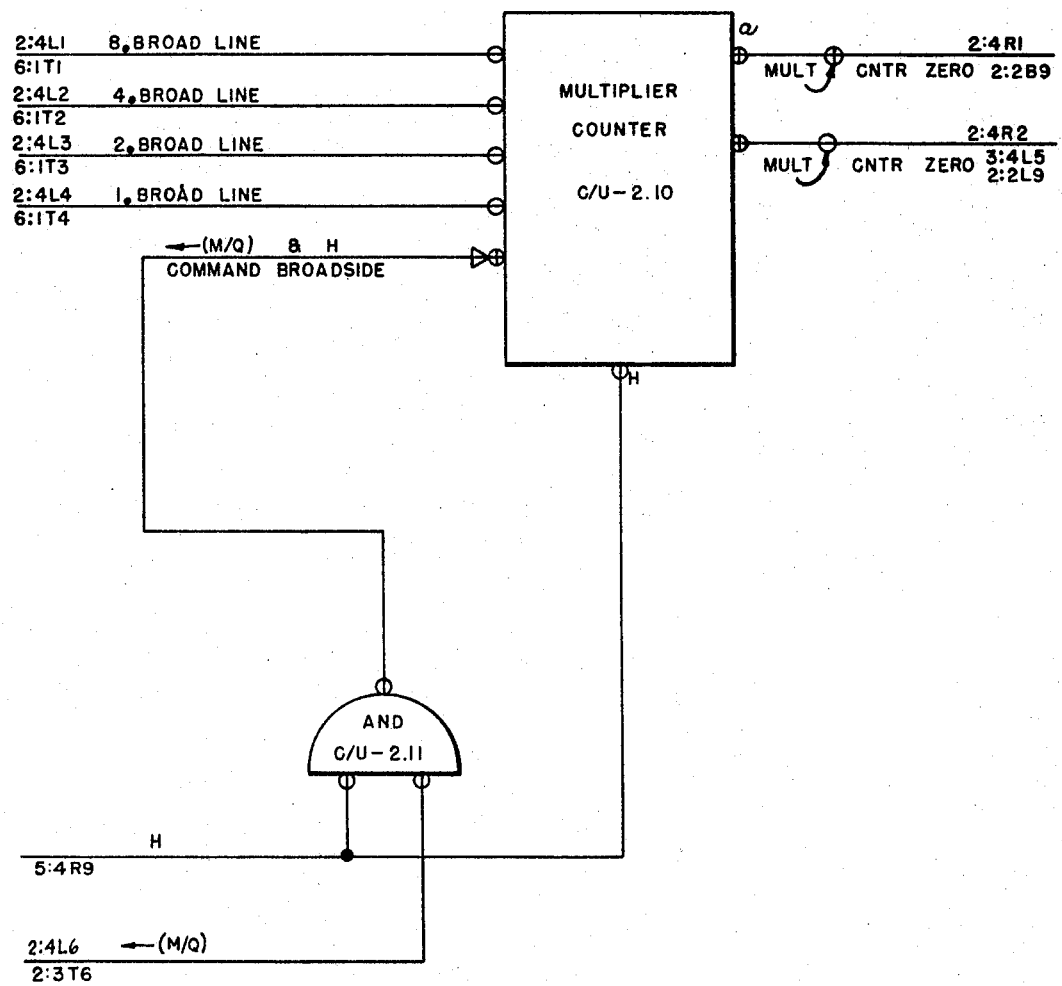
FIG_21 (2:4)

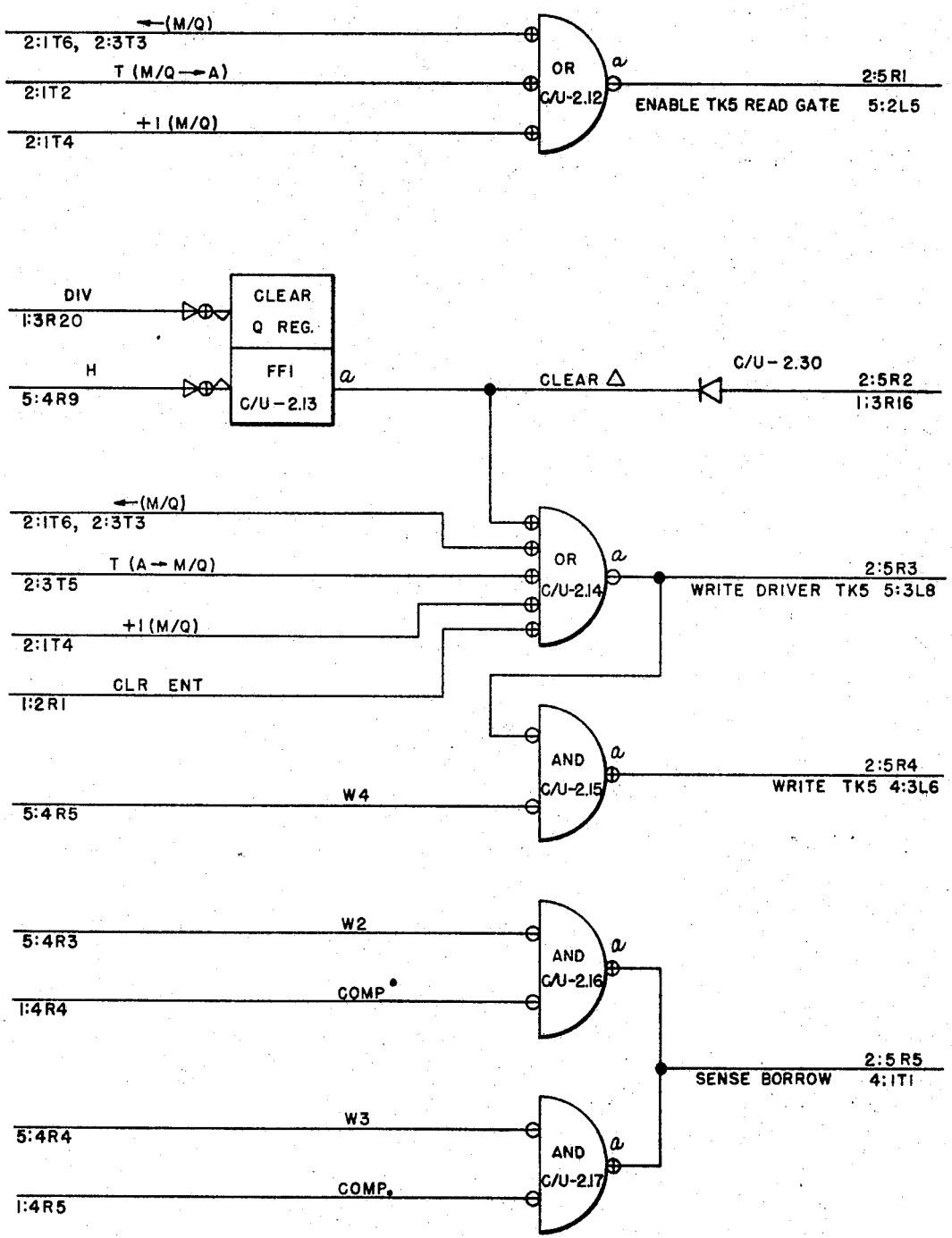
FIG_22 (2:5)

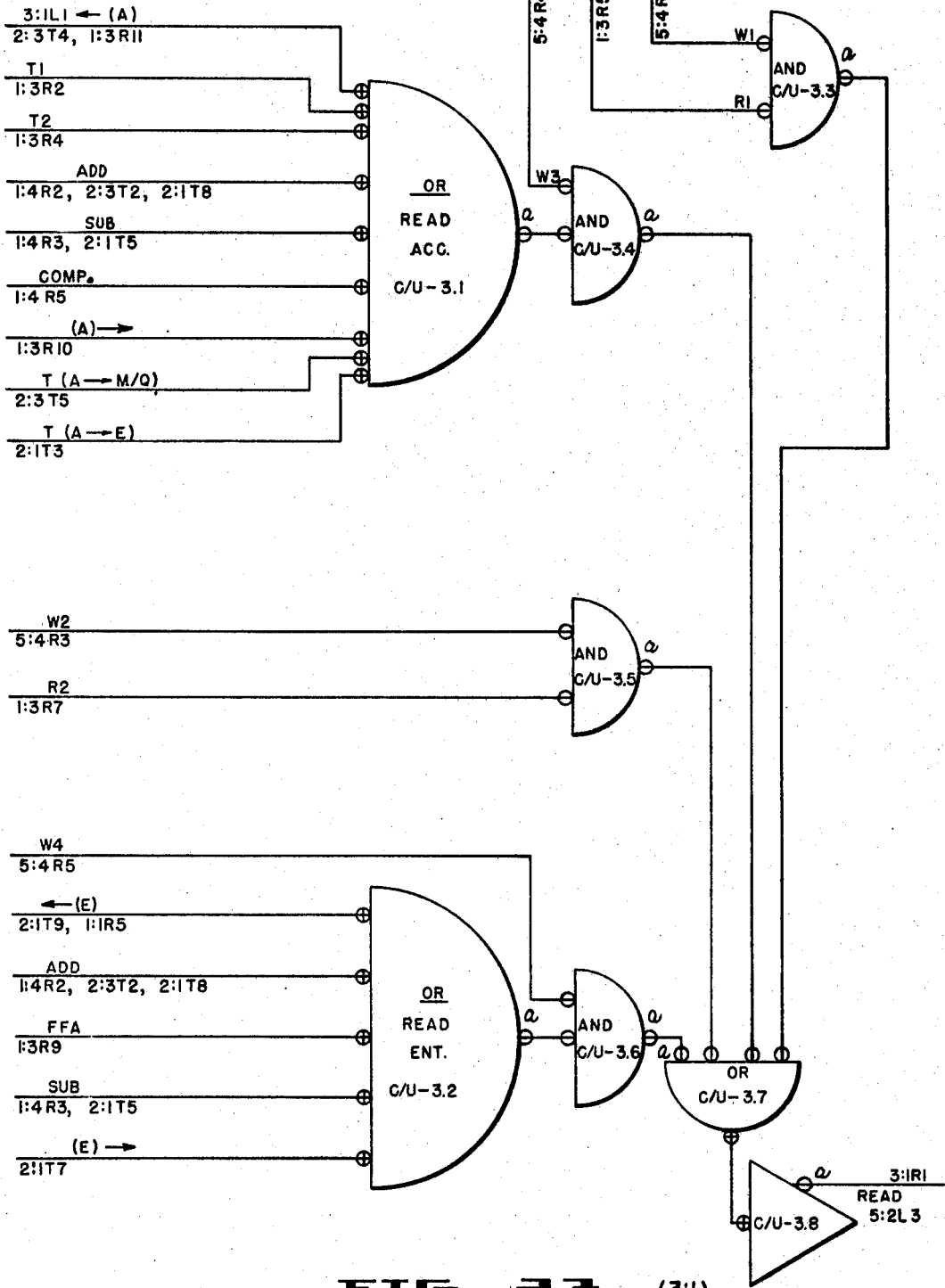
FIG_23 (3:1)

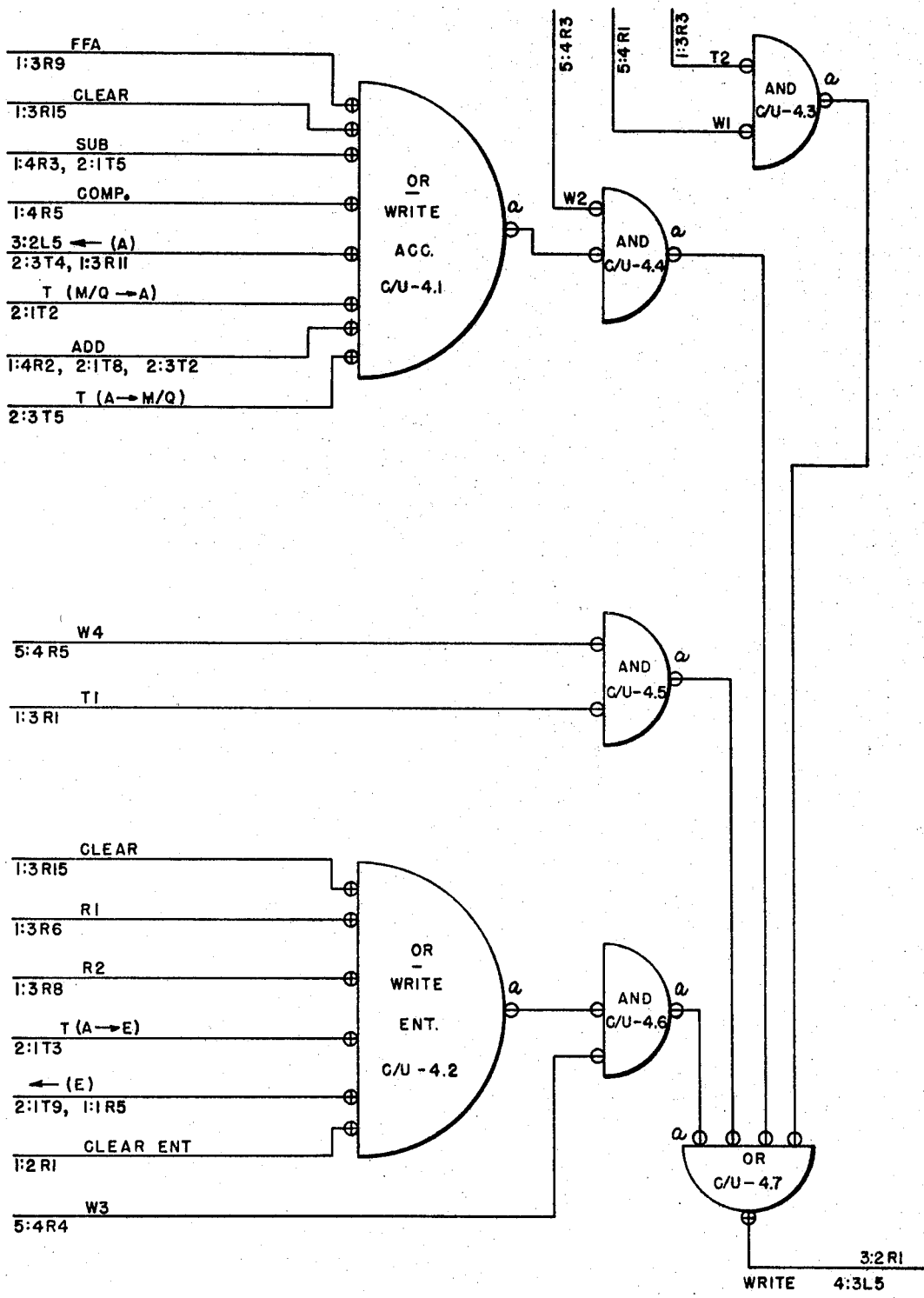
FIG_24 (3:2)

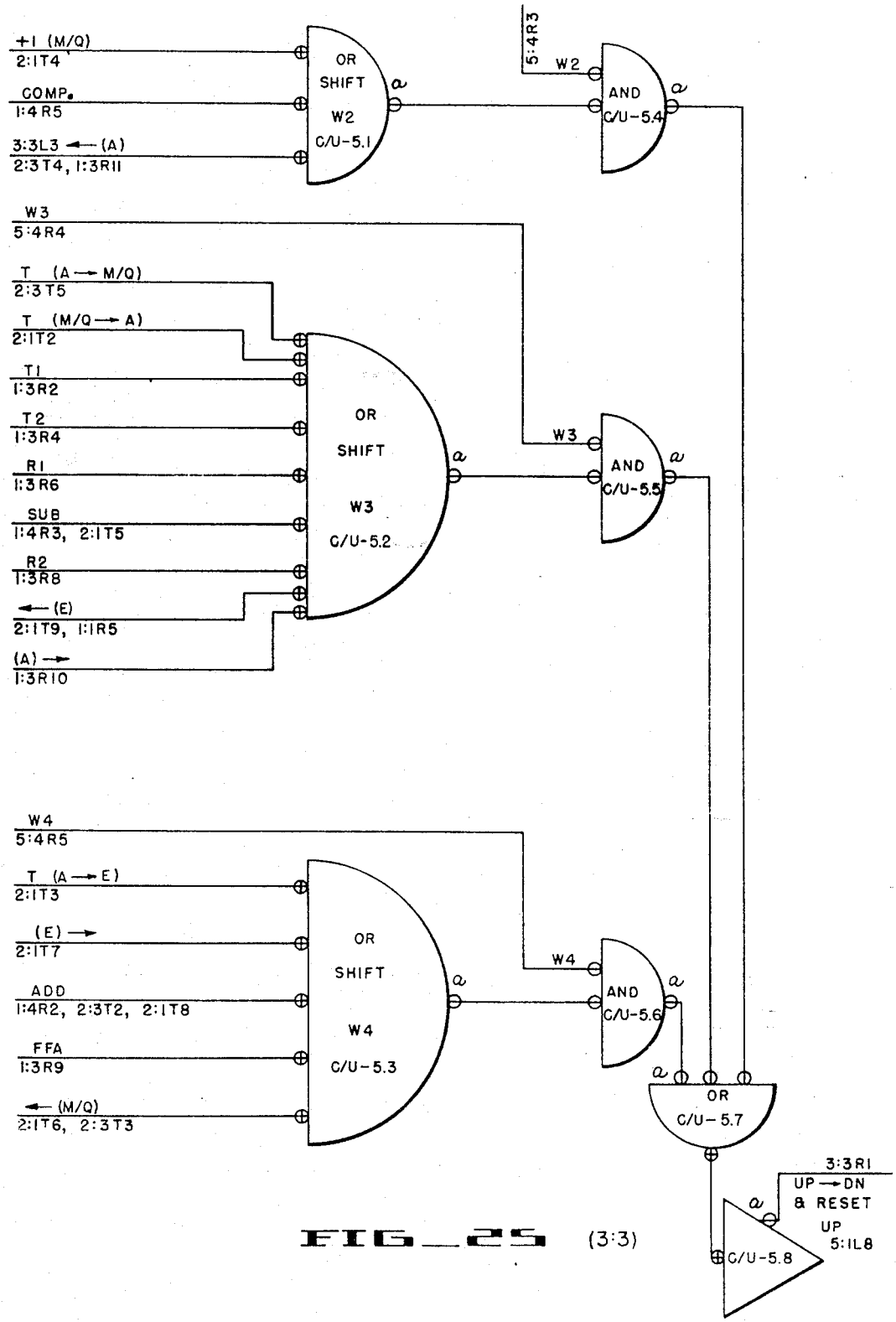
FIG_25 (3:3)

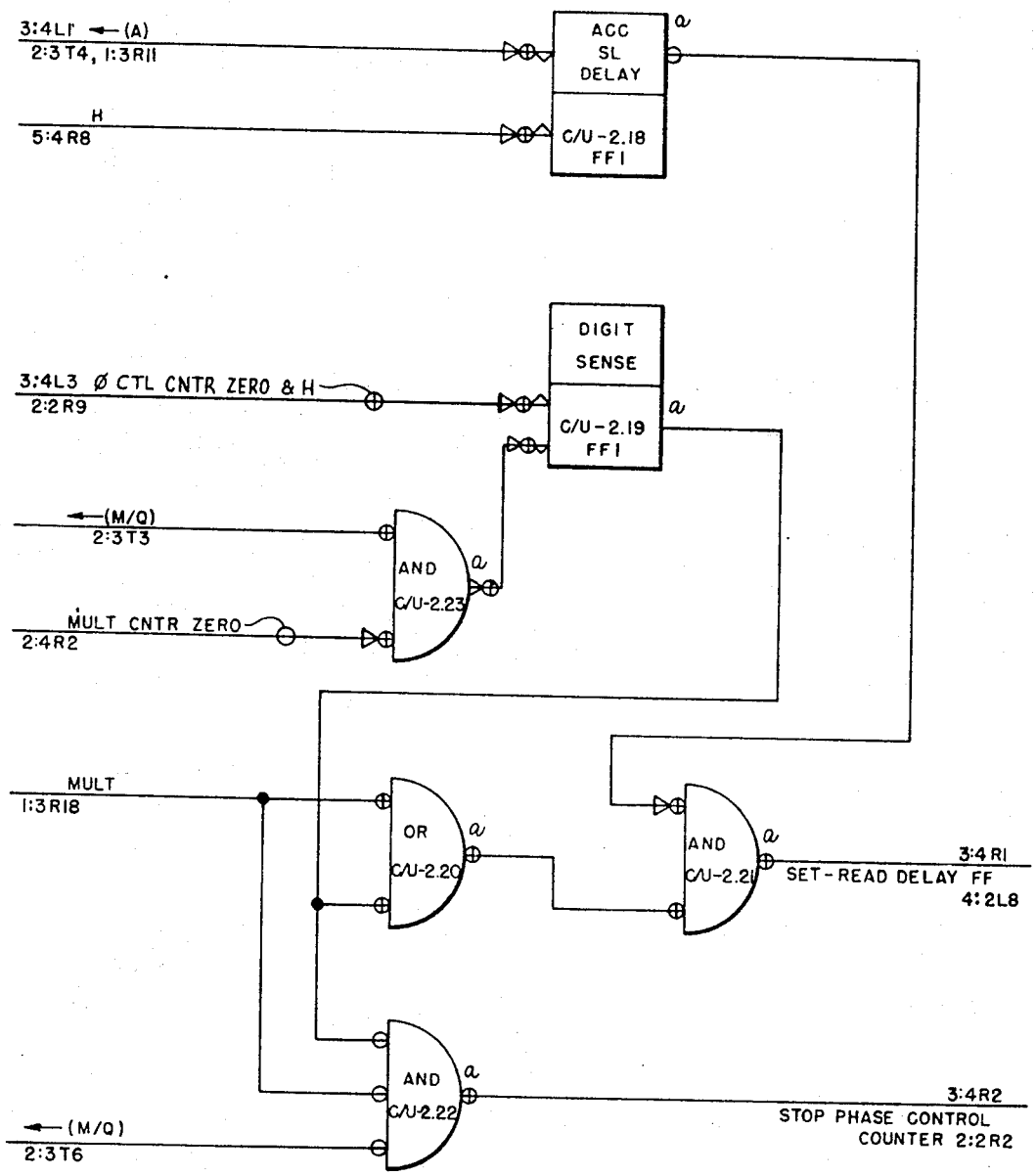
FIG_26 (3:4)

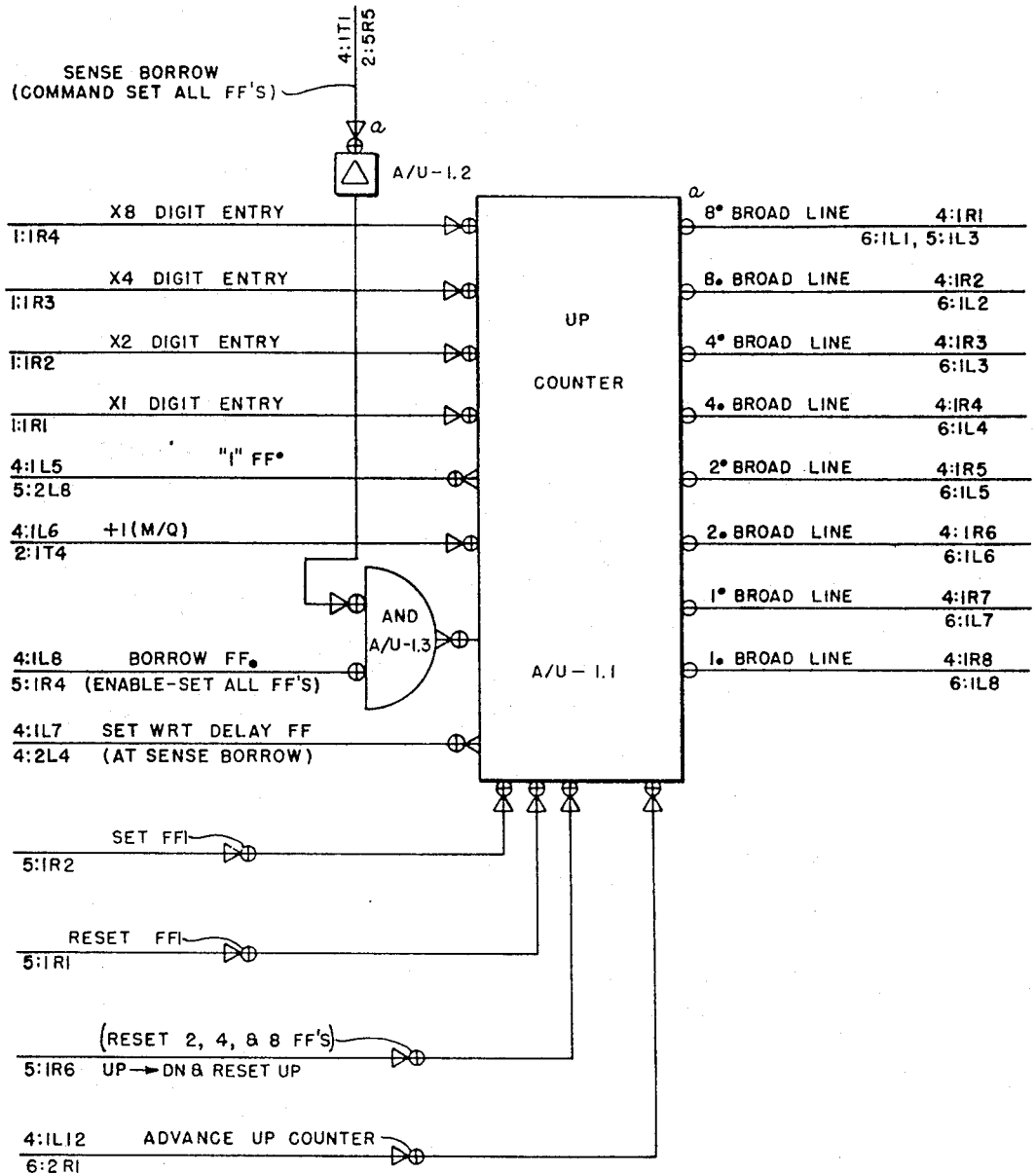
FIG_22 (4:1)

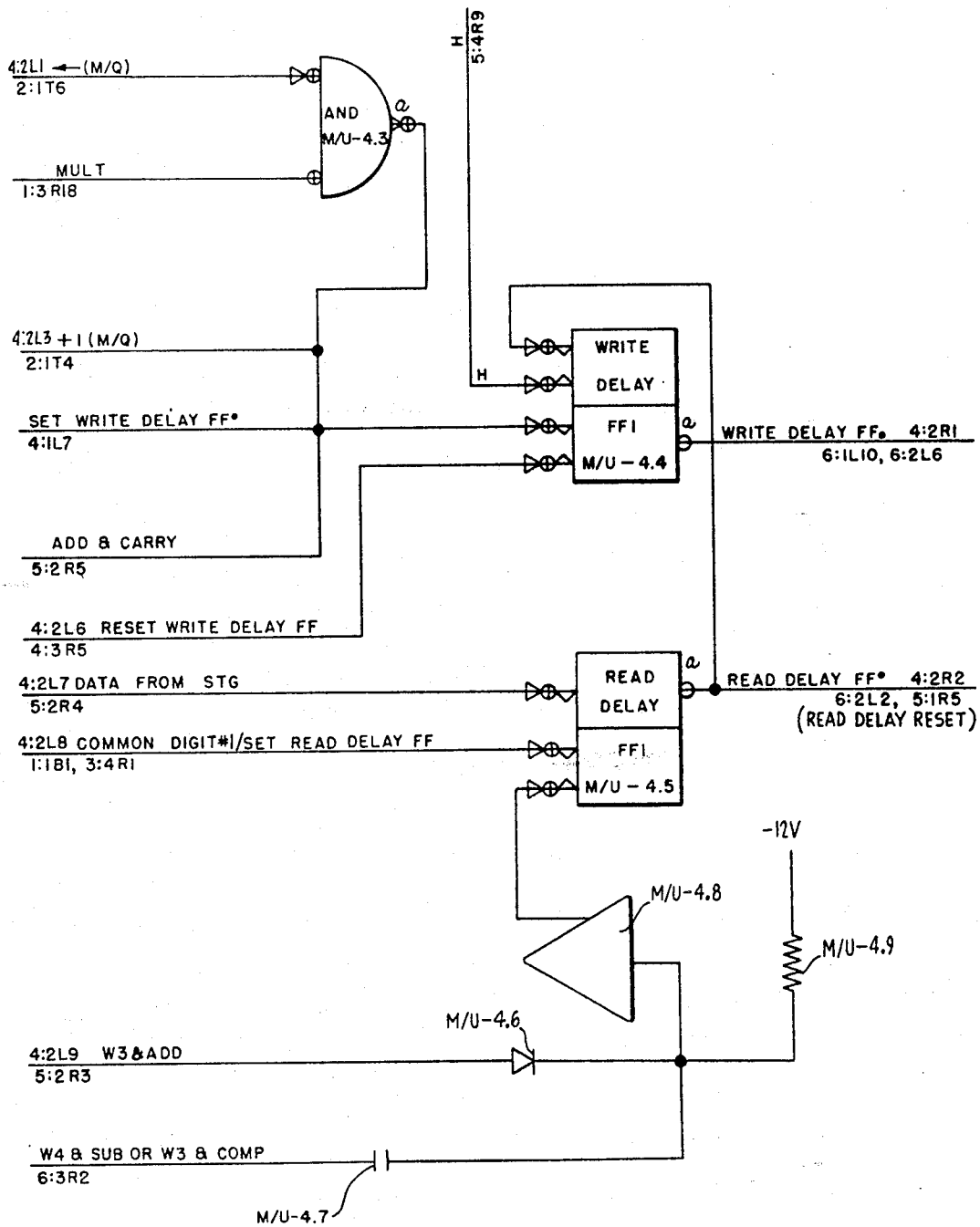
FIG_28 (4:2)

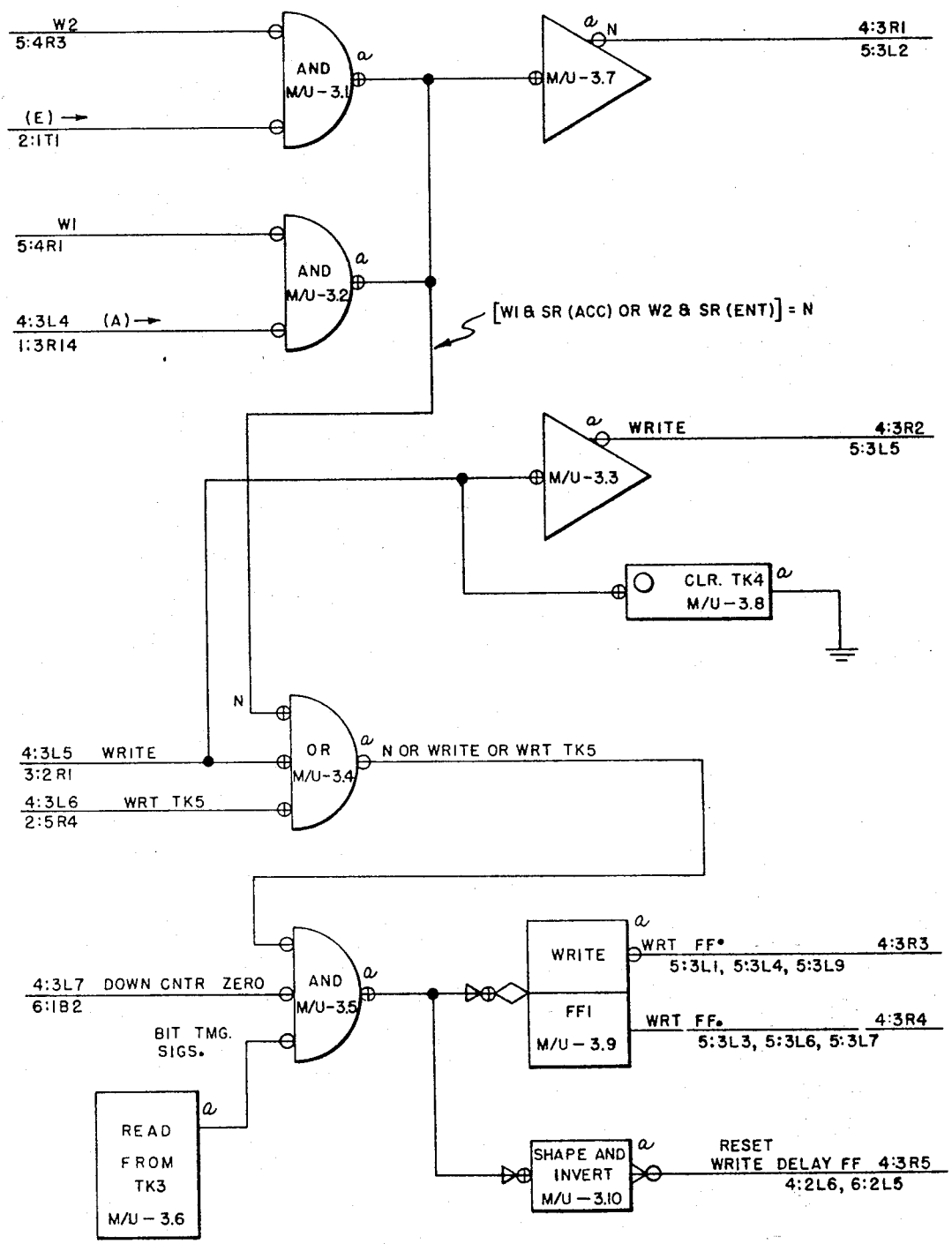
FIG_29 (4:3)

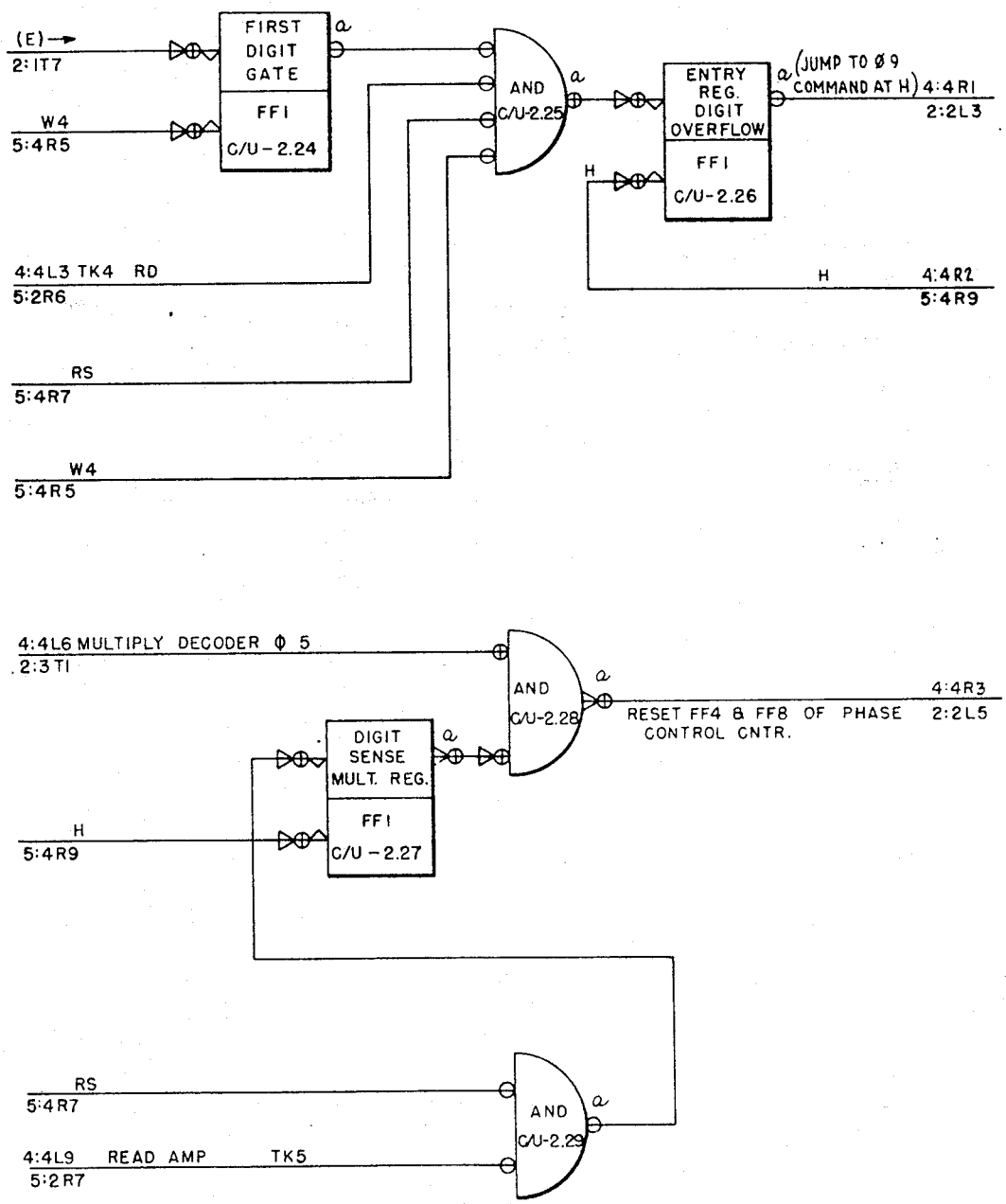
FIG_30 (4:4)

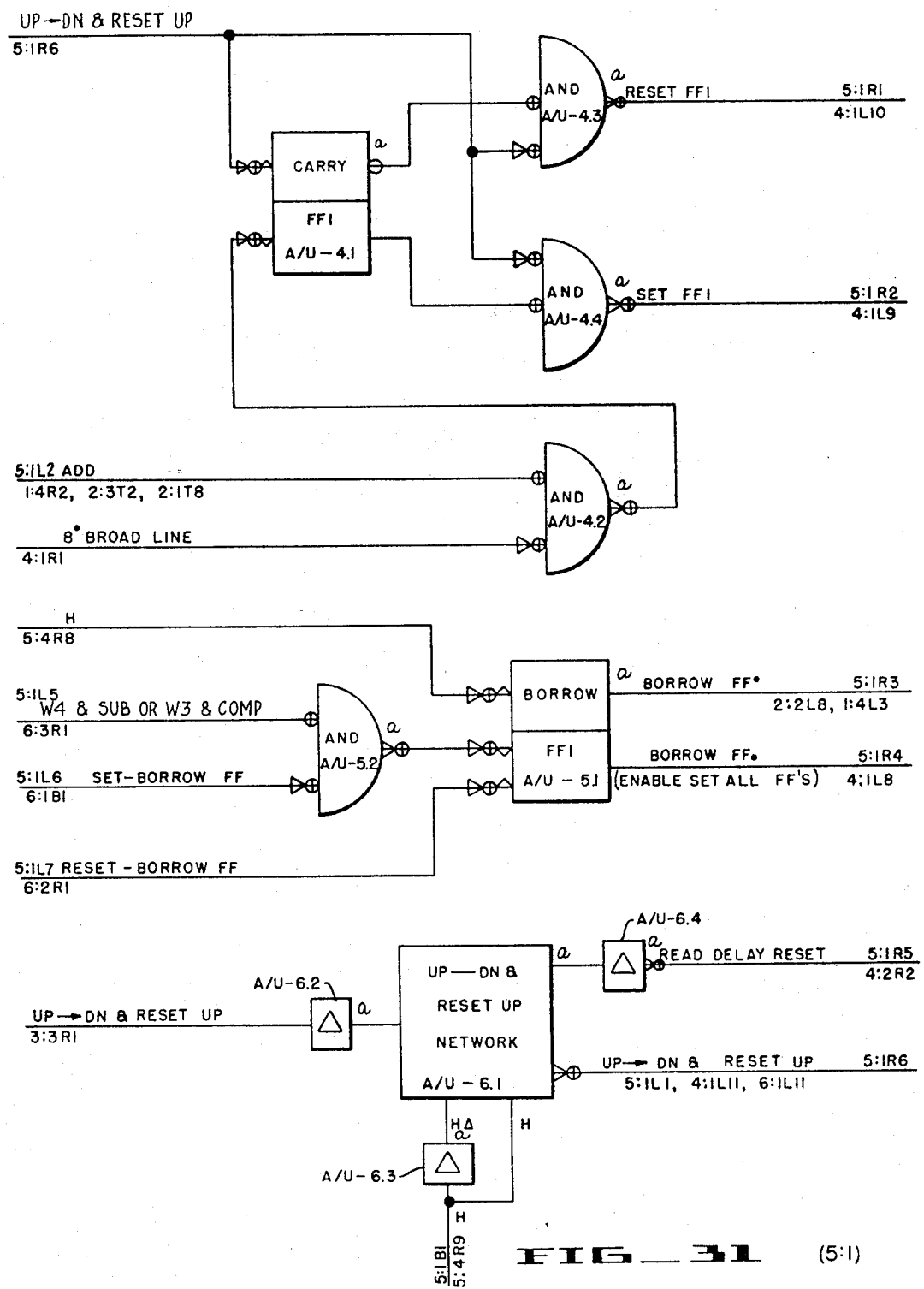
FIG_31 (5:1)

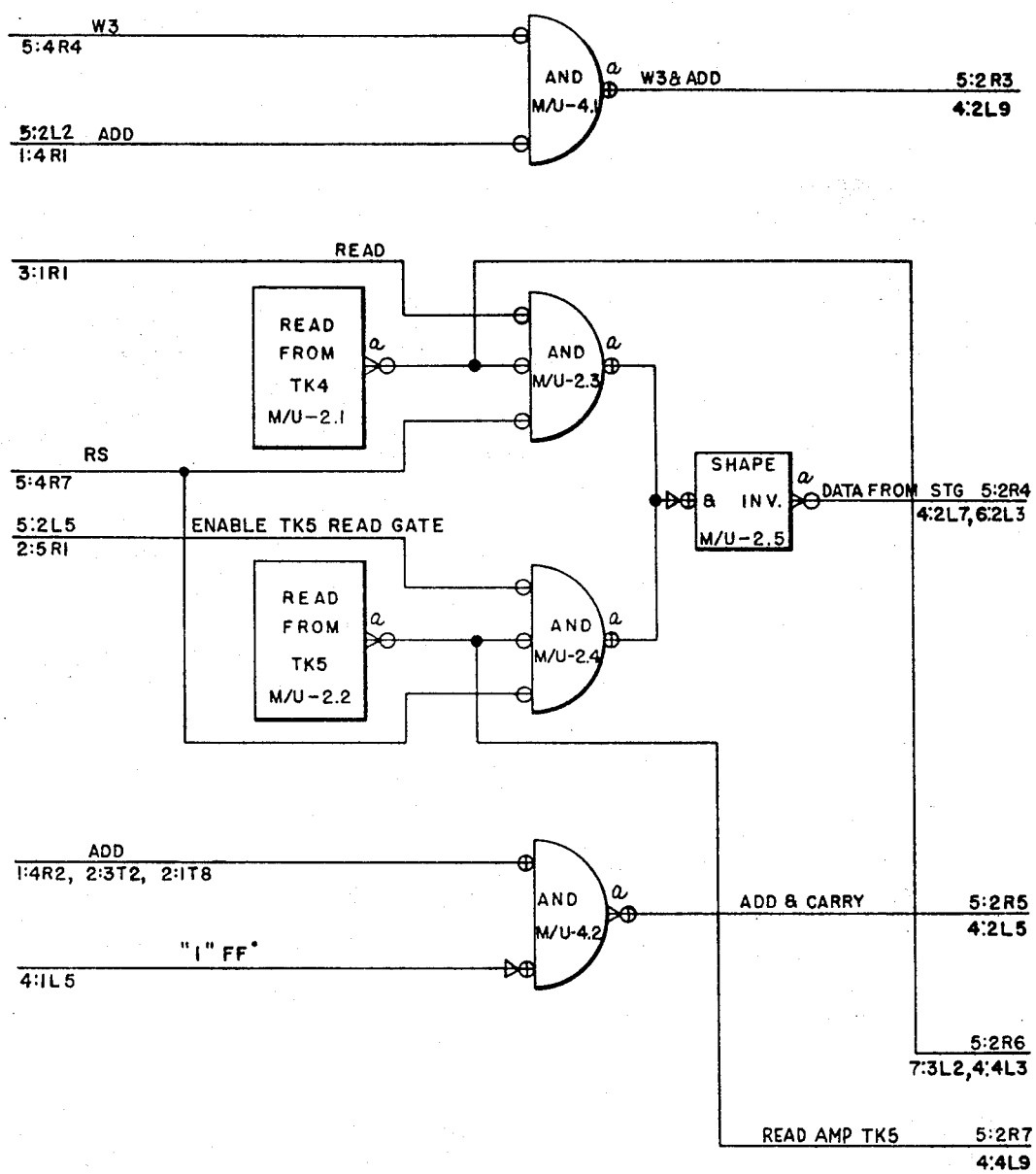
FIG_32 (5:2)

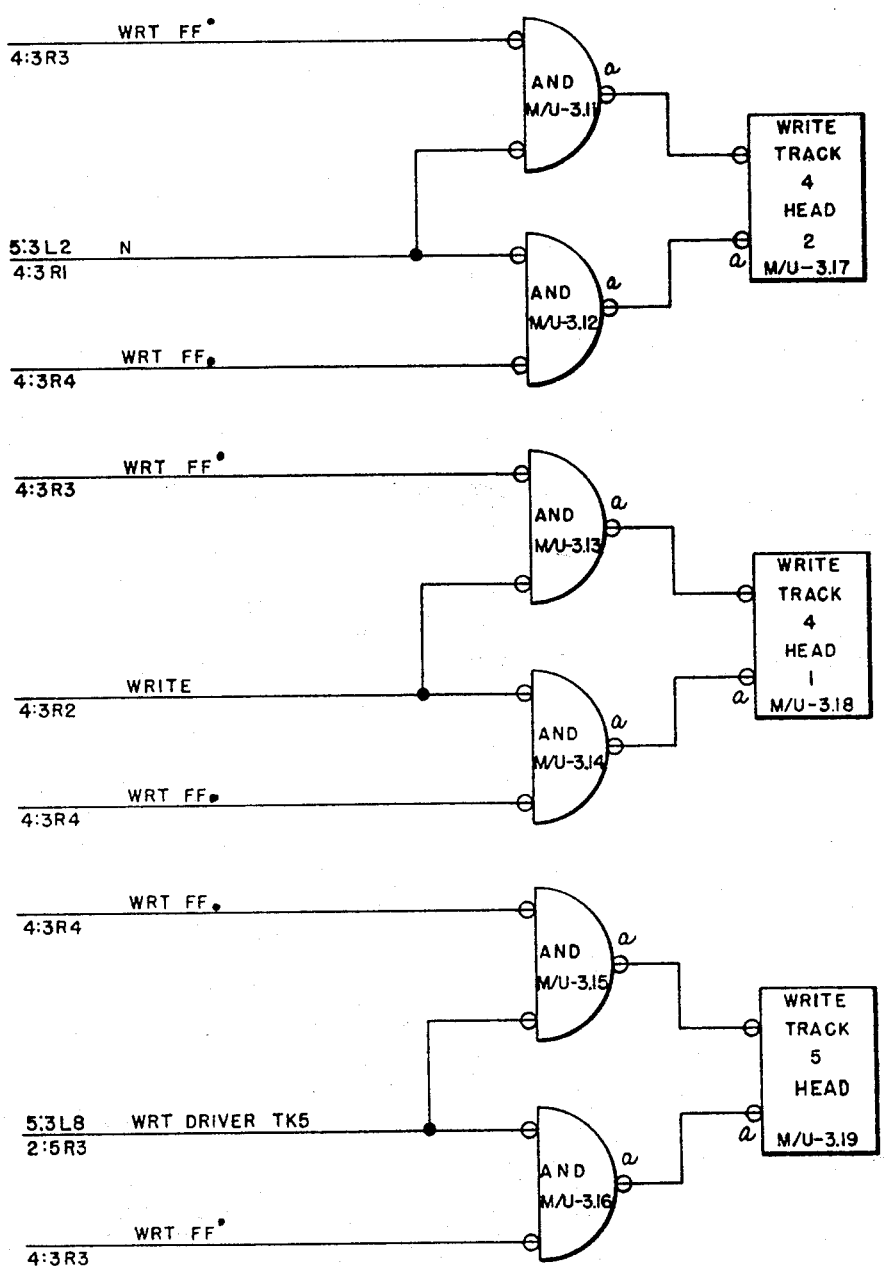
FIG_33 (5:3)

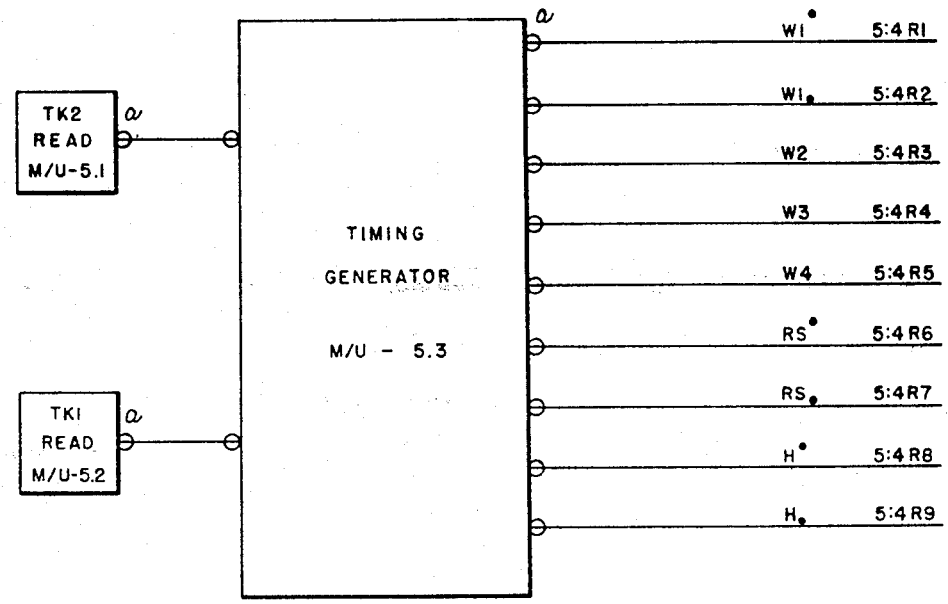
FIG_34 (5:4)

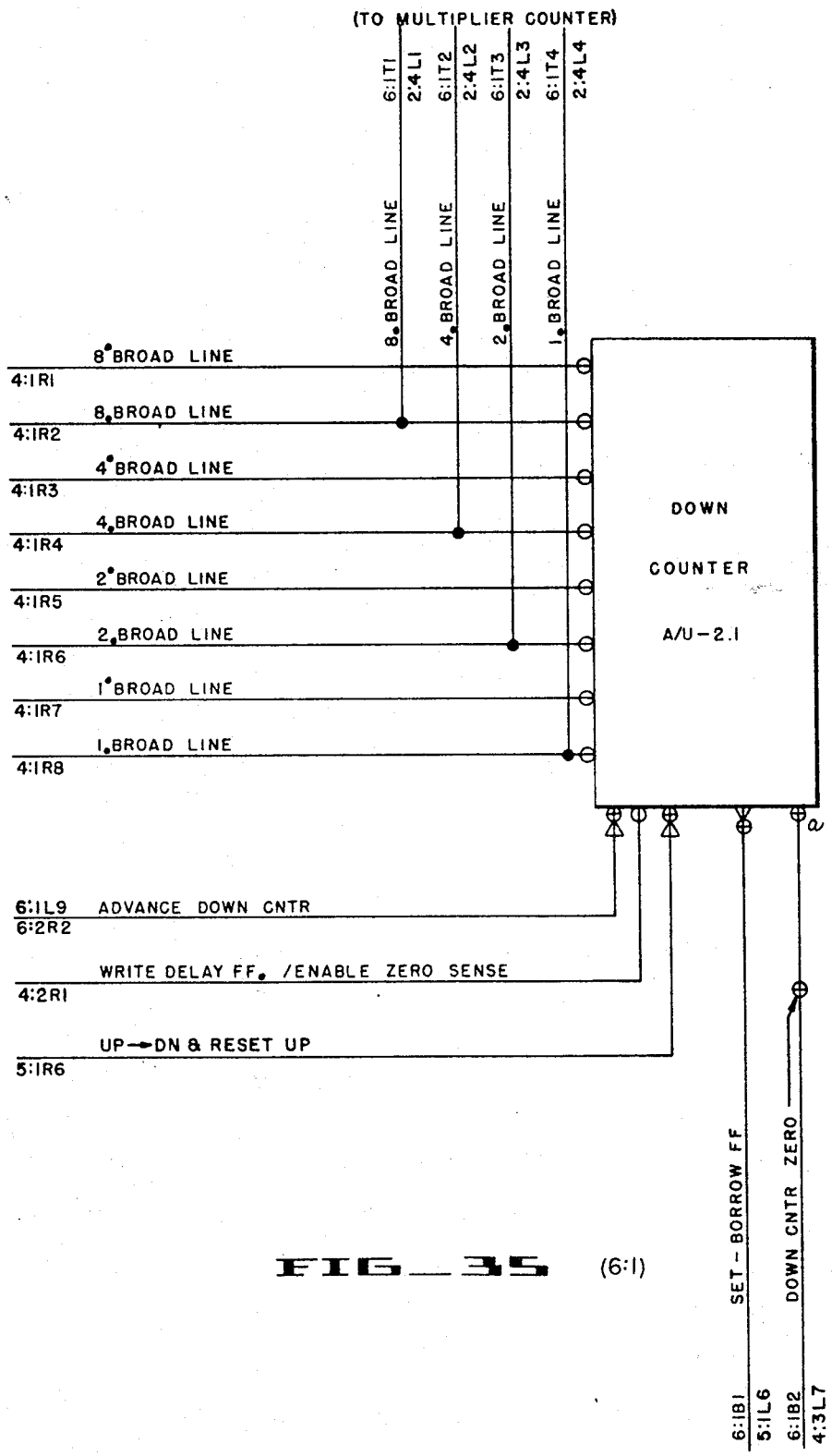
FIG_35 (6:1)

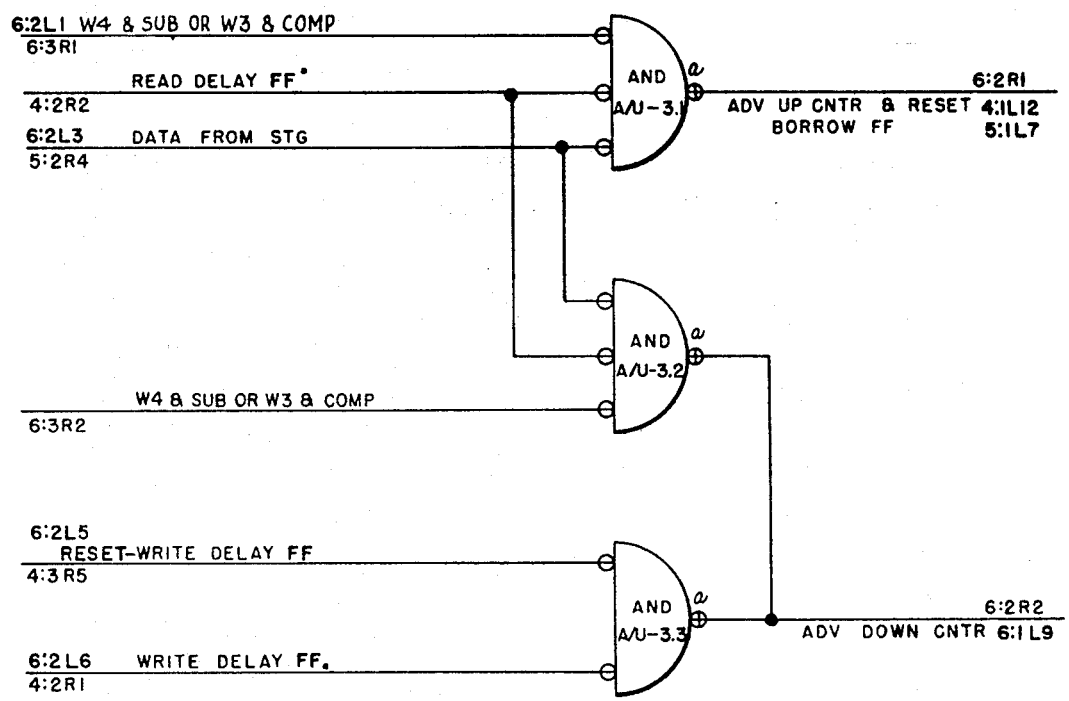
FIG_36 (6:2)

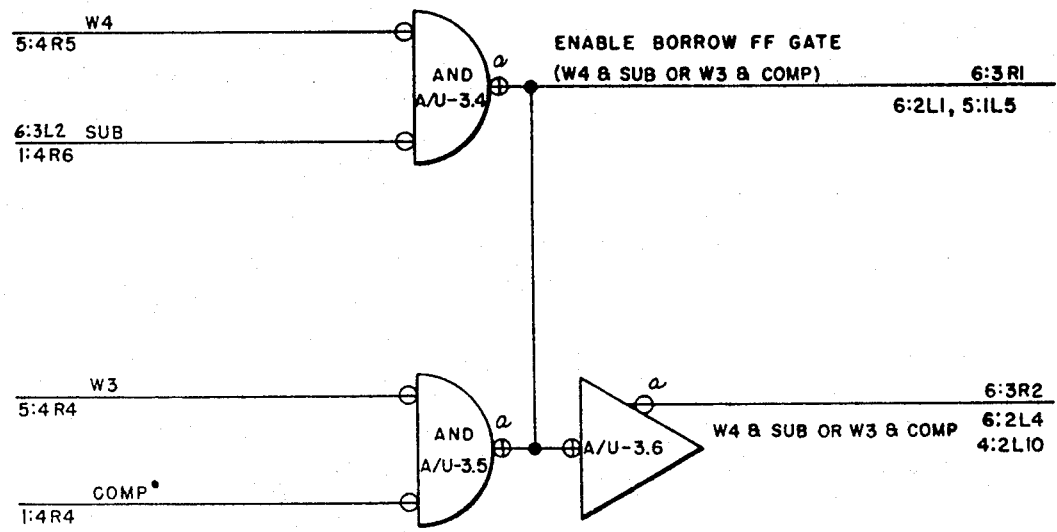
FIG_37 (6:3)

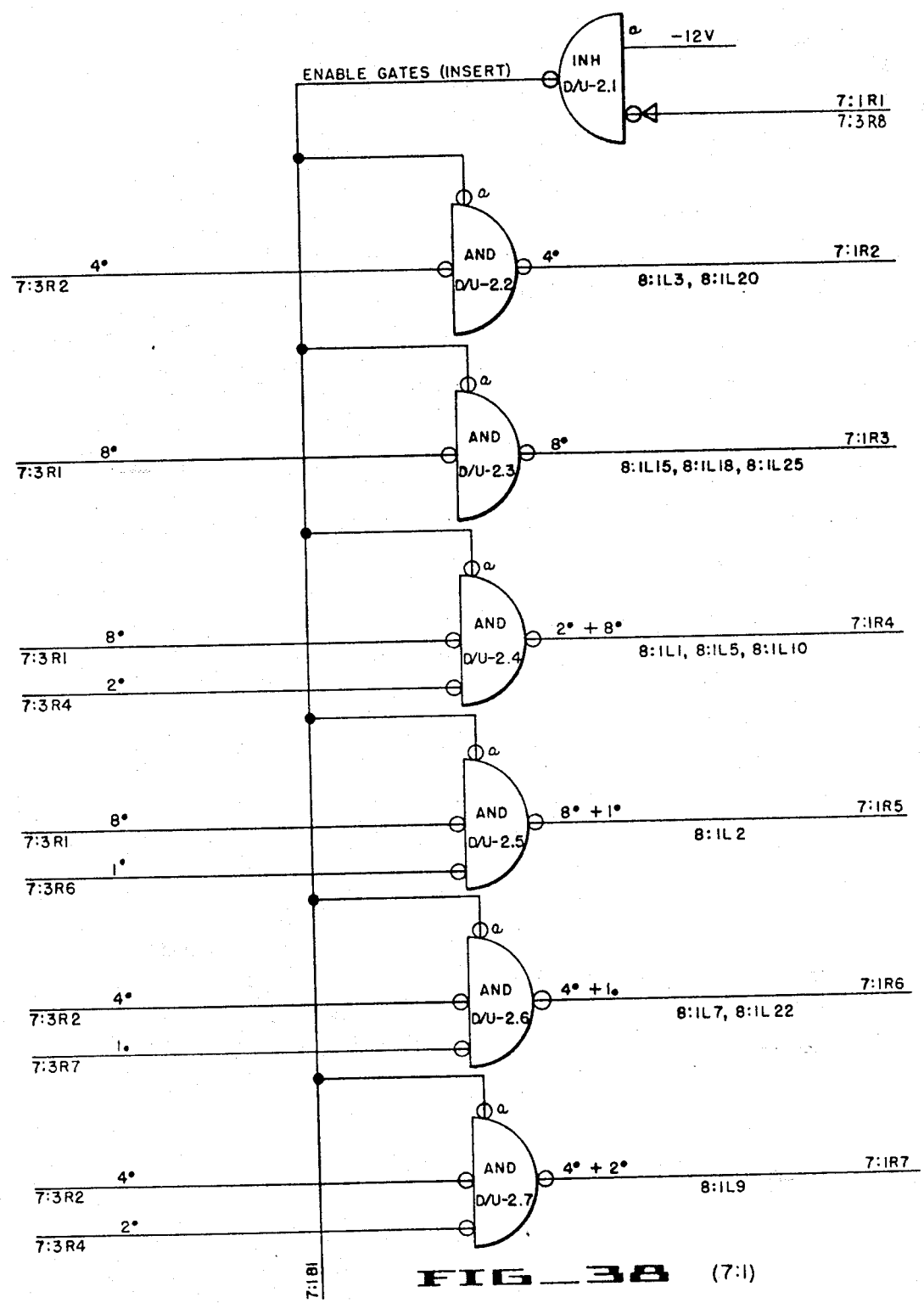

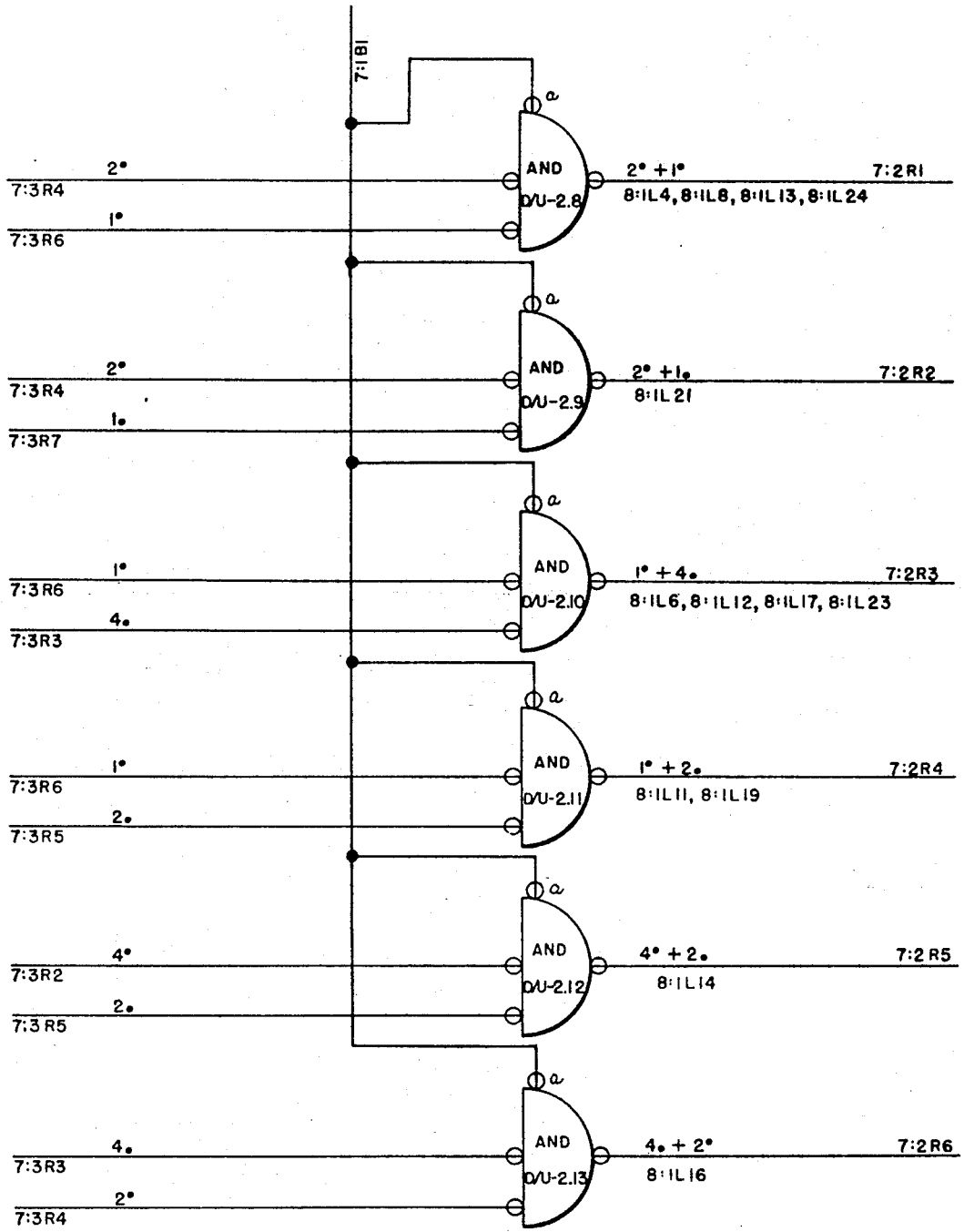
FIG_39 (7:2)

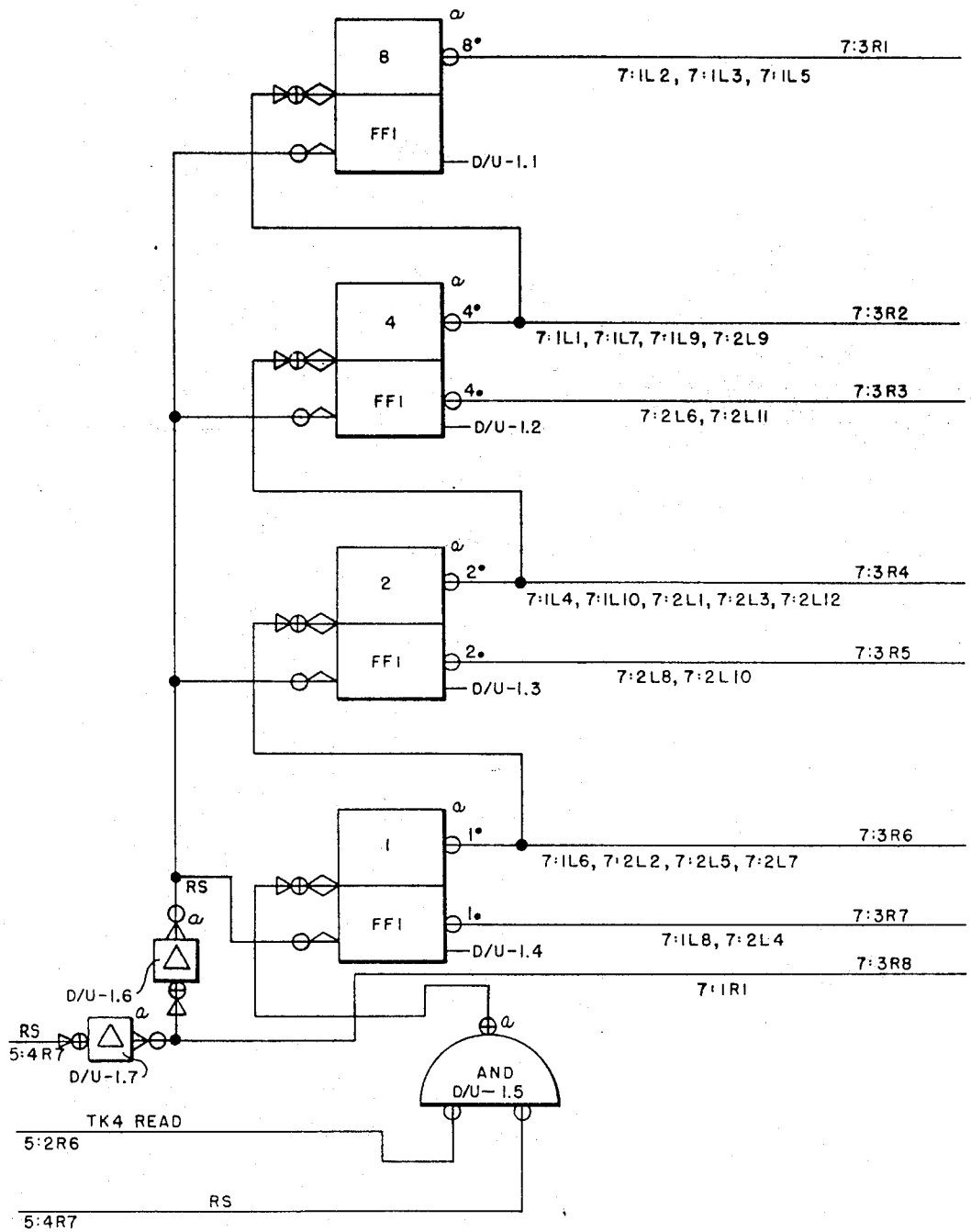
FIG_40 (7:3)

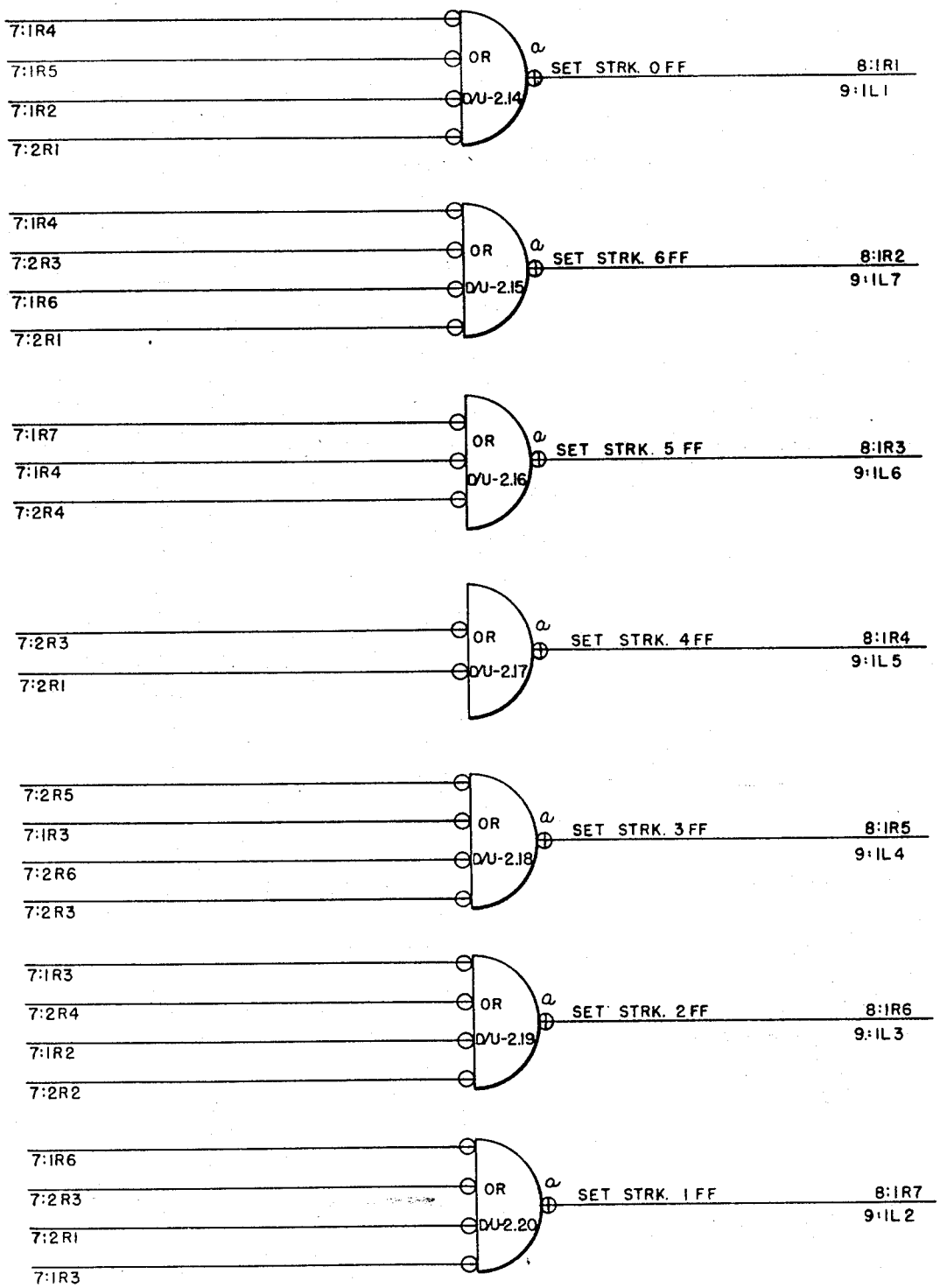
FIG_41 (8:1)

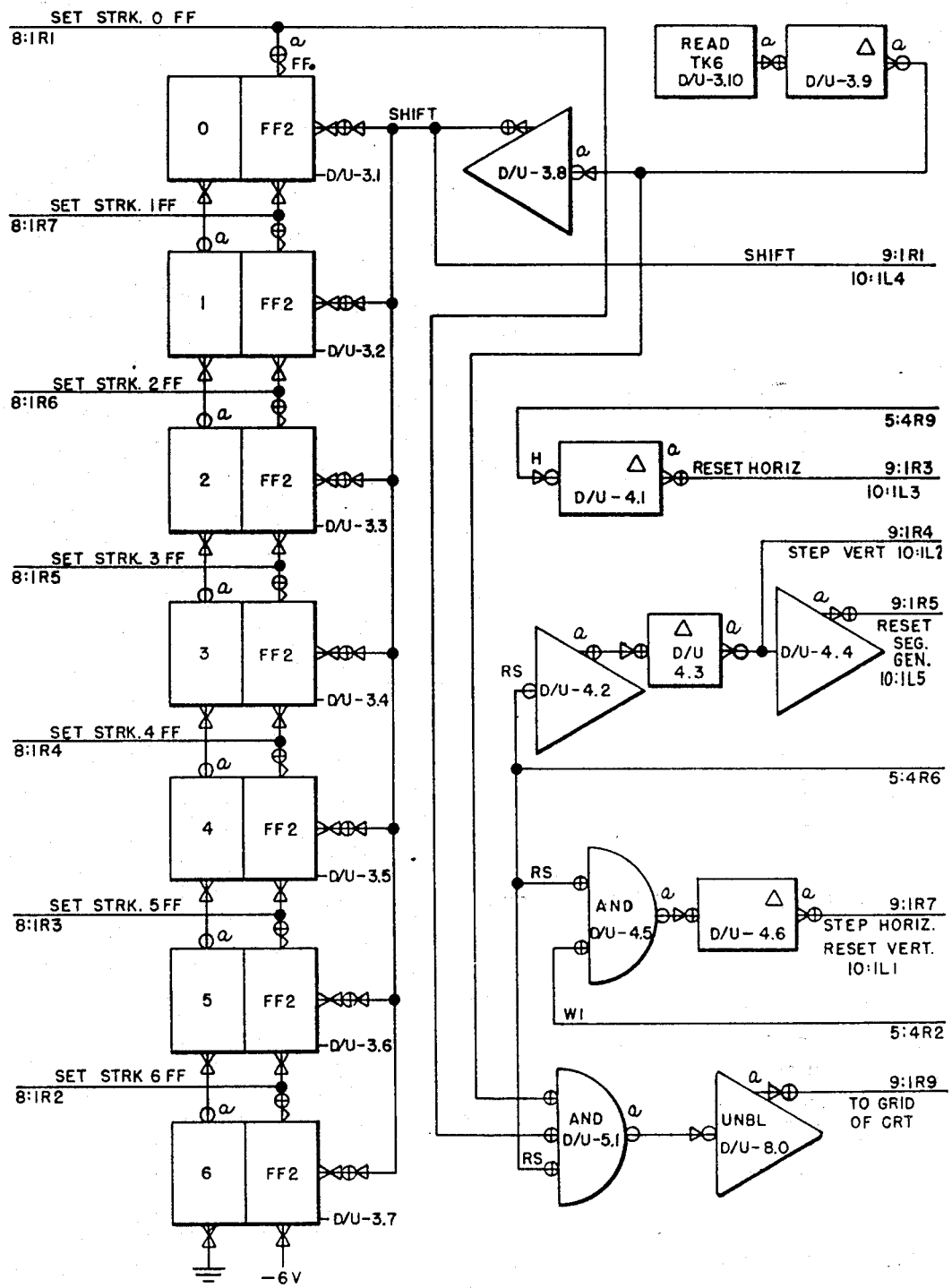
FIG_42 (9:1)

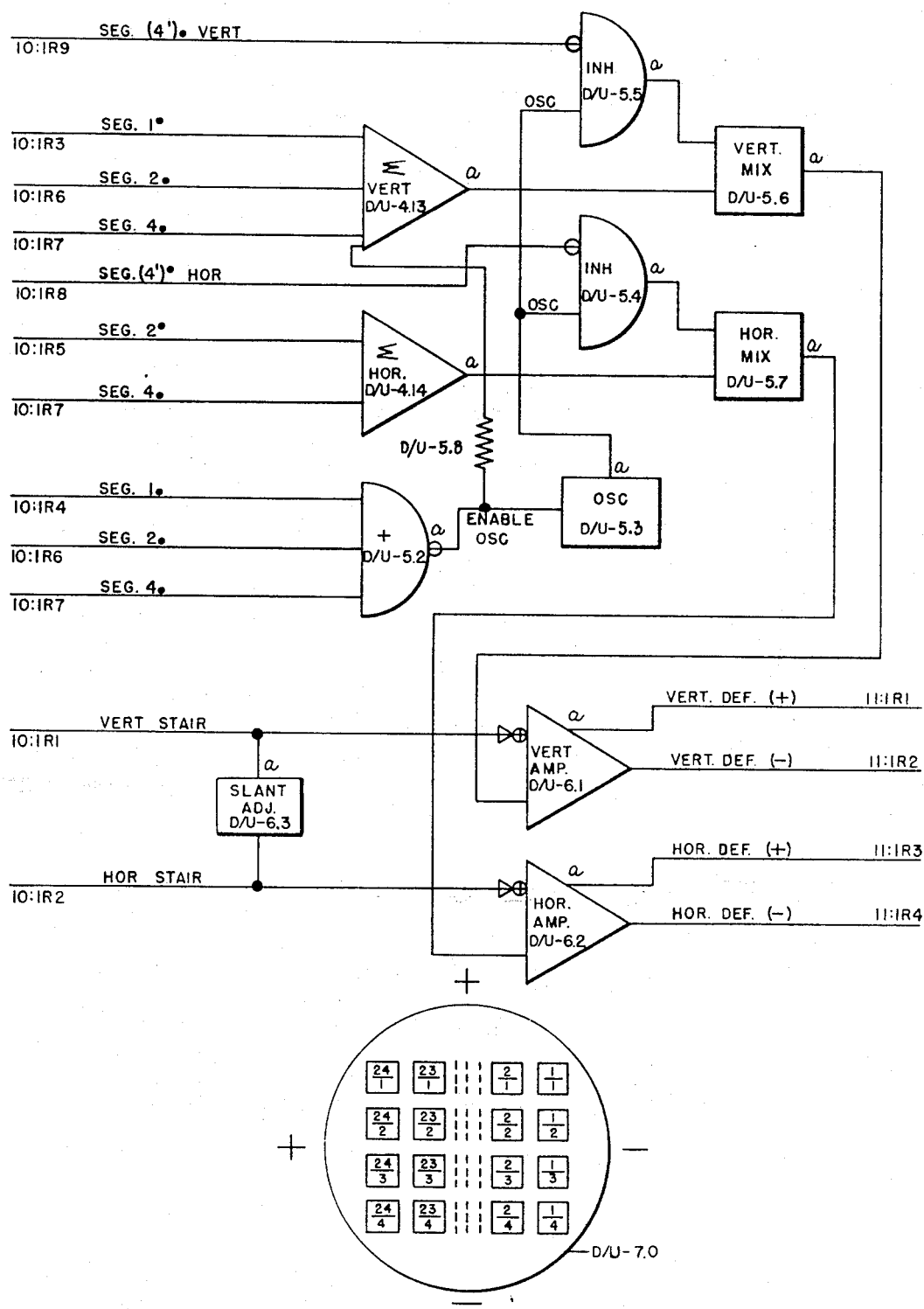
FIG_44 (1:1)

| FLIP FLOP | "0" | "1" | F.F. OUT |
|---|---|---|---|
| I | GND. | −6V | Q |
| II | GND. | −6V | Q |
| III | GND. | −12V | Q |
~ GND. = POS. VOLTAGE LEVEL
~ −6VOLTS OR −12VOLTS = NEG. VOLTAGE LEVEL
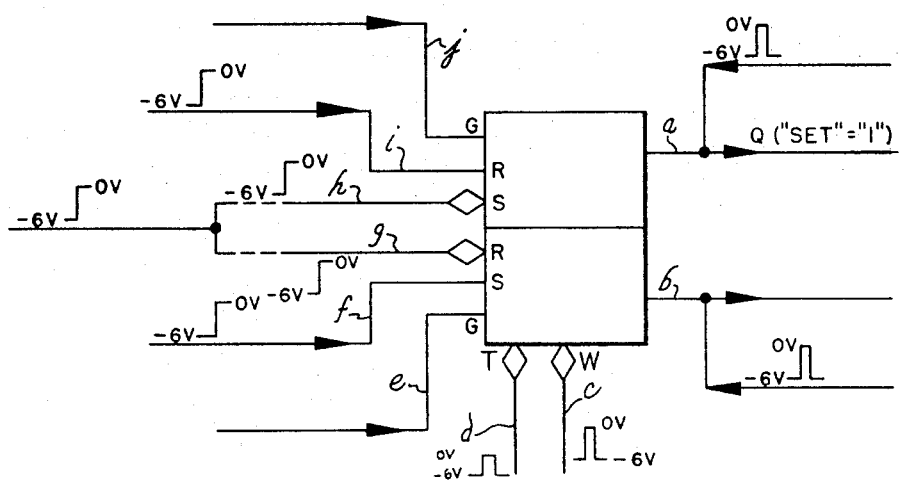
FIG_45
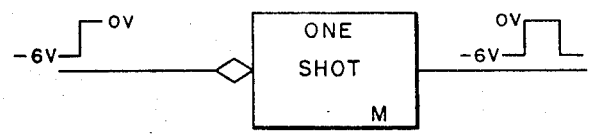
FIG_46

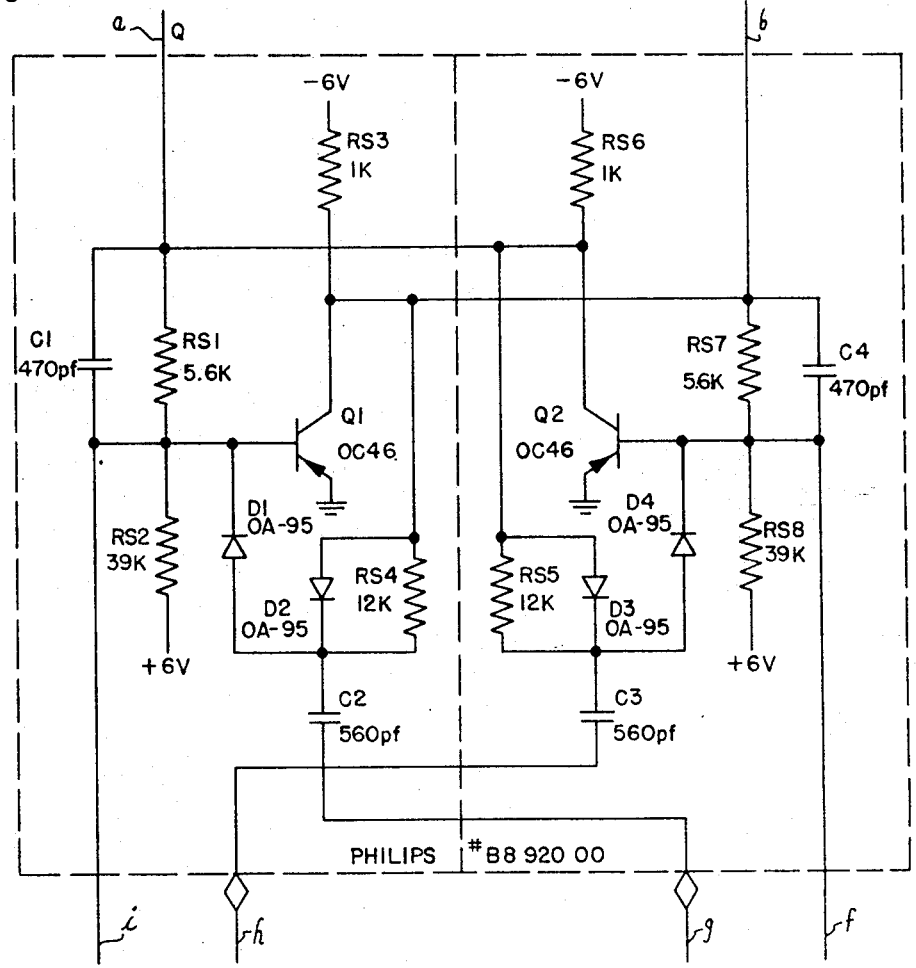
FIG_47
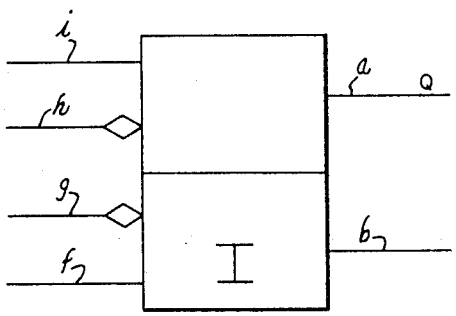
FIG_48

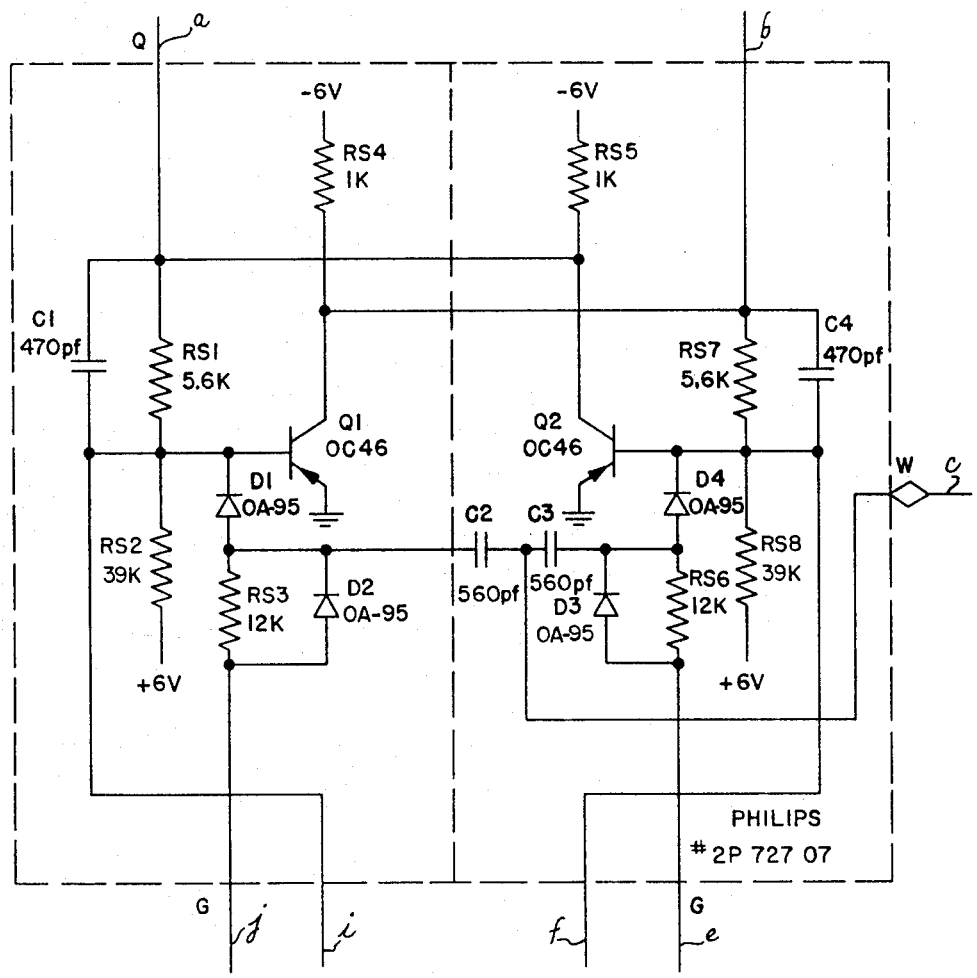
FIG_49
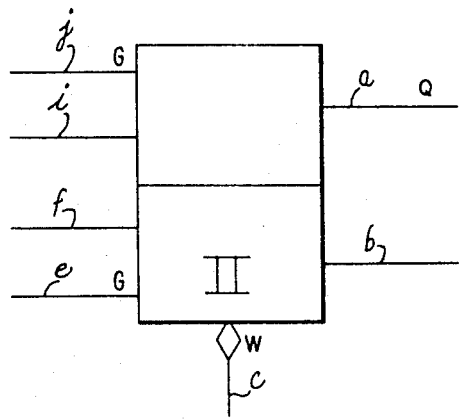
FIG_50

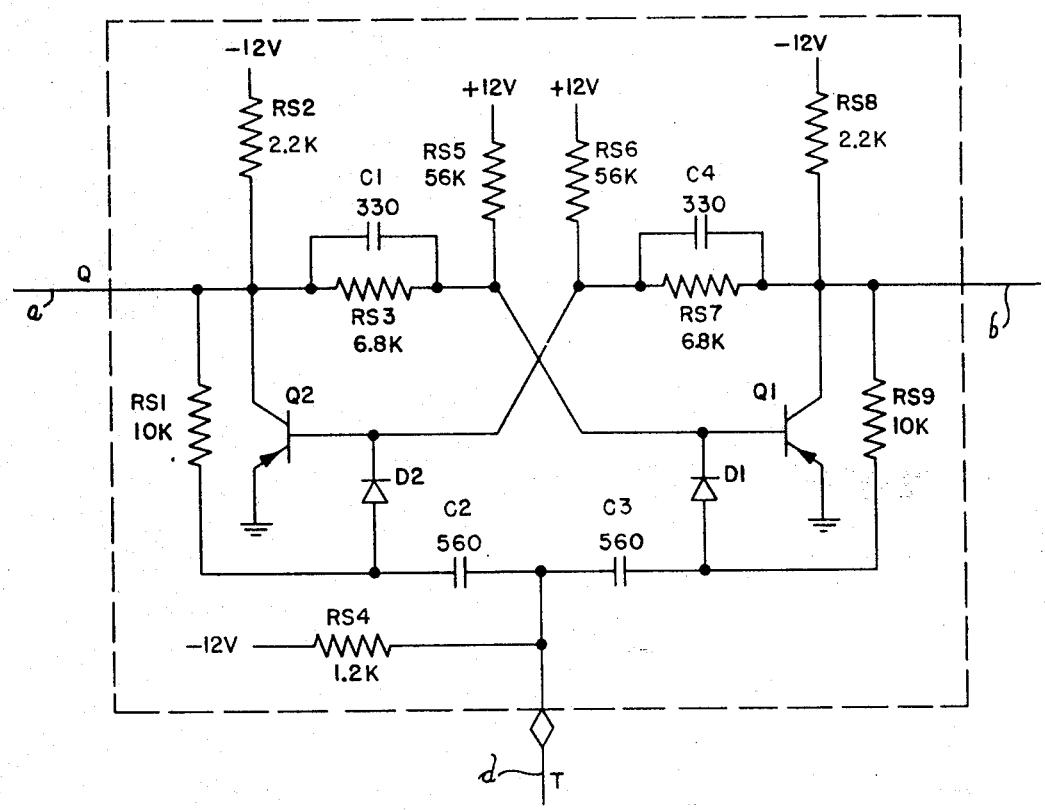
FIG_51
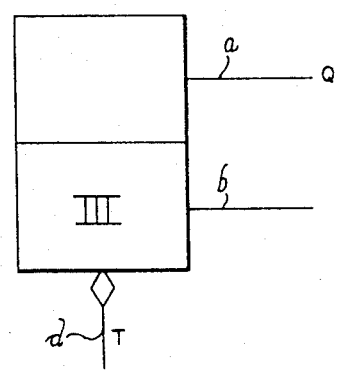
FIG_52

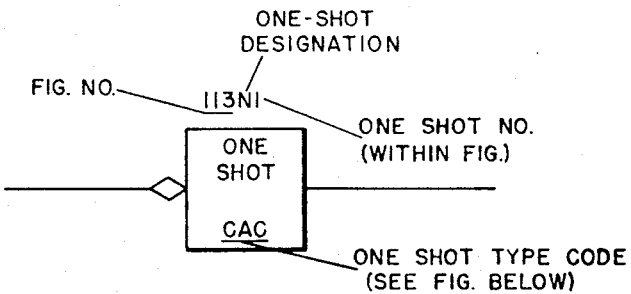
FIG_53
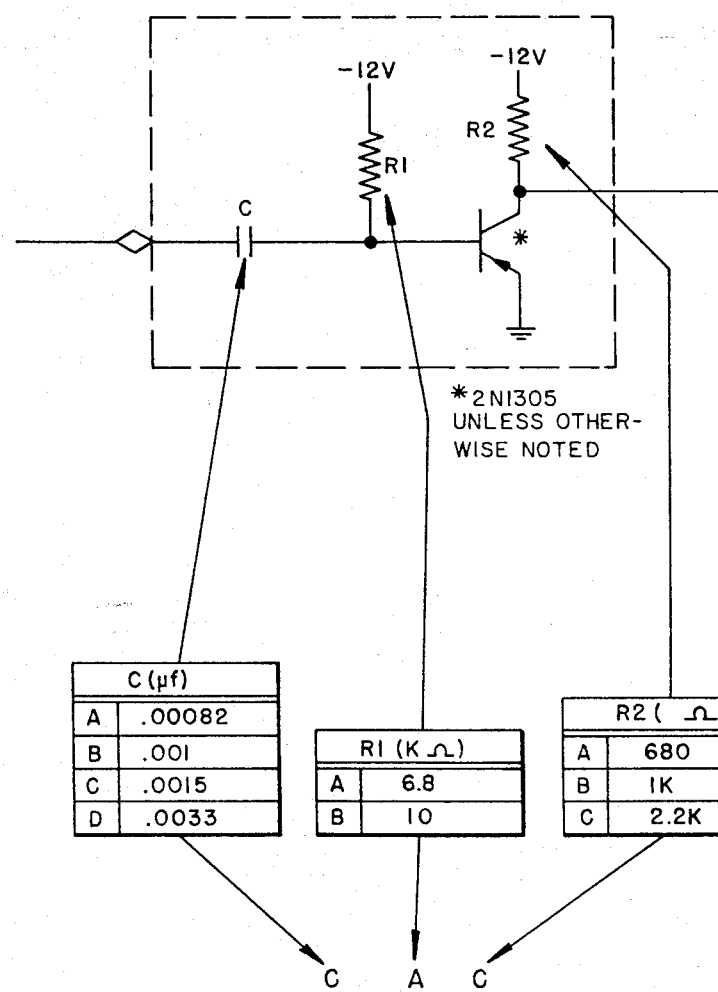
FIG_54

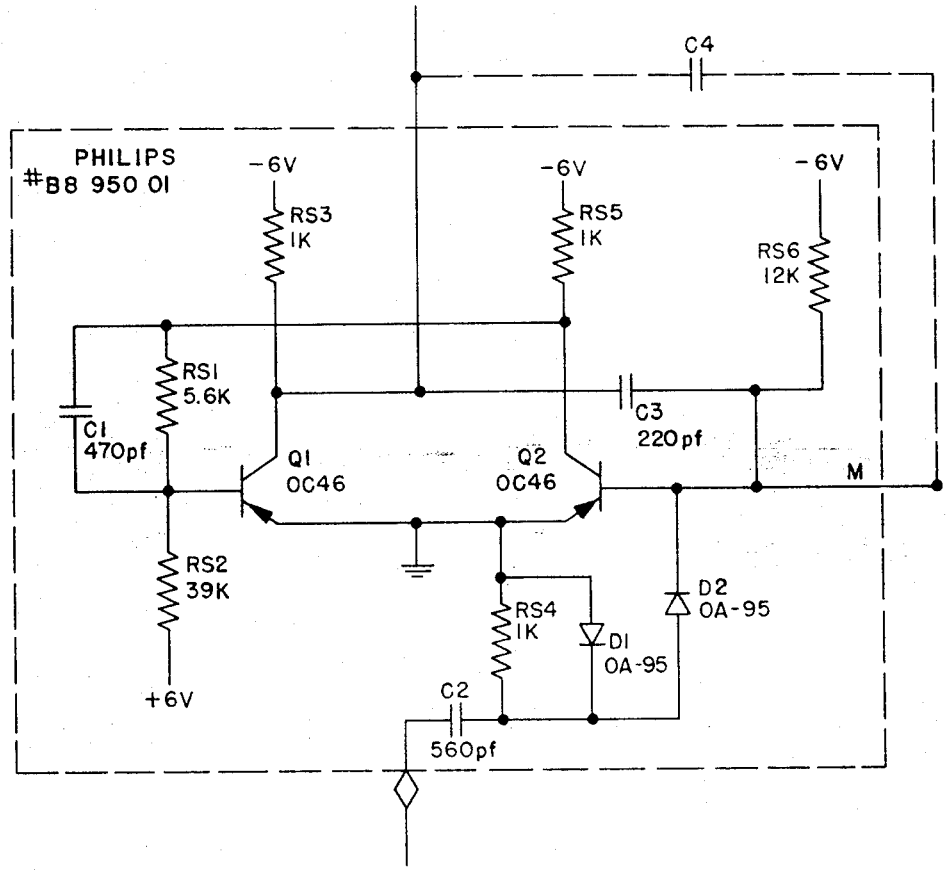
FIG_55
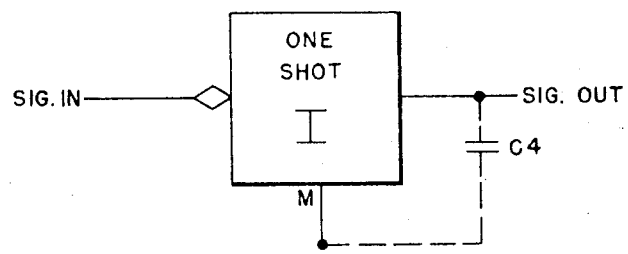
FIG_56

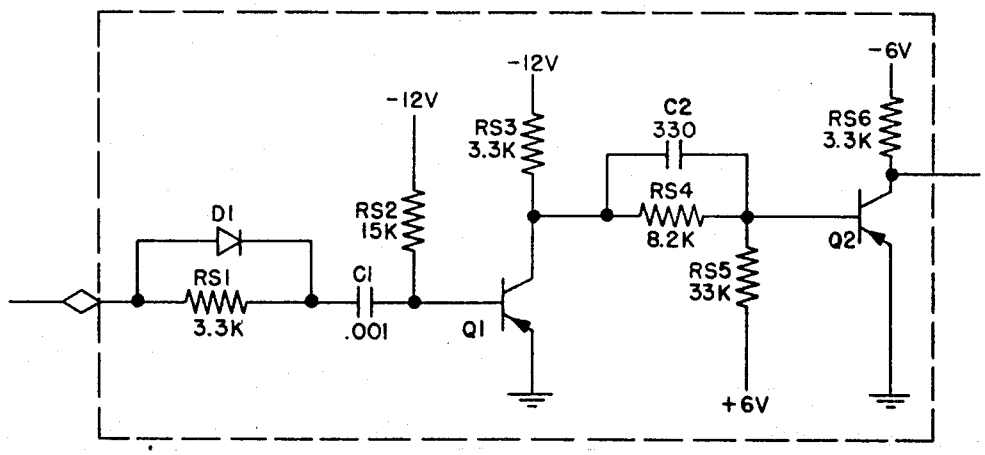
FIG_57
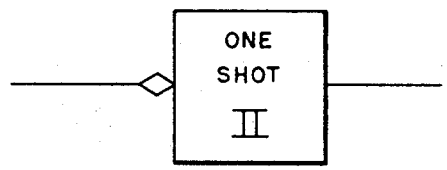
FIG_58
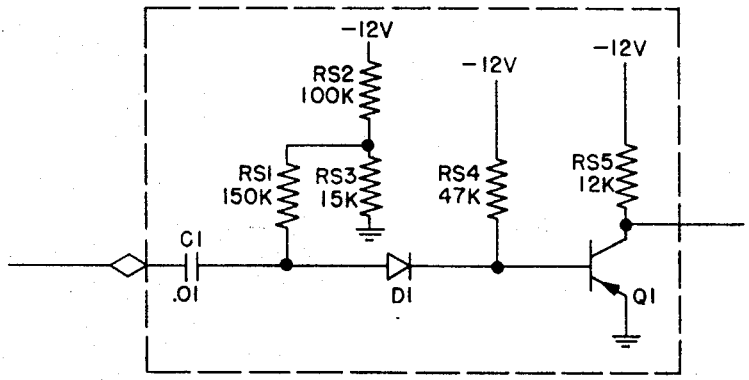
FIG_59
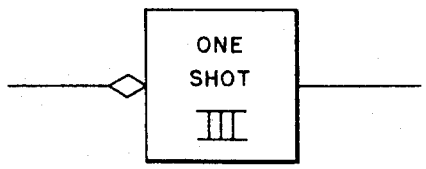
FIG_60

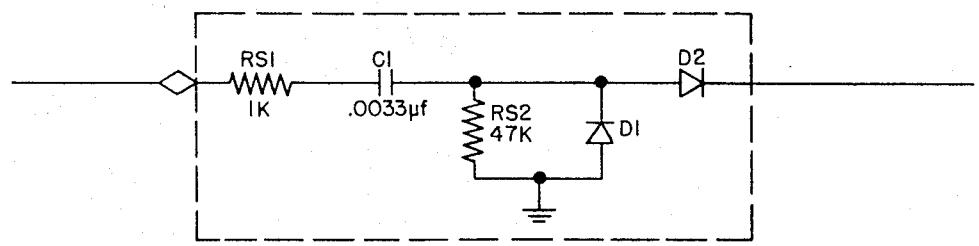
FIG_61
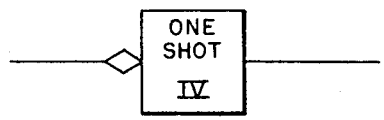
FIG_62
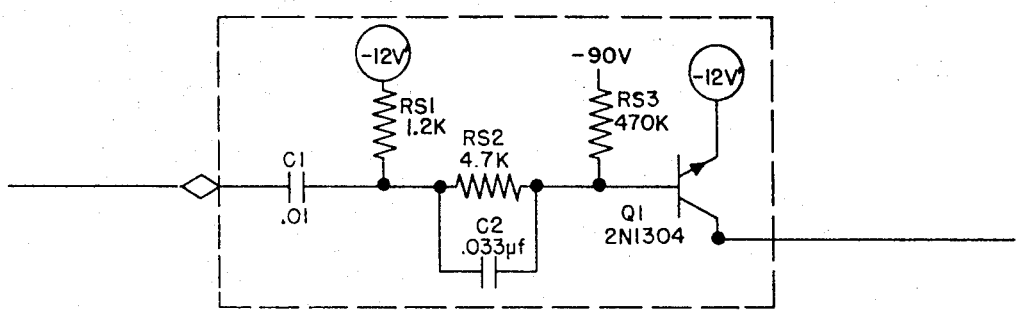
FIG_63
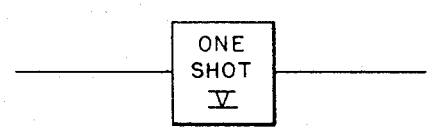
FIG_64
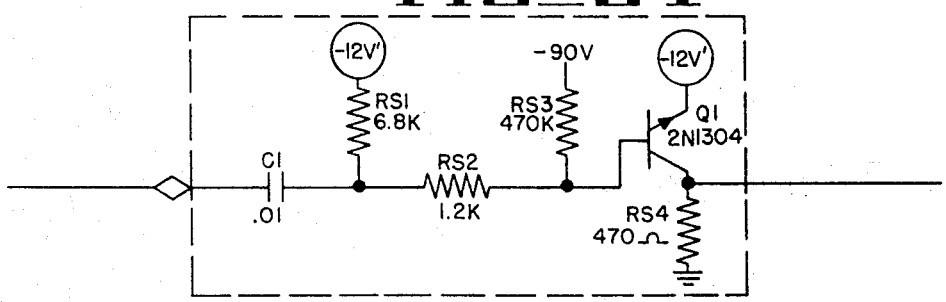
FIG_65
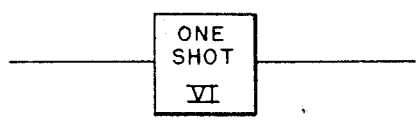
FIG_66

Oct. 21, 1969   R. A. RAGEN ET AL   3,474,238
ELECTRONIC CALCULATOR FOR PERFORMING RESTORING DECIMAL DIVISION
Original Filed Oct. 28, 1963   133 Sheets-Sheet 48
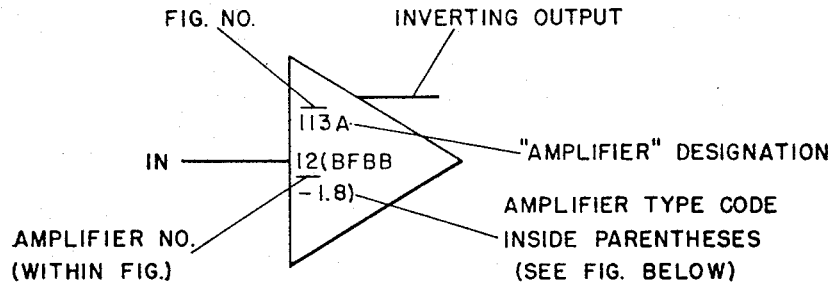
FIG_62
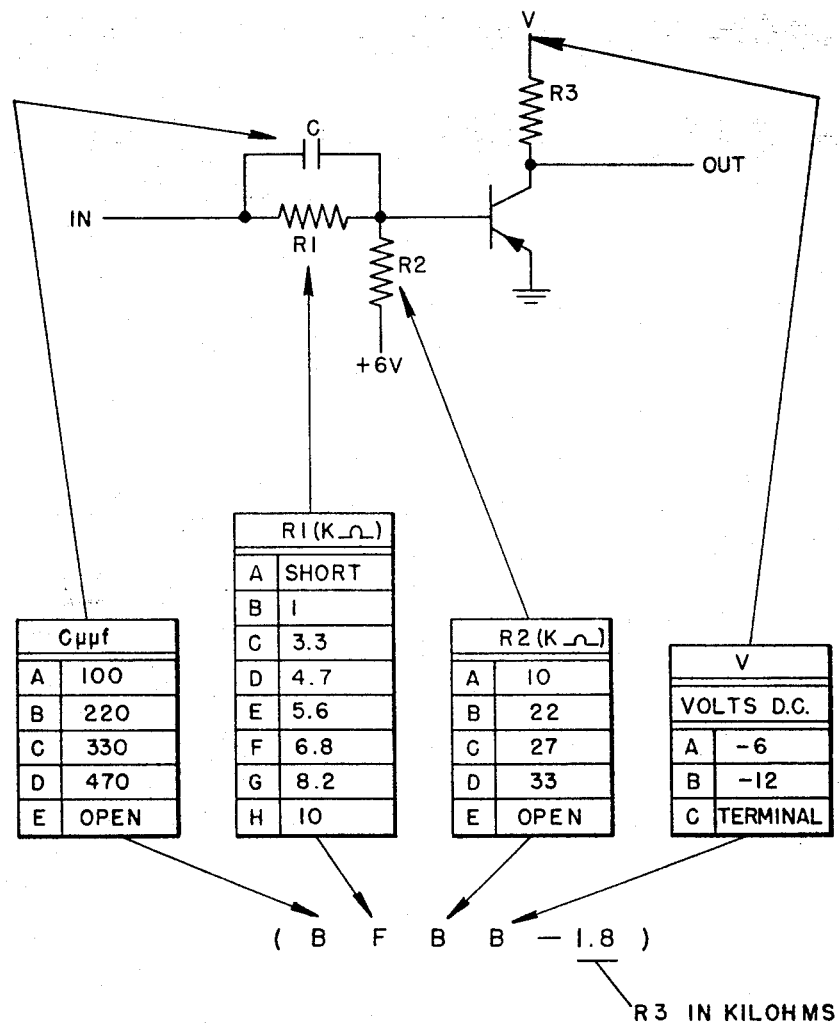
FIG_68

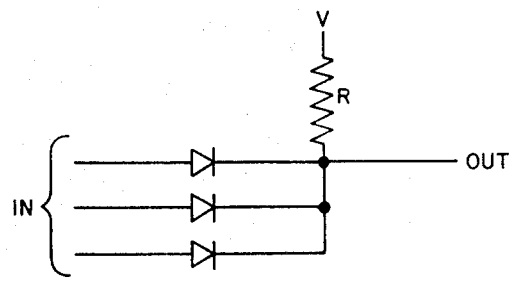
FIG_69
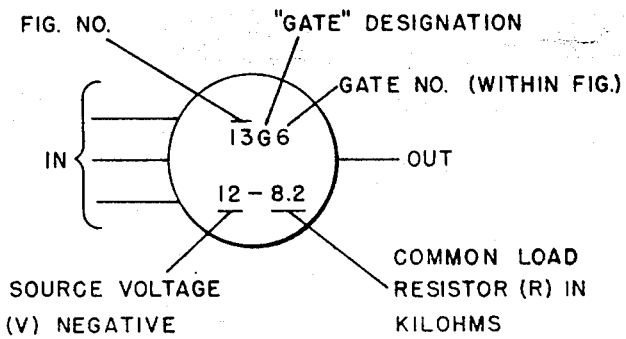
FIG_70
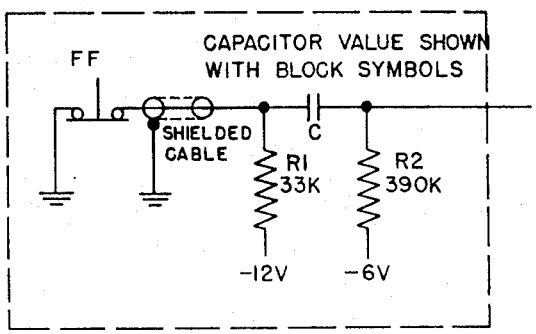
FIG_71
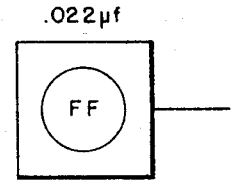
FIG_72

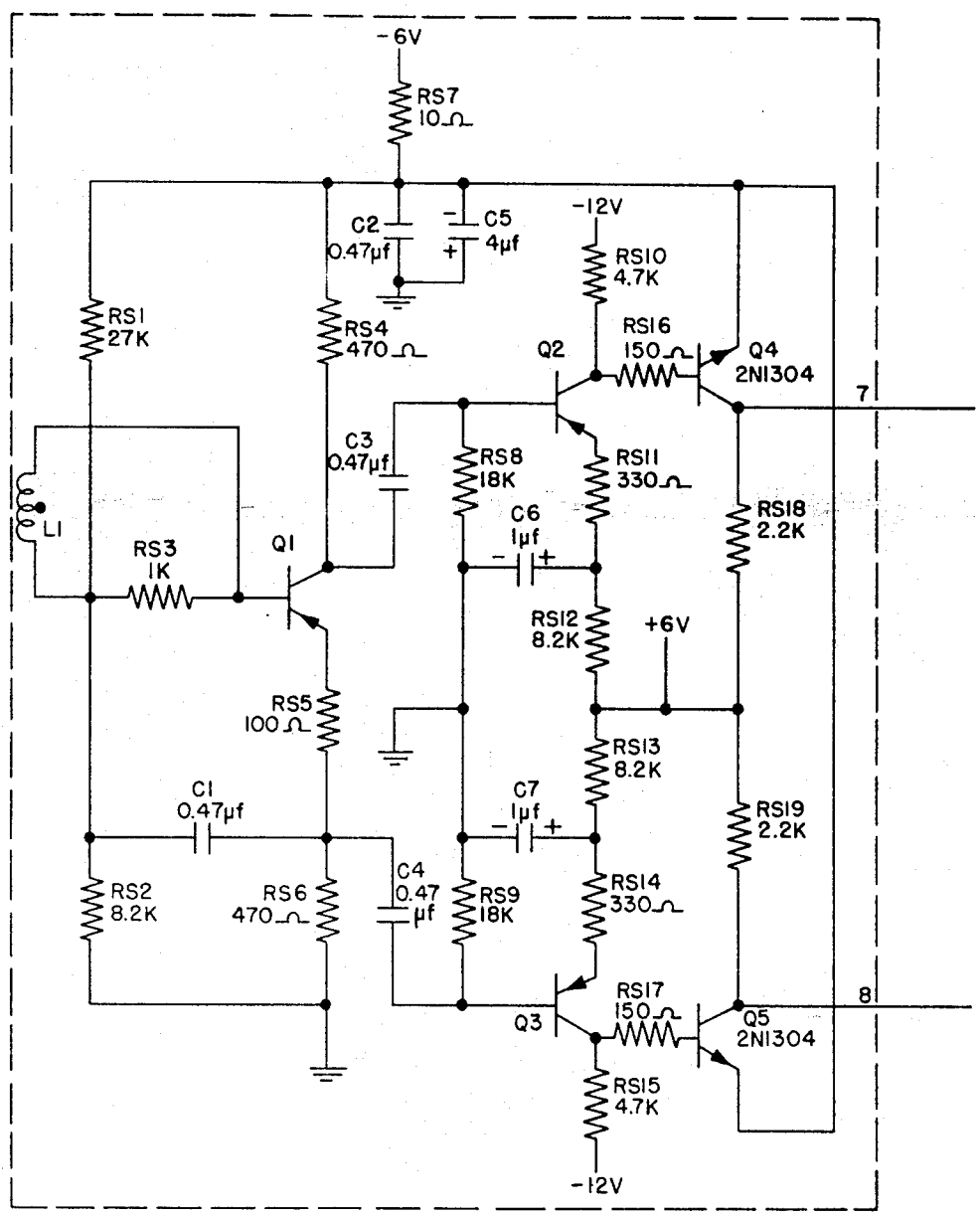
FIG_73
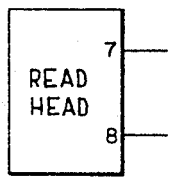
FIG_74

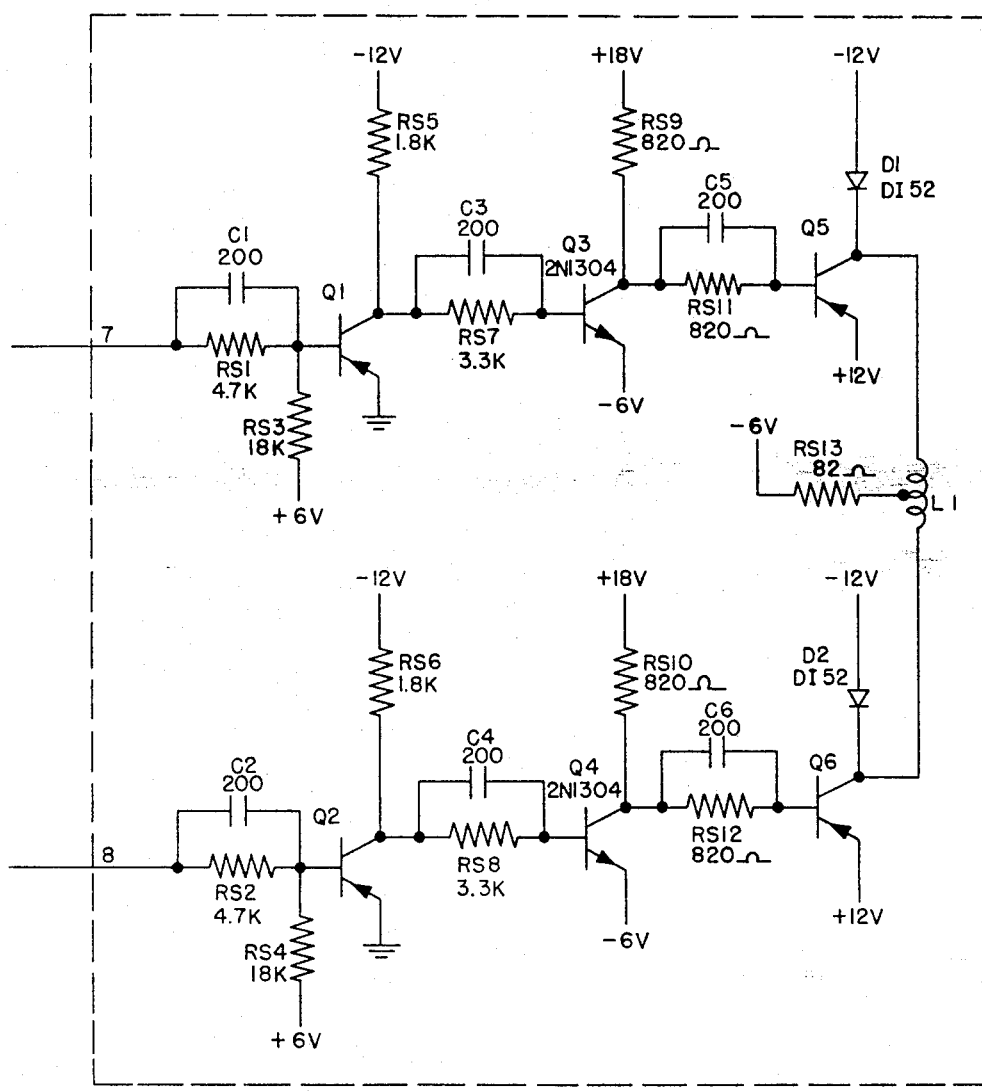
FIG_25
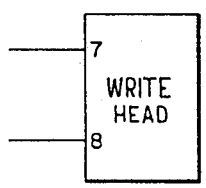
FIG_26

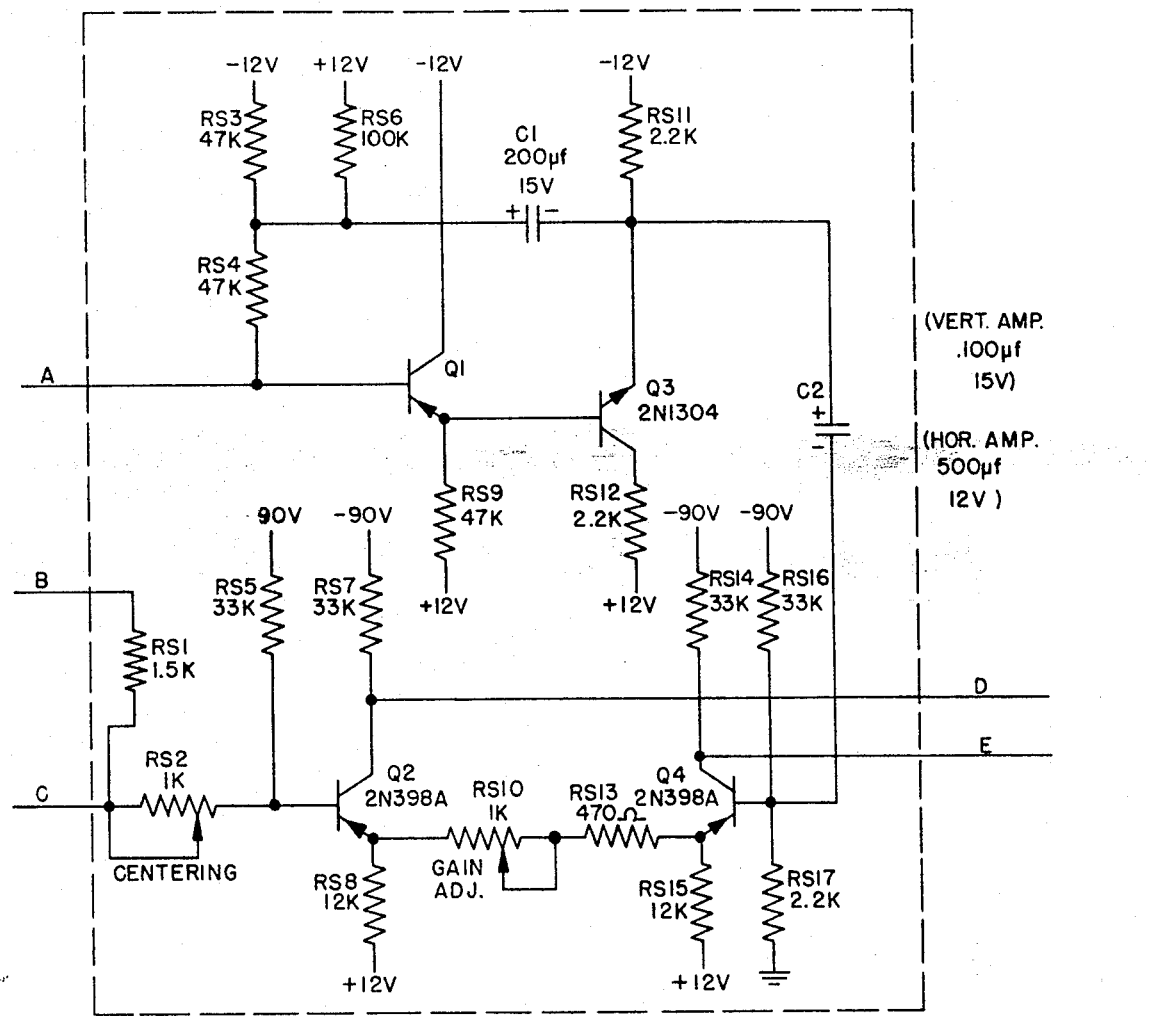
FIG_22
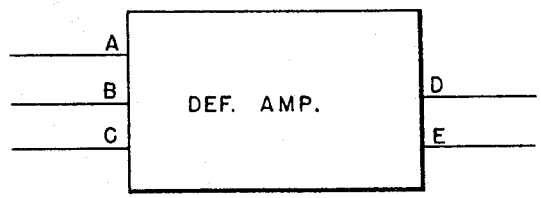
FIG_28

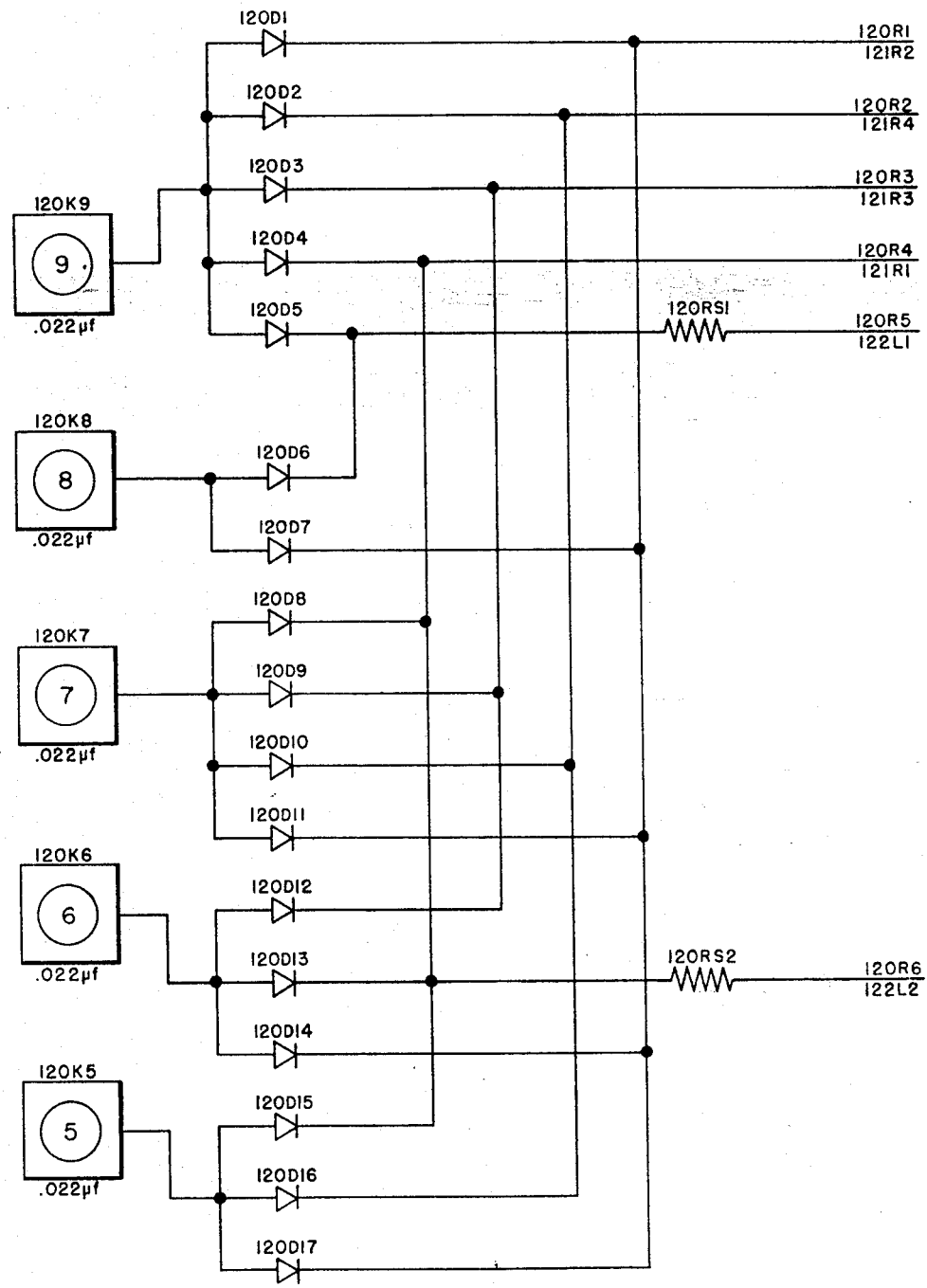

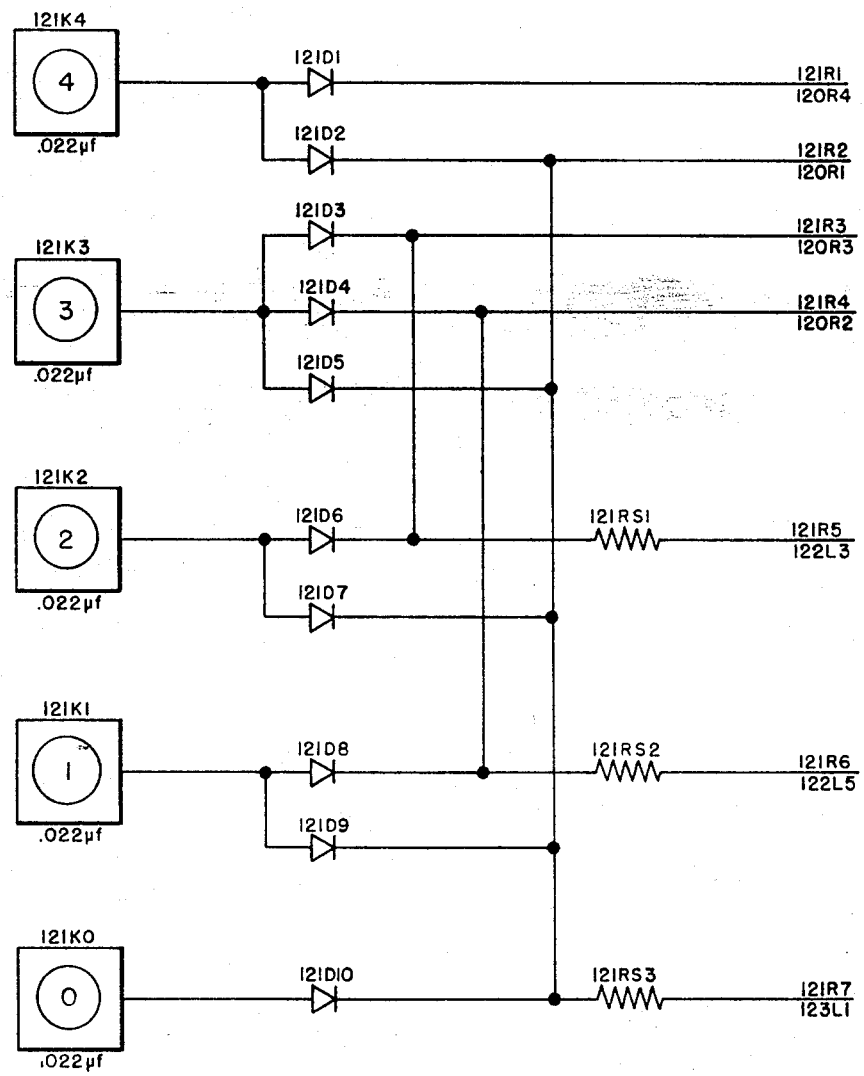
FIG_80 (121)

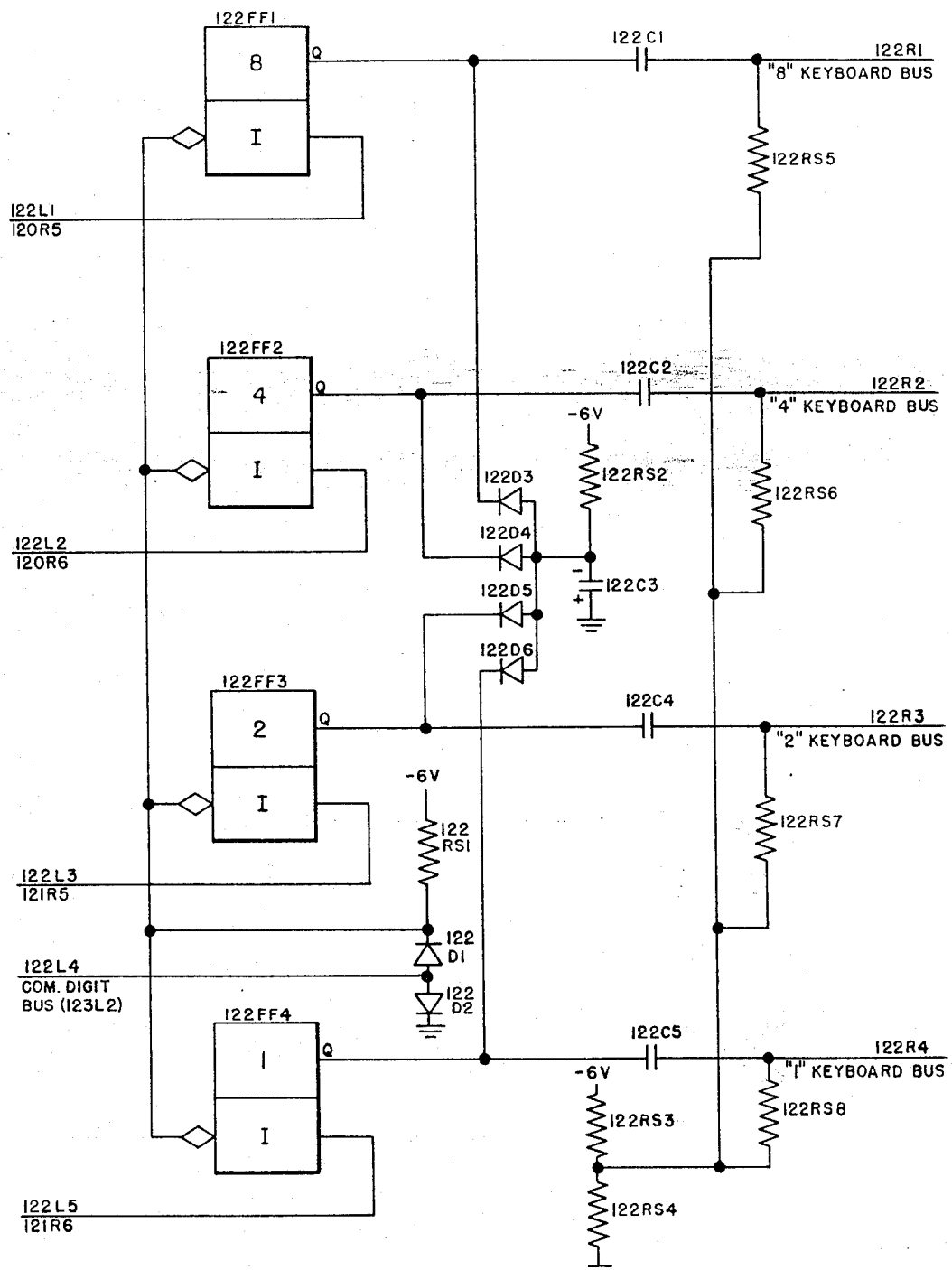
FIG_81 (122)

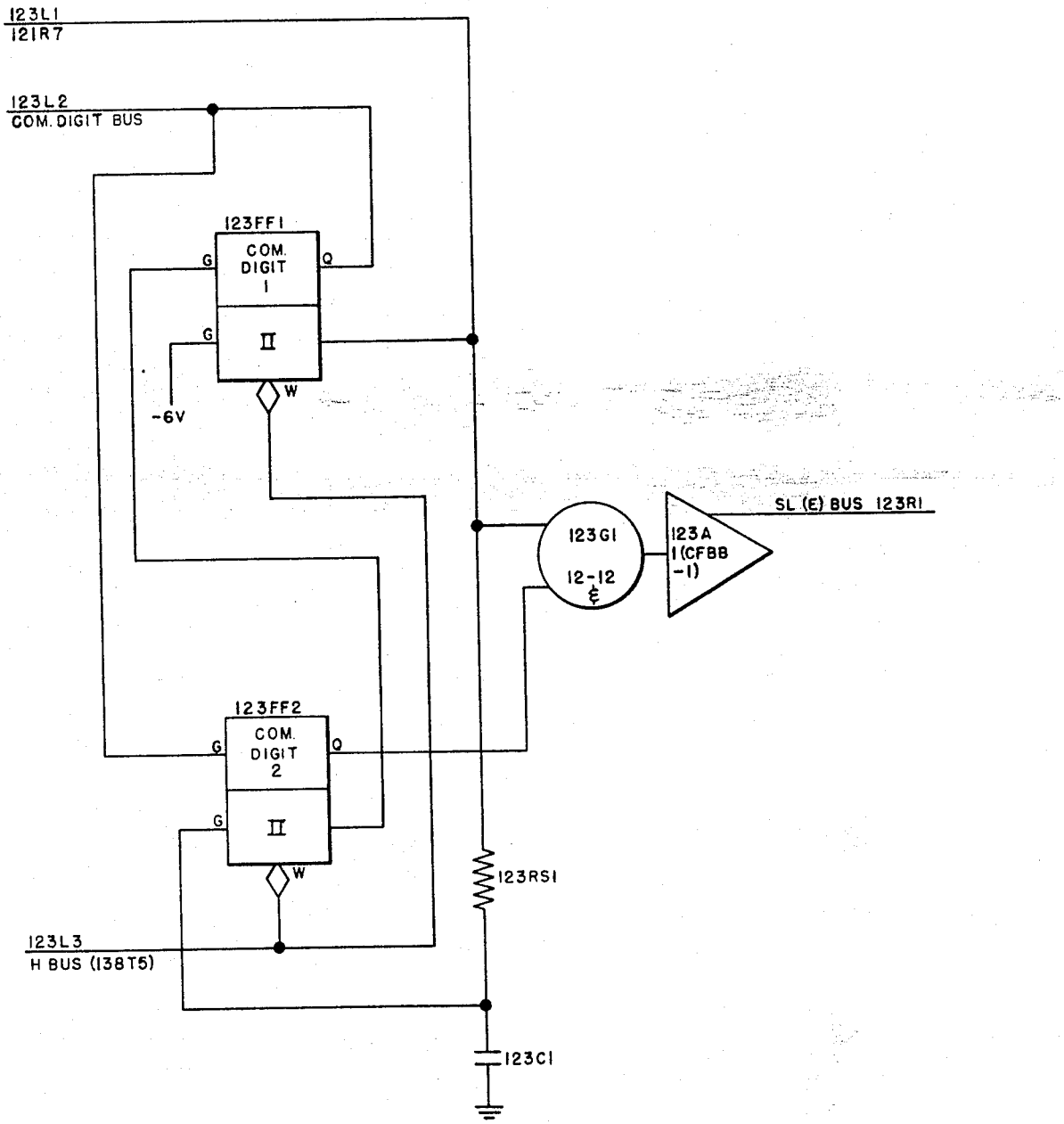
FIG_82 (123)

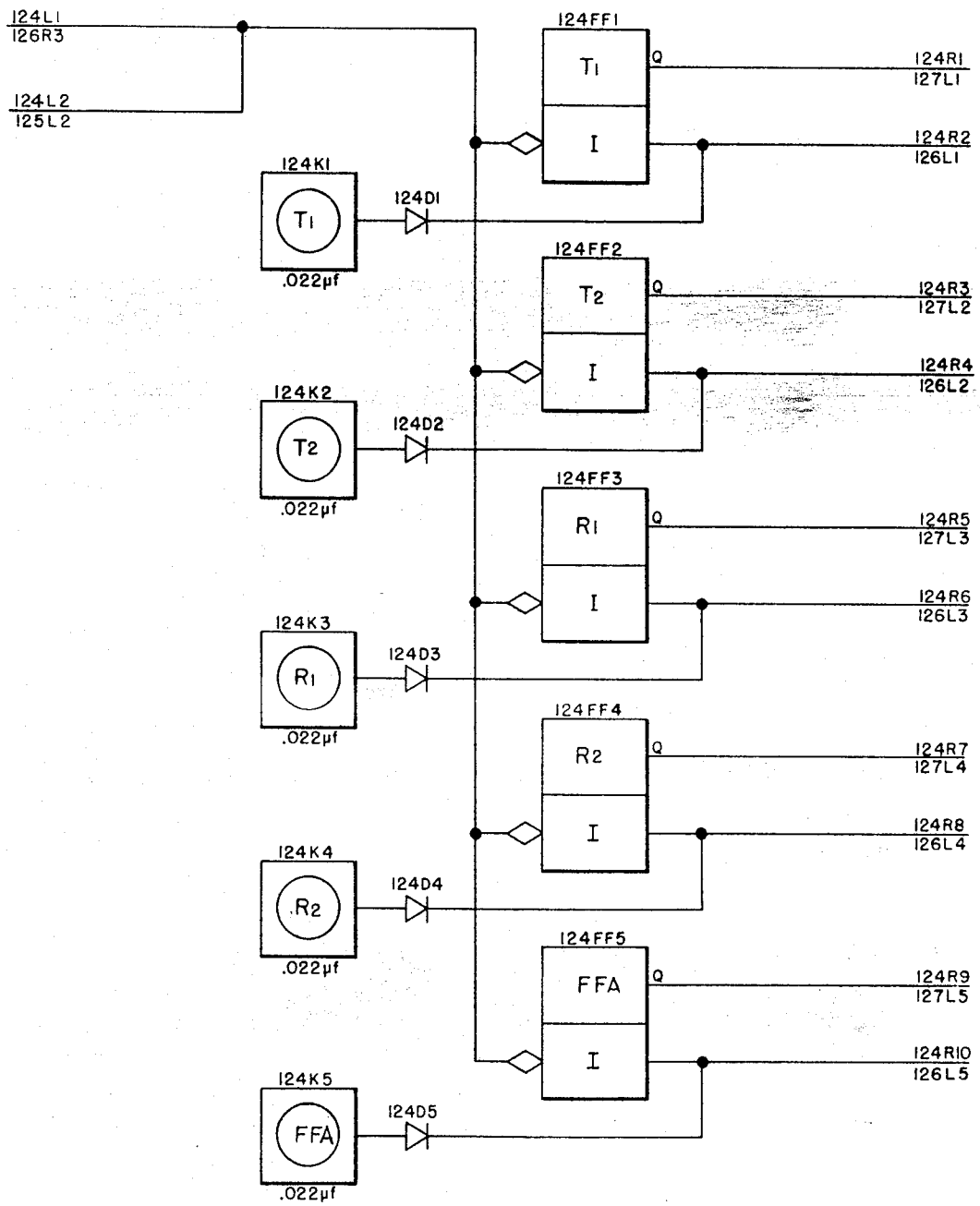
FIG_83 (124)

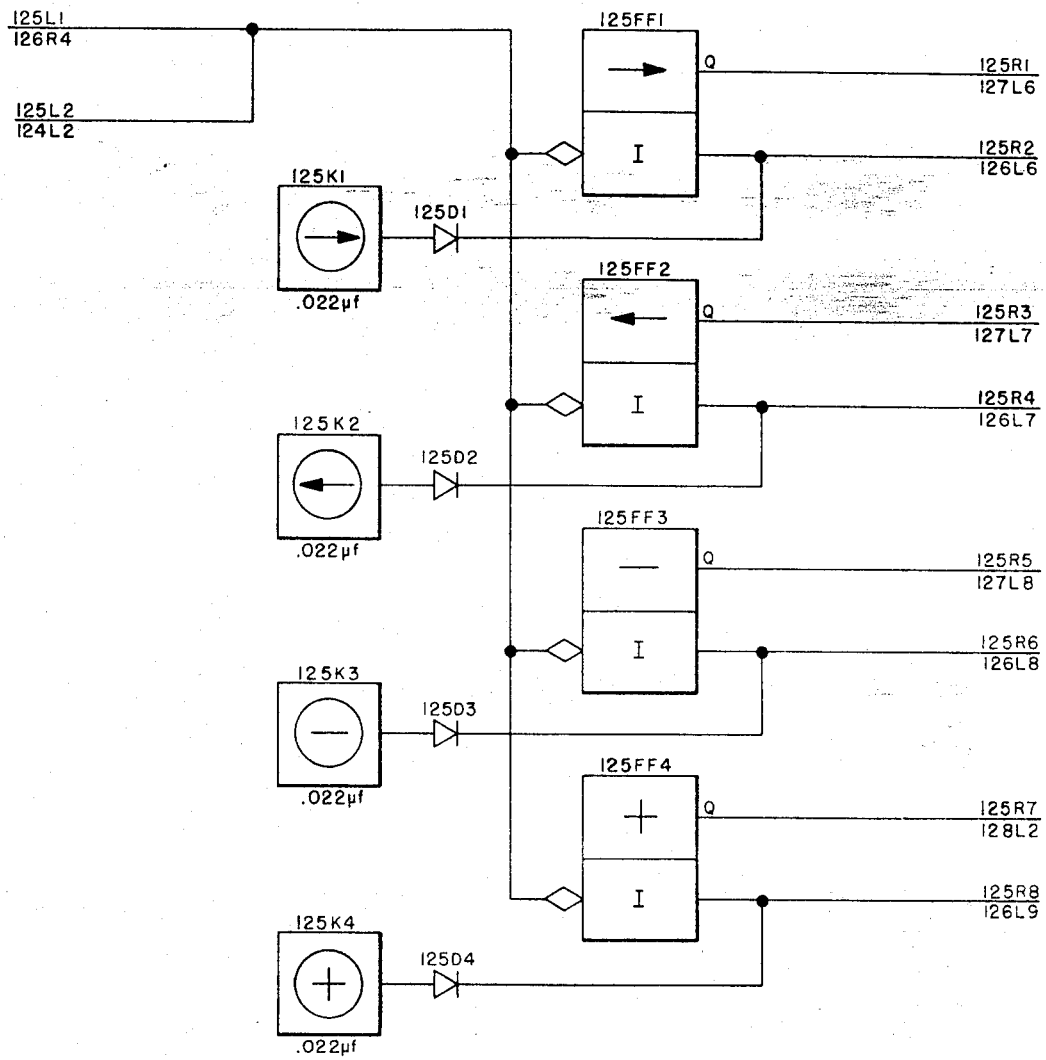
FIG_84 (125)

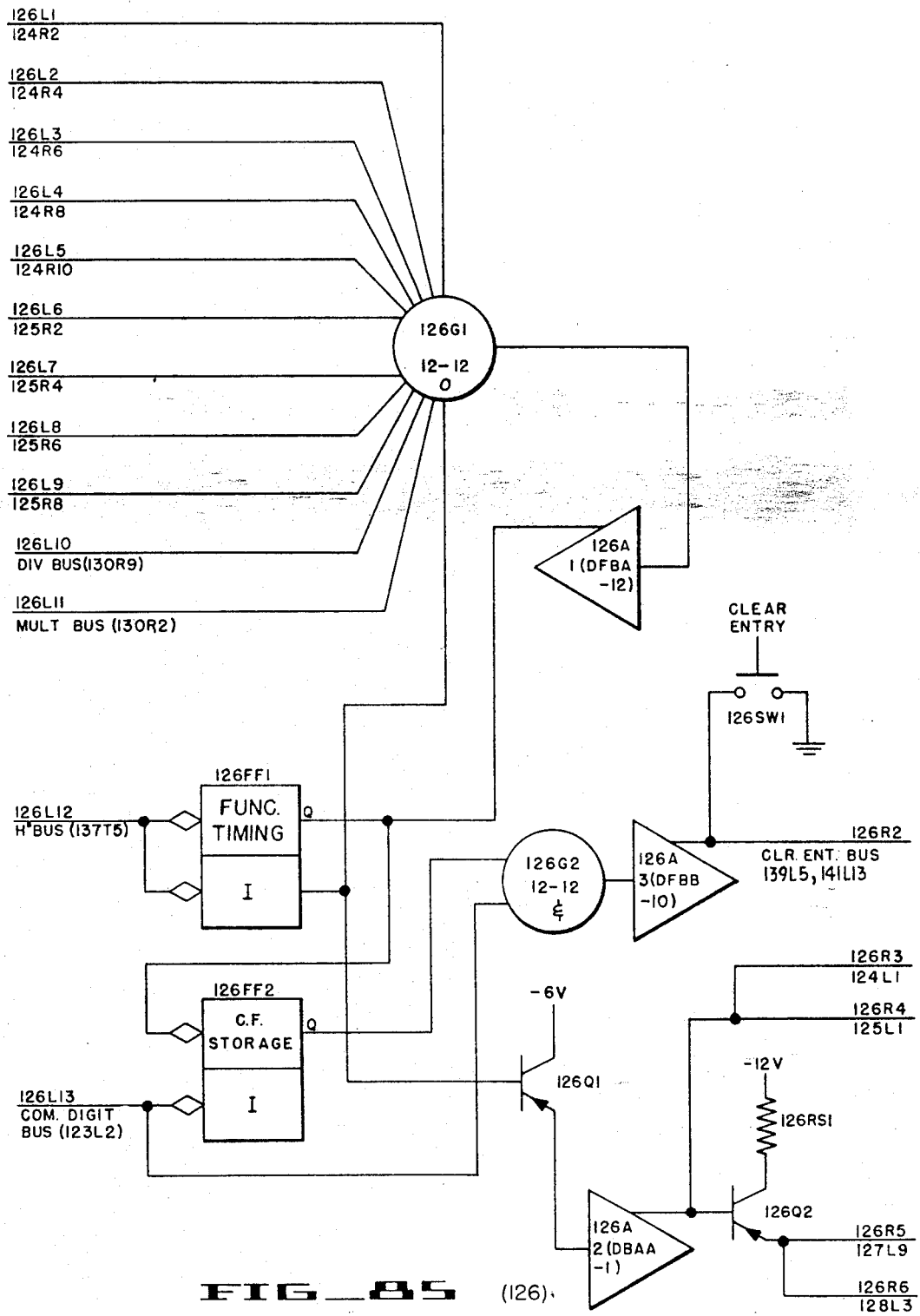
FIG_85 (126)

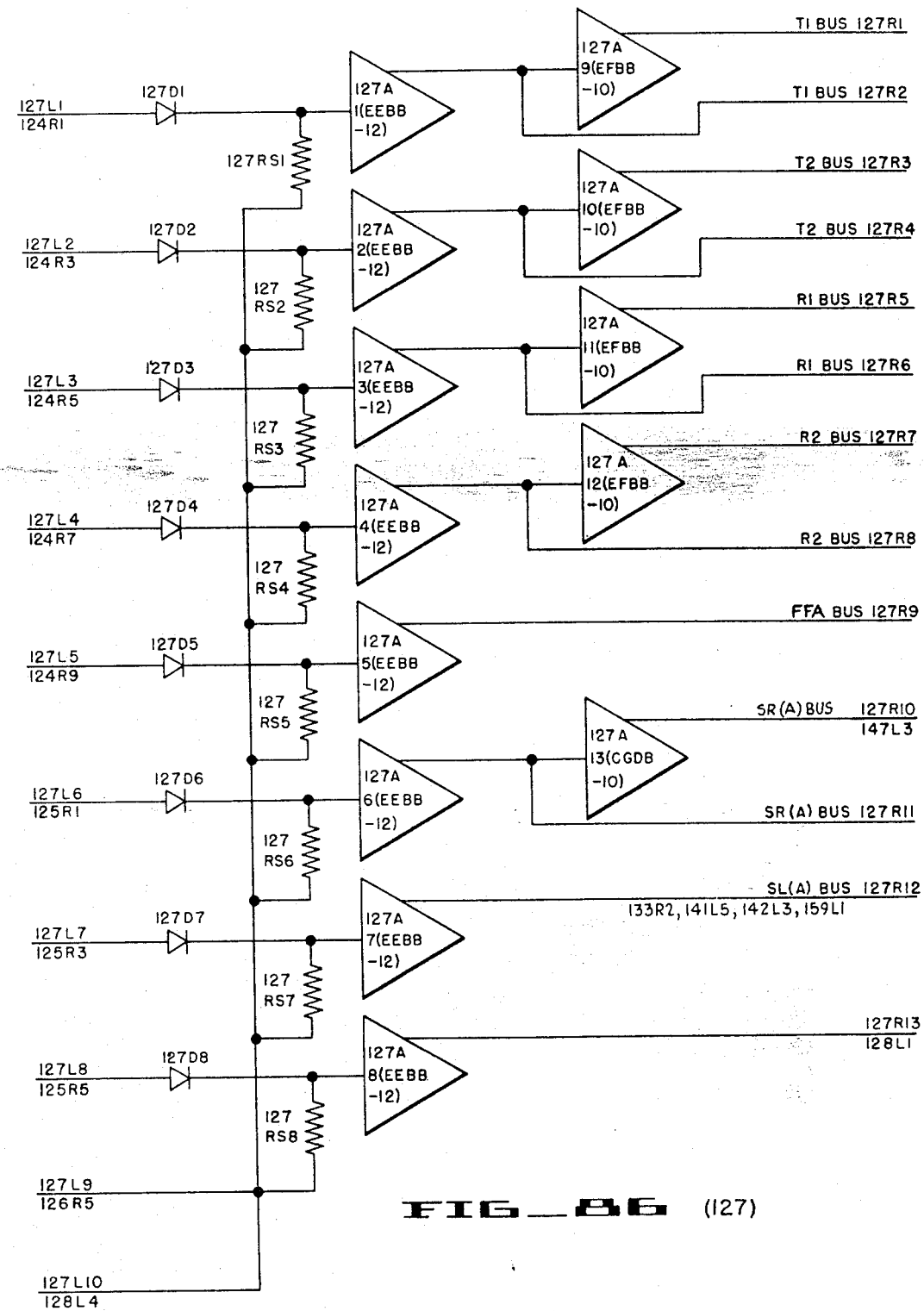
FIG_86 (127)

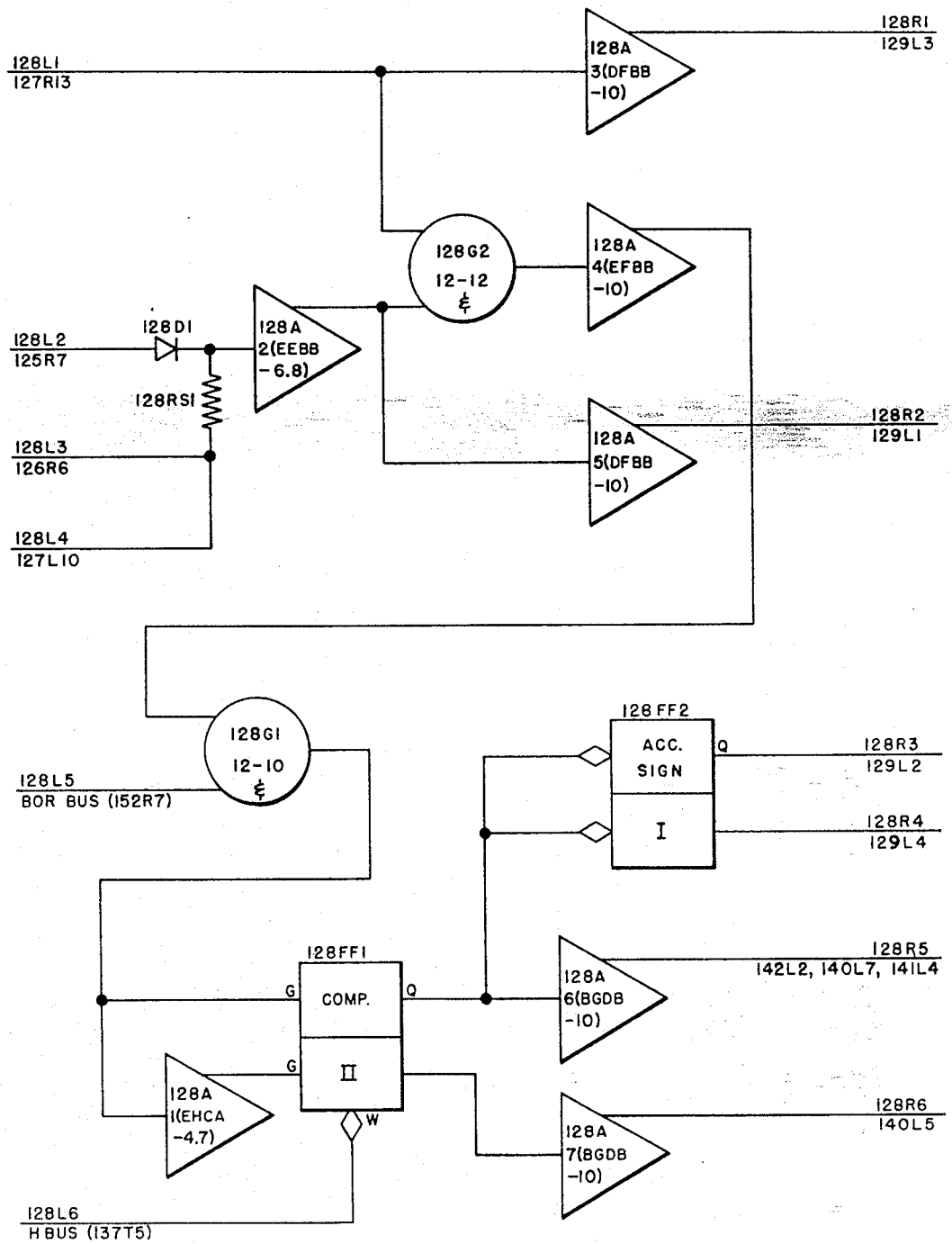
FIG_82 (128)

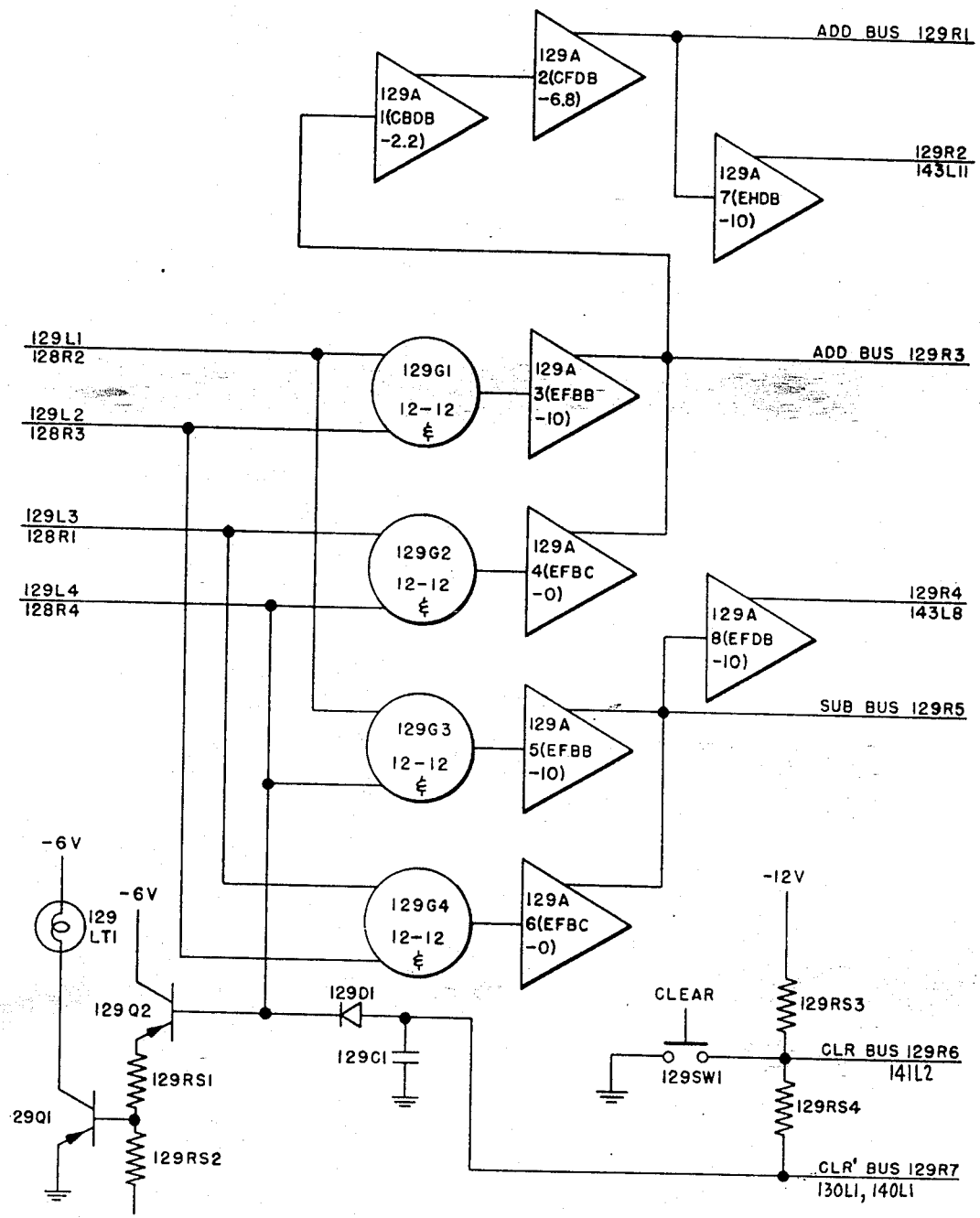
FIG_88 (129)

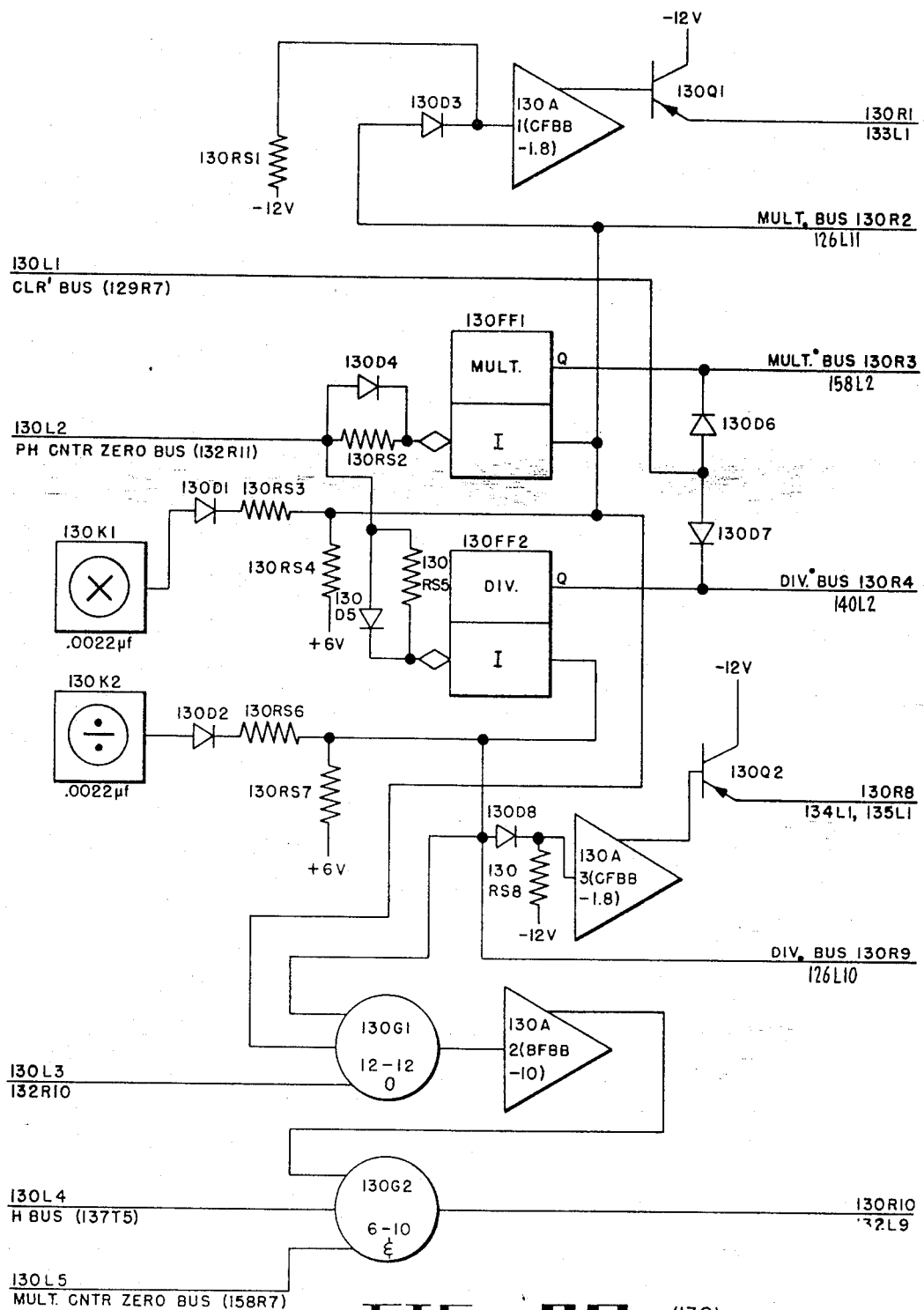
FIG_89 (130)

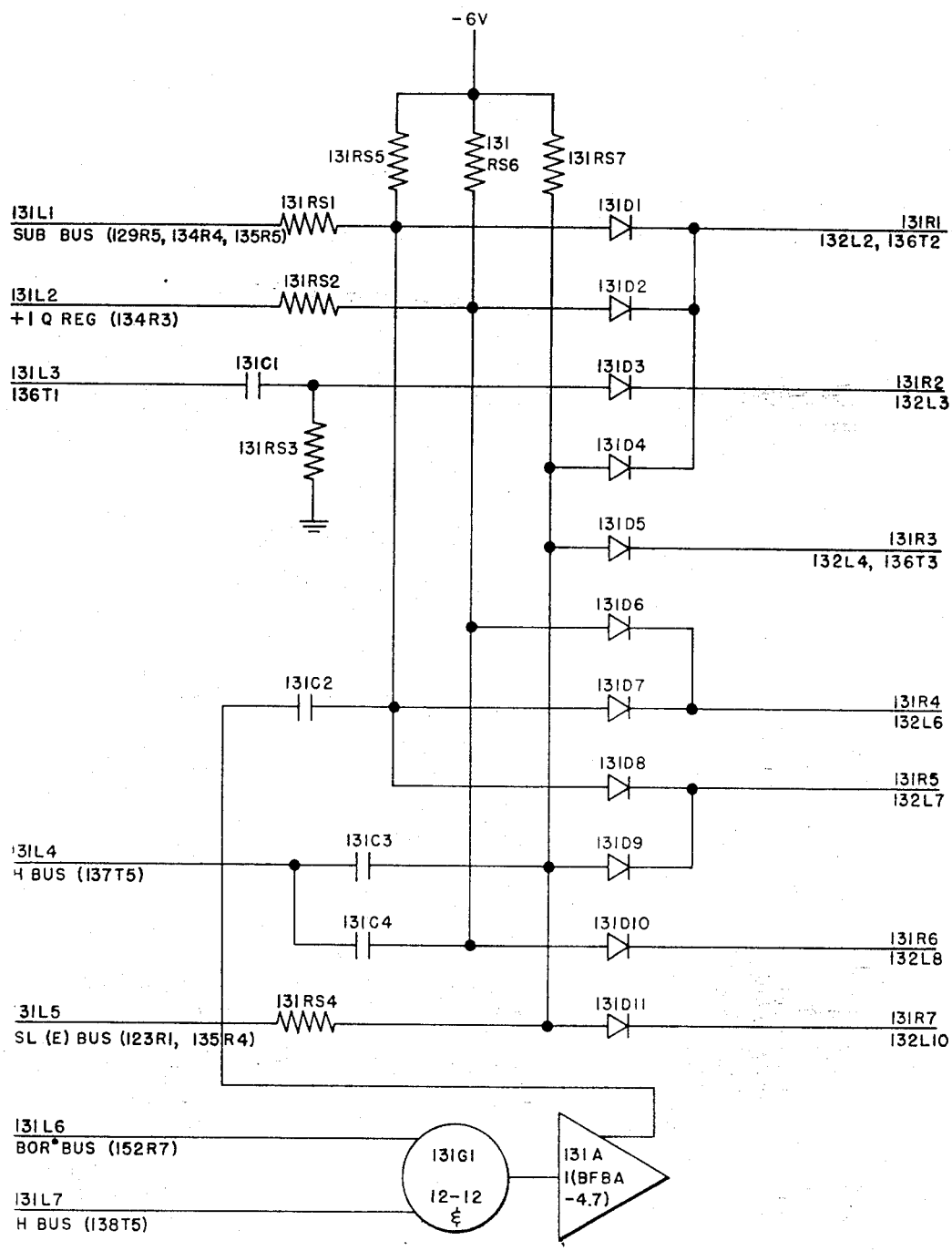
FIG_90 (131)

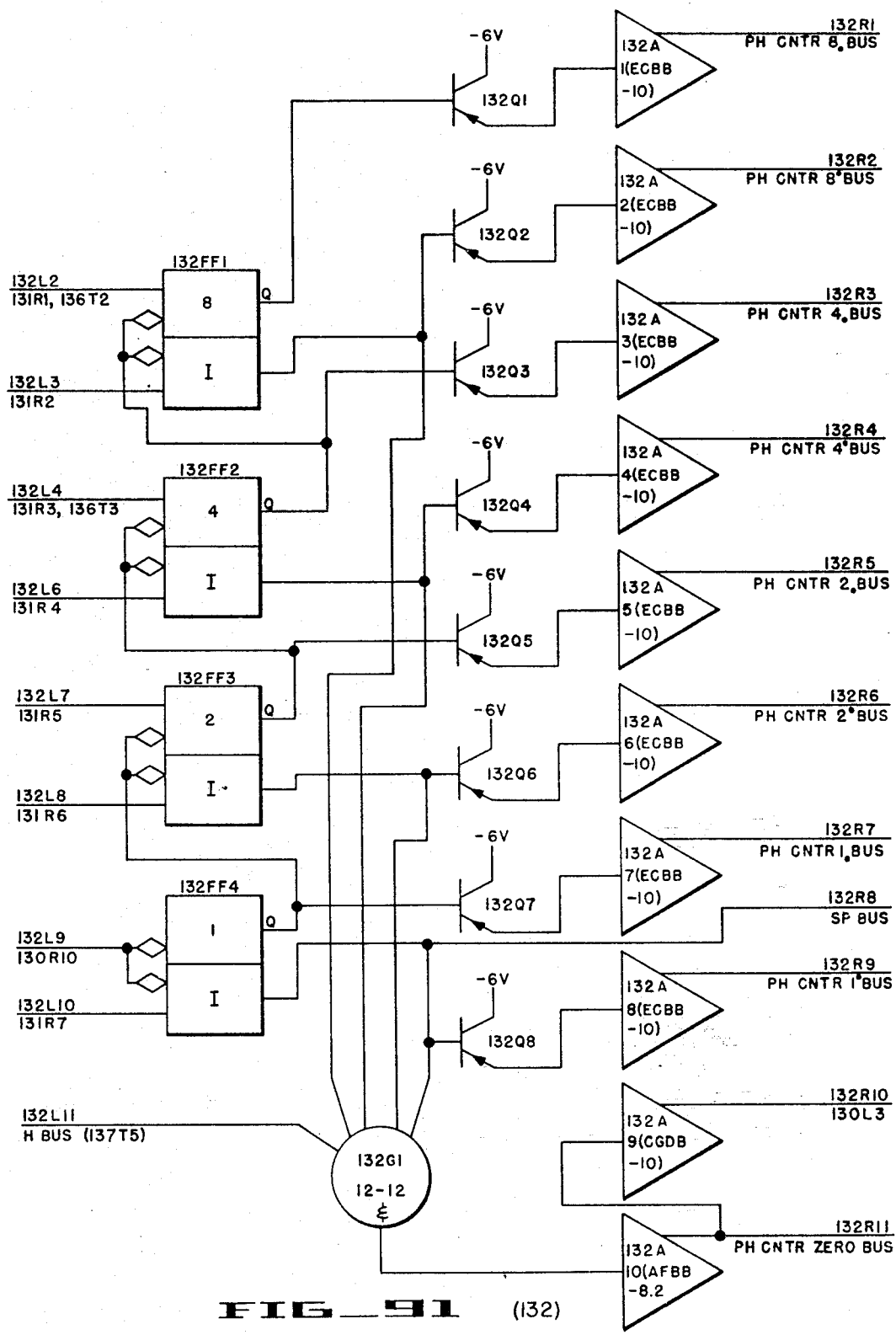
FIG_91 (132)

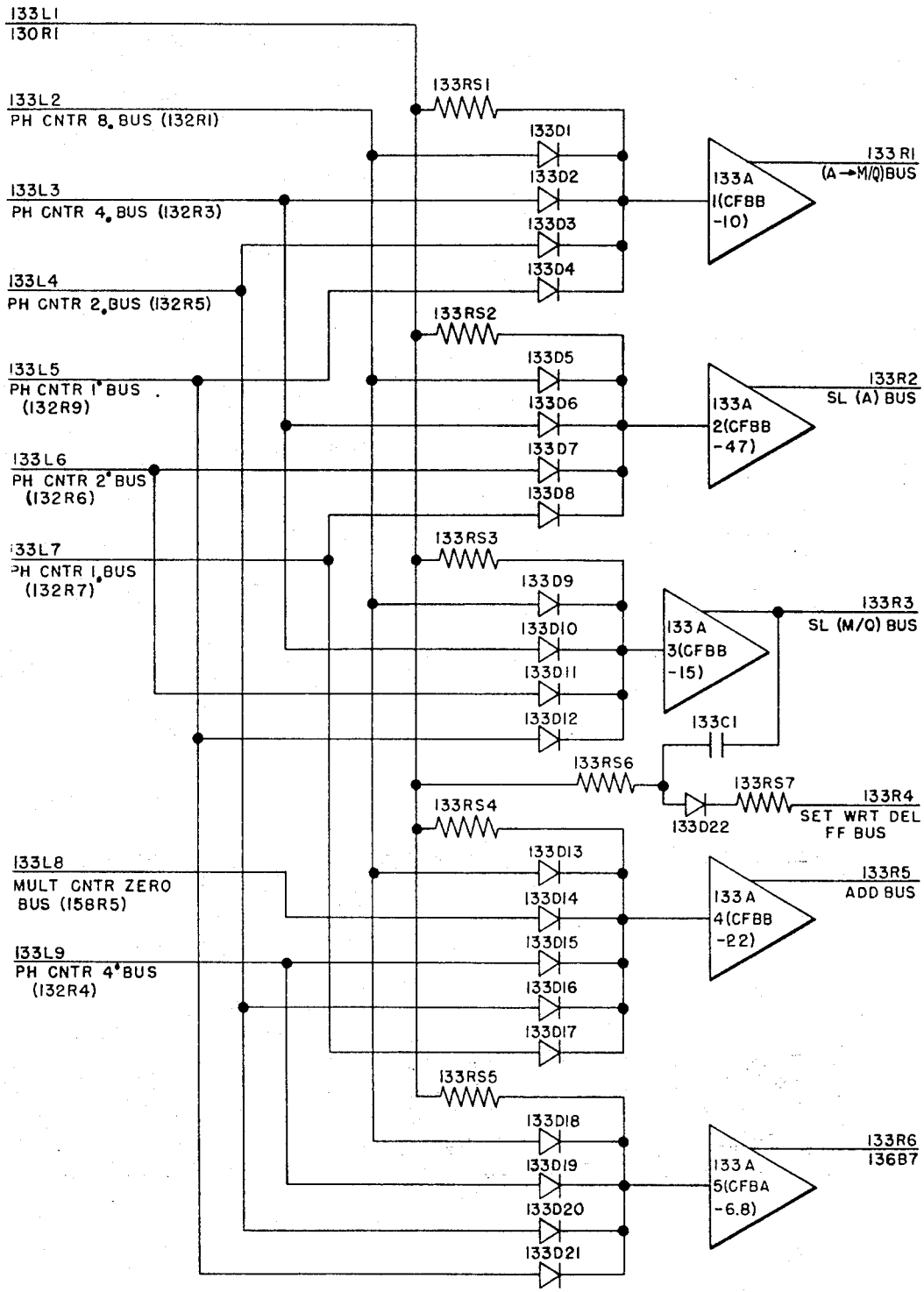
FIG_92 (133)

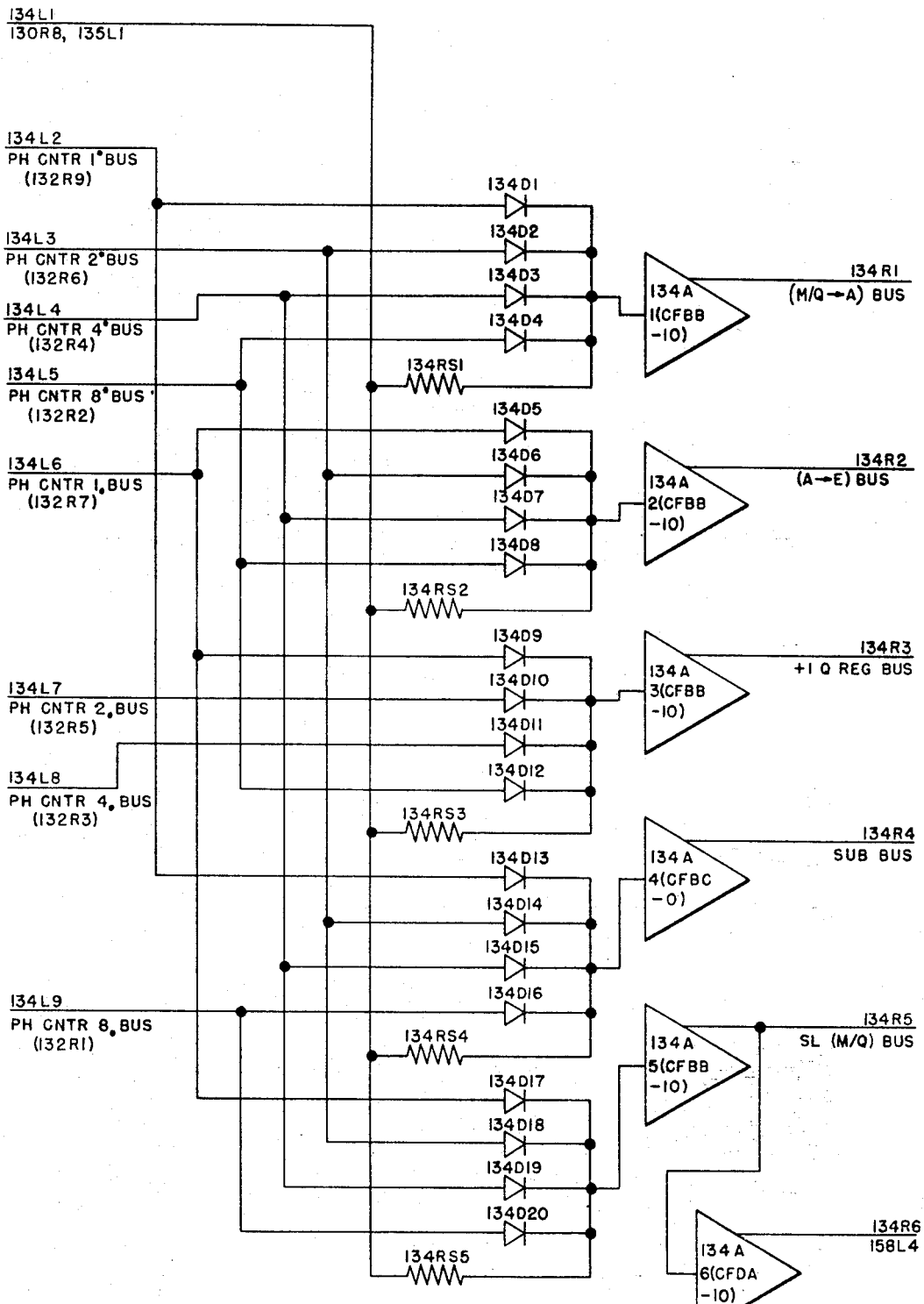
FIG_93 (134)

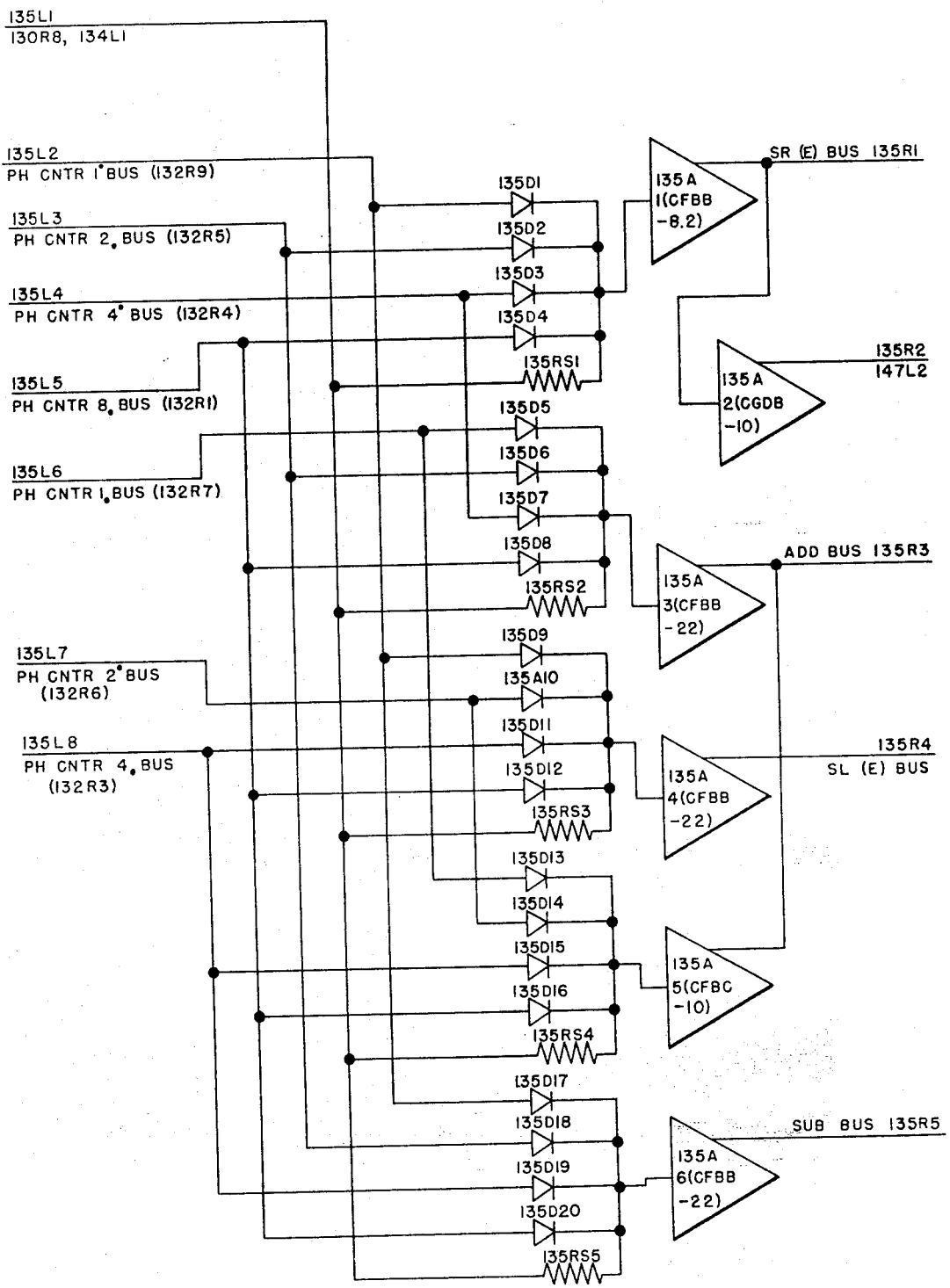
FIG_94 (135)

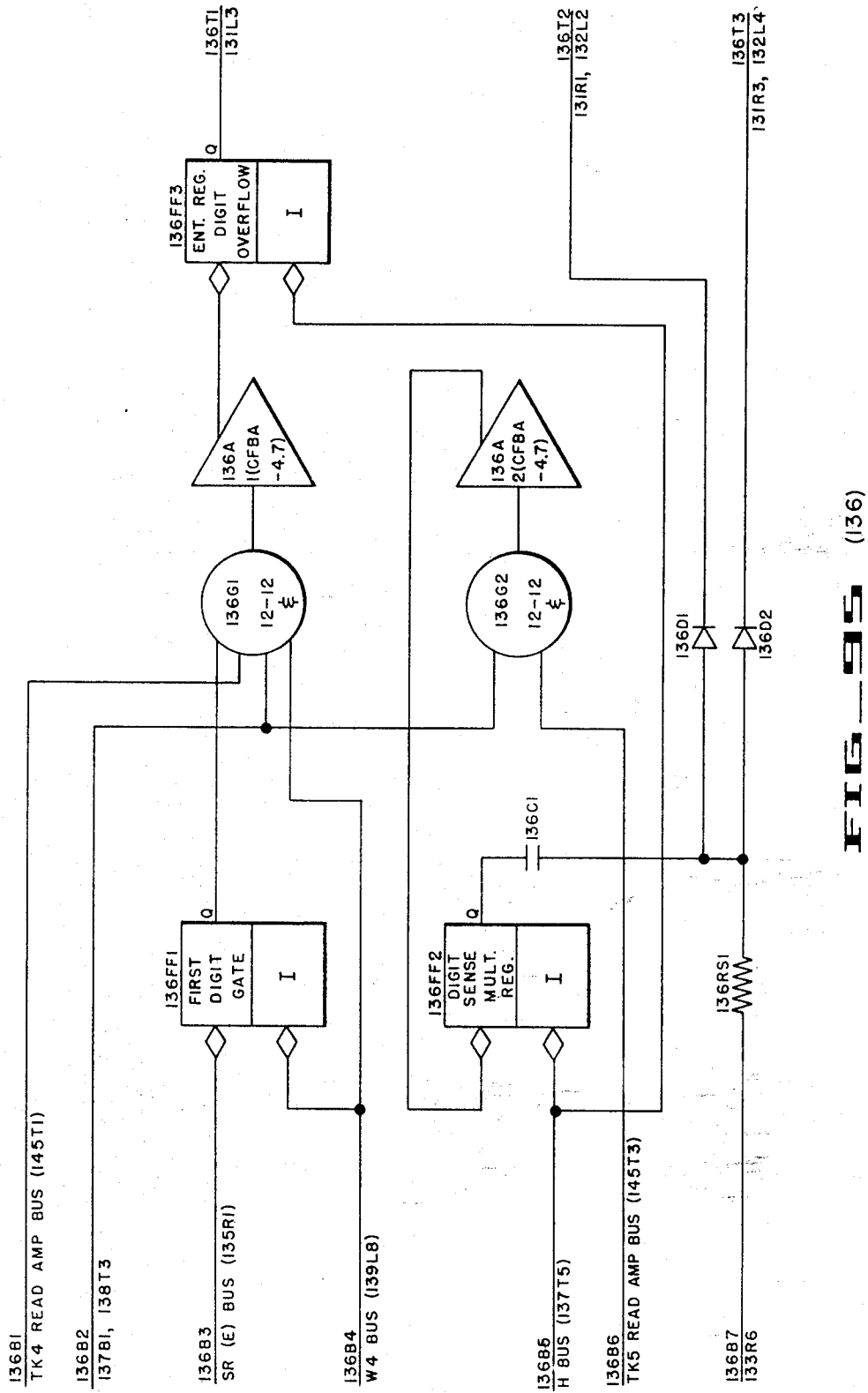

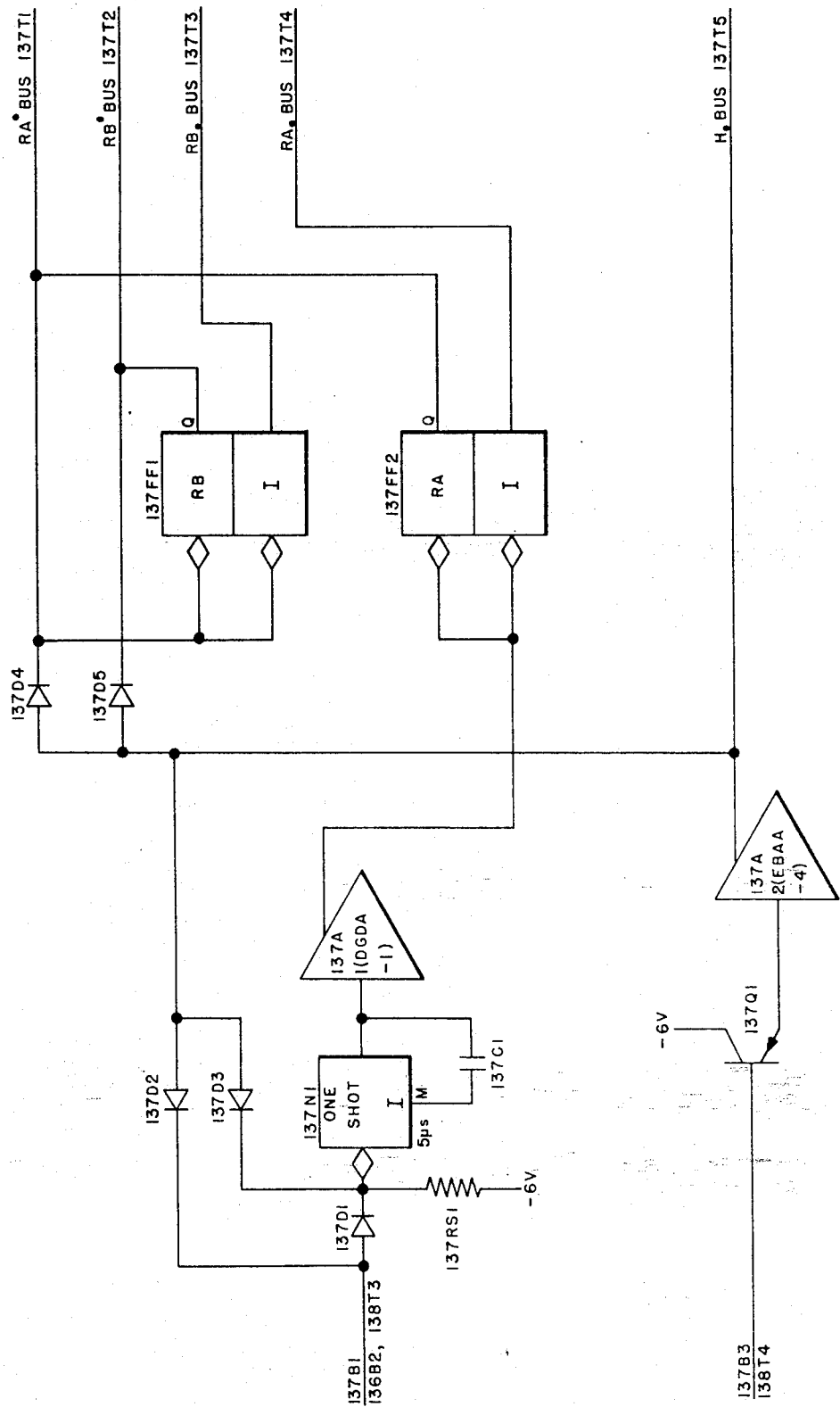

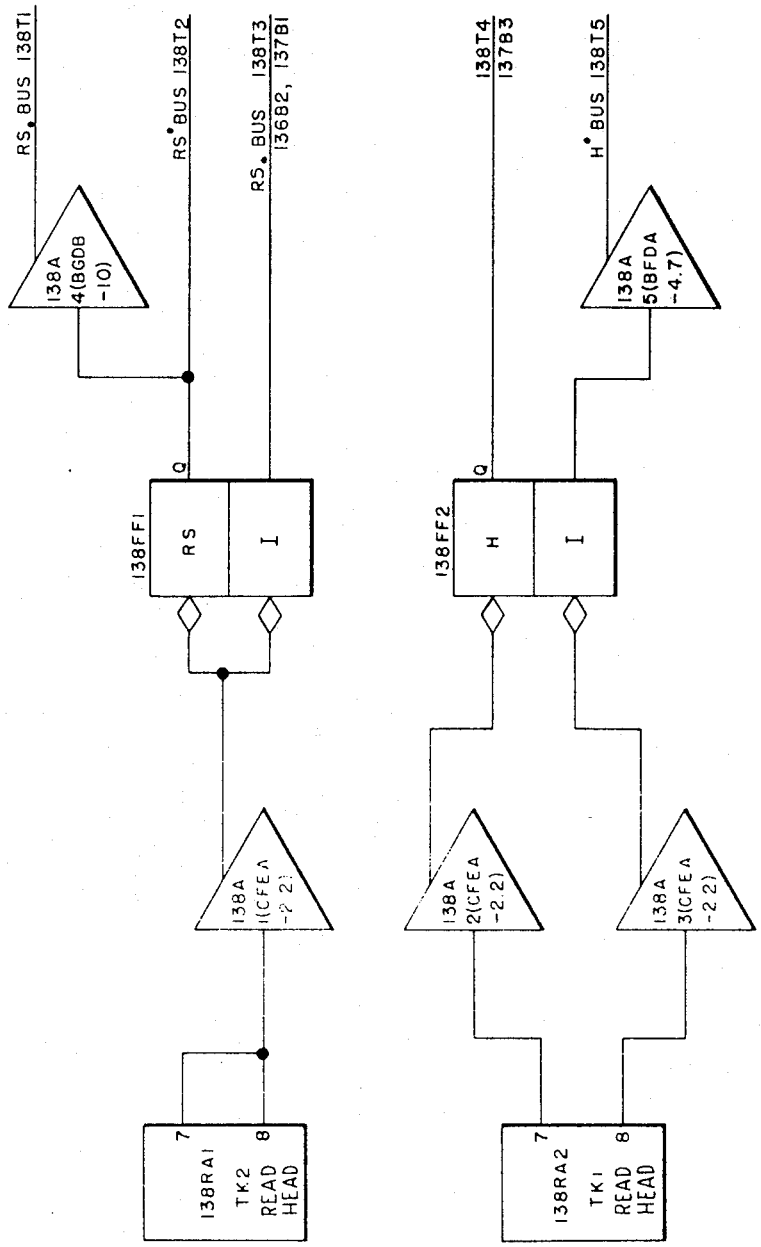
FIG-92 (138)

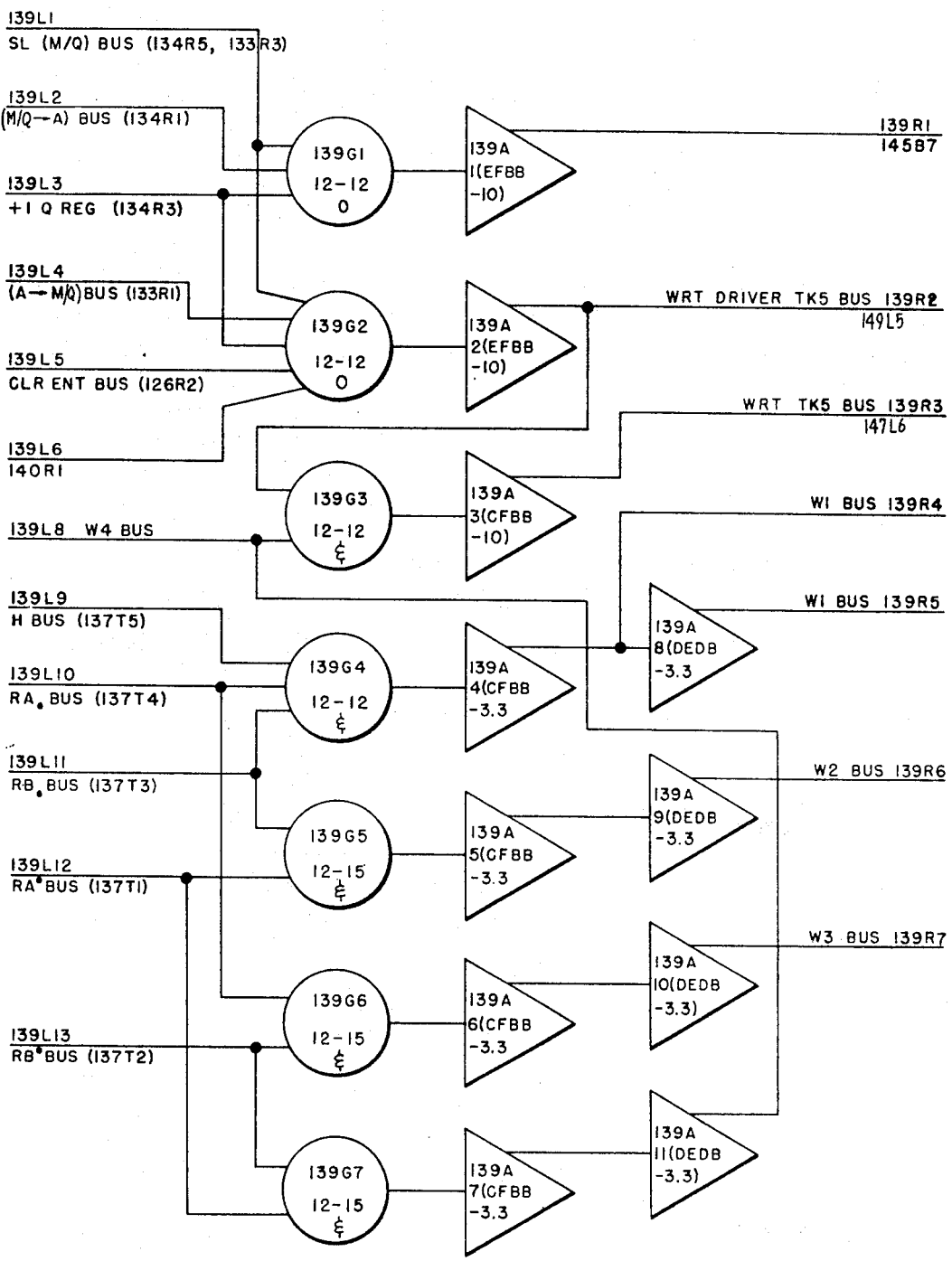
FIG_98 (139)

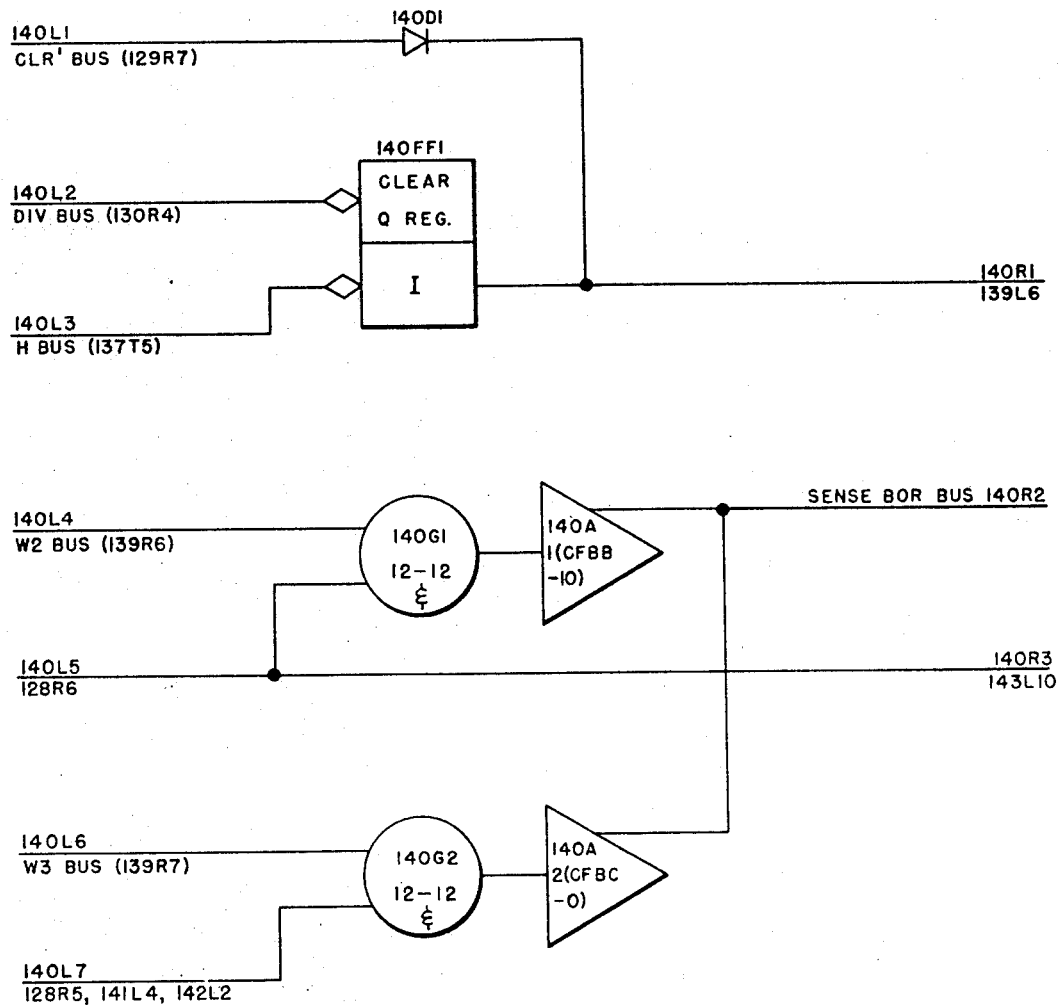
FIG_99 (140)

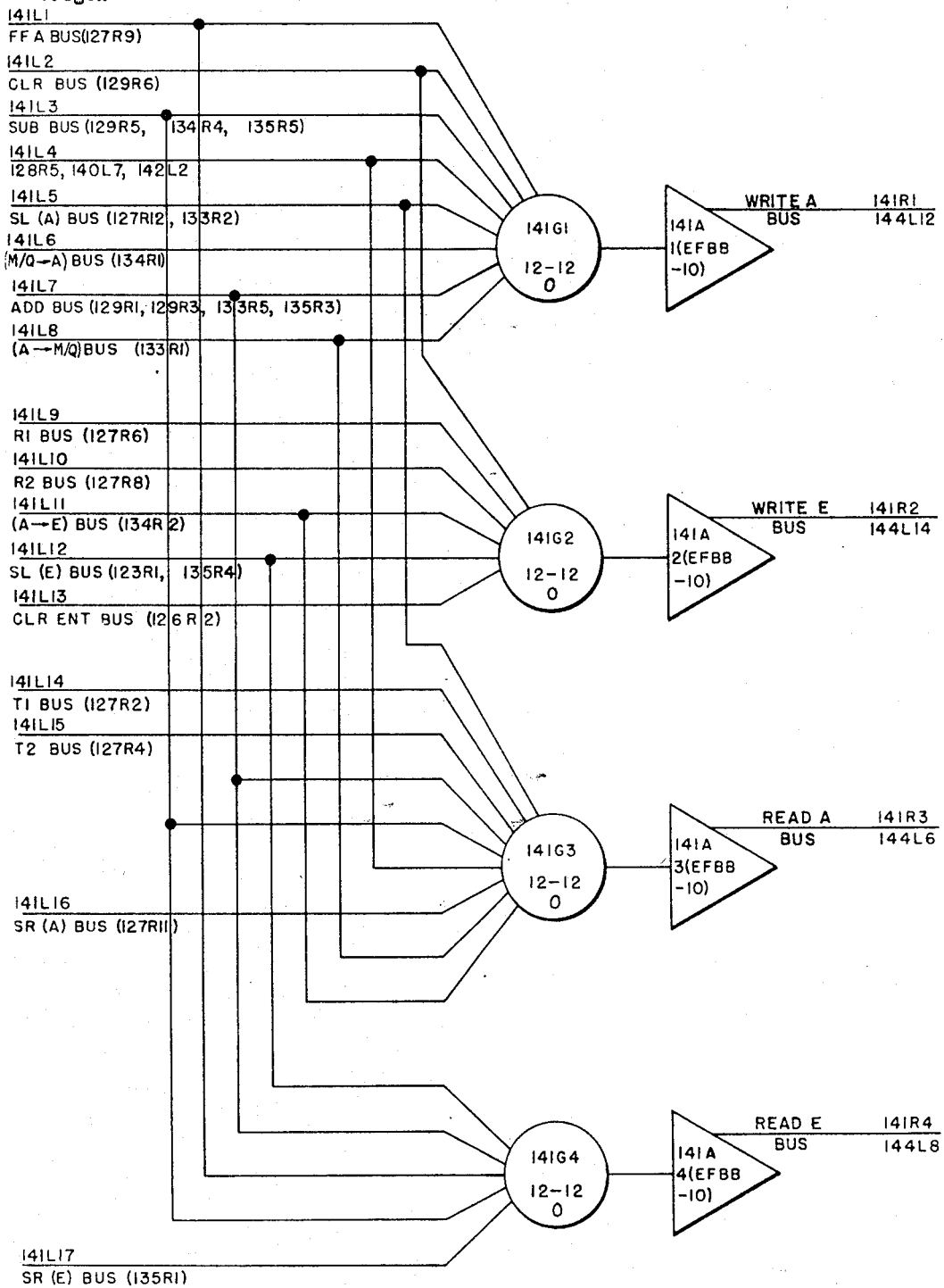
FIG_100 (141)

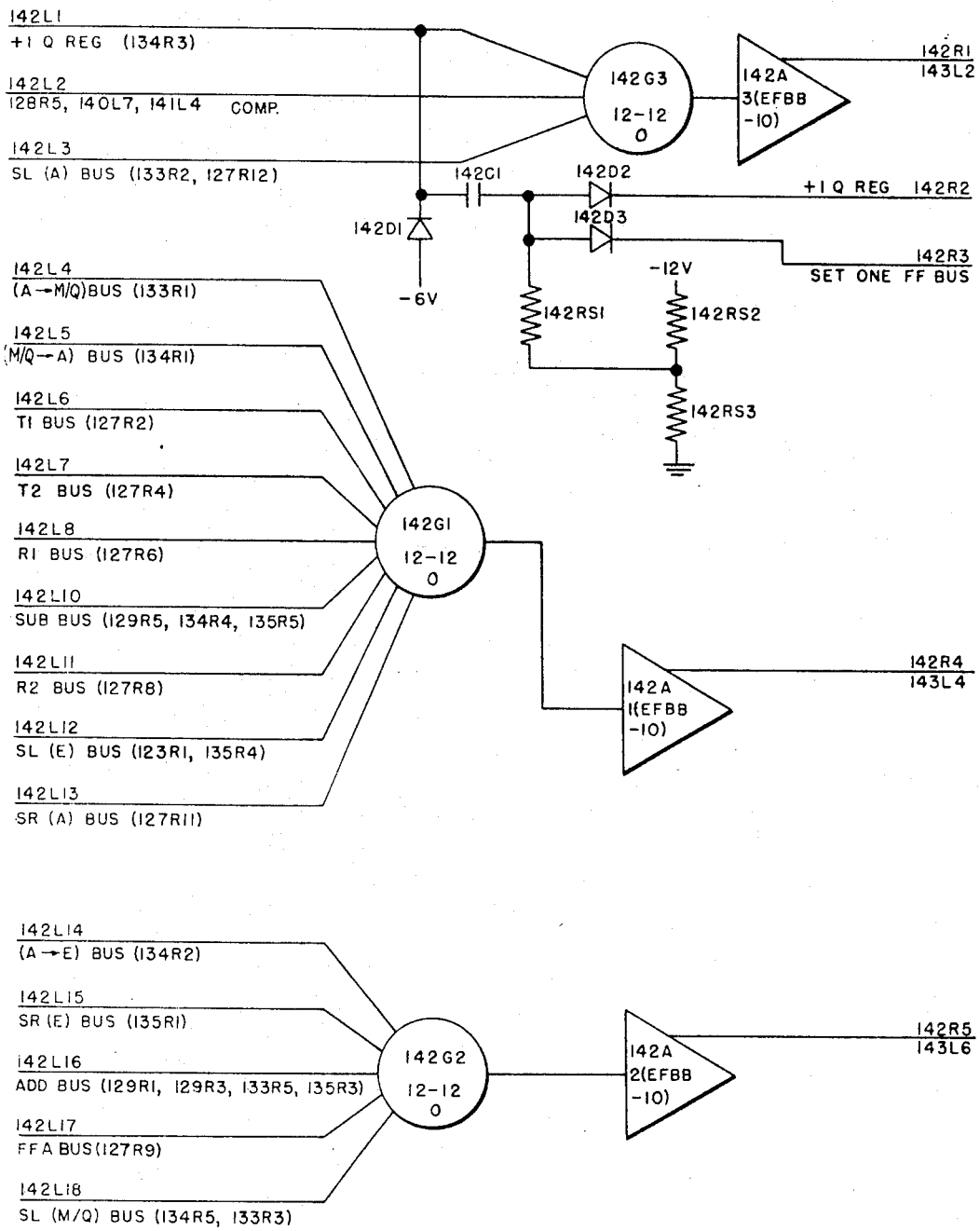
FIG_101 (142)

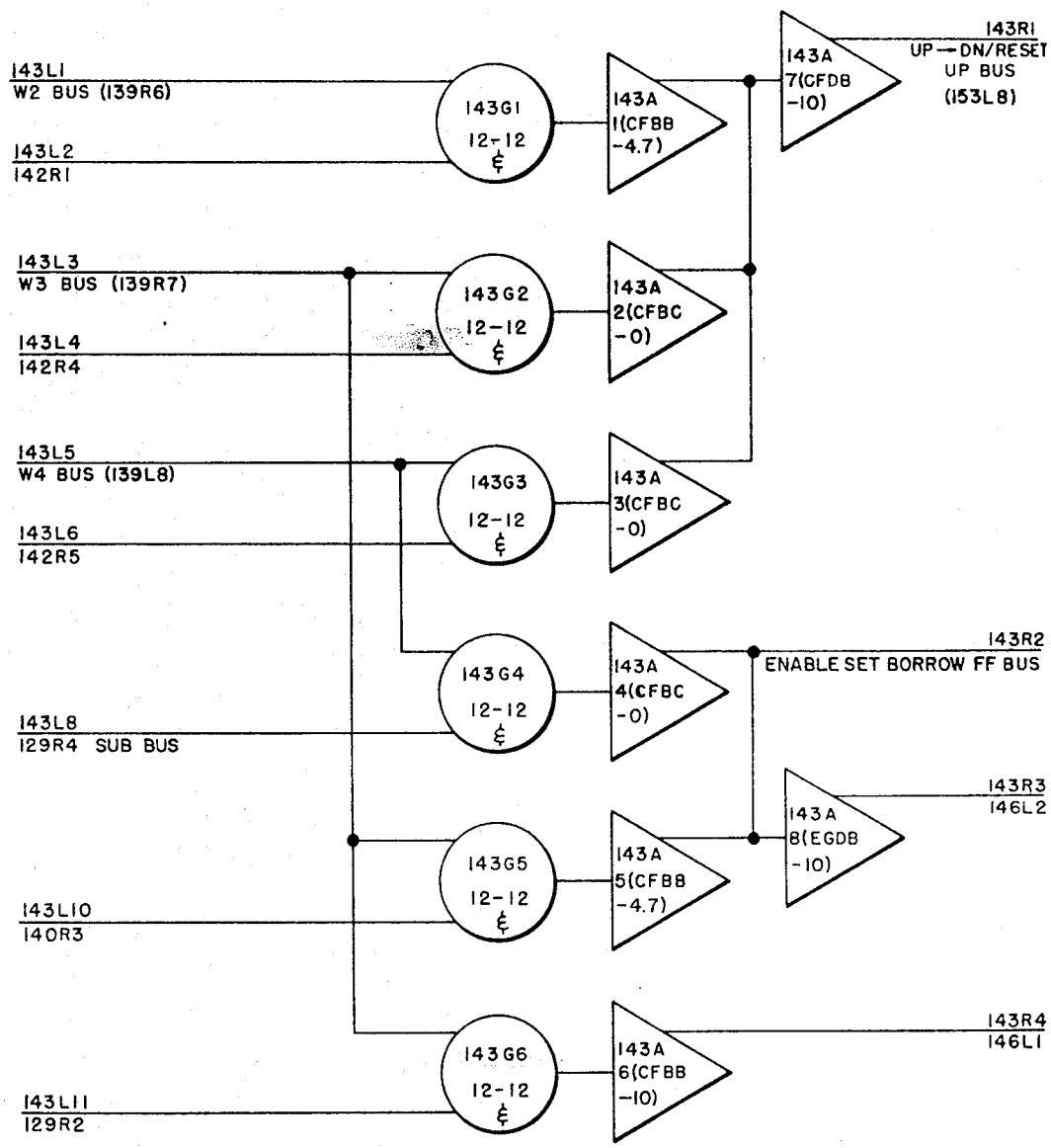
FIG_102 (143)

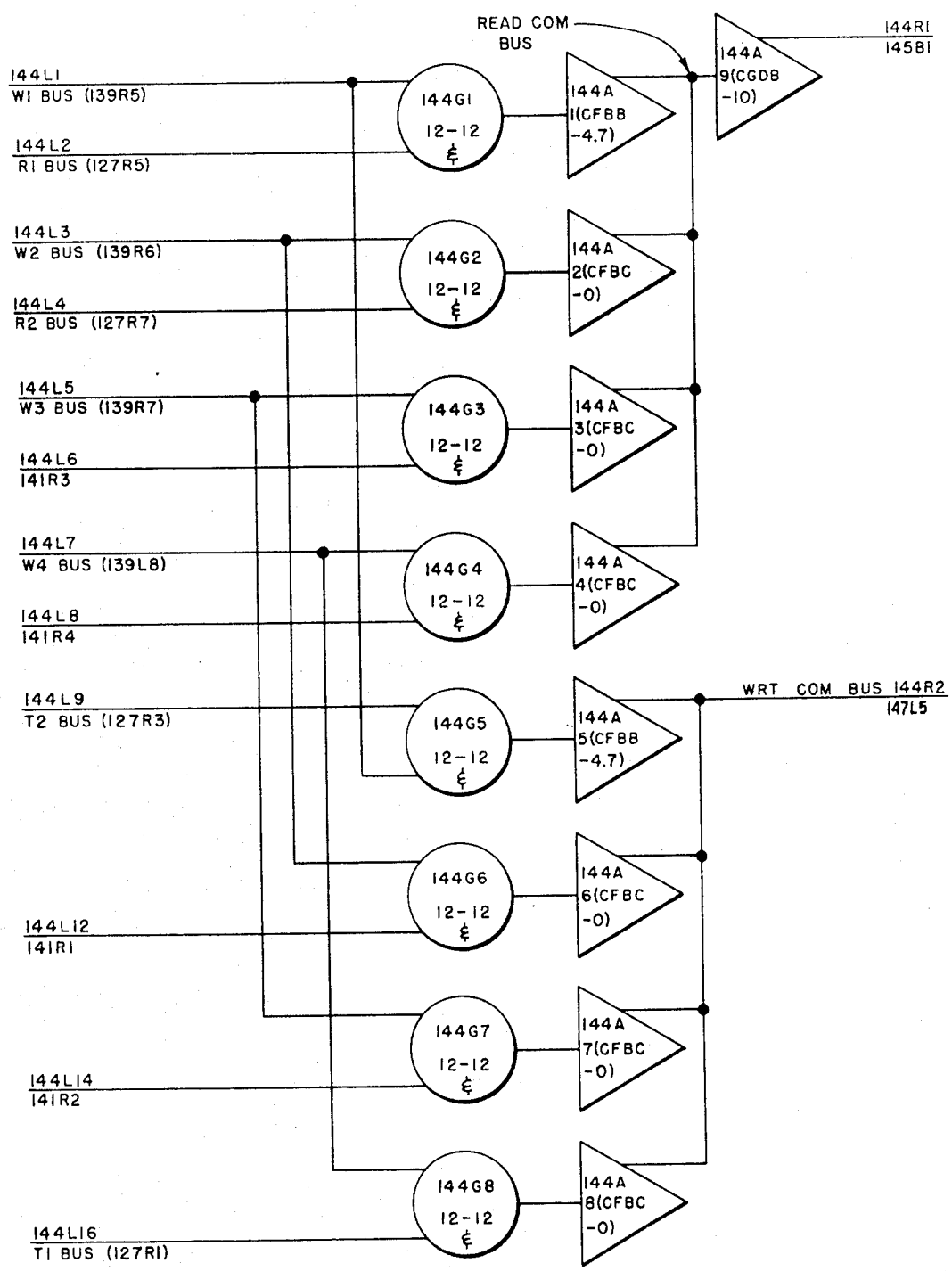
FIG_103 (144)

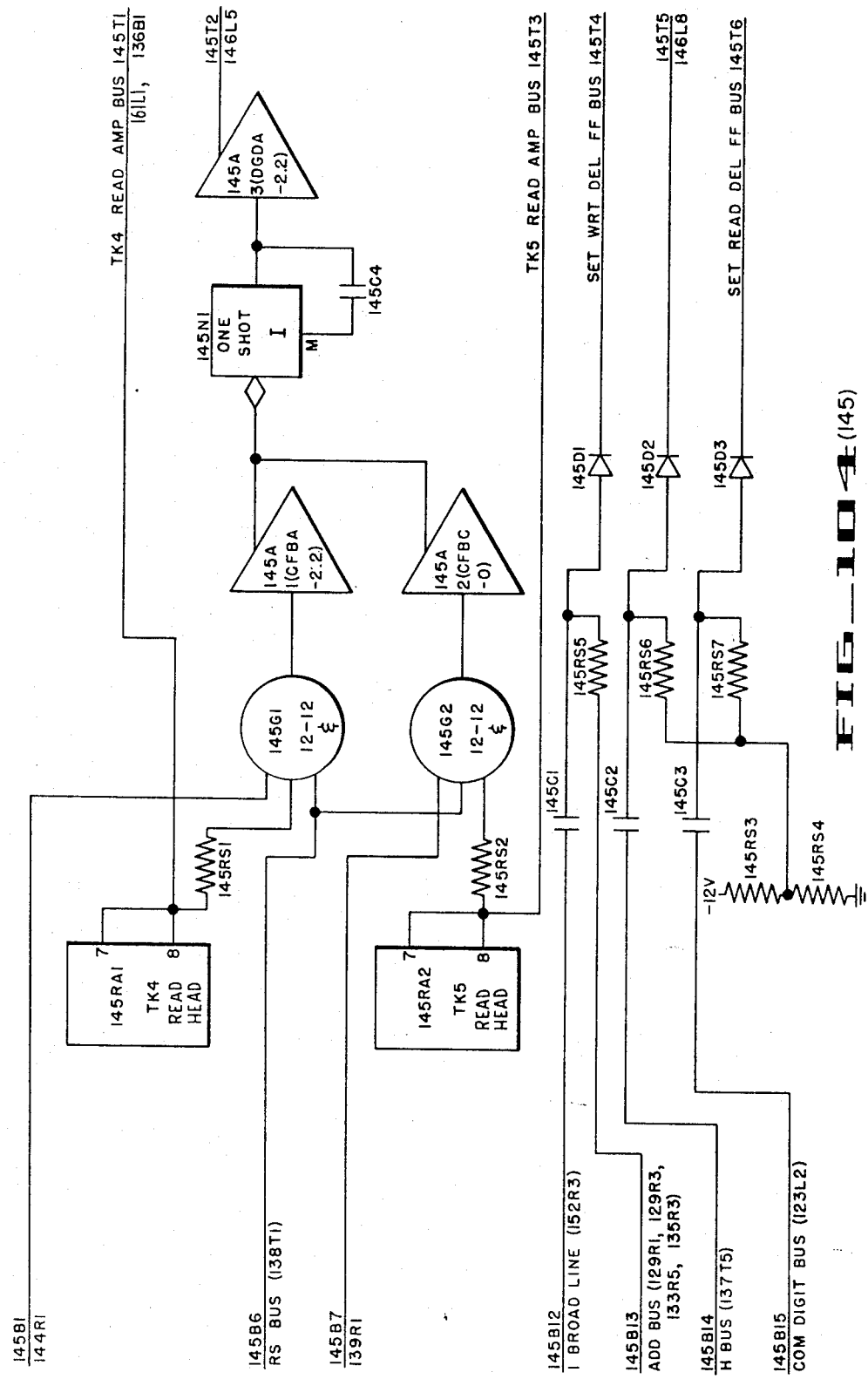

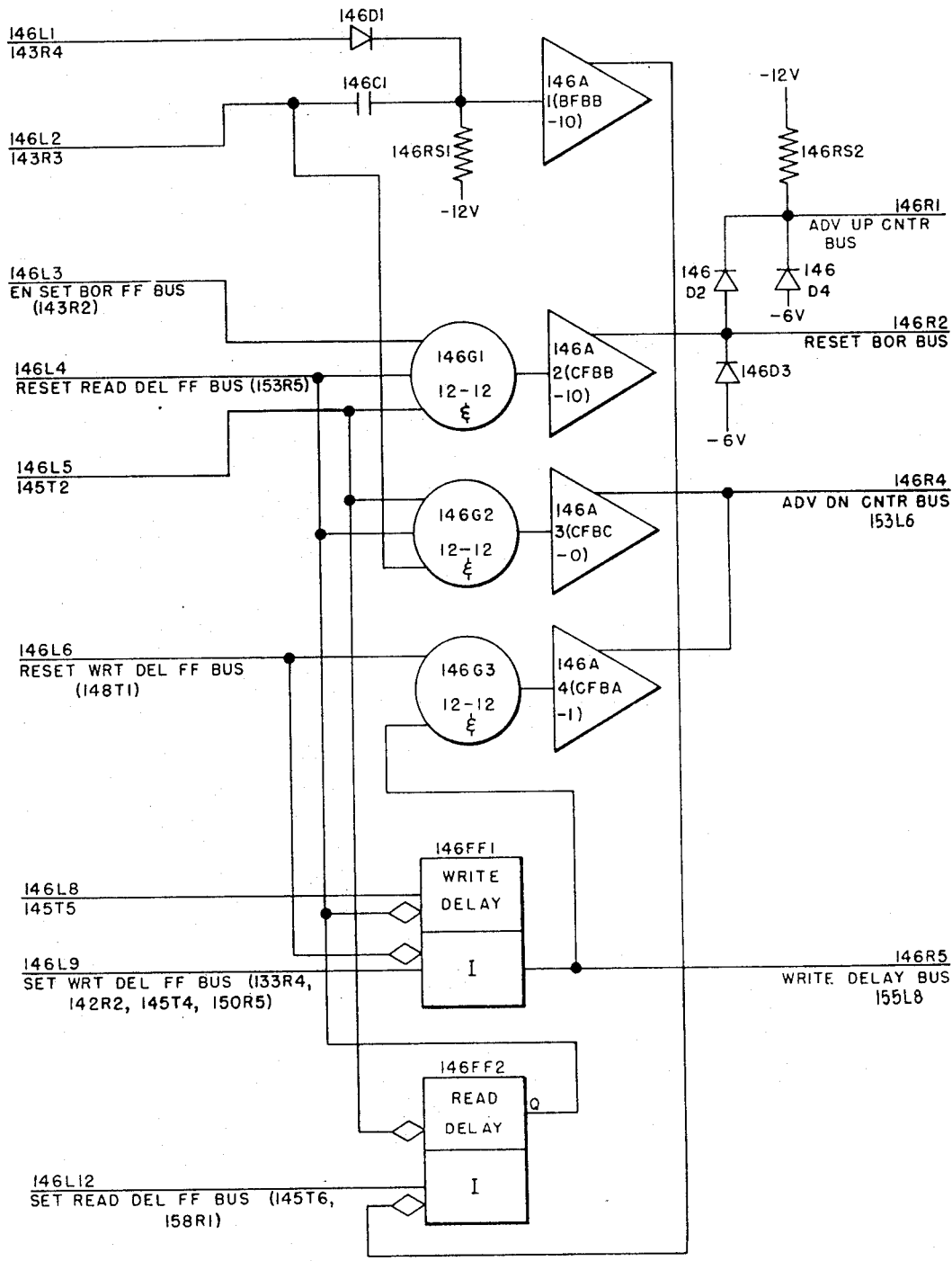
FIG_105 (146)

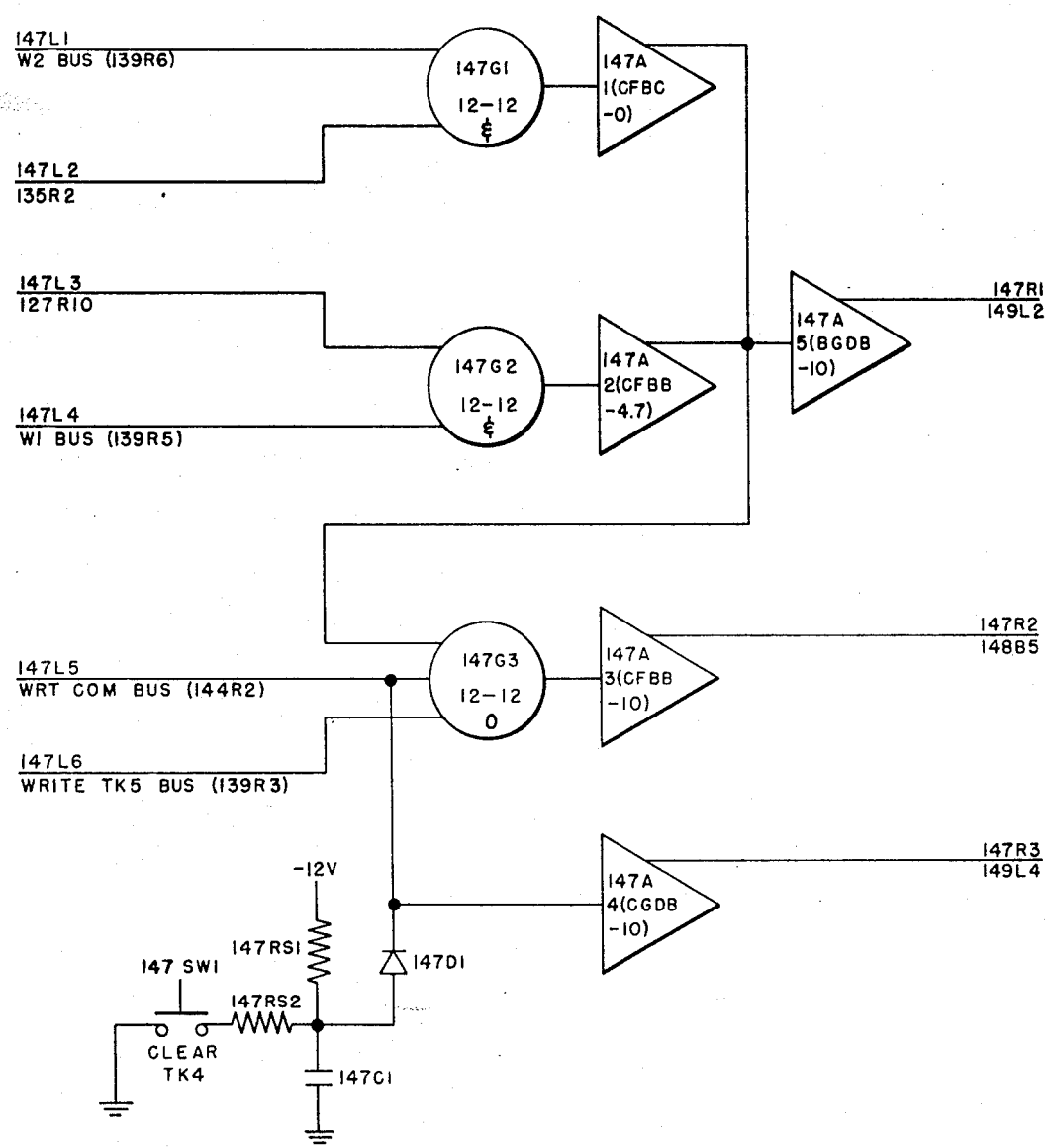
FIG_106 (147)

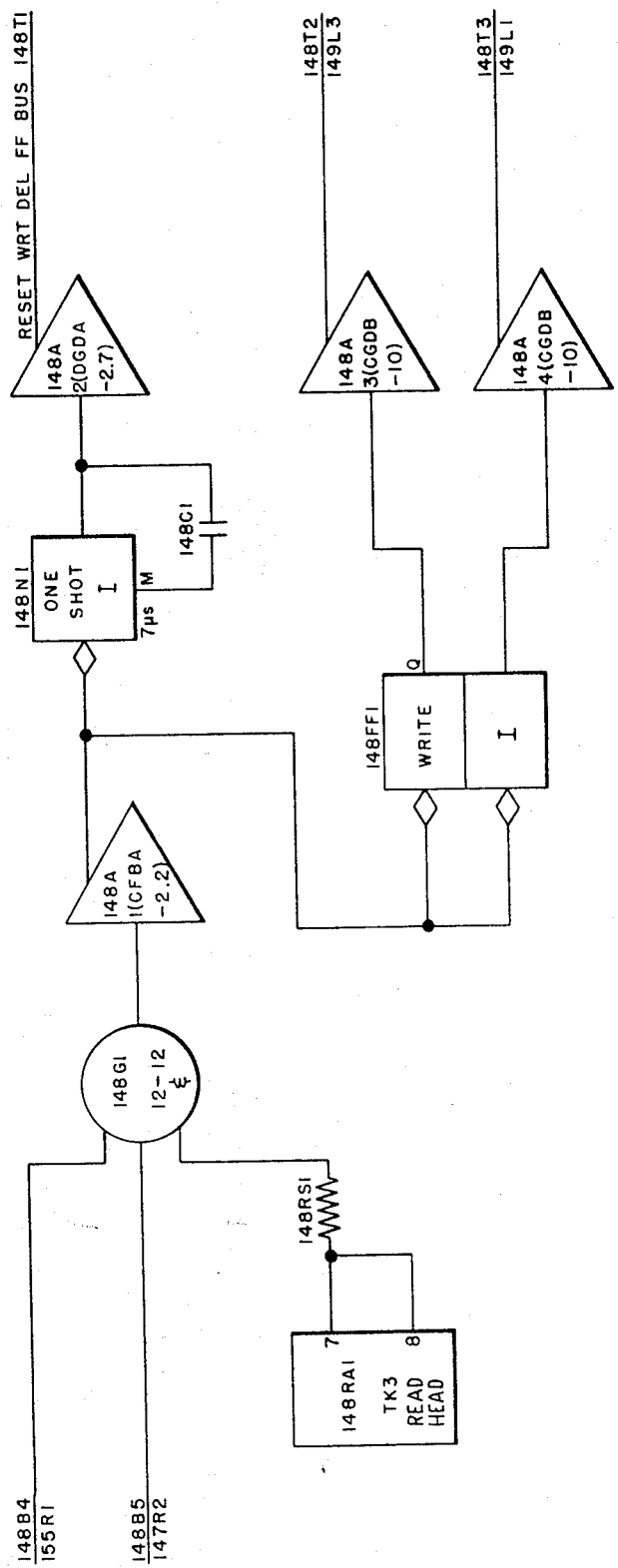
FIG_102 (148)

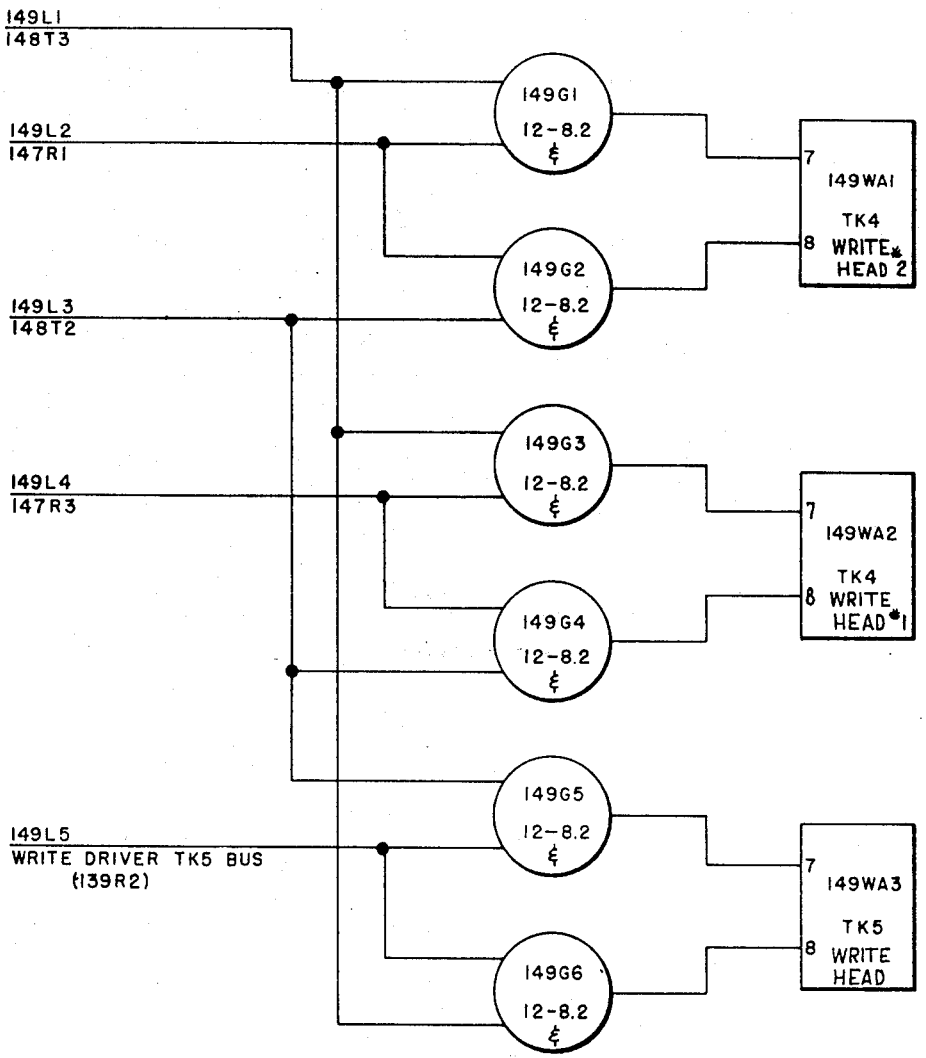
FIG_108 (149)

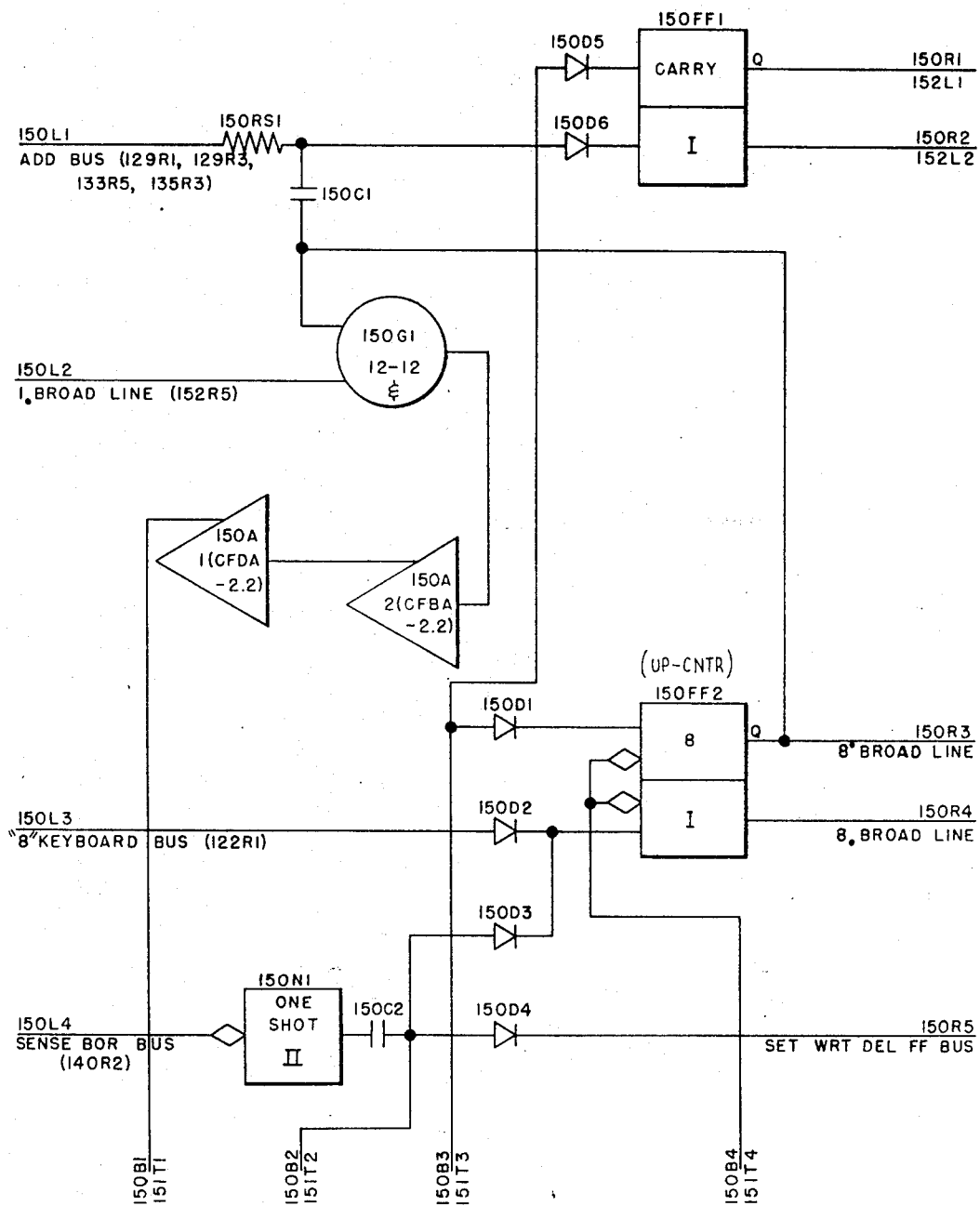
FIG_109 (150)

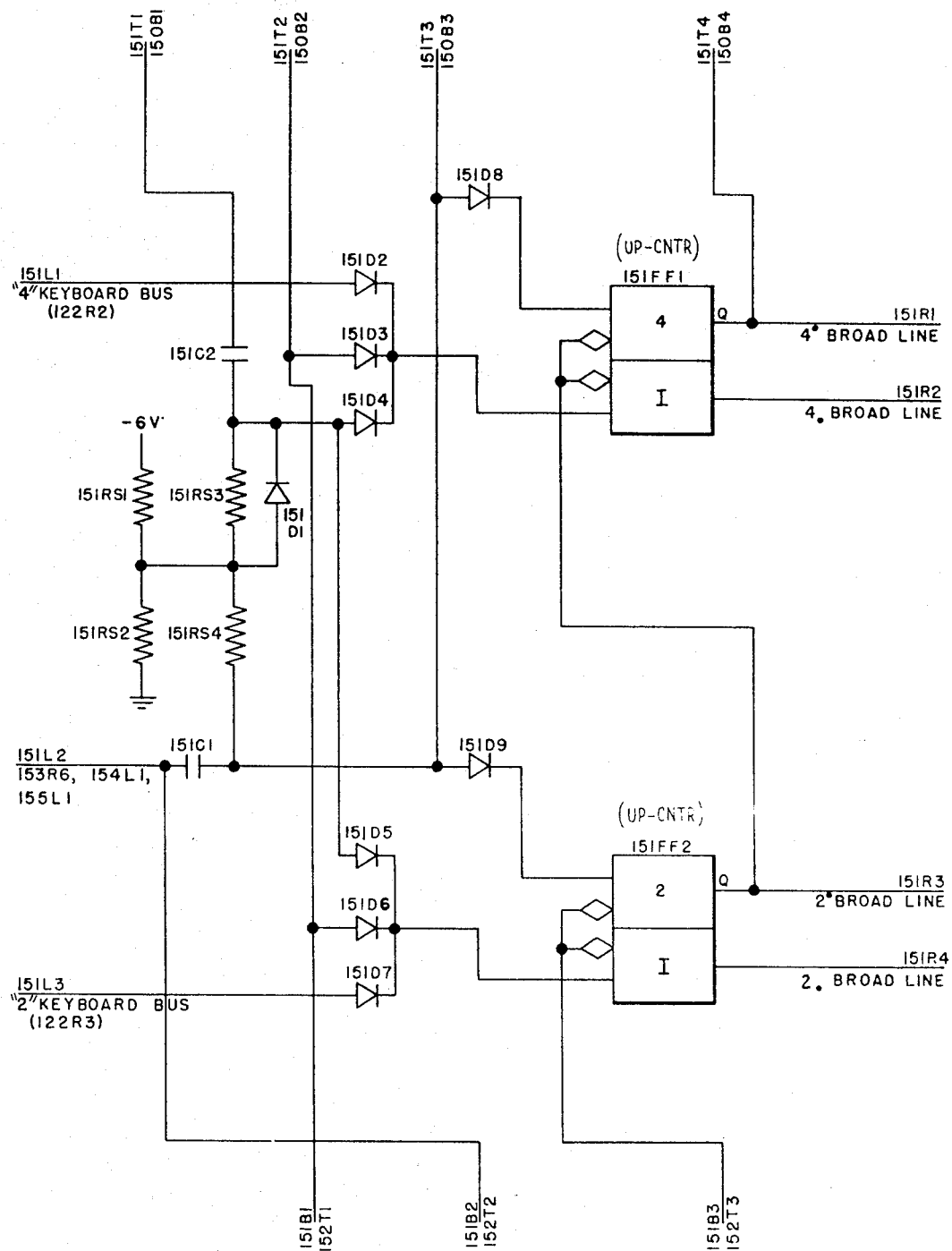
FIG_110 (151)

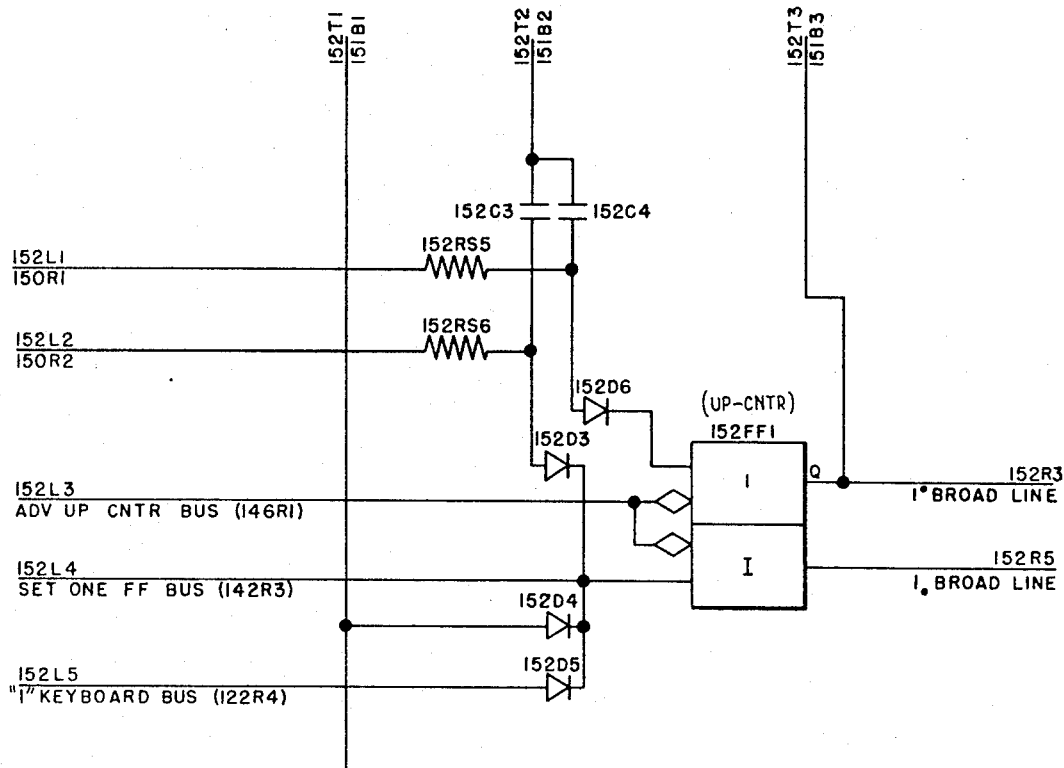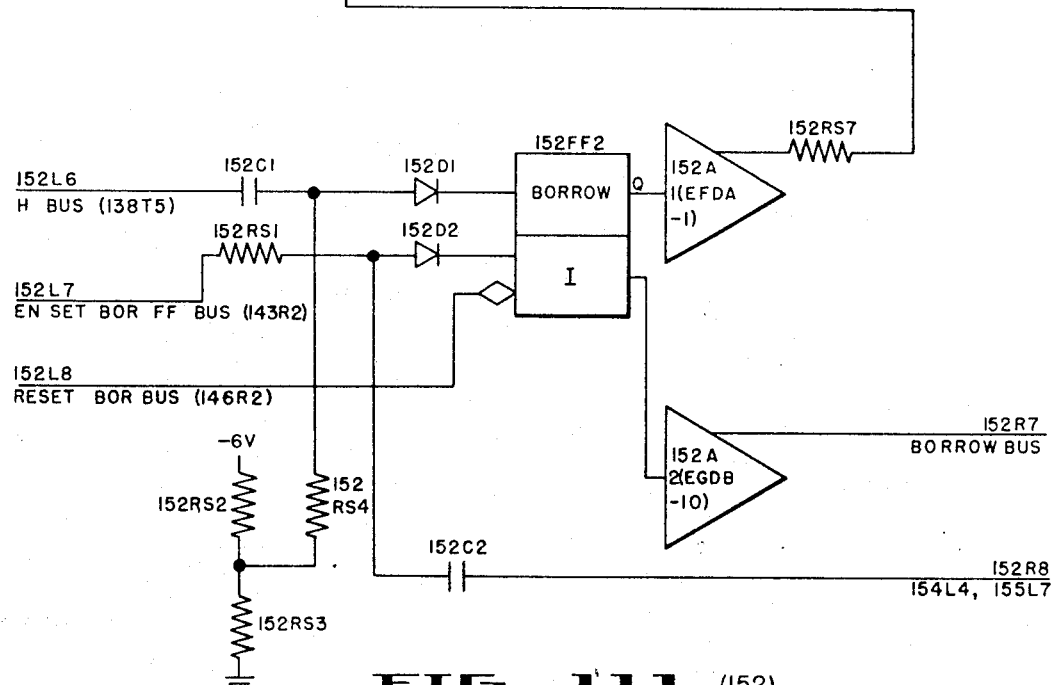
FIG_111 (152)

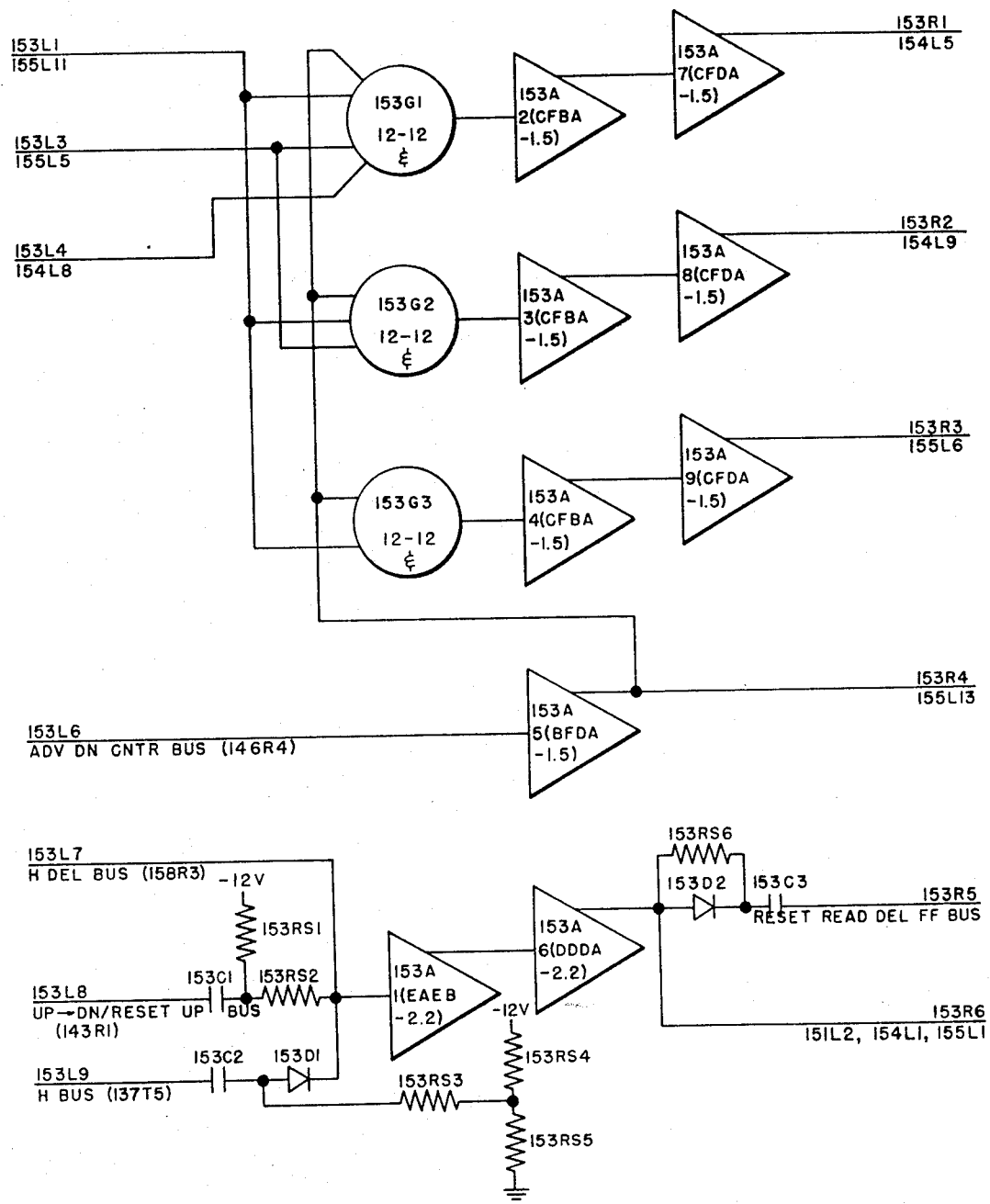
FIG_112 (153)

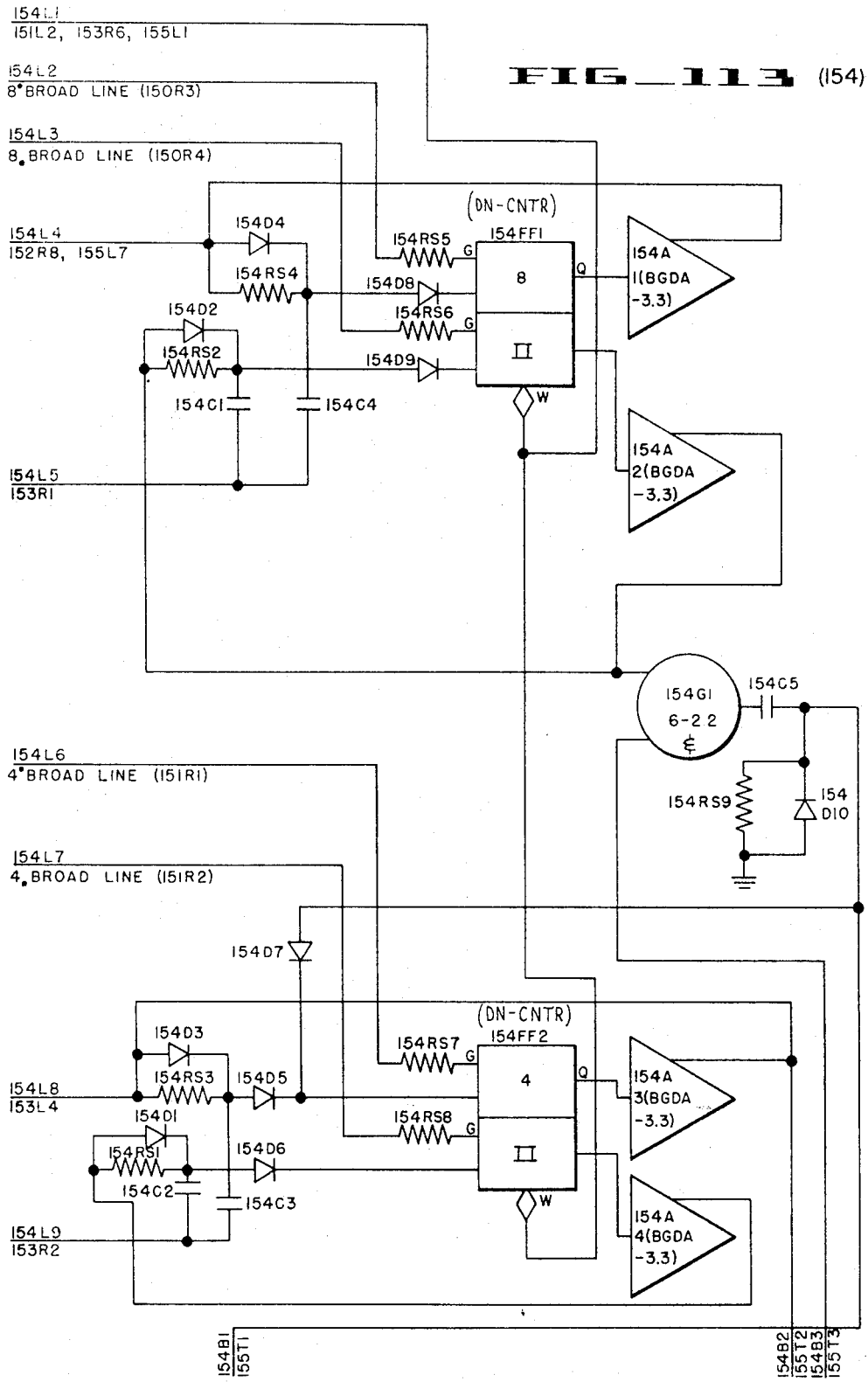

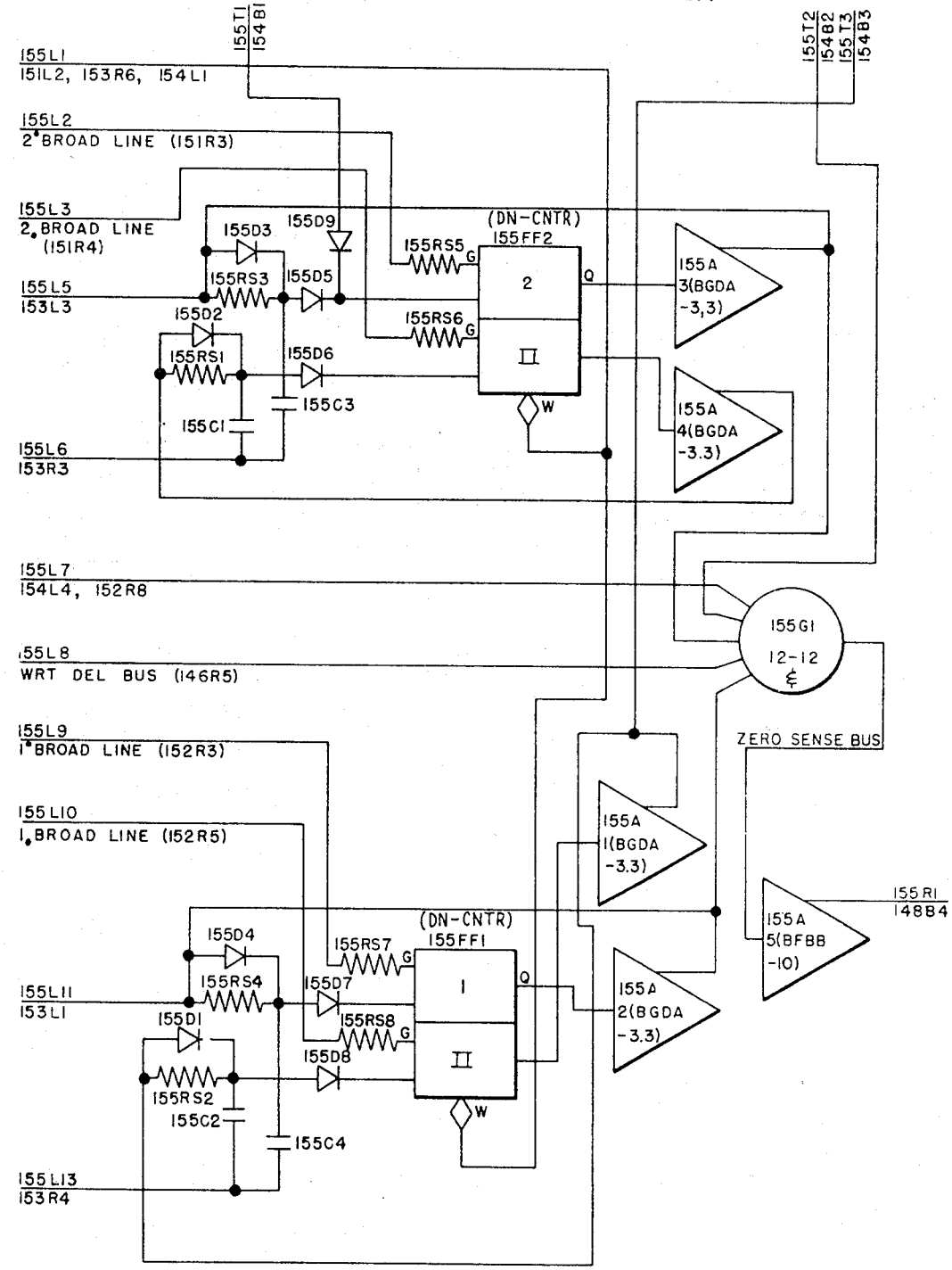
FIG_114 (155)

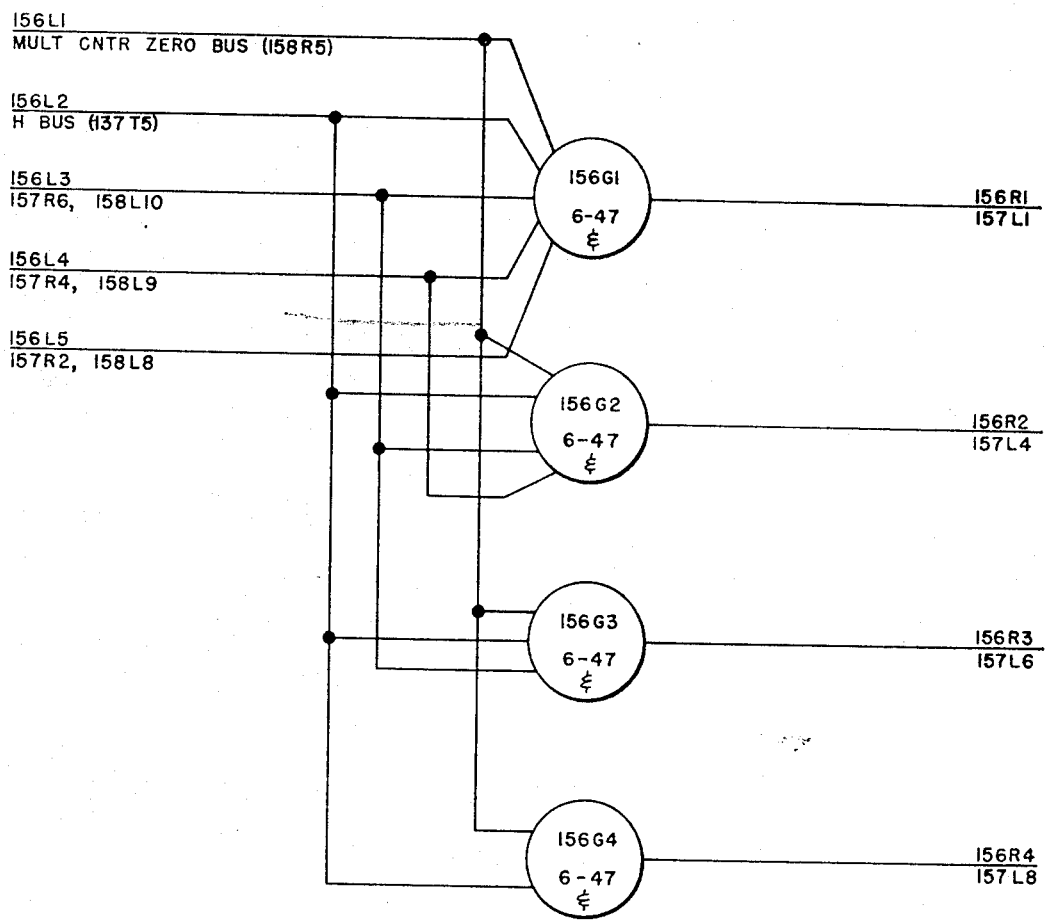
FIG_115 (156)

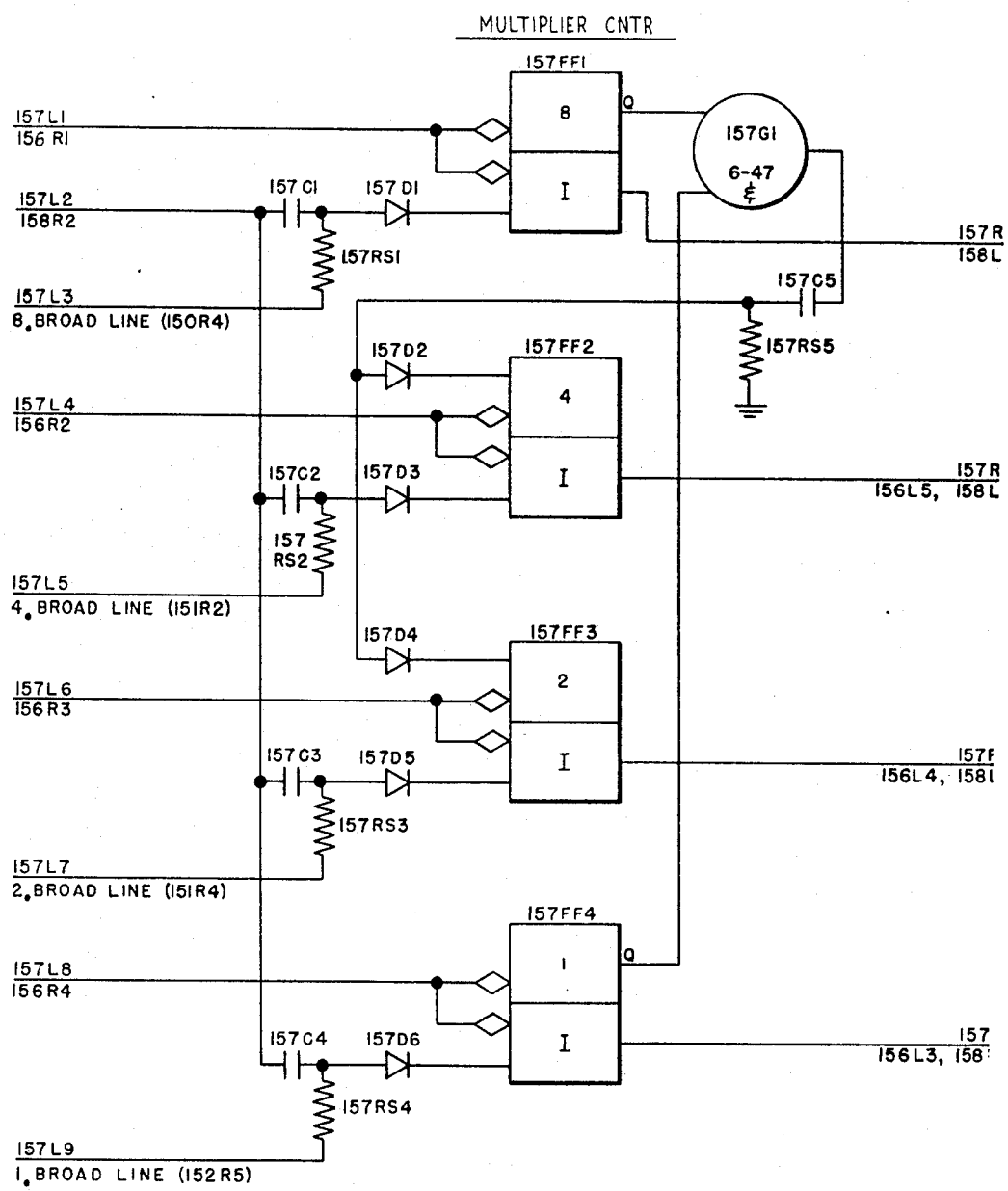
FIG_116 (157)

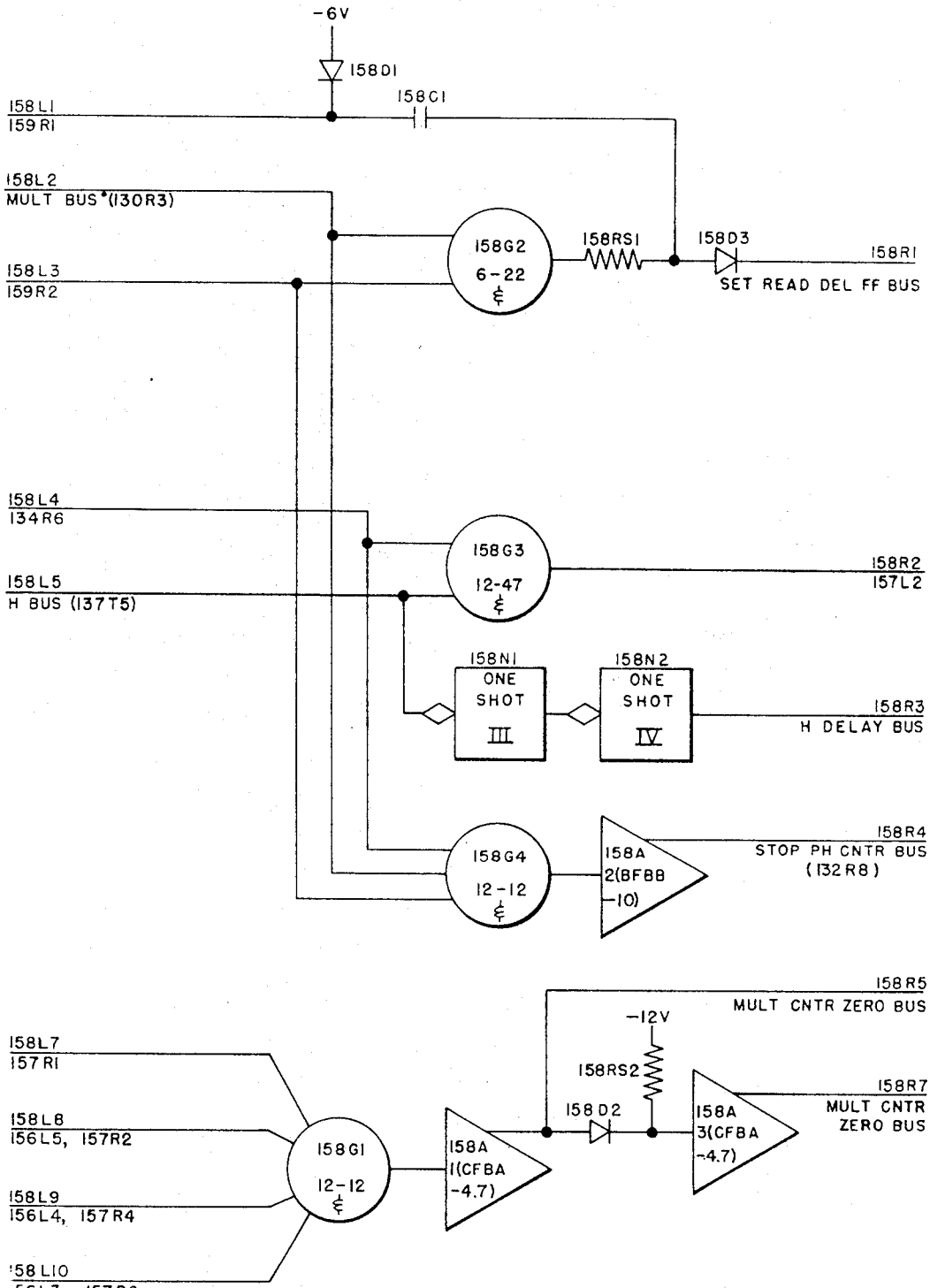
FIG_112 (158)

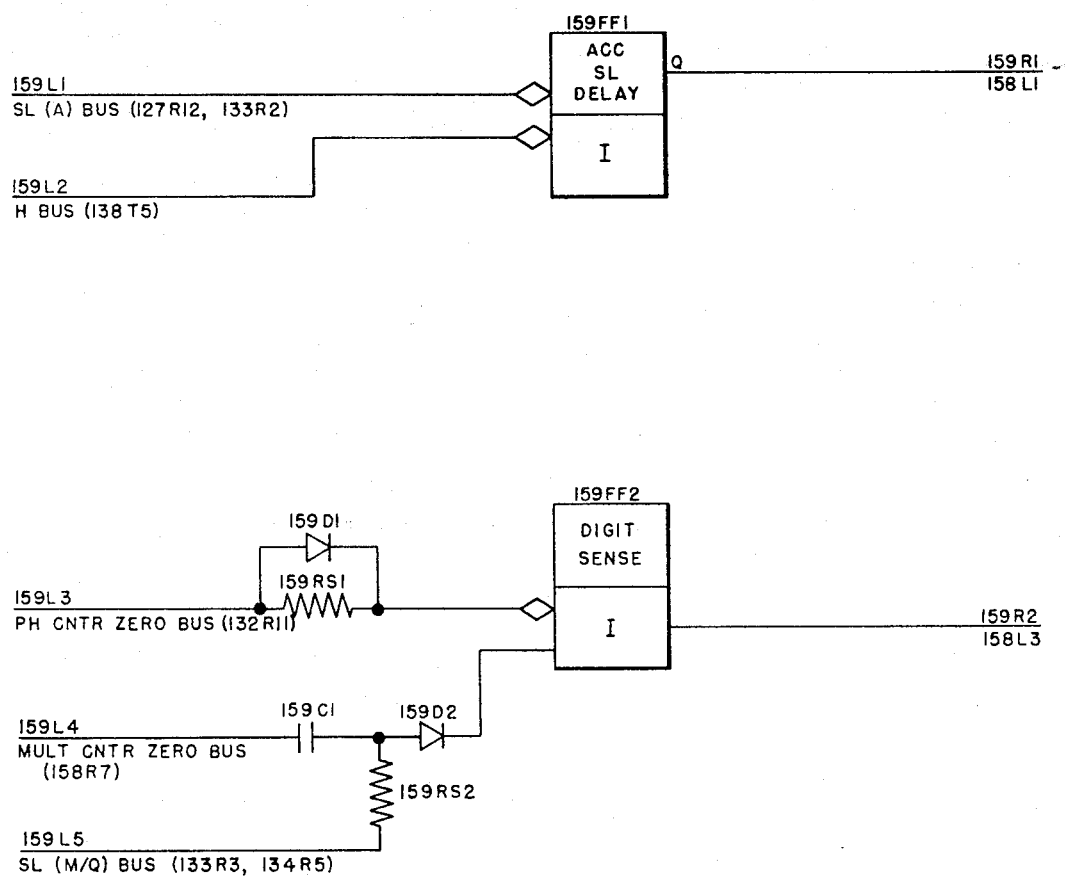
FIG_118 (159)

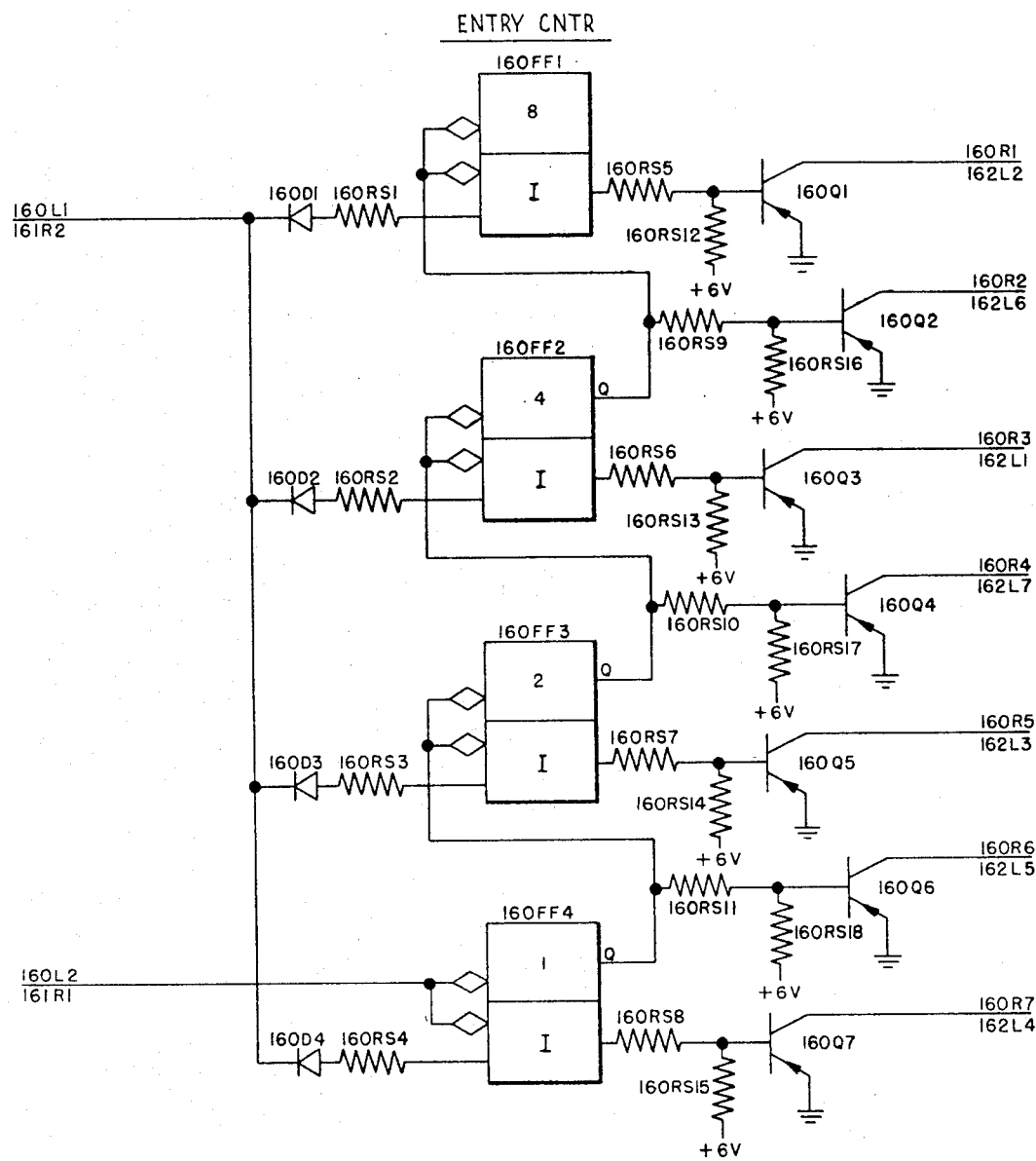
FIG_119 (160)

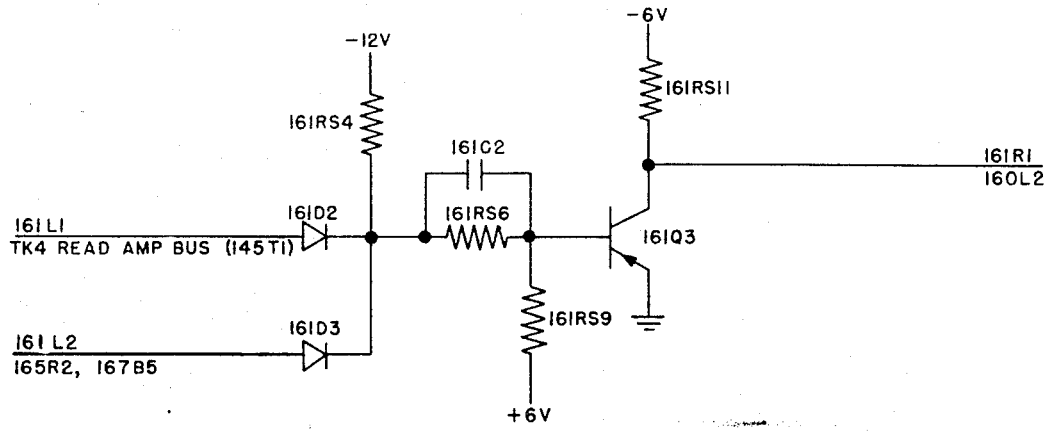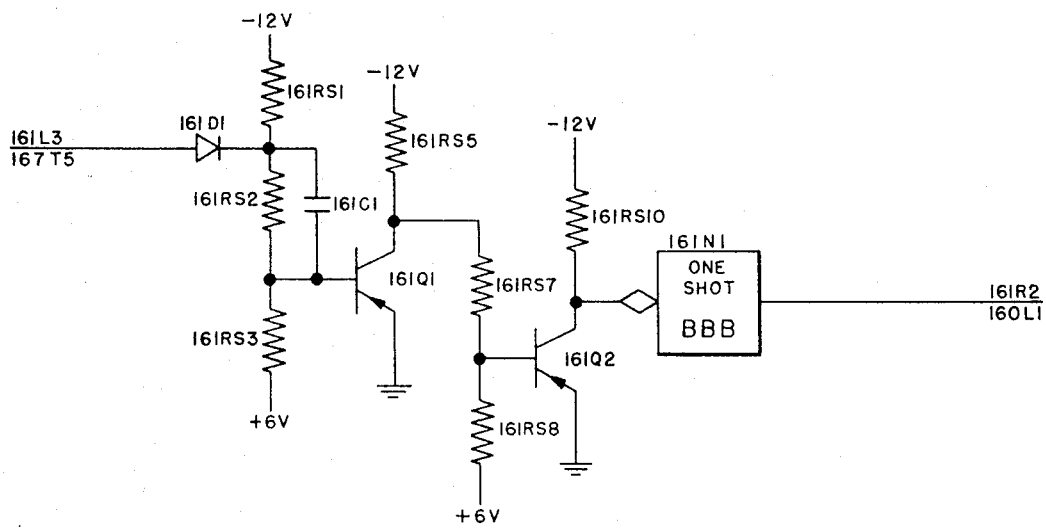
FIG_120 (161)

Oct. 21, 1969   R. A. RAGEN ET AL   3,474,238
ELECTRONIC CALCULATOR FOR PERFORMING RESTORING DECIMAL DIVISION
Original Filed Oct. 28, 1963
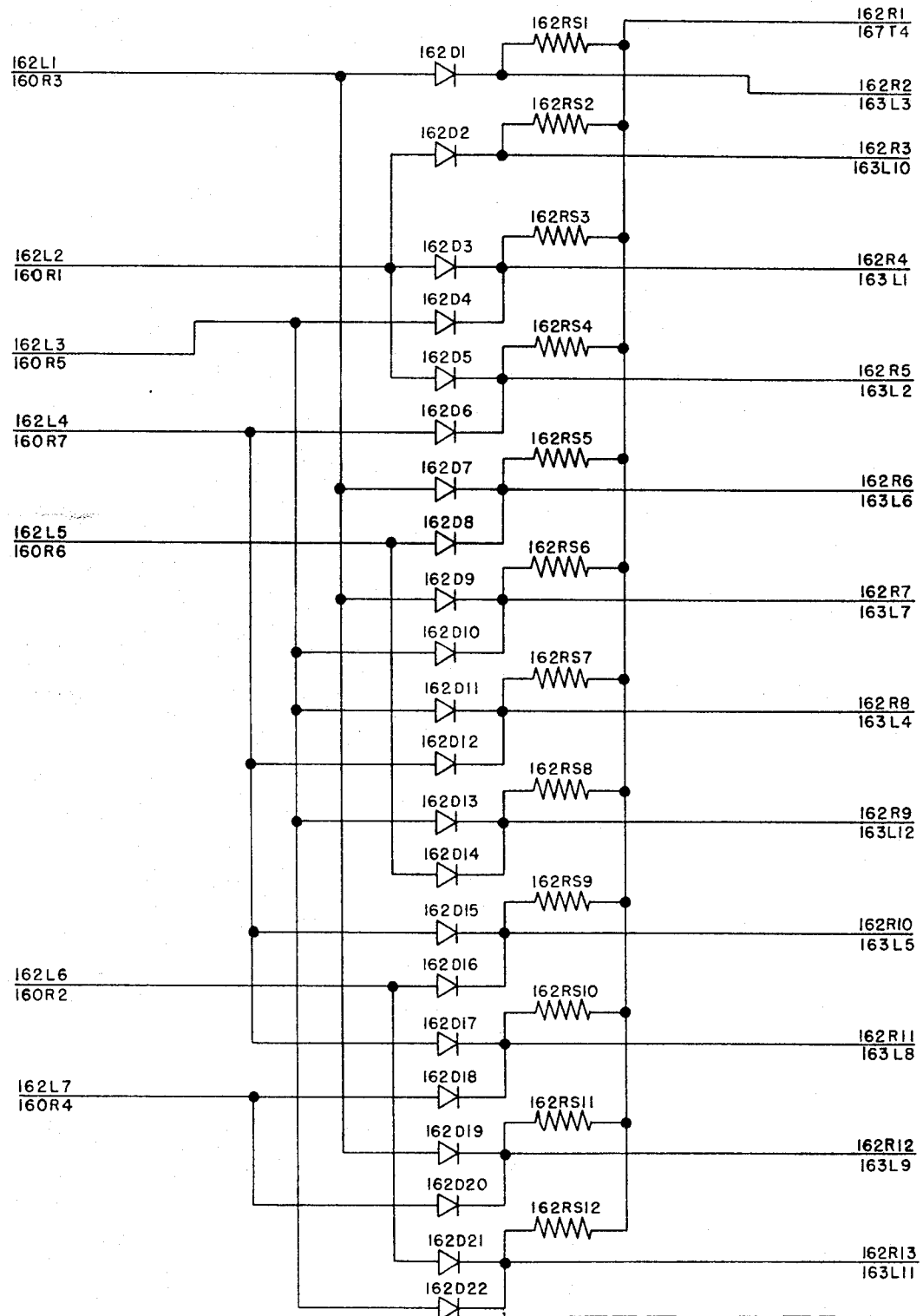
FIG_121 (162)

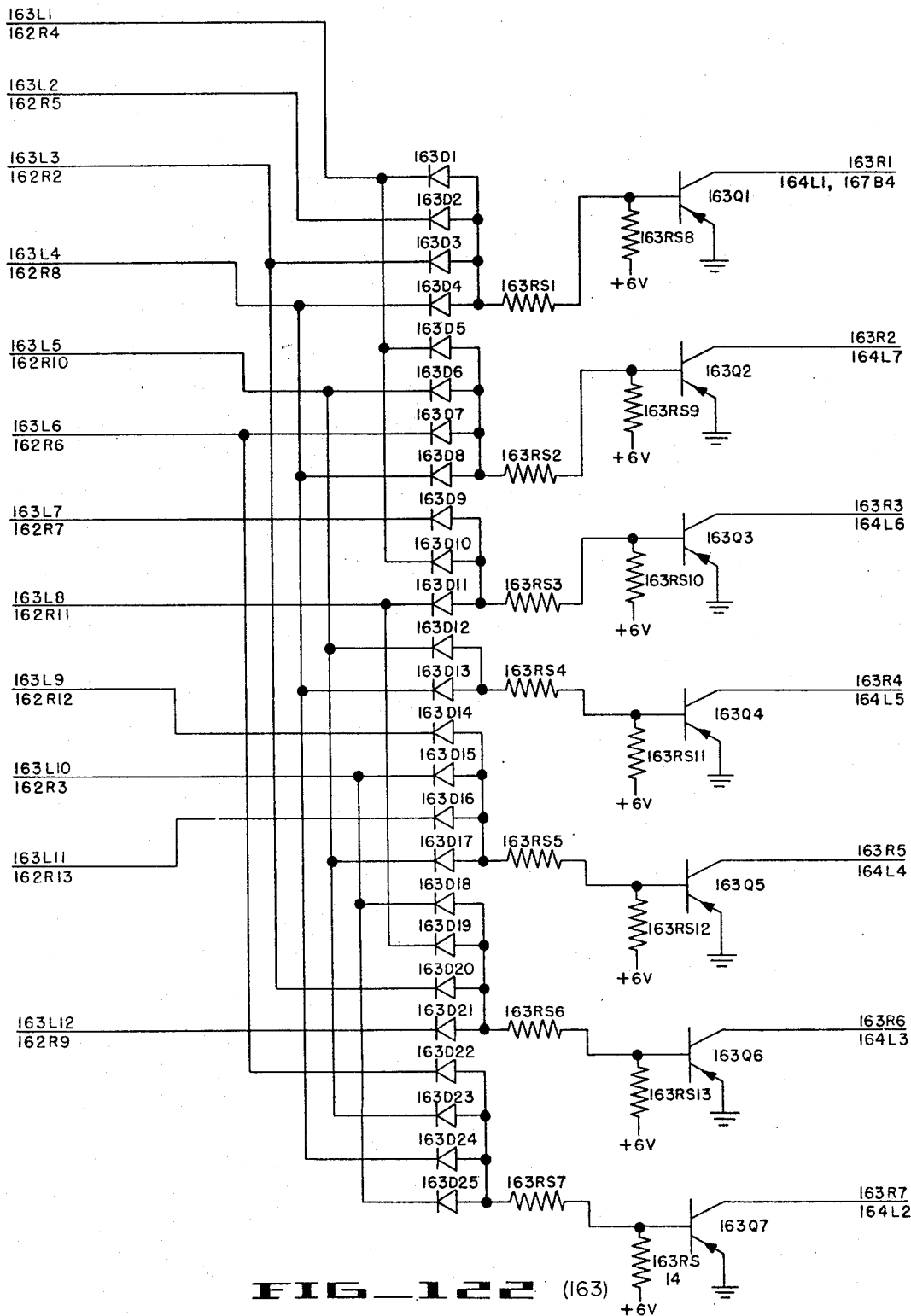
FIG_122 (163)

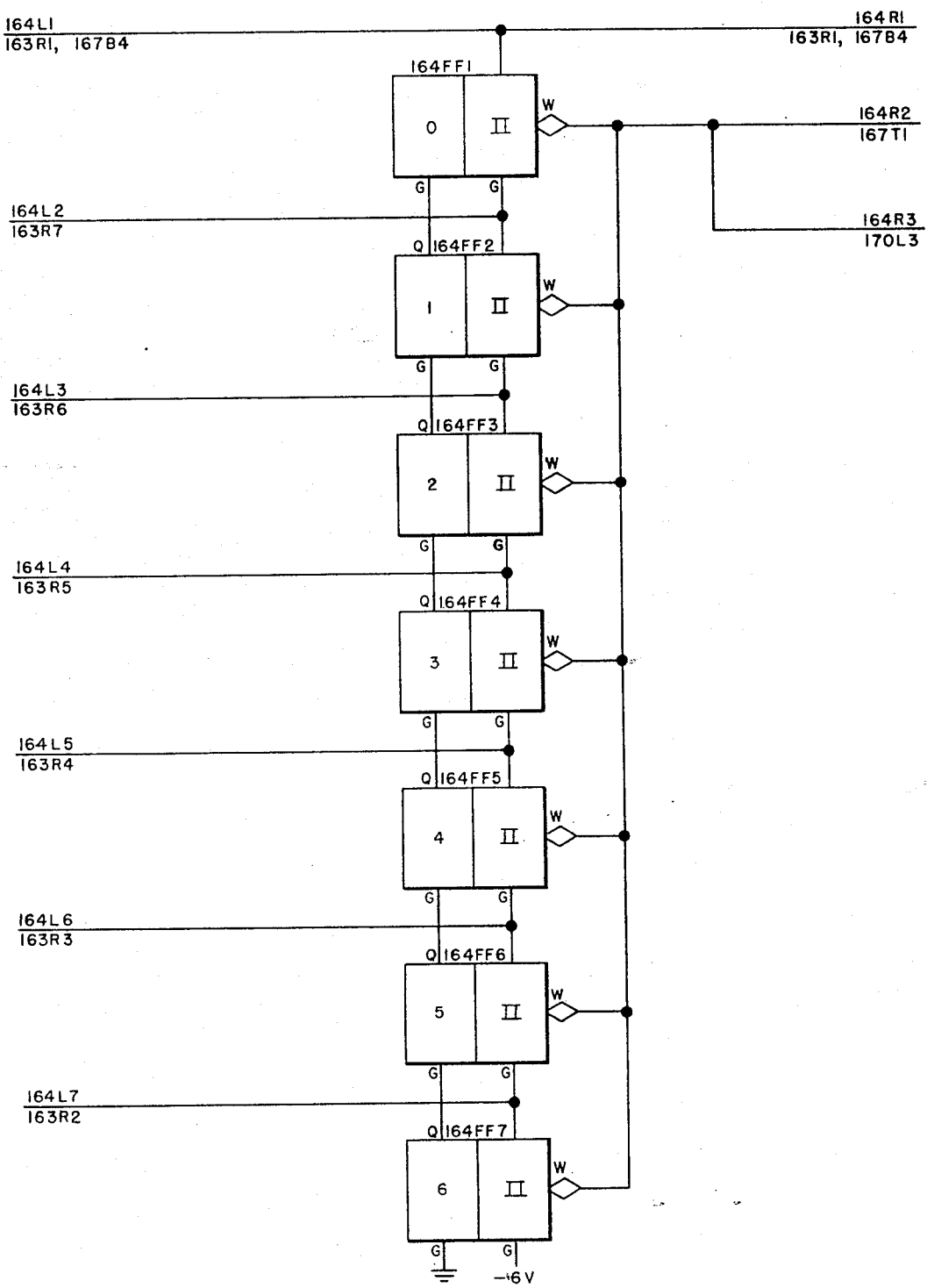

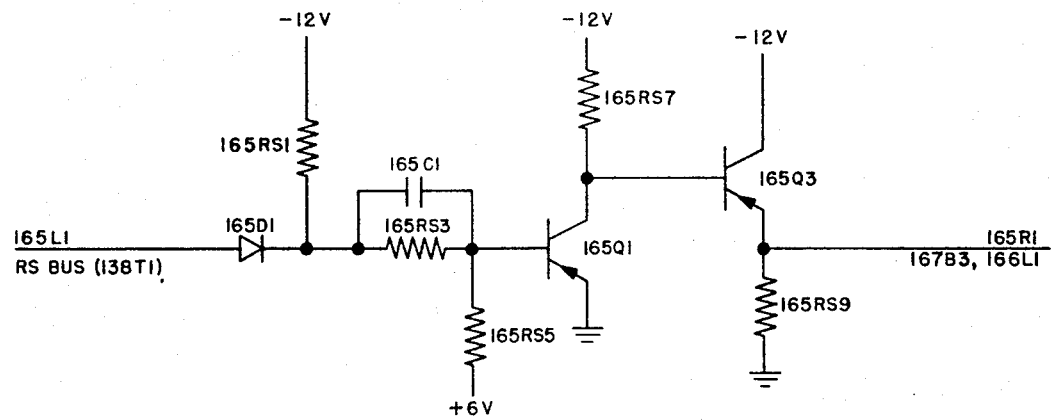
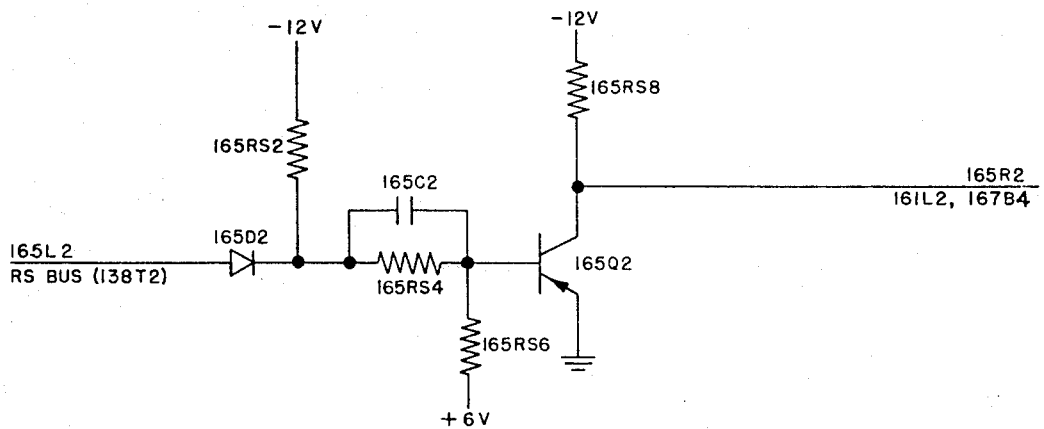
FIG_124 (165)

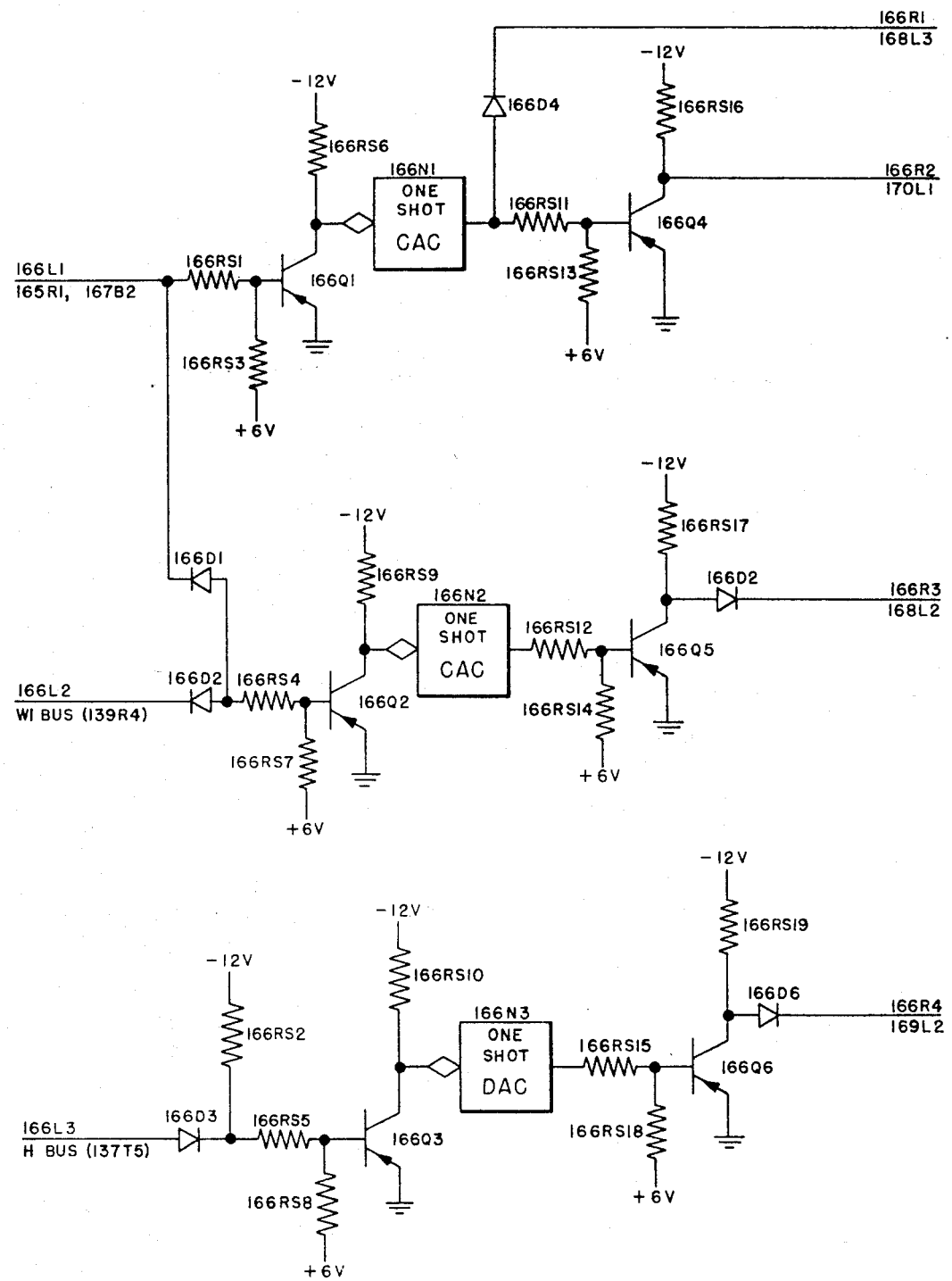
FIG_125 (166)

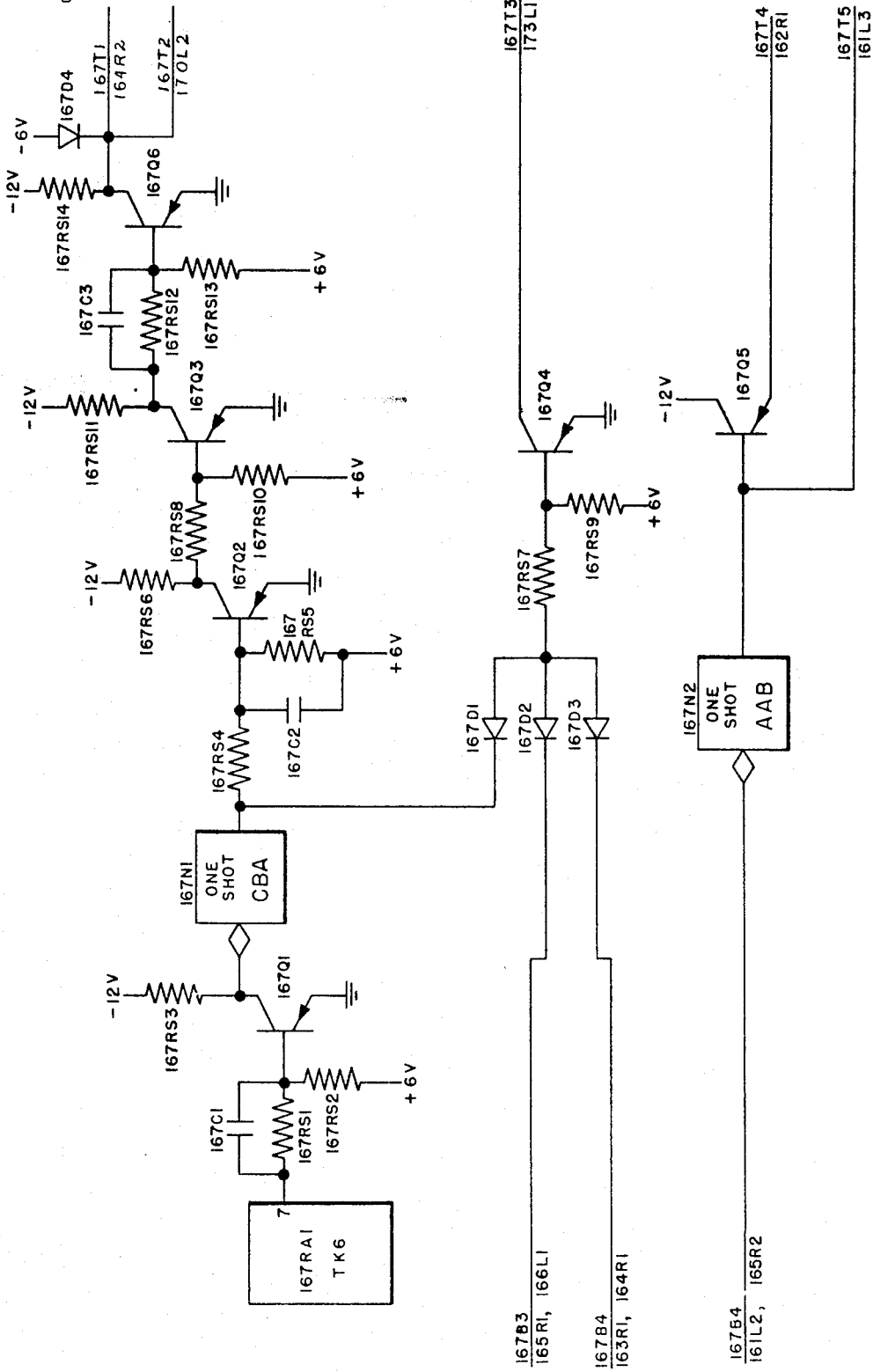

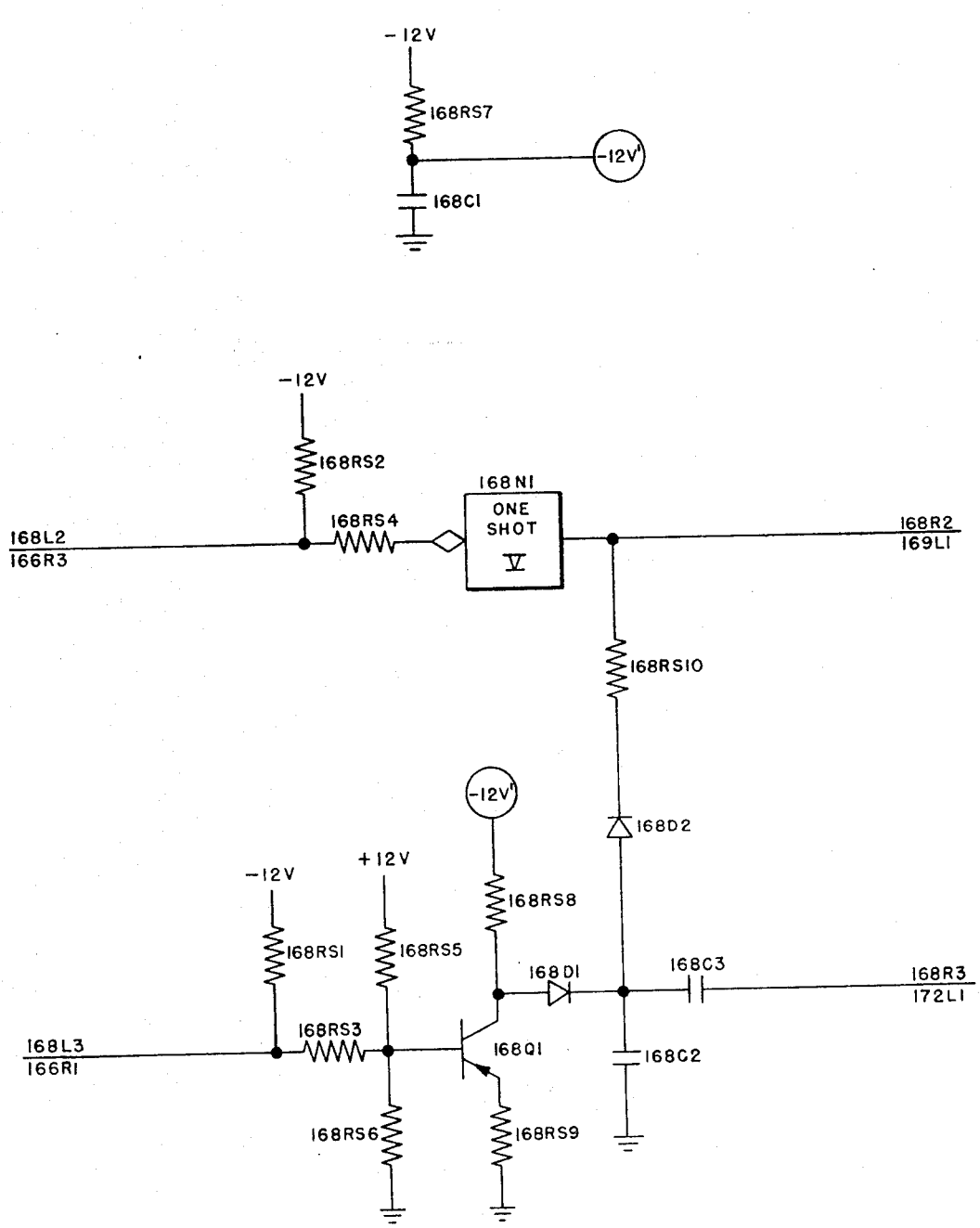
FIG_122 (168)

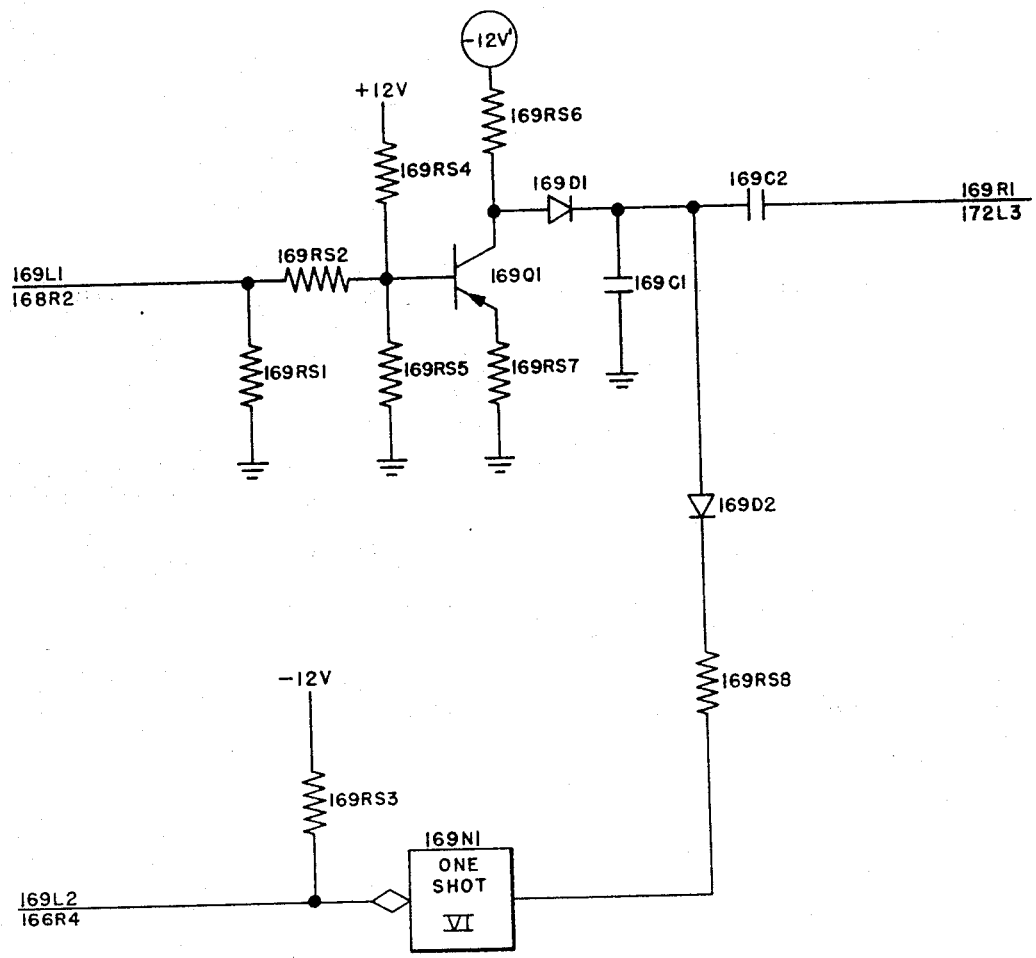
FIG_128 (169)

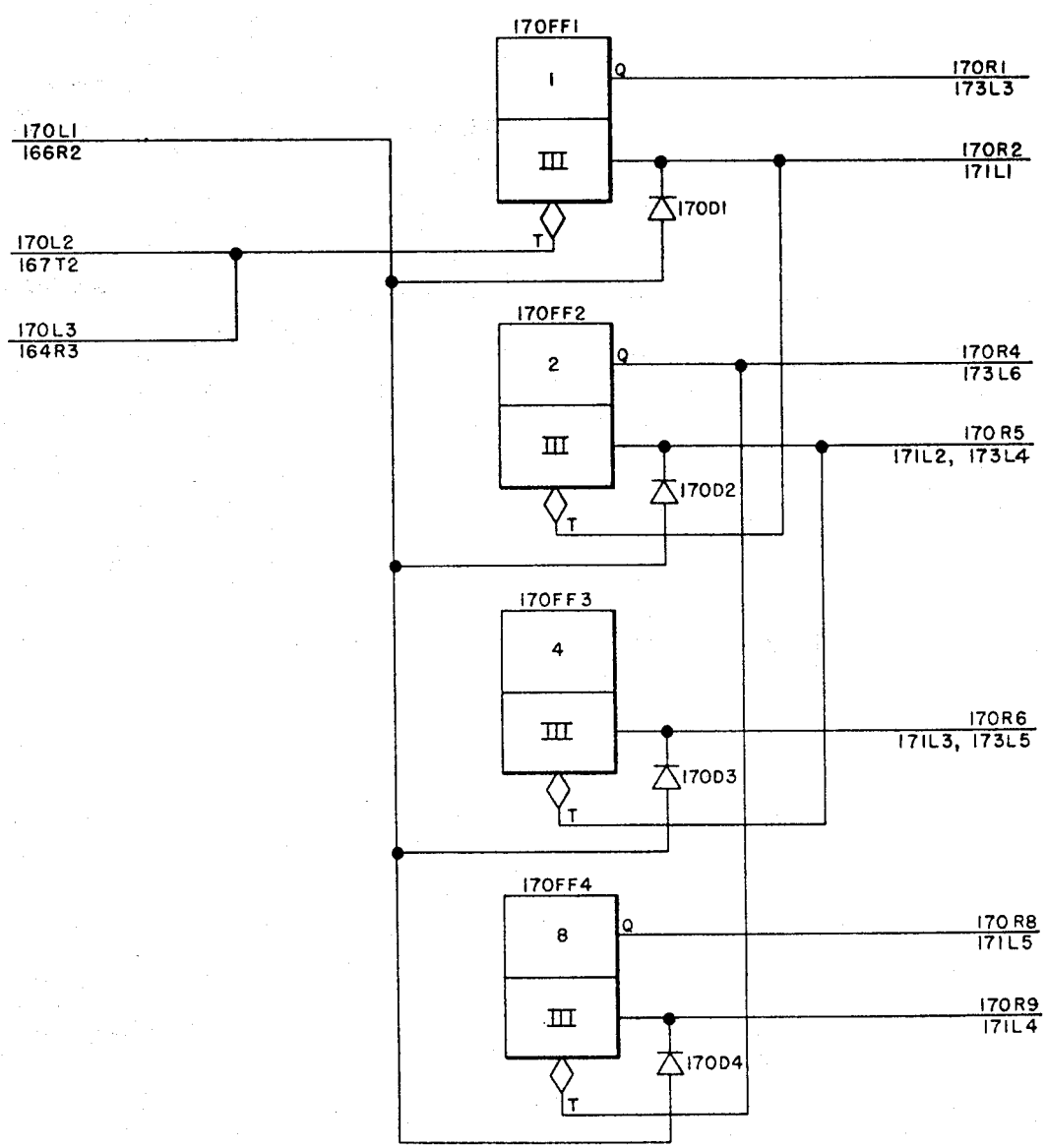
FIG_129 (170)

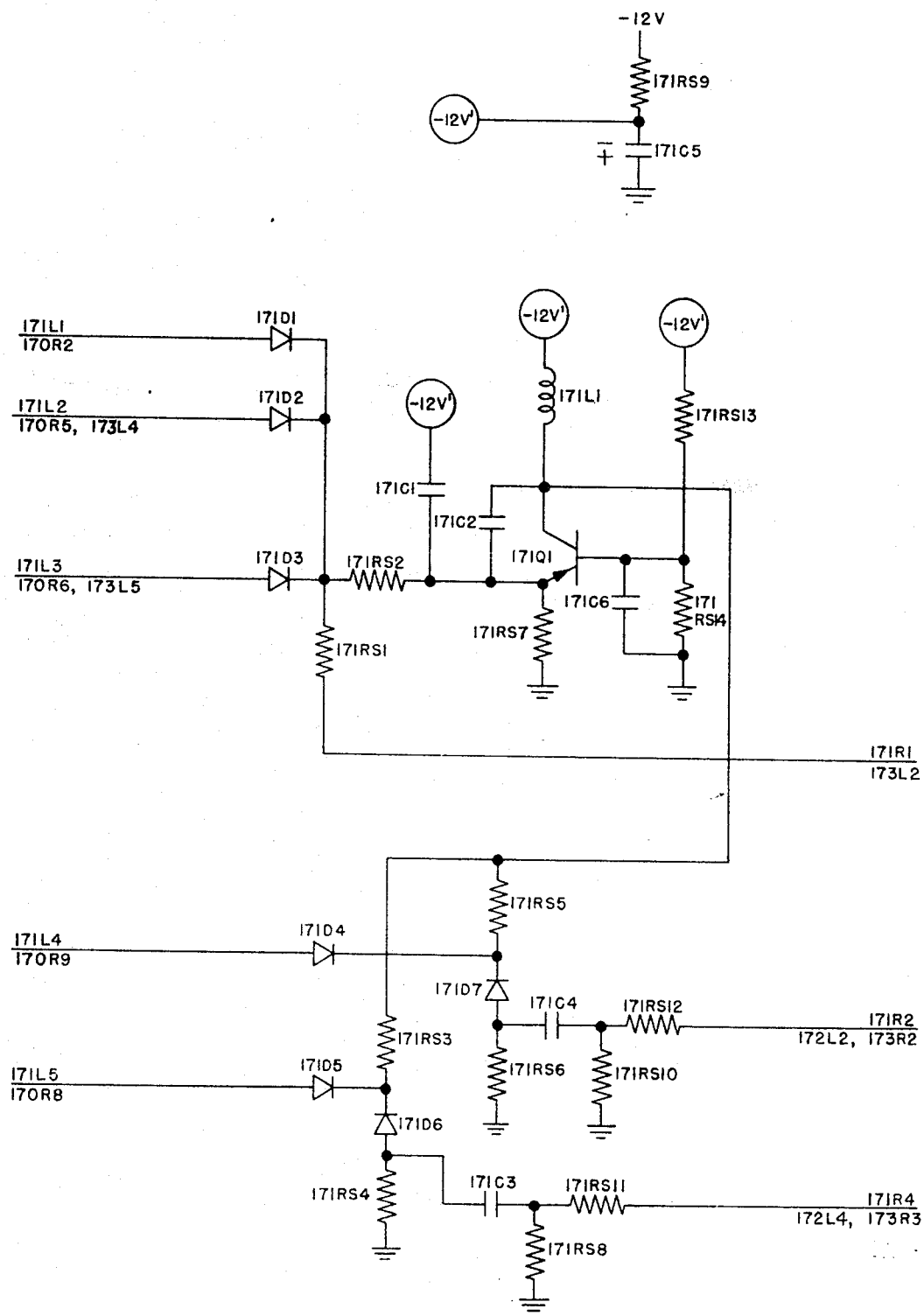
FIG_130 (171)

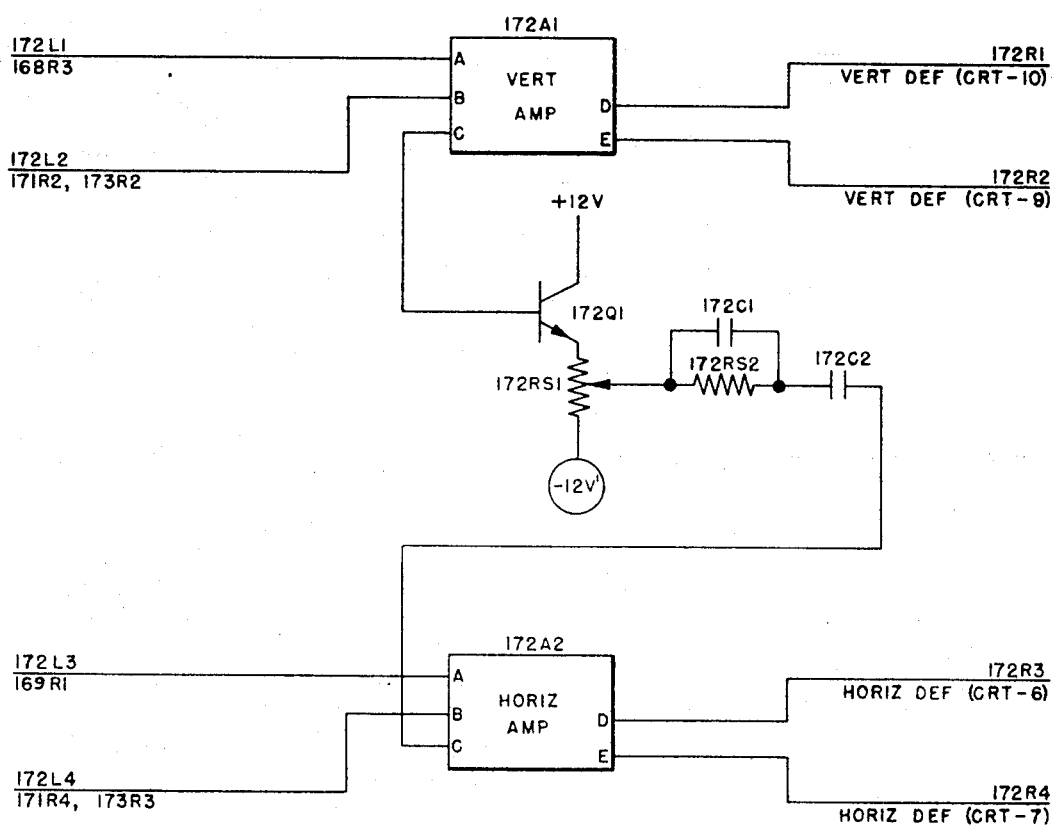
FIG_131 (172)

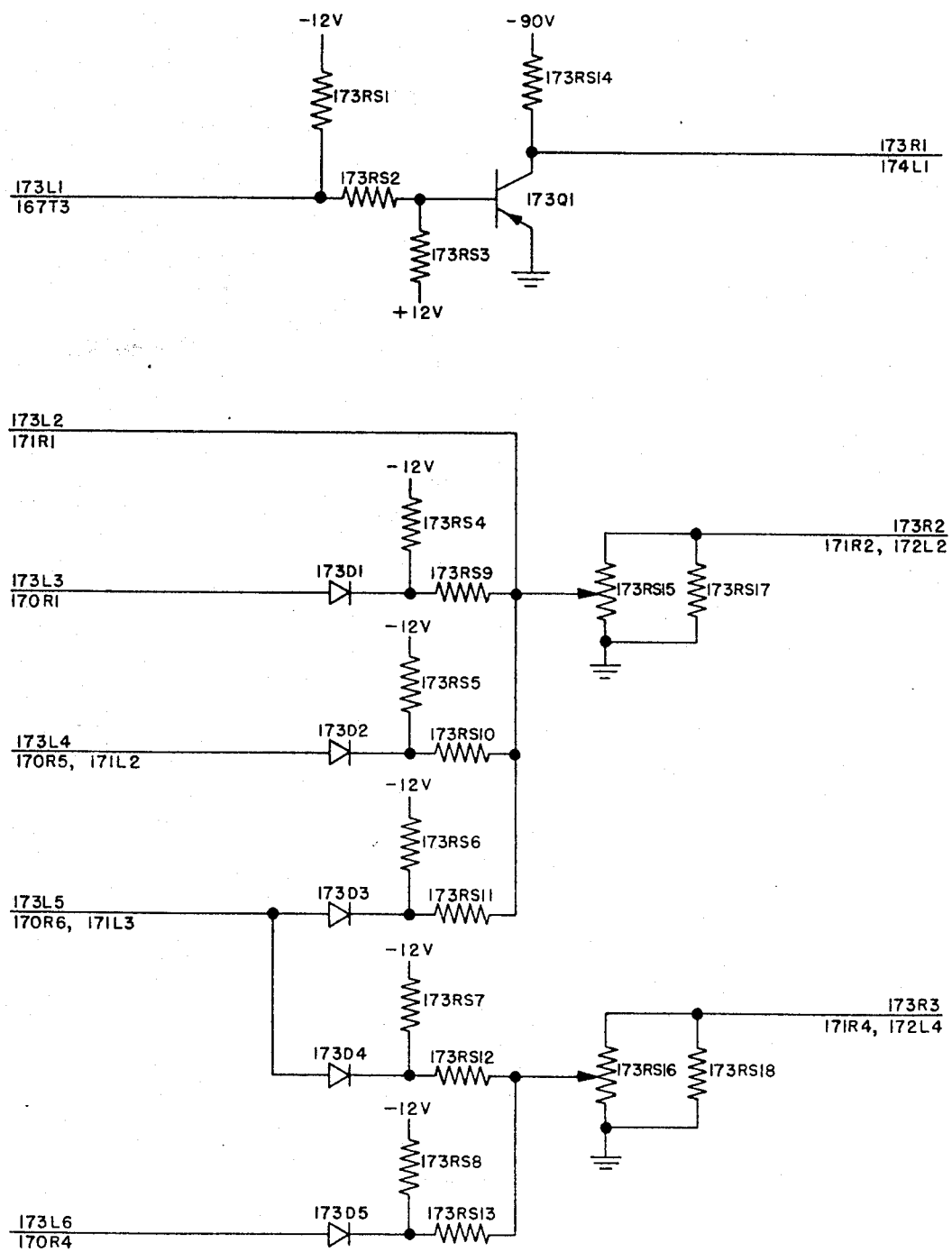
FIG_132 (173)

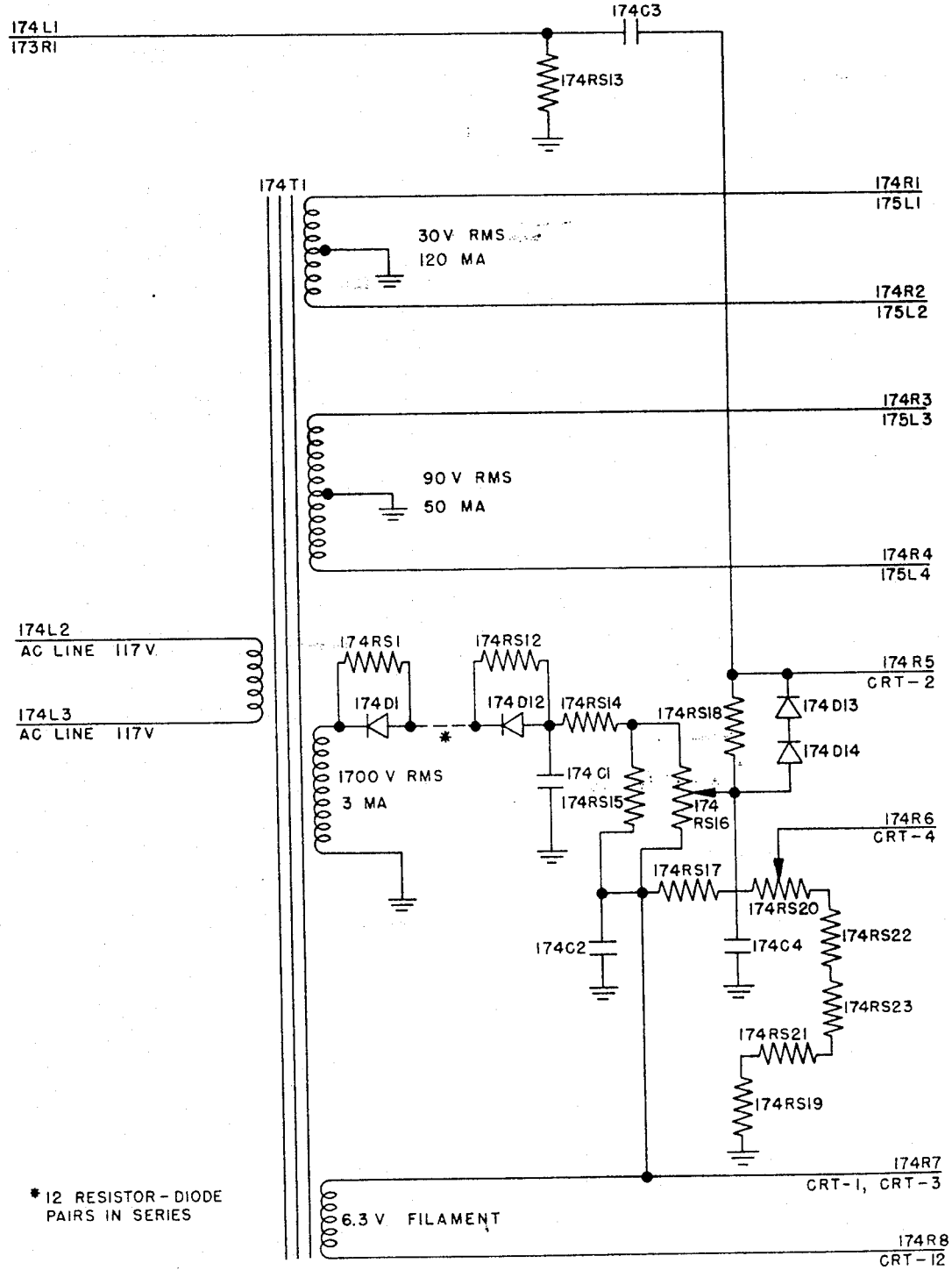
FIG_133 (174)

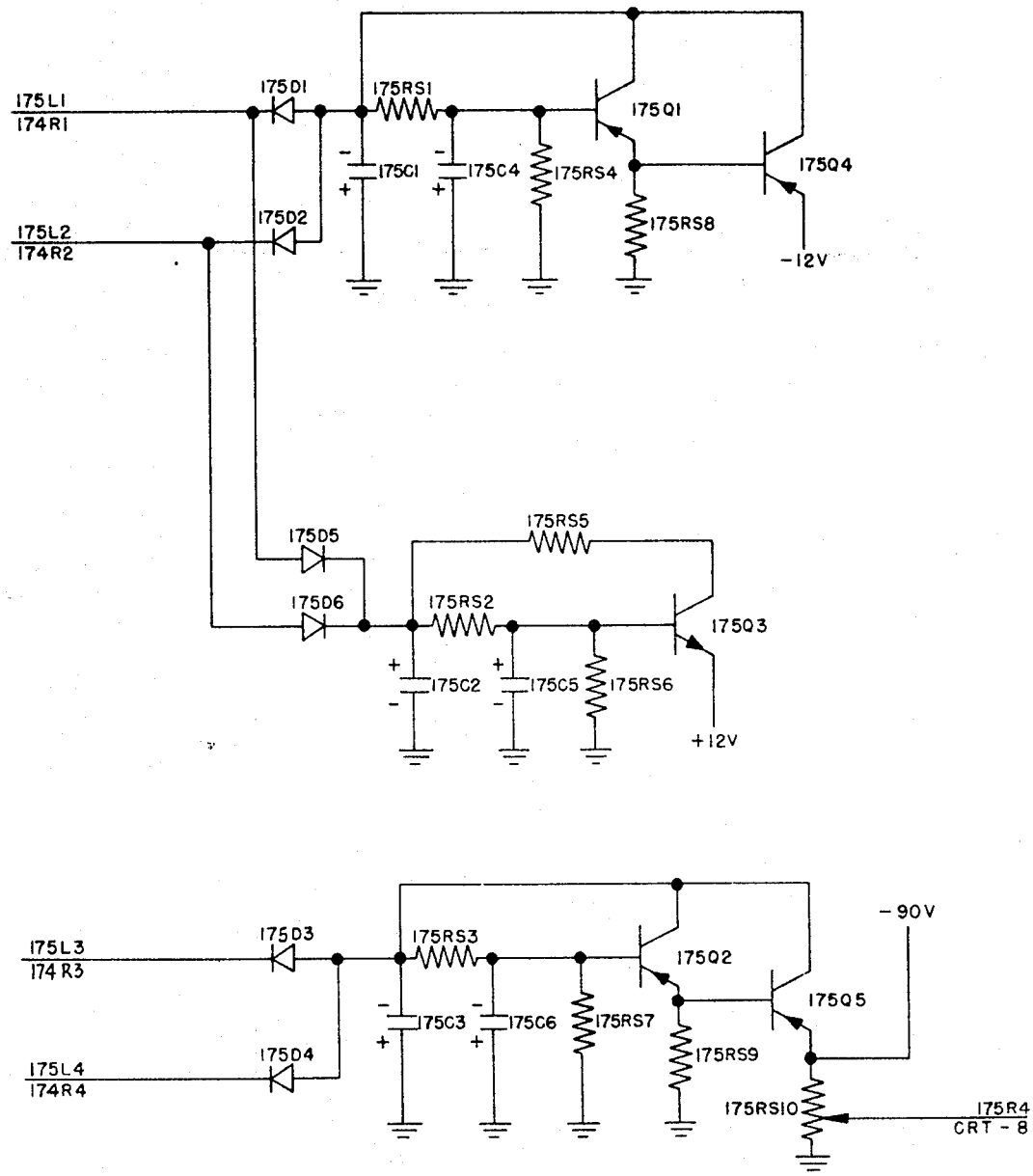
FIG_134 (175)

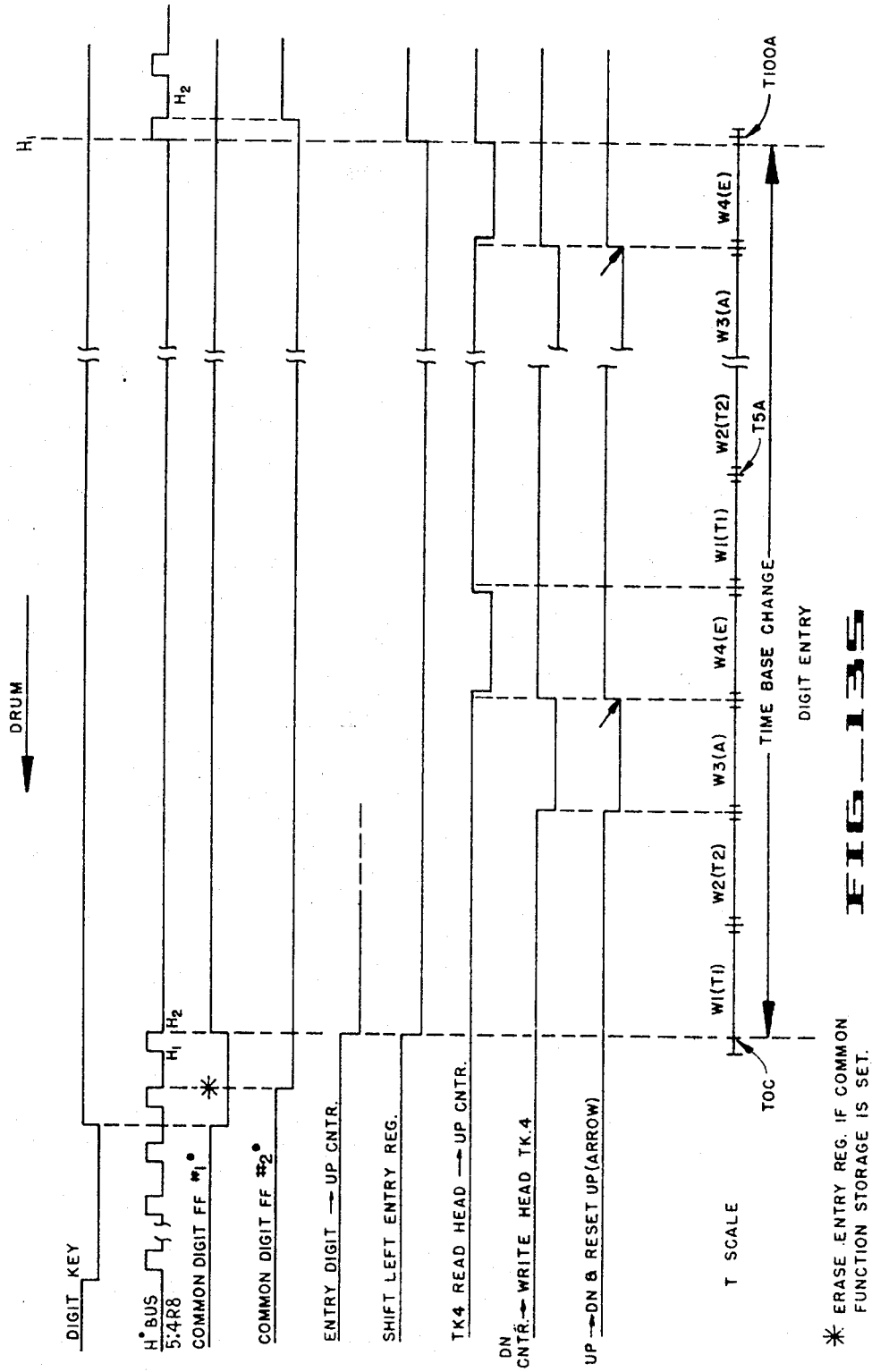

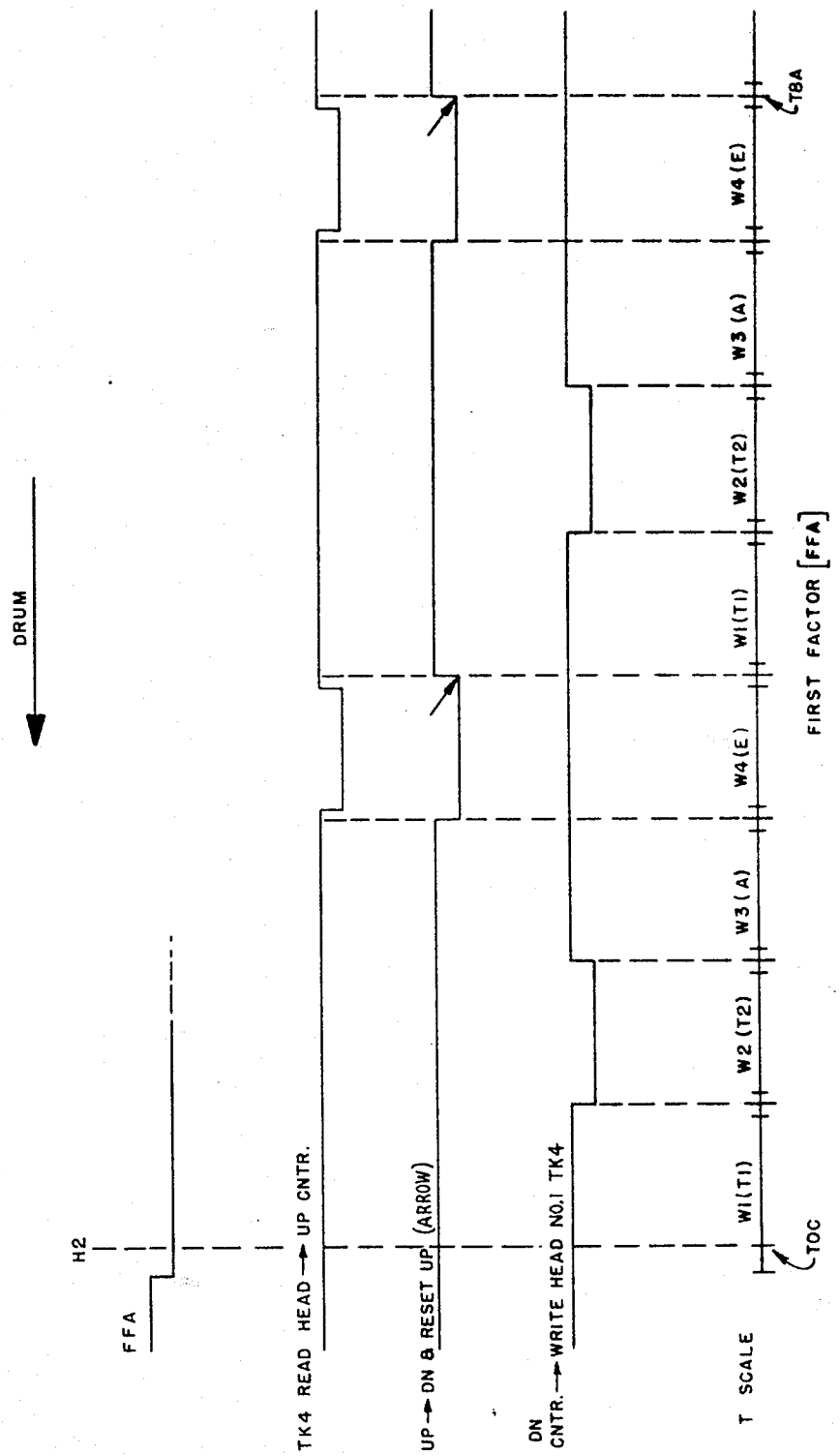

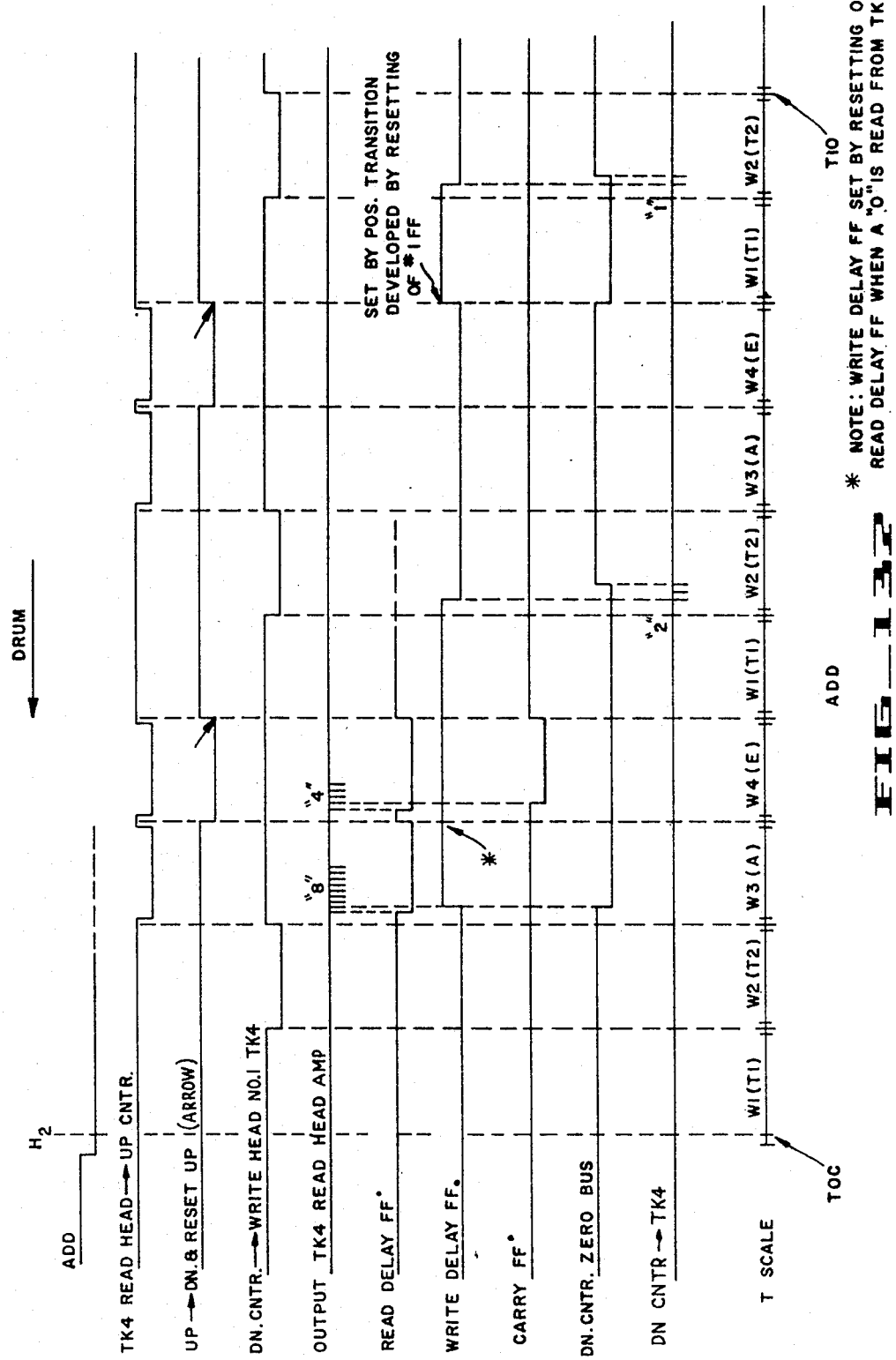

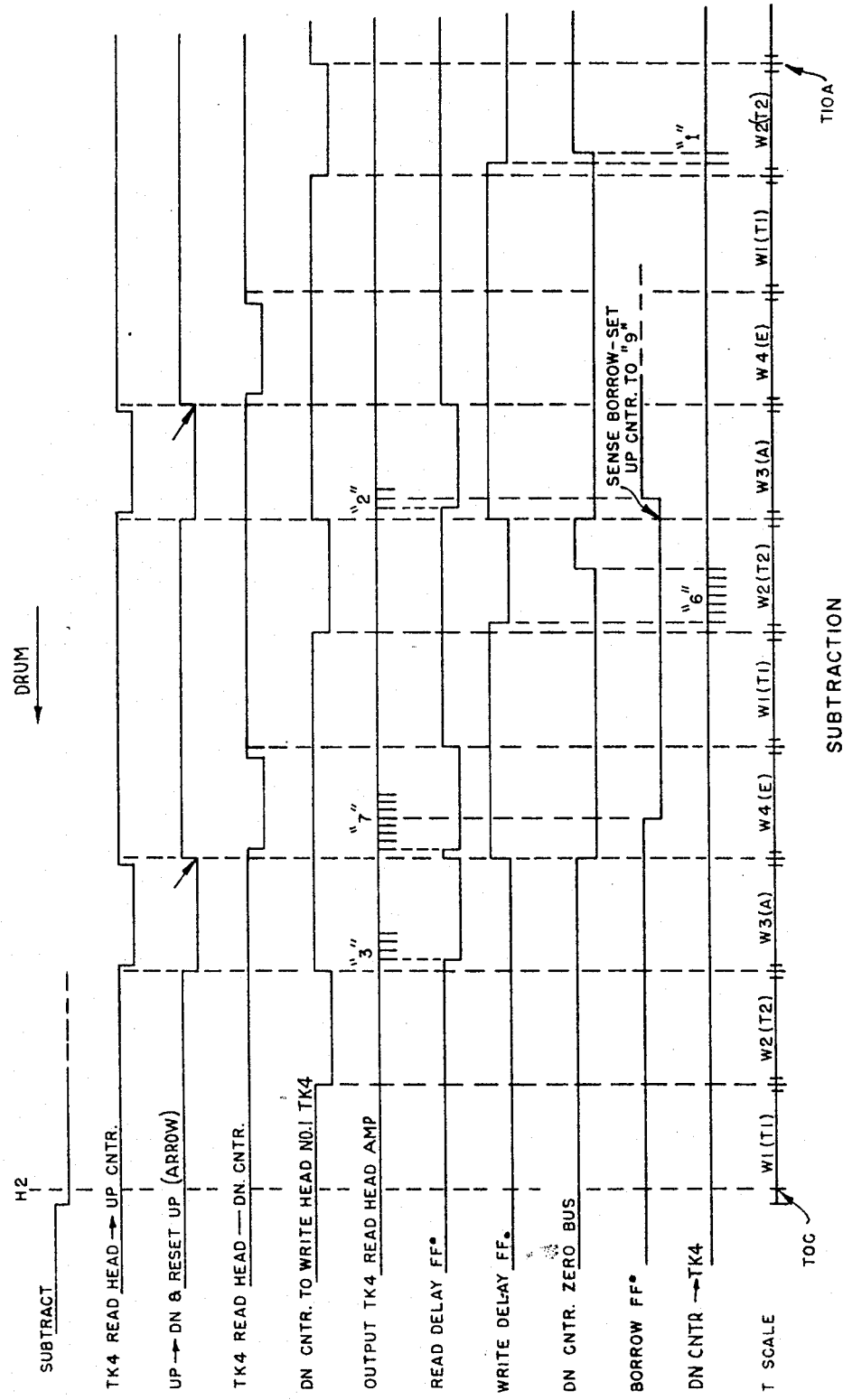
FIG_138

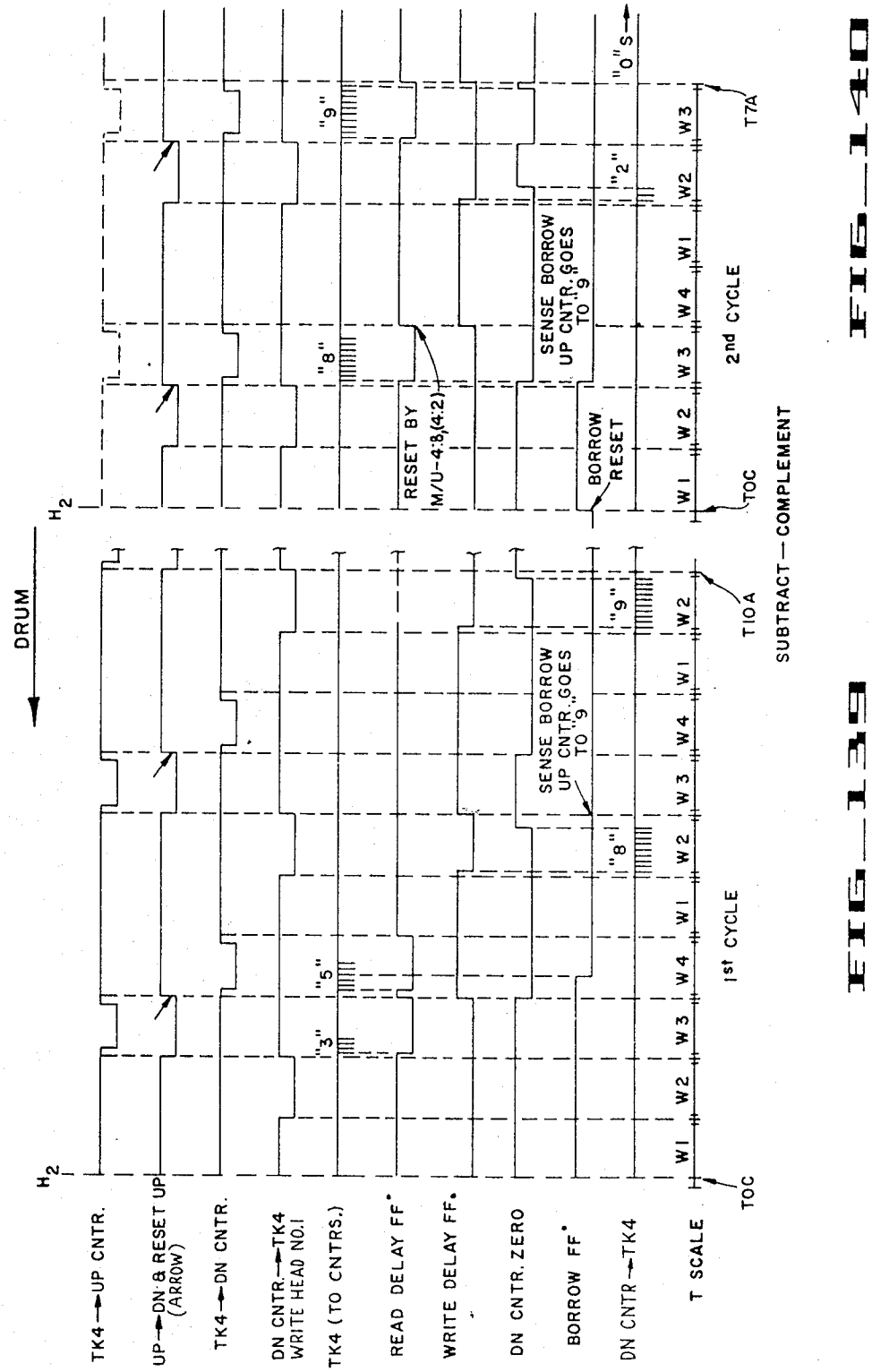

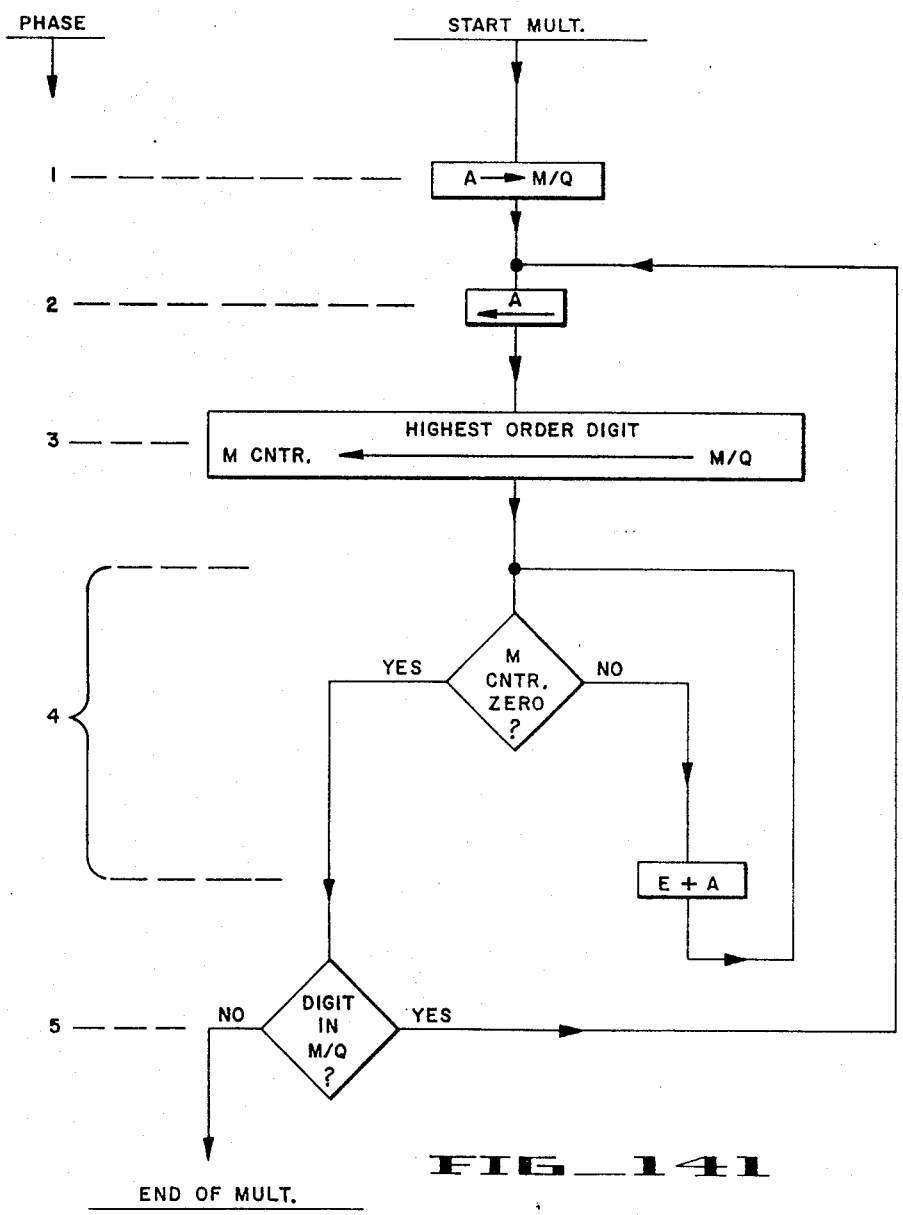
FIG_141

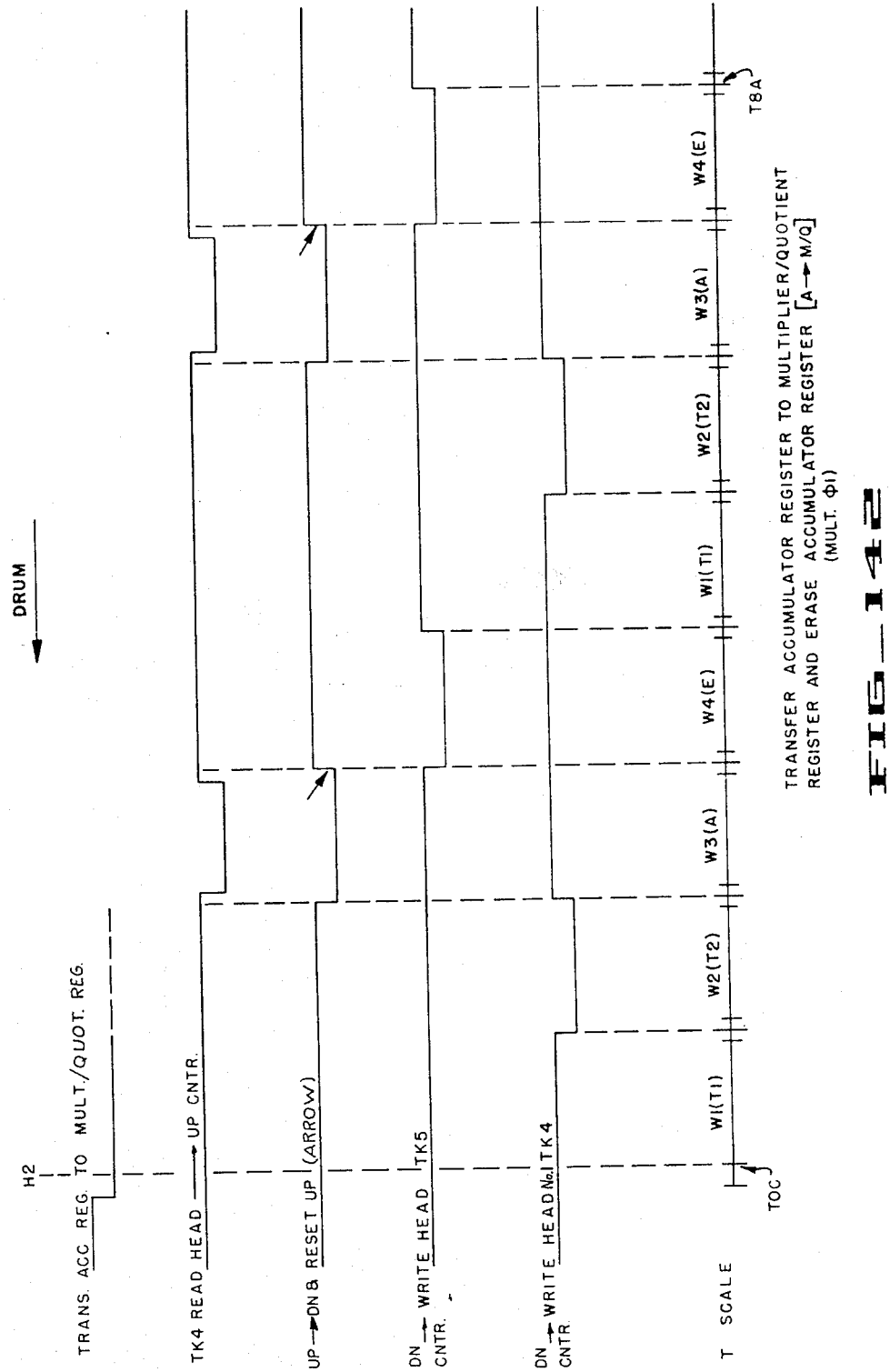

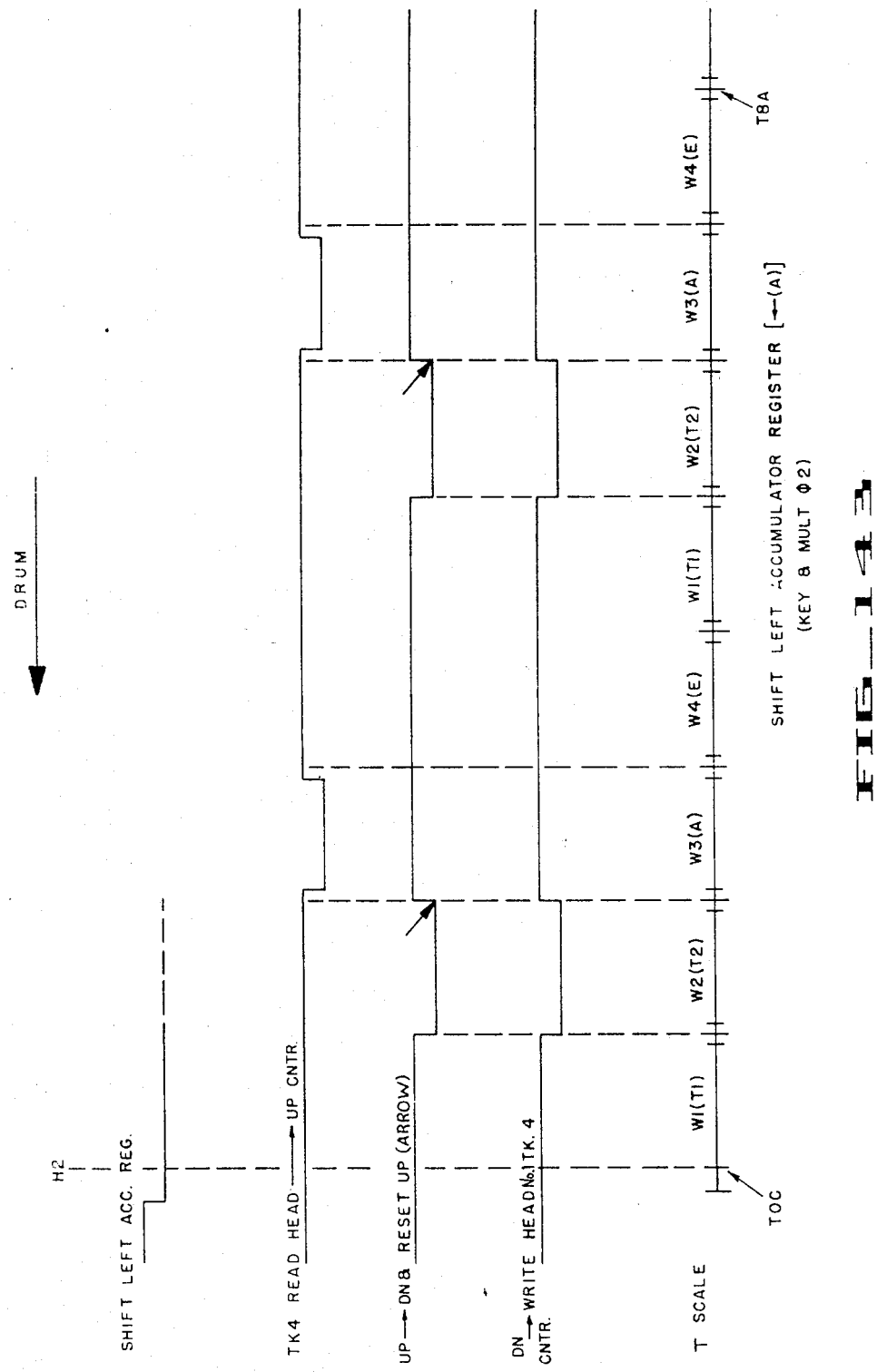
FIG_143

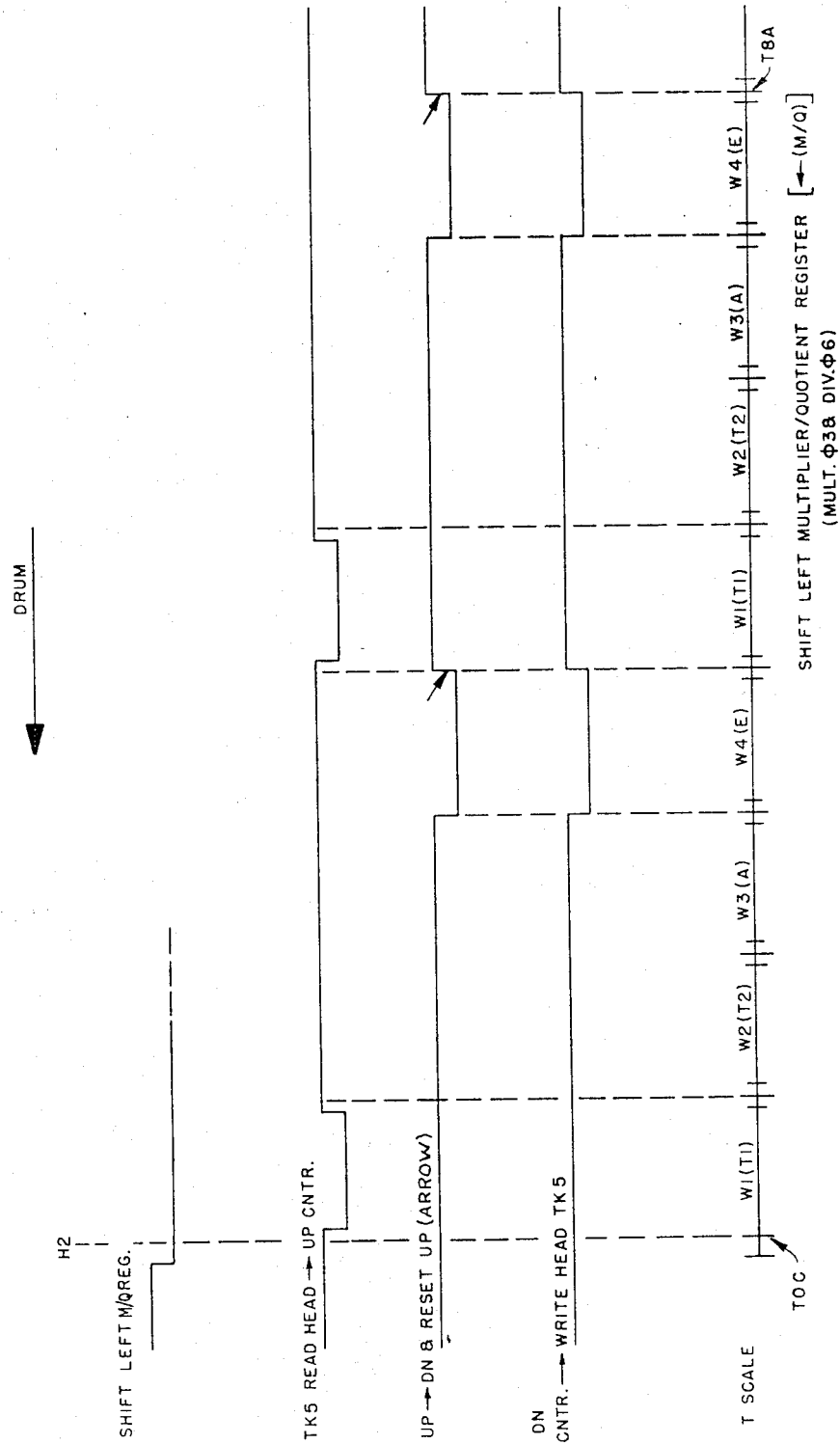

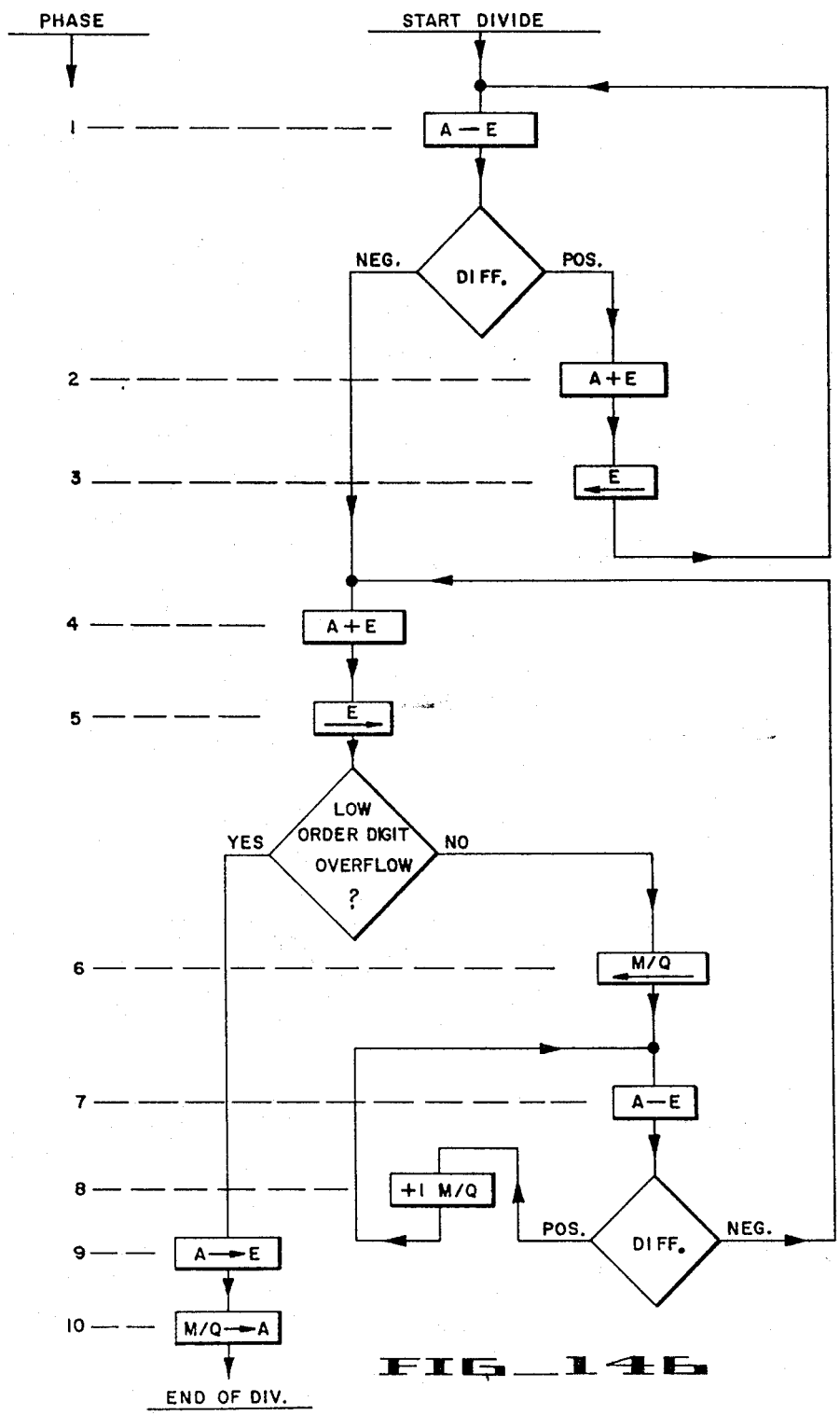
FIG_146

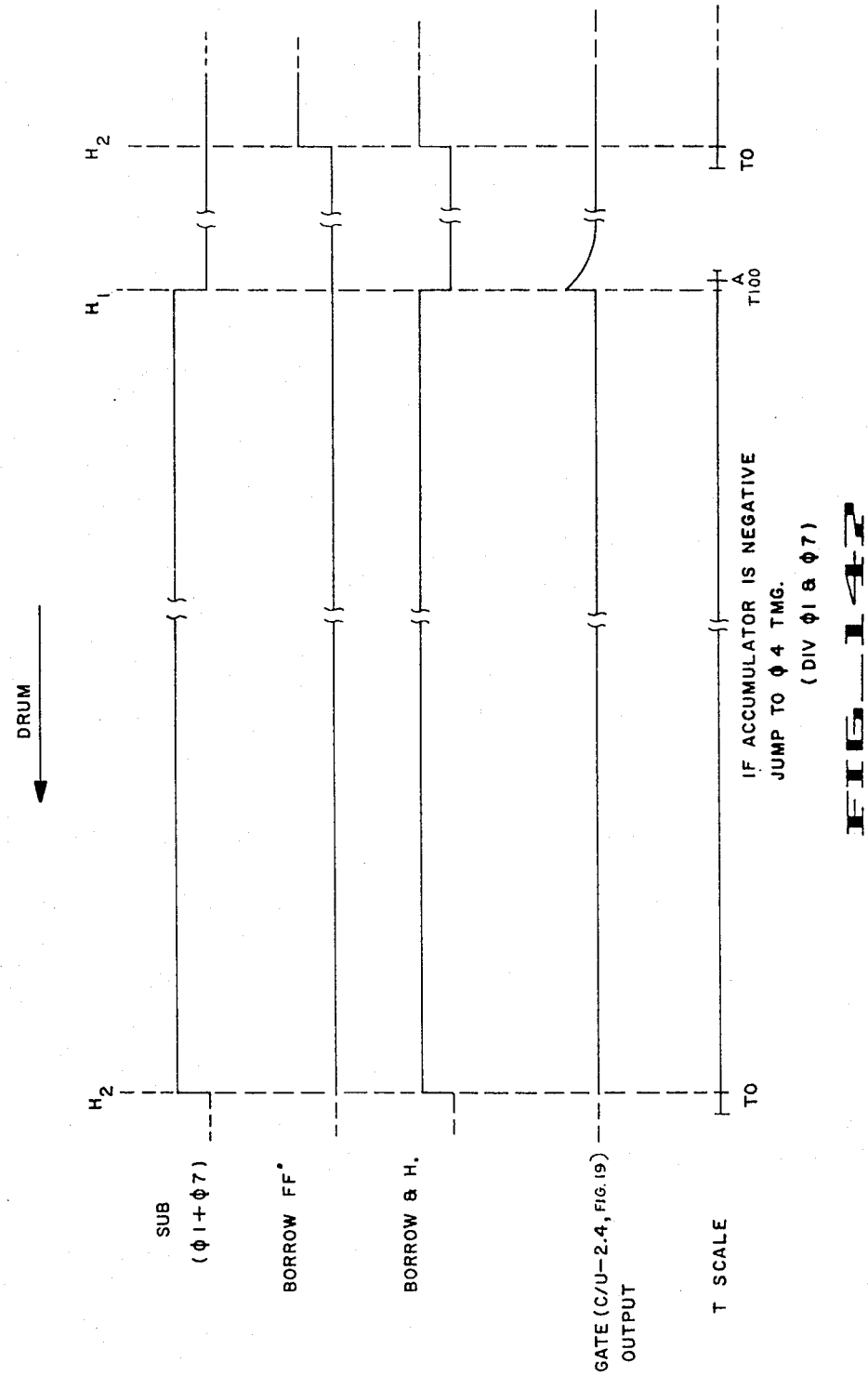

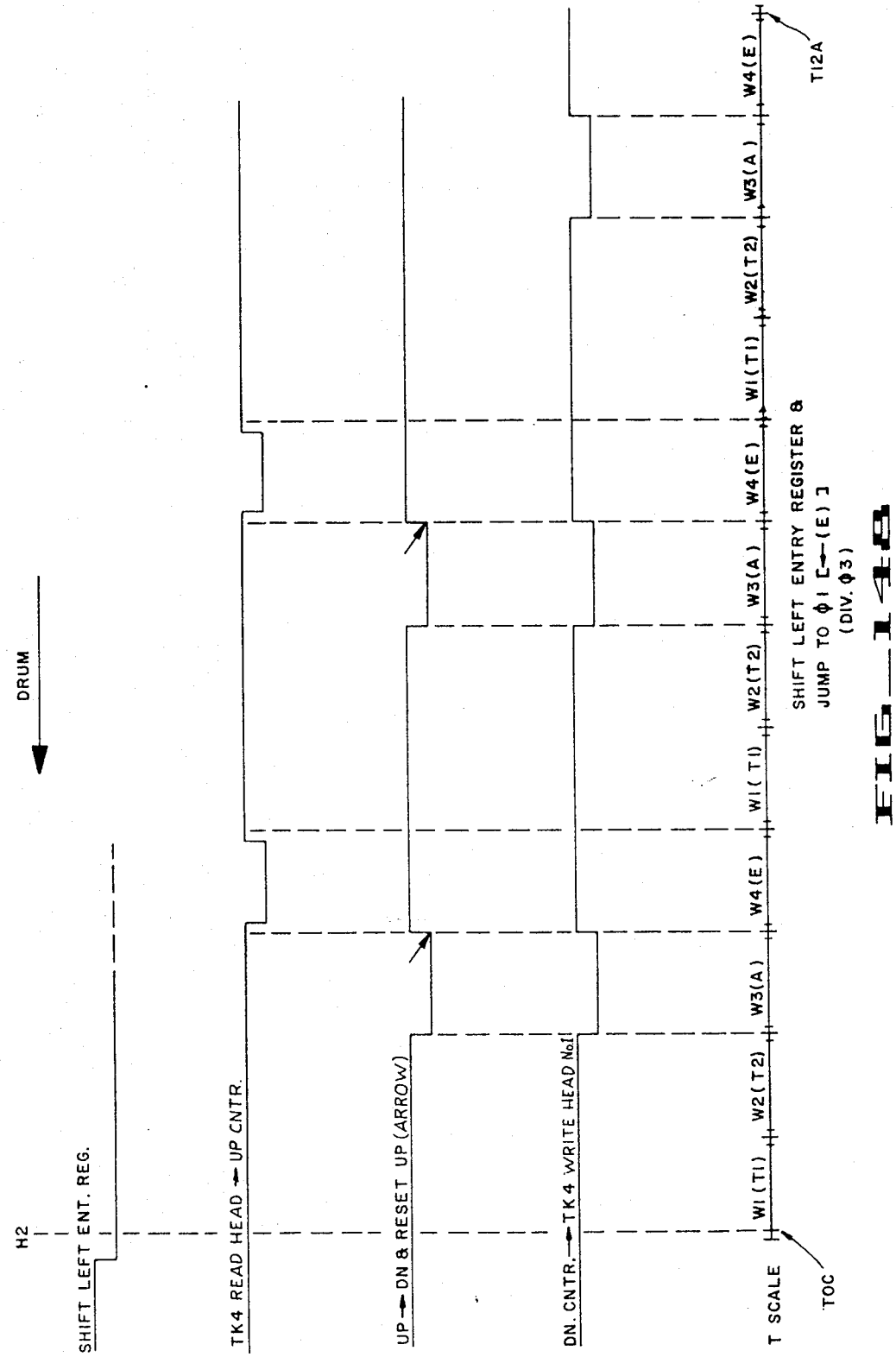

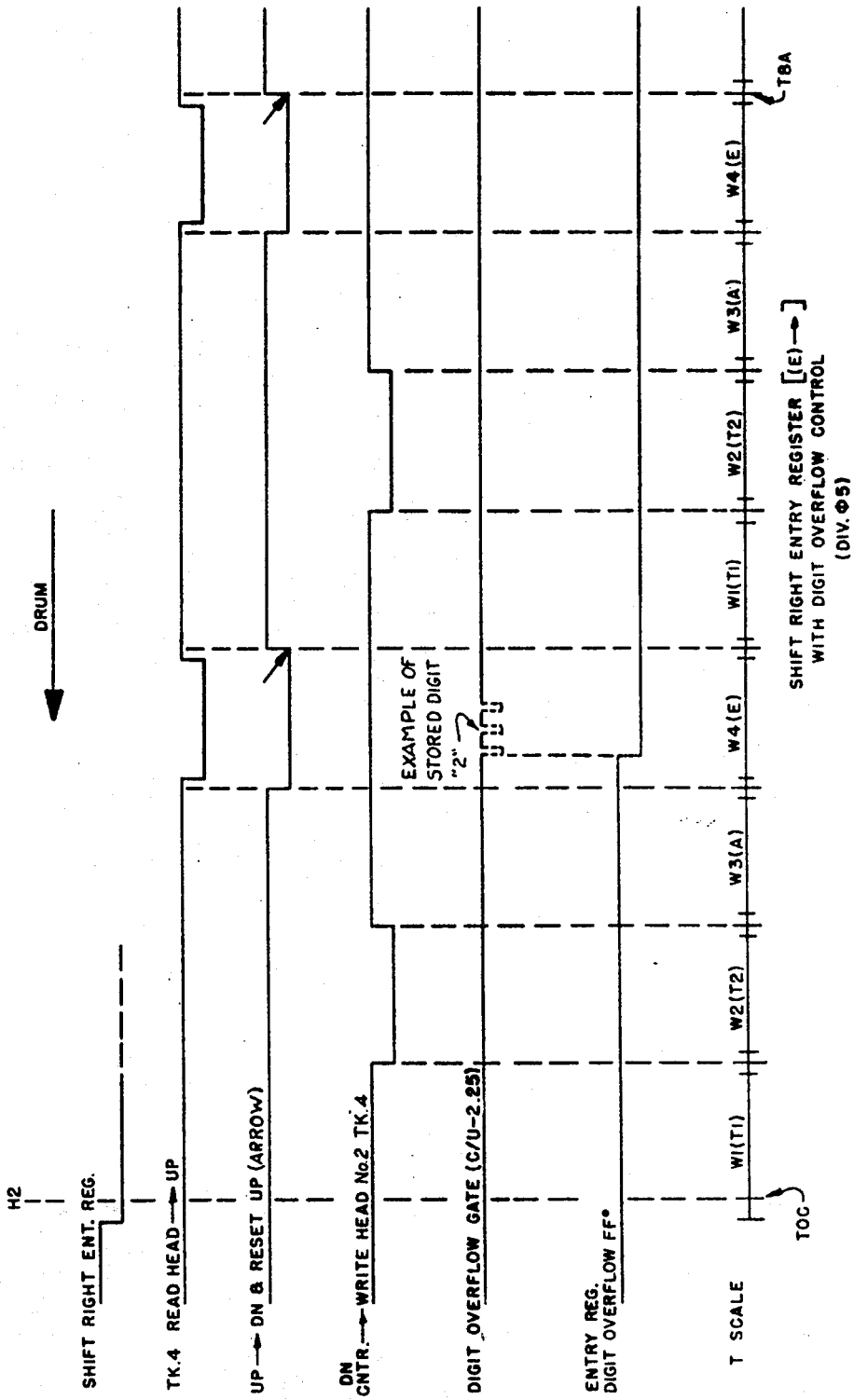
FIG_149

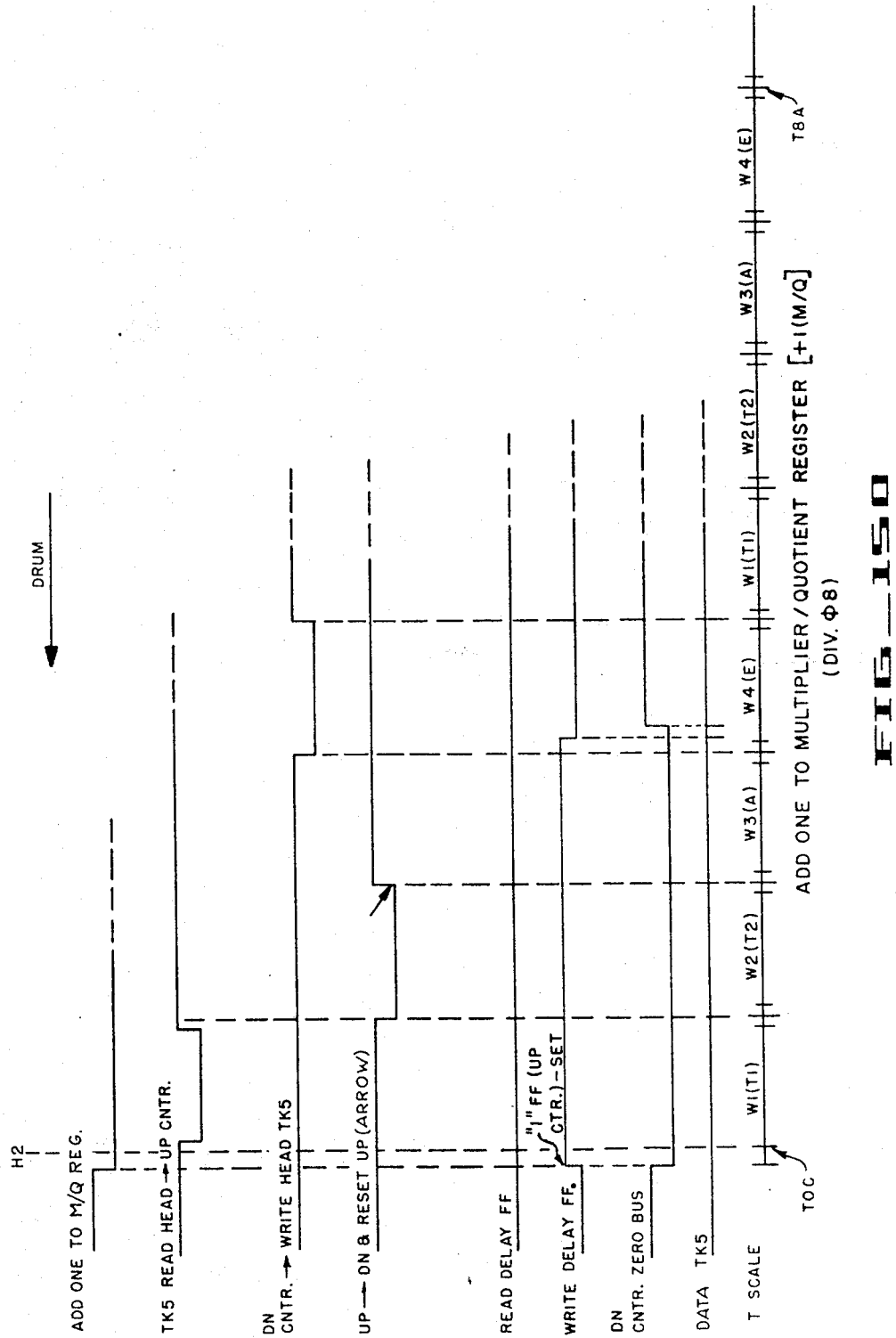

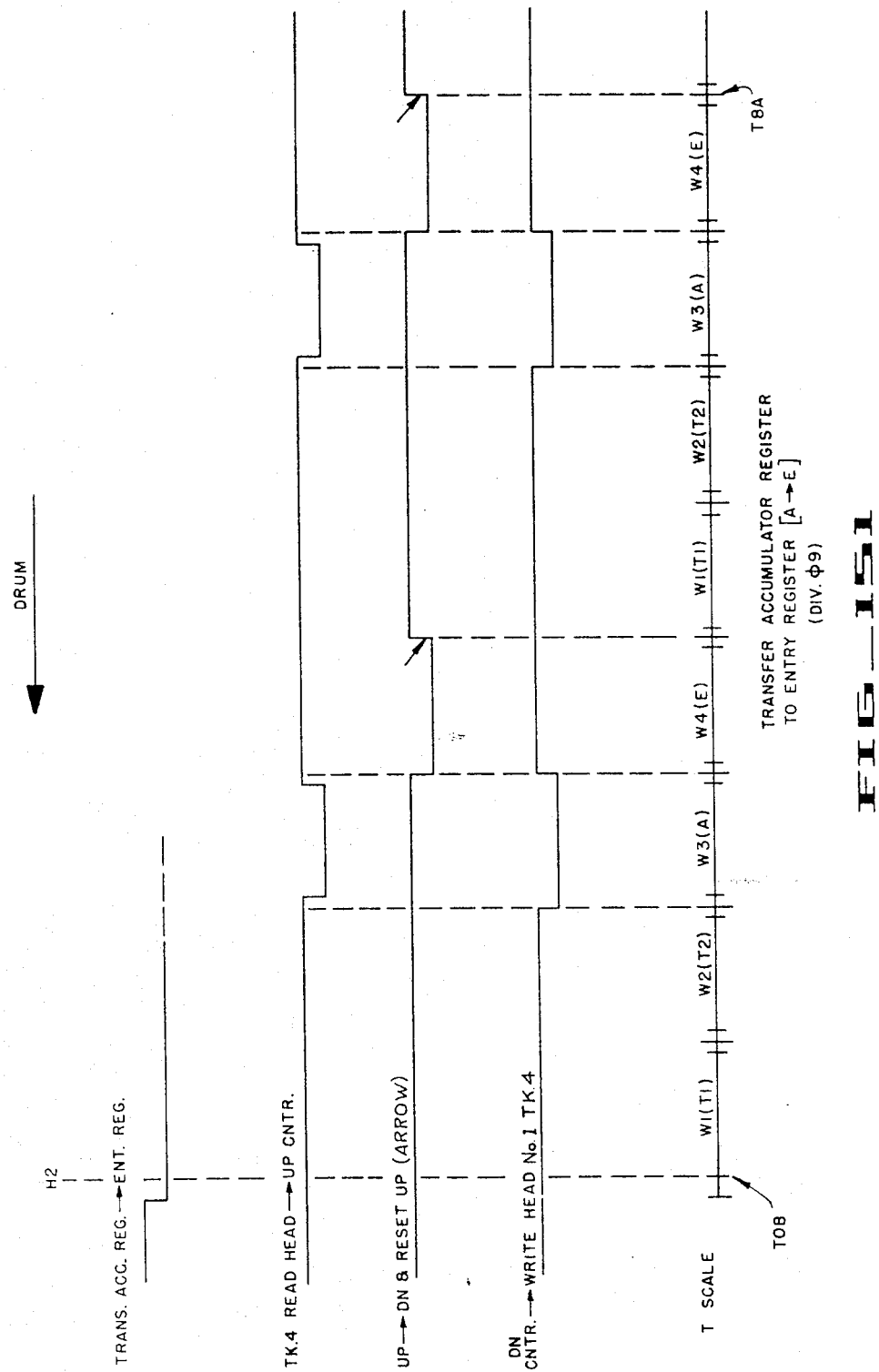

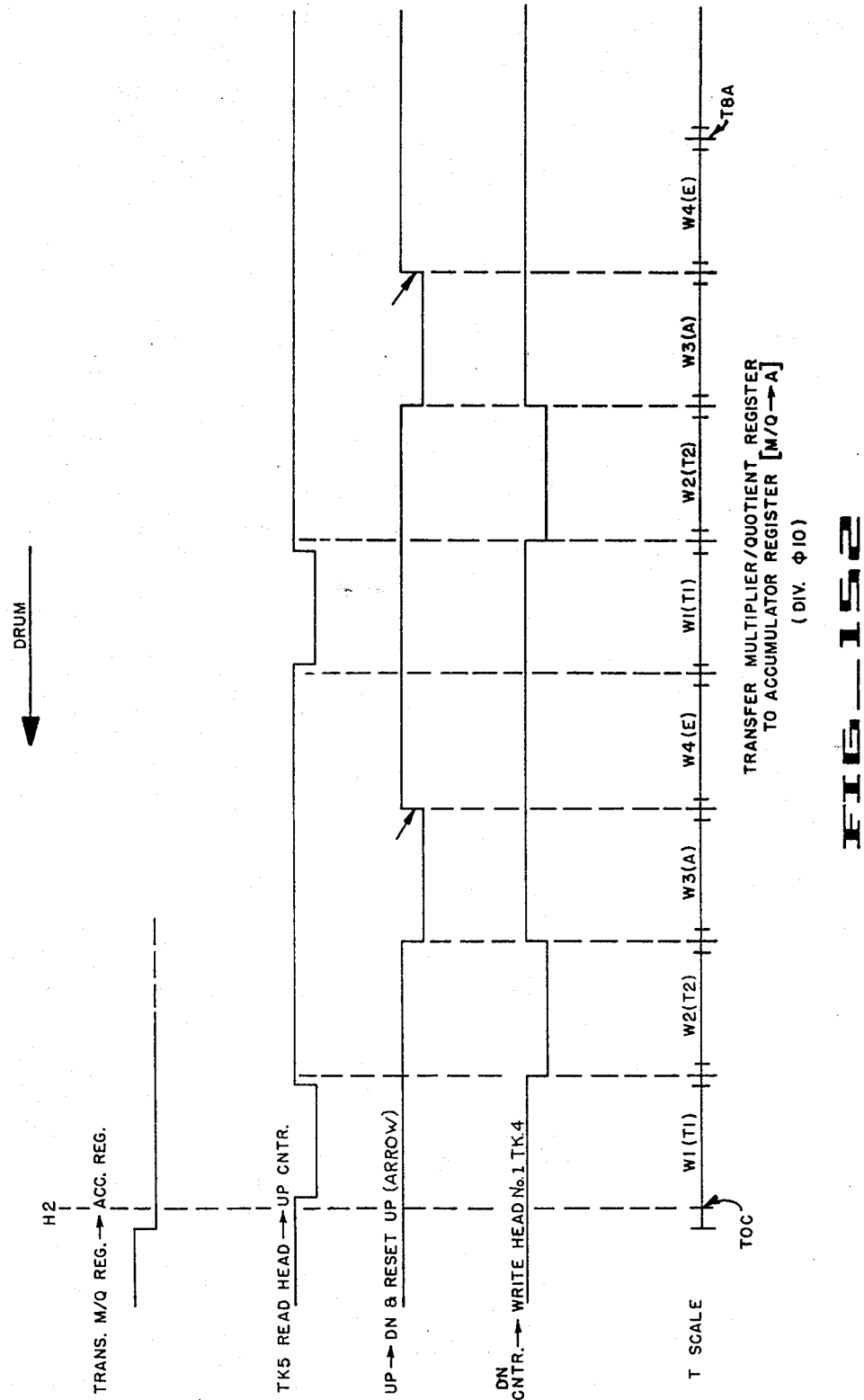
FIG_152

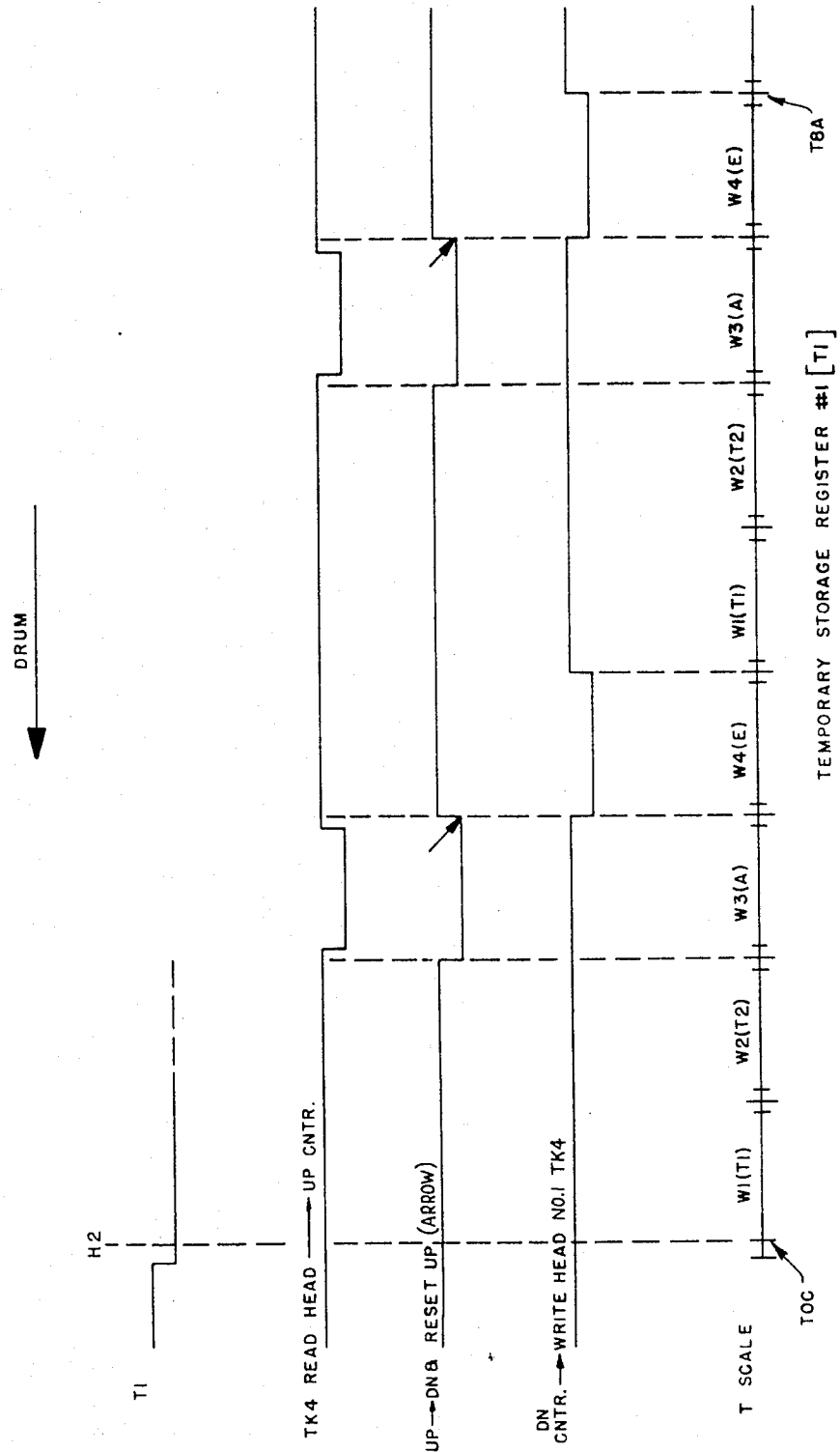
FIG_153

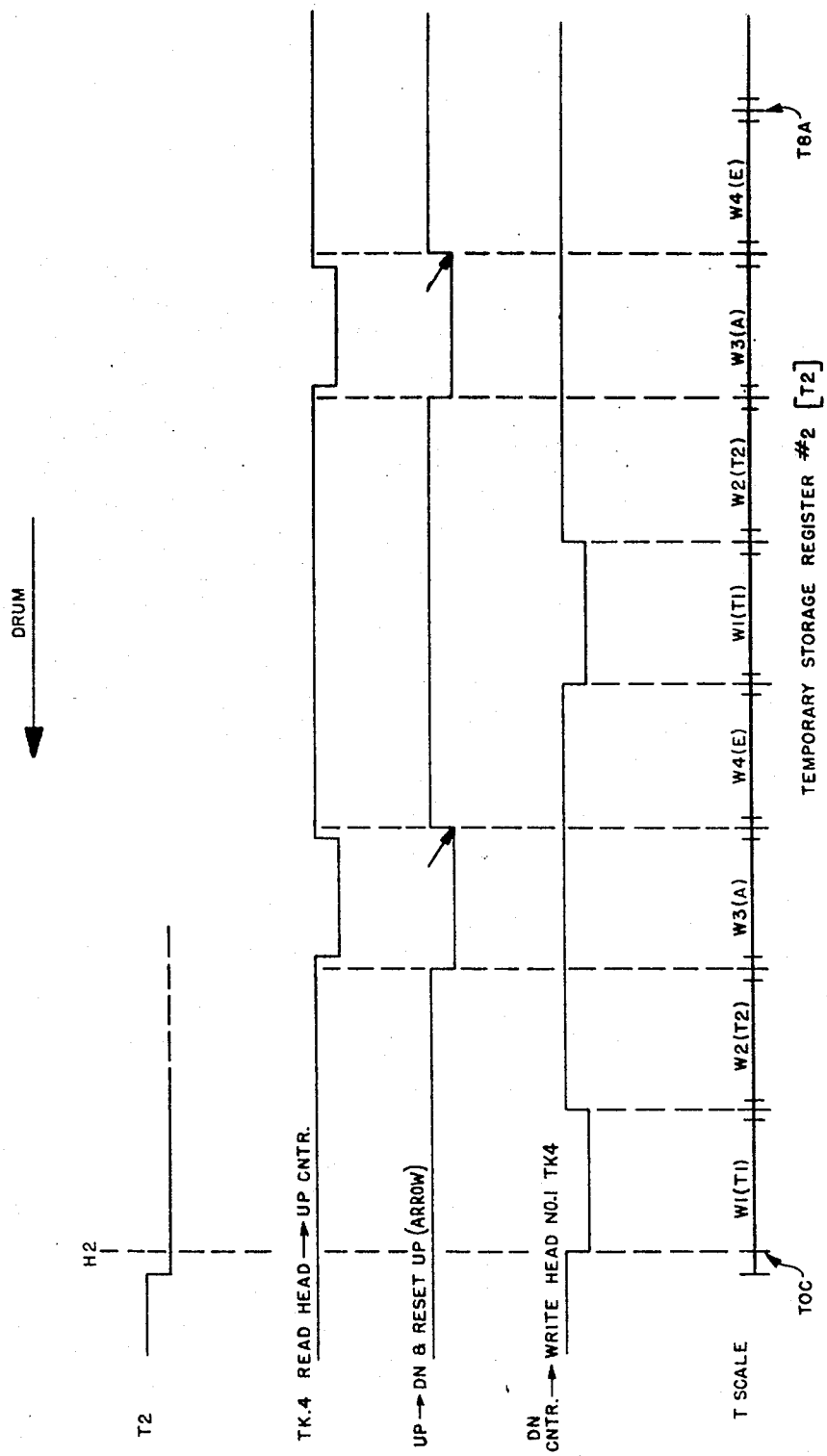

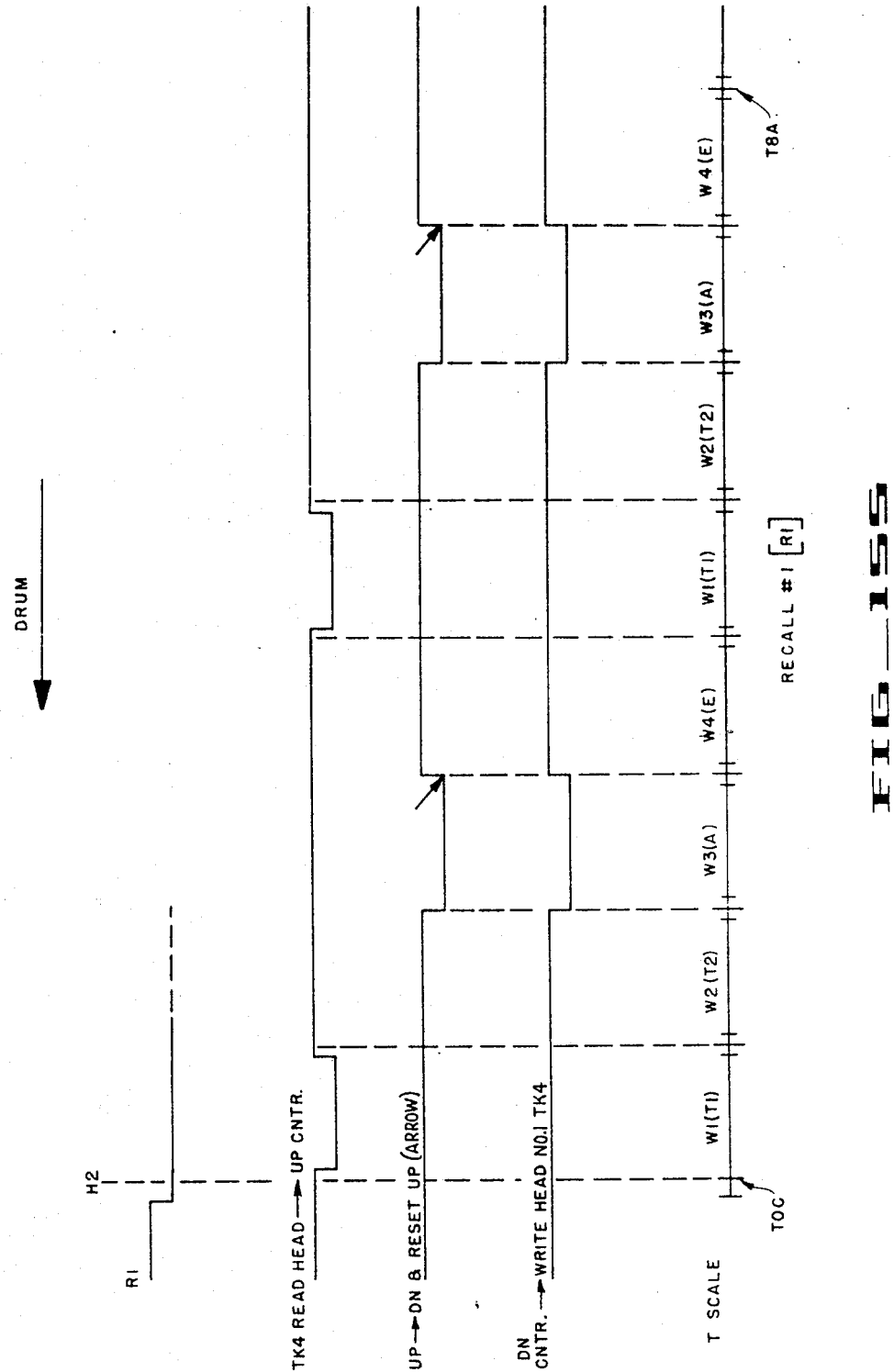
FIG_155

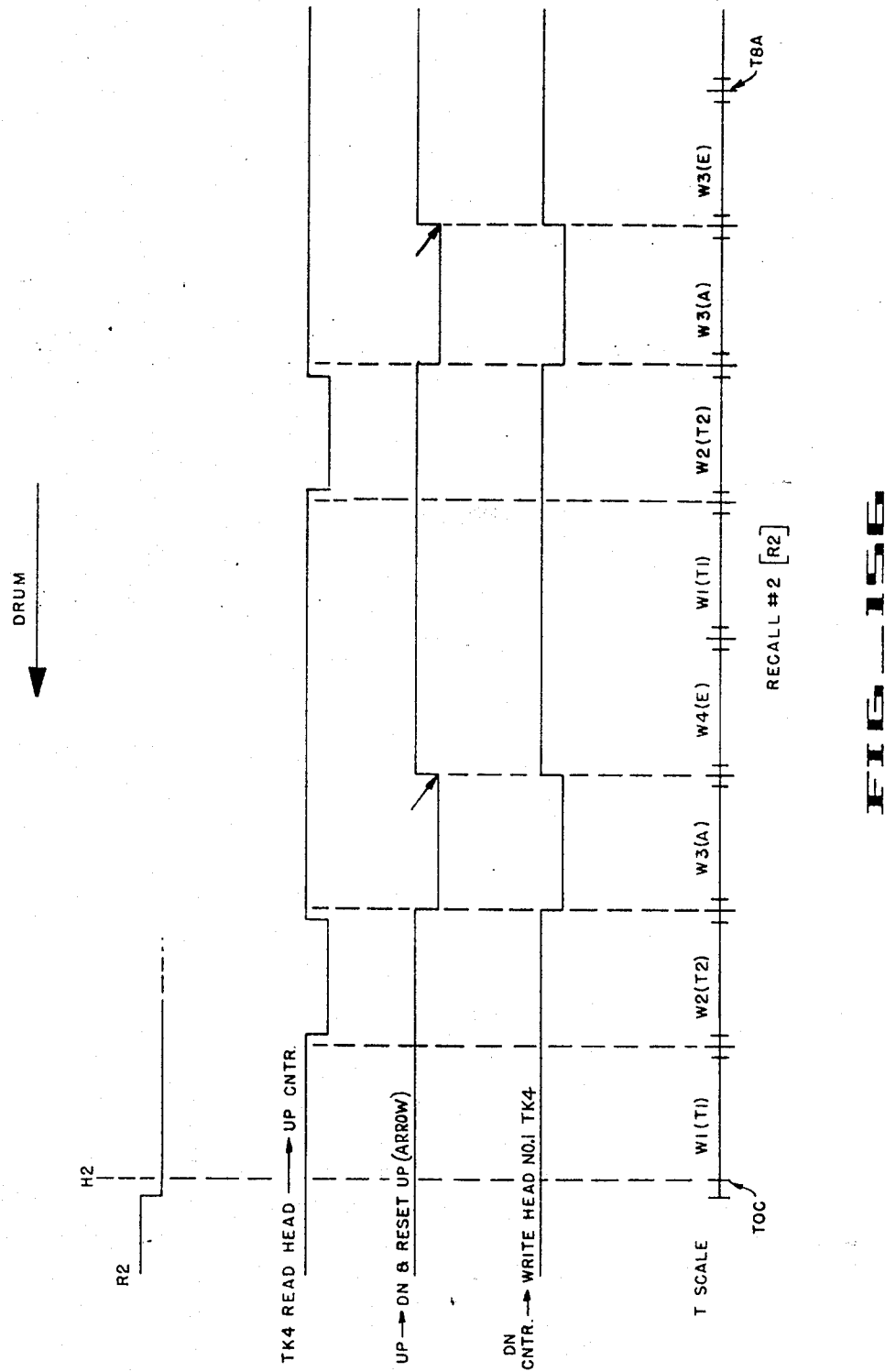

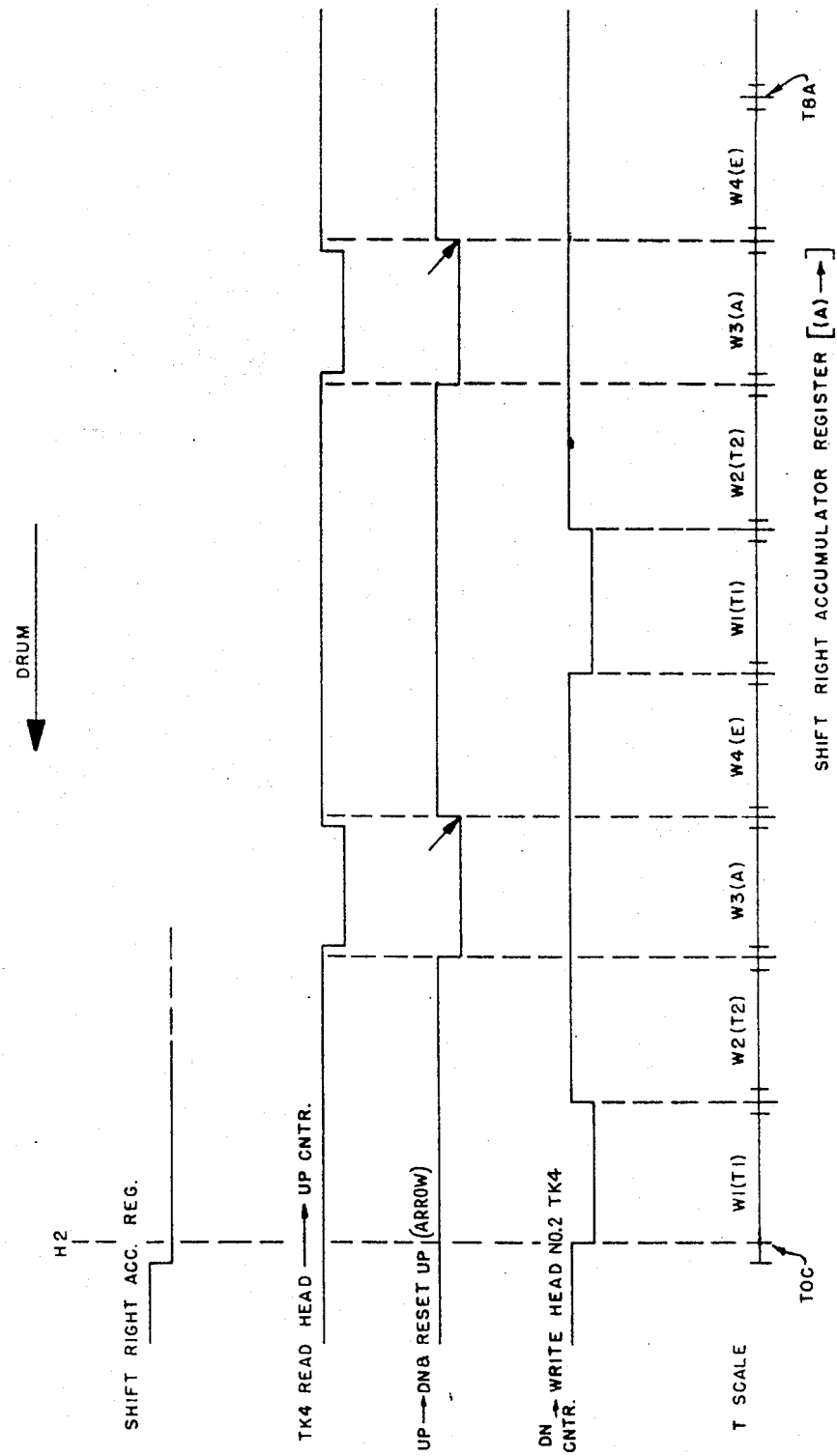

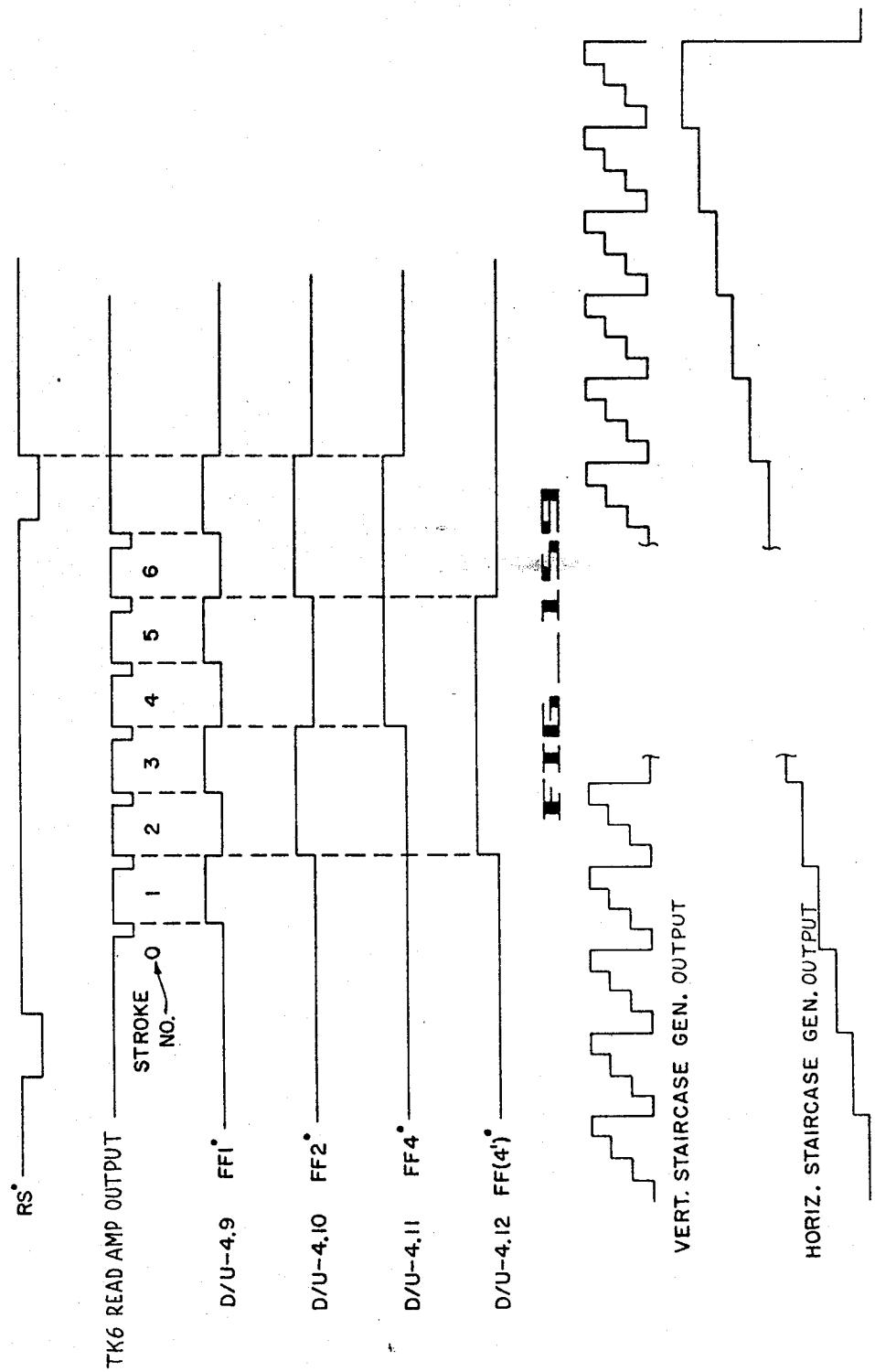

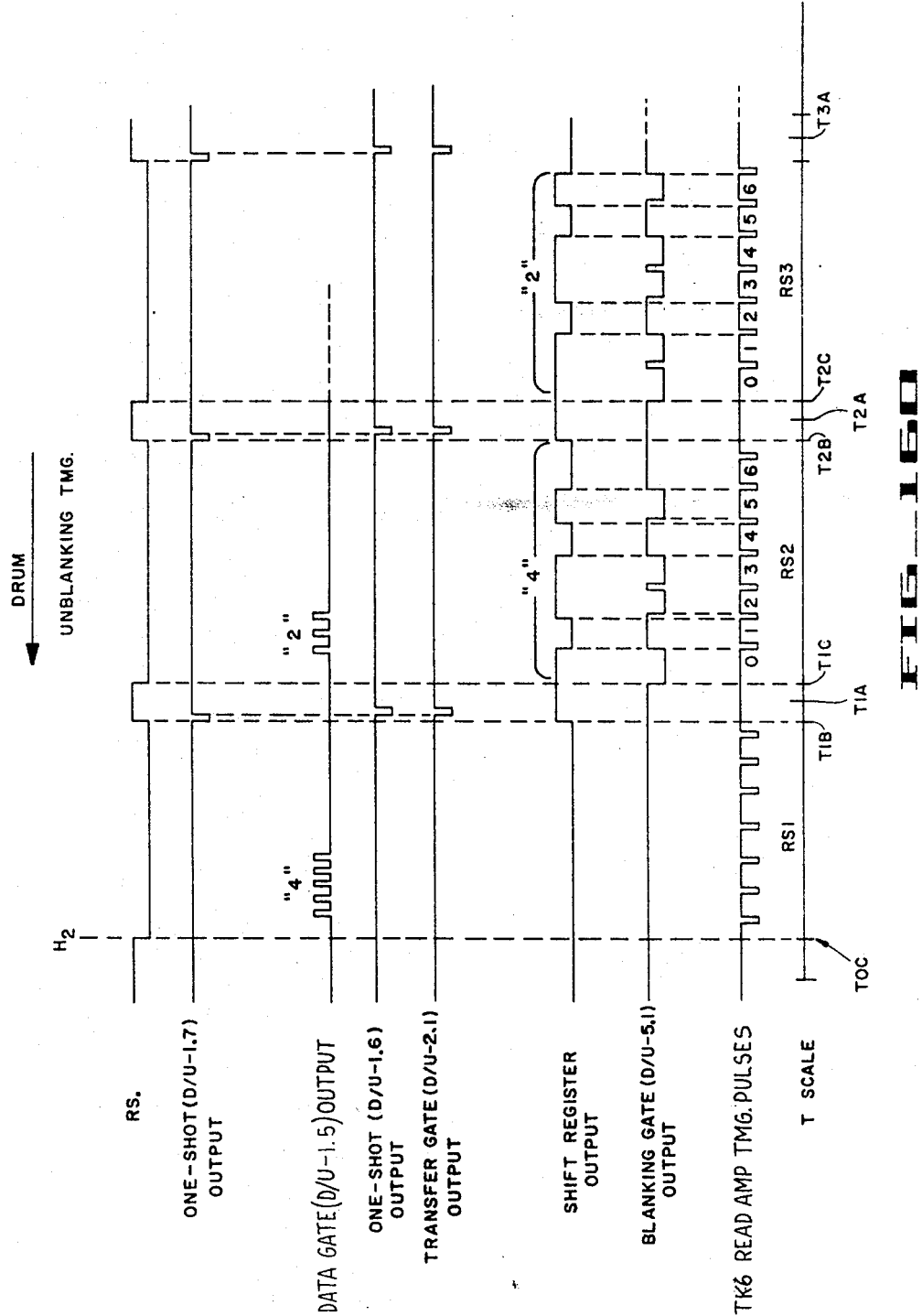

Oct. 21, 1969 R. A. RAGEN ET AL 3,474,238
ELECTRONIC CALCULATOR FOR PERFORMING RESTORING DECIMAL DIVISION
Original Filed Oct. 28, 1963 133 Sheets-Sheet 133

TYPICAL CHARACTER RASTER

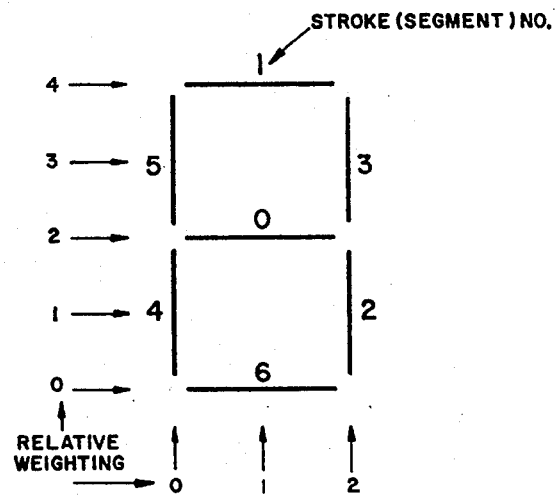

FIG_161

STROKE ORIGIN

| | | VERT. COORDINATE RELATIVE WEIGHTING (UNITS OF VOLTAGE) | | | | HORIZ. COORDINATE RELATIVE WEIGHTING (UNITS OF VOLTAGE) | | |
|---|---|---|---|---|---|---|---|---|
| FLIP–FLOP OUTPUTS → | | 1. | 4. | 2. | | 2. | 4. | |
| HORIZ. STROKE | 0 | − | + | + | 2 | − | + | 1 |
| | 1 | − | + | + | 4 | − | + | 1 |
| VERT. STROKE | 2 | − | + | − | 1 | + | + | 2 |
| | 3 | + | + | − | 3 | + | + | 2 |
| | 4 | − | − | + | 1 | − | − | 0 |
| | 5 | + | − | + | 3 | − | − | 0 |
| HORIZ. STROKE | 6 | − | − | − | 0 | + | + | 1 |
| STROKE NO. | | GENERATION OF STROKE WEIGHTING | | | | | | |

FIG_162

United States Patent Office 3,474,238
Patented Oct. 21, 1969

3,474,238
ELECTRONIC CALCULATOR FOR PERFORMING RESTORING DECIMAL DIVISION
Robert A. Ragen, Hayward, and Carl E. Herendeen, Fremont, Calif., assignors to Friden, Inc., a corporation of Delaware
Continuation of application Ser. No. 319,273, Oct. 28, 1963, now abandoned. This application Oct. 26, 1964, Ser. No. 406,328
Int. Cl. G06f 7/44
U.S. Cl. 235—160     9 Claims

ABSTRACT OF THE DISCLOSURE

An electronic keyboard controlled calculator is disclosed which is capable of performing restoring decimal division. In performing the division operation, means are provided for automatically aligning the divisor with the dividend. Counters and pulse trains are utilized in the arithmetic unit. A magnetic drum is the principle storage means, while a cathode ray tube is the output display means.

TABLE OF CONTENTS

| | Column |
|---|---|
| Introduction | 1 |
| Figures | 3 |
| Timing | 5 |
| H Timing Signals | 7 |
| RS Timing Signals | 8 |
| W Timing Signals | 8 |
| Conventions | 10 |
| Table of Locations of Certain Gates | 12 |
| Discussion of Logic Diagrams | 12 |
| Digit Entry | 12 |
| Common Digit Flip Flops | 12 |
| Write Flip Flop | 15 |
| Excess Bit | 15 |
| First Factor | 16 |
| Clear Entry | 18 |
| Add | 18 |
| Carry | 19 |
| Subtract | 20 |
| Borrow | 21 |
| Subtract Complement | 22 |
| Multiplication | 29 |
| Divide | 35 |
| Transfer to Temporary Storage No. 1 | 40 |
| Transfer to Temporary Storage No. 2 | 41 |
| Recall from Temporary Storage No. 1 | 41 |
| Recall from Temporary Storage No. 2 | 42 |
| H Delay | 42 |
| Shift Left Accumulator | 43 |
| Shift Right Accumulator | 45 |
| Clear Entry Key | 46 |
| Clear Key | 46 |
| Display | 47 |
| Sample Problem | 55 |
| Key Sheets and Conventions | 62 |
| Circuit Diagram Operation | 76 |
| Digit Entry | 76 |
| Number Entry Cycle Control Counter | 77 |
| Shift Left Entry | 77 |
| Excess Bit | 82 |
| Transfer From Entry to Accumulator | 84 |
| Addition | 90 |
| Carry | 92 |
| Transfer From Accumulator to Temporary Storage | 94 |
| Subtraction | 96 |
| Borrow | 97 |
| Recall From Temporary Storage to Entry | 98 |
| Multiplication | 99 |
| Subtract Complement | 107 |
| Division | 110 |
| Display Circuit | 119 |
| Shift Left Accumulator Key | 128 |
| Shift Right Accumulator Key | 132 |
| Clear Entry Key | 134 |
| Clear Key Operation | 134 |
| Clear Track 4 Key | 136 |
| Component Value List | 136 |
| Logic Diagram to Circuit Diagram Conversion | 142 |

This invention relates to calculators, and, more particularly, to calculators adapted for at least one mode of data entry, viz., manipulation of a keyboard, and is a continuation of our application Ser. No. 319,273, filed Oct. 28, 1963, now abandoned.

Further, this invention relates to calculators which employ electronic means for performing calculations, as distinguished from the gear trains, racks, electromagnetic relay banks, and similar devices, of the great bulk of the prior art.

Also, this invention relates to calculators which employ electronic means for displaying the data entered into the calculator resulting from the calculations performed, as distinguished from the mechanical dials, and the like, of the prior art.

More particularly yet, this invention relates to electronic calculating devices of the highly compact type, i.e., those ranging in size from the volume of a small stenographer's desk to the volume of a present-day, rotary, mechanical calculator, or even smaller, exclusive of auxiliary devices.

It has been broadly suggested in the prior art that a single, incrementable-type electronic counter be used in a large-scale, complex bookkeeping machine for the purpose of up-dating stored records.

The prior art has also disclosed a character display device in which the character is generated by selectively unblanking or turning on the stroke traces of a rectilinear-trace character raster in response to an unblanking signal selected by gating from among a set of N blanking signals, said blanking signals being continuously generated by N different blanking signal generators.

Those skilled in the art have long recognized the desirability of combining various principles and expedients which have evolved during the development of large-scale, automatic sequence controlled calculator technology, and automatic industrial control technology, into a compact, quiet, high-speed, keyboard-controlled calculating device which would perform at least the four basic artithmetic operations, addition, subtraction, multiplication, and division.

It has been generally recognized in the calculator art that it is highly desirable to provide, in keyboard-controlled calculating devices, retrievable storage means which are capable of storing a factor in response to the depression of a single key, and of retrieving the contents of this storage by depression of another single key. It has also been recognized that, desirably, such retrievable storage means should be "visible," rather than "blind," i.e., that it should be possible to see the contents of such storage displayed upon the face of the calculating device at all times.

In addition, it is generally recognized that magnetic storage drums are produced which are extremely compact and free from the problems usually associated with moving parts, and that it is desirable for these reasons, where possible, to incorporate such magnetic storage in electronic apparatus, e.g., in automatic sequence controlled calculating machines.

It is also well-known in the art that, where possible, the substitution of solid state components for space discharge devices is desirable for reasons of saving space, avoiding the problem of heat dissipation to a large degree, avoiding the use of filament voltage supplies, or ionizing supplies, and to provide a device which is generally rugged and free from excessive difficulties due to mechanical shock.

It is also desirable, in an electronic, keyboard-controlled storage drums are produced which are extremely compact calculating device, to provide a keyboard arrangement having a large number of "unconditional" function keys, i.e., keys, the operation of which is independent of the setting of other keys. This freedom from "conditional" function keys, results, of course, in a greater freedom from arbitrary rules of calculator operation such as are characteristic of devices of the prior art, and which have to be thoroughly learned before proficiency can be attained in the use of such prior art calculating devices. This freedom from arbitrary rules of operation results in lowering the cost of training clerical operators, and extends the usefulness of such an electronic calculating device to embrace a class of "casual" users, such as scientists and technicians.

It is also recognized as desirable in connection with the present invention to provide an external utilization device which can be directly connected to and controlled by the electronic calculator. Such utilization devices could comprise storage devices, printing devices, display devices, data transmitting devices, punching devices, etc.

It is also recognized as desirable in connection with the present invention to provide cathode ray display means capable of displaying the contents of a plurality of stores, in addition to current keyboard entry, or the result of a previously calculated step.

It is therefore an object of the present invention to provide a compact, electronic calculating device including, as its principal storage means, a magnetic storage drum.

Another object of the present invention is to provide an arithmetic unit in an electronic calculating device which is capable of arithmetically combining numerical factors emitted by a storage means in pulse-count or unitary, notation without the interposition of means for converting to a second form of notation Another object of the present invention is to provide a compact electronic calculating device, substantially all of the function keys of which are free from conditioning by other keys.

Another object of the present invention is to provide an electronic, keyboard-controlled calculating device having a multi-row, single-scan cathode ray tube display.

Another object of the present invention is to provide an arithmetic unit for a keyboard-controlled, electronic calculating device adapted to receive numerical data in the form of a pulse train expressing said data in pulse-count, or unitary, notation, and to transmit the result, or partial results, of arithmetically operating upon such data in the form of a pulse train in which said results, or partial results, are expressed in pulse-count, or unitary, notation.

Another object of the present invention is to provide an electronic calculator wherein a single basic group of electrical circuit elements provides a principal portion of the electrical circuitry utilized in all digit entry and function operations of the calculator.

Another object of the present invention is to provide an electronic calculator which is easily connected to a utilization device.

A further object of the present invention is to provide a single monosequenceable and contrasequenceable register which coact to perform at least a portion of all arithmetic and information shifting operations.

A further object of the present invention is to provide an excess bit code system whereby a decimal zero is represented by two different pulse code groupings.

A further object of the present invention is to provide an excess bit code system whereby a decimal zero is represented by a reproducible or a nonreproducible or suppressed zero code notation.

A further object of the invention is to provide a calculator wherein entered digital information is retained for further use in an entry register until a function operation is performed and then further digital information is entered into the calculator.

Other objects of the present invention will in part be obvious, and will in part appear hereinafter.

The present invention accordingly comprises the features of construction, combination of elements, and arrangement of parts, which will be exemplified in the construction hereinafter set forth, the scope of the instant invention being indicated in the claims.

For a fuller understanding of the nature and objects of the invention, reference should be had to the following detailed description, taken in connection with the accompanying drawings, which may be described as follows:

FIGURES

FIG. 1 is a perspective view of the calculator in accordance with the present invention.

FIG. 2 is a pictorial description of the output signals from track 1, track 2 and track 3 read head circuits of the magnetic drum including a reference scale designated T.

FIG. 3 is a pictorial description of track 1 of the magnetic drum.

FIGS. 4 and 5 are pictorial explanations of the definition of the signal time periods.

FIG. 6 is a pictorial description of the registers of tracks 4 and 5 of the magnetic drum and the relationship of the write and read heads therefor.

FIG. 7 is a description of the timing signals obtained from the timing circuits and the levels of these timing signals during the various time periods of operation.

FIG. 8 is a symbolic diagram of a flip flop as used in the logic diagram of FIGS. 14 to 44.

FIG. 9 is a description of symbols utilized in the description of FIGS. 14 to 44.

FIG. 10 is a symbolic diagram of a one shot as used in the logic diagram of FIGS. 14 to 44.

FIG. 11 is a block diagram of the principal units of the calculator in accordance with the present invention.

FIG. 12 is a description of the arrangement of FIGS. 14 to 44.

FIG. 13 is a description of the portions of FIG. 12 which comprise the principal units of the calculator according to FIG. 11.

FIGS. 14 to 44 comprise a logic diagram of the calculator in accordance with the present invention.

FIG. 45 is a symbolic diagram of a flip flop as used in the circuit diagram of FIGS. 79 to 134.

FIG. 46 is a symbolic diagram of a one shot as used in the circuit diagram of FIGS. 79 to 134.

FIG. 47 is a circuit diagram of a type I flip flop.

FIG. 48 is a symbolic diagram of a type I flip flop.

FIG. 49 is a circuit diagram of a type II flip flop.

FIG. 50 is a symbolic diagram of a type II flip flop.

FIG. 51 is a circuit diagram of a type III flip flop.

FIG. 52 is a symbolic diagram of a type III flip flop.

FIGS. 53 and 54 describe the circuit of certain one shots used in the circuit diagram of FIGS. 79 to 134.

FIG. 55 is a circuit diagram of a type I one shot.

FIG. 56 is a symbolic diagram of a type I one shot.

FIG. 57 is a circuit diagram of a type II one shot.

FIG. 58 is a symbolic diagram of a type II one shot.

FIG. 59 is a circuit diagram of a type III one shot.

FIG. 60 is a symbolic diagram of a type III one shot.

FIG. 61 is a circuit diagram of a type IV one shot.

FIG. 62 is a symbolic diagram of a type IV one shot.

FIG. 63 is a circuit diagram of a type V one shot.

FIG. 64 is a symbolic diagram of a type V one shot.

FIG. 65 is a circuit diagram of a type VI one shot.

FIG. 66 is a symbolic diagram of a type VI one shot.

FIGS. 67 and 68 describe the circuit of the inverters used in the circuit diagram of FIGS. 79 to 134.

FIGS. 69 and 70 describe the circuit of certain gating circuits used in the circuit diagram of FIGS. 79 to 134.

FIGS. 71 and 72 describe the key circuits used in the circuit diagram of FIGS. 79 to 134.

FIG. 73 is a circuit diagram of the read head circuit used in the circuit diagram of FIGS. 79 to 134.

FIG. 74 is a symbolic diagram of the read head circuit of FIG. 73.

FIG. 75 is a circuit diagram of the write head circuit used in the circuit diagram of FIGS. 79 to 134.

FIG. 76 is a symbolic diagram of the write head circuit of FIG. 75.

FIG. 77 is a circuit diagram of the vertical and horizontal deflection amplifiers used in the circuit diagram of FIGS. 79 to 134.

FIG. 78 is a symbolic diagram of the vertical and horizontal deflection amplifiers of FIG. 77.

FIGS. 79 to 134 comprise a circuit diagram of the calculator in accordance with the present invention.

FIG. 135 is a timing diagram of the digit entry operation.

FIG. 136 is a timing diagram of the first factor function.

FIG. 137 is a timing diagram of the add function.

FIG. 138 is a timing diagram of the subtract function.

FIGS. 139 and 140 are timing diagrams of the subtract-complement operation.

FIG. 141 is a diagram of the phase sequence of operations for the multiply function.

FIG. 142 is a timing diagram of the multiply phase 1 operation.

FIG. 143 is a timing diagram of the shift left accumulator key and multiply phase 2 operation.

FIG. 144 is a timing diagram of the multiply phase 3 and divide phase 6 operations.

Figure 145:
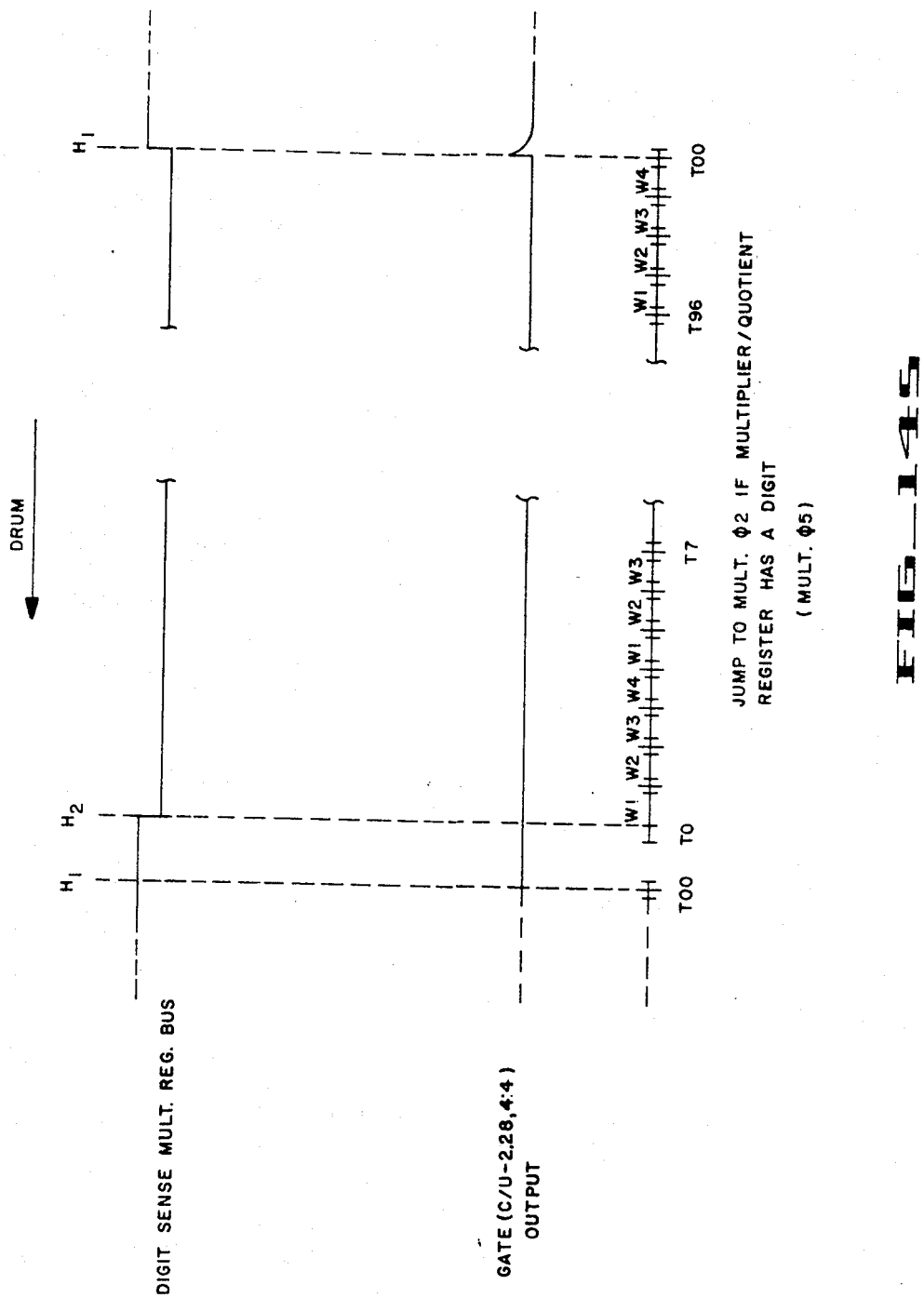

FIG. 145 is a timing diagram of the multiply phase 5 operation.

FIG. 146 is a diagram of the phase sequence of operations for the divide function.

FIG. 147 is a timing diagram of the divide phase 1 and phase 7 operations.

FIG. 148 is a timing diagram of the divide phase 3 operation.

FIG. 149 is a timing diagram of the divide phase 5 operation.

FIG. 150 is a timing diagram of the divide phase 8 operation.

FIG. 151 is a timing diagram of the divide phase 9 operation.

FIG. 152 is a timing diagram of the divide phase 10 operation.

FIG. 153 is a timing diagram of the transfer to temporary storage register No. 1 function.

FIG. 154 is a timing diagram of the transfer to temporary storage register No. 2 function.

FIG. 155 is a timing diagram of the recall from temporary storage register No. 1 function.

FIG. 156 is a timing diagram of the recall from temporary storage register No. 2 function.

FIG. 157 is a timing diagram of the shift right accumulator register function.

FIG. 158 is a timing diagram of the operation of the segment flip flops of the display unit and a description of the timing signals obtained by the magnetic drum track 6 read head circuit.

FIG. 159 is a pictorial description of the output signal of the vertical staircase generator and the horizontal staircase generator of the display unit.

FIG. 160 is a timing diagram of the unblanking circuitry of the display system.

FIG. 161 is a diagram of a typical character raster produced on the face of the cathode ray tube of the display unit.

FIG. 162 is a table of the weighting of the output signals of the segment flip flops of the display unit.

Referring first to FIG. 1, there is shown the complete calculator in accordance with the present invention, wherein digits may be entered into the calculator or functions may be performed in the calculator by the depression and release of one of the keys 2. The digit entry into the calculator or performance of a function by depression and release of one of the keys 2 is provided by means of the circuitry 3 which operates in conjunction with timing and storage tracks on a magnetic drum 4, the contents of the digits entered and the result obtained by operation of a function key being displayed on the display tube 1.

TIMING

Since the operation of a calculator is primarily dependent upon the timing therein, it is initially essential to understand the operation of the timing pulse generator system and subsequently, the timing required for the performance of each operation of the calculator. The basic timing signals utilized in the calculator in accordance with the present invention are obtained from magnetic tracks located on the drum 4 of FIG. 1.

Figure 2:
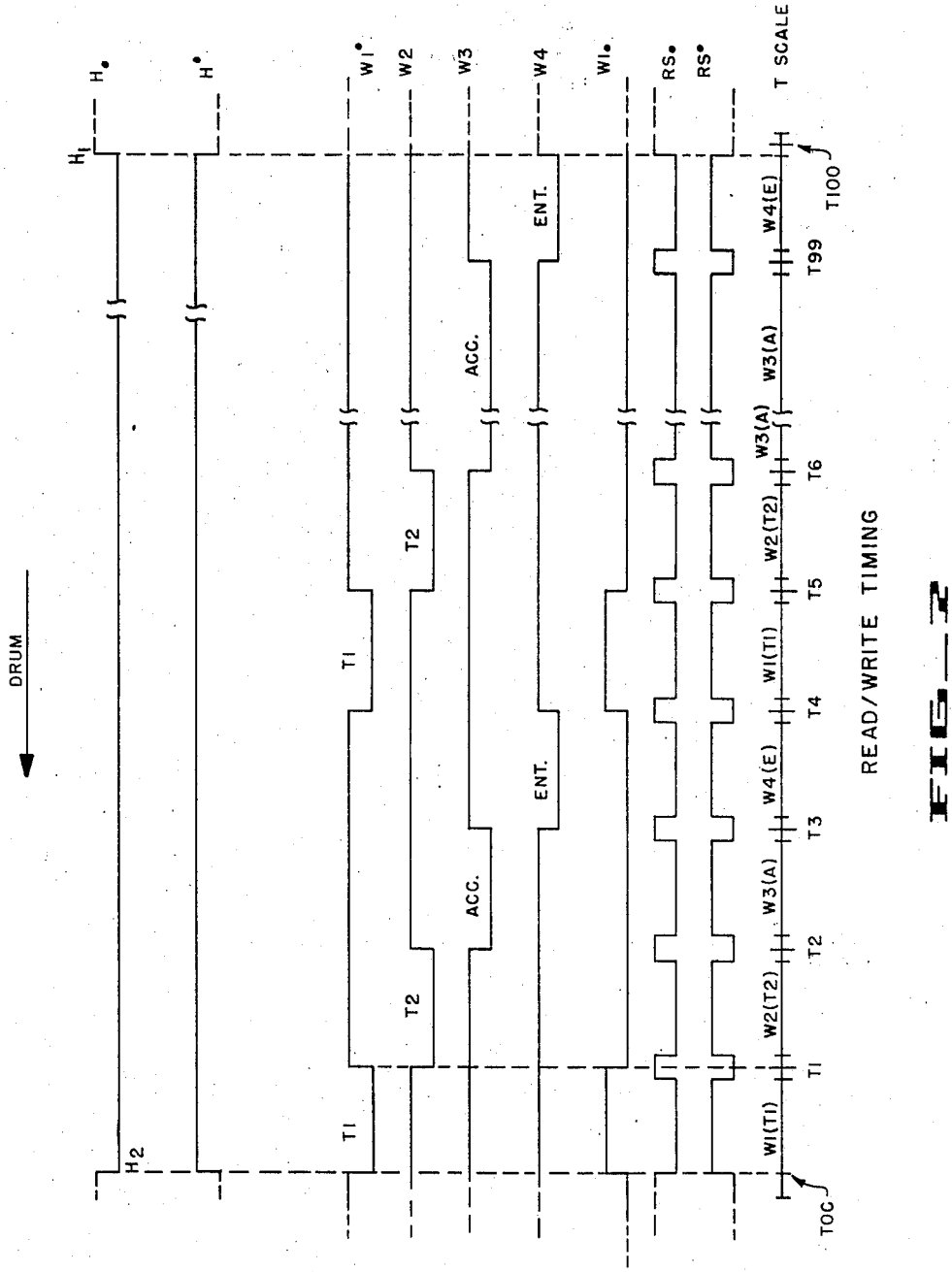

FIG. 2 sets forth the output of the read heads of tracks 1, 2 and 3 of the drum indicated as TK1, TK2 and TK3, respectively. It is assumed that the drum is rotating toward the left as indicated by the arrow in FIG. 3. Track 1 produces H pulses, track 2 produces R pulses and track 3 produces B pulses. Each pulse in FIG. 2 represents a change in the state of the magnetic material on the drum, this change being sensed by the reading heads associated with the drum to produce a bit pulse.

Track 3 produces bit pulses, these pulses being a continuous set of 1200 individual pulses, equally spaced from each other and continuing during the revolution of the magnetic drum between time T0C and T100B. Track 1 produces H pulses, these pulses comprising two individual pulses per revolution of the magnetic drum, these pulse bits being closely spaced on the drum as show in FIGURE 3. The short space of time between these H pulses lettered H1 and H2 is referred to as "dead time" since no operations of the calculator take place during this time period. Track 2 produces 101 equally spaced pairs of timing pulses positioned in time from T0B to T100C. These pulses are set forth in FIGURES 4 and 5 at the B and C times. It will be noted that B time occurs one half bit time prior to A time (the A times being equally spaced between B and C times) and the C time corresponding to the second bit of the R bit pair occurring one half bit time after an A time.

In summary, it can therefore be seen that in the operation of the drum, first an H1 pulse will appear, then there will be a short period of "dead time" when no operations occur. There will then be a first R pulse at time T0B (FIGURE 2), then, one bit later at T0C time, an H2 pulse and a second R pulse at time T0C. This is followed by 10 bit pulses occurring via track 3, these 10 bit pulses being labelled BIT No. 0 to BIT No. 9, and occurring in the time period from one bit time after the T0C time until one bit time prior to the next following T0B time. The above time periods are set forth on the exemplary time scale T of FIGURE 2. This sequence will continue for one hundred such pulse groups about the track until time T100B has been reached, whereupon an H1 pulse and an R pulse are received and then a "dead time" returns until the following R pulse which occurs one bit time prior to the next H2 pulse.

Referring now to FIGURE 6, the top track therein is labelled track 4 of the magnetic drum and includes a space marked H which corresponds to the space between position H1 and H2 of track 2 or the "dead time." This space is not restricted as to size. Immediately upon occurrence of the H2 signal, the following track space which corresponds to the portion of track 4 corresponding to times T0C to T1A of track T in FIGURE 2 is the area in which the least significant digit of a number to be stored in the temporary storage register No. 1 (T1) will be stored by the reading therein of a number of bits equal to the value of the number to be stored therein plus one "excess" bit. As shown, the number "3" (3 bits plus 1 "excess" bit) is stored therein. The portion of track T corresponding to the time period from time T1A to time T2A, corresponds to the portion of track 4 labelled T2, this portion of track 4 being similar to register T1 and being utilized as a second temporary storage register. The portion of track 4 corresponding to track T in time T3A is referred to as the accumulator (ACC) whereas the portion of track 4 corresponding to times T3A to T4A is referred to as the entry register (ENT). Each of track portions T1, T2, accumulator register and entry register indicated as 1/1, 1/2, 1/3 and 1/4, respectively, will store the least significant digit of a number to be stored in the entire temporary register T1 or T2, accumulator register or entry register. During subsequent times as referred to in the T scale of FIGURE 2, track 4 will continue to include space for more significant digits of the storage register T1, storage register T2, accumulator register and entry register until at time T100A there will have been 25 of each of these registers. The registers set forth in track 4, as indicated supra, are referred to by utilization of two numbers located in each register block, the top number of which indicates the significance of the digit and the bottom number of which indicates the particular register, i.e., temporary storage register T1 (1), temporary storage register T2 (2), accumulator register (3) or entry register (4).

Both read and write heads are positioned adjacent track 4 for reading therefrom or writing therein, there being two such write heads and one read head. These heads are so positioned that track 4 write head 2 is positioned 3 time periods T behind track 4 write head one, track 4 write head one being positioned 3 time periods T behind track 4 read head.

Track 5 includes the multiplier/quotient register. This register is utilized for storing either the multiplier during the multiplication operation or the quotient during a division operation. It will be noted by reference to track 5 in FIGURE 6 that the portions of track 5 positioned the same as the temporary storage register T1 of track 4, will be used as the multiplier/quotient register, the remainder of track 5 not being utilized in this operation. Tracsk 5 includes one write head and one read head, the read head being positioned ahead of the write head by 3 time periods T. Also, the track 5 write head is positioned at the same point with reference to track 5 as is track 4 write head one with reference to track 4, whereas track 5 read head is positioned in the same relative position with respect to track 5 as is the track 4 read head with respect to track 4. The positioning of the various registers and the write and read heads of tracks 4 and 5 are important for an understanding of the operation of the calculator in accordance with the present invention since this positioning is required for proper operation thereof with the specific circuitry set forth in the preferred embodiment of the invention described hereinafter.

Track 6 of the drum is utilized to provide proper timing signals for the display. This track is depicted in FIGURES 159 and 160. It is noted that track 6 provides seven bit pulses during each RS time period and during each T period. The circuitry for providing the above bits will be more fully discussed hereinafter.

Referring now to FIGURE 7, there is shown a timing diagram of the various timing signals provided by the timing circuitry of the calculator. The T scale indicates the various time periods from T0C to T100A, identical to the T scale of FIGURE 2.

H TIMING SIGNALS

It is noted that the timing circuitry provides two different types of H signals, these being, in one case, a shift from the positive voltage to the negative voltage level at time T0C, this signal remaining at the negative voltage level until time T100B when this signal returns to the positive voltage level. A second H signal shifts from the negative voltage level at time T0C to the positive voltage level and remains at the positive voltage level until time T100C when this signal then shifts back to the negative voltage level. These signals are indicated as H. and H· respectively. It will be noted that the portion of the drum between the H1 and the following H2 signal is the "dead time" indicated in FIGURE 3.

These H signals are provided by the circuitry set forth in FIGURE 97, wherein the H2 indication on track 1 on the drum is sensed by track 1 read head 138RA2 and transferred through inverters 138A2 and 138A3 to the input terminals of the H flip flop 138FF2. The input signal provided by inverter 138A2 is a positive-going pulse, also the signal provided by inverter 138A3 is a positive-going pulse. The positive-going pulse produced by inverter 138A2 is applied to the input of the flip flop 138FF2 and sets this flip flop, thereby providing negative level signals on the bus 138T4 and the H· bus 138T5. These signals will appear and will remain on buses 138T4 and 138T5 until the next following H2 pulse which will reset the H flip flop 138FF2 and invert the voltage levels on these buses.

RS TIMING SIGNALS

The negative voltage level RS, signal is obtained on bus 138T3 100 times during each revolution of the drum from time T0C to T1B, T1C to T2B . . . T99C to T100B as indicated in FIG. 7. It will be noted that the first RS. signal commences at time T0C by going, at that time, from a positive voltage level to a negative voltage level and remaining in this negative state for eleven bit time lengths or until the next following B time whereupon this signal reverts to its positive voltage level until the next following C time whereupon this signal again reverts to its negative level. This cycle commences for 100 T periods. Similarly, the positive voltage level RS· signal on bus 138T2 is identical in all respects to the RS. signal on bus 138T3 except that this signal goes from a negative voltage level to a positive voltage level at the identical times that the RS. signal on bus 138T3 goes from a positive voltage level to a negative voltage level and vice versa.

These RS signals are obtained by reading the signals from track 2 as shown in FIGURE 2 with the track 2 reading head 138RA1 (FIGURE 97), these signals being inverted in the inverter 138A1 and transferred to the complement inputs of the RS flip flop 138FF1. Upon reading the signal on track 2 corresponding to the B time of FIGURES 4 and 5, the RS flip flop 138FF1 is set by a positive-going voltage pulse thereto, and provides a negative voltage level output on RS· bus 138T2. Simultaneously, a positive voltage level signal is applied to the RS bus 138T1 through inverter 138A4. When the following bit pulse taken from track 2, which corresponds to the time C of FIGURES 4 and 5, is received from track 2 read head, this signal will provide a second positive-going voltage level and reset the RS flip flop. Thereby, the voltage levels on the RS buses 138T1 and 138T2 are inverted to provide significant voltage levels on these buses only in the time period between a C time and the following B time on the drum. It should be noted that the output on bus 138T3 will be identical to the output on bus 138T1 and, therefore, buses 138T3 and 138T1 are RS. buses.

W TIMING SIGNALS

The pulses on bus 138T3 (FIG. 97) are transferred through a diode 137D1 (FIG. 96), a time delay one shot 137N1, and the inverter 137A1 to the complement inputs of the RA flip flop 137FF2. This RA flip flop, along with the RB flip flop 137FF1 comprises a binary counter with four states. Therefore, for each positive going transition on the RS flip flop RS. bus there will be a corresponding change in state of the counter composed of the RA and RB flip flops. It can be seen that the RA and RB flip flops are initially both in the reset condition due to a positive going transition resetting signal applied on the H. bus 137T5. This positive voltage level on the bus 137T5 disables the one shot 137N1 through diode 137D3 by holding the one shot input at a positive voltage level.

It should be noted that the H flip flop 138FF2 and the RS flip flop 138FF1 are synchronized by the positive voltage level on bus 137T5, which level is applied through the diode 137D2 to the RS. bus 138T3, thereby setting the RS flip flop for time synchronization with the H flip flop. When the voltage level on the H bus 137T5 then goes to a negative voltage level, the RA, RB, and RS flip flops and the one shot 137N1 are unlocked.

Concurrently with the unlocking of the RS, RA and RB flip flops and the one shot 137N1, an input signal to the RS flip flop 138FF1 resets this flip flop, this resetting having no effect on the timing circuitry. At time T1B, a positive-going transition to the complement input of the RS flip flop 138FF1 sets this flip flop and provides a positive-going transition on the RS. output bus thereof. This positive-going transition is delayed in the one shot 137N1, the negative-going output therefrom being inverted by the inverter 137A1 and setting the RA flip flop 137FF2 at time T1A. At time period T1C, a positive-going transition to the input of the RS flip flop 138FF1 will reset this flip flop, producing a negative level on the RS. bus, this negative level having no effect as before. This procedure is continued for each T time to thereby step the counter composed of the RA and RB flip flops and provide various significant voltage levels on the buses 137T1 through 137T4 in accordance with the condition of the RA and RB flip flops. The voltage levels on these buses 137T1 through 137T4 will aid in providing the W timing signals as will be described hereinbelow.

The RA and RB signals are utilized to provide the W1, W2, W3 and W4 signals utilized throughout the calculator. As shown in FIGURE 7, the W1·signal remains in its positive voltage level condition except during times indicated as T1, i.e., the time period between times T0C and T1A, the time period between times T4A and T5A, . . . . It will be seen that this W1 pulse is provided at every fourth time period beginning with time T0C. It should also be noted that the W1 pulse extends in time from a first A time to the next succeeding A time as shown in FIGURE 4 for all time periods except T0. This extended range is provided by the time delay obtained in the one shot 137N1 since the RA and RB counter advances during the positive-going portion of the RS signal on bus 138T3.

Similarly, the W2 signal is provided between times T1A and T2A and during every fourth time period thereafter as indicated in FIGURE 7. Also, timing pulse W3 is obtained between time periods T2A and T3A and every fourth time period thereafter as indicated by ACC in FIGURE 7. Timing pulses W4 are obtained during the time period between time T3A and T4A and every fourth time period thereafter as indicated by ENT on FIGURE 7. The W1 pulses on bus 139R4 are identical to the W1 pulses on bus 139R5 with the exception that the W1 signals on bus 139R5 are obtained by passing the W1 signal on bus 139R4 through an inverter 139A8, thereby providing an inverted signal thereof.

It can now be seen that, in the time period between time T0C to T1A, the H bus 139L9 will have a significant negative voltage level signal thereon as explained supra and shown in FIGURE 7. Also, since at time T0C the RA and RB flip flops 137FF1 and 137FF2 will both be in the reset state and thereby provide a negative voltage level output signal on the RA bus 137T4 and 139L10 and a negative voltage level signal on the RB bus 137T3 and 139L11. Accordingly, at this time the AND gate 139G4 is enabled and provides a negative voltage output therefrom, this negative voltage level being inverted by inverter 139A4 to provide a positive voltage level output on the W1 bus 139R4. A negative voltage level signal is applied on the W1 bus 139R5 due to the inverter 139A8.

At time T1B, the RS flip flop is set and applies a delayed positive-going signal through the one shot 137N1 to set the RA flip flop 137FF2 at time T1A. Accordingly, at this time, the RB bus 137T3 will remain in its negative voltage condition, whereas, the RA bus 137T1 and 139L12 have now changed from a positive voltage level condition to a negative voltage level condition, thereby enabling the AND gate 139G5. The output of this AND gate is a negative voltage signal which is inverted by inverters 139A5 and 139A9 to provide a negative voltage level signal on the W2 bus in the time period between the times T1A to T2A.

The next positive-going transition on the bus 138T3, as before, will again change the count of the RA and RB flip flops by "1" and accordingly, the RA buses 137T4 and 139L10 as well as the RB buses 137T2 and 139L13 will be at a negative voltage level, thereby enabling the AND gate 139G6 to provide a negative output signal therefrom. This signal is inverted by inverters 139A6 and 139A10 to provide a negative voltage level signal on the W3 bus 139R7 during the time periods between time T2A to T3A.

At the next positive-going transition of the RS signal on bus 138T3, as before, the counter composed of flip flops 137FF2 and 137FF1 will again change in count by "1" and provide a negative voltage level signal on the buses 137T1, 139L12, 137T2 and 139L13, thereby enabling AND gate 139G7 and providing a negative voltage level output therefrom. This negative voltage level output is inverted by inverters 139A7 and 139A11 to provide a negative voltage level signal on the bus 139L8 during the time between times T3A to T4A.

Accordingly, as set forth supra, each of the timing signals required is obtained at its proper time by means of the above described circuitry as clearly set forth in FIGURE 7.

The preferred embodiment of the invention will first be described with reference to the logic diagrams thereof wherein the calculator is depicted by logical circuitry. These diagrams comprise FIGURES 14 to 44.

CONVENTIONS

It is necessary to understand certain conventions that are utilized herein. In FIGURE 8, e.g., is shown a symbolic diagram of a flip flop as used herein. This flip flop comprises terminals numbered from 10 to 21. The output terminals are numbered 11 and 12 and will be referred to as the FF· and FF. output terminals, respectively. As noted in the table, a binary "1" or set condition exists when a negative voltage level appears on the FF· output terminal (about —6 volts) and a positive voltage level appears at the FF. output terminal (about 0 volts). It follows that the flip flop will be set when the FF. output terminal thereof is at a positive voltage level and the FF· output terminal thereof is at a negative voltage level. At some places herein the FF· terminal is designated Q, or $a$; and the FF. terminal is designated non-Q, or $b$.

Referring now to FIGURE 9, taken in conjunction with FIGURE 8, there are noted the various symbols utilized and the definitions thereof. The transfer symbol is located on the flip flop of FIGURE 8 at terminals 14, 15 and 21 thereof. These three symbols always occur together and are defined to indicate that the impressing of a positive-going voltage transition on terminal 14 will transfer the voltages on the terminals 15 and 21 respectively to the terminals 12 and 11. That is, if a negative voltage is located on terminal 21 and a positive voltage is located on terminal 15, the application of a positive-going transition on terminal 14 will set the flip flop, or, in other words, place a negative voltage level at the FF· output terminal and a positive voltage level at the FF. output terminal thereof. Of course, if the flip flop is already set, no change will take place. Also, if the terminals 15 and 21 each have a negative signal thereon, no change will take place.

The symbol on terminals 17 and 20 indicates that the occurrence of a positive-going transition on one of the said terminals will reset the flip flop. The symbol on terminals 19 and 16 indicates that the occurrence of a positive-going transition on one of the said terminals will set the flip flop. The symbol on terminal 18 indicates that the occurrence of a positive-going transition on this terminal will complement the flip flop, i.e., change the state of the flip flop from the set condition to the reset condition or from the reset condition to the set condition, depending upon the initial condition of the flip flop.

The symbol on terminal 10 of the flip flop indicates that the placement of a positive voltage level thereon will reset the flip flop. The symbol on terminal 13 of the flip flop indicates that the placement of a positive voltage level thereon will set the flip flop. The above symbols and the other symbols set forth in FIG. 9 can be used to depict each of the operations of the flip flops utilized in the calculator to be described hereinafter.

The symbols set forth in FIGURE 9 are also utilized to depict the various gate circuits utilized in the present invention. The gate circuits set forth in FIGURES 14 to 44 are labelled as either AND gates or OR gates. The symbols at the input and output terminals are defined to indicate the type of input required to provide the designated output. That is, assuming an AND gate, if all input terminals thereto are provided with the neg. level symbol of FIGURE 9 and the output terminal thereof is provided with the pos. level symbol of FIGURE 9, the symbology states that if a negative level is applied to all input terminals of the gate (AND function) then a positive voltage level will appear at the output terminal thereof. If the gate under consideration is an OR gate having the pos. level symbol on the input terminals thereto and a neg. level symbol on the output terminal therefrom, the symbology states that if a positive level is applied to at least one of the input terminals thereof (OR function) then a negative voltage level will appear at the output terminal thereof. Other types of gate configurations utilizing the above-explained symbology can also be utilized.

The symbology set forth in FIGURE 9 can be used in many other situations. This symbology, when tied to a bus legend will indicate the signal required on that bus for the bus function to be performed. This symbology is also utilized at the input and output terminals of other types of circuits to indicate the output obtained when a particular input signal is applied thereto. This type of symbology is depicted in FIGURE 10, wherein a one shot is set forth, the symbology indicating that a positive-going transition signal at the input thereto will provide a positive level at the output terminal thereof.

It should be understood that various combinations of the signal symbols set forth in FIGURE 9 can be used, each symbol indicating the function defined thereby.

FIGURE 11 sets forth the various units required in the preferred embodiment of the invention. These units are defined as the Entry Unit (E/U) wherein digits are entered into the calculator and wherein the various functional operations of the calculator are initiated. The Control Unit (C/U) provides the timing for the calculator and includes the circuitry for directing the calculator to carry out the programs thereof in proper sequence. The Arithmetic Unit (A/U) provides the circuitry for carrying out the various arithmetic operations as directed by the control unit. The Memory Unit (M/U) provides the memory and the required circuitry for writing into and reading out from the storage drum. The Display Unit (D/U) includes the circuitry required to provide a display of the contents of the several storage elements.

FIGURE 12 indicates the manner of arrangement of FIGURES 14 to 44, the complete logic diagram of the preferred embodiment of the invention. It will be noted that each of FIGURES 14 to 44 includes therein a number as explained by the key of FIGURE 12, this number indicating the position of the particular figure.

FIGURE 13 indicates the particular units comprising the calculator as described by the FIGURES 14 to 44.

In the labelling of all buses, the numbers above the bus indicate bus number designation, whereas numbers below the bus indicate continuing portions of the bus. The numbers utilized to designate buses include a first number indicating the column, a number after the colon indicating the row, a letter (T, B, L, R) indicating the top, bottom, left or right side of the sheet and a number indicating the bus designation on the sheet. The first two numbers describe the row and column of a sheet of drawing as set forth in FIGURE 12. For example, a bus marked 5:2L3 describes a bus on FIGURE 32 (column 5, row 2 of FIGURE 12), entering this figure from the left and being the third bus down from the top.

With the above conventions and positioning of the figures in mind, the calculator will now be described in detail with respect to the logic diagram as set forth in FIGURES 14 to 44.

TABLE OF LOCATIONS OF CERTAIN GATES

| Function gate: | Column |
|---|---|
| E/U–3.5 | 16 |
| Read: | |
| A/U–3.1 | 13 |
| C/U–2.12 | 31 |
| C/U–3.1 | 18 |
| C/U–3.2 | 13 |
| C/U–3.7 | 13 |
| M/U–2.3 | 13 |
| M/U–2.5 | 13 |
| Up to down/reset up: | |
| C/U–5.1 | 34 |
| C/U–5.2 | 14 |
| C/U–5.3 | 17 |
| C/U–5.7 | 14 |
| Write: | |
| C/U–2.14 | 30 |
| C/U–4.1 | 17 |
| C/U–4.2 | 14 |
| C/U–4.7 | 15 |
| M/U–2.3 | 13 |
| A/U–3.1 | 13 |
| M/U–3.4 | 15 |
| M/U–3.5 | 15 |
| Miscellaneous: | |
| E/U–2.3 | 12 |
| A/U–3.2 | 21 |
| A/U–3.4 | 21 |
| C/U–2.7 | 29 |
| E/U–3.3 | 18 |
| M/U–4.5 | 19 |
| M/U–3.9 | 15 |
| M/U–4.4 | 16 |

DISCUSSION OF LOGIC DIAGRAMS

The various operations of the calculator which occur during digit entry therein or during some function operation thereof, are a result of one or more programmed operations of the calculator, many of these individual programmed operations being utilized in a plurality of the calculator functions. These programmed operations will now be discussed in conjunction with the digit entry and function operations of the calculator.

DIGIT ENTRY

A digit is entered into the calculator by the depression and release of one of the digit keys (FIGURE 14) marked from "0" to "9" in the digit signal generator E/U–1.0. This depression and release of a digit key, as indicated in the digit entry timing diagram (FIGURE 135), produces a positive-going pulse on the common key output line and sets the Common Digit No. 1 flip flop E/U2.2 (FIGURE 14). With the arrival of the first H pulse thereafter on bus 1:1B2, the Common Digit No. 2 flip flop is set, the Common Digit No. 1 flip flop remaining in its set condition. With the arrival of the next positive-going transition on the H bus 1:1B2, the Common Digit No. 1 flip flop is reset, thereby producing a positive-going transition upon the FF· output lead thereof and producing a positive-going transition on the reset and transfer bus to reset the digit signal generator which was previously set by the depression and release of a key therein.

The reset and transfer signal to the digit signal generator produces positive-going transitions on the digit entry buses 1:1R1 to 1:1R4 in accordance with the digital value of the key previously depressed and released; (i.e., depression of the "7" key would provide a positive-going transition on the X1, X2 and X4 digit entry buses labelled 1:1R1, 1:1R2 and 1:1R3, there being no positive-going transition on the X8 digit entry bus 1:1R4). These positive-going transition pulses are transferred along the respective digit entry buses to the up counter (FIGURE 27), thereby setting the up counter to indicate the digital value of the key originally depressed and released in the digit signal generator.

COMMON DIGIT FLIP FLOPS

Gate E/U–2.3

At this same time (denoted as H2 on the digit entry timing diagram FIGURE 135), a shift left entry signal is generated as follows:

The Common Digit No. 1 flip flop being reset at this time will have a negative voltage level on its FF. output lead, whereas the Common Digit No. 2 flip flop will have a negative voltage level on its FF· output lead. The occurrence of these two signals at the input of the AND gate E/U–2.3 will produce a positive level signal at the output thereof and on the bus labelled shift left entry (1:1R5).

Read

The positive voltage level signal on the shift left entry bus 1:1R5 is also transferred to bus 3:1L13, this bus being one of the input terminals of the OR gate C/U–3.2.

Gate C/U–3.2

This positive voltage level on the input terminal of OR gate C/U–3.2 enables this gate and provides a negative voltage level at the output thereof, this voltage level being applied to one of the input terminals of the AND gate C/U–3.6. When a negative voltage level appears on the W4 bus 3:1L12 concurrently with the negative voltage level output from OR gate C/U–3.2, AND gate C/U–3.6 is enabled and provides a negative output signal thereat, this negative level being applied to one of the input terminals of the OR gate C/U–3.7.

Gate C/U–3.7

The negative voltage level at the input of OR gate C/U–3.7 enables this gate and provides a positive voltage level output thereat, this positive voltage level being inverted by the inverter C/U–3.8 to provide a negative voltage level on the read bus 3:1R1.

Gate M/U–2.3

The occurrence of a negative voltage level on the read bus 3:1R1 will provide a negative voltage level on the read bus 5:2L3, one input of AND gate M/U–2.3. When a concurrent negative signal level appears on the RS bus 5:2L4, bit pulses appearing at the output of the read from track 4 head M/U–2.1 will pass through the now enabled AND gate M/U–2.3 and appear as positive voltage levels at the output thereof.

Shape and invert M/U–2.5

These positive voltage levels will then be transferred to the input of the shape and invert circuit M/U–2.5 to provide negative voltage levels at the output thereof on the data from storage bus 5:2R4.

These negative voltage level signals on the data from storage bus are applied to the data from storage bus 6:2L3 input of the AND gate A/U–3.1 and also to the input data from storage bus 4:2L7 of the read delay flip flop M/U–4.5.

Gate A/U–3.1

Since at this time, the enable borrow flip flop gate bus 6:2L1 is at a negative voltage level and the read delay FF· bus 6:2L2 is at this time at a positive voltage level, the read delay flip flop (FIGURE 28) being reset at this time, the AND gate A/U–3.1 will not be enabled. The first bit from the data storage track will, therefore, not be transferred through the AND gate A/U–3.1 due to this positive input signal on the input lead labelled read delay FF· bus 6:2L2. Instead, the positive-going edge of this first bit signal will set the read delay flip flop M/U–4.5 (FIGURE 28), thereby causing a negative signal level to appear on the output lead thereof labelled read delay FF· 4:2R2 and enable AND gate A/U–3.1. Accordingly, a positive voltage level appears on the output terminal of this gate at the advance up counter and reset borrow flip flop bus 6:2R1, the data from storage bus 6:2L3 continuing to transfer positive pulses along the bus 6:2R1. The transfer of pulses along the advance up counter and reset borrow flip flop bus 6:2R1 causes the digits in track 4 to be counted into the up counter along the bus 4:1L12 and to reset the borrow flip flop (if the borrow flip flop is set) along the bus 5:1L7.

Up to down and reset up

The up to down and reset up counter transfer signal is developed as follows:

The positive voltage level on the shift left entry bus 1:1R5 will also appear on the bus 3:3L12, this bus being the input to OR gate C/U–5.2 (FIGURE 25).

Gate C/U–5.2

The positive voltage level at an input terminal of OR gate C/U–5.2 enables this OR gate and provides a negative voltage level output therefrom at the input to AND gate C/U–5.5. When the W3 signal on bus 3:3L4 is at a negative voltage level, AND gate C/U–5.5 is enabled and provides a negative output level thereat, this negative level being applied to one of the input terminals of the OR gate C/U–5.7.

Gate C/U–5.7

The negative voltage level on one of the input terminals of OR gate C/U–5.7 enables this gate and provides a positive voltage level output therefrom. This positive voltage level is inverted by the inverter C/U–5.8 and provides a negative voltage level on the up to down and reset up bus 3:3R1. This negative voltage level is applied to the up to down and reset up bus 5:1L8, this bus being the input of a one shot A/U–6.2 (FIGURE 31). The signal on this bus at this time does not constitute a significant level, however, and it is not until the end of the W3 time period that a significant signal is developed, namely, the positive-going transition from the negative voltage level to the positive voltage level as shown in the arrow in FIGURE 135.

At the end of W3 time, the AND gate C/U–5.5 (FIGURE 25) is disenabled and provides a positive voltage level output thereat, this positive voltage level disenabling OR gate C/U–5.7 and providing a negative-going voltage level at the output thereof. This change from a positive voltage level to a negative voltage level at the output of OR gate C/U–5.7 therefore provides a positive-going transition at the output of inverter C/U–5.8 and to the one shot A/U–6.2 (FIGURE 31). The output of the one shot is transferred to the up to down and reset up network A/U–6.1 and produces a positive output signal on the up to down and reset up bus (5:1R6).

The positive up to down and reset up signal on bus 5:1R6 is transferred to the up to down and reset up bus 6:1L11 and thereby to an input of the down counter A/U–2.1 (FIGURE 35). This input signal to the down counter causes a transfer of information in the up counter to the down counter.

At the trailing edge of W3 time, as discussed above, the positive-going transition on the up to down and reset up bus 5:1R6 is applied to the up counter A/U–1.1 (FIGURE 27) along the bus 4:1L11, thereby resetting the up counter.

Also, at the end of W3 time the up to down and reset up network (A/U–6.1, FIG. 31) will produce a positive going transition signal at the read delay reset output (5:1R5). This positive going transition signal is applied to the read delay FF· output (4:2R2) of the read delay flip flop (M/U–4.5, FIG. 28) thus forcing the read delay flip flop to a reset condition. Also, this positive going transition signal (5:1R5) is applied to a set input of the write delay flip flop (M/U–4.4, FIG. 28) and thereby setting the write delay flip flop.

Write

The positive signal level appearing at the output of AND gate E/U–2.3 (FIGURE 14), as mentioned supra in the discussion of the common digit flip flops will appear on the shift left entry register bus 1:1R5 and also at the shift left entry register bus 3:2L15 of the OR gate C/U–4.2 (FIGURE 24).

Gate C/U–4.2

As a result of this positive input signal level to OR gate C/U–4.2 a negative output signal level is produced therefrom and appears on one input of the AND gate C/U–4.6 When a concurrent W3 signal appears on the W3 bus 3:2L17, the AND gate C/U–4.6 will be enabled and a negative voltage level signal will appear on the output thereof and simultaneously at one input terminal of the OR gate C/U–4.7.

Gate C/U–4.7

The negative voltage level signal at an input terminal of the OR gate C/U–4.7 will enable this gate and provide a positive voltage level signal at the output thereof on the write bus 3:2R1. This positive voltage level on the write bus 3:2R1 is transferred to the write bus 4:3L5, an input terminal of the OR gate M/U–3.4.

Gate M/U–3.4

The appearance of a positive voltage level on one of the input terminals of OR gate M/U–3.4 provides a negative voltage level at the output thereof, this negative level being applied to one of the input terminals of the AND gate M/U–3.5.

Gate M/U–3.5

The input terminal 4:3L7 of AND gate M/U–3.5 is connected to the down counter zero bus 6:1B2. The down counter zero bus is coupled to each of the elements of the down counter A/U–2.1 and provides a positive voltage level thereon when the down counter contains a zero count, this bus having a negative voltage level thereon at all other times. It can be seen that, when the down counter does contain a count, a negative voltage level will be provided on the down counter zero bus and, thereby, a negative voltage level is applied to the bus 4:3L7 of AND gate M/U–3.5. The concurrence of these negative voltage levels at the input of AND gate M/U–3.5 will, concurrently with bit pulses obtained from the track 3 read head M/U–3.6, provide a positive-going voltage level at the output thereof. It therefore follows that, for each bit read from track 3 at this time, the AND gate M/U–3.5 will be enabled and thereby provide a positive-going voltage transition at the output thereof.

These bits, read from track 3, will continue to be read through the AND gate M/U–3.5 until the down counter A/U–2.1 has been counted down to zero (to be described hereinafter), the down counter zero bus at this time shifting from a negative voltage level to a positive voltage level and, thereby, disenabling the AND gate M/U–3.5.

WRITE FLIP FLOP M/U–3.9

These positive-going voltage transitions are applied to the complement or toggle input of the write flip flop M/U–3.9, causing this flip flop to change state with each positive-going input voltage transition thereto. As a result, the FF· and FF. output leads of the write flip flop will also change in polarity in response to each of these input signals, the output signals from the write flip flop appearing on buses 4:3R3 and 4:3R4 being applied, respectively, to buses 5:3L4 and 5:3L6. These latter buses provide the input for one terminal of each of AND gates M/U–3.13 and M/U–3.14.

Concurrently with these voltage levels at the output terminals of the write flip flop, the write bus 4:3L5 will provide a positive voltage level to the inverter M/U–3.3 to provide a negative voltage level on the write bus 4:3R2. This negative voltage level is applied to bus 5:3L5, this bus being the second input of each of the AND gates M/U–3.13 and M/U–3.14. The concurrence of these input signals to these AND gates (the WRITE and WRITE FF signals) will alternately enable and disenable these gates, thereby causing an alternating input of signals to the write track 4 head No. 1 (M/U–3.18) (FIGURE 33), thereby causing the number stored in the down counter to be written onto track 4. It should be noted at this point that the number of bits to be stored on track 4 will include an "excess" bit, i.e., one bit more than the value of the count read out of the down counter. The manner in which the excess bit is obtained will be described hereinafter.

EXCESS BIT

When the Common Digit flip flop No. 1 provides a positive-going transition at the FF· output terminal thereof, the read delay flip flop M/U–4.5 (FIGURE 28) is set by the Common Digit flip flop No. 1 output signal (positive-going transition). This signal is applied along the Common Digit No. 1 bus 1:1B1 to the Common Digit bus 4:2L8 and thereby sets the read delay flip flop M/U–4.5.

Gate M/U–4.4

Concurrently, with the complementing of the write flip flop M/U–3.9, these same positive voltage level signals from AND gate M/U–3.5 (FIGURE 29) are transferred to the input of the shape and invert circuit M/U–3.10, causing a negative output level to be developed on the reset write delay FF bus 4:3R5. The trailing edge of this pulse will be positive-going when the AND gate M/U–3.5 is disenabled and will reset the write delay flip flop M/U–4.4, causing a negative signal level to appear at the FF. output 4:2R1 labelled "Write Delay FF." of this flip flop. This negative voltage level is transferred to the write delay flip flop FF. bus 6:2L6, this bus being one input of the AND gate A/U–3.3. The second bit from the track 3 read head, which passes via AND gate M/U–3.5 and shape and invert circuit M/U–3.10, appearing at the advance down counter AND gate A/U–3.3 (FIGURE 36) together with the negative signal level on the write delay FF. bus 6:2L6 will cause a positive voltage level to appear at the output of this AND gate, thereby debiting the down counter by one count by a positive transition on bus 6:2R2. The down counter will be similarly debited for all following bits from the track 3 read head which are applied along the advance down counter bus 6:2R2 to the advance down counter bus 6:1L9. In this manner, there is a one bit delay provided prior to commencement of counting down or advancing the down counter, thereby providing the "excess" bit on track 4.

FIRST FACTOR

The first factor operation is performed to transfer a number stored in the entry register into the accumulator register. The timing diagram for this operation is shown in FIGURE 136. This operation is initiated by depressing the FFA key of the function signal generator E/U–4.1. When the FFA key is released, a positive output signal appears on the FFA bus 1:3R9. This positive signal is transferred to the input lead of OR gate E/U–3.5 via FFA bus 1:3T7 and bus 1:2B7.

Gate E/U–3.5

This positive input signal to OR gate E/U–3.5 causes a negative signal level to appear at the output thereof, this negative signal level being impressed at the FF· output lead of the function timing flip flop E/U–3.1 (FIGURE 15). This signal enables the function timing flip flop by unblocking same and allowing this flip flop to be set by the next positive-going signal pulse on the H bus 1:2L1 which pulse complements the function timing flip flop. Upon setting of this flip flop, a positive signal level appears at the FF. output thereof, this positive voltage level being transferred to one of the input terminals of the OR gate E/U–3.5, thereby causing this OR gate to remain enabled after the release of the FFA key. Concurrently, the positive output signal level at the FF. output lead of the function timing flip flop E/U–3.1 appears at the input of the inverter E/U–3.4 and provides a negative voltage level at the output thereof on the bus 1:2B12.

This negative signal level is impressed on the bus 1:3T12 and enables the FFA output lead 1:3R9 (or the output lead 1:3R1 through 1:3R14 and 1:3R17 through 1:3R20 corresponding to the depressed function key) of the function signal generator E/U–4.1, causing a positive signal level to be developed on this output lead. This positive signal level is transferred to the FFA bus 3:1L15, this bus being an input terminal of the OR gate C/U–3.2 (FIGURE 23).

At this point the first factor read operation continues in the same manner set forth supra in the sections with gates marked: C/U–3.2, C/U–3.7, M/U–2.3, M/U–2.5 and A/U–3.1.

Up to down and reset up

The FFA bus 1:3R9 also applies a positive voltage level to the bus 3:3L18, thereby enabling the OR gate C/U–5.3 and providing a negative output level thereat.

Gate C/U–5.3

This negative level at the input to OR gate C/U–5.3 is supplied to an input of AND gate C/U–5.6 and, in conjunction with a negative level on the W4 bus 3:3L14, will provide a negative voltage level at the output of this AND gate and upon an input terminal of OR gate C/U–5.7.

This output from AND gate C/U–5.6 will enable gate C/U–5.7 to provide at W4 time, the necessary up to down and reset up signal on bus 3:3R1, explained supra in the discussion of gates C/U–5.7. As shown on the first factor timing diagram, FIGURE 136, the up to down and reset up function takes place at the trailing edge of W4 time.

Write

The positive voltage level on FFA bus 1:3R9 provides a positive level on the FFA bus 3:2L1, an input terminal of OR gate C/U–4.1.

Gate C/U–4.1

This positive level on an input terminal of OR gate C/U–4.1 (FIGURE 24) enables this gate and provides a negative level at the output thereof. This negative level is applied to one input of the input terminals of AND gate C/U–4.4 and, in conjunction with a negative level W2 signal on W2 bus 3:2T1, AND gate C/U–4.4 will be enabled and provide a negative voltage level at the output thereof.

The negative voltage level at the output of AND gate C/U–4.4 will enable the OR gate C/U–4.7 at W2 time in the manner set forth supra to provide a positive voltage level write signal on the write bus 3:2R1 and write the contents of the down counter into the accumulator register as described supra.

At the end of the revolution of the drum, an H signal is provided on the H bus 1:2L1, this H signal resetting the function timing flip flop E/U–3.1 (FIGURE 15). The positive-going signal then developed on the FF· output of the function timing flip flop E/U–3.1 will set the C.F. STG. flip flop E/U–3.2. The negative signal appearing on the FF· output of the function timing flip flop will then be transferred to the input of the OR gate E/U–3.5 and to the input of an inverter E/U–3.4. A positive signal will be developed at the output of the inverter E/U–3.4 and will be transferred to the "Reset" input of FUNC. SIGNAL GEN. E/U–4.1, resetting the FFA flip flop and developing a negative signal level on the output bus of the FUNC. SIGNAL GEN. numbered 1:3T7 (FFA). This negative signal level is then applied to the input of the OR gate E/U–3.5, and, because one other enabling input (from the FUNC. TMG. FF. output) is now also at a negative level, the OR gate E/U–3.5 is then disenabled, producing a positive voltage level signal at the output thereof. This positive voltage level signal is then applied to the FF· output of the FUNC. TMG. flip flop E/U–3.1, locking the FUNC. TMG. flip flop in the reset state. Further H pulses applied at the complement input of the FUNC. TMG. flip flop E/U–3.1 will then have no effect.

This completes the first factor operation.

It should be noted that, for all functions of addition, subtraction, multiplication and division, it is required that one number be placed in the entry register and the other number be placed in the accumulator register. This order would be (1) either addend or augend in the accumulator register and the other factor in the entry register for addition, (2) the subtrahend in the accumulator register and the subtracter in the entry register for subtraction, (3) the multiplicand or the multiplier in the accumulator register and the remaining factor in the entry register for multiplication and (4) the dividend in the accumulator register and the divisor in the entry register for division.

CLEAR ENTRY

Whenever a digit key is depressed and released after the depression and release of a function key, a clear entry cycle is initiated as follows: as a result of the depression and release of any function key the C.F. STG. flip flop will be set. The FF· lead thereof therefore being at a negative signal level, upon depression and release of a digit key a typical digit entry cycle is initiated wherein the common digit No. 1 flip flop is set, producing a negative signal level at the FF· output thereof.

Gate E/U–3.3

This negative signal level is then applied to an input terminal of the AND gate E/U–3.3 together with the negative signal level applied to the other input of this AND gate as developed at the FF· output of the C.F. STG. flip flop. AND gate E/U–3.3 will thereby be enabled, producing a positive signal level at the output thereof on the CLEAR ENTRY bus 1:2R1.

This positive voltage level will therefore be transferred along the clar ntry bus 1:2R1 to the clear entry terminal 3:2L16 of the OR gate C/U–4.2. As explained supra, a positive input to OR gate C/U–4.2 will provide a positive voltage level on the write bus 3:2R1 during the W3 time period. As explained supra, a negative voltage level will be provided on the write bus 5:3L5 to prime the AND gates M/U–3.13 and M/U–3.14. However, since the write flip flop is not being complemented, only one of the AND gates M/U–3.13 or M/U–3.14 is enabled, thereby providing a constant signal to write track 4 head No. 1, this constant signal erasing any information written in the entry register of storage track 4.

ADD

Referring to the add timing diagram in FIGURE 137, the add function is performed by depressing and releasing the add key of the function signal generator E/U–4.1, thereby providing a positive voltage level on the add bus 1:3T4 and 1:2B4, one of the input terminals of the OR gate E/U–3.5 to enable this gate.

The output of OR gate E/U–3.5 performs the same function set forth supra, thereby providing a positive voltage level on the add bus 1:3R12.

A positive voltage level will be produced at the output terminal of AND gate E/U–3.3 and will provide a clear entry operation in the same manner as set forth hereinabove.

Gate C/U–1.9

A positive voltage level is also developed on the add bus 1:3R12. This positive voltage level signal is applied to the input terminal 1:4L2 and inverted by the inverter C/U–1.2, this being one input terminal of the AND gate C/U–1.9. At this time, the accumulator sign flip flop C/U–1.5 is in its set condition (as shown hereinafter), thereby applying a negative voltage level to the other input of AND gate C/U–1.9 and providing a positive voltage level at the output thereof at bus 1:4R2. The output of AND gate C/U–1.9 is also inverted by the inverter C/U–1.13 to provide a negative voltage level on the add bus 1:4R1, the positive voltage level being transferred to the add bus 3:1L4.

Gate C/U–3.1

The positive voltage level signal on the input terminal 3:1L4 of the OR gate C/U–3.1 (FIGURE 23) provides a negative output level therefrom. At the W3 time period, when a negative voltage level appears on the W3 bus 3:1T1, the AND gate C/U–3.4 will provide a negative output level to enable the OR gate C/U–3.7, as described supra. A read signal will then be provided on the READ bus 3:1R1 and carry out a read function at W3 time.

Read delay FF
Gate M/U-4.5

During the write function, the read delay flip flop M/U-4.5 (FIGURE 28) is reset as follows: At the end of the W3 time period, a positive voltage transition signal will be developed on the W3 bus 5:2L1, this bus being the upper input of the AND gate M/U-4.1 (FIGURE 32). A negative voltage transition signal will thereby be produced at the output bus 5:2R3 of AND gate M/U-4.1. This negative voltage transition signal is applied to the inverter M/U-4.8 via the W3 & ADD bus 4:2L9 and diode M/U-4.6, producing a positive voltage transition signal at the output thereof. This positive voltage transition is applied to the reset input of the READ DELAY flip flop M/U-4.5, resetting this flip flop.

Read

The positive voltage level on add bus 1:4R2 is also applied to bus 3:1L14, an input terminal of OR gate C/U-3.2. At W4 time, as stated supra, a negative level read signal will be provided on the bus 3:1R1 in the same manner set forth supra. During this time the contents of the entry register will be transferred to the up counter as previously described and added to the number already therein. This provides the required addition for one significant digit level.

As the up counter counts from 8 to 9 in the process of adding the two digits together, a "jam back" signal will be developed by the negative signal level appearing on the FF· lead of the No. 8 flip flop (not shown in the logic drawings) of the up counter and a positive-going signal on the FF· lead of the No. 1 flip flop (not shown in the logic drawings) of the up counter as this latter flip flop is set. This "jam back" signal will set the No. 4 and No. 2 flip flops (not shown in the logic drawings), thus causing the up counter to count to "15" to represent the digit "9." At the arrival of the 10th count at the input of the up counter, all of th flip flops will be reset, the resetting of the No. 8 flip flop of the up counter causing the carry flip flop A/U-4.1 (FIGURE 31) to be set.

CARRY

The setting of the carry flip flop A/U-4.1 (FIGURE 31) is provided as follows: The add bus 5:1L2 will be at a positive voltage level at this time. Therefore, when the No. 8 flip flop of the up counter is reset, a positive-going voltage transition will appear on the 8· broad line 4:1R1 thereof and at the 8· broad line 5:1L3. The concurrence of these two conditions enables the AND gate A/U-4.2 and provides a positive-going transition at the output thereof to set the carry flip flop A/U-4.1.

The setting of the carry flip flop A/U-4.1 (FIG. 31) will develop a negative voltage level at the FF· output thereof and a positive voltage level at the FF. output thereof. The negative voltage level at the FF· output is applied to an input of the AND gate A/U-4.3 (FIG. 31) and the positive voltage level produced at the FF. output is applied to an input of the AND gate A/U-4.4 (FIG. 31). Upon the operation of the up to down and reset up counter network A/U-6.1 (FIG. 31), a positive-going transition signal is developed at the output thereof designated up to down and reset up (5:1R6). This positive-going transition signal is applied to the inputs connected directly to the 5:1L1 terminal of the AND gates A/U-4.4 (FIG. 31), thereby enabling the AND gate A/U-4.4 (FIG. 31) and producing a positive-going transition signal at the output designated set FF1 (5:1R2). The AND gate A/U-4.3 (FIG. 31) will be disenabled, producing a negative voltage level at the output designated reset FF1.

The positive-going transition signal developed on the output designated set FF1 (5:1R2) of the AND gate A/U-4.4 (FIG. 31) is applied to the set FF1 input (4:1L9) of the up counter A/U-1.1 (FIG. 27), thereby setting the No. 1 flip flop in the up counter. The negative voltage level developed on the reset FF1 output (5:1R1) of the AND gate A/U-4.3 (FIG. 31) will have no effect on the carry operation at this time.

During those periods of operation when the carry flip flop A/U-4.1 (FIG. 31) is reset, a positive voltage level is produced on the FF· output thereof and a negative voltage level is produced on the FF. output thereof. The positive voltage level produced on the FF· output is applied to an input of the previously mentioned AND gate A/U-4.3 (FIG. 31) and the negative voltage level produced on the FF. output is applied to an input of the previously mentioned AND gate A/U-4.1 (FIG. 31). Upon the operation of the up to down and reset up counter network A/U-6.1 (FIG. 31), a positive-going transition signal is produced on the (5:1R6) output thereof. This positive-going transition signal is applied to the input of the AND gates A/U-4.3 and A/U-4.4 (FIG. 31). The AND gate A/U-4.3 (FIG. 31) will thus be enabled, producing a positive-going transition signal at the reset FF1 (5:1R1) output, and the AND gate A/U-4.4 (FIG. 31) will be disenabled, producing a negative voltage level at the set FF1 (5:1R2) output. This negative voltage level will have no effect in the carry operation at this time. The positive-going transition signal developed on the reset FF1 (5:1R1) output of the AND gate A/U-4.3 (FIG. 31) is applied to the reset FF1 (4:1L9) input, an input of the up counter A/U-1.1 (FIG. 27), thereby resetting the No. 1 flip flop in the up counter when an up to down and reset up counter signal is devleoped.

Up to down and reset up

The positive voltage level on the add bus 1:4R2 is also impressed upon the add bus 3:3L17, this bus being an input terminal of the OR gate C/U-5.3 (FIGURE 25). This positive voltage level existing at the input of this gate will provide a negative level output therefrom, this negative level output, in conjunction with a negative level on the W4 bus 3:3L14 will provide a negative voltage level at the output of AND gate C/U-5.6, which appears at 3:3R1. The subsequent positive going transition at 3:3R1, which occurs at the end of W4 time, performs the up to down and reset up functions described supra, shifting the sum from the up counter to the down counter.

Write

The positive voltage level on the add bus 1:4R2 is also impressed upon the add bus 3:2L7, this bus being an input terminal of OR gate C/U-4.1 (FIGURE 24). As described supra, at W2 time, a significant write signal will be provided on the write bus 3:2R1 to provide a W2 write operation.

The above completes the required steps of a typical add operation.

SUBTRACT

With reference to the subtract timing diagram (FIGURE 138), the subtract operation is initiated by depression and release of the subtract key of the function signal generator E/U-4.1, thereby providing significant voltage levels on the clear entry bus 1:2R1, as described supra, and the subtract bus 1:3R13 in the same manner described supra.

The positive voltage level on bus 1:3R13 is applied to the subtract bus 1:4L1. This positive voltage level is inverted by the inverter C/U-1.1, the negative voltage level thereat being applied to the input terminals of AND gates C/U-1.10 and C/U-1.12. The accumulator sign flip flop C/U-1.5 is set at this time, thereby providing a negative voltage level on the input terminal thereto of the AND gate C/U-1.12 and providing a positive voltage level output therefrom on subtract bus 1:4R3. This positive voltage output is also inverted by the inverter C/U-1.14 to provide a negative voltage level on the subtract bus 1:4R6.

The positive voltage level on the subtract bus 1:4R3 is transferred to the subtract bus 3:1L5, this bus being an input terminal of the OR gate C/U–3.1 (FIGURE 23) and providing a negative voltage level at the output thereof. As explained supra, during W3 time, a significant read signal is provided on the read bus 3:1R1 to provide the read function.

The positive voltage level on the subtract bus 1:4R3 is also impressed on the subtract bus 3:3L10, this bus being an input terminal of the OR gate C/U–5.2 (FIGURE 25). As discussed supra, at the trailing edge of W3 time, the output of this OR gate will provide a significant up to down and reset up signal on the bus 3:3R1 to provide the proper functions connected therewith as discussed supra.

During W4 time, a negative voltage level signal appears on subtract bus 1:4R6 and bus 6:3L2.

Gate A/U–3.4

The concurrence of the negative level W4 signal and the subtract signal at the input terminals of the AND gate A/U–3.4 (FIGURE 37) provides a positive level at the output thereof on the enable borrow flip flop gate bus 6:3R1. This positive output level is also inverted by the inverter A/U–3.6 to provide a negative level on the bus 6:3R2.

Gate A/U–3.2

The negative voltage level signal on bus 6:3R2 is transferred to bus 6:2L4, this bus being one input terminal of AND gate A/U–3.2. Concurrently, a negative signal level is applied to this AND gate on the read delay flip flop bus 6:2L2 and, thereby, the second pulse and all pulses thereafter read out of the read from track 4 head M/U–2.1 along the data from storage bus 6:2L3 will pass through AND gate A/U–3.2 and provide a positive voltage level at the output thereof. This output is the advance down counter bus 6:2R2. The output on this advance down counter bus will be a group of positive voltage level pulses corresponding to the number of pulses read from track 4 less one pulse.

The down counter is then counted down.

The positive voltage level on the subtract bus 1:4R3 is applied to the subtract bus 3:1L16, this bus being an input terminal of the OR gate C/U–3.2. When a negative level appears on the W4 bus at W4 time, a significant read signal will be applied to the bus 3:1R1 as explained supra, thereby providing an entire read operation, as discussed supra.

BORROW

The positive voltage level on the bus 6:3R1 is applied along the bus 5:1L5 to the AND gate A/U–5.2. At the moment the down counter is counted down past zero, the number 8 flip flop (not shown in the logic diagrams) of the down counter is then set and a positive-going pulse will be applied by the set borrow flip flop bus 6:1B1 to the bus 5:1L6, thereby providing a positive-going transition at the output of AND gate A/U–5.2 and setting the borrow flip flop A/U–5.1.

At the end of the W4 time period, the read delay flip flop M/U–4.5 (FIGURE 28) will be reset as a result of a positive-going transition appearing on the bus designated 4:2L10. This positive-going transition is delayed in the one shot circuit comprising capacitor M/U–4.7, resistor M/U–4.9 and inverter M/U–4.8 and is then applied to the reset input of the READ DELAY flip flop M/U–4.5, resetting this flip flop.

The subtract bus 1:4R3 has a positive voltage level thereon, this positive voltage level being applied to the subtract bus 3:2L3 and enabling the OR gate C/U–4.1. During W2 time, as explained supra, a positive voltage level is applied to the write bus 3:2R1, thereby providing the necessary operations to write the contents of the down counter into the accumulator register.

SUBTRACT-COMPLEMENT

During a subtract operation which involves the subtracting of an integer from a smaller integer, a complement operation will result as follows:

Assuming that the smaller integer has been entered into the accumulator register and the larger integer has been entered into the entry register, depression and release of the subtract key will initiate a subtract function as previously described. However, a deviation will develop from the typical subtract operation when a borrow is required. This deviation will occur during the first W4 time period after an H2 time period (refer to FIGS. 139 and 140). The positive voltage level, as normally developed on the subtract bus 1:4R3, is applied to the input of an inverter C/U–1.14 (FIG. 17) causing the inverter to produce a negative voltage level at the output thereof designated subtract (1:4R6). This negative voltage level is then applied to the input designated subtract (6:3L2) of an AND gate A/U–3.4 (FIG. 37) and, concurrently with the application of a negative voltage level (during W4 time period) at the other input thereof labelled W4 (6:3L1), this AND gate A/U–3.4 (FIG. 37) will be enabled, thereby developing a positive voltage level at the output thereof labelled W4 & SUB or W3 & COMP (6:3R1). This positive voltage level is applied to the "enabling" input labelled W4 & SUB or W3 & COMP (5:1L5) of a dynamic AND gate A/U–5.2 (FIG. 31).

Also, during the first W4 time period, the contents of the entry register are subtracted from the contents of the accumulator register. In this instance, as the larger number is subtracted from the smaller number in the down-counter, the down-counter will pass through "zero," producing a positive transition signal at the set borrow FF (6:1B1) output of the down-counter A/U–2.1 (FIG. 35). This positive transition signal is then applied to the "dynamic" input designated set borrow FF (5:1L6) of the borrow flip flop AND gate A/U–5.2 (FIG. 31) and, concurrently with the positive voltage level previously applied at the input labelled W4 & SUB or W3 & COMP (5:1L5), the borrow flip flop AND gate will be enabled, producing a positive transition signal at the output thereof. This positive transition signal is applied to the "set" input of borrow flip flop A/U–5.1 (FIG. 31), setting the borrow flip flop and producing a negative voltage level at the FF· output thereof designated borrow FF· (5:1R3) and producing a positive voltage level at the FF. output thereof designated borrow FF. (5:1R4). (The tens complement of the difference between the larger number and the smaller number will be left in the down-counter.)

During the second W2 time period, a write signal is developed since a positive voltage level has been applied to subtract (3:2L3) input of the OR gate C/U–4.1 (FIG. 24), enabling this gate and producing a negative voltage level at the output thereof. This negative voltage level is then applied to one of two inputs of an AND gate C/U–4.4 (FIG. 24) and, concurrently with the negative signal level developed during the W2 time period at the remaining input thereof labelled W2 (5:4R3), this AND gate will be enabled and develop a write signal on the write bus (3:2R1) as previously described. The tens complement of the difference of the two numbers in the down-counter is then written into the accumulator register during the W2 time period.

The negative voltage level produced at the FF. output (1:4R5) of the comp flip flop C/U–1.6 (FIG. 17) will be applied to one input (2:5L14) of an AND gate C/U–2.17 (FIG. 22) and, concurrently, at the beginning of the W3 time period, a negative voltage level is produced at the other input (2:5L13), thereby enabling this AND gate C/U–2.17 (FIG. 22) and producing a positive transition signal at the sense borrow output thereof (2:5R5). This positive transition signal is applied to the sense borrow input (4:1T1) of a one shot circuit A/U–1.2 (FIG. 27), producing a positive transition signal at the output thereof.

This positive transition signal from one shot A/U–1.2 is applied to an input of the AND gate A/U–1.3 (FIG. 27). The positive voltage level developed at the borrow FF. output (5:1R4) of the borrow flip flop A/U–5.1 (FIG. 31) is applied to the other input of AND gate A/U–1.3. AND gate A/U–1.3 is thereby enabled, producing a positive going transition signal at the output thereof. This positive going transition signal is then applied to an input of the up-counter, setting the up-counter to represent a count of "9" as indicated by all flip flops thereof being set, i.e., the binary count of "15."

During the second W3 time period, if there is a digit in the tens position (i.e., a second order digit) of the accumulator register, the borrow flip flop will be reset as follows: the digit in the tens position of the accumulator register will be read into the up counter during the second W3 time period due to the application of a positive voltage level at the subtract input (3:1L5) of an OR gate C/U–3.1 (FIG. 23) and the subsequent development of a typical read command signal. When the first information bit pulse appears (from TK 4) on the advance up counter and reset borrow FF bus (6:2R1), this bit pulse will be applied to the reset borrow FF input (5:1L7) of the borrow flip flop A/U–5.1 (FIG. 31), resetting the borrow flip flop. The ensuing transfer of the second order digit from TK 4 into the up counter leaves a digit one bit smaller in the up counter due to the "9" previously stored in the up counter. The first bit of the second order digit will merely count the up counter up to zero.

The positive voltage level on the subtract bus is applied to the subtract input (3:3L10) of an OR gate C/U–5.2 (FIG. 25), enabling this gate and producing a negative voltage level at the output thereof. This negative voltage level is then applied to one of two inputs of an AND gate C/U–5.5 (FIG. 25) and, concurrently with the application of a positive transition signal at the end of a second W3 time period at the input designated W3 (3:3L4), this AND gate C/U–5.5 (FIG. 25) is disenabled and subsequently develops a positive-going transition signal on the up to down and reset up bus (3:3R1).

Thus, the "9" in the up counter is then transferred to the down counter during the second W3 time period as previously described. During the third W2 time period, a write signal is developed as previously described and the "9" in the down counter is written into the accumulator register. The borrow flip flop will remain set throughout the remainder of the H period if there are no further digits in the higher order positions of the accumulator register to initiate a resetting of the borrow flip flop.

At the beginning of successive W3 time periods, a sense borrow signal will be produced as previously described, whereby the up counter will be set to register the count of "9," this "9" being transferred to the down counter and subsequently being written into the accumulator register.

As a result, a series of "9's" will be written into the accumulator register to the left of the least significant digits. In this case the least significant digit is the tens complement of the difference of the original integers. The negative voltage level developed at the borrow FF· output (5:1R3) of the borrow flip flop A/U–5.1 (FIG. 31) is applied to one input (1:4L3) of an AND gate C/U–1.4 (FIG. 17). Also, as a result of the initiation of the subtract operation, a positive voltage level will be developed on the subtract input (1:4L1) of the AND gate C/U–1.3 (FIG. 17). A negative voltage level is produced at the output of this AND gate and will be transferred to the remaining input of the AND gate C/U–1.4 (FIG. 17), thereby enabling this AND gate and producing a negative voltage level at the output thereof. This negative signal level is applied to the upper gate input of the comp flip flop C/U–1.6 (FIG. 17).

Also, this same negative voltage level is applied to the input of an inverter C/U–1.7 (FIG. 17) producing a positive voltage level at the output thereof. This positive voltage level is transferred to the lower gate input of the comp flip flop C/U–1.6 (FIG. 17).

Second cycle

At the end of the first H time period, a positive voltage transition signal is developed on the H bus and is applied to the transfer input (1:4L5) of the comp. flip flop C/U–1.6 (FIG. 17). This positive voltage transition signal transfers the negative voltage level at the upper gate input of the comp. flip flop and the positive voltage level at the lower gate input of the comp. flip flop to the FF· and FF. outputs thereof, respectively, thus setting the comp. flip flop. At the following H2 time, a positive transition signal is applied to the input labelled H (5:1L4) of the borrow flip flop, resetting the borrow flip flop. The complementing operation then proceeds as follows: The positive voltage level applied at the comp. input (3:1L6) of the read OR gate C/U–3.1 (FIG. 23) enables this gate and develops a negative voltage level at the output thereof. Additionally, at the beginning of the first W3 time period, a negative voltage signal level is applied to the input labelled W3 (3:1T1) of an AND gate C/U–3.4 (FIG. 23) and, together with a negative voltage level from the output of the read OR gate C/U–3.1 (FIG. 23), the AND gate C/U–3.4 (FIG. 23) is disenabled and develops a typical read command signal (negative voltage level) on the read bus (3:1R1). The negative voltage level read command signal is applied to the read input (5:2L3) of an AND gate M/U–2.3 (FIG. 32) and, together with the negative information bits from the read from TK 4 circuit (M/U–2.1) and the negative signal level developed during the RS time period on the RS input (5:2L4), this AND gate M/U–2.3 is enabled and positive pulses are thereby developed at the output thereof. These positive pulses are applied to the input of the shape and invert circuit (M/U–2.5), causing negative pulses to appear at the output of the circuit, designated data from storage (5:2R4). The first pulse of these negative pulses is applied to the data from storage input (4:2L7) of the read delay flip flop, setting the read delay flip flop (by the positive-going trailing edge of this bit pulse) and producing a negative voltage signal level at the read delay FF· output (4:2R2). This negative voltage signal level is applied to the read delay FF· input (6:2L2) of an AND gate A/U–3.2 (FIG. 36).

The negative voltage level produced at the output designated comp· (1:4R4) of the comp flip flop C/U–1.6 (FIG. 17) is applied to the comp· input (6:3L4) of an AND gate A/U–3.5 (FIG. 37) and, together with the negative voltage level applied to the W3 input (6:3L3) during the first W3 time period, this AND gate A/U–3.5 (FIG. 37) is enabled, producing a positive voltage level at the output thereof. This positive voltage level is applied to the input of an inverter A/U–3.6 (FIG. 37), causing a negative voltage level to be produced at the W4 and subtract or W3 and comp output (6:3R2). This negative voltage level is applied to the W4 and subtract or W3 and comp input (6:2L4) of the previously mentioned AND gate A/U–3.2 (FIG. 36). The negative bit pulses developed at the data from stg output (5:2R4) of the shape and invert circuit M/U–2.5 (FIG. 32) is applied to the data from stg input (6:2L3) of the previously mentioned AND gate A/U–3.2 (FIG. 36) enabling this AND gate and producing positive pulses at the advance down counter output (6:2R2).

The AND gate A/U–3.1 (FIG. 36) is disenabled at this time because the positive voltage level on the enable borrow FF gate output (6:3R1) of the AND gate A/U–3.5 (FIG. 37) is applied to the input labelled W4 & SUB or W3 & COMP (6:2L1) of the AND gate A/U–3.1 (FIG. 36), and thus, disenables this gate and prevents pulses from advancing the up counter.

The positive pulses developed on the advance down counter bus (6:2R2) are applied to the advance down counter input (6:1L9) of the down counter A/U–2.1

(FIG. 35), counting the down counter down from zero. That is, the digit being entered at this time into the down counter is the tens complement of the difference of the two original numbers and, as the down counter is counted down from zero, a new tens complement of the first tens complement will be left in the down counter.

The comp flip flop C/U–1.6 (FIG. 17) is set and the FF· comp· output (1:4R4) is, therefore, at a negative voltage level. This negative voltage level is applied to one input comp· (6:3L4) of an AND gate A/U–3.5 (FIG. 37) and, together with the negative voltage signal level applied during the first W3 time period after the second H2 time period to the other input thereof labelled W3 (6:3L3), the AND gate A/U–3.5 (FIG. 37) is enabled and a positive voltage level is developed at the enable borrow FF gate output (6:3R1).

This positive voltage level is then applied to one of two inputs designated enable borrow FF gate (5:1L5) of an AND gate A/U–5.2 (FIG. 31).

The down counter, in being counted down, as previously described, will immediately pass through zero and develop a positive going transition signal at the output thereof designated set borrow FF (6:1B1) of the down counter A/U–2.1 (FIG. 35). This positive going transition signal is then applied to the input designated set borrow FF (5:1L6) of the borrow flip flop AND gate A/U–5.2 (FIG. 31), thereby enabling the borrow flip flop AND gate and producing a positive going transition signal at the output thereof. This positive-going transition signal sets the borrow flip flop A/U–5.1 (FIG. 31).

The read delay flip flop is reset at the end of the first W3 time period as follows: A negative voltage level is applied to an input designated comp· (6:3L4) of an AND gate A/U–3.5 (FIG. 37) and, together with the positive-going transition signal at the input labelled W3 (6:3L3), this AND gate A/U–3.5 (FIG. 37) is disenabled, producing a negative-going transition signal at the output thereof. This negative-going transition signal is applied to the input of an inverter A/U–3.6 (FIG. 37), causing a positive-going transition signal to be developed at the output thereof designated W4 and subtract or W3 and comp.

This positive transition signal is delayed in the "one-shot" circuit comprised of capacitor M/U–4.7, resistor M/U–4.9 and inverter M/U–4.8 and is then applied to the reset input of the READ DELAY flip flop M/U–4.5, resetting this flip flop.

The positive-going transition signal developed at the output designated read delay FF· (4:2R2) of the read delay flip flop M/U–4.5 (FIG. 28) is applied to a set input of the write delay flip flop M/U–4.4 (FIG. 28), setting the write delay flip flop. Since the borrow flip flop A/U–5.1 (FIG. 31) is set, as previously described, the output designated borrow FF. (enable-set all FF's) (5:1R4) will be at a positive voltage level. This positive voltage level is applied to the input designated borrow FF. (enable-set all FF's) of an AND gate A/U–1.3 (FIG. 27). Because the comp flip flop C/U–1.6 (FIG. 17) is set, the FF· output thereof designated comp· (1:4R4) is at a negative voltage level. This negative voltage level is applied to one of two inputs designated comp· (2:5L12) of an AND gate C/U–2.16 (FIG. 22) together with the negative transition signal developed at the beginning of the second W2 time period at the other input thereof labelled W2 (2:5L11). This AND gate C/U–2.16 (FIG. 22) will therefore be enabled and a positive-going transition signal will be developed at the output thereof designated sense borrow (2:5R5). This positive-going transition signal is then applied to an input designated sense borrow (command set all FF's) (4:1T1) of a one shot circuit A/U 1.2 (FIG. 27), developing a positive-going transition signal at the output thereof. This positive-going transition signal is applied to an input of the previously mentioned AND A/U–1.3 (FIG. 27), enabling this AND gate and producing a positive-going transition signal at the output thereof. This positive-going transition signal is applied to an input of the up counter A/U–1.1 (FIG. 27), setting all flip flops in the up counter. A count of "9" will therefore be indicated by an actual binary count of "15" in the up counter.

The positive voltage level developed at the output designatel comp. (1:4R5) of the comp flip flop C/U–1:6 (FIG. 17) is applied at the input designated comp. (3:2L4) of an OR gate C/U–4.1 (FIG. 24), enabling this OR gate and producing a negative voltage level at the output thereof. This negative voltage level is applied to an input of the AND gate C/U–4.4 (FIG. 24) together with a negative voltage level produced during the first W2 time period at the other input thereof labelled W2 (3:2T1). AND gate C/U–4.4 (FIG. 24) will thus be enabled and a positive voltage level write signal is developed on the write bus (3:2R1). The new tens complement in the down counter is then written into the accumulator register of track 4.

The positive voltage level developed at the output designated comp. (1:4R5) of the comp flip flop C/U–1.6 (FIG. 17) is also applied to an input designated comp. (3:3L2) of an OR gate C/U–5.1 (FIG. 25), enabling this OR gate and producing a negative voltage level at the output thereof. This negative voltage level is applied to an input of an AND gate C/U–5.4 (FIG. 25) together with a positive-going transition signal developed at the end of the first W2 time period at the other input thereof labelled W2 (3:3T1). This AND gate C/U–5.4 (FIG. 25) is thus enabled and a positive-going transition shift signal is developed on the up to down and reset up bus (3:3R1). The "9" in the up counter is then transferred to the down counter.

The positive voltage level developed at the output designated comp. (1:4R5) of the comp flip flop C/U–1.6 (FIG. 17) is applied to the input designated comp. (3:1L6) of an OR gate C/U–3.1 (FIG. 23), enabling this OR gate and developing a negative voltage level read signal on the read bus (3:1R1).

Bit pulses representing the "9" on track 4 are then applied to one of three inputs designated data from storage (6:2L3) of an AND gate A/U–3.2 (FIG. 36). These bit pulses are also applied to the input designated data from storage (4:2L7) of the read delay flip flop M/U–4.5 (FIG. 28), setting the read delay flip flop and developing a negative voltage level at the read delay FF· output (4:2R2). This negative voltage level is applied to one of the two remaining inputs designated read delay FF· (6:2L2) of the previously mentioned AND gate A/U–3.2 (FIG. 36).

The negative voltage level at the output designated comp· (1:4R4) of the comp flip flop C/U–1.6 (FIG. 17) is applied to one of two inputs designated comp· (6:3L4) of an AND gate A/U–3.5 (FIG. 37) and, together with the negative voltage signal level developed during the W3 time period at the other input thereof labelled W3 (6:3L3), this AND gate is enabled, thus producing a positive voltage level at the output thereof. This positive voltage level is applied to the input of an inverter A/U–3.6 (FIG. 37), producing a negative voltage level at the output thereof designated W4 and subtract or W3 and comp (6:3R2). This negative voltage level is then applied to the remaining input designated W4 and subtract or W3 and comp (6:2L4) of the previously mentioned AND gate A/U–3.2 (FIG. 36), thereby causing this AND gate to be enabled upon the introduction of the second information bit from the "9" stored on track 4. (The first bit from the information on track 4 is used to set the read delay flip flop and develop the necessary negative voltage level at the input of the AND gate A/U–3.2 (FIG. 36) designated read delay FF· and thus enable this AND gate to pass the remaining bit pulses from track 4). The positive "information" bit pulses will then appear as positive pulses at the output designated advance down counter (6:2R2) of this AND gate A/U–3.2 (FIG. 36). These positive bit pulses are applied to the input designated advance down counter (6:1L9) of the down counter A/U–2.1 (FIG. 35), causing the down counter to be counted down from "9," this "9" having been previously transferred into the down counter at the end of the W2 time period. As a result, the down counter will contain a zero.

The negative voltage level developed at the output designated W4 and subtract or W3 and comp (6:3R2) of the inverter A/U–3.6 (FIG. 37), as described supra, is applied to the input designated W4 and subtract or W3 and comp (4:2L10) of a one shot circuit M/U–4.7 (FIG. 28), causing a negative-going transition signal to be developed at the output of this one shoe at the end of the second W3 time period. This negative-going transition signal is then applied to an input of an OR gate M/U–4.6 (FIG. 28), enabling this OR gate and developing a positive-going transition signal at the output thereof. This positive-going transition signal is then applied to a reset input of the read delay flip flop M/U–4.5 (FIG. 28) resetting the read delay flip flop and producing a positive transition signal at the output thereof designated read delay FF· (4:2R2). This positive-going transition signal is transferred to a set input of the write delay flip flop M/U–4.4 (FIG. 28), setting the write delay flip flop.

The positive voltage level developed at the output designated comp. (1:4R5) of the comp flip flop C/U–1.6 (FIG. 17) is applied to the input designated comp. (3:2L4) of the OR gate C/U–4.1 (FIG. 24), enabling this OR gate and subsequently developing a positive voltage level write signal during the third W3 time period on the write bus (3:2R1).

This positive voltage level is applied to the input designated write (4:3L5) of the OR gate M/U–3.4 (FIG. 29), enabling this OR gate and producing a negative voltage level at the output thereof. This negative voltage level is then applied to an input of the AND gate M/U3.5 (FIG. 29) and, together with the input from track 3 containing the negative bit timing pulses and the negative signal level on the input designated down counter zero (4:3L7) this AND gate is enabled, producing positive pulses at the output thereof and developing a write operation as described supra with the following exception:

Since the write delay flip flop M/U–4.4 (FIG. 28) has been set while the down counter A/U–2.1 (FIG. 35) remains at zero, a single bit will be written into track 4, indicating a zero as follows: The first bit developed at the output of the previously mentioned AND gate M/U3.5 (FIG. 29) is applied to the input of a shape and invert circuit M/U–3.10 (FIG. 29), thereby developing a negative transition signal at the output thereof designated reset write delay FF (4:3R5). The positive-going trailing edge of this negative pulse is applied to the input designated reset write delay FF (4:2L6) of the write delay flip flop M/U–4.4 (FIG. 28), resetting the write delay flip flop and causing the output thereof designated write delay FF. (4:2R1) to return to a negative voltage level. As a result, the down counter zero bus will return to a positive voltage level and disenable the AND gate M/U–3.5 (FIG. 29), thereby preventing further bit pulses from being read from track 3. This negative voltage level is applied to the inputs designated write (5:3L5) of AND gate M/U–3.13 and M/U–3.14 (FIG. 33), causing one of these AND gates to be enabled and the other to be disenabled and thereby producing an output thereat, so that write track 4 head No. 1, M/U–3.18 (FIG. 33) will write a single bit into the accumulator register representing a zero.

In a similar manner, zeros will be written during succeeding W3 time periods for the remainder of the digit positions provided in the display.

The single positive pulse produced at the output of the AND gate M/U–3.5 (FIG. 29) as previously described, is applied to the complement input of the write flip flop M/U–3.9 (FIG. 29), causing the voltage levels at the outputs thereof designated write FF· (4:3R3) and write FF. (4:3R4) to change polarity. The voltage levels on the inputs designated write FF· (5:3L4) and write FF. (5:3L6) of the AND gates M/U–3.13 and M/U–3.14 (FIG. 33), respectively, will also change polarity. The positive voltage level developed on the write bus (4:3L5) is also applied to the input of an inverter M/U–3.3 (FIG. 29), causing a negative voltage level to be developed at the output thereof designated write (4:3R2).

As previously described, the comp flip flop C/U–1.6 (FIG. 17) is set at the end of the first H period. Therefore, a negative voltage level is developed on the FF· output thereof, designated comp· (1:4R4) and a positive voltage level is developed on the FF. output thereof designated comp. (1:4R5). Also, the input designated sub (1:4L1) of AND gate C/U–1.3 (FIG. 17) will be at a negative voltage level and the input designated add (1:4L2) of this AND gate C/U–1.3 (FIG. 17) will also be at a negative voltage level, thereby enabling this AND gate and producing a positive voltage level at the output thereof. This positive voltage level is applied to an input of AND gate C/U–1.4 (FIG. 17), disenabling this AND gate and causing a positive voltage to be developed at the output thereof. This positive voltage is applied to the upper transfer input of the comp flip flop C/U–1.6 (FIG. 17) and to the input of an inverter C/U–1.7 (FIG. 17), causing a negative voltage level to be produced at the output thereof. This negative voltage level is then applied to the lower transfer input of the comp flip flop C/U–1.6 (FIG. 17).

The positive-going transition signal developed on the H bus (5:4R9) at the end of the second H period is applied to the transfer input labelled H (1:4L5) of the comp flip flop C/U–1.6 (FIG. 17), causing the positive voltage level at the upper transfer input of the comp flip flop and the negative voltage level at the lower transfer input of the comp flip flop to be transferred to the FF· and FF. outputs thereof, respectively. The positive-going transition signal thus developed at the FF· output of the comp flip flop is applied to the complement input of the ACC sign flip flop C/U–1.5 (FIG. 17), resetting the ACC sign flip flop. A negative voltage level is thereby developed on the ACC FF. output thereof, and is applied to the input of the drive circuit C/U–1.8 (FIG. 17), causing the drive circuit to energize the negative indicator C/U–1.15 (FIG. 17). The lighting of the negative indicator indicates that the information contained in the accumulator register is a negative quantity.

Also, the negative voltage level developed at the FF. output of the ACC sign flip flop C/U–1.5 (FIG. 17) is applied to an input designated acc FF. of an AND gate C/U–1.11 (FIG. 17) and also to the input designated acc FF. of an additional AND gate C/U–1.10 (FIG. 17).

If it is now desired to subtract an additional integer from the quantity now stored in the accumulator register as a result of the preceding complement operation, the subtract key of the function signal generator E/U–4.1 (FIG. 16) is operated and a positive voltage level is developed on the subtract bus (1:3R13) as previously described. This positive voltage level is applied to the input designated sub (1:4L1) of an inverter C/U–1.1 (FIG. 17), causing a negative voltage level to be developed at the output thereof. This negative voltage level is applied to an input of the previously mentioned AND gate C/U–1.10 (FIG. 17), enabling this AND gate and producing a positive voltage level on the output thereof designated add (1:4R2). The quantities in the entry register and the accumulator register are then added together as in a normal add operation. However, since a borrow operation is not generated during the add function, the comp flip flop C/U–1.6 (FIG. 17) is not affected and the acc sign flip flop C/U–1.5 (FIG. 17) will remain in the reset condition. Thus, upon the completion of this last operation, the negative indicator C/U–1.15 (FIG. 17) will remain lit, indicating a negative quantity in the accumulator.

An additional variation of the complement operation is produced by the entering of a digit into the entry register and operating the add function key in the function signal generator E/U–4.1 (FIG. 16). A positive voltage level is thereby developed at the output thereof designated add (1:3R12). This positive voltage level is applied to the input designated add (1:4L2) of an inverter C/U–1.2 (FIG. 17), causing a negative voltage level to be developed at the output thereof. This negative voltage level is applied to an input of the previously mentioned AND gate C/U–1.11 (FIG. 17), thereby enabling this AND gate and producing a positive voltage level on the output designated sub (1:4R3).

Two further variations are possible at this point. If the integer in the entry register is smaller than the integer in the accumulator register, then operation of the add function key will result in the development of a subtract operation. However, if the integer in the entry register is smaller than the integer in the accumulator register, the borrow flip flop A/U–5.1 (FIG. 31) will not be set and therefore the comp flip flop C/U–1.6 (FIG. 17) will remain in the reset state. Since the comp flip flop remains in the reset state, a positive-going transition signal will not be applied to the complement input of the acc sign flip flop C/U–1.5 (FIG. 17). Thus, the acc sign flip flop will remain in a reset state and the negative indicator lamp C/U–1.15 (FIG. 17) will remain lit, indicating a negative quantity in the accumulator.

A second variation wherein the integer in the entry register is larger than the integer in the accumulator register, will produce a positive quantity in the accumulator register as follows:

Since the integer in the entry register is larger than the integer in the accumulator register, the subtract function, which had been developed as previously described, will result in the setting of the borrow flip flop A/U–5.1 (FIG. 31) and the setting of the comp flip flop C/U–1.6 (FIG. 17). At the end of the second H period, during this operation, the comp flip flop will be reset, thereby developing a positive-going transition signal at the output thereof. This positive-going transition signal is applied to the complement input of the acc sign flip flop C/U–1.5 (FIG. 17) and thereby setting the acc sign flip flop and de-energizing the negative indicator lamp C/U–1.15( FIG. 17). Therefore, a positive quantity will be indicated in the accumulator register.

MULTIPLICATION

The multiplication operation is initiated by depression and release of a multiply key of the function signal generator E/U–4.2. This operation of the multiply key enables the OR gate E/U–3.5 as described supra, and provides a positive voltage level signal on the multiply bus 1:3R17 and a negative voltage level signal on the multiply bus 1:3R18.

This positive voltage level on the multiply bus 1:3R17 is applied to the multiply bus 2:2L10, an input terminal of OR gate C/U–2.7 (FIGURE 19) to provide a negative output level therefrom.

Gate C/U–2.7

This negative level at the output of gate C/U–2.7 is applied to one input terminal of AND gate C/U–2.6. At this time, a second input terminal to this AND gate designated multiply counter zero bus 2:2L9 will be at a negative level due to the fact that the down counter is at a zero count and the write delay flip flop is reset. AND gate C/U–2.6 is therefore enabled on the application thereto of a negative signal level on the H bus 2:2L6, thereby producing a negative level at the output thereof. When the level on the H bus changes to a positive level, the output of the AND gate C/U–2.6 goes positive, this positive-going transition being fed to the phase control counter C/U–2.3 (the phases of which are shown in FIGURE 141 for the multiply operation), thereby advancing the phase control counter to phase 1 thereof.

For each phase of the phase control counter, a combination of signals will be applied at the output terminals thereof labelled 2:2R1 through 2:2R8, this combination indicating the phase of operation at a particular point in time.

The output terminals from the phase control counter are applied to the input terminals 2:3B1 to 2:3B8 of the multiply decoder C/U–2.8 and, upon receipt of the first advance pulse by the phase control counter, set the multiply decoder to multiplication phase 1.

Multiplication phase 1

At multiplication phase 1, as shown in Timing Diagram FIGURE 142, a positive voltage level is applied to the transfer from accumulator to multiplier quotient register bus 2:3T5, this positive voltage level being applied also to the transfer from accumulator to multiplier quotient register bus 3:1L8, an input terminal of OR gate C/U–3.1.

As explained supra, when a negative voltage level appears on the W3 bus 3:1T1 in conjunction with the enabling of gate C/U–3.1, a negative level will appear on the read bus 3:1R1 and provide the necessary signal thereon for reading the contents of the accumulator register into the up counter.

At the trailing edge of W3 time, the transfer from accumulator to multiplier quotient register bus 3:3L5 will also have a positive voltage level thereon due to the positive level of bus 2:3T5. Accordingly, as set forth supra, at the trailing edge of W3 time an up to down and reset up signal will be applied to the bus 3:3R1 to shift the contents of the up counter into the down counter and reset the up counter.

The positive voltage level on the transfer accumulator to multiplier quotient register 2:3T5 is transferred to bus 2:5L7, this bus being an input terminal of OR gate C/U–2.14.

Gate C/U–2.14

This positive voltage level at the input of OR gate C/U–2.14 provides a negative output level therefrom, this negative level, when applied to AND gate C/U–2.15 concurrently with a negative level on W4 bus 2:5L10, will provide a positive output level therefrom on the write track 5 bus 2:5R4.

The positive voltage level on write track 5 bus 2:5R4 is applied to write track 5 bus 4:3L6, this bus being an input terminal of the OR gate M/U–3.4.

The application of the positive voltage level signal to an input terminal OR gate M/U–3.4 provides a negative voltage level at the output thereof and, in conjunction with a negative voltage level on the down counter zero bus 4:3L7, provides output bit pulses from track 3 read head M/U–3.6. The output of the AND gate M/U–3.5 will provide output signals on the write flip flop buses 4:3R3 and 4:3R4 and reset write delay flip flop bus 4:3R5 as described supra.

The output terminals 4:3R3 and 4:3R4 of the write flip flop are coupled to the AND gates M/U–3.15 and M/U–3.16. Upon the arrival of a write driver track 5 negative voltage level signal on bus 5:3L8, this signal being provided at the output of OR gate C/U–2.14 (FIGURE 22), the bits read from track 3 will be written onto track 5 by the write track 5 head M/U–3.19. These bits will continue to be written onto track 5 until the down counter has been couned down to zero whereupon AND gate M/U–3.5 will be disenabled and cut off the passage of bit signals from track 3 to track 5.

The positive voltage level on the transfer accumulator to multiplier quotient register 2:3T5 is also applied to the transfer accumulator to multiplier quotient register bus 3:2L8, this bus being an input terminal of the OR gate C/U–4.1. As described supra, at W2 time, when a negative voltage level appears on bus 3.2T1, the write bus 3:2R1 will have a positive level thereon and provide the write operation discussed supra for gate C/U–4.1. Since, at W2 time, nothing is stored in the down counter, only one of AND gates M/U–3.15 or M/U–3.16 will be enabled and, accordingly, the contents of the accumulator register will be erased.

Multiplication phase 2

The next positive-going transition on the H bus 2:2L6 will step the phase counter C/U–2.3 to its phase 2 state as shown in FIGURE 143. As explained supra, under the discussion of the phase 1 operation, the output of the phase control counter will be fed to the multiply decoder and provide an output on the phase 2 bus, this being the shift left accumulator register bus 2:3T4. This phase 2 operation takes place after the phase 5 operation and will be discussed after the phase 5 operation.

Multiplication phase 3

The next positive-going transition on the H bus 2:2L6 will step the phase control counter to phase 3 thereof as shown in FIGURE 144 and, thereby, as explained supra, provide a positive voltage level on the phase 3 bus, this bus being the shift left multiplier quotient register bus 2:3T3. The positive voltage level on bus 2:3T3 is inverted by inverter C/U–2.9, producing a negative voltage level on bus 2:3T6. This negative voltage level is applied to input terminal 3:4L7 of the AND gate C/U–2.22 (FIGURE 26). This will enable this AND gate as a result of the negative signal levels having been applied to the remaining inputs thereof, one of these signals being a negative level multiply signal on the bus 3:4L6 and the other being a negative level signal from the FF. output of the digit sense flip flop C/U–2.19. The concurrence of these signals at the input of AND gate C/U–2.22 will provide a positive level output therefrom, this level being applied on the stop phase control counter bus 3:4R2 to the 1. bus 2:2R2 of the phase control counter. The phase control counter C/U–2.3 (FIG. 19), is then locked in the multiply phase 3 state and will remain so locked until the most significant digit in the accumulator register is sensed. The most significant digit in the accumulator register is sensed by the following series of operations:

The positive voltage level on the shift left multiplier quotient register bus 2:3T3 is applied to the shift left multiplier quotient register bus 2:5L1, this bus being an input terminal of the OR gate C/U–2.12 (FIGURE 22)

Gate C/U–2.12

A negative level is thereby applied at the output of this OR gate on the enable track 5 read gate bus 2:5R1, thereby applying a negative voltage level to the enable track 5 read gate bus 5:2L5, an input terminal of AND gate M/U–2.4. Upon the occurrence of a negative voltage level on the RS bus 5:2L4, the output from the read from track 5 head M/U–2.2 will pass through the now enabled AND gate M/U–2.4 and be transferred through a shape and invert circuit M/U–2.5 to the data from storage bus 5:2R4.

It should be understood that, though the read head from track 5 is constantly energized due to the appearance of an RS negative signal on AND gate M/U–2.4 during each W period, the contents of the multiplier quotient register are only read during W1 time, at all other times the multiplier quotient register having no information stored therein. It is for this reason that the RS timing signal can be used alone.

Thus, the data on the data from storage bus 6:2L3, read out by the track 5 read head, will be transferred to the up counter along bus 6:2R1 in the manner set forth supra.

The positive voltage level on the shift left multiplier quotient register bus 2:3T3 is applied to the shift left multiplier quotient register bus 3:3L19, this bus being an input terminal of the OR gate C/U–5.3. Accordingly, as discussed supra, at the trailing edge of W4 time, a positive going transition will appear on the up to down and reset up counter bus (5:1L8) to provide an up to down and reset up function, thereby shifting the contents of the up counter to the down counter.

The positive voltage level on the shift left multiplier quotient register bus 2:3T3 is also applied to the shift left multiplier quotient register bus 2:5L6, this bus being an input terminal of the OR gate C/U–2.14. At W4 time, when a negative level appears on the W4 bus 2:5L10, the write track 5 head M/U–3.19 will be energized and write the contents of the down counter into the multiplier quotient register on track 5 in the manner set forth supra in the discussion of phase one of the multiply operation.

The positive voltage level on the shift left multiplier quotient register bus is inverted by the inverter C/U–2.9 (FIGURE 20) to provide a negative level on the shift left multipler quotient register bus 2:3T6, this negative level being applied to the shift left multiplier quotient register bus 2:4L6. When the voltage level on the H bus 2:4L5 goes negative, the concurrence of this negative voltage level and the negative voltage level on the shift left multiplier quotient register bus 2:4L6 will enable AND gate C/U–2.11 (FIGURE 21) and provide a negative voltage level at the output thereof. When the voltage level on the H bus 2:4L5 goes positive, the output of AND gate C/U–2.11 will go positive and provide a positive-going transition on the command broadside bus of the multiplier counter C/U–2.10. A number contained in the down counter will now be transferred to the multiplier counter along the broadside line buses 6:1T1 to 6:1T4. The multiplier counter will thus contain a count equal to the count of the down counter.

As a result of a count being entered into the multiplier counter, a positive transition signal will appear on the multiplier counter zero bus 2:4R2, this signal being transferred to the multiplier counter zero bus 3:4L5. This positive transition signal on bus 3:4L5 provides a positive transition at the output of AND gate C/U–2.23 since a positive voltage level is now applied to the phase 3 bus 2:3T3. This positive voltage transition at the output of the AND gate C/U–2.23 will set the digit sense flip flop C/U–2.19 and cause a positive voltage level to appear on the FF·output lead thereof. This positive level signal will disenable AND gate C/U–2.22 and allow the phase control counter to be advanced to its next phase. This positive voltage level transition will also be applied along the multiplier counter zero bus 2:2L9 to one input of the AND gate C/U–2.6, thereby disenabling this AND gate and providing a positive-going transition on the output thereof. This positive-going transition will be applied to the advance bus of the phase control counter and thereby advance the counter to its next phase.

Multiplication phase 4

The phase control counter now sets the multiply decoder to its phase 4 state, thereby developing a positive voltage level on the phase 4 or add bus 2:3T2. Thus, a typical add cycle will be initiated, adding the contents of the entry register to the contents of the accumulator register and leaving the sum in the accumulator register.

The above is accomplished because the add bus 2:3T2 is tied to the same terminals as the add bus 1:4R2 of the add operation and, therefore, performs the same operations as performed by the existence of a positive level on bus 1:4R2.

After the phase 4 addition operation is completed, the following positive transition at time H1 will attempt to advance the phase control counter through the AND gate C/U–2.6. However, if the multiplier counter contains a count therein, the AND gate C/U–2.6 will be disenabled due to the positive voltage level on the input lead thereto labelled multiply counter zero (2:2L9). Therefore, the phase control counter will remain in its phase 4 operation so long as the multiply counter contains a count therein.

With the arrival of the next H pulse, the multiplier counter C/U–2.10 will be debited one count. The add cycle will again be instituted and the contents of the entry register will again be added into the accumulator register. This operation continues until the multiplier counter has been counted down to zero, whereupon the multiplier counter zero buses 2:4R2 and 2:2L9 will contain a negative level thereon and enable AND gate C/U–2.6.

Multiplication phase 5

Since AND gate C/U–2.6 is now enabled, the following H pulse will cause a positive transition on the output thereof and advance the phase control counter to its phase 5 state as shown in FIGURE 145. Accordingly, as described supra, the multiply decoder C/U–2.8 will provide a positive voltage level on the phase 5 output bus 2:3T1 thereof.

The positive voltage level on the phase 5 bus 2:3T1 is applied to the multiply decoder phase 5 bus 4:4L6, this bus being an input terminal of AND gate C/U–2.28 (FIGURE 30). This AND gate will be enabled in the following manner: During RS time periods, a positive level signal is applied on the RS bus 4:4L8, this bus being an input terminal of AND gate C/U–2.29. Also, information remaining on track 5 will appear as negative pulses on the read amp. track 5 bus 4:4L9, this bus being the other input terminal of AND gate C/U–2.29. The positive transitions of the pulses on the read amp. track 5 bus 4:4L9 will provide positive-going transitions at the output of AND gate C/U–2.29 and will set the digit sense multiply register flip flop C/U–2.27. This will provide a negative level at the FF · output of the digit sense multiply register flip flop. With the next succeeding positive-going transition on the H bus 5:4R5, the digit sense multiply register flip flop C/U–2.27 will be reset and provide a positive-going transition on the FF · output thereof, this positive-going transition passing through the AND gate C/U–2.28 previously enabled by the positive level on the multiply decoder phase 5 bus. This positive-going transition appears on the reset FF4 and FF8 of phase control counter bus 4:4R3.

This positive transition on the reset FF4 and FF8 of phase control counter bus 4:4R3 is applied to the bus 2:2L5 to reset the phase control counter to its phase 2 state. This resetting of the phase control counter to its phase 2 state will be initiated due to the information still remaining in the track 4 storage register. The calculator will then proceed to operate in the multiply function from phase 2 on as described supra.

Multiplication phase 2

When the multiply decoder is in the phase 2 state, a positive level appears on the shift left accumulator bus 2:3T4.

This positive voltage level is applied to the shift left accumulator bus 3:1L1, an input terminal of OR gate C/U–3.1 (FIGURE 23). As explained supra, enabling of OR gate C/U–3.1 will, at W3 time, provide a negative level on the read bus 3:1R1 and thereby read the contents of the accumulator register into the up counter.

This positive voltage level of the shift left accumulator bus (2:3T4) is applied to the set input designated shift left accumulator (3:4L1) of the ACC SL DELAY flip flop C/U–2.18 (FIG. 26), setting the ACC SL DELAY flip flop on the application of the next succeeding positive-going transition signal on the reset input labelled H (3:4L2). The ACC SL DELAY flip flop will be reset, thus developing a positive-going transition at the output thereof. The input designated multiply (3:4L6) of OR gate C/U–2.20 (FIG. 26) will be at a positive voltage level, thereby enabling this OR gate and producing a positive voltage level at the output thereof.

This positive voltage level is then transferred to the input of the previously mentioned AND gate C/U–2.21 (FIG. 26) and, together with the positive transition signal developed at the output of the ACC SL DELAY flip flop C/U–2.18 (FIG. 26), as previously mentioned, the AND gate C/U–2.21 (FIG. 26) will be enabled, thereby producing a positive transition at the output designated set-read delay FF (3:4R1). This positive-going transition is applied to the set input designated common digit No. 1 (4:2L8) of the read delay flip flop M/U–4.5 (FIG. 28), thereby setting the read delay flip flop and producing a negative voltage level at the output thereof designated read delay FF· (4:2R2).

Gate C/U–5.1

The previously mentioned positive voltage level produced on the shift left accumulator bus (2:3T4) is applied to an input designated shift left accumulator (3:3L3) of the shift OR gate C/U–5.1 (FIG. 25), thus enabling this OR gate and producing a negative voltage level at the output thereof. This negative voltage level is applied to an input of the AND gate C/U–5.4 (FIG. 25) and, together with the positive-going transition signal applied to the input designated W2 (3:3T1) at the end of the first W2 time period, this AND gate C/U–5.4 (FIG. 25) will be disenabled and develop a positive-going transition signal on the up to down and reset up bus (3:3R1). The positive-going transition signal on the up to down and reset up bus (3:3R1) is applied to the input designated up to down and reset up (5:1L8) of a one shot circuit A/U–6.2 (FIG. 31), enabling this one shot circuit and producing a negative-going transition signal at the output thereof. This negative-going transition signal is applied to the input of the up to down and reset up network A/U–6.1 (FIG. 31), thereby developing a positive-going transition signal at the output designated read delay reset (5:1R5).

The positive-going transition signal on the read delay reset bus (5:1R5) is applied to the output designated read delay FF· (4:2R2) of the read delay flip flop M/U–4.5 (FIG. 28), thus forcing the read delay flip flop into a reset condition. Also, this positive-going transition signal (5:1R5) is applied to a set input of the write delay flip flop M/U–4.1 (FIG. 28), thereby setting the write delay flip flop.

Multiplication phase 5

When the phase control counter is advanced to its phase 5 state as shown in FIGURE 145, and no information remains in track 5 of the drum, no pulses are applied to the input bus of AND gate C/U–2.29 (FIGURE 30) designated read amp. track 5 bus 4:4L9. Therefore, the digit sense multiply register flip flop C/U–2.27 (FIGURE 30) will not be set and the input to the digit sense multiply register flip flop next appearing on the H bus 4:4L7 will have no effect thereon and not provide a positive-going transition on the FF· output thereof. Therefore, the AND gate C/U–2.28 is not enabled and the next incoming positive transition on the H bus 2:2L6 will advance the phase control counter continually, one step for each incoming positive transition thereto, through a complete cycle back to a zero count or phase zero. At this point, all inputs to the AND gate C/U–2.31 (FIGURE 19) will be at a negative level since each of the FF· terminals of the flip flops of the phase control counter are now at a negative level. The following H pulse on the H bus 2:2L6, after the phase control counter has been counted to its zero phase, provides a negative signal level at the input to AND gate C/U–2.31, thereby enabling the gate and causing a positive level signal to appear at the output thereof. This positive level signal is applied to the reset input of the function signal generator E/U–4.2 (FIGURE 16) along buses 2:2R9 and 1:3L4 to reset the multiply flip flop (not shown) in the function signal generator E/U–4.2. Concurrently, the negative signal level is developed on the multiply output bus 1:3R17 of the function signal generator multiply and divide circuit, this negative signal being transferred to the multiply bus 2:2L10, an input of OR gate C/U–2.7.

This OR gate is then disenabled and produces a positive level at the output thereof, this positive level being applied to one of the inputs of AND gate C/U–2.6 and disenabling this AND gate. Disenabling of AND gate C/U–2.6 prevents the phase control counter from being advanced by the application of further H pulses thereto.

The positive-going leading edge of the signal appearing at the output of AND gate C/U–2.31 is applied to an input terminal 3:4L3 of the digit sense flip flop C/U–2.19, thereby resetting this flip flop.

The above completes the set of operations required to provide the multiplication function.

DIVIDE

The divide operation is commenced by depressing and releasing the divide key of the function signal generator E/U–4.2 and thereby providing a positive voltage level on the divide buses 1:3L3 and 1:3R19 and a negative voltage level on the divide bus 1:3R20 to institute the phases of the divide operation as set forth in FIGURE 146.

The positive voltage level on the divide bus 1:3L3 is transferred to the divide bus 1:2B2 and enables OR gate E/U–3.5 in the same manner described supra to perform the operations associated therewith. The positive voltage level on the divide bus 1:3R19 is transferred along the divide bus 2:2L11 to the input of OR gate C/U–2.7 to provide a negative level output therefrom as described supra in the multiplication operation.

Since a negative level appears on buses 1:3R20 and 2:2R9, as described supra in the multiplication operation, the negative level output of OR gate C/U–2.7, in conjunction with a negative level on the multiply counter zero bus and a positive transition on the H bus will shift the phase control counter C/U–2.3 to phase 1 of the divide operation.

Divide Phase 1

When the phase control counter C/U–2.3 is shifted to phase 1 as depicted in FIGURE 147, a combination of signals is provided on the output buses 2:2R1 to 2:2R8 thereof to indicate a phase 1 divide operation. The voltage levels on these buses are transferred to the input buses of the divide decoder C/U–2.1 these buses being labelled 2:1B1 through 2:1B8. This operation sets the divide decoder to its phase 1 state, producing a positive level signal on the output lead therefrom labelled phase 1 sub bus 2:1T5.

The positive voltage level on the subtract bus 2:1T5 provides the same functions described supra when a positive level appears on the subtract bus 1:4R3. Therefore, the contents of the entry register will be subtracted from the contents of the accumulator register in the manner set forth hereinabove under subtraction with the following change:

Because neither the add nor subtract function keys have been operated, the subtract bus (1:4L1) and the add bus (1:4L2) will be at a negative voltage level. Therefore, the input labelled "subtract" (1:4L1) of AND gate C/U–1.3 (FIG. 17) will be at a negative voltage level and the input labelled "add" (1:4L2) of this AND gate C/U–1.3 (FIG. 17) will also be at a negative voltage level. Therefore, this AND gate will be enabled and a positive voltage level will be developed at the output thereof. This positive voltage level is applied to an input of AND gate C/U–1.4 (FIG. 17), disenabling this gate. Therefore, because the AND gate C/U–1.4 (FIG. 17) is disenabled, the borrow signal appearing on the BORROW FF· (1:4L3) of the AND gate C/U–1.4 (FIG. 17) will be inhibited and will have no effect on the COMP flip flop C/U–1.6 (FIG. 17). At those points of the divide operation wherein an integer is subtracted from a smaller integer to develop a borrow signal, the COMP flip flop C/U–1.6 (FIG. 17) will remain in its reset condition at the end of the H time period when a positive-going "transfer" signal is applied to the COMP flip flop.

Divide Phase 2

The next following positive transition on the H bus 2:2L6 will advance the phase control counter to phase 2 and thereby provide a positive voltage level on the phase 2 and add bus 2:1T8 of the divide decoder. Phase 2 of the division operation constitutes a restoration of the previously subtracted quantity (subtracted during phase 1) into the accumulator register. This restoration is provided by adding the contents of the entry register to the contents of the accumulator register, this function being the normal add function and, accordingly, the positive level on the add bus 2:1T8 will provide the same add function as provided by the add bus 1:4R2, when a positive voltage level appears thereon, thereby restoring the accumulator register to its original condition.

Divide phase 3

When the H bus 2:2L6 again shifts from a negative to a positive voltage level, the positive-going transition will shift the phase control counter to phase 3 of the divide operation and thereby, as described supra, place a positive voltage level on the phase 3 shift left entry bus 2:1T9. This positive voltage level on the shift left entry bus 2:1T9, as shown in FIGURE 148, provides the same function as a positive voltage level on the shift left entry bus 1:1R5 and, thereby, shifts the contents of the entry register one digit space to the left or, effectively, multiplies the contents of the entry register by 10.

The positive voltage level on the shift left entry bus 2:1T9 is also applied to the enabled jump to phase 1 at H bus 2:2L4. The application of this positive voltage level at the input of the phase control counter will, at the next H time, jump the phase control counter back to phase 1 rather than continuing the count onward to phase 4. The phase control counter then proceeds to cycle through the phase 1, phase 2 and phase 3 cycles of the divide operation until, at a subsequent time, a subtraction operation in phase 1 provides a negative value result.

When the subtraction in phase 1 of the divide operation provides a negative quantity in the accumulator register, the borrow flip flop A/U–5.1 (FIGURE 31) is set in the manner described supra during the borrow operation of the subtract function. Setting of the borrow flip flop will provide a negative voltage level on the borrow FF·bus 5:1R3 and also on the borrow FF·bus 2:2L8, thereby priming AND gate C/U–2.4 for conduction when a negative voltage level appears on the H bus 2:2L7. At the next H time when the H bus 2:2L7 goes negative, the output of the AND gate C/U–2.4 (FIGURE 19) will have a positive-going transition thereat and thereby jump the phase control counter to phase 4 by providing the positive-going transition on the jump to phase 4 command bus.

Divide phase 4

When the phase control counter has shifted to the phase 4 state, a positive voltage level is provided on the phase 4 and add bus 2:1T8 of the divide decoder C/U–2.1. This add function is identical to the add function of phase 2 of division and adds the contents of the entry register back into the accumulator register as described previously for the add function.

Divide phase 5

At the next postive-going transition in the H bus 2:2L6, the phase control counter will advance to phase 5 which is a shift right entry function as depicted in FIGURE 149. A positive voltage level will appear on the phase 5 shift right entry bus 2:1T7 of the divide decoder in the manner previously described.

In the shift right entry register operation, the positive voltage level on the shift right entry bus 2:1T7 is applied to the shift right entry bus 3:1L17, this bus being an input terminal of the OR gate C/U–3.2. As explained supra, enabling of OR gate C/U–3.2 will cause a negative level to appear on the read bus 3:1R1 at W4 time and, thereby, as explained supra, read the contents of the entry register into the up counter.

The positive voltage level on the shift right entry bus 2:1T7 is also applied to the shift right entry bus 3:3L16, this bus being an input terminal of the OR gate C/U–5.3. As explained supra, enabling of OR gate C/U–5.3 will provide a negative voltage level on the up to down and reset up bus 3:3R1 at the trailing edge of W4 time, thereby transferring the contents of the up counter into the down counter and resetting the up counter.

The positive voltage level on the shift right entry bus 2:1T7 is also applied through the inverter C/U–2.2 to the shaft right entry bus 2:1T1 and thereby to the shift right entry bus 4:3L2 as a negative voltage level. During W2 time when a negative voltage level appears on the W2 bus 4:3L1, the AND gate M/U–3.1 is enabled and provides a positive voltage output thereat.

The positive voltage level at the output of AND gate M/U3.1 is applied to one of the input terminals of OR gate M/U–3.4 and is described as an N signal. This positive N signal at an input terminal of OR gate M/U–3.4 provides a negative voltage level at the output thereof.

The positive voltage level at the output of AND gate M/U–3.1 is also applied to the inverter M/U–3.7 to provide a negative voltag level on the N bus 4:3R1, this negative voltage level being applied to the N bus 5:3L2. The positive voltage level on the bus 5:3L2 is applied to an input terminal of each of AND gates M/U–3.11 and M/U–3.12, the other input terminal of each of these gates being fed by the write FF· and write FF· output terminals 5:3L1 and 5:3L3.

Since the output of OR gate M/U–3.4 (FIGURE 29) is at a negative level and, concurrently, the down counter zero bus 4:3L7 is at a negative level due to the non-zero condition of the down counter, AND gate M/U–3.5 is enabled and pulses read by the read head from track 3 M/U–3.6 pass to the write flip flop M/U–3.9 and the shape and invert circuit M/U–3.10 in the manner described supra. Accordingly, the alternate negative levels on the write FF· and write FF. buses, in conjunction with the negative level N signal on bus 5:3L2, will enable the AND gates M/U–3.11 and M/U–3.12 to pass pulses therethrough in the manner described supra. Thereby the contents of the down counter are placed in track 4 via track 4 write head 2 (M/U–3.17) (FIGURE 33) to shift the contents of the entry register one position to the right.

Divide phase 6

At the end of the phase 5 operation, the next succeeding positive transition on the H bus 2:2L6 will advance the phase control counter to phase 6 and thereby, in the manner described above, provide a positive voltage level on the phase 6 shift left multiplier quotient register bus 2:1T6 of the divide decoder, and provide the steps set forth in FIGURE 144.

The positive voltage level on the shift left multiplier quotient register bus 2:1T6 is transferred to the shift left multiplier quotient register bus 2:5L1 and thereby enables OR gate C/U–2.12 (FIGURE 22) as explained supra in phase 3 of the multiplication operation. Thus, as explained supra, the AND gate M/U–2.4 (FIGURE 32) is enabled and the contents of the track 5 are read into the up counter. This reading of the contents of the multiplier quotient register into the up counter will take place during the W1 time period because the contents of the multiplier quotient register pass under track 5 read head at W1 time.

The contents of the up counter are shifted to the down counter and the up counter is reset by the application of the positive voltage level on the shift left multiplier quotient register bus 2:1T6 to the shift left multiplier quotient register bus 3:3L19, thereby enabling the OR gate C/U–5.3 (FIGURE 25). In the manner described supra, enabling of the OR gate C/U–5.3 will provide the necessary signal on bus 3:3R1 at the trailing edge of W4 time, to shift the contents of the up counter into the down counter and resetting the up counter.

The positive voltage level on the shift left multiplier quotient register bus 2:1T6 is also applied to the shift left multiplier quotient register bus 2:5L6 and thereby enables the OR gate C/U–2.14 (FIGURE 22) in the same manner indicated supra. Accordingly, as described supra, at W4 time, a significant write TK5 signal will be produced at the output of AND gate C/U–2.15 to read the contents of the down counter into the multiplier quotient register during the W4 time period.

Divide phase 7

After the phase 6 operation has been completed, the next positive-going transition on the H bus 2:2L6 will advance the phase control counter to its phase 7 state and thereby provide a positive voltage level on the phase 7 subtract bus 2:1T5 of the divide decoder.

The phase 7 subtract operation is identical to the phase 1 subtraction and will subtract the contents of the entry register from the contents of the accumulator register in the same manner described supra for the phase 1 operation.

Divide phase 8

At the next positive voltage transition on the H bus 2:2L6, the phase control counter will shift to its phase 8 state and thereby provide a positive voltage level on the phase 8 and add one to the multiplier quotient register bus 2:1T4 of the divide decoder as indicated in FIGURE 150.

The division phase 8 operation proceeds in the following manner: At the beginning of the phase 8 condition of the divide decoder, phase 8 bus 2:1T4 is shifted from a negative level to a positive level thereby providing a positive-going transition thereon. This positive transition is transferred to the add 1 to the multiplier quotient register bus 4:2L3 and thereby sets the wire delay flip flop M/U–4.4.

The positive voltage transition on the add 1 to the multiplier quotient register bus 2:1T4 is also applied to the add 1 to the multiplier quotient register bus 4:1L6 of the up counter, thereby setting the number 1 flip flop at this time (at the beginning of W1 time). The subsequent bits obtained by a reading out of the count in track 5 is also read into the up counter due to the negative voltage level on the enabled track 5 read gate bus 2:5R1 and 5:2L5 thereby adding "1" to the present contents of the multiplier quotient register. This sum is then subsequently rewritten back into the multiplier quotient register. It is to be noted that, due to the setting of the write flip flop, an excess 1 bit will be placed into the multiplier quotient register in the same manner as previously described.

The positive voltage level on the add one to the multiplier quotient register bus 2:1T4 is also applied to the add one to multiplier quotient register bus 3:3L1 and, thereby, as explained supra, enables OR gate C/U–5.1 and provide a negative voltage level on the up to down and reset up bus 3:3R1 at the W2 period.

Accordingly, at the trailing edge of W2 time, the contents of the up counter are shifted to the down counter and the up counter is reset.

The positive voltage level on the add 1 to the multiplier quotient register bus 2:1T4 is also applied to the add one to the multiplier quotient register bus 2:5L3, this being an input terminal of the OR gate C/U–2.12.

As explained supra, the positive voltage level at the input or OR gate C/U–2.12 provides an enabling pulse for the AND gate M/U–2.4 which, in conjunction with an RS signal thereto, will read the contents from track 5 into the up counter, this function taking place immediately upon sensing any data stored in track 5.

The positive voltage level on the add 1 to the multiplier quotient register bus 2:1T4 will also be transferred to the add 1 to the multiplier quotient register bus 2:5L8, thereby providing a positive level on an input terminal of the OR gate C/U–2.14. As explained supra, enabling of OR gate C/U–2.14 will provide a significant level at the output thereof so that the track 5 write head will be energized during the W4 time period to write the contents of the down counter back into track 5 of the drum.

Jump divide phase 8 to phase 7

The positive voltage level on the bus 2:1T4 is also applied to the enable jump phase 8 to phase 7 bus 2:2L2 and, thereby, at the conclusion of the phase 8 operation, will shift the phase control counter back to the phase 7 state. Thereby, the phase 7 and phase 8 operations of the multiplication operation will be continued until a negative number is sensed in the accumulator register.

Jump to divide phase 4

This negative number will occur when a substraction during the phase 7 operation results in a negative result, thereby providing a positive voltage level signal on the enable jump to phase 4 bus 2:2I1 and thereby jumping the phase control counter back to phase 4.

The operation now continues with phase 4 and continues through phases 5, 6, 7 and 8 in the manner previously described.

Jump to divide phase 9

Upon jumping from the phase 7 operation back to the phase 4 operation as described above (when an advance to the phase 5 operation produces a low order digit overflow), a jump from the phase 5 state to the phase 9 state is produced in the following manner: At the commencement of a phase 5 divide operation, the change from a negative level to a positive level on the phase 5 shift right entry bus 2:1T7 is also placed on the shift right entry bus 4:4L1, thereby setting the first digit gate flip flop C/U–2.24 and producing a negative level on the FF· output thereof. This negative level, in conjunction with a negative level on the RS bus 4:4L4 and a negative level on the W4 bus 4.4L5, will enable AND gate C/U–2.25 upon the occurrence of a negative level on the track 4 read bus 4:4L3, thereby providing a change from a negative level to a positive level at the output of this AND gate. Each pulse along the track 4 read bus 4:4L3 will provide a positive-going transition at the output of AND gate C/U–2.25, these positive-going transitions being applied to the entry register digit overflow flip flop C/U–2.26, thereby setting this flip flop and producing a negative level on the jump to phase 9 command at H bus 4:4R1.

The negative level on the jump to phase 9 command at H bus 4:4R1 is shifted to a positive level upon the occurrence of a positive voltage transition on the H bus 4:4R2, this pulse resetting the entry register digit overflow flip flop and providing a positive transition on the jump to phase 9 command at H bus 4:4R1, this positive transition being transferred to the jump to phase 9 command at H bus 2:2L3 and, thereby, jumping the phase control counter to phase 9. This jump to phase 9 takes place concurrently with the application of an H pulse to the phase control counter via H bus 2:2L6.

Divide phase 9

When the phase control counter is set to phase 9, in the manner described supra, the divide decoder provides a positive level during phase 9 on the transfer from accumulator to entry register bus 2:1T3 as described in FIGURE 151.

The positive voltage level on the transfer from accumulator to entry register bus 2:1T3 provides a positive voltage level on the similarly designated bus 3:1L9, this bus being an input terminal of the OR gate C/U–3.1 (FIGURE 23) to enable this gate. In the manner described supra, enabling of OR gate C/U–3.1 provides a significant voltage level on the read bus 3:1R1 at the W3 time period and the contents of the accumulator register are transferred into the up counter.

The positive voltage level on the transfer from accumulator to entry register bus 2:1T3 is applied to the similarly named bus 3:3L15, this bus being an input terminal of the OR gate C/U–5.3 (FIGURE 25) and, as explained supra, enables this OR gate and, thereby, provides a positive going transition on the up to down and reset up bus 3:3R1 at the trailing edge of W4 time. Accordingly, the contents of the up counter will be transferred to the down counter and the up counter will be reset.

The positive voltage level on the transfer from accumulator to entry register bus 2:1T3 provides a positive voltage level on the similarly named bus 3:2L14 and, as described supra, enables OR gate C/U–4.2 and provides a significant voltage level on the write bus 3:2R1 during the W3 time period to write the contents of the down counter into the entry register.

It should be understood that the contents of the accumulator register which are read into the entry register at this time represent the remainder of the division operation.

Divide phase 10

The next incoming positive voltage transition on the H bus 2:2L6 will advance the phase control counter to phase 10 as described in FIGURE 152 and thereby provide a positive voltage level on the phase 10 transfer from multiplier quotient register to accumulator register bus 2:1T2 of the divide decoder.

The positive voltage level on the transfer from multiplier quotient register to accumulator register bus 2:1T2 is impressed on the similarly named bus 2:5L2, thereby enabling OR gate C/U2.12 (FIGURE 22) in the manner previously described. Accordingly, the track 5 read head AND gate M/U2.4 (FIGURE 32) will be enabled and transfer the contents of track 5 into the down counter as soon as read, this being during W1 time. This operation is fully explained supra.

The positive voltage level on the transfer from multiplier quotient register to the accumulator register bus 2:1T2 provides a positive level on the similarly named bus 3:33L6, thereby enabling OR gate C/U5.2 (FIGURE 25) and providing a positive going transition on the up to down and reset up bus 3:3R1 at the trailing edge of the W3 time period in the manner similarly set forth supra. Accordingly, the contents of the up counter are shifted to the down counter and the up counter is reset.

The positive voltage level on the transfer from the multiplier quotient register to the accumulator register bus 2:1T2 is also transferred to the similarly named bus 3:2L6, thereby enabling the OR gate C/U–4.1 (FIGURE 24). As explained supra, by enabling OR gate C/U–4.1, the write bus 3:2R1 will have a significant voltage level applied thereto during the W2 time period and, thereby, write the contents of the down counter into the accumulator register.

Accordingly, in the division operation the quotient is now stored in the accumulator register and the remainder is stored in the entry register.

This completes the basic operation required to perform a division operation.

TRANSFER TO TEMPORARY STORAGE 1

The contents of the accumulator register are transferred to the temporary storage register No. 1 by depression and release of the T1 key (FIGURE 16) of the function signal generator E/U–4.1 as shown in FIGURE 153. As described supra, depression and release of the transfer to storage register 1 key will provide a positive level on the bus 1:3T10, thereby providing a significant level at the output of OR gate E/U–3.5 (FIGURE 15) as described supra. Also, a positive voltage level will be applied to the T1 bus 1:3R2 and a negative level will be applied to the T1 bus 1:3R1.

The positive voltage level on the bus 1:3R2 is transferred to the T1 bus 3:1L2 (FIGURE 23), this bus being an input terminal of the OR gate C&U–3.1 to enable this gate. As set forth supra, by enabling of OR gate C/U–3.1, the contents of the accumulator register will be read into the up counter at the W3 time period due to this positive level at the input of OR gate C/U–3.1.

The positive level on bus 1:3R2 is transferred to the T1 bus 3:3L7, enabling the OR gate C/U–5.2 and thereby providing a positive going transition on the up to down and reset up bus 3:3R1 as explained supra. Thereby, the contents of the up counter are transferred to the down counter and the up counter is reset.

The negative voltage level on the T1 bus 1:3R1 is transferred to the T1 bus 3:2L10, thereby providing a negative input level to one input terminal of the AND gate C/U–4.5 (FIGURE 24). When a negative level appears on the W4 bus 3:2L9, the AND gate C/U–4.5 is enabled and provides a negative output level thereat and at an input terminal of OR gate C/U–4.7. This negative input level to OR gate C/U–4.7 will provide a significant voltage level on the write bus 3:2R1 as discussed supra. The above steps will transfer the contents of the accumulator register into the temporary storage register No. 1.

TRANSFER TO TEMPORARY STORAGE 2

Information is transferred from the accumulator register to the temporary storage register No. 2 in a manner similar to the transfer from the accumulator register to the storage register No. 1 described supra. This operation is commenced by the depression and release of the T2 key of the function signal generator, thereby enabling the OR gate E/U–3.5 as described supra and providing a negative voltage level on the T2 bus 1:3R3 and a positive voltage level on the T2 bus 1:3R4 as shown in FIGURE 154.

The positive voltage level on the T2 bus 1:3R4 is transferred to the T2 bus 3:1L3, this bus being an input of OR gate C/U–3.1 to enable this gate. As described supra, enabling of OR gate C/U–3.1 will provide a significant voltage level on the read bus 3:1R1 and thereby transfer the contents of the accumulator register to the up counter during the W3 time period.

The appearance of the positive voltage level on the T2 bus 1:3R4 also provides a positive voltage level on the T2 bus 3:3L8, thereby enabling the OR gate C/U–5.2 and, as described supra, providing an up to down and reset up signal on the bus 3:3R1 at the trailing edge of W3 time. Thereby, the contents of the up counter are transferred to the down counter and the up counter is reset.

The negative voltage level appearing on the T2 bus 1:3R3 is transferred to the T2 bus 3:2T3, this bus being an input terminal of the AND gate C/U–4.3. When a concurrent negative voltage level also appears on the W1 bus 3:2T2, AND gate C/U–4.3 is enabled and provides a negative output level thereat and at an input terminal of OR gate C/U–4.7 to provide a significant signal on the write bus 3:2R1 in the manner described supra.

The above operations will transfer the contents of the accumulator register into the temporary storage register No. 2.

RECALL FROM TEMPORARY STORAGE 1

Information can be transferred from the temporary storage register No. 1 into the entry register by depressing and releasing the R1 key of the function signal generator as shown in FIGURE 155. Depression and release of the R1 key will provide a positive voltage level on the R1 bus 1:3T8 and thereby provide a negative level at the output of OR gate E/U–3.5 to provide the operations described supra. Also, a negative level will appear on the R1 bus 1:3R5 whereas, a positive level will appear on the R1 bus 1:3R6.

The negative voltage level on the R1 bus 1:3R5 will provide a negative voltage level on the R1 bus 3:1T2, this bus being an input terminal of the AND gate C/U–3.3. When a concurrent negative level appears on the W1 bus 3:1T3, AND gate C/U–3.3 (FIGURE 23) will be enabled and provide a negative level at the output thereof and at an input terminal of OR gate C/U–3.7 to provide a significant read signal on the read bus 3:1R1 as set forth supra. Therefore, the contents of the temporary storage register No. 1 are read into the up counter.

The positive voltage level on the R1 bus 1:3R6 is transferred to the R1 bus 3:3L9, thereby enabling the OR gate C/U–5.2 (FIGURE 25) and providing a positive going transition on the up to down and reset up bus 3:3R1 at the trailing edge of W3 time as explained supra. This positive going transition on the up to down and reset up bus will transfer the contents of the up counter to the down counter and reset the up counter.

The positive voltage level on the R1 bus 1:3R6 will provide a positive voltage level on the R1 bus 3:2L12, thereby enabling the OR gate C/U–4.2 (FIGURE 24) and providing a significant voltage level on the write bus 3:2R1 during the W3 time period as explained supra. Accordingly, the contents of the down counter will be written into the entry register.

The above operations are required to recall the contents of the storage register No. 1 into the entry register.

RECALL FROM TEMPORARY STORAGE 2

The contents of the temporary storage register No. 2 are recalled to the entry register by the depression and release of the R2 key (FIGURE 16) of the function signal generator as shown in FIGURE 156. Depression and release of the R2 key provides a positive voltage level on the R2 bus 1:3T9 to enable the OR gate E/U–3.5 (FIGURE 15) and provide the functions as described supra in connection therewith. Depression and release of the R2 key will also provide a negative voltage level on the R2 bus 1:3R7 and a positive level on the R2 bus 1:3R8.

The appearance of a positive level on the R2 bus 1:3R7 provides a negative level on the R2 bus 3:1L11, this bus being an input terminal of the AND gate C/U–3.5 (FIGURE 23). When a negative level appears on the W2 bus 3:1L10, AND gate C/U–3.5 is enabled and provides a negative output level thereat and at an input terminal of OR gate C/U–3.7 to provide a significant read signal on the read bus 3:1R1 as described supra. The contents of the temporary storage register No. 2 are therefore transferred to the up counter.

The appearance of a positive level on the R2 bus 1:3R8 will provide a positive level on the R2 bus 3:3L11, thereby enabling the OR gate C/U–5.2 (FIGURE 25) and, at the trailing edge of the W3 time providing a positive going transition on the up to down and reset up bus 3:3R1 as explained supra. This positive going transition on the up to down and reset up bus 3:3R1 will shift the contents of the up counter to the down counter and reset the up counter.

The presence of a positive level on the R2 bus 1:3R8 will provide a positive level on the R2 bus 3:2L13, thereby enabling the OR gate C/U–4.2 (FIGURE 24) and, as described supra, thereby provide a significant voltage level on the write bus 3:2R1 during the W3 time period. Therefore, the contents of the down counter will be written into the entry register.

The above operations are required to recall the contents of the temporary storage register No. 2 into the entry register.

H DELAY CIRCUIT OPERATION

The H delay circuit is designed to clear the up counter and down counter of surplus numbers which may incidentally have been left in the counters at the end of an H time. At the end of every H period, a positive-going transition signal is applied to an input labelled H (5:1B1) of a special one shot circuit A/U–6.2 (FIG. 31). This special one shot circuit contains an H delay network wherein, upon the introduction of the previously mentioned positive-going transition signal on the H bus, a delayed signal will be initiated by the initial H signal. On the application of the initial positive-going transition (H) signal to the previously-mentioned one shot A/U–6.2 (FIG. 31), a negative-going transition signal will be developed at the output thereof. This negative-going transition signal is applied to the input of the up to down and reset up counter network A/U–6.1 (FIG. 31), causing a typical positive-going transition up to down and reset up counter signal to be developed on the output labelled up to down and reset up (5:1R6).

This positive-going transition signal is applied to an input designated up to down and reset up (4:1L11) of the up counter A/U–1.1 (FIG. 27). Also, this positive-going transition signal will be applied to the input designated up to down and reset up counter (5:1L1) of the AND gates A/U–4.3 and A/U–4.4 (FIG. 31) and resetting the carry flip flop A/U–4.1 (FIG. 31) if the carry flip flop has been set. Finally, this positive-going transition signal will be applied to the input designated up to down and reset up (6:1L11) of the down counter A/U–2.1 (FIG. 35). Therefore, whatever count may have remained in the up counter at the end of the H time period is now transferred to the down counter and the up counter will be reset to zero.

The H delay signal which is developed shortly after the application of the initial H signal at the end of the H time period will also produce a negative-going transition signal at the output of the special one shot circuit A/U–6.2 (FIG. 31). This negative-going transition signal is applied to the up to down and reset up counter network A/U–6.1 (FIG 31), causing a positive transition signal to be developed at the output thereof, designated up to down and reset up (5:1R6). This positive-going transition signal is applied to the previously mentioned inputs designated up to down and reset up (4:1R11) of the up counter A/U–1.1 (FIG. 27), reset up counter (5:1L1) of the carry flip flop A/U–4.1 (FIG. 31) and the AND gates A/U–4.3 and A/U–4.4 (FIG. 31) and the input designated "up to down and reset up" (6:1L11) of the down counter A/U–2.1 (FIG. 35).

Therefore an additional transfer operation will be initiated wherein the zero now contained in the up counter will be transferred to the down counter, leaving a zero in the down counter and resetting the up counter and leaving a zero in the up counter, i.e., clearing the up and down counters.

SHIFT LEFT ACCUMULATOR REGISTER

The contents of the accumulator register may be shifted to the left by depression and release of the shift left key (arrow pointing to the left) (FIGURE 16) of the function signal generator. Depression and release of the shift left key will provide a positive level on the shift left accumulator bus 1:3T6, thereby enabling the OR gate E/U–3.5 (FIGURE 15) and providing the functions thereof as discussed supra. Also, a positive voltage level will appear on the shift left accumulator bus 1:3R11.

This positive voltage level on the shift left accumulator bus (1:3R11) is applied to the set input designated shift left accumulator (3:4L1) of the ACC SL DELAY flip flop C/U–2.18 (FIG. 26), setting the ACC SL DELAY flip flop on the application of the next succeeding positive-going transition signal on the reset input labelled H (3:4L2). The ACC SL DELAY flip flop will be reset, thus developing a positive-going transition at the output thereof. The input designated multiply (3:4L6) of OR gate C/U–2.20 (FIG. 26) will be at a positive voltage level, thereby enabling this OR gate and producing a positive voltage level at the output thereof.

This positive voltage level is then transferred to the input of the previously-mentioned AND gate C/U–2.21 (FIG. 26) and, together with the positive transition signal developed at the output of the ACC SL DELAY flip flop C/U–2.18 (FIG. 26), as previously mentioned, the AND gate C/U–2.21 (FIG. 26) will be enabled, thereby producing a positive transition at the output designated set-read delay FF (3:4R1). This positive-going transition is applied to the set input designated common digit No. 1 (4:2L8) of the read delay flip flop M/U–4.5 (FIG. 28), thereby setting the read delay flip flop and producing a negative voltage level at the output thereof designated read delay FF·(4:2R2).

The positive voltage level developed on the shift left accumulator bus (1:3R11), previously mentioned, is also applied to the input designated shift left accumulator (3:1L1) of the OR read gate C/U–3.1 (FIG. 23), thereby enabling this OR gate and producing a negative voltage level at the output thereof. This negative voltage level is then applied to an AND gate C/U–3.4 (FIG. 23) and, together with the negative signal level applied at the other input thereof labelled W3 (3:1T1) during the first W3 time, this AND gate C/U–3.4 (FIG. 23) will be enabled and develop a negative voltage level "read" signal on the read bus (3:1R1). The integer in the units position of the accumulator register is then read from the accumulator register into the up counter.

The previously mentioned positive voltage level produced on the shift left accumulator bus (1:3R11) is applied to an input designated shift left accumulator (3:3L3) of the shift OR gate C/U–5.1 (FIG. 25), thus enabling this OR gate and producing a negative voltage level at the output thereof. This negative voltage level is applied to an input of the AND gate C/U–5.4 (FIG. 25) and, together with the positive-going transition signal applied to the input designated W2 (3:3T1) at the end of the first W2 time period, this AND gate C/U–5.4 (FIG. 25) will be disenabled and develop a positive-going transition signal on the up to down and reset up bus (3:3R1). The positive-going transition signal on the up to down and reset up bus (3:3R1) is applied to the input designated up to down and reset up (5:1L8) of a one shot circuit A/U–6.2 (FIG. 31), enabling this one shot circuit and producing a negative-going transition signal at the output thereof. This negative-going transition signal is applied to the input of the up to down and reset up network A/U–6.1 (FIG. 31), thereby developing a positive-going transition signal at the output designated read delay reset (5:1R5).

The positive-going transition signal on read delay reset bus (5/1R5) is applied to the output designated read delay FF·(4:2R2) of the read delay flip flop M/U–4.5 (FIG. 28), thus forcing the read delay flip flop into a reset condition. Also, this positive-going transition signal (5:1R5) is applied to a set input of the write delay flip flop M/U–4.1 (FIG. 28), thereby setting the write delay flip flop.

The positive voltage level developed on the shift left accumulator bus (1:3R11), previously mentioned, is applied to the shift left accumulator (3:2L5) input of the write OR gate C/U–4.1 (FIG. 24), thus enabling this OR gate and producing a negative voltage level at the output thereof. This negative voltage level is applied to an input of an AND gate C/U–4.4 (FIG. 24) and, together with the negative voltage level applied to the W2 input (3:2T1) during the second W2 time period to enable this AND gate and develop a positive voltage level write signal on the write bus (3:2R1). This positive voltage level is applied to the write input (4:3L5) of the write OR gate M/U–3.4 (FIG. 29), thereby enabling this OR gate and producing a negative voltage level at the output thereof designated N or WRITE or WRT TK5 (FIG. 29). This negative voltage level is then applied to an input of an AND gate M/U-3.5 (FIG. 29) and, together with the negative signal level applied to the down counter zero input (4:3L7) and the negative bit timing pulses from the read from TK3 circuit M/U-3.6 (FIG. 29) on the remaining input, this AND gate M/U-3.5 (FIG. 29) will be enabled and develop positive pulses at the output thereof. (Input 4:3L7 is placed at a negative voltage level because the write delay flip flop M/U-4.4 of FIG. 28 is set, thereby enabling the down counter zero gate in the down counter A/U-2.1 of FIG. 35 and developing a negative voltage level on the down counter zero bus 6:1B2.)

The first of these positive pulses as applied to the input of the shape and invert circuit M/U-3.10 (FIG. 29) will cause a negative pulse to be produced at the output thereof designated reset write delay FF (4:3R5). The positive-going trailing edge of this negative pulse is applied to the reset write delay FF (4:2L6) input of the write delay flip flop M/U-4.4 (FIG. 28), thereby resetting the write delay flip flop and producing a negative voltage level at the output thereof designated write delay FF. (4:2R1). This negative voltage level will then disenable the down counter zero gate in the down counter A/U-2.1 (FIG. 35) and produce a positive voltage level on the down counter zero bus (6:1B2). This positive voltage level is then applied to the down counter zero input (4:3L7) of the AND gate M/U-3.5 (FIG. 29), thus disenabling this AND gate and preventing further bit pulses from passing through this gate.

Therefore, one "information" bit (a positive pulse) will be applied to the complement input of the write flip flop M/U-3.9 (FIG. 29) and thus, cause a change of voltage level at the output terminals thereof designated WRT FF· (4:3R3) and WRT FF. (4:3R4). This single change of voltage levels will be applied to the WRT FF· (5:3L4) input of an AND gate M/U-3.1 (FIG. 33) and the WRT FF. (5:3L6) of the AND gate M/U-3.14 (FIG. 33) and, together with the negative signal level on the write bus (5:3L5) will enable these AND gates and cause a single change of voltage level at the output terminals thereof. This single change of voltage level is then applied to the write track 4 head No. 1 M/U-3.18 (FIG. 33), thereby causing a single bit representing a "0" to be written into the accumulator register. Therefore, each time the shift left accumulator key is operated, a zero will be produced and displayed to the right of the least significant or lowest order integer.

SHIFT RIGHT ACCUMULATOR REGISTER

The contents of the accumulator register can be shifted to the right by depression and release of the shift right key (arrow pointing to the right) of the function signal generator as indicated in FIGURE 157. Depression and release of the shift right accumulator key (FIGURE 16) will provide a positive voltage level on the shift right accumulator bus 1:3T5, thereby enabling the OR gate E/U-3.5 (FIGURE 15) and providing the operations consonant therewith. Also, a positive voltage level will appear on the shift right accumulator bus 1:3R10 and a negative voltage level will appear on the shift right accumulator bus 1:3R14 due to the inverter E/U-4.5.

The positive voltage level on the shift right accumulator bus 1:3R14 is transferred to the shift right accumulator bus 3:1L7, thereby enabling the OR gate C/U-3.1. As discussed supra, enabling of OR gate C/U-3.1 provides a significant voltage level on the read bus 3:1R1 at the W3 time period, thereby reading the contents of the accumulator register into the up counter.

The positive voltage level on the shift right accumulator bus 1:3R10 is also applied to the shift right accumulator bus 3:3L13 to enable the OR gate C/U-5.2 and thereby provide a positive going transition on the up to down and reset up bus 3:3R1 at the trailing edge of W3 time as described supra. This positive going transition on the up to down and reset up bus 3:3R1 will shift the contents of the up counter into the down counter and reset the up counter.

The negative voltage level on the shift right accumulator bus 1:3R14 will provide a negative voltage level on the shift right accumulator bus 4:3L4, this bus being an input terminal of the AND gate M/U-3.2. During the W1 time period, a concurrent negative voltage level apears on the W1 bus 4:3L3, thereby enabling the AND gate M/U3.2 and providing a positive level at the output thereof.

The positive voltage level at the output terminal of AND gate M/U-3.2 enables OR gate M/U-3.4 and, thereby, as described supra, will write the contents of the down counter into the accumulator register during the W1 time period.

The above operations will shift the contents of the accumulator register one digit position to the right.

Initial clearing of calculator

Before initiating operation of the calculator, it is often desirable and even necessary to clear one or more of the registers on track 4 and/or track 5 of the drum. These operations are performed in the following manner:

CLEAR ENTRY KEY

The entry register is cleared or erased by closure of the clear entry key E/U-4.6 (FIGURE 15). Closure of this key completes a circuit and provides a positive voltage level on the clear entry bus 1:2R1. In the manner described supra during the discussion of the clear entry operation, the entry register will be cleared since the same type of positive level is applied to the clear entry bus by closure of the clear entry key as was provided in the prior discussion by the enabling of the AND gate E/U-3.3.

The positive voltage level on the clear entry bus 1:2R1 is also transferred to the clear entry bus 2:5L9, this bus being an input terminal of OR gate C/U-2.14. As explained supra, a significant voltage level will be applied to the write driver track 5 bus 2:5R3 and, during the W4 time period, to the write track 5 bus 2:5R4 due to enabling of OR gate CU/2.14.

Since the write flip flop M/U-3.9 is not complemented due to the disenabling of AND gate M/U-3.5 at this time, only one of the AND gates M/U-3.13 or M/U3.14 will be energized and, therefore, write track 4 head will erase the contents of track 4 whenever the entry register appears thereunder as explained supra. Also, only one of the AND gates M/U-3.15 or M/U-3.16 will be energized during the W4 time period. Since the track 5 write head is over the multiplier quotient portion of track 5 during the W4 time period, write track 5 head will erase the contents of the multiplier quotient register.

CLEAR ENTRY AND ACCUMULATOR REGISTER KEY

Both the entry register and the accumulator register may be cleared of any information thereon by closure of the clear key E/U-4.4, thereby placing a positive voltage level on the clear bus 1:3R15. Also, this change to a positive voltage level will be delayed by the delay one shot circuit E/U-4.3. The output of the delay circuit is a positive voltage level Therefore, this change to a positive voltage level on the clear delta bus 1:3L1 is applied, through diode E/U-4.7, to the clear delta bus 1:4L4 and, thereby, setting the accumulator sign flip flop C/U-1.5.

The output on the clear delta bus 1:3R16 is also applied to the clear delta bus 2:5R2, this positive voltage being applied through diode C/U-2.30 to the FF. bus of the clear Q register flip flop C/U-2.13 and, thereby, setting this flip flop.

The positive voltage level on the clear bus 1:3R15 is applied to the clear bus 3:2L2 and to the clear bus 3:2L11. As explained supra, the positive level on the clear bus 3:2L2 will enable the OR gate C/U-4.1 and thereby, during W2 time, provide a significant voltage level on the write bus 3:2R1, thereby writing the contents of the down counter into the accumulator register. Since the down counter has no count therein, no bits will be entered into the accumulator register and, accordingly, this register will be erased.

The positive level on the clear bus 3:2L11 will enable the OR gate C/U–4.2 and, as described supra, thereby provide a significant voltage level on the write bus 3:2R1 during the W3 time period. Since the down counter will have no count contained therein no bit information will be written from the down counter and accordigly, the entry register will have no bit information written therein as explained hereinbelow.

The positive voltage level on the clear delta bus 1:3R16 is applied to an input terminal of the OR gate C/U–2.14. As explained supra, enabling of OR gate C/U–2.14 provides a significant voltage level on the write driver track 5 bus 2:5R3 and, during th W4 time period, to the write track 5 bus 2:5R4.

Since the write flip flop M/U–3.9 (FIGURE 29) is not complemented due to the disenabling of the AND gate M/U–3.5 (FIGURE 29) at this time, only one of the AND gates M/U–3.13 or M/U–3.14 (FIGURE 33) will be energized and,therefore, write track 4 head No. 1 will erase the contents of track 4 whenever the entry and accumulator registers appear thereunder as explained supra. Also, only one of the AND gates M/U–3.15 or M/U–3.16 will be energized during the W4 time period. Since the track 5 write head is over the multiplier quotient portion of track 5 during the W4 time period, write track 5 head will erase the contents of the multiplier quotient register. Accordingly, the calculator will be reset to compute a new problem at this time.

DISPLAY SYSTEM

The following is a description of the operation of a preferred embodioent of a display system which can be utilized with the calculator in accordance with the present invention. It is understood that many utilization devices beside the one described herein could be utilized, such as other displays, punches, printers, etc.

The content of each of the storage registers on track 4 of the drum will be constantly displayed by the display device. The content of each register is displayed on a separate row on the face of a cathode ray tube, thereby indicating the contents of each element of the individual registers, i.e., the entry register, the accumulator register, the temporary storage register No. 1 and the temporary storage register No. 2.

We assume initially that the track 4 reading head is at the trailing edgt of the dead time portion of track 4, and is about to commence reading of the data stored in the first or least significant digit position of the temporary storage register No. 1. This section of the temporary storage Register No. 1 is indicated by the numbers 1/1 of track 4 in FIGURE 6.

As the track 4 read head passes over the first section (1/1) of the temporary storage register No. 1, all bits stored therein will be read and, for each bit read, a pulse will be obtained having a negative-going transition, this negative-going transition being applied to the track 4 read but 5:2R6. This negative-going transition also appears on the track 4 read bus 7:3L2, this bus being an input terminal of the AND gate D/U–1.5. The concurrence of a negative level on the RS bus 7:3L3 and the negative-going transition on the track 4 read bus will enable AND gate D/U–1.5 and provide a positive-going transition at the output thereof, this positive-going transition being applied to the complement input of the No. 1 flip-flop of a display entry counter composed of flip-flops D/U–1.1 to D/U–1.4. All subsequent negative-going transitions on the track 4 read bus 7:3L2 will provide additional positive-going transitions at the output of the AND gate D/U–1.5 and thereby continually set the display entry counter to provide an indication of the number stored in the first section of the temporary storage register No. 1. It will be noted that the count obtained from the temporary storage register No. 1 will include the "excess" bit and, therefore, the count obtained in the entry counter of the display circuit will be one greater than the number to be ultimately displayed on the display device.

The flip flops of the display entry counter are, therefore, either in their set or reset condition to indicate the digit read from the element 1/1 temporary storage register No. 1. This reading into the display entry counter takes place during the time period beginning at T0C and ending at T1B, this being the first RS period as shown on FIGURE 160. At the end of the first RS time period, the positive-going transition on the RS bus 7:3L1 is applied to the input of a one shot D/U–1.7, a negative-going pulse being developed at the output of this one shot. This negative-going pulse is applied over the bus 7:3R8 to the bus 7:1R1, this bus being an input terminal of the inhibit gate D/U–2.1, the other input to this gate being a negative voltage level signal. The concurrence of this negative voltage level signal and a negative-going transition on the input bus 7:1R1 will enable this gate D/U–2.1 and produce a negative voltage level at the output thereof. This negative voltage level is applied to one of the input terminals of each of the AND gates D/U–2.2 to D/U–2.13 of FIGURES 38 and 39. Each of these AND gates D/U–2.2 to D/U–2.13 will provide a negative voltage level output thereat if each of the input terminals thereto is at a negative level. The input terminals of these AND gates are directly connected to the output terminals of the entry counter flip flops D/U–1.1 through D/U–1.4 (FIGURE 40).

It can be seen that the FF· output of the No. 8 flip flop D/U–1.1 of the display entry counter is applied via the bus 7:3R1 to the sole input of AND gate D/U–2.3, an input of the AND gate D/U–2.4, an input of the AND gate D/U–2.5.

The output of the FF· output terminal of the No. 4 flip flop of the display entry counter is transferred along the bus 7:3R7 to an input terminal of the AND gates D/U–2.6, and the AND gates D/U–2.7, D/U–2.12 and the only input of D/U–2.2.

The output signal on the FF. output terminal of the No. 4 flip flop D/U–1.2 of the entry counter provides a signal on the bus 7:3R3, this signal also appearing at the input terminal of the AND gates D/U–2.10 and D/U–2.13.

The FF· output of the No. 2 flip flop D/U–1.3 of the display entry counter provides a signal along the bus 7:3R4 to the AND gates D/U–2.4, D/U–2.7, D/U–2.8, D/U–2.9 and D/U–2.13.

The FF. output of the No. 2 flip flop D/U–1.3 of the display entry counter provides a signal on the bus 7:3R5, this signal being applied to an input terminal of the AND gates D/U–2.11 and D/U–2.12.

The FF· output terminal of the No. 1 flip flop D/U–1.4 of the display entry counter provides a signal along the bus 7:3R6 to an input terminal of AND gates D/U–2.5, D/U–2.8, D/U–2.10 and D/U–2.11.

The FF. output terminal of the No. 1 flip flop of the display entry counter D/U–1.4 provides a signal along the bus 7:3R7 to an input terminal of the AND gates D/U–2.6 and D/U–2.9.

The output from the one shot D/U–1.7 is delayed by one shot D/U–1.6 and resets the flip flops D/U–1.1 to D/U–1.4 inclusive after the information has been read into the shift register D/U–3.1 to D/U–3.7 inclusive (to be explained hereinafter).

It is assumed that the AND gates have been enabled by a negative level at the output terminal of inhibit circuit D/U–2.1. It can be seen by an inspection of the input terminals of the AND gates D/U–2.2 through D/U–2.13 that, the AND gate D/U–2.2 will provide a negative level at the output thereof when the No. 4 flip flop of the display entry counter is in the set condition. The AND gate D/U–2.3 will provide a negative level at the output thereof when the No. 8 flip flop of the display entry counter is in the set condition. The AND gate D/U–2.4 will provide a negative level at the output thereof when both the No. 8 flip flop and the No. 2 flip flop of the display entry counter are in the set condition. The AND gate D/U–2.5 will provide a negative level at the output thereof when both the No. 8 and the No. 1 flip flops of the display entry counter are in the set condition. The AND gate D/U–2.6 will provide a negative level at the output thereof when the No. 4 flip flop of the display entry counter is set and the No. 1 flip flop of this counter is reset. The AND gate D/U–2.7 will provide a negative level at the output thereof when both the No. 4 flip flop and the No. 2 flip flop of the display entry counter are in the set condition. The AND gate D/U–2.8 provides a negative level at the output thereof when both the No. 2 and the No. 1 flip flops of the display entry counter are in the set condition. The AND gate D/U–2.9 provides a negative level at the output thereof when the No. 2 flip flop of the display entry counter is in the set condition and the No. 1 flip flop thereof is in the reset condition. The AND gate D/U–2.10 provides a negative level at the output thereof when the No. 1 flip flop of the display entry counter is in the set condition and the No. 4 flip flop thereof is in the reset condition. The AND gate D/U–2.11 provides a negative level at the output thereof when the No. 1 flip flop of the display entry counter is in the set condition and the No. 2 flip flop thereof is in the reset condition. The AND gate D/U–2.12 provides a negative level at the output thereof when the No. 4 flip flop of the display entry counter is in the set condition and the No. 2 flip flop thereof is in the reset condition. The AND gate D/U–2.13 provides a negative level at the output thereof when the No. 4 flip flop of the display entry counter is in a reset condition and the No. 2 flip flop thereof is in the set condition.

It can be seen from an inspection of the above and FIGURES 38 and 39 that each of the respective buses 7:1R2 to 7:1R7 and 7:2R1 to 7:2R6 will have a negative voltage level thereon when their associated AND gates have been properly enabled.

It should at this point be understood that the characters to be displayed are produced from a scanning raster designed to scan a FIGURE "8." This raster is displayed in FIGURE 161 wherein the FIGURE "8" is composed of a plurality of stroke segments numbered from 0 through 6. Each of the possible characters to be displayed on the face of the cathode ray tube is composed of certain ones of these stroke segments and, therefore, in order to properly display a particular character, it is only necessary to suppress the display of certain ones of the strokes.

Suppression of the undesired strokes is accomplished by means of the OR gates D/U–2.14 through D/U–2.20 of FIGURE 41.

The OR gate D/U–2.14 is coupled to the output terminal of the AND gates D/U–2.2, D/U–2.4, D/U–2.5, and D/U–2.8. Therefore, when a negative voltage level appears at the output terminal of any of the above mentioned AND gates coupled to an input of the OR gate D/U–2.14, a positive level will appear at the output of this OR gate on set stroke zero flip flop bus 8:1R1.

The OR gate D/U–2.16 provides a positive voltage level at the output thereof on the set stroke 6 flip flop bus 8:1R2 when at least one of the AND gates D/U–2.4, D/U–2.6, D/U–2.8 or D/U–2.10 has a negative voltage level at the output thereof.

The OR gate D/U–2.16 provides a positive voltage level at the output thereof on the set stroke 5 flip flop bus 8:1R3 when a negative voltage level is provided at the output terminal of one of the AND gates D/U–2.4, D/U–2.7 or D/U–2.11.

The OR gate D/U–2.17 provides a positive voltage level on the set stroke 4 flip flop bus 8:1R4 when a negative voltage level appears at the output of one of the AND gates D/U–2.8 or D/U–2.10.

The OR gate D/U–2.18 provides a positive voltage level on the set stroke 3 flip flop bus 8:1R5 when a negative voltage level appears at the output terminal of one of the AND gates D/U–2.3, D/U–2.10, D/U–2.12 or D/U–2.13.

The OR gate D/U–2.19 provides a positive voltage level at the output thereof on the set stroke 2 flip flop bus 8:1R6 when a negative voltage level appears at the output terminal of one of the AND gates D/U–2.2, D/U–2.3, D/U–2.9 or D/U–2.11.

The OR gate D/U–2.20 provides a positive voltage level on the output thereof on the set stroke 1 flip flop bus 8:1R7 when a negative voltage level appears at the output terminal of one of the AND gates D/U–2.3, D/U–2.6, D/U–2.8 or D/U–2.10.

The signal levels on the buses 8:1R1 to 8:1R7 operate the shift register flip flops D/U–3.1 to D/U–3.7 (FIGURE 42) in the following manner:

The output voltage level signal on the bus 8:1R1 will be applied to the FF. output lead of the zero flip flop D/U–3.1 (FIGURE 42) along the set stroke zero flip flop bus 9:1L1. Similarly, the output voltage level on the bus 8:1R2 will be applied to the FF. output lead of the No. 6 flip flop D/U–3.7; the output voltage level on the bus 8:1R3 will be applied to the bus 9:1L6, this being the FF. output terminal of the No. 5 flip flop D/U–3.6; the output voltage level on the bus 8:1R4 will be applied to the set stroke 4 flip flop bus 9:1L5, this being the FF. output terminal of the No. 4 flip flop D/U–3.5; the output voltage level on the set stroke 3 flip flop bus 8:1R5 will be applied to the set stroke 3 flip flop bus 9:1L4, this being the FF. output terminal of the No. 3 flip flop D/U–3.4; the output voltage level on the set stroke 2 flip flop bus 8:1R6 being applied to the set stroke 2 flip flop bus 9:1L3, this being the FF. output terminal of the No. 2 flip flop D/U–3.3; and the output voltage level on the set stroke 1 flip flop bus 8:1R7 will be applied to the set stroke 1 flip flop bus 9:1L2, this bus being the FF. output terminal of the No. 1 flip flop D/U–3.2.

Thus, when the output voltage level on one or more of the buses 8:1R1 to 8:1R7 has a positive-going transition thereon, predetermined ones of the flip flops of the display shift register will ultimately be set by the output signals from the OR gates of FIGURE 41.

During each of the RS time periods, a series of seven positive-going pulses are generated in response to information on track 6 of the drum, these pulses being read by the read track 6 head D/U–3.10 (FIGURE 42). These positive-going pulses pass through the one shot D/U–3.9 and appear at the output thereof as negative-going transitions. These negative-going transitions which are delayed by the one shot, are then inverted by the inverter D/U–3.8 to provide positive-going transitions on the shift bus, this bus being coupled to the transfer terminal of each of the flip flops of the shift register D/U–3.1 through D/U–3.7.

This transfer input terminal of the flip flops D/U–3.1 to D/U–3.7 will transfer the levels from the input terminals thereof to the output terminals thereof when a positive-going transition is applied thereto. In this manner, the content of the shift register is shifted completely therethrough by the 7 positive-going transitions applied to the transfer input of the flip flops thereof by the track 6 read head (FIGURE 158).

The positive-going transition appears at the output of the one shot D/U–3.9 at the trailing edge of a pulse produced from track 6, such positive-going transition is also applied to one of the input terminals of the AND gate D/U–5.1. This AND gate is enabled by the concurrent positive level input on the RS bus R:1R6 and a positive level on the set stroke zero flip flop bus 9:1L1. It can be seen that the level on the set stroke zero flip flop bus 9:1L1, which is applied to the input of the AND gate D/U–5.1 will depend upon the condition at that particular time of the zero flip flop of the shift register D/U–3.1. A set condition of this flip flop will provide a positive level on the FF. output thereof and thereby provide an enabling signal for the AND gate D/U–5.1. However, the absence of a set condition i.e., a reset condition of flip flop D/U–3.1 will provide a negative level on the FF. output terminal thereof and thereby disenable the AND gate D/U–5.1.

The condition of the AND gate D/U–5.1 determines whether or not an unblanking pulse will be provided to the grid of the cathode ray display tube D/U–7.0 (CRT) (FIGURE 44). The unblanking signal is provided, as explained supra, by the concurrent positive levels at the input terminals of AND gate D/U–5.1, thereby providing a negative output level therefrom, this output level being inverted by the inverter D/U–8.0 (FIGURE 42) to provide a positive level to the grid of the cathode ray tube along the bus 9:1R9. Conversely, it can be seen that the disenabling of AND gate D/U–5.1 will provide a positive output level therefrom and, it follows, that a negative output level will be provided on the bus 9:1R9, thereby cutting off the grid voltage for the CRT and blanking same during that particular stroke time period.

The significant voltage levels on the set stroke zero flip flop bus 9:1L1, which are provided at the input terminal of the AND gate D/U–5.1, are obtained in the following manner: after the flip flops of the shift register have been initially set by the OR gates D/U–2.14 to D/U–2.20 in the manner explained supra, succeeding positive transitions applied to the transfer inputs of the shift register flip flops D/U–3.1 to D/U–3.7 will successively shift the output voltage on the output terminals of any one of these flip flops to the next following flip flop of descending order. That is, the output voltage on the FF. and FF· terminals of the No. 6 flip flop D/U–3.7 will be shifted to the output terminals of the No. 5 flip flop D/U–3.6 by the first positive-going transition on the transfer terminal of the No. 6 flip flop. Similarly, the output voltages from the No. 5 flip flop will be transferred to the No. 4 flip flop; the output voltage from the No. 4 flip flop will be transferred to the No. 3 flip flop; the output voltage from the No. 3 flip flop will be transferred to the No. 2 flip flop; the output voltage from the No. 2 flip flop will be transferred to the No. 1 flip flop and the output voltage from the No. 1 flip flop will be transferred to the zero flip flop. Accordingly, for each successive positive transition on the transfer inputs of the shift register flip flops, the contents thereof will be shifted upward to the next succeeding flip flop for each incoming positive voltage transition.

It can be seen that the shift register will be completely reset after 7 positive-going transitions have been applied to the transfer inputs thereof. This is caused by the fixed voltage levels at the input terminals of the No. 6 flip flop D/U–3.7. The first positive-going transition to the transfer terminal of this No. 6 flip flop will reset this flip flop due to the voltage levels at the input terminals thereof, this reset condition being transferred upward to each of the succeeding flip flops until, after 7 such transitions, all of the flip flops will be reset in the manner described supra for shifting the signals in the shift register.

In the manner described supra, it can be seen that the cathode ray tube grid circuit (not shown) will be enabled during certain predetermined time periods only, these time periods being determined by the condition of the shift register prior to the application of the transfer signals thereto.

It is also necessary to locate the cathode ray tube beam in the particular area thereof at a particular period in time.

Individual characters are positioned by the application of horizontal and vertical incremental changes in sweep voltage. The appearance of these wave forms is similar to a stair step configuration (FIGURE 159).

There are 4 horizontal tracks displayed on the face of the cathode ray tube. The bottom-most track is a display of the contents of the entry register, the next track is a display of the contents of the accumulator register, the next track is a display of the contents of the temporary storage register No. 2 and the topmost track is a display of the contents of the temporary storage register No. 1. It can therefore be seen that, in order to display, first, the contents of the least significant portion of the temporary storage register No. 1 then the contents of the least significant portion of the temporary storage No. 2, then the contents of the least significant portion of the accumulator register and then the contents of the least significant portion of the entry register, it is necessary that the position of the cathode ray tube beam be positioned vertically downward by one track level after reading of each section of each of the registers. That is, after the last signifiicant digit of the temporary storage register No. 1 has been displayed, the cathode ray tube beam will be positioned vertically downward to the next track position and the contents of the least significant digit position of the temporary storage track No. 2 will there be displayed. The cathode ray tube beam will then be positioned vertically downward to the next level whereupon the contents of the least significant digit position of the accumulator register will be displayed and, then, the cathode ray tube beam will again be positioned vertically downward to the bottom-most track whereupon the contents of the least significant digit position of the entry register will be displayed. This process continues with the beam being shifted horizontally by one digit position and then the vertical scanning cycle continuing ad infinitum until the entire contents of each digit section of the registers have been displayed.

Figure 43:
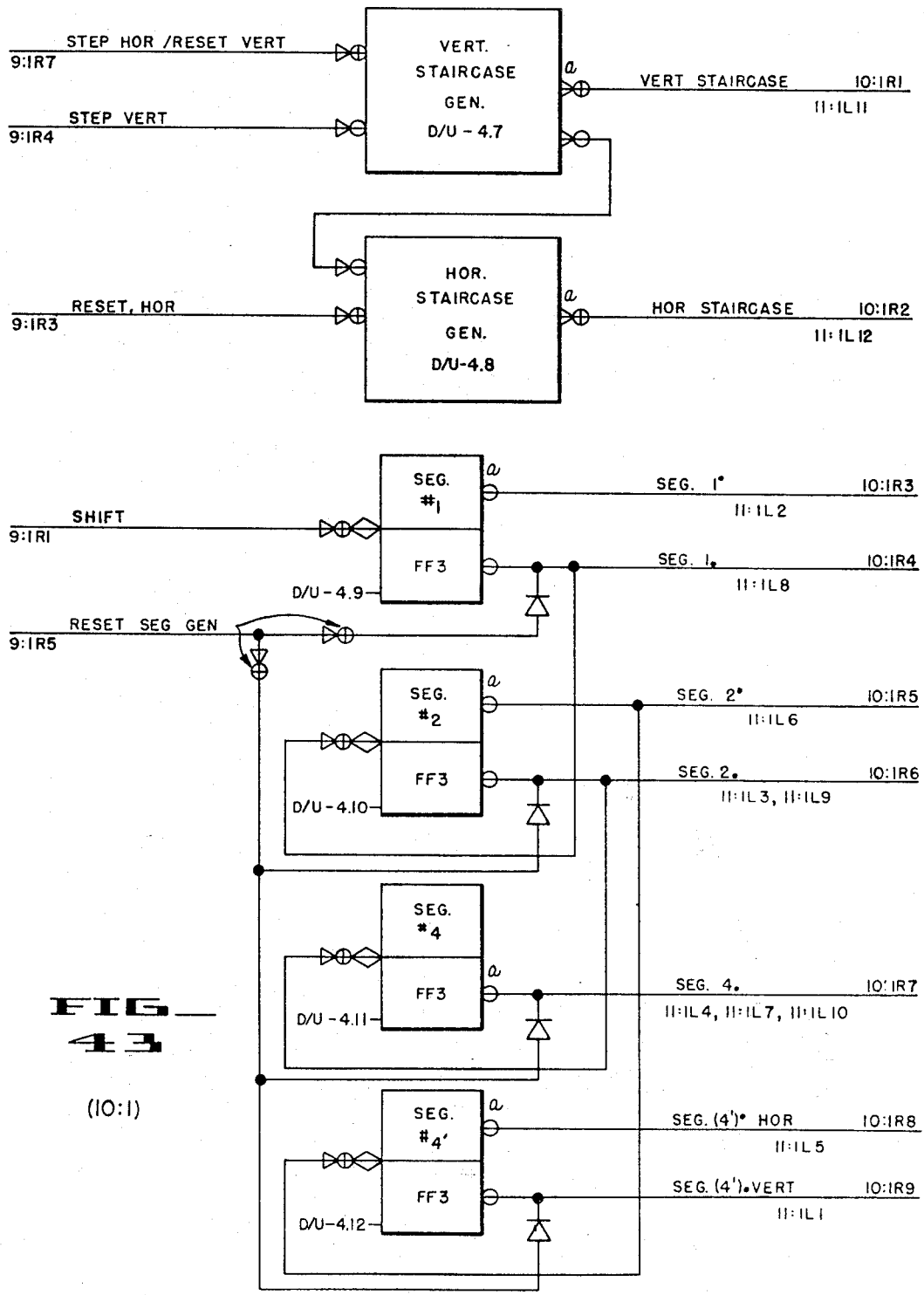

The above is accomplished in the following manner:

The voltage waveform necessary to effect a change in the vertical position of a cathode ray tube beam is developed by the vertical staircase generator circuit D/U–4.7 (FIGURE 43). This circuit receives a negative-going input signal at the end of each RS period. This negative-going voltage level is obtained when the RS bus 9:1R6 (FIG. 42) goes negative, thereby providing a positive-going output from the inverter D/U–4.2, this positive-going output being delayed and inverted by the one shot D/U–4.3 to provide a negative-going output on the step vertical bus 9:1R4. This step vertical signal is applied to the step vertical bus 10:1L2, this bus being an input terminal of the vertical staircase generator D/U–4.7 (FIG. 43).

These input pulses at the end of each RS period are received by the vertical staircase generator and, through a voltage build-up of a capacitor circuit therein, a voltage waveform is built up, causing the required deflection of the electron beam in the cathode ray tube (see FIGURE 159). At the end of every fourth RS time period, a positive-going signal is produced on the step horizontal and reset vertical bus 10:1L1 by the next succeeding positive voltage level W1 timing signal on bus 9:1R8. This signal, in conjunction with a negative RS signal on RS bus 9:1R6 resets the vertical staircase generator D/U–4.7 and, thereby, introduces one step into the horizontal staircase generator D/U–4.8. This single pulse input to the horizontal staircase generator will properly position the succeeding digit position in the horizontal display, this procedure continuing as shown in FIGURE 159. At the end of each H time period, a reset pulse is introduced to the horizontal staircase generator on reset horizontal bus 10:1L3 and, thereby, resets this generator to its original starting voltage level position. The output wave forms of the vertical and horizontal staircase generators are indicated on FIGURE 159.

As explained supra, the vertical staircase generator D/U–4.7 is advanced one step by storing a voltage in a capacitive circuit, this voltage being applied by negative-going transitions applied along the step vertical buses 9:1R4 and 10:1L2. At the following W1 time period, one of the input terminals of the AND gate D/U–4.5 will have a positive voltage level on the W1 input terminal thereof, this terminal being the W1 bus 9:1R8. When the RS bus 9:1R6 goes positive, a positive-going transition will be applied at the output of AND gate D/U–4.5 due to the concurrence of positive signals at the input thereof, this positive-going transition being delayed by the delay circuit D/U–4.6 and appearing on the step horizontal reset vertical bus 9:1R7. This positive-going transition is applied to the step horizontal/reset vertical bus 10:1L1 to reset the vertical staircase generator and step the horizontal staircase generator to its next position. It is noted that this operation takes place once every four RS time periods or, after the track 4 read head has traversed one digit segment of each of the registers therein.

At each resetting of the vertical staircase generator D/U–4.7, a negative voltage going transition is provided at the output of the vertical staircase generator and transmitted to the input of the horizontal staircase generator, thereby stepping the horizontal staircase generator D/U–4.8.

The horizontal staircase generator is reset once every revolution of the drum. The reset signal is obtained on the H bus 9:1R2 when this bus has a negative transition thereon. This negative transition is delayed and inverted in the one shot D/U–4.1 to provide a positive-going transition on the reset horizontal bus 9:1R3. This positive-going transition is applied to the reset horizontal bus 10:1L3, this bus being an input terminal of the horizontal staircase generator, and resets this circuit to its initial condition. The output of the vertical staircase generator is applied over the vertical staircase buses 10:1R1 and 11:1L11 to one of the input terminals of the vertical amplifier D/U–6.1.

The output of the horizontal staircase generator is applied along the horizontal staircase buses 10:1R2 and 11:1L12 to one of the input terminals of the horizontal amplifier D/U–6.2.

Additional signals required to develop the relative positions of the strokes for each character are produced in the following manner:

The track 6 timing signals previously discussed, are applied along the shift bus 9:1R1 to the shift bus 10:1L4. For each of the 7 pulses obtained from track 6 as discussed supra, a positive-going voltage transition will be obtained, this positive voltage transition being applied to the complement input of the segment flip flop No. 1 D/U–4.9 (FIGURE 43), alternately setting and resetting this flip flop.

After the seven strokes have been obtained from the track 6 read head, the next succeeding signal on the RS bus 9:1R6 will provide a positive-going transition on the reset segment generator bus 9:1R5 and 10:1L5 to reset the segment flip flops D/U–4.9, D/U–4.10, D/U–4.11 and D/U–4.12 of FIGURE 43.

The segment flip flops D/U–4.9, D/U–4.10 and D/U–4.11 of the segment or stroke generator act as an up counter because the resetting of the segment No. 1 flip flop will cause the segment No. 2 flip flop to be set while the resetting of the segment No 2 flip flop will cause the segment No. 4 flip flop to be set, thus producing a binary output signal pattern as indicated in FIGURE 158. The fourth flip flop of the segment generator D/U–4.12 produces a signal output with a staggered timing pattern in relation to the other three flip flops. This output signal will shift the output of a stroke oscillator between the vertical and horizontal deflection amplifiers as required.

The segment generator outputs labelled SEG 1·, SEG 2., and SEG 4. are applied to the input terminals of the vertical summing network D/U–4.13 (FIG. 44), the output of which is subsequently applied to the vertical mixing network D/U–5.6 and then to the vertical deflection amplifier D/U–6.1. An additional input is applied to the vertical summing network through a resistor D/U–5.8 which originates at the output of the oscillator OR gate D/U–5.2 which resistor is part of a circuit (not shown) for providing a decimal point.

A slant adjustment circuit D/U–6.3 is coupled between the buses 11:1L11 and 11:1L12.

Segment gnerator outputs labelled SEG 2· and SEG 4. are applied to the input of a horizontal summing network D/U–4.14, the output of which is applied to the input of the horizontal mixing network D/U–5.7 and then to the horizontal deflection amplifier D/U–6.2.

Two inhibit gates D/U–5.5 and D/U–5.4 control the path taken by the oscillator stroke-producing signal by the application of signals from the segment generator. That is, the output of the segment flip flop No. 4' FF. terminal 10:1R9 is applied to the inhibit gate D/U–5.5, thereby enabling this gate and transferring the oscillator signal to the vertical deflection amplifiers.

The output of the segment flip flop No. 4' FF· terminal 10:1R8 controls the inhibit gate D/U–5.4, this gate controlling the transfer of the oscillator stroke signal to the horizontal deflection amplifier when enabled by the signal of bus 10:1R8. The sequence of the stroke generation pattern is shown in FIGURES 161 and 162.

Typical generation of the character stroke proceeds as follows:

During the zero stroke time, as determined by the pulses on track 6 of the drum, all of the FF· outputs of the various segment flip flop D/U–4.9 to D/U–4.12 (FIGURE 43) will be at a negative voltage level thereat. As a result, the segment flip flop inputs to the vertical summing network D/U–4.13 (FIG. 44) will be at the following levels:

The segment No. 1 flip flop FF· output will be at a negative voltage level, the segment No. 2 flip flop FF. output will be at a positive voltage level, the segment No. 4 flip flop FF. output will be at a positive voltage level (see FIGURES 161 and 162).

A relative "weighting" of "two" is developed as a result of the various output levels of the segment flip flops being applied to the vertical summing network during the zero stroke time.

In addition to the vertical positioning voltage, a horizontal positioning voltage is developed by the output levels on the FF· output of the No. 2 segment flip flop, which output will be at a negative signal level while the No. 4 segment flip flop FF. output will be at a positive level. The "weighting" thus produced for the horizontal voltage level will give relative "weight" of "one." This places the origin of zero stroke at the center of the character raster.

Similarly, during the No. 1 stroke period, the FF· output of the No. 1 segment flip flop will be at a negative voltage level, the FF. output of the No. 2 segment flip flop will be at positive voltage level and the FF. output of the No. 4 segment flip flop will be at positive voltage level, this producing a relative "weighing" of 4 in the vertical direction. The horizontal "weighting" will then be produced by the negative voltage level appearing at the FF· output of the No. 2 segment flip flop and the positive voltage level appearing at the FF. output of the No. 4 segment flip flop. Thus, with a relative "weight" of "one," therefore, the number one stroke will appear at the top center of the character raster.

The FF· output of the No. 4' segment flip flop will be at a negative level during the zero stroke time and thus will enable the inhibit gate D/U–5.4, thereby causing a stroke signal as produced by the oscillator D/U–5.3 to be directed to the horizontal deflection amplifier D/U–6.2. Also, during the No. 1 stroke time, the inhibit gate D/U–5.4 will remain enabled, again producing a horizontal stroke during the No. 1 stroke time.

This operation is carried on for the remaining strokes in a similar manner to generate each segment of the "8" pattern of FIGURE 161. As mentioned supra, the desired character is described on the face of the CRT by timely blanking of the CRT grid, thereby eliminating certain ones of the figure "8" strokes. In this manner, the contents of the track 4 registers are displayed on the CRT.

SAMPLE PROBLEM

The operation of the calculator as set forth in the above described logic diagrams (FIGS. 14 to 37) can be clearly understood from the solution of the problem as follows: (18+23) (22−19)+3−5+7.

The above problem includes most of the circuit operations provided in the calculator.

The solution of the above problem will first require entry of the number "18" into the entry register. This is accomplished by first entering the "1" of this number by depression and release of the one key of the digit signal generator of FIG. 14. This operation is described hereinabove under DIGIT ENTRY and in FIG. 135.

Since no information exists in the least significant digit register of the entry register, the digit entry read operation will provide no significant operation. However, the remaining operations described under DIGIT ENTRY will be utilized to enter the "1" into the least significant digit portion of the entry register.

The "8" of the number "18" is then entered into the entry register by depression and release of the "8" key of the digit signal generator of FIG. 14. On this occasion, all of the functions set forth in the section entitled DIGIT ENTRY will be utilized by (1) reading the "8" into the up counter, (2) shifting the "8" into the down counter and resetting the up counter at the trailing edge of the W3 time period, (3) reading the "1" from the least significant digit portion of the entry register into the up counter during the W4 time period, (4) writing the "8" in the down counter into the least significant digit position of the entry register during the following W3 time period, (5) shifting the "1" in the up counter to the down counter and resetting the up counter at the trailing edge of this W3 time period and (6) then writing the "1" from the down counter into the next less significant digit position of the entry register during the next following W3 time period.

Accordingly, in the manner described supra with reference to the DIGIT ENTRY operation set forth hereinabove, the number "18" is entered into the entry register.

The number "18" now stored in the entry register is then shifted to the accumulator register by depression and release of the first factor key of the function signal generator of FIG. 16.

As described hereinabove under the FIRST FACTOR operation and in FIG. 136, during the W4 time period, the "8" in the least significant digit portion of the entry register will be read into the up counter. At the trailing edge of the W4 time period, the "8" in the up counter is shifted to the down counter and the up counter is reset. During the following W2 time period, the contents of the down counter (8) are written into the least significatn digit portion of the accumulator register.

During the next W4 time period, the contents of the next less significant digit portion of the entry register (1) is read into the up counter, and, at the trailing edge of this W4 time period, the "1," read into the up counter, is transferred to the down counter and the up counter is reset. At the following W2 time period, the track 4 write head 1 will be positioned above the next less significant digit portion of the accumulator register and the contents of the down counter (1) will be written therein, thereby transferring the "18" from the entry register to the accumulator register.

In the same manner described hereinabove for entry of the number "18" into the entry register, the number "23" is now entered into the entry register. Accordingly, the number "18" now appears in the accumulator register and the number "23" now appears in the entry register.

The numbers "18" and "23" are added by depression and release of the add key of the function signal generator of FIG. 16.

The operations utilized in this add function are fully set forth hereinabove under the title ADD and in FIG. 137.

In the add operation, during the W3 time period, the contents of the least significant digit portion of the accumulator register are read into the up counter, thereby placing an "8" therein. During the W4 time period, the "3" stored in the least significant digit portion of the entry register is read into the up counter, thereby stepping the up counter around past "10," thereby setting the carry flip flop and retaining a count of "1" in the up counter. At the trailing edge of the W4 time period, the contents of the up counter is shifted to the down counter and the up counter is reset to a count of "1" due to resetting of the carry flip flop. During the following W2 time period, the "1" stored in the down counter is written into the least significant digit portion of the accumulator register.

During the following W3 time period, the "1" stored in the next less significant digit portion of the accumulator register is read into the up counter and, during the next W4 time period, the "2" stored in the next less significant digit portion of the entry register is read into the up counter, thereby providing, in conunciton with the count of "1" provided in the up counter by the resetting of the carry flip flop, a count of "4" in the up counter. At the trailing edge of this W4 time period, the contents of the up counter (4) is shifted to the down counter and the up counter is reset. During the next following W2 time period, the "4" in the down counter is written into the next less significant digit portion of the accumulator register, thereby storing a "41" in the accumulator register.

The "41" stored in the accumulator register is transferred to the temporary storage register #1 by depression and release of the T1 key of the function signal generator of FIG. 16. This function is provided by the operations set forth hereinabove under the section entitled TRANSFER TO TEMPORARY STORAGE REGISTER #1 and FIG. 153.

This operation is performed by reading the "1" in the least significant digit portion of the accumulator register into the up counter during the W3 time period. At the trailing edge of the W3 time period, the "1" is shifted from the up counter to the down counter and the up counter is reset. During the following W4 time period, the contents of the down counter (1) is written into the least significant digit portion of the temporary storage register #1 (T1).

During the following W3 time period, the contents of the next less significant digit portion of the accumulator register (4) is read into the up counter, thereby storing a "4" therein. At the trailing edge of this W3 time period, the "4" in the up counter is transferred to the down counter and the up counter is reset. During the following W4 time period, the "4" stored in the down counter is written into the next less significant digit portion of the temporary storage register #1, thereby storing the "41" in the temporary storage register #1.

In the manner set forth supra, the number "22" is entered into the entry register and then transferred to the accumuator register. The number "19" is then entered into the entry register. Therefore, a "22" will now appear in the accumulator register and a "19" will now appear in the entry register.

The "19" is subtracted from the "22" by depression and release of the subtract key of the function signal generator of FIG. 16. The operations required to provide the subtract function are set forth supra under the sections labelled SUBTRACT and SUBTRACT-COMPLEMENT and FIGS. 138 to 140.

During the W3 time period, the "2" stored in the least significant digit portion of the accumulator register is read into the up counter. At the trailing edge of the W3 time period the "2" stored in the up counter is transferred to the down counter and the up counter is reset. During the W4 time period, the "9" stored in the least significant digit portion of the entry register is read into the down counter to count down the down counter and set the borrow flip-flop when the count in the down counter has passed through "0."

Thereby, the down counter is counted past zero and down through "9" until a count of "3" is contained therein and the borrow flip-flop has been set. During the following W2 time period, the "3" stored in the down counter is read into the least significant digit portion of the accumulator register. At the beginning of the following W3 time period, the borrow flip-flop is sensed and, thereby, sets the up counter to a count of "9." During this W3 time period, the contents of the accumulator register (2) is read into the up counter to provide a count of "1" therein due to the previous setting thereof to a "9." At the trailing edge of this W3 time period, the "1" stored in the up counter is transferred to the down counter and the down counter is reset. During the next W4 time period, the "1" stored in the least significant digit portion of the entry register is read into the down counter and reads the down counter down to a count of zero. During the following W2 time period, the "0" read in the down counter is sensed and read into the next less significant portion of the accumulator register as a single bit (an excess bit).

Thereby, the "3" representing the difference between "22" and "19" is stored in the accumulator register.

The "41" stored in the temporary storage register #1 is now recalled to the entry register by depression and release of the R1 key of the function signal generator of FIG. 16.

The above function is accomplished by utilization of the operations set forth supra under the section labelled RECALL FROM TEMPORARY STORAGE REGISTER #1 and FIG. 155.

During the W1 time period, the "1" stored in the least significant digit portion of the temporary storage register #1 is transferred into the up counter. At the trailing edge of the W3 time period, the "1" stored in the up counter is transferred to the down counter and the up counter is reset. During the next following W3 time period, the "1" stored in the down counter is written into the least significant digit portion of the entry register.

During the next succeeding W1 time period, the "4" stored in the next less significant digit portion of the temporary storage register #1 is read into the up counter. At the trailing edge of the next W3 time period, the "4" stored in the up counter is transferred to the down counter and the up counter is reset. This "4" is written into the next less significant digit portion of the entry register during the next succeeding W3 time period. Accordingly, the number "41" is stored in the entry register.

At this time, in view of the above operations, a "3" is stored in the accumulator register and a "41" is stored in the entry register.

The number "3" and "41" are multiplied by depression and release of the multiply key of the function signal generator of FIG. 16.

The operations utilized in this multiply function are fully set forth hereinabove under the title MULTIPLY and in FIGS. 141 to 145.

The muiltiply operation requires five separate and distinct phases as set forth in FIG. 141.

Phase one of the multiply operation is a shifting of the contents of the accumulator register into the multipler quotient register of track 5 (FIG. 142). Accordingly, in phase one of the multiply operation, during the W3 time period, the "3" stored in the accumulator register is read into the up counter. At the trailing edge of the W3 time period the "3" is transferred to the down counter and the up counter is reset. During the W4 time period, the "3" in the down counter is written into the multiplier quotient register on track 5 of the drum. During the next following W2 time period, the "3" is erased from the accumulator register. Therefore, the "3" will appear in the multiplier quotient register of track 5.

The phase two operation of the multiply function is a shift left of the contents of the accumulator register (FIG. 143). This operation will not take place at this time, however, since the accumulator register is erased by the transfer of the contents of the accumulator register into the multiplier quotient register during phase one, only blanks will be shifted to the left end, accordingly, nothing happens at this time during the phase two operation.

Phase three of the multiply operation is a shift left of the multiplier quotient register (FIG. 144). The "3" in the multiplier quotient register is read into the up counter during the W1 time period. During the trailing edge of the W4 time period, the "3" is transferred from the up counter to the down counter and the up counter is reset. During the next succeeding W4 time period, the "3" in the down counter is read into the next less significant digit position of the multiplier quotient register. Accordingly, the "3" has been shifted to the left by one digit position. This "3" is continually shifted to the left until it is shifted off the end of the multiplier quotient register, i.e., off the 25th digit portion of the multiplier quotient register. Shifting of the "3" off the end of the multiplier quotient register will place this "3" into the multiplier counter. The presence of the "3" in the multiplier counter provides a significant signal to advance to phase four of the multiply operation.

In phase four of the multiply operation, the contents of the entry register are repetitively added into the previously cleared accumulator register and, each time the contents of the entry register are added into the accumulator register, the multiplier counter is debited or counted down by one count. Thus, the "41" in the entry register will be added to the contents of the accumulator register three times and entered into the accumulator register as described hereinabove, at which time the multiplier counter will have a count of "0" therein.

If the multiplier quotient register contained a second digit, then the multiply operation would jump back to phase 2, otherwise the multiplication operation would be at an end. This step is accomplished during phase five of the multiply operation wherein track 5 of the multiplier quotient register is sensed by the track 5 read head. Since no information remains in track 5, the shift back to phase 2 will not ensue and the multiply operation will terminate.

Accordingly, the product of the numbers "3" and "41" or "123" will be contained in the accumulator register. The number "123" is transferred from the accumulator register to the temporary storage register #1 in the manner described supra.

The "3" is then entered into the entry register and shifted to the accumulator register in the manner described above. Then, a "5" is entered into the entry register and the subtract key is depressed and released.

Subtraction of a larger number from a smaller number will provide a negative difference and provide operation in accordance with the SUBTRACT operation set forth hereinabove in FIG. 138 and with the SUBTRACT-COMPLEMENT operation set forth hereinabove and in FIGS. 139 and 140.

The initial subtraction of the number "5" from the number "3" will result, by utilizing the standard subtract operation described supra, in a "9" in each of the digit portions of the accumulator register with the exception of the least significant digit portion thereof which will contain an "8." During the next following revolution of the drum, as described supra in the SUBTRACT-COMPLEMENT operation, the least significant digit portion of the accumulator register will be tens complemented whereas the remaining digit portions of the accumulator register will be nines complemented. Accordingly, a "2" will appear in the least significant digit portion of the accumulator register and a "0" will appear in the remaining digit portions of the accumulator register. Also, a negative indicating light will be enabled to indicate that a negative number is being stored in the accumulator register.

The number "7" is next entered into the entry register in the manner described supra. This number is then added to the negative "2" stored in the accumulator register by depression and release of the add key in the manner described hereinabove.

Addition of a positive and a negative number results in a setting of the calculator into the subtract phase as indicated supra. Accordingly, the "minus 2" will be entered into the down counter as a "2" in the manner described supra in the subtract operation. Then, the number "7" will be entered into the down counter and count the down counter through zero and around to a "5," thereby enabling the borrow flip flop. Since the borrow flip flop is enabled and, as described hereinabove in the SUBTRACT-COMPLEMENT operation, a "9" will appear in all of the digit portions of the accumulator register except the "5" in the least significant digit portion of the accumulator register. The calculator will then go through the SUBTRACT-COMPLEMENT operation. Accordingly, each of the digit portions of the accumulator register with the exception of the least significant digit portion thereof will be nines complemented and provide a zero therein whereas the least significant digit portion of the accumulator register will be tens complemented and thereby provide a "5" therein. The resulting "5" will be stored in the accumulator register.

Accordingly, at this time, the "123" is stored in the temporary storage register #1 and the "5" is stored in the accumulator register. It is now desired to divide the "123" in the temporary storage register #1 by the "5" in the accumulator register.

The above is accomplished by first transferring the contents of the accumulator register (5) into the temporary storage register #2. This is accomplished by depression and release of the temporary storage register #2 key of the digit signal generator of FIG. 14. This operation is described hereinabove under TRANSFER TO TEMPORARY STORAGE REGISTER #2 and in FIG. 154.

In this operation, during the W3 time period, the "5" in the accumulator register is read into the up counter. At the trailing edge of the W3 time period, the "5" is transferred from the up counter to the down counter. During the next following W1 time period the "5" in the down counter is written into the least significant digit portion of the temporary storage register #2.

The "123" in the temporary storage register #1 is transferred to the entry register by depression and release of the recall from temporary storage register #1 key in the manner described hereinabove. This number "123" is then transferred to the accumulator register by the operation of the first factor key of the digit signal generator in the manner described hereinabove. Accordingly, the number "123" is now stored in the accumulator register.

The number "5" is then recalled from the temporary storage register #2 into the entry register by depression and release of the recall from temporary storage register #2 key of the digit signal generator of FIG. 14. This operation is described hereinabove under RECALL FROM TEMPORARY STORAGE REGISTER #2 and in FIG. 156.

In this operation, the contents of temporary storage register #2 (5) is read into the up counter during the W2 time period. At the trailing edge of the W3 time period, the "5" is transferred from the up counter to the down counter and the up counter is reset. During the next following W3 time period, the "5" is written from the down counter into the entry register.

Accordingly, the calculator will now have a "123" stored in the accumulator register thereof and a "5" stored in the entry register thereof.

The number "123" is divided by the number "5" by depression and release of the divide key of the digit signal generator of FIG. 14. This operation is described hereinabove under DIVIDE and in FIGS. 144 and 146 to 152.

The divide operation comprises ten phases of operation, the first phase thereof being a subtraction of the "5" in the entry register from the "123" in the accumulator register in the manner set forth hereinabove in the subtract operation. The difference is sensed and will result in a positive remainder. Accordingly, the divide operation will step to phase two thereof and add the contents of the entry register back into the accumulator register to restore the original "123" into the accumulator register. The calculator then steps to phase three of the divide operation and shifts the contents of the entry register to the left by one digit position (FIGURE 148).

The shift left of the contents of the entry register (5) is accomplished by reading the contents of the least significant digit position of the entry register (5) into the up counter during the W4 time period. At the trailing edge of the following W3 time period the "5" in the up counter is transferred to the down counter and the up counter is reset. During the next following W3 time period the "5" in the down counter is written into the next less significant digit portion of the entry register. Accordingly, the "5" has been shifted one digit position to the left in the entry register. The divide operation then shifts back to phase one and continues with the phase two and phase three operation, thereby again obtaining a positive remainder (12−5) adding the "5" back into the accumulator register and shifting the "5" one digit position to the left in the entry register, then returning to phase one of the divide operation.

The next subtraction of the contents of the entry register from the accumulator register, i.e., subtracting a "5" from a "1" will result in a negative difference and thereby jump the divide operation to phase four thereof wherein the contents of the entry register are added back into the accumulator register to provide the "123" therein.

The calculator then steps to phase five of the divide operation wherein the contents of the entry register (5) are shifted one digit position to the right (FIGURE 149). This is accomplished by reading the contents of the entry register into the up counter during the W4 time period. At the trailing edge of the W4 time period the "5" in the up counter is transferred to the down counter and the up counter is reset. During the following W2 time period, the "5" is written back into the entry register but one digit position to the right, i.e., in the next less significant digit portion of the entry register. Since this shift right of the entry register does not carry the "5" off the right-hand side of the entry register, the calculator will continue into phase six of the divide operation.

Phase six is a shift left of the multiplier quotient register on track 5 of the drum (FIGURE 144). This operation is accomplished by reading the contents of the multiplier quotient register (a blank) into the up counter during the W1 time period. At the trailing edge of the W4 time period the contents of the up counter (a blank) is shifted to the down counter and the up counter is reset. During the next following W4 time period, the blank in the up counter is read into the multiplier quotient register of track 5 but shifted to the left by one digit position.

The calculator then proceeds to phase seven of the divide operation wherein the "5" in the entry register is subtracted from the "12" in the accumulator register to leave a "7" in the next less significant digit portion of the accumulator register.

Since the difference of the subtraction of the "5" from the "12" is positive, the calculator steps to phase eight of the divide operation wherein a "1" is added into the multiplier quotient register and the divide operation returns to phase seven thereof.

Phase seven is again repeated and a "12" remains in the next less significant digit portion of the accumulator register. Since a positive result is obtained, a second "1"

is added into the multiplier quotient register during phase eight of the divide operation and the divide operation again returns to phase seven thereof.

The subtraction of the "5" in the entry register from the "2" in the accumulator register will now leave a negative remainder and thereby step the calculator to phase four of the divide operation.

During phase four of the divide operation, the "5" will be added back into the accumulator register to leave a "28" therein as described hereinabove.

The calculator then steps to phase five of the divide operation and shifts the "5" in the entry register, one digit position to the right. Since the "5" does not overflow on the low order end of the entry register, the calculator again proceeds to phase six of the divide operation and shifts the "2" in the multiplier quotient register one digit position to the left as described hereinabove.

The calculator then advances to phase seven of the divide operation and subtracts the "5" from the "23," then advances to phase eight and adds a "1" into the multiplier quotient register and then returns to phase seven. This procedure is repeated until a "4" has been entered into the multiplier quotient register and the accumulator register contains a "3" therein.

The next subtraction of the "5" in the entry register from the "3" in the accumulator register during phase seven will provide a negative difference and the divide operation will jump back to phase four. The "5" is then added back into the accumulator register to provide a "3" therein during phase four and the "5" in the entry register is again shifted to the right during phase five.

Since "5" had previously been in the least significant digit portion of the entry register, the shift right in phase five will cause the contents (5) of the entry register to overflow in the low order digit direction. Therefore the calculator will jump to phase nine of the divide operation (FIG. 150).

In phase nine of the divide operation, the "3" in the accumulator, which is the remainder of the divide operation, is read into the up counter during the W3 time period. At the trailing edge of the W4 time period, the "3" is transferred from the up counter to the down counter and the up counter is reset. During the next following W3 time period, the "3" is written into the entry register.

The calculator then proceeds to phase ten of the divide operation wherein the "24" in the multiplier quotient register is transferred into the accumulator register. In this phase of operation, the "4" in the least significant digit portion of the multiplier quotient register is read into the up counter during the W1 time period. At the trailing edge of the W3 time period, the "4" is transferred from the up counter to the down counter and the up counter is reset. During the next W1 time period, the "2" in the next less significant digit portion of the multiplier quotient register is read into the up counter. During the following W2 time period, the "4" in the down counter is written into the least significant digit portion of the accumulator register. During the trailing edge of the next following W3 time period the "2" in the up counter is transferred to the down counter and the up counter is reset. During the next following W2 time period, the "2" stored in the down counter is written into the next less significant digit portion of the accumulator regiser.

Accordingly, at this time, the division operation terminates with the quotient (24) in the accumulator register and the remainder (3) in the entry register, thereby providing the solution to the original problem.

FIGURES 79 to 134 set forth a typical circuit diagram of the preferred embodiment of the invention previously described. The operation of this circuit will be described by the solution of a problem which utilizes substantially all of the functional operations available in the calculator.

Before discussing the circuit diagram, it will first be necessary to set forth the conventions utilized and the contents of various blocks depicting a typical circuit configuration.

CONVENTIONS

In order that the buses of the various sheets of drawing be easily followed, bus numbers have been provided, some of which appear above the bus line and some of which appear below the bus line. These numbers include a first number, a letter (T, B, L or R) and a second number. The first number refers to the sheet number in parentheses () rather than the figure number. The letter indicates top (T), bottom (B), left (L) and right (R). The second number indicates the number of the bus.

All bus numbers appearing above a bus line refer to that bus on that sheet. All bus numbers appearing below a bus line refer to the sheet or sheets and bus thereon to which this bus is connected. For example, a number 157T2 above a bus line indicates a bus which leaves sheet (157) at the top thereof and is the second top bus going from left to right. A number 159L10 below a bus line indicates that the bus line continues at sheet (159), the tenth bus down from the top on the left side of sheet (159).

Summary of the "flip flop modes of operation" diagram (FIGURE 45)

Referring to FIGURE 45, the table therein defines the RESET ("0") and the SET ("1") conditions for the several flip flops numbered I, II, III used in the circuit. The flip flops are defined as being RESET if output $b$ thereof is at a negative voltage level and output $a$ thereof is at a positive voltage level. The values provided in this table are approximate values only.

FIGURE 45 also illustrates all possible input and output configurations, though it is apparent by referring to the individual flip flop diagrams, that only certain combinations of these inputs are used with any given flip flop. This diagram will serve primarily as a reference aid to location of flip flop terminals. As set forth in FIGURE 45, the following inputs require a positive transition signal (i.e., a rapid change in voltage levels from a negative voltage to a positive voltage level), $i, h, g, f$. The following inputs operate by the application of a positive pulse: $d$ (T), $c$ (W), $a, b$ (Note: connections $a$ and $b$ may be considered as bifunctional connections in the sense that these connections primarily function as outputs. However, a positive pulse may be introduced into the flip flop to momentarily forcing the appropriate output connection to a positive voltage level). Terminals $j$ and $e$ serve as static inputs, i.e., changes of voltage levels at these inputs do not, of themselves, change the state of the flip flop. Rather, these "gate" inputs serve to retain appropriate voltage levels until it is desired to transfer these levels to the corresponding output terminals $a$ and $b$ by the application of a positive transition signal to the input $c$ (W). Input $d$ (T) operates as a "toggle" input. That is, the flip flop will continue to change states upon the application of successive positive transition signals thereto. As shown in FIGURE 45, a positive-going transition on the $f$ and $h$ input terminals will set the flip flop, whereas a positive-going transition on the $g$ and $i$ input terminals will reset the flip flop. If the $g$ and $h$ input terminals are tied together, these inputs will then operate as a complementing input for all positive-going transitions applied thereto, thereby alternately setting and resetting this flip flop. A positive voltage level applied to the $b$ input terminal will set the flip flop, whereas a positive voltage level applied to the $a$ input terminal will reset the flip flop.

The above symbology will be utilized in depicting all flip flops in FIGURES 79 to 134.

FIGURE 46 illustrates the operation of a typical one shot circuit. Upon the application of a positive transition signal at the left-hand input (denoted by a diamond shaped symbol), the one shot circuit will produce a negative output signal. The pulse width of this signal is determined by the RC time constant of the one shot. The letter M signifies a connection point to the one shot circuit wherein an external capacitor may be connected from point M to the output connection in order to change the pulse width of the output signal.

Flip flop 1 circuit operation

FIGURES 47 and 48 set forth the circuit diagram and block diagram of the type I flip flop. The type I flip flop is typical of the type circuit designed to remain in one of two stable states at the termination of a triggering signal thereto. Six separate input terminals are available, two of which make use of bifunctional connections being primarily operated as outputs. The four connections used as inputs only are labelled: $i$, $h$, $g$ and $f$. Two outputs (previously mentioned as bifunctional connections) are provided: $a$ and $b$. A typical cycle of operation follows wherein it is assumed that the flip flop is reset, i.e., in FIGURE 47, Q2 is "on" (conducting) and Q1 is "off" (non-conducting). Assuming further that a positive transition signal is to be applied to the $h$ input, the $h$ input would be initially at a negative level. The lower side of capacitor C3 would then be at a negative voltage level. Also the upper side of this capacitor would be at a positive voltage level because of the connection thereat to the collector of transitor Q2 through resistor RS5. As a result, capacitor C3 will have a charge of approximately 6 volts thereacross. At the arrival of the positive-going transition pulse, the lower side of capacitor C3 will be driven to a positive voltage level, causing the upper side of capacitor C3 to be driven to a level of approximately +6 volts. The diode D4, pointing toward and connected to the base of transistor Q2, will transfer this positive transition signal to the base of transistor Q2, causing this transistor to be turned "off."

As transistor Q2 is turned "off", the collector thereof will approach —6 volts. A negative transition signal will be developed at the collector of transistor Q2, therefore, and will be transferred to the base of transistor Q1 through capacitor C1. This negative transition signal, by being applied to the base of transistor Q1 will turn transistor Q1 "on," causing the collector thereof to approach a positive voltage level. A positive-going transition signal will, therefore, be produced at the collector of transistor Q1 and will be transferred to the base of transistor Q2 through capacitor C4, aiding in turning "off" transistor Q2 by the initial positive transition signal applied to input $h$ thereof. As a result, a rapid build-up of reinforced signals will develop wherein transistor Q2 will be turned "off" and transistor Q1 turned "on."

Biasing networks for each transistor will establish the required voltage levels at the respective bases of each transistor to maintain the resulting state of the flip flop as follows: Since transistor Q2 is now turned "off," the collector thereof will be at a negative voltage level. As a result, the midpoint of the voltage divider composed of RS1 and RS2 and connected to the collector of transistor Q1 will be sufficiently negative to maintain transistor Q1 turned "on." Also, the voltage level at the midpoint of the voltage divider composed of RS7 and RS8 and connected to the collector of transistor Q1, will be sufficiently positive to maintain transistor Q2 turned "off." The diodes D2 and D3 are used to speed up the charging of capacitors C2 and C3, respectively, at the time the flip flop is changing states.

Resistors RS3 and RS6 serve as load resistors for transistors Q1 and Q2, respectively.

Additional methods of triggering the flip flop may be employed, such as applying a positive pulse to input F which is connected directly to the base of transistor Q2. (It has been assumed that the flip flop is "reset" and transistor Q2, therefore, would be turned "on"). A positive transition signal, being applied directly to the base of transistor Q2, will initiate a triggering action similar to that caused by a positive transition signal at the input $h$.

Again, assuming the flip flop to be "reset" with transistor Q2 turned "on" and transistor Q1 turned "off," a negative transition signal may be introduced via input $i$ directly to the base of transistor Q1. Transistor Q1 would then be turned "on," the collector thereof approaching a positive voltage level and developing a positive transition signal which would be introduced through capacitor C4 to the base of transistor Q2, turning transistor Q2 "off." As transistor Q2 is turned "off," a negative transition signal is developed at the collector thereof and further aids the negative transition signal applied to the base of transistor Q1 via input $i$. This action continues with a result that transistor Q1 is turned "on" and transistor Q2 turned "off," thus setting the flip flop.

A final variation in methods of triggering the flip flop involves the "grounding" of one of the output leads.

Beginning with the flip flop in the reset condition ($a$ at a positive voltage level and $b$ at a negative voltage level), the application of a positive voltage level signal to output $b$ will result in a positive transition signal being applied to the base of transistor Q2 and to capacitor C4, turning transistor Q2 "off." As transistor Q2 is turned "off," a negative transition signal is developed at the collector thereof which signal is applied to the base of transistor Q1 through capacitor C1, turning transistor Q1 "on." As transistor Q1 is turned "on," the collector thereof will remain at a positive voltage level as previously established by the positive voltage level signal at output $b$. Transistor Q2 will remain turned "off" and transistor Q1 turned "on," upon the termination of the initiating positive voltage level signal at output $b$. With the exception of the fact that a positive voltage level signal is established at the collector of transistor Q1, sooner than usual, the application of a positive voltage level signal to the output $b$ will produce a triggering action similar to that produced by applying a positive signal to the input $f$.

Inputs causing the flip flop I to change from a "set" to a "reset" condition, initiate triggering action similar to that developed by input signals changing the flip flop from a "reset" to a "set" condition. Assuming the flip flop to be set, the application of a positive transition signal to input $g$ will turn transistor Q1 "off" and turn transistor Q2 "on" in the same way as that previously described for the application of a positive transition signal to input $h$.

Summary of flip flop type I triggering methods

Group A signals (reset to set):

| | |
|---|---|
| Input $i$ | Negative transition signal. |
| Input $h$ | Positive transition signal. |
| Input $f$ | Do. |
| Output $b$ | Do. |

Group B signals (set to reset):

| | |
|---|---|
| Input $i$ | Positive transition signal. |
| Input $g$ | Do. |
| Input $f$ | Negative transition signal. |
| Output $a$ | Positive transition signal. |

Flip flop II

Referring to FIGURES 49 and 50, there is shown the circuit diagram of the type II flip flop. The type II flip flop is typical of the type of circuit designed to remain in one of two stable states at the termination of a triggering input signal. The principal differences between the type II flip flop and the other flips flops in this series are limited to the methods of triggering the transistors and the inclusion of "gating inputs." Four separate inputs are available, two of which make use of bifunctional terminals primarily operated as outputs. The two connections used as inputs only are labelled $i$ and $f$. Two outputs previously mentioned as bifunctional connections are labelled $a$ and $b$. In addition, two gates ("gating inputs") $j$ and $e$ are included. Finally, a transfer input is used to change the state of the flip flop upon each application of a positive transition signal. This input is labelled $c$ (W).

The two gate inputs, *j* and *e*, peculiar to the type II flip flop, serve to transfer voltage levels appearing on these inputs to the outputs *a* and *b* respectively. Output terminal *a* will assume the voltage level on gate input *j* while the output terminal *b* will assume the voltage level on the gate input *e*. A typical cycle of operation follows wherein it is assumed that the flip flop is reset, i.e., transistor Q2 is "on" and transistor Q1 is "off." Assuming further that a positive transition signal is applied to the transfer input *c*, input *c* will be at a negative voltage level. The common plate of capacitor C2 and C3, connected to input *c* will be at a negative voltage level also. (An additional assumption will be made at this point that gate input *e* is at a positive voltage level and gate input *j* is at a negative voltage level). The plate of capacitor C3, therefore, connected to resistor RS6, will be at a positive voltage level, while the plate of capacitor C2, connected to resistor RS3, will be at a negative voltage level. As a result, capacitor C2 will have no charge thereacross while capacitor C3 will have an approximate 6 volt charge thereacross. At the arrival of a positive transition signal at input *c* (W), the common plates of capacitors C2 and C3 will approach the positive voltage level, while the plates of capacitor C3 connected to resistor RS6 will approach +6 volts. Therefore, a positive transition signal of approximately +6 volts will be applied to the base of transistor Q2 through diode D4, (pointing toward and connected to the base of Q2), turning transistor Q2 "off." Since capacitor C2 has no charge thereacross, there will be no effect upon the base of Q1 at the arrival of the positive transition signal at input *c* (W).

As transistor Q2 is turned "off," a negative transition signal is developed at the collector thereof, this signal being applied to the base of transistor Q1 through capacitor C1 and turning transistor Q1 "on." As transistor Q1 is turned "on," the collector thereof approaches a positive voltage level, developing a positive transition signal at this point. This positive transition signal is then applied to the base of transistor Q2 through capacitor C4, aiding the initial positive transition signal applied to the base of transistor Q2 from input *c*. Therefore, a rapid change of state will ensue wherein transistor Q1 will be turned "on" and transistor Q2 will be turned "off." The flip flop will now be set.

Biasing networks for each transistor will establish the required voltage levels at the respective bases of each transistor to maintain the resulting state of the flip flop as follows: Since transistor Q2 is now turned "off," the collector thereof will be at a negative voltage level. As a result, the midpoint of the voltage divider composed of RS1 and RS2 and connected to the base of transistor Q1, will be sufficiently negative to maintain transistor Q1 turned "on." Also, the voltage level at the midpoint of the voltage divider composed of RS7 and RS8 and connected to the base of transistor Q2 will be sufficiently positive to keep transistor Q2 turned "off." The diodes D2 and D3 are used to speed up the charging of capacitors C2 and C3 respectively at the time the flip flop is changing states. Resistors RS4 and RS5 serve as load resistors for transistors Q1 and Q2 respectively.

Additional methods of triggering the flip flop may be employed such as applying a positive pulse to input *f* which is connected directly to the base of transistor Q2. (It has been assumed that the flip flop is "reset" and that transistor Q2 is, therefore, turned "on"). A positive transition signal, applied directly to the base of transistor Q2 will initiate a triggering action similar to that caused by a positive transition signal at the input *c*. A third triggering method proceeds as follows: Assuming the flip flop to be reset (transistor Q2 "on," transistor Q1 "off"), a negative transistion signal may be introduced via input *i* directly to the base of transistor Q1. Transistor Q1 will then be turned "on," the collector thereof approaching a positive voltage level and developing a positive transition signal which is applied, through capacitor C4, to the base of transistor Q2, turning transistor Q2 "off." As transistor Q2 is turned "off," a negative transition signal is developed at the collector thereof which further aids the negative transition signal applied to the base of transistor Q1 via input *i*. This action continues with the transistor Q1 being turned "on" and transistor Q2 being turned "off," thus "setting" the flip flop.

A unique feature of the type II flip flop concerns the relationship of the gate inputs *j* and *e* and the outputs *a* and *b*. This relationship is such that if the outputs are at the same voltage levels as the respective inputs, there will be no change of state of the flip flop upon the application of a positive transition signal at the transfer gate *c*. If, however, the input gates have voltage levels of opposite polarity to those voltage levels at the respective outputs, then, upon application of a positive transition signal at the transfer gate *c*, the flip flop will change states wherein the outputs will assume voltage levels matching the voltage levels at the respective gate inputs.

SUMMARY OF FLIP FLOP TYPE II TRIGGERING METHODS

Group A signals (reset to set) gate voltage levels:
    Gates:
        input *j* _____ Negative voltage level.
        Input *e* _____ Positive voltage level.
    Input *i* _____ Negative transition signal.
    Input *f* _____ Positive transition signal.
    "Transfer" input *c* (W) __ Do.

Group B signals (set to reset) gate voltage levels:
    Gates:
        Input *j* _____ Positive voltage level.
        Input *e* _____ Negative voltage level.
    Input *i* _____ Positive transition signal.
    Input *f* _____ Negative transition signal.
    "Transfer" input *c* (W) __ Positive transition signal.

Flip flop III circuit operation

Referring to FIGURES 51 and 52, there is shown the circuit diagram of the type III flip flop. The type III flip flop is typical of the type of circuit designed to remain in one of two stable states at the termination of a triggering signal. Principle differences between the type III flip flop and other flip flops in this series are: (a) the type III flip flop uses supply voltages of negative 12 volts and positive 12 volts rather than the 6 volt supply used elsewhere, (b) there are no speed-up diodes used in conjunction with the charging of the capacitors in the triggering circuits and (c) the toggle input *d* is connected to a negative 12 volt source through a resistor. Two separate inputs are available, one of which makes use of a bifunctional connection basically classed as an output. The single connection used as an input only is labelled *t* (T) and is used as a "toggle" input, i.e., the flip flop will change states upon the application of successive positive transition signals at this input. Two outputs are provided: *a* and *b* (note: output *b* has previously been mentioned as a bifunctional connection). A typical cycle of operation follows wherein it is assumed that the flip flop is reset, i.e., transistor Q2 is "on" and transistor Q1 is "off."

The application of a positive transition signal to input terminal *t* (T) indicates a previously established negative voltage level at this input wherein the input capacitors C2 and C3 are charged as follows:

The common plates of these capacitors, connected to the input *d*, are at a negative voltage level. The plate of capacitor C3, connected to the collector of transistor Q1 through resistor RS9, is at a negative level because transistor Q1 is turned "off" and the collector thereof will be at an approximate 12 volt level. The plate of capacitor C2, connected to the collector of transistor Q2 through resistor RS1, is at approximately positive voltage level due to the fact that transistor Q2 is turned "on" and the collector thereof is at about ground level. Therefore, capacitor C2 will have an approximate 6 volt charge thereacross whereas, capacitor C3 will have no charge thereacross. Therefore, since a positive transition signal is applied, the common junction of input capacitors C2 and C3 will approach ground level. As a result, a positive pulse of approximately 6 volts will be applied to the base of transistor Q2 through the diode D2, pointing toward and connected to the base of transistor Q2. Transistor Q2 will then be turned "off," the collector thereof approaching a +12 volt level and a negative transition signal being developed at the collector. This negative transition signal is applied, through capacitor C1, to the base of transistor Q1, turning transistor Q1 "on," and developing a positive transition signal at the collector thereof. This positive transition signal is applied to the base of transistor Q2 through capacitor C4, aiding in turning "off" transistor Q2 by the initial positive transition signal applied at input $d$. A rapid change of state therefore occurs wherein transistor Q2 is turned "off" and transistor Q1 is turned "on," setting the flip flop. Biasing networks will maintain the flip flop in a "set" condition as follows:

Since transistor Q2 will be turned "off," the collector thereof will be at an approximate +12 volt level. Therefore, the midpoint of the voltage divider connected to the collector of transistor Q2 and comprising resistors RS3 and RS5, will be sufficiently negative to maintain transistor Q1 turned "on." Conversely, the collector of transistor Q1 will be at an approximate ground level. The midpoint of the voltage divider connected to the collector of transistor Q1 and comprising resistors RS7 and RS6, will be sufficiently positive to maintain transistor Q2 turned "off." As a result, the flip flop will remain in a set condition, i.e., output $a$ will be at +12 volts and output $b$ will be at an approximate ground level. Resistors RS2 and RS8 serve as load resistors for transistors Q2 and Q1 respectively. An additional set input is available by "grounding" (applying a positive transition signal to) the output $b$. This action will impress a positive transition signal upon the base input of transistor Q2 through capacitor C4, turning "off" transistor Q2. A negative transition signal is then produced at the collector of transistor Q2 which is applied to the base of transistor Q1 through capacitor C1, turning transistor Q1 "on." As transistor Q1 is turned "on," the collector thereof will approach ground level, developing a positive transition signal which signal will aid in turning "off" transistor Q2 by the initial "grounding" of the output $b$. Transistor Q2 is then turned "off" transistor Q1 is turned "on," thereby "setting" the flip flop.

Identical triggering action is established in setting and resetting the flip flop upon the application of successive positive transition signals to the input $d$ (T). The application of a ground level signal to output $b$ will result in a positive transition signal being applied to the base of transistor Q2 through capacitor C4, turning transistor Q2 "off." With the exception of the fact that a ground level signal is established at the collector of transistor Q2 sooner than usual, the application of a positive transition signal to the output $b$ will produce a triggering action similar to that produced by applying a positive going transition signal to the input $d$.

Summary of flip flop type III triggering methods

Triggering methods for the type III flip flop are limited to two types: the "toggle" input $d$ (T) and a "SETTING" input using the bifunctional connection $b$. The latter input may be considered as a means of changing the state of the flip flop by forcing one or more outputs to the desired voltage level.

Standard one shot

Referring to FIGURE 54, there is shown the circuit diagram of the standard one shot (FIGURE 53). The principal function of this circuit is to develop output pulses with: (a) voltage transitions corresponding to those of the input signals that are relayed by a fixed amount and (b) specific waveshapes and pulse widths relatively independent of the input signals. Differences between the standard one shot circuit and others of this series are (a) the output signal is delayed from the input signal, (b) the output signal is inverted in relation to the input signal and (c) a single transistor is used to accomplish the one shot function. A typical cycle of operation is initiated by the application of a positive transition signal at the input thereof (denoted by the diamond shape symbol). Prior to the application of the initiating input signal, the "rest" condition of the one shot is as follows: the input lead to capacitor C is at an approximate −6 volt level while the other plate of capacitor C connected to resistor R1 and to the base of transistor R2 is at approximately ground level. This ground level is developed because the transistor is biased "on" by the connection to the −12 volt supply through resistor R1 and, therefore, the voltage drop across resistor R1 will establish a ground level voltage at the junction between resistor R1 and the base of the transistor. The transistor is then turned "on," the collector thereof approaching an approximate ground level. The positive transition signal impressed upon the input lead is transferred to the base of the transistor as a +6 volt signal due to the 6 volt charge across the capacitor. This 6 volt positive transition signal will then turn the transistor "off," driving the collector thereof toward +12 volts, i.e., a negative transition signal will be developed at the collector of the transistor. The output of the one shot will then remain at a negative voltage level for a period of time determined by the RC time constant of capacitor C and resistor R1. At the time capacitor C has discharged to a sufficiently low negative voltage level, the transistor will be turned "on" and the collector thereof will return to an approximate ground level. The one shot, therefore, produces a negative pulse of predetermined pulse width upon the application of a positive transition signal at the input terminal.

This type of one shot, when set forth by letters (e.g., CAC in FIGURE 53) refers to the components set forth in the one shot of FIGURE 54. Referring to FIGURE 54, it is noted that the first such letter refers to the value of capacitor C, the second letter refers to the value of resistor R1 and the third letter refers to the resistor R2. Therefore, the one shot CAC would be a one shot as set forth in FIGURE 54, wherein the capacitor is 0.0015 µf., resistor R1 is 6.8K ohms and resistor R2 is 2.2K ohms One shot I Referring to FIGURE 55, there is shown the circuit diagram of the type I one shot (FIGURE 56). The function of the type I one shot is such that an independently controlled positive output pulse of variable width and shaping will be produced upon the application of a positive transition input signal thereto. The principal difference between the type I one shot and other one shots in this series is the use of two transistors acting in a type of flip flop operation to produce the output pulse. Also, there is no inversion of the input pulse as this input pulse is acted upon by the one shot, i.e., a positive input pulse will produce a positive output pulse.

A typical cycle of operation proceeds as follows:

The "rest" position of the one shot is indicated by transistor Q1 being "off" and transistor Q2 being "on," the output terminal, therefore, being at a negative voltage level.

The input (denoted by a diamond shape symbol), being at a negative voltage level prior to the application of the input signal thereto, the plate of capacitor C2 connected to the input will also be at a negative voltage level. The other plate of capacitor C2 is connected to ground through resistor RS4. As a result, capacitor C2 has an approximate 6 volt charge thereacross. Upon the application of a positive transition signal to the input, the plate of capacitor C2 connected to the input terminal will be raised to ground level (0 v.) while the other plate thereof, connected to diode D2, will be raised to approximately +6 volts. Thus, a +6 volt transition signal will be applied to the base of transistor Q2 through the diode D2, pointing toward and connected to the base of transistor Q2. Transistor Q2 will, therefore, be turned "off," producing a negative transition signal at its collector. This negative transition signal is then applied to the base of transistor Q1 through capacitor C1, turning transistor Q1 "on" and causing the collector thereof to approach ground level (0 v.).

Capacitor C3 connected from the base of transistor Q2 to the collector of transistor Q1 has an approximate 6 volt charge because the plate of capacitor C3 connected to the base of transsistor Q2 is at ground level (0 v.). This ground level is established because transistor Q2 is turned "on" with the base thereof being close to ground level due to the voltage drop across resistor RS6. The other plate of capacitor C3 will be at an approximate +6 volt level because transistor Q1 is turned "off" and the collector thereof is at an approximate −6 volt level. The plate of capacitor C3 connected to the base of transistor Q2, will then approach a +6 volt level. A +6 volt transition signal is therefore applied to the base of transistor Q2 aiding the initial positive transition signal applied to the base of transistor Q2 through the input circuit. Therefore, transistor Q2 will be turned "off" and transistor Q1 will be turned "on." The one shot will remain in this condition until capacitor C3 has discharged sufficiently to cause the base of transistor Q2 to return to a negative voltage level, turning "on" transistor Q2. As transistor Q2 is turned "on," the collector thereof approaches ground level, producing a positive transition signal which is applied to the base of transistor Q1 through capacitor C1, turning transistor Q1 "off." Therefore, the one shot will be returned to its original state wherein transistor Q2 will be turned "on" and transistor Q1 will be turned "off."

A biasing circuit is provided to maintain a positive "cutoff" voltage on the base of transistor Q1. This biasing circuit is comprised of resistors RS1 and RS2, the upper side of this biasing circuit being connected to the collector of transistor Q2. Resistors RS3 and RS5 serve as load resistors of transistors Q1 and Q2 respectively. Capacitor C4 is an optional component which may be used to change the RC time constant as initially determined by capacitor C3 and resistor RS6 of the one shot and thus vary the output pulse width thereof.

One shot II

Referring to FIGURE 57, there is shown the circuit diagram of the type II one shot (FIGURE 58). The principal function of the type II one shot is the generation of an output pulse that is: (a) of the same polarity as the input pulse and (b) delayed by a fixed amount from the input pulse. Differences of the type II one shot circuit from others in this series are: (a) the inclusion of decoupling and speed up components and (b) the output pulse is of the same polarity as the input pulse. Typical cycle of operation: Before applying an initiating signal, the "rest" condition is established by a negative signal level at the input (denoted by a diamond shape symbol) and the biasing "on" of transistor Q1 and the biasing "off" of transistor Q2. Transistor Q1 is biased "on" because the base thereof is connected to a +12 volt supply through resistor RS2. Transistor Q2 is biased "off" because of a ground level voltage developed by a voltage divider comprised of resistors RS4 and RS5, the mid-point of this divider being connected to the base of transistor Q2. The voltage divider is connected to the collector of transistor Q1 which is at ground level.

Capacitor C1 will have an approximate 6 volt charge because the plate of the capacitor connected to the input will be at a negative voltage level of approximately −6 volts while the other plate of this capacitor will be connected to the base of the transistor Q1, which, being turned "on," will be at an approximate ground level. Upon the application of a positive transition signal at the one shot input, diode D1 will be turned "on" and will transfer the input signal via capacitor to the base of transistor Q1. This positive pulse at the base of transistor Q1 will turn "off" transistor Q1, causing its collector to approach +12 volts, thus generating a negative transition signal. This negative transition signal is then coupled through capacitor C2 to the base of transistor Q2, turning transistor Q2 "on" and developing a positive transition signal at the output, i.e., the collector of transistor Q2 will be driven to an approximate ground level. A positive transition signal, therefore, will be developed at the output of the one shot upon the application of a positive transition signal at the input.

One shot III

Referring to FIGURE 59, there is shown the circuit diagram of the type III one shot (FIGURE 60). The principal function of the type III one shot is the generation of an output pulse that is inverted and delayed with respect to an input pulse and is relatively unaffected by small amounts of input "noise." The principal difference between the type III one shot and other one shots of this series is the inclusion of a noise "standoff" circuit. During the quiescent condition, a small negative voltage level is maintained at the junction of resistor RS1, capacitor C1 and diode D1, pointing toward and connected to the base of transistor Q1. This negative voltage level is developed by a voltage divider comprised of resistors RS2 connected to a −12 volt supply and resistor RS3 connected to ground, resistor RS1 being connected to the common point of resistors RS2 and RS3. Since the base of transistor Q1 is connected to a −12 volt supply through resistor RS4, this transistor will be turned "on" and the junction of resistor RS4 and the base of transistor Q1 will be at an approximate ground level. Therefore, the side of diode D1 connected to the base of transistor Q1 will also be at an approximate ground level. As a result, diode D1 will be reversed, biased by a small voltage. The side of capacitor C1 connected to the input (denoted by a diamond shape symbol) will be at a negative voltage level. The other side of capacitor C1 connected to diode D1 will be at a low negative voltage level. Capacitor C1 will then have a charge of a few volts. The fact that transistor Q1 is turned "on" establishes an approximate ground level at the output of the one shot. Upon the application of a positive transition signal at the input, the plate of capacitor C1, connected to diode D1, will be driven sufficiently positive to forward bias diode D1, causing this diode to conduct and transfer the positive transition signal to the base of transistor Q1, turning transistor Q1 "off." As transistor Q1 is turned "off," the collector thereof approaches −12 volts, developing a negative transition signal at the output of the one shot. The pulse width of this negative transition signal will be determined by the RC time constant of capacitor C1 and resistor RS4. Therefore, the application of a positive going transition signal at the input of the one shot will create a negative pulse at the output thereof of a predetermined pulse width.

One shot IV

Referring to FIGURE 61 for the circuit diagram of the type IV one shot (FIGURE 62), the principal function of the type IV one shot is the provision for means to trigger a transistor common to a number of input circuits serving as one shot inputs. In addition, the type IV one shot is constructed to differentiate the input signal and "clip" the negative pulse of the resulting signal. Differences between the type IV one shot and others in this series are: (a) an integral transistor stage is not used, (b) the inclusion of a differentiating circuit, a "clipping" diode, and a current limiting resistor. During the quiescent condition as indicated by a negative signal level at the input (denoted by a diamond shape symbol) capacitor C1 will have an approximate 6 volt charge thereacross since the plate thereof connected to resistor RS1 will be at a negative voltage level while the other plate thereof, connected to ground through resistor RS2, will be at ground level. The application of a positive transition signal at the input of the one shot will develop an approximate 6 volt positive transition signal at the junction of capacitor C1 and diode D2, forward biasing diode D2 and developing a positive transition signal at the output thereof. As the input signal returns from a ground level to the initial negative signal level at the one shot input, the charging of capacitor C1 would develop a negative transition signal across resistor RS2. However, the "clipping" diode D1 will be forward biased at this time and will short circuit resistor RS2, thus preventing the development of a negative transition signal. Resistor RS1 serves to limit the current through capacitor C1 during the recharging cycle.

One shot V

Referring to FIGURE 63 for the circuit diagram of the type V one shot (FIGURE 64), the principal function of the type V one shot is to establish an approximate −12 volt signal level at the output of the one shot for a period of time determined by the RC time constant of the one shot upon the application of a positive transition signal at the input thereof (denoted by a diamond shape symbol). During the quiescent condition of the one shot, as indicated by a negative signal level at the input, the transistor Q1 will be biased "off" by being connected to a −90 volt supply through resistor RS3, establishing, therefore, a relatively positive signal level at the output. Capacitor C1 will have relatively little charge thereon because both plates thereof will be very nearly at −12 volts. Also, capacitor C2 will have a relatively small charge thereon, due to the small voltage drop across resistor RS2. A positive transition signal applied to the input will be transferred through capacitors C1 and C2 to the base of transistor Q1, turning transistor Q1 "on." The output of the one shot will then be driven to an approximate −12 volt signal level and will remain at this level for a period of time determined by the RC time constant of capacitor C1 and resistor RC1. When capacitor C1 has discharged to a sufficiently low voltage, the base of transistor Q1 will return to a sufficiently negative level to turn transistor Q1 "off."

At the time transistor Q1 is turned "off," the output thereof will return to a relatively positive level.

One shot VI

Referring to FIGURE 65 for the circuit diagram of the type VI one shot (FIGURE 66), the principal function of the type VI one shot is similar to the type V one shot, except that the type VI one shot operates slower as a result of the omission of a speed-up capacitor across the transistor base input resistor thereof. Differences between the one shots type V and VI and others in this series are the inclusion of additional resistors in the transistor base bias circuit and stabilization of the −12 volt supply and a collector resistor RS4. During the quiescent condtion of the type VI one shot, as indicated by a negative signal level at the input (denoted by a diamond shape symbol), transistor Q1 will be biased "off" due to the negative voltage level established at the base of the transistor Q1 by the connection thereto of a −90 volt supply through resistor RS3. The transistor output, therefore, will be at a relatively positive voltage level. Since both plates of capacitor C1 will be at a similar −12 volt level, capacitor C1 will have relatively no charge thereacross. A positive transition signal applied to the one shot input, therefore, will be transferred to the base of transistor Q1 resistor RS2, turning transistor Q1 "on." As tansistor Q1 is turned "on," the collector thereof will approach −12 volts and a negative transition signal will be developed at the output of the one shot. The output of the one shot will remain at a negative signal level for a period of time determined by the RC time constant of capacitor C1 and resistor RS1. When capacitor C1 has discharged to a sufficiently low voltage, the base of transistor Q1 will return to a negative level such that transistor Q1 will be turned off, causing the collector thereof to return to a relatively positive level.

Standard Inverter

Referring to FIGURE 68 for the circuit diagram of the standard inverter (FIGURE 67), the principal functions of the standard inverter are: (a) the inversion of an input signal, e.g., if the input signal is negative, then the output signal will be positive (b) the amplification of the input signal (in this application, the inverter may be considered as a "buffer"). FIGURE 67 indicates the symbol used to represent the standard inverter. In addition, the designations describe the location of the individual inverter within any particular figure and the type of inverter, i.e., the values of the components that are used for that particular inverter. The tabulations of FIGURE 68 summarize the various parameter values of the components indicated for different inverters. The example shown below these tabulations would be interpreted as follows. The first B indicates that the input capacitor C has a value of 220 $\mu\mu$f. F indicates that the input resistor R1 has a value of 6.8K ohms (6.8 thousand ohms). The second B indicates that the bias resistor R2 has a value of 22 K ohms. The third B indicates that the voltage supply V has a value of −12 volts. The figure 1.8 following the dash represents the value of the load resistor R3 in kilohms, in this case, 1.8 kilohms. During the quiescent condition, the transistor will be biased "off" by a positive voltage developed at the base of the transistor because the base of the transistor is connected to a +6 volts supply through resistor R2. A negative signal applied to the inverter input will be transferred to the base of the transistor through "speed up" capacitor C. Resistor R1 is a "current limiting" resistor, which limits the input signal current flowing in the base circuit of the transistor. The negative-going signal appearing at the base of the transistor will turn the transistor "on" (cause the transistor to conduct) and develop a positive-going signal at the output thereof since the collector thereof is driven toward ground. Therefore, an input signal will produce an inverted and amplified output signal.

Standard gate

Referring to FIGURE 69 for the circuit diagram of the standard gate (FIGURE 70), the standard gate can be operated to perform either of two logical functions, the "AND" function and the "OR" function. The gate is defined as an AND gate, if a particular output signal is obtained only upon coincidence of all input signals. A coincidence of inputs in this case would constitute the presence of negative signal levels at all input terminals to the gate. The particular type of gate illustrated may be further defined as a NEGATIVE AND gate due to the requirement of negative signal levels at the inputs assuming a negative source voltage.

Resistor "R" is the gate "load" resistor across which the output voltages are developed. If any of the inputs are at a ground level (0 volts), then the output terminal will also be at ground level. At the instant all inputs acquire negative voltage levels, the output terminal will also develop a negative voltage level. This effect is caused by the reverse biasing of all diodes in the gate, thus establishing a high resistance between the input voltage and the supply voltage. Therefore, the predominant part of the difference between these voltages will be developed across the diodes, causing a voltage level to develop at the output terminal closely approaching that of the supply voltage. FIGURE 70 illustrates the symbol used to indicate the standard gate.

The circuit of FIGURE 69 will also operate as an OR gate. Assuming a negative source voltage, a positive voltage on any of the input terminals will provide a positive voltage level at the output.

Accordingly, the circuit of FIGURE 69 and the gate symbol of FIGURE 70 may represent an AND or an OR gate.

The first number of the lower line of FIGURE 70 represents the negative value of the source voltage (V) while the second number represents the value in kilohms of the common load resistor (R) FIGURE 69.

Key pulse generator

Referring to FIGURE 71, there is shown the circuit diagram of the key pulse generator (FIGURE 72), the function of which is to produce a positive-going transition signal upon the operation of a "key" or push-button switch. The FF push-button switch indicated in FIGURES 71 and 72 is representative of the type of designation that may be assigned. Operation of the key pulse generator is initiated by depressing the push-button key. One plate of capacitor C will then be connected to a −12 volt supply via resistor R1, the other plate thereof being connected to a −6 volt supply via capacitor R2, thus placing an approximate 6 volt charge across the capacitor. Upon releasing the push-button key, the plate of capacitor C connected to resistor R1 will then be grounded, causing the opposite plate, connected to resistor R2, to be driven to approximately +6 volts above ground and producing an approximate 6 volts positive-going transition signal at the output thereof. Therefore, each time the push-button key is depressed and released, a positive-going transition signal will be produced at the output thereof.

The value of the capacitor C of FIGURE 71 is set forth above FIGURE 72 for each such key pulse generator. In the example of FIGURE 72 the capacitor C has a value of 0.022 µf.

Read head

Referring to FIGURE 73 for the circuit diagram of the read head (FIGURE 74), the read head senses changes in the flux patterns of the various storage registers on the memory drum. As the read head senses information on the drum, a signal is produced thereby which varies the bias on the transistor of a "phase inverter" circuit. The phase inverter circuit generates an additional signal which is 180 degrees out of phase with the original signal. Two signals, then, are produced, which signals are applied to the bases of two transistors (Q2 and Q3) forming part of a "push-pull" circuit. Signals at the outputs of these transistors are then applied to the bases of two more transistors (Q4 and Q5) and then to the output terminals (7 and 8) of the read head and amplifier circuit. The output signal at either output terminal (7 or 8) will be a series of negative pulses. In applications where the output terminals are "jumpered" together, the negative pulses will occur at twice the rate of those pulses produced by either transistor alone. Successive pulses, therefore, would be produced by first one transistor and then the other, i.e., one transistor will be turned "on," producing a negative pulse while the other transistor will be "cut off." This condition is then reversed during the next half of the input signal.

More specifically, the information "bits" or pulses, which are developed in the read head as information is read from the drum, are applied to the base of transistor Q1, causing transistor Q1 to operate about the mid-point of its operating range (class A operation) as determined by the biassing resistors RS1 and RS2. As the positive portion of the input signal is developed on the base of transistor Q1, the conduction of transistor Q1 will decrease, causing the voltage level at the collector thereof to approach −6 volts and the voltage level at the emitter (at the junction of resistor RS5, capacitor C1, resistor RS6 and capacitor C4) to approach ground level. Therefore, two signals are developed (at the same time) of opposite polarity.

The −6 volt supply voltages for the read head circuitry is provided by a voltage stabilizing network comprised of resistor RS7, capacitor C2 and capacitor C5. The negative-going signal developed at the collector of transistor Q1 is applied to the base of transistor Q2 through capacitor C3, increasing the conduction of transistor Q2 and causing the collector thereof to approach ground level. The bias voltage at the base of transistor Q2 as developed by resistor RS8, connected from the base of transistor Q2 to ground, and the two resistors in the emitter circuit RS11 and RS12, connecting the emitter of transistor Q2 to a +6 volts, will be such that transistor Q2 will be partially conducting. The positive-going signal thus produced at the collector of transistor Q2 will be applied to the base of transistor Q4 through resistor RS16, transistor Q4 having been previously biassed "off" by the negative signal developed at the collector of transistor Q2 during its quiescent state. Transistor Q4 will then be turned "on," causing the collector thereof to change from an approximate +6 volt level to a −6 volt level.

A negative pulse, therefore, will be produced at the output terminal 7. Concurrently, with the development of the negative-going signal at the collector of transistor Q1, the positive-going signal being developed in the emitter circuit of transistor Q1 will be applied to the base of transistor Q3 through capacitor C4, decreasing the conduction through transistor Q3 and causing the collector of transistor Q3 to approach −12 volts. A negative-going signal is therefore developed at the collector of transistor Q3 and is applied to the base of transistor Q5 through resistor R17, causing transistor Q5 to remain turned "off," transistor Q5 having been previously biassed "off" by the negative signal level as developed at the collector of transistor Q3 during the quiescent state. The output signal produced at the collector of transistor Q5, connected to the output terminal 8, will remain at an approximate +6 volt level. Therefore, during the positive portion of the input signal as applied to the base of transistor Q1, the output signal at output terminal 7 will be negative while the output signal at output terminal 8 will remain positive. During the negative portion of the input signal as applied to the base of transistor Q1, the signal at the output terminal 8 will be negative while the signal at the output terminal 7 will remain positive. For applications where output terminals 7 and 8 are connected together, a series of negative pulses will be produced as previously described.

Write head

Referring to FIGURE 75 for the circuit diagram of the write head (FIGURE 76), the input terminals of the write head are indicated by connections 7 and 8. These inputs are connected to the write FF· and write FF. outputs (M/U−3.9, FIG. 29). Therefore, if a positive transition signal is applied to input 7, a negative transition signal is applied to the input 8, etc. These input signals are further developed by the write head circuitry and applied to the final transistor stages. Only one of the transistors will be turned "on" at a time. As the transistors connected to the write head coil are alternately turned "on" and "off," first one half and then the other half of the write head coil will be energized. This action, then, results in the recording of an alternating flux pattern on the drum.

Detailed circuit operation: The base of transistor Q1 is connected to a +6 volt supply through resistor RS3, biassing transistor Q1 "off." The base of transistor Q3 is connected to a negative voltage level at the collector of transistor Q1 through resistor RS7, biassing transistor Q3 "off." The base of transistor Q5 is connected to a positive voltage level at the collector of transistor Q3 through resistor RS11 and will also be biassed "off." In a similar manner, all transistors associated with input 8 will be biassed "off." Assuming the application of a negative transition signal at the input terminal 7, this signal will appear at the base of transistor Q1 via capacitor C1, turning transistor Q1 "on" and causing the collector of transistor Q1 to approach ground level. A positive transition signal is then developed at the collector of transistor Q5. This positive transition signal will energize the section of the write head coil connected between the collector of transistor Q5 and the −6 volt supply via resistor RS13 causing the writing of a "bit" of information on the drum.

Since a negative transition signal is applied to input 7, a positive transition signal, therefore, is applied to the input terminal 8. However, no change occurs in the state of the transistor associated with the input 8, because all the transistors associated with input 8 are biassed "off" and a positive input signal causes these transistors to remain in this condition. Therefore, the section of the write head coil connected between the collector of transistor Q6 and the −6 volt supply via resistor RS13, will not be energized.

Upon the reversal of the input signals, the section of the write head coil associated with the transistor Q6 is energized while the other section thereof will be de-energized, causing a change in the flux pattern on the drum and the writing of another "bit" of information. For operation of the write circuitry in an erase mode, the input signals do not alternate but remain at fixed levels, causing the write head coil to establish a flux pattern in one direction only on the drum, thereby erasing any information previously stored. The quiescent condition of the write head is indicated by positive voltage levels at both inputs and thereby disenabling the write head.

Diodes D1 and D2 serve as negative voltage "spike" suppression diodes, protecting the output transistors Q5 and Q6 from high voltages which may be developed by the write head coil.

Deflection amplifier

Referring to FIGURE 77 for the circuit diagram of the vertical and horizontal deflection amplifier (FIGURE 78), the principal function of the deflection amplifier is to amplify: (a) "staircase" type voltage signals which position characters on a cathode ray tube screen and (b) stroke generating signals which create and position the individual strokes for each character through the use of differential amplifiers. These signals are then amplified and applied to the appropriate deflection plates of a cathode ray tube. During the quiescent period, transistors Q1 and Q3 will be biassed "on." Transistors Q2 and Q4 will also be biassed "on." However, the voltage levels on the outputs of transistors Q2 (output D) and Q4 (output E) will develop deflection potentials at the cathode ray tube such that the first character to be displayed will be positioned in the lower right-hand corner of the display pattern. Transistors Q1 and Q3, together with their associated components, form a high input impedance circuit or "buffer" unit between the staircase generators and the actual circuitry of the deflection amplifiers. Representative signals applied to input A of the "buffer" unit comprise incremental positive voltage steps. These positive voltage steps applied at input A will be transferred directly to the base of transistor Q1, turning transistor Q1 "off" and developing positive transition signals at the emitter thereof. These positive transition signals are then applied to the base of transistor Q3, turning transistor Q3 "on" and developing a series of positive transition signals at the emitter thereof. The first of two directions taken by these positive transition signals at transistor Q3 is through a coupling capacitor (C1) to the junction of three resistors: RS3, RS4, and RS6. These signals are then applied to the base of transistor Q1 through resistor RS4 and reinforce the initial signals appearing at input A. The positive transition signals developed at the emitter of transistor Q3, as previously mentioned, will also be applied to the base of transistor Q4 through capacitor C2, turning transistor Q4 "off" and developing a series of negative transition signals at the collector thereof. These negative transition signals are then applied to the appropriate deflection plates of the cathode ray tube and thus contribute to the generation of the display pattern. Signals applied to the input B are representative of the stroke developing and positioning signals from the stroke generator. These signals will be applied to the base of transistor Q2 through resistors RS1 and RS2, developing voltage levels at the collector of transistor Q2 and subsequently at the appropriate deflection plates of the cathode ray tube to generate and position the individual strokes for each of the characters in the display pattern. Input C represents the connections between the vertical and horizontal amplifiers for the "character slant" control circuit. Potentiometer RS2 is typical of the two centering controls, one for each deflection amplifier, provided for the positioning of the display pattern. Potentiometer RS10 is typical of the two adjustment controls, one for each deflection amplifier, provided for the adjustment of the size of the display pattern.

CIRCUIT DIAGRAM OPERATION

The following problem will be solved on the calculator and described in steps of operation of the circuit diagram set forth in FIGURES 79 to 134 to more fully disclose the operation and circuitry thereof:

$$\frac{(18+20)(22-19)}{(3-5+7)}$$

It will be assumed that initially the calculator was "cleared," i.e., the CLEAR (129SW1), CLEAR ENTRY (126SW1), T2 (124K2) and T1 (124K1) keys have been depressed in succession, thereby eliminating all of the displayed characters from the screen, and clearing all digit information from data tracks 4 and 5 on the drum.

ENTRY OF DIGIT 1

This computation is begun by depressing the 1 key 121K1. Upon depression and release of the 1 key a positive spike is produced at the No. 1 output 121R6 of the digit key pulse generator bank.

This positive spike is passed by the key pulse encoder to (a) the non-Q or $b$ output of the No. 1 flip flop 122FF4 of the digit storage register, (b) the non-Q or $b$ output of the Common Digit No. 1 flip flop 123FF1 of the number entry cycle control counter and (c) to one of the inputs of the shift left entry register gate FIG. 123G1.

It is to be noted that the digit storage register (122FF1 to 122FF4) is at this time in a reset state, i.e., the $a$ or $q$ outputs of each of the flip flops comprising this register are at positive potential. It is also to be noted that the number entry cycle control counter (123FF1 and 123FF2) is in its reset state, i.e., the $a$ or Q outputs of both Common Digit No. 1 flip flop 123FF1 and Common Digit No. 2 flip flop 123FF2 are at a positive voltage level.

Then, since the digit storage register was previously in rest condition, the occurrence of the before-mentioned positive spike upon the non-Q or $b$ output of the Common Digit No. 1 flip flop 123FF1 of the digit storage register will set that flip flop.

Further, the occurrence of the before-mentioned positive spike upon the non-Q or $b$ output of the Common Digit No. 1 flip flop of the number entry cycle control will cause this flip flop to assume the set condition, i.e., the condition wherein its Q or $a$ output is at a negative voltage level. The occurrence of this positive spike will not, however, cause an output pulse to be produced at the output of the shift left entry register gate 123G1 nor set the Common Digit No. 2 flip flop of the number entry cycle control counter.

NUMBER ENTRY CYCLE CONTROL COUNTER

Considering, for a moment, the operation of the number entry cycle control counter (123FF1 and 123FF2), it may be seen that this counter will assume 4 states: (1) the reset state in which the Q or *a* outputs of both flip flops are at a positive voltage level, (2) the state in which the Q or *a* output of the No. 1 flip flop is at a negative voltage level and the Q or *a* output of the No. 2 flip flop is at positive voltage level, (3) the state in which the Q or *a* output of both flip flops is at a negative voltage level and (4) the state in which the Q or *a* output of the No. 1 flip flop is at positive voltage level and the Q or *a* output of the No. 2 flip flop is at a negative voltage level.

Having thus described the successive states of operation of the number entry cycle control counter, it will be seen that the depression and release of the No. 1 key has impelled the number entry cycle control counter, which was in its reset state, forward to the set condition so that the entry cycle control counter is now in the (2) state described supra.

Further operation awaits the occurrence of a positive going transition of the signal on the H bus 123L3 which is applied to the *c* or W input of the flip flops 123FF1 and 123FF2 of the number entry cycle control counter.

Occurrence of this positive going transition on bus 123L3 next after the actuation of the No. 1 key causes the No. 2 flip flop of the number entry cycle control counter to be set.

(The transition of the number entry cycle control counter to this state enables the clearing of the entry register on the drum if and only if a function key has been depressed immediately prior to the depression of the 1 key (to be explained later); however, since this is not the case in the problem under solution, no further operation of the machine will be accomplished during this phase of the number entry cycle control counter operation.

Receipt of the next positive going transition of the signal on the H bus 123L3 causes the Common Digit No. 1 flip flop to be reset and places the number entry cycle control counter into phase (3).

Upon this resetting, since the Q and *a* output of the Common Digit No. 1 flip flop goes to a positive potential level, it may be said that the *a* output of Common Digit No. 1 flip flop experiences a positive going transition. This positive going transition is applied along the Common Digit bus 123L2 to the 122L4 terminal, thereby producing a reset pulse at the cathode of diode 122D1 and resetting the No. 1 flip flop 122FF4. The resetting of the digit storage register in the present problem amounts to resetting the number 1 flip flop 122FF4 of the digit storage register.

The resetting of the No. 1 flip flop 122FF4 will, in the well known manner, produce a positive going transition on the Q or *a* output thereof. This positive going transition on the Q or *a* output of the No. 1 flip flop 122FF4 of the digit storage register causes a corresponding signal to be conveyed over the "1" KEYBOARD bus 122R4 to the No. 1 flip flop 152FF1 of the up counter (150FF2, 151FF1, 151FF2, 152FF1), thereby entering the same information into the up counter previously contained in the digit storage register.

It will be recognized, of course, that, in order for this entry to be made in the up counter, the up counter was previously reset in a phase of operation which will be described hereinbelow.

SHIFT LEFT ENTRY

In addition, the resetting of the Common Digit No. 1 flip flop 123FF1 of the number entry cycle control counter produces, in the well known manner, a negative voltage level signal on the non-Q or *b* output thereof. This negative voltage level signal appears at the upper input terminal of the shift left entry register gate 123G1, and does so in concurrence with a negative voltage signal supplied to the lower input of the shift left entry register gate by the Q or *a* output of the Common Digit No. 2 flip flop 123FF2 of the number entry cycle control counter.

Thus, the shift left entry register gate 123G1 is enabled, producing a significant positive voltage signal level on the shift left entry register [SL(E)] bus 123R1.

The occurrence of this signal, or significant positive voltage level, upon the SL(E) bus 123R1 causes the write entry command gate 141G2 output through inverter 141A2 to go to a negative voltage level at bus 141R2. This negative voltage level signal is applied to the W3 write gate 144G7 along with the W3 signal applied on bus 144L5 thereto, and via inverter 144A7 causes a positive voltage level on the WRITE COM bus 144R2 during the W3 period.

This positive voltage level signal is applied to bus 147L5 and, thus, to the input of the inverter 147A4. The inverted signal from said inverter is applied to the pair of AND gates 149G3 and 149G4. However, these two AND gates will remain disenabled, i.e., they will not convey any bit pulses from track 3 read head 148RA1 to write head 1 on track 4, 149WA2, since the AND gate 148G1 remains disenabled due to the presence of a positive level signal on the lead 148B4 thereof. This positive level signal applied to the AND gate 148G1 results from the presence of a negative voltage level on the zero sense bus leading from the zero sense gate 155G1 of the down counter, this negative level being inverted in inverter 155A5 to apply the positive level signal to lead 148B4 of AND gate 148G1, thereby disenabling the gate 148G1.

Thus, no information from the down counter is written into track 4 at this time. At this termination of the W3 period, the SL(E) bus 123R1 remains at a positive level. Thus, the output of the gate 143G2 is maintained at negative voltage and the bus 143L4 is maintained at negative voltage due to the inversion by inverter 142A1 of the positive voltage output of OR gate 142G1.

Upon positive transition of the W3 timing signal on bus 143L3, the gate 143G2 is disenabled, therefore swinging the common output terminal of inverters 143A1, 143A2 and 143A3 of gates 143G1, 143G2 and 143G3 from positive to negative level.

This transition, or these voltage levels, are inverted in the inverter 143A7 thereby causing the transition at the UP TO DOWN/RESET UP bus 143R1 to take place from negative to positive level (significant voltage level).

The UP TO DOWN/RESET UP bus 143R1 is connected through bus 153L8 to the input of a capacitor one shot composed of capacitor 153C1 and resistors 153RS1 and 153RS2.

The output of this one shot is applied through inverters 153A1 and 153A6 to the W or *c* inputs of all 4 flip flops (154FF1, 154FF2, 155FF1 and 155FF2) comprising the down counter and, at the same time, to the reset input 151L2 of the up counter. This positive going transition appearing on the output of the above mentioned capacitor one shot, then, "broadsides" the information ("1") in the up counter forward to the down counter, and, also, resets the carry, 1, 2, 4 and 8 flip flops (150FF1, 150FF2, 151FF1, 151FF2 and 152FF1) of the up counter, shifting the input on the G or *e* and *j* inputs of the flip flops of the down counter to the *a* and *b* outputs thereof by pulsing the W or *c* inputs thereof and pulsing the up counter reset on bus 151L2.

(It will be recognized that, where a carry is stored in the carry flip flop 150FF1, the No. 1 flip flop 152FF1 of the up counter would be set, rather than reset, as in the present example wherein no carry is presently being carried forward.)

Continuing the shift left entry register operation, the SL(E) bus 123R1 is still at a positive voltage level.

Thus, the read from entry command gate 141G4 has a positive level at its output and the inverter 141A4 immediately following this gate has a negative level at its output.

This negative signal is applied to the lower input of W4 read AND gate 144G4 and, in conjunction with the appearance of the negative W4 signal on bus 144L7 at the upper input of this AND gate, a negative voltage level will appear at the output of this AND gate, and the READ COM bus (FIGURE 103) will receive a positive going signal and come to rest at a positive voltage level.

This positive voltage level signal on the READ COM bus will be inverted by the inverter 144A9, thus applying a negative voltage level signal to the bus 144R1 and AND gate 145G1.

Thus, when the RS line 145B6 goes to a negative voltage level, the gate 145G1 will be enabled and allow data to pass from track 4 as received at the track 4 read head 145RA1.

The pulses comprising this data are inverted by inverter 145A1 and reshaped by the one shot 145N1. The output on bus 145T2 will be the inverse of the output of the one shot 145N1 due to the inverter 145A3 coupled to the one shot. Thus, the output pulses at bus 145T2 will be negative going pulses from the positive to the negative voltage level.

The positive-going, or trailing edge, of the first one of the data pulses occurring at bus 145T2 and 146L5 will set the read delay flip flop 146FF2. However, since the gate 146G1 must have an input level supplied thereto from the Q or $a$ output of the read delay flip flop, said level being negative during the occurrence of the first data pulse, the first occurrence of the data bit pulses at bus 145T2 and 146L5 will not be passed therethrough because the negative voltage level is not supplied from the Q or $a$ output of the read delay flip flop 146FF2 until after the termination of this first occuring bit pulse.

Thus, it may be seen that the read delay flip flop functions to eliminate the passage of the first, or "excess," pulse of each pulse train through the gate 146G1.

It will be recognized, however, that in entering a number, such as "1," the first number entered after the calculator has been completely cleared, there will be no further data available on track 4 to be passed through the gate 145G1, the one shot 145N1, etc., and, therefore, no data will be passed to the AND gate 146G1.

If, however, such data were available, it would be passed through AND gate 146G1 and the associated inverter 146A2 through the output level clamping network 146D2 and 146D3 to the ADVANCE UP COUNTER bus 146R1 and 152L3.

These data signals, if they were available at this stage of operation, would then be passed by the ADVANCE UP COUNTER bus 152L3 to the complementing or $g$ and $h$ inputs of the No. 1 flip flop 152FF1 of the counter, thus advancing the up counter by a number of counts equal to the number of counts read from the drum in the W4 period, less the one "excess" bit which was "suppressed" by the operation of the read delay flip flop 146FF2 in conjunction with the AND gate 146G1.

However, since the "1" which was just entered, the entry of which is the subject of this present description, was the first number key depressed after the clearing of the machine, there will be no data forwarded into the up counter, and the up counter will remain totally reset.

The SL(E) bus 123R1 still remains in its positive voltage level condition, thus continuing the shift left entry register cycle. That is to say, the previous cycle of (1) writing from the down counter into the entry register during the W3 time, (2) broadsiding (i.e., transferring data from the up counter to the down counter) the contents of the up counter into the down counter and resetting the up counter on the trailing edge of the W3 time, and (3) reading the data from the entry register of track 4 into the up counter during W4 time will now be repeated and will be repeated successively for each order of the entry register, i.e., until the next H pulse.

In the present consideration of depression and release of the "1" key immediately after the calculator has been cleared, however, the next (3) phase will cause the 1 originally entered upon the keyboard and currently stored in the down counter, to be written in the lowest order position of the entry register upon the drum, the remaining cycles of the left shift entry program being in the sense mere blanks, or no information is read from the successive orders of the entry register on the drum, and, thus, the up and down counters are not disturbed, and blank, or no information is "written" back into the successive higher orders of the entry register upon the drum.

This repetitious cycle continues until the next succeeding H pulse, which rests the No. 2 flip flop 123FF2 of the number entry cycle control counter, thus disenabling the shift left entry register gate 123G1 and terminating the shift left entry register cycle.

Now, the digit "1" having been entered into the lowest order of the entry register upon the drum, and appearing at the right hand of the entry register as displayed upon the screen, (to be explained later), the No. 8 digit key 120K8 is depressed and released.

Entry of digit 8

Depressing and releasing the No. 8 digit key sets the No. 8 flip flop 122FF1 of the digit storage register as described hereinabove, and also sets the No. 1 flip flop 123FF1 of the number entry cycle control counter, as also described hereinabove.

Following upon this, the next succeeding pulse upon the H bus 123L3 sets the No. 2 flip flop 123FF2 of the number entry cycle control counter but, since a function key was not immediately previously depressed, this phase of the operation of the number entry cycle control counter accomplishes no further operation.

The next arriving pulse upon the H bus 123L3, however, resets the Common Digit No. 1 flip flop 123FF1 of the number entry cycle control counter, thereby resetting the No. 8 flip flop 122FF1 of the digit storage register thus transferring the number "8" stored in the digit storage register to the up counter via bus 122R1. In addition, the resetting of the Common Digit No. 1 flip flop 123FF1 of the number entry cycle control counter places an enabling negative potential upon the upper input terminal of the shift left entry register gate 123G1, thereby producing a positive voltage signal on the shift left entry register bus 123R1 which initiates the shift left entry register program.

This positive voltage signal existing upon the shift left entry register bus enables the write entry command gate 141G2, and places a negative voltage level upon the bus 141R2. This negative voltage level signal upon the bus 141R2 is transferred along bus 144L14 to AND gate 144G7 and, in conjunction with the W3 signal occurring at W3 time upon the bus 144L5 of the same AND gate, produces a write command (positive voltage level) signal upon the WRITE COM bus 144R2. Since, however, the contents of the down counter at this time are zero, the counter having been drawn down to this condition upon the writing of the numeral "1" in the previous key depression cycle, the zero condition of the down counter as sensed by the down counter zero sense gate 155G1 will disenable the write circuit by disenabling AND gate 148G1. Thus, nothing will be written into the lowest order of the entry register on the drum, and there will be no tendency to destroy the recording at that point.

Since the number entry cycle control counter has remained in the same state, and the positive voltage level signal on the SL(E) bus 123R1 is still produced by the shift left entry register gate 123G1, the occurrence of the trailing end of the W3 timing pulse will result in a broadside transfer of the "8" stored in the up counter flip flop 150FF2 into the down counter flip flop 157FF1, as described hereinbefore under ENTRY OF DIGIT 1, and will also result in a resetting of the up counter, as described hereinbefore, there being no carry in the carry flip flop to cause the No. 1 flip flop 152FF1 of the up counter to bet set, rather than reset.

Again, since the phase of the number entry cycle control counter has not changed (and will not change until the occurence of the next H pulse), the positive voltage level signal remains on the SL(E) bus 123R1 until the occurrence of the next H pulse, the read from entry command gate 141G4 is enabled, thus producing at the output of its associated inverter 141A4, a negative voltage signal. This negative voltage signal on bus 141R4 is applied at the 144L8 bus and to the AND gate 144G4 in conjunction with the W4 time pulse on bus 144L7 will cause a positive voltage level signal to occur on the READ COM bus.

The appearance of this positive voltage level signal upon the READ COM bus, and its inversion by the inverter 144A9 will, at the time of the occurrence of a negative voltage signal on the RS bus 145B6, enable the gate 145G1, thus permitting data to pass from the entry register of track 4 through the inverter 145A1 to the shaping one shot 145N1 and through the inverter 145A3 to the bus 145T2. The positive going transition of the trailing edge of the first bit occurring at the 145T2 and 146L5 bus will set the read delay flip flop 146FF2, thus enabling the second and subsequent, if any, bits from the 145T2 bus to pass through the gate 146G1, but not allowing the first bit from track 4 to appear because the read delay was set by the trailing edge of the first bit.

In the problem now being considered, there will, of course, be two bits written upon the drum in the lower order digit entry register position. The first of these two bits will be suppressed by the operation of the read delay flip flop 146FF2 in conjunction with the AND gate 146G1, and the second of these bits will be passed on, after being limited to a definite voltage level to the ADVANCE UP COUNTER bus 146R1 and 152L3 thus advancing the up counter by "1." That is to say, in this phase of the shift left entry register cycle the "1" stored in the lower order of the entry register on the drum has been "copied" into the up counter.

The writing of the "8" previously stored in the down counter takes place during the next succeeding W3 period. This is accomplished by the fact that the positive voltage level signal on the SL(E) bus 123R1 is applied to the write entry command gate 141G2, causing a negative voltage level signal to be produced at the output of the associated inverter 141A2 upon the WRITE E bus 141R2.

This negative voltage level signal upon the WRITE E bus 141R2 is applied to the input of the W3 write timing gate 144G7 and, thus, when the W3 period occurs at bus 144L5, the W3 signal applied to the upper input terminal of the gate will cause a positive voltage level signal to be produced on the WRITE COM bus 144R2. (At the time this depression and release of the 8 key, as distinct from the original depression of the 1 key, a number is stored in the down counter, viz., the number "8.") Thus, the signal on the zero sense line 155R1 of the down counter will not disenable the AND gate 148G1.

In addition, the signal on the WRITE COM bus 147L5 as inverted in the inverter 147A4, is applied to the two central AND gates 149G3 and 149G4. Thus, when the other inputs of these two AND gates are excited (described hereinbelow) by bit signals from the write flip flop 148FF1, which signals are in turn provided by the output of the aforementioned AND gate 148G1, the outputs of the AND gates 149G3 and 149G4 will successively be applied to the inputs of the write circuit or the No. 1 write head on track 4 149WA2.

These successive bit pulses will be applied to the inputs of the write circuit for the No. 1 write head on track 4 and, at the same time, the down counter will be "debited" by one count state for each bit signal passed to the write circuit for the write head on track 4.

As explained above, the application of a significant positive voltage level signal on the WRITE COM bus 147L5 to the input of the inverter 147A4, causes a negative voltage level signal to be applied to both of gates 149G3 and 149G4 thereby enabling these gates, when excited by bit pulses, to pass these bit pulses onto the track 4 through track 4 write head 1 circuit 149WA2.

In addition, the positive voltage level signal on the WRITE COM bus 147L5 is applied to an input terminal of the OR gate 147G3. This results in a negative voltage level signal at bus 147R2 after passage through inverter 147A3, which signal is applied to bus 148B5, i.e., to one terminal of the gate 148G1. This gate 148G1 now is "enabled," insofar as its 148B5 terminal is concerned, by the presence of the positive voltage level signal on the WRITE COM bus 147L5. Also, since there is a quantity, viz., the numeral "8," stored in the down counter, there is an enabling (negative voltage level) signal on the 148B4 input terminal of this gate. Thus, since the gate is enabled as far as both of its "level" inputs are concerned, any bit signals fed from the read head of track 3 into gate 148G1 will appear at the output of this gate and, thus, will appear as positive-going pulses at the output of the associated inverter 148A1. These positive-going bit pulses are fed to the complement input of the write flip flop 148FF1 and forward to the gates 149G3 and 149G4 through inverters 148A3 and 148A4 which, as described above, have been placed in the "enabled" state by the presence of a positive voltage level signal on the WRITE bus 147R3. Thus, each said positive-going bit pulse will now be fed directly to the track 4, write head 1 write circuit and thus will be recorded in the lowest order entry position on the drum.

EXCESS BIT

However, as described above, it is desired to add an "excess" bit to the train recorded on the drum, i.e., to record 9 strokes on the drum, rather than to only record 8 strokes on the drum corresponding to the number now stored in the drum counter.

In order to insert this extra bit, or "excess" bit, the following circuits are utilized: the gate 146G3 in the up/down counter control and the write delay flip flop 146FF1.

The said positive-going bit signals, at the output of inverter 148A1, are applied to the one shot 148N1 for "shaping" purposes. These bit signals will generally be spikes, and not necessarily of suitable shape for actuation of the digital circuits of the machine. For this reason, each of these successive spikes will be used only to initiate operation of the one shot circuit, the output of the one shot circuit driving its associated inverter 148A2 to form, on bus 148T1, suitably "rectangular" information pulses for processing in the calculator.

These information pulses are fed via the bus 148T1 labelled RESET WRT DELAY FF to the lower reset or g input of the write delay flip flop 146FF1 and also to an input terminal of the up/down counter control gate 146G3.

As described above, the resetting of the FF1 type flip flop can only be done by a positive pulse, or a positive going transition. Therefore, the write delay flip flop will not be reset until the occurrence of the trailing edge of the first bit pulse conveyed to its lower reset or g input via the RESET WRT DELAY bus 146L6.

The up/down counter control gate 146G3, however, will be "disenabled" until it receives a negative voltage level signal on the input terminal thereof from the non-Q or b output of the write delay flip flop 146FF1 which negative voltage level signal is only produced when the write delay flip flop is in its reset condition. Also, the output of the gate 146G3 in the up/down counter control is conveyed by the ADVANCE DN CNTR bus 146R4 to the down counter, and is used to advance the down counter.

It may be seen from the above that, since the first bit is fed to the input of this gate before this gate is "enabled" by the write delay flip flop 146FF1, this first bit will be fed to the write head, but will not be able to advance the down counter.

Thus, through the operation of the write delay flip flop and the gate 146G3 in the up/down counter control, the first occurring bit in the group of bits occurring during W3 time will be "written" on the drum, but will not advance the down counter. It is the down counter, however, which controls the termination of the writing of bits onto the drum and, therefore, the writing of bits will be terminated by the zero sense down counter signal on bus 155R1 after the writing of the 9th bit on the drum rather than the writing of the 8th bit on the drum.

Thus, the down counter has been cleared and, in so doing, the "8" which was stored in the down counter has been written into the appropriate position on the drum in "excess 1" notation, i.e., 9 strokes have been written on the drum.

Now, as described above, the termination of the W3 timing pulse results in the transfer of the numerals stored in the up counter, viz., the numeral "1," to the down counter, and the resetting of the up counter which, because no carry is retained in the carry flip flop, has each one of its flip flops returned to the reset state. Now, here is the beginning of the W4 time. Since, however, the next order of the drum has a "blank" written therein at this time, there are no pulses applied by the output of the track 4 read head circuit to the middle input terminal of the AND gate 145G1 and, therefore, as above, the up counter will not be advanced, i.e., the "state" of the up counter will not be changed.

Thus, during the W4 period, nothing is read from the drum, i.e., the up counter is left in its zero indicating state. As will be clear, each "attempt to read" from the subsequent higher orders of the entry register during this present shift left entry register period will result merely in leaving the up counter in its "0" state.

Returning, however, to the present phase of the shift left entry register cycle, and numeral "1" remains in the down counter, and must be "written" into the drum at the second lowest order digit position, that being the next W3 time.

Now, during the subsequent W3 time, the fact that the SL(E) bus 123R1 still has a significant positive voltage signal thereon will result in the disenabling of the write entry command gate 141G2 which will, in turn, in conjunction with the W3 signal on bus 144L5, enable the write timing gate 144G7 and place a significant positive voltage level signal on the WRITE COM bus 144R2. This will initiate the write cycle, as described above, and will cause 2 bits to be written on the drum in the second lowest order position of the entry register.

In so doing (i.e., counting the down counter to zero), the down counter will be reset. Thus, both the up and down counters are now standing in the reset condition.

Since both the up and down counters are now standing in the reset position, i.e., containing a count of zero, and since the interrogation of every subsequent order of the entry register will produce no bit signals at the 148B4 input lead of the gate 148G1, the arithmetic unit will not be disturbed at any of the succeeding higher order positions of the entry register on this turn of the drum.

At the next occurrence of the H pulse, the shift left entry register gate 123G1 will be "closed" i.e., the significant positive voltage level signal will be taken off the SL(E) bus 123R1.

This is accomplished, as described above, by the resetting of the number entry cycle control counter into its "home" state by the receipt of the H pulse, which resets the Common Digit No. 2 flip-flop 123FF2 of the number entry cycle control counter, therefore leaving both flip flops of the number entry cycle counter reset, this being the (1) or "home" phase of the number entry control cycle counter, as described above.

TRANSFER FROM ENTRY REGISTER TO ACCUMULATOR REGISTER

Having entered the number "18" into the entry register, it is now desired to transfer this number "18" into the accumulator register. This operation is initiated by pressing and releasing the first factor key (FFA).

Depression and release of the first factor key causes a positive pulse to appear at the output of the FFA key pulse generator 124K5. This positive pulse is applied to the non-Q or $b$ output terminal of the first factor flip flop 124FF5, thereby setting the first factor flip flop, and also holds the first factor flip flop input to the function OR gate 126G1 at a positive voltage level. Also, the Q or $a$ terminal, in the manner well known to those skilled in the art, is placed at a negative voltage level.

This negative voltage signal is applied to bus 127L5 which is one of the two terminals of an AND circuit composed of the diode 127D5 and the resistor 127RS5. This, with the application of the negative voltage level signal from the Q or $a$ output of the first factor flip flop 124FF5 to the bus 127L5 of this AND circuit, the AND circuit is conditioned to pass a negative voltage level signal to the input of the inverter 127A5 when, and only when, the lower terminal of this AND circuit (the resistor 127RS5) is also supplied with a negative voltage level signal.

Now, considering the output of the function gate 126G1, the application of a positive potential to one of the inputs of this gate upon the setting of the first factor flip flop 124FF5 causes the output of the function gate to go to a positive voltage level. This positive voltage level at the output of the function gate is applied to the input of inverter 126A1.

The output of the inverter 126A1 is a negative voltage level which is applied directly to the Q or $a$ terminal of the function timing flip flop 126FF1. When the output of this inverter is at a positive voltage level, the function timing flip flop 126FF1 will be held in the reset condition. When, however, the positive voltage level pulse is carried forward from the output of the function gate and applied to the input of this inverter, the output thereof will then go to a negative voltage level and, as may be deduced from consideration of the circuitry of the type 1 flip flop, the function timing flip flop will be "unlocked," i.e., the function timing flip flop will remain in its reset state, but will then be capable of being complemented by an input to the complementing input of this flip flop. The complementing input of this flip flop, however, is tied to the H bus 126L12.

Thus after the depression and release of the first factor key has caused a positive voltage level output to be produced upon the output of the function gate 126G1, thereby altering the signal tied to the Q or $a$ terminal of the function timing flip flop 126FF1 to a negative voltage level, and thereby "unlocking" this flip flop while leaving it in its reset state, the occurrence of the next H pulse will "complement" the function timing flip flop, transferring it to its set state.

In the set state of the function timing flip flop, the non-Q or $b$ output terminal thereof is at a positive voltage level.

This positive voltage level signal on the non-Q or $b$ output terminal of the function timing flip flop is tied to the input of an emitter follower 126Q1, the output of which is tied to the input of an inverter 126A2, the output of this inverter being tied to the input of a successive emitter follower 126Q2 and, finally, the output of this emitter follower being tied, via bus 126R5, to the resistive input 127L9 of the AND gate previously described which includes diode 127D5 and resistor 127RS5. Thus, the positive voltage level signal at the non-Q or $b$ output of the function timing flip flop 126FF1 occurs at the resistive input of this AND gate as a negative voltage level, thereby "opening" this gate at the occurrence of the H pulse on bus 126L12 and resulting in the production of a positive voltage level signal at the output of the inverter 127A5. This output of the inverter 127A5 is the FFA bus 127R9.

Thus, the depression and release of the first factor key has resulted in (a) placing the function timing flip flop 126FF1 into its set state at the occurrence of the next succeeding H pulse, and (b) producing a significant positive voltage level signal upon the first factor FFA bus 127R9.

As employed in the first factor program, this first factor (FFA) bus 127R9 is tied to the inputs of 3 gates, the write accumulator command gate 141G1, the read from entry command gate 141G4 and the broadside command gate 142G2.

The arrival of the significant positive voltage level signal on the first factor (FFA) bus 127R9 conditions all three of these gates to produce a significant negative voltage level signal at the output of the inverter associated with each said gate (141A1, 141A4, 142A2).

Thus, the significant negative voltage level signal produced at the output of the inverter 141A1 associated with the write accumulator command gate 141G1 is conveyed by means of the bus 141R1 to one input of AND gate 144G6. This input signal so conditions this write timing gate 144G6 that, when the W2 timing pulse appears on bus 144L3, the WRITE COM bus 144R2 tied to the output of the inverter 144A6 of the output of the write timing gate 144G6 goes to a positive voltage level.

The occurrence of this positive voltage level signal on the WRITE COM bus 144R2 initiates the normal write cycle described hereinabove, which would write the contents of the down conter into an accumulator "slot" on track 4. But here, however, nothing is stored in the down counter and, consequently, the corresponding signal on the down counter zero sense line 155R1 prevents writing by means of AND gate 148G1. No part of the transfer cycle from entry to accumulator in response to the depression of the first factor (FFA) key occurs during the W3 time period.

Now, starting the W4 time period, because of the significant positive voltage level signal remaining on the first factor (FFA) bus 127R9, the read from entry command gate 141G4 has on the output of its corresponding inverter 141A4 a negative voltage level signal, for reasons stated hereinabove. This negative voltage level signal is applied to one of the two inputs of the read timing gate 144G4. Thus, at the occurrence of W4 time, the W4 signal on the 144L7 bus is applied to the other input of this gate 144G4 on the W4 bus, the READ COM bus having a positive voltage level signal applied thereto.

This positive voltage level signal is inverted in inverter 144A9 and applied to one of the inputs of the gate 145G1. Thus, when the signal on the RS bus 145B6 is at a negative voltage level the bits read from data track 4 will be passed through an inverter 145A1, a shaping one shot 145N1, and an inverter 145A3 to the set or $h$ input of the read delay flip flop 146FF2, and also to one of the inputs of the gate 146G1. This signal is passed in the form of negative-going pulses, but since the read delay flip flop can be triggered only by positive-going transitions, the read delay flip flop is not triggered until after the passage of the first bit pulse, i.e., the trailing edge of the first bit pulse. The gate 146G1 will not be enabled until after the occurrence of the first bit pulse of the series. Therefore, the first bit pulse of the series will not be passed to the ADVANCE UP COUNTER bus 146R1, but the subsequent bit pulses of the series will be passed to the ADVANCE UP COUNTER bus by gate 146G1, which will be opened by a signal supply from the $a$ output of the read delay flip flop 146FF2 when this flip flop has been triggered by the passage of the trailing edge of the first bit pulse.

Thus, the bits read out of track 4 during W4 time will all pass to the ADVANCE UP COUNTER bus, except one. These bits (8 in number) on the ADVANCE UP COUNTER bus will result in the up counter being advanced through its "8" state.

As described above, during the presence of the positive voltage level signal on the first factor (FFA) bus 127R9, an output signal will also be produced by the gate 142G2, this output signal providing negative voltage level on the output of the associated inverter 142A2. This negative voltage level is applied to one of the inputs of the gate 143G3. Thus, when the W4 timing pulse is received on bus 143L5 by the other terminal of this gate 143G3, a positive voltage level signal will be produced at the output thereof. After passing through inverter 143A3, the signal on the UP TO DOWN/RESET UP bus 143R1 will be at a negative voltage level. In the manner described hereinbefore, a positive transition of the potential on this bus at the termination of the W4 pulse will cause the number "8" stored in the up counter to be broadsided to the down counter, and the up counter to be reset.

No part of the entry register to accumulator register transfer cycle in response to the depression and release of the first factor key appears during the W1 time.

Next, during the W2 time, the number "8," which was just broadsided into the down counter, is rewritten into the lowest order of the accumulator register as represented on the surface of the drum. This reading out of the down counter into the drum is effected in the manner described hereinabove during W2 time.

As stated above, no portion of the entry to accumulator transfer cycle in response to the depression and release of the first factor (FFA) key, occurs during the W3 period.

Next, during the W4 period, the number "1" stored in the second lowest order of the entry register on the drum is entered into the up counter, whereafter, at the end of the W4 period, this number is entered into the up counter, is broadsided into the down counter, and the up counter is reset. Since the number "18" appeared in the entry register before the depression of the first factor key, and since this entire number "18" has been entered into the accumulator register by the operations described immediately hereinabove, the treatment of the balance of the higher order digits is of no concern, the termination of the transfer cycle taking place when the potential on the first factor (FFA) bus 141L1 is returned to its normal negative voltage level by the action of the next succeeding H pulse on bus 126L12. That is, the H bus 126Y12 signal next proceeding excites the complementing or $g$ and $h$ input of the function timing flip flop 126FF1, thereby returning the function timing flip flop to the reset state. This return of the function timing flip flop 126FF1 to the reset state has two effects. The first effect of the return of the function timing flip flop to the reset state is to set the common function storage flip flop 126FF2, which is done by the positive-going transition read from the Q or $a$ output of the function timing flip flop to the set or $h$ input of the common function storage flip flop.

The second effect of the resetting of the function timing flip flop is to reset any of the function storage flip flops which have been set by depression and release of a function key.

This is accomplished by the negative-going transition occurring at the non-Q or $b$ output of the function timing flip flop 126FF1, which negative-going transition passes through emitter follower 126Q1, is inverted by the inverter 126A1, and then fed to the reset line 124L1 and 125L1 which is common to all of the reset or $g$ input terminals of the function storage flip flops 124FF1 to 124FF5 and 125FF1 to 125FF4.

This resetting will, of course, reset the first factor storage flip flop 124FF5, which was previously set by the depression and release of the first factor key. An additional effect of toggling or complementing the function timing flip flop 126FF1 is the appearance at the bus 126R5 and 126R6 and, therefore, on the resistor input 127L9 of the diode resistor gate including resistor 127RS5 and diode 127D5 of a positive voltage level signal. This positive voltage level signal applied to the resistive input 127L9 of the gate terminates the presence of the significant positive voltage level signal on the first factor bus 127R9.

By so doing, the first factor cycle from entry register to accumulator register is terminated.

Digit entry 2

Now, in order to enter the digit "2" of the number 20, the No. "2" digit key 121K2 is depressed and released. Thus, as hereinbefore described, the number "2" is entered into the digit storage register by setting only the No. 2 flip flop 122FF3 of the digit storage register. Also, the common line 123L2 of the key pulse encoder provides a positive pulse to the non-Q or *b* input of the Common Digit flip flop No. 1, 123FF1 of the number entry cycle control counter. This impels the number entry cycle control counter into its (2) phase, as set forth before. In this phase, a negative voltage level signal is produced upon the Q or *a* output of the Common Digit No. 1 flip flop 123FF1 of the number entry cycle control counter. This negative voltage level signal on the common digit bus 123L2 is applied to one of the inputs of the clear entry gate 126G2. The other input of the clear entry gate, however, is presently held at a negative voltage level due to the common function storage flip flop 126FF2 placed in its set condition by the immediately preceding depression and release of the first factor key, as described above.

Thus, the output of the clear entry gate 126G2 is at a negative voltage level and the output of the inverter 126A3 directly attached thereto is at a positive voltage level. This positive voltage level signal is applied to the CLEAR ENTRY bus 126R2. The application of this positive voltage level signal on the CLEAR ENTRY bus to the input of the write entry command gate 141G2 causes a negative voltage level command signal to be transmitted over the bus 141R2 to one input of the W3 write gate 144G7.

Upon the occurrence of the negative voltage level W3 time pulse on bus 144L5, this gate 144G7 is enabled, thus producing a significant positive voltage level signal upon the WRITE COM bus 144R2. This positive voltage level signal occurring upon the WRITE COM bus causes a negative voltage level signal to be applied to one input terminal of each of the gates 149G3 and 149G4 along the bus 147R3. The number now stored in the down counter is "0," however, and, for this reason, the zero sense gate 155G1 of the down counter produces such a signal on the zero sense bus as to maintain the gate 148G1 disenabled.

Since the gate 148G1 is disenabled the write flip flop 148FF1 will remain in one of the set or reset states. Since the write flip flops remains in one of its stable states, only one of the two gates 149G3 and 149G4 will be able to produce a negative voltage level output signal. For this reason, the track 4, write head 1, will cause a constant direct current through one half of the write coil during each W3 period, i.e., so long as the significant positive voltage level signal remains upon the CLEAR ENTRY bus 126R2. Thus, during each W3 period, so long as the CLEAR ENTRY bus remains in its "significant" positive voltage level state, the data appearing in the entry register on track 4 of the drum will be erased. That is, the data will be replaced with unidirectional D-C magnetization of the drum surface in those areas.

This erasure process will continue, entry digit by entry digit, until the appearance of the second H pulse next succeeding on bus 126L12. That is, the appearance of the first H pulse next succeeding will impel the number entry cycle control counter forward to phase (3), but the resetting of the common function storage flip flop 126FF2 must wait upon the resetting of the Common Digit No. 1 flip flop 123FF1 of a number entry cycle control counter, and this does not occur until the next successive H pulse, which impels the number entry cycle control counter forward to the (4) phase.

The occurrence of the next, or second succeeding H pulse will propel the number entry cycle control counter forward to its (4) state and reset the Common Digit No. 1 flip flop 123FF1 of the number entry cycle control counter. In so doing, the Q or *a* output of this flip flop 123FF1 goes through a negative to positive voltage transition, thereby resetting the common function storage flip flop 126FF2, and terminating the presence of the significant positive voltage level signal upon the CLEAR ENTRY bus 126R2.

In addition, the occurrence of the positive going transition on the Q or *a* output of the No. 1 flip flop 123FF1 of the number entry cycle control counter will reset the digit storage register, and transfer the contents of the digit storage register to the up counter, in the manner hereinbefore described.

Having entered the highest order digit, "2," into the entry register by depressing and releasing the No. 2 digit key, we now proceed to enter the other digit of the number desired to be entered, viz, zero.

Digit entry (0)

Since the digit entered is, in this case, zero, the setting of the digit storage register counter will remain zero, i.e., will not be set.

The common output line of the key pulse encoder 121R7 will, however, be pulsed just as in the case of the entry of any other digit.

This pulse will, as before, impel the number entry cycle control counter forward to its (2) state.

The first occurrence of an H pulse thereafter will advance the number entry cycle control counter to its (3) state but, since the common function storage flip flop 126FF2 has not been set in the course of the cycle taking place upon the depression and release of a function key, this portion of the cycle of the number entry cycle control counter will not be utilized to carry out a function within the machine.

Then, upon the occurrence of the second succeeding H pulse, the number entry cycle control counter is advanced to its (4) state.

At the commencement of this phase of the number entry cycle control counter, the Q or *a* output of the No. 1 flip flop 123FF1 of this counter makes a positive-going transition to the positive voltage level. This positive-going transition is transmitted by the common digit bus 123L2 to bus 145B15. In the pulse forming network coupled to bus 145B15, this positive-going transition is differentiated by the resistor 145RS7 and capacitor 145C3 network, thereby producing a high amplitude positive-going spike at the bus 145T6 and the lower set input of the read delay flip flop 146FF2. This signal at the lower set input of the read delay flip flop sets the read delay flip flop, causing the Q or *a* output thereof to pass through a negative going transition from a positive to a negative voltage level.

In the instance of entering a zero by means of the zero digit key, as in the present case, it will be recognized that, when the digit storage register counter is reset, the transfer which would otherwise take place from the digit storage register to the up counter does not take place, i.e., the up counter remains entirely in its reset condition.

It may be considered that the presence of the totally reset condition in the up counter amounts to having a zero stored therein.

Further, in the normal digit entry cycle as described above, the contents of the up counter will be "broadsided" into the down counter at the termination of the W3 period. In this case, no change will actually take place in the state of the down counter, since, when entering zero, the up counter is in its totally reset state even after the "transfer" of the contents of the digit storage register into the up counter.

At the end of the W3 period, in addition to the "broadsiding" of the contents of the up counter into the down counter, the UP TO DOWN/RESET UP signal also causes the production of a positive-going read delay reset signal by means of the network terminating at bus 153R5 and 146L4. This read delay reset signal or RESET READ DEL FF bus 146L4 resets the read delay flip flop 146FF2 and also sets the write delay flip flop 146FF1.

Since the write delay flip flop is set, the non-Q or b output thereof is at a positive voltage level. However, the non-Q or b output of the write delay flip flop is directly tied via WRITE DELAY bus 146R5 and 155L8 to one of the inputs of the down counter zero sense gate 155G1. Thus, a positive voltage level signal is applied to one of the inputs of the down counter zero sense gate, and this causes the potential on the ZERO SENSE bus at a positive voltage level. This positive voltage level signal on the ZERO SENSE bus is inverted in the inverter 155A5 thus enabling the gate 148G1. Immediately afterward, in the W4 time period, the number "2" is read from the lowest order of the entry register into the up counter in the manner described hereinabove.

Consultation of the timing diagrams will show that no phase of the zero digit entry occurs during the W1 and W2 time periods. Then, during the W3 time period, the contents of the down counter, viz, zero, is read into the lowest order digit position of the entry register on the drum. However, it will be recognized that the code to be read into the drum for a zero is not itself an absence of bits, but a single "excess bit." This excess bit is entered as follows: the occurrence of the W3 pulse at the input 144L5 of the gate 144G7 produces a significant positive voltage level signal on the WRITE COM bus 144R2. This signal on the WRITE COM bus is applied to one of the input terminals 147L5 of the gate 147G3 and causes a negative voltage level signal to appear at the output of inverter 147A3 coupled thereto and, thus, upon the 148B5 bus input of the gate 148G1. This gate, however, already has a negative voltage level enabling signal applied thereto via bus 148B4 by the operation of the down counter zero sense gate 155G1 in conjunction with the non-Q or b terminal of the write delay flip flop 146FF1.

Therefore, a bit from the read head 148RA1 on track 3 is applied to the write flip flop 148FF1 through the gate 148G1, impressing a bit upon track 4 in the lowest order position of the entry register. This bit signal, however, is not only applied to the write flip flop, but also, after reshaping by the one shot 148N1 is applied to the WRITE DELAY RESET bus 148T1. Thus, since this bit pulse is negative-going, its trailing edge is applied to the lower reset or g input of the write delay flip flop 146FF1 and resets this flip flop.

Since, however, the non-Q or b output of the write delay flip flop, which is now at a negative voltage level, is tied directly to one of the inputs of the down counter zero sense gate 155G1, the signal on the ZERO SENSE bus goes to a negative voltage level, therefore applying a positive voltage level signal to one of the inputs of the gate 148G1, and blocking further passage of bit signals from bit track 3 to the write flip flop 148FF1, and thus to the data track 4. By the above described process, a single "excess" bit is applied to the appropriate entry space of the data track 4 when the zero key is depressed and released.

The re-entry of the digit "2" into the next higher order of the entry register is carried out as described hereinabove and need not be re-described at this point.

As a result of the above described process, it will be recalled that the number "18" has been entered into the accumulator register, and that the number "20" is now entered in the entry register.

ADDITION

It is now desired to add the number "20" in the entry register to the number "18" in the accumulator register. In order to do this, the add key 125K4 is depressed and released. Depression and release of the add key causes a positive voltage pulse at the 125R8 and 126L9 bus in the manner described hereinbefore. This positive voltage pulse sets the add flip flop 125FF4 in the same manner described hereinbefore for the first factor (FFA) flip flop.

Also, as described hereinbefore, the add flip flop remains in the set condition, therefore causing the non-Q or b output thereof to remain at a positive voltage level condition. This positive voltage level state of the non-Q or b output of the add flip flop is applied to one of the inputs of the function gate 126G1, causing the output of the function gate to go to a positive voltage level which level, when inverted by the inverter 126A1 to a negative voltage level signal, is applied to the Q or a output of the function timing flip flop 126FF1. The application of this negative voltage level to the Q or a output of the function timing flip flop, as hereinabove described, "unlocks" this function timing flip flop, thereby making is susceptible of being toggled or complemented by its toggle input, but leaving it in the reset condition until so toggled. The function timing flip flop, then, is in its reset state, and is "unlocked."

The arrival of the next significant transition upon the H bus 126L12 complements the function timing flip flop 126FF1. When complemented, the function timing flip flop has a positive voltage level signal at its non-Q or b terminal, which positive voltage level signal is applied, inter alia, to the chain of emitter followers 126Q1 and 126Q2 and inverter 126A2. As a result of passing through this chain, the positive voltage level signal at the non-Q or b output terminal of the function timing flip flop appears at bus 126R5 and 126R6 as a negative voltage level signal.

This negative voltage level signal is applied to the resistive input 128L3 of the resistor 128RS1-diode 128D1 gate. The other terminal 128L2 of this resistor-diode gate is concurrently supplied with a negative voltage level signal from the Q or a output terminal of the add flip flop 125FF4. Therefore, an output signal is produced at the output of the inverter 128A2 associated with this resistor-diode gate. This output is a positive voltage level signal which is applied to the input of the inverter 128A5, thereby being inverted to a negative voltage level signal, which is then applied to the 129L1 input terminal of the gate 129G1 in the accumulator sign control. The other terminal of this gate 129G1 in the accumulator sign control has a negative voltage level signal applied thereto because it is tied to the Q or a output of the accumulator sign flip flop 128FF2 which is in the set condition.

Thus, the gate 129G1 of the accumulator sign control is "open" and a positive voltage level signal is produced at the output of its associated inverter 129A3, i.e., on the ADD bus 129R3.

The presence of this positive voltage level signal on the ADD bus 129R3 enables the write accumulator command gate 141G1, thus producing a significant negative voltage level signal on the bus 141R1 at the inverter 141A1 output, which signal is applied to the 144L12 input of the gate 144G6.

Thus, with the WRITE A negative voltage level signal applied to one input of the W2 write gate 144G6 the occurrence of the W2 signal on the 144L3 input of this W2 write gate will cause a significant positive voltage level signal on the WRITE COM bus 144R2.

As a result of this signal, the write circuits are conditioned to write the contents of the down counter into the accumulator register. Since, however, in this case, there is nothing stored in the down counter and the write head is in "dead time" on the drum, this phase of operation will not succeed in making a significant entry upon the drum.

The significant positive voltage level signal remains upon the ADD bus 129R3, however; thus, in the next succeeding time period, viz, W3, the machine will be conditioned for reading the lowest order digit from the accumulator register of the drum into the up counter.

This is done by the following: producing a significant negative voltage level signal upon the bus 141R3, which signal is tied directly to one of the inputs of the W3 read gate 144G3. Thus, as described hereinbefore, upon occurrence of the W3 timing pulse at the 144L5 input of the W3 read gate 144G3, a significant positive voltage level output signal will be produced upon the READ COM bus.

This signal upon the READ COM bus is inverted by inverter 144A9 to a negative voltage level and applied to the 145B1 input of the gate 145G1.

Upon application of this negative voltage level signal, gate 145G1 is enabled, as described hereinabove, to pass data signals from the track 4 read head 145RA1 during the "on" periods of the RS bus 145B6 to a pulse shaping network 145N1 and an inverter 145A3, whereby each of the bits read from track 4 is produced at one of the inputs of the sequence control gate 146G1 and at the upper set or $h$ input of the read delay flip flop 146FF2, in the form of negative-going pulses.

The read delay flip flop 146FF2 and the counting sequence control gate 146G1 now function in the manner described hereinabove to maintain the counting sequence control gate 146G1 in the disenabled condition during the occurrence of the first bit pulse from the read head 145RA1 of track 4 thus eliminating the "excess" bit pulse, as hereinbefore described in detail.

The subsequent bits will, of course, pass through counting sequence control gate 146G1 and will then be applied to the ADVANCE UP COUNTER bus 146R1 in the manner described hereinbefore. Thus, the numeral "8" stored in the lowest order position of the accumulator register upon the drum is fed into the up counter.

At the termination of the W3 pulse, the read delay flip flop 146FF2 is reset by a positive-going transition applied to its lower reset or $g$ input terminal. This positive-going transition is applied from the output of the inverter 146A1 associated with the timing sequence control gate 1 composed of diode 146D1, resistor 146RS1 and capacitor 146C1. The input to this sequence control gate 1 is supplied from the output of the inverter 143A6 associated with the add cycle read delay reset gate 143G6. This gate has as its inputs an ADD signal (the signal on the ADD bus 143L11 and the W3 timing signal 143L3. Thus, when the W3 timing signal on the W3 bus 143L3 and the significant signal on the ADD bus 143L11) occur simultaneously, a positive voltage level signal occurs at the output of sequence control gate 143G6.

However, at the termination of the W3 timing pulse as applied to the 143L3 input of the add cycle read delay gate 143G6, a negative-going transition is applied to the diode input 146L1 of counting sequence control gate 1. As a result, a positive-going transition is produced at the output of the associated inverter 146A1 and, thus, applied to the lower reset input of the read delay flip flop 146FF2, resetting the read delay flip flop.

Now, at the commencement of the W4 time period, the continued presence of the significant positive voltage level signal on the ADD bus 141L7 will cause a significant negative voltage level signal on the bus 141R4, which signal is applied to an input 144L8 of the W4 read gate 144G4 and, in conjunction with the occurrence of the W4 timing pulse on bus 144L7, produces a significant positive voltage level signal on the READ COM bus as hereinabove described. This significant signal on the READ COM bus will, as hereinbefore described, initiate the operation of suppressing the first, or "excess" bit, and will cause the reading of the bits stored on track 4 in the lowest order of the entry register (though only 1 bit is present in the instant problem), these bit signals being produced at bus 145T2 as negative-going, shaped pulses.

In the instant problem, the number to be read from the lowest order of the entry register is zero and, therefore, the read delay flip flop 146FF2 will conjoin with the counting sequence control gate 146G1 to suppress the only pulse read from the drum, viz, the "excess" bit.

Thus, it may be considered that the "zero" from the lowest order of the entry register has been entered into the up counter "on top of" the "8" which was previously read from the lowest order of the accumulator register on the drum. It may also be considered that the sum of the "8" and the "zero" from the lowest orders of the accumulator and entry registers, respectively, now exists in the up counter. (It should be understood that if the sum of these two lowest order digits had been greater than "9," the up counter would have operated to set the carry flip flop 150FF1. Since, however, the sum of the two digits here under consideration is not greater than "9," the carry flip flop remains in its reset condition.)

At the termination of the W4 time period, the conjunction of a negative voltage level signal from the output of the inverter 142A2 associated with the broadside command gates at one of the input terminals of the broadside timing gate 143G3 with the trailing edge of the W4 timing pulse will cause a positive-going transition on the UP TO DOWN/RESET UP bus 143R1. This positive-going transition on the UP TO DOWN/RESET UP bus will cause the number "8" stored in the up counter to be "broadsided" or shifted into the down counter, and will reset the up counter in the manner hereinbefore described.

CARRY

It is noted that, had the carry flip flop 150FF1 been set, it would have been reset by this positive-going transition on the UP TO DOWN/RESET UP bus. Considering for a moment, the operation of the carry flip flop in determining whether the No. 1 flip flop 152FF1 of the up counter will, or will not, be reset upon receipt of the UP TO DOWN/RESET UP significant positive voltage level signal, let us first consider the present case, wherein the carry flip flop remains reset. In this case, the positive voltage level a tthe Q or an output 150R1 of the carry flip flop is applied to the bus 152L1. This bus is tied to one end of a resistor 152RS5 which comprises a part of the pulse gate tied to the upper or $i$ reset input of the No. 1 flip flop 152FF1 of the up counter. This pulse gate comprises in addition to said resistor, a capacitor 152C4 tied between the other end of said resistor and the bus 152T2, and diode 152D6, the cathode of which is tied to the upper reset or $i$ input of the No. 1 flip flop 152FF1.

Considering now a period when the UP TO DOWN/ RESET UP bus 143R1 is in its "normal" negative voltage level condition, it may be seen that this negative voltage level is applied from bus 153L8 through the time delay circuit including capacitor 153C1, resistors 153RS1 and 153RS2, inverters 153A1 and 153A6 to the capacitor input terminals 151L2 and 152T2 of the pulse gate. Thus, the capacitor 152C4 of the pulse gate will be charged to the point where it is storing a negative voltage level, its lower plate as shown in the diagram being relatively positive.

Subsequently, when the UP TO DOWN/RESET UP bus makes a positive-going transition to its significant positive voltage level, this positive-going transition is reflected to the upper terminal of the capacitor 152C4, bringing that point to a positive voltage level. Thus, instantaneously, the upper plate of the capacitor 152C4 is driven in the positive direction.

This positive transition of the lower plate of the capacitor 152C4 of the pulse gate passes a current signal through the diode 152D6 to the upper or $i$ reset input of the No. 1 flip flop 152FF1, thereby resetting this flip flop.

From the above, it may be seen that, in the case where the carry flip-flop remains reset, the No. 1 flip flop 152FF1 will be reset by the occurrence of the UP TO DOWN/ RESET UP transition on the UP TO DOWN/RESET UP bus, as are the 2, 4, and 8 flip flops 151FF2, 151FF1 and 150FF2, respectively, of the up counter.

It will be evident from the above considerations that, were the carry flip flop 150FF1 in its set position, a positive voltage level signal would be applied to the resistor input 152L2 of the similar pulse gate including capacitor 152C3 and diode 152D3 and, upon the occurrence of the positive-going transition on the UP TO DOWN/ RESET UP bus, the No. 1 flip flop 152FF1 would be or remain set, as the case may be.

We have now arrived at the end of the W4 time in the add cycle, having broadsided the contents of the up counter into the down counter and reset the up counter. Thus, the sum of the two lowest order digits from the entry register and the accumulator register is now found stored in the down counter.

During the next succeeding W2 period, the contents of the down counter are written into the lowest order of the accumulator.

This means, of course, that the contents of the down counter, viz, the numeral "8," must be written into the lowest order storage position of the accumulator register on the drum, not as 8 stored bits, but as 9 stored bits, the additional stored bit being the "excess" bit referred to at several places hereinabove. The addition of this "excess" bit is brought about by the write delay flip flop 146FF1 acting in conjunction with the counting sequence control gate 146G3.

First, it will be recognized, that the write delay flip flop 146FF1 was actuated into its set condition at the time that the read delay flip flop 146FF2 was actuated into its reset condition as described hereinabove. This was accomplished by the tie between the Q or a terminal of the read delay flip flop and the upper set or $h$ input terminal of the write delay flip flop. Thus, the write delay flip flop is now in its set condition.

Since the write delay flip flop is in its set condition, and since its non-Q or $b$ output is tied to one of the inputs of the counting sequence control gate 146G3, this counting sequence control gate will remain disenabled until the write delay flip flop is complemented.

As hereinbefore described, the occurrence of the significant negative voltage level on the WRITE COM bus 144R2 in conjunction with the non-zero signal from the zero sense gate 155G1 of the down counter will enable the gate 148G1. Thus, this gate is enabled to pass the bit information from the timing bits stored on track 3. The bit information produced at the output of this gate 148G1 is, as described hereinabove, fed to the write flip flop 148FF1, and in addition, fed through the shaping network 148N1 and inverter 148A2 to an input of counting sequence control gate 146G3 and the lower reset or $g$ input of the write delay flip flop 146FF1. The bit information fed to counting sequence control gate 146G3 and the write delay flip flop 146FF1 is in the form of negative-going pulses.

In operation, the first occurring of these negative-going bit signals cannot pass counting sequence control gate 146G3 due to the positive voltage level signal applied thereto by the non-Q or $b$ output of the write delay flip flop 146FF1. This first pulse, however, is passed to the write flip flop 148FF1 and, thus, inscribed upon the drum. Thus, a pulse is inscribed upon the drum and the down counter is not "debited" or counted down in correspondence thereto. It will be recognized, of course, that this pulse inscribed upon the drum without debiting the down counter is the "excess" bit stored upon the drum.

Upon the occurrence of the trailing edge of this first bit pulse the write delay flip-flop 146FF1 is reset, thus "opening" counting sequence control gate 146G3, whereafter each pulse which is inscribed upon the drum by means of the write flip flop 148FF1 is also debited from the down counter. Therefore, when the down counter returns to zero and the signal on the zero sense bus 155R1 returns to its quiescent state, the gate 148G1 will be disenabled thus preventing the feeding of further pulses from the timing bit track 3 onto track 4. Thus, the "sum" stored in the down counter has been entered into the accumulator register in the lowest order position.

The addition of the second lowest order digit in the accumulator, viz, the numeral "1," to the second lowest order digit in the entry register, viz, "2," is accomplished in the same manner as the addition of the lowest order digits. It will be recognized, of course, that had a carry been generated in the lower order it would have existed as a preset "1" stored in the up counter and would have been added into the total of one and two without further steps taken within the machine.

In addition, if the second lowest order digits had been sufficiently large to generate a carry, this would have left a 1 stored in the up counter, which would then have been written into the third lowest order digit position of the accumulator in the course of normal operation of the machine.

Thereafter, until the end of one revolution of the drum is reached, the machine will, in its normal course of operation, add "blanks" as stored in the accumulator register to "blanks" as stored in the entry register, and record "blanks" in the remaining positions of the accumulator register.

It will be recognized that, in the operation of addition, no erasure of the information stored in the entry register takes place and, thus, at the end of the add operation, the content of the entry register on the drum remains the same, and this content is displayed in the entry register position of the display tube (to be explained later).

At the termination of sweeping one revolution of the drum (during which time the addition is performed), an H pulse occurs, which pulse is fed from the H bus 126L12 into the toggle or complement input of the function timing flip flop 126FF1, thus resetting this flip flop. The resulting negative voltage level upon the non-Q or $b$ output of the function timing flip flop, as inverted by inverter 126A2 is impressed upon bus 126R4 and 125L1, resets the add storage flip flop 125FF4, and places a positive voltage level on the resistive input terminal of the resistor-diode gate at bus 126R6 and 126R5, thus terminating the presence of the significant positive voltage level signal on the add bus 129R3.

In addition, the negative voltage level signal appearing on the non-Q or $b$ output of the now reset add storage flip flop 125FF4, travels via the function gate 126G1 and "relocks" the function timing flip flop 126FF1 by producing a positive voltage level through the inverter 126A1. This positive-going transition will also set the common function storage flip flop 126FF2.

Thus, the add operation is terminated and the machine is conditioned for the next state of operation.

TRANSFER FROM ACCUMULATOR REGISTER TO TEMPORARY STORE

It is now desired to transfer the numbers stored in the accumulator into the number 1 storage register. This operation is initiated by depression and release of the T1 key 124K1. As hereinbefore described, the depression and release of the T1 key sets the T1 flip flop 124FF1, produces an output from the function gate 126G1 which "unlocks" the function timing flip flop 126FF1, and produces a negative voltage signal level at the input 127L1 of the diode 127D1-resistor 127RS1 gate. The occurrence of the next significant H signal on the H bus 126L12, thereafter, will set the function timing flip flop, as hereinabove described, thus producing a negative voltage signal level at the resistive input 127L9 of the resistor diode AND circuit. This, in turn, will produce a significant positive voltage level signal on the T1 bus 127R2, and will produce a significant negative voltage level signal on the T1 bus 127R1.

Having now provided a significant negative voltage level signal on the T1 bus 127R1, and a significant positive voltage level signal on the T1 bus 127R2, and also having set the function timing flip flop 126FF1, the next procedure is to transfer the contents of the accumulator to storage 1.

Broadly speaking, this transfer from accumulator to storage 1 is accomplished by (1) reading a single digit of information from the accumulator during the W3 time period, (2) "broadsiding" the information from the up counter to the down counter at the time of transition from W3 period to W4 period and (3) writing the contents of the down counter into the storage 1 register during the W4 time period.

To effect the transfer from the accumulator into the up counter, the T1 signal on bus 127R2 is applied to the read from accumulator command gate 141G3 at bus 141L14, which in turn excites the W3 read gate 144G3, at W3 time, the W3 read gate producing a significant positive voltage level signal on the READ COM bus. This significant signal upon the READ COM bus, as hereinbefore described, causes the reading of the contents of the lowest order of the accumulator appearing on the drum into the up counter.

At the termination of the W3 time pulse the broadside timing circuit gate 143G2, which is enabled by a signal produced by the broadside command gate 142G1, produces a positive-going signal upon the UP TO DOWN/RESET UP bus 143R1, thereby "broadsiding" the contents of the up counter into the down counter, and resetting the up counter.

The T1 signal at bus 127R1 is applied to the W4 write gate 144G8 and, thus, upon the occurrence of the W4 pulse, the WRITE COM bus 144R2 has a significant positive voltage level signal produced thereupon.

This WRITE COM signal, in the manner hereinbefore described, causes the contents of the down counter to be written upon the drum in the lowest order of the T1 storage register.

This cycle is repeated until the entire content of the accumulator, i.e., in this case "38," is transferred into the T1 storage register, and continues thereafter to "transfer" blanks from the accumulator register into the T1 storage register.

This process is terminated by the receipt at the toggle or complement input of the function timing flip flop 126FF1 of the next H pulse on bus 126L12.

The complementing of the function timing flip flop, as hereinbefore described, causes the resetting of the T1 flip flop 124FF1 and also the disenabling of the diode 127D1-resistor 127RS1 gate, thus terminating the existence of significant signals on the T1 buses 127R1 and 127R2.

Now, having transferred the first factor on the left side of the numerator of the equation which is being considered into the temporary storage register 1, let us proceed with the problem.

Digit entry (22)

Since all of the steps in so doing are set out hereinabove, it is assumed that the number "22" has been entered into the entry register and transferred to the accumulator register in the same manner set forth supra for the number "18."

It should be noted that erasing is constantly carried on during the process of writing any number in this machine by the fact that the termination of the number of bits written by the writing head at any one pass across digit entry on the drum, the head continues to have a unidirectional current passed therethrough and, therefore, will tend to strongly magnetize the remaining portion of the digit space on the drum in one polarity. Thus, it will be impossible for the read head to read out any bit, since the read heads read transitions, ignoring the D-C level on the drum.

Digit entry (19)

It will now be assumed without description herein, since the same process is described hereinabove, that the number "19" has been entered, as found in the numerator of the problem under consideration, into the entry register, and that, thus, the accumulator now contains the number "22" and the entry register contains the number "19."

SUBTRACTION

Proceeding with substraction (i.e., substrating 19 from 22), this is carried out by depressing and releasing the subtract key 125K3.

Depression and release of the subtract key sets the subtract flip flop 125FF3, thereby causing the function gate to produce a negative voltage level signal at the Q or $a$ output of the function timing flip flop 126FF1, thereby "unlocking" the function timing flip flop and leaving it in the reset state. In addition, the setting of the subtract flip flop causes a negative voltage level signal at the diode input 127L8 of the diode 127D8-resistor 127RS8 gate.

Upon arrival of the first H pulse at the toggle or complement input 126L12 of the function timing flip flop 126FF1, the function timing flip flop is set, thereby producing a negative voltage level signal at the resistor input 126R5 of the said resistor-diode gate, and thereby applying a negative voltage level signal to the bus 129L3 of gate 129G4 of the accumulator sign control at the output of inverter 128A3.

However, the terminal 129L2 of the gate 129G4 of the accumulator sign control also has a negative voltage level signal applied thereto by reason of the state of the accumulator sign flip flop 128FF2 and, therefore, a significant positive voltage level signal is produced on the subtract bus 129R5.

During the W2 period, as a result of the presence of this significant positive voltage level signal on the SUBTRACT bus 129R5, the write in accumulator command gate 141G1 is conditioned, and produces a negative voltage level signal on the WRITE A bus 141R1 which, in turn, conditions the W2 write gate 144G6. The W2 write gate, then, in the W2 period, produces a significant positive voltage level signal upon the WRITE COM bus 144R2. This signal upon the WRITE COM bus initiates the writing of the contents of the down counter into the accumulator. However, in this case, the down counter is in cleared condition, and, in addition, for this lowest order position, the write head 149WA2 is in dead space. Thus, nothing will be written out of the down counter at this time.

During the W3 period, the contents of the accumulator is read into the up counter by operation of the read from accumulator command gate 141G3 and the W3 read gate 144G3. The operation of the read delay flip flop 146FF2, the write delay flip flop 146FF1, etc., has been described hereinabove.

At the end of the W3 time period, the operations of broadsiding the contents of the up counter into the down counter, and clearing the up counter, are carried out as hereinbefore described.

At this point, however, the operation not hereinbefore described of "debiting" the down counter with counts from the entry register takes place. In doing this, the read from entry command gate 141G4 is caused by the signal on the SUBTRACT bus 141L3 to produce a significant negative voltage level output signal on the READ E bus 141R4, which signal is applied to one of the inputs of the W4 read gate 144G4. Thus, during the W4 period, the W4 read gate will produce a significant positive voltage level signal upon the READ COM bus.

In addition, in order to feed the information which is read into the ADVANCE DOWN COUNTER bus 146R4, the significant positive voltage level signal on the SUBTRACT bus 129R5 is inverted in an inverter 129A8, and is then applied to one of the inputs of the borrow flip flop control gate 143G4. The other input to this gate is the W4 signal on bus 143L5. At the occurrence of the W4 signal, gate 143G4 produces a negative voltage level output signal which, when inverted in inverter 143A4, transmits a positive voltage level signal to a second inverter 143A8, thereby producing a negative voltage level signal at the output of this second inverted. The output of this second inverter is applied to the input 146L2 of the AND gate 146G2.

A second input to gate 146G2 is the Q or $a$ output of the read delay flip flop 146FF2; the read delay flip flop and gate 146G2 operating in conjunction to suppress the first or "excess" bit as described herein above. The third input to gate 146G2 has the data train applied thereto at bus 146L5 directly from the circuit which cooperates with the read head 145RA1 of track 4. Thus, the calculator is now conditioned to read the contents of the lowest order digit of the entry register onto the ADVANCE DOWN COUNTER bus 146R4.

As pointed out above, a "2" is already stored in the down counter and a "9" is now being read into the advance down counter line pulse by pulse. Also, gate 143G4, which is coupled to the inverted SUBTRACT signal bus 143L8 and the W4 bus 143L5 supplies, by means of an intermediate inverter 143A4, and the EN SET BORROW FLIP FLOP bus 143R2 and 152L7, a positive voltage level signal to condition the pulse gate composed of resistor 152RS1, capacitor 152C2 and diode 152D2 to set the borrow flip flop 152FF2 upon receipe of a positive-going pulse from the Q or $a$ output of the No. 8 flip 154FF1 of the down counter.

Now, as the nine counts from the entry register are successively fed to the ADVANCE DOWN COUNTER bus 153L6, the down counter, which was previously set to "2," and is so set, will follow the following count-down cycle: 2–0010; 1–0001; 0–0000; 9–1111 (a binary 15); 8–1000; 7–0111; . . ., 4–0100; 3–0011. That is to say, the contents of the down counter have now been counted down through zero to a binary representation of the difference in this order, viz., "3."

BORROW

In addition, the borrow flip flop was set at the transition of the down counter from indicating the number zero as its contents (0000) to indicating "9" as its contents (1111), (i.e., the transition of the 8 flip flop 154FF1 from its zero to 1 or reset to set state).

At the time of the next succeeding W2 period the machine is conditioned in a manner described hereinabove to write the contents of the down counter into the lowest order of the accumulator register on the drum.

The borrow flip flop remains set.

Since the borrow flip flop 152FF2 remains set, and its Q or $a$ output, inverted by inverter 152A1, is applied to the D-C input of a pulse-gate, which pulse-gate is adapted to set each stage of the up counter to 1 (the representation of "9"), and since the A-C input of the same pulse-gate is tied to the output of the sense borrow network on bus 150L4, then the up counter will be set to "9" at the beginning of the W3 period. The sense borrow network referred to hereinabove comprises gate 140G1 and the associated inverter 140A1. The pulse-gate referred to directly hereinabove comprises: the capacitor 150C2 the resistor 152RS7 and, inter alia, diodes 152D4, 151D6, 151D3 and 150D3.

The up counter has been set to "9" (represented by binary 1111) at the commencement of the W3 period.

Then, under control of the gates hereinbefore described, the numeral "2" which is the numeral in the next lowest order of the accumulator (i.e., the "2" giving the numeral 20) is read into the up counter, it being kept in mind that, since a "9" has just been entered into the up counter via the borrow flip flop, the value finally set into the counter will not be 2, i.e., 20, but 1, i.e. 10. This takes place during the W3 time (i.e., "9" "2").

At the end of the W3 period, the UP TO DOWN/RESET UP bus is pulsed in the usual manner, resulting in the transfer of the "1" in the up counter into the down counter, and the resetting of the up counter.

Thereupon, during the W4 period, the contents of the second lowest order of the entry register, viz., "1," are read into the down counter in the manner described hereinabove, leaving, in the present problem, a zero registered in the down counter.

It should also be noted that it is the function of the same pulse-gate used to write a "9" into the up counter to set the write delay flip flop along bus 150R5 in order to add the "excess" bit upon writing the contents of the down counter back into the accumulator register.

During the entry of the "2" from the second lowest order of the accumulator register the operation of the read gate 146G1 in the up/down counter control causes a reset borrow pulse to be applied to the lower reset or $g$ input of the borrow flip flop 152FF2 thereby resetting the borrow flip flop. It must be remembered that, if there had been no digit at the place of this "2," then the borrow flip flop would not have been reest. However, this "2" having been present, the borrow flip flop is now reset.

At this point in the operation of the machine, the up counter is reset, the down counter contains a zero representation and the borrow flip flop is reset.

The time is now the termination of the W4 period.

At this point an important operation of the present calculator must be considered. As will be clear from the above, the occurrence of the next write cycle, i.e., the W2 time, will result in a writing of the contents of the down counter into the second lowest order of the accumulator. However, in this calculator no means have been provided for resetting the write delay flip flop during a subtraction of the type described directly hereinabove. Therefore, though the answer to this particular part of the problem is the single digit "3," we will, because of this operation, have the present contents of the down counter written out into the second lowest order of the accumulator register as a zero. However, the writing of this single stroke indicating a zero in the second lowest order of the accumulator register will, in the normal course of operation as described above, result in resetting the write delay flip flop. As a result of this resetting of the write delay flip flop the subsequent higher order digits of the accumulator will contain blanks, not zeros.

As a result of the above operations, the sum of the first addition, viz., the number "38," has now been stored in the T1 storage register. As a result of the more recent operations wherein the subtraction described directly hereinabove has been performed, we have the remainder stored in the accumulator register on the drum, viz., the number "3."

RECALL FROM STORAGE TO
ENTRY REGISTER

As the next step in the solution of the problem detailed above, the R1 key 124K3 is depressed and released, thereby transferring the contents of the T1 storage register back into the entry register. The number "38" will remain in the T1 storage register for further use if desired, since no erase function takes place.

As a result of depressing and releasing the R1 key, the R1 flip flop 124FF3 is set, and the function timing flip flop 126FF1 is "unlocked." Thus, at the appearance of the next H pulse, the significant signals are produced on the R1(124R5) and R1(124R6) buses, in the manner substantially described hereinabove in connection with other function keys.

The significant R1 negative voltage level signal is thereby applied to the input 144L2 of the W1 read gate 144G1, whereafter the occurrence of the W1 pulse on bus 144L1 causes a significant positive voltage level signal on the READ COM bus. This significant signal on the READ COM bus as hereinbefore described, initiates the reading of the lowest order digit of the T1 register into the up counter.

In the next time period, viz., W2, this transfer process is not carried forward.

During the next succeeding time period, viz., W3, the contents of the down counter are written into the entry register. However, as described hereinabove, for this lowest order, the contents of the down counter are "written into dead time" and, therefore, are merely ineffective to make a visible entry into the entry register.

At the end of the W3 period, as described hereinabove, the UP to DOWN/RESET UP bus is pulsed, therefore, in the present problem, transferring the "8" from the T1 storage register which was just previously put into the up counter into the down counter, and clearing the up counter.

The next time period during which significant action takes place is the W1 period.

During this period, the next higher order of the T1 storage is read into the up counter, viz., the numeral "3" in the present problem. Again, as described hereinabove in connection with this transfer operation, the W2 time does not contribute to this transfer operation.

During the W3 time, the contents of the down counter are entered into the lowest order of the entry register. At the trailing edge of W3 the UP TO DOWN/RESET UP action takes place, transferring the "3" previously stored in the up counter into the down counter and clearing the up counter.

This transfer cycle is terminated by the occurrence of the next H pulse on bus 126L12 which, in the manner described hereinabove, resets the function timing flip flop 126FF1, thereby terminating the presence of the significant signal levels on the R1 buses 127R5 and 127R6.

Thus, the contents of the T1 register have been transferred into the entry register, while the accumulator register has been undisturbed and contains the result of the previous subtraction.

In the above described transfer operation, it is to be noted that the erasure of any undesired strokes left in any position of the entry register has been effected by the D-C erasure method described hereinabove.

MULTIPLICATION

It is now desired to multiply the contents of the accumulator register by the contents of the entry register. This is effected by depression and release of the multiply function key 130K1.

At this time, the number "38" is stored in the entry register and the number "3" is stored in the accumulator register.

Depression and release of the multiplication function key, then, will set the multiply flip flop 130FF1, thereby applying a positive voltage level signal from the non-Q or b terminal of the multiply flip flop to gate 130G1.

The appearance of the positive voltage level signal on the input of gate 130G1 causes the output thereof to go to a positive voltage level, and the output of the associated inverter 130A2 to go to a negative voltage level. This negative voltage level signal is tied to one of the inputs of the gate 130G2.

The other inputs to gate 130G2 are the H signal on bus 130L4 and the multiply counter zero signal on bus 130L5.

Starting, now, with the multiplier quotient register (track 5) blank; the multiplier "03" is entered into the accumulator register with the numeral "3" at the lowest order position of the accumulator register; and the multiplicand 38 is entered in the entry register with the "8" in the lowest order position of the entry register.

A discussion of phase 1 of the sequence of phases in the phase control counter will now be presented.

In phase 1 the contents of the accumulator register, viz., 03, are transferred into the multiplier quotient register, wherein the 3 is displayed in the lowest order position, and the accumulator register is erased.

In phase 2 the contents of the accumulator register are left shifted, that is to say, the blanks which exist in the accumulator register can be thought to be shifted to the left, each blank being shifted to the next highest order position. When commencing any multiplication operation, of course, the first operation of phase 2 will result in merely shifting blanks, but since this shift left of the accumulator register is essential at the later stages of multiplication, and since it does no harm when involving mere blanks, it is not suppressed at this stage of operation but merely carried out.

Phase 3 is a branching operation, that is to say, it is an operation in which a test is carried out, this test being applied each time the contents of the highest order position in the multiplier quotient register are "dumped off the left end" into the multiplier counter. Each time the contents of the highest order position of the multiplier quoient register are "dumped off the left end" into the multiplier counter, the zero sensing means of the multiplier counter determines, in effect, whether to so operate the multiply phase counter as to continue shifting left, or to proceed to phase 4. To state this differently, in phase 3, the number in the multiplier quotient register is successively shifted left until the first, highest order, significant digit is "passed out of the left end" of the multiplier quotient register, and registered in the multiplier counter. The presence of this significant digit in the multiplier counter, as sensed by the multiplier counter zero sensing network, provides a signal to the multiply divide phase control counter which unlocks the phase control counter and allows the multiply program to proceed to phase 4.

In phase 4 the contents of the entry register (the multiplicand) are repetitively added to the previously cleared accumulator register, and each time one multiplicand value from the entry register is added to the contents of the accumulator register the multiplier counter is "debited," or counted down, by one count. Thus, when the contents of the multiplier counter reaches zero, the unique output of the zero sensing device of the multiplier counter terminates the adding of successive multiplicand values into the accumulator register and "notifies" the multiply divide phase control counter to proceed with phase 5.

Phase 5 is actually a "steering" rather than calculating phase. That is to say, in phase 5 the entire contents of the multiplier quotient register is sensed to determine if any digits are left anywhere in the multiplier quotient register. If the previous operation has completely exhausted the contents of the multiplier quotient register, when the multiply divide phase control counter is "notified" to terminate the multiplication operation.

More specifically, at the start of the multiplication function the MULTIPLY COUNTER ZERO bus 158R7 will be at a negative voltage level (since the multiply counter flip flops 157FF1 to 157FF4 are at zero, thereby opening gate 158G1). Thus, since the two outer inputs to gate 130G2 are at a negative voltage level either before depression and release of the multiplication function key or thereupon, and since the third input to this gate 130G2 is the H bus 130L4, the appearance of the next successive significant negative voltage level signal upon the H bus will cause such a transition upon the output 130R10 of this gate as to advance the phase control counter (flip flops 132FF1 to 132FF4) by 1 count, i.e., advance the phase counter to a state such that its successive stages 1 (132FF4), 2 (132FF3), 4 (132FF2) and 8 (132FF1) are set, reset, reset and reset, respectively. The code appearing upon the group of output leads of the phase control counter as a result of this transition to the 1 count appear upon the input terminals of the gate composed of diodes 133D1 to 133D4 inclusive, causing a significant positive voltage level signal to appear at the output of inverter 133A1 on the transfer accumulator register to multiplier register (A to M/Q) bus 133R1, which is tied to the output of the inverter 133A1 associated with this gate. It is to be noted that this gate and each of its associated gates (composed of diodes 133D5 to 133D8; 133D9 to 133D12; 133D13 to 133D17 and 133D18 to 133D21) requires, in addition to the inputs from the phase control counter, an enabling signal. This enabling signal is supplied in response to the depression and release of the multiply function key 130K1 and appears at bus 133L1 via the non-Q or $b$ output of the multiply flip flop 130FF1, diode 130D3, inverter 130A1 and emitter follower 130Q1 to bus 130R1.

This significant positive voltage level signal appearing upon the A to M/Q bus 133R1 is applied to the input 139L4 of the gate 139G2, the 141L8 input of the write in accumulator command gate 141G1, the read from accumulator command gate 141G3 and the 142L4 input of the broadside command gate 142G1, respectively.

Thus, as described hereinabove, the conditioning of these gates by the signal on the A to M/Q bus 133R1 enables further gates, e.g., the W2 write gate 144G6 during preselected time phases of the operating cycle of the calculator.

As a result of the operation of the calculator (considering 1 digit at a time) conditions are established for writing the contents of the down counter into track 4 but, initially, these conditions are set up during the "dead time" and, therefore, no actual writing takes place at this time. During W3 time the contents of the lowest order digit of the accumulator are read into the up counter.

More specifically, at time W3, the signal on bus 141L8 enables OR gate 141G3 and provides a positive voltage level output therefrom, this output signal being inverted in inverter 141A3 and passed to the W3 read gate 144G3 which gate provides, at W3 time, a negative voltage signal at the output thereof. This signal is passed through inverters 144A3 and 144A9 to AND gate 145G1 and enables this gate to read out the contents of the accumulator register to the up counter in the manner previously described. At the trailing edge of W3 time, the signal on bus 142L4 causes the transfer from the up counter to the down counter and resets the up counter in the manner previously described.

At time W4, with both the WRT DRIVER TK5 bus 139R2 and the WRT COM bus 144R2 in their significant negative voltage levels, gates 149G5 and 149G6 are enabled by the input thereto on bus 149L5. The signal on the WRT COM bus 144R2 at W4 time is passed to bus 147L5 where, in conjunction with a negative voltage level signal on write TK5 signal of bus 147L6 and a closed state of gates 147G1 and 147G2, gate 147G3 is enabling and provides, through inverter 147A3, a positive voltage level signal to input 148B5 of gate 148G1. Since the down counter is not at zero, a negative voltage level signal will appear on bus 148B4 and enable gate 148G1. Therefore, in the manner previously described, track 3 bits will be read out through write flip flop 148FF1 to gates 149G5 and 149G6 which are now enabled, thereby causing these bits to be recorded on track 5. No significant action in the multiplication operation takes place during the W1 period.

During the W2 period the write circuit for write head 1 of track 4 (149WA2) is conditioned to write, i.e., the gates 149G3 and 149G4 are opened permitting the levels supplied by the two inverters 148A3 and 148A4 associated with the write flip flop 148FF1 to be transferred to, and energize, one-half of the windings on the track 4 No. 1 write head. Since, however, the gate 148G1 is maintained in a disenabled condition, no bits from the bit track (track 3) are fed to the input of the write flip flop to change its condition and, therefore, the unidirectional current through the track 4 write head No. 1 will cause erasure of whatever is written in the accumulator register. What has been described hereinabove with respect to this phase of multiplication has referred to the lower order digit of the accumulator, but the same remarks apply to the operation which successively affects the succeeding higher order digits of the accumulator and multiplier registers, and need not be repeated herein.

Thus, the contents of the accumulator register are now found in the multiply register (track 5) and the accumulator register has been cleared.

The occurrence of the next successive H pulse on bus 130L4 will be passed through the gate 130G2, causing the phase control counter to be advanced by one count, such that its respective flip flops 1, 2, 4 and 8 now are in their reset, set, reset and reset states.

The receipt of the signals from the multiply phase control counter flip flop output terminals at this time, along with the common or enabling signal upon the bus 133L1, enables the AND gate composed of diodes 133D5 to 133D8, causes the appearance of a significant positive voltage level signal at the output of inverter 133A2 and upon the shift left accumulator register [SL(A)] 133R2 bus.

The receipt of this significant positive voltage level shift left accumulator signal at gates 141G1, 141G3 and 142G3 causes the following order of operations in the manner described hereinabove. During the W2 period the W2 write gate 144G6 is "opened" and the contents of the down counter (if any) are written into the accumulator register; for the lowest order, however, this writing from the down counter will take place merely in "dead space" and, therefore, no significant recording will be made.

At the end of the W2 period, the W2 shift gate 142G3 is enabled and the contents of the up counter are broadsided into the down counter, and the up counter is reset (i.e., if there is anything in the up counter to be broadsided).

During W3 time, W3 read gate 144G3 is enabled and the contents of one of the accumulator register orders are read into the up counter.

No significant part of the shift left accumulator register cycle takes place during the W4 time.

Returning, then, to the W2 time period, the machine again "attempts" to write from the down counter into the accumulator register. This time, however, while the appropriate write head is correctly located to write into the lowest order of the accumulator register, there is no content in the down counter to be so written.

At the termination of the W2 period, the up to down/reset up operation is initiated, thereby transferring the contents of the up counter (the lowest order digit formerly in the accumulator) to the down counter.

During the W3 period the next highest order digit is read into the up counter.

Returning, then, to the W2 time period, the lowest order digit formerly stored in the accumulator register, which is now stored in the down counter, is written into the second lowest order digit position in the accumulator register.

This process is continued until the entire contents of the accumulator register are shifted left one place in the accumulator register. This shifting process is terminated by the receipt of the next H pulse at the input 130L4 of the gate 130G2.

Generally, the first occurrence of the phase 2 operation is non-significant, since no digit is available for manipulation and therefore no phase 2 operation takes place at this time. However, if the contents of the accumulator register were to be shifted to the left due to the existence of a plural integer number in the multiplier-quotient register, then the positive voltage level appearing on the SL(A) bus, that stands for shift left accumulator bus 133R2, would provide the same series of operations as provided when a positive voltage level appears on the SL(A) bus 127R12, as set forth hereinafter in the Section entitled "Shift Left Accumulator Key." It will be noted that the SL(A) busses 133R2 and 127R12 are connected to each other and are therefore the same bus.

Starting, now, with the phase 3 period of the multiplication operation, the phase control counter is set to indicate 3. The 3 output indication of the phase control counter by means of the gate composed of diodes 133D9 to 133D12 in multiply phase decoder causes a significant positive voltage level signal on the shift left multiplier quotient register [SL(M/Q)] bus 133R3. This signal causes the entire contents of the multiplier quotient register to be shifted left (on the drum) via the up and down counters in the manner described hereinbefore. This shift left operation is carried out one bit at a time, and at the end of each bit shift, the contents of the multiplier counter is interrogated as follows.

The output of the multiplier counter zero sense gate 158G1 is applied through a pulse-gate composed of capacitor 159C1, resistor 159RS2 and diode 159D2, to the $f$ input of the digit sense flip flop 159FF2, the digit sense flip flop being normally reset. The $b$ output of this digit sense flip flop, which is normally at a negative voltage level, is applied to the gate 158G4. This signal from the $b$ output of the digit sense flip flop, is applied to the stop phase counter gate 158G4 in addition to a signal from the multiply flip flop associated with the multiplier function key along bus 158L2 and a signal conditioned by the SL(M/Q) bus 134R6 (158L4), thereby maintaining the stop phase counter gate "open" (i.e., producing a positive voltage level signal at the output 158R4 of its associated inverter 158A2) only until a significant digit appears in the multiplier counter, that same significant digit having been "taken off the left end" of the multiplier quotient register. This positive voltage level signal produced by the stop phase counter gate is applied via bus 158R4 to the $b$ output of the No. 1 flip flop 132FF4 of the phase control counter along bus 132R8, thereby "locking" this flip flop, and preventing toggle inputs thereto from altering the state thereof and, thus, from advancing the phase control counter. Thus, the stop phase counter gate 158G4 prevents the phase control counter from advancing until a significant digit is sensed as present in the multiplier counter and, thus, the presence of a significant signal upon the SL(M/Q) bus 133R3, operating through the program control gates, is enabled to repetitively shift the contents of the multiplier quotient register to the left until such time as a significant digit which has "fallen off the left hand end" of the multiplier register into the multiplier counter is sensed. At the time that a significant digit is sensed in the multiplier counter the digit sense flip flop 159FF2 is set, thereby removing one of the essential signals from the input of the stop phase counter gate 158G4 and enabling, or "unlocking" the No. 1 flip flop 132FF4 of the phase control counter and, thus, allowing the phase control counter to advance to its No. 4 decimal count, initiating multiplication phase 4.

Now, the phase control counter having advanced to its decimal 4 indication, i.e., the multiply divide phase control counter now reading reset, reset, set, reset, phase 4 of the multiplication operation commences.

The output on the output leads of the phase control counter is "decoded" by the gate in the phase decoder composed of diodes 133D13 to 133D17, thereby producing on the ADD bus 133R5 a significant positive voltage level signal, which signal is applied, as hereinabove described, to the program gates 141G1, 141G3, 141G4 and 142G2, resulting in the addition of the multiplicand as stored in the entry register into the accumulator. In addition, the addition of each multiplicand value in the entry register into the accumulator register results in the "debiting" of the multiplier counter. This is accomplished by the successive H signals at bus 156L2, each of which causes the multiplier counter to be counted down by means of the down counter sequence control gates 156G1, 156G2, 156G3 and 156G4. It should be noted that, during this phase (4) of the multiply program, no shifting of any of the registers takes place but, rather, the successive additions of the contents of the entry register into the accumulator register take place with this same decimal alignment. The successive "debiting" of the multiplier counter each time one multiplicand value is added into the accumulator register from the entry register results in the return of the multiplier counter to its zero setting after the correct number of multiplicands have been added into the accumulator register to satisfy the value of the order of the multiplier being operated upon at that time in any given repetition of the inner loop of the multiply program. When the multiplier counter returns to zero, the signal on the output of the inverter 158A3 associated with the multiplier counter zero sense gate 158G1 applied to the input 133L8 of the gate composed of diodes 133D13 to 133D17 in the multiply decoder (the phase 4 gate), causes the termination of the add signal on the ADD bus 133R5. In addition, the disenabling signal on the input 130L5 of the AND gate 130G2 provided by the multiply counter zero network is terminated, thereby permitting the next successive H pulse to open gate 130G2 and to advance the phase control counter to its 5 output condition. Thus, the No. 5 multiplication phase is commenced. During phase 5 the entire multiplier quotient register is tested to sense the presence of any digits remaining therein. If any digits remain therein the multiply program is continued by return to phase 2. If, on the other hand, no further digits remain in the multiplier quotient register, then the multiply program is not returned to phase 2, and the multiply divide phase control counter is enabled to advance through all of its decimal set phases to zero upon the occurrence of successive H pulses.

Upon the return to zero of the multiply divide phase control counter the zero state of the multiply divide phase control counter causes the gate 132G1 to produce a positive voltage level signal at the output of its associated inverter 132A10, thereby resetting the multiply flip flop 130FF1 and enabling the gate 130G1 which, in turn, causes a positive voltage level signal to appear upon an input connected thereto of gate 130G2, disenabling gate 130G2 and preventing further feed of H signals from bus 130L4 to the toggle or complement input of the No. 1 flip flop 132FF4 of the phase control counter and, thereby, leaving the phase control counter in its zero state until the next depression and release of a multiply or divide key again places this counter into operation.

The return to phase 2 of the multiply operation, in the event that any digits remain in the multiplier quotient register, is accomplished as follows.

The presence of information stored in track 5 is sensed by the gate 136G2. The lower terminal 136B6 of this gate is fed directly from the read amplifier of track 5, i.e., if any digits remain written in track 5, then, between H pulses at least some bit signals will be applied to the 136B6 input of this gate.

The upper lead 136B2 of gate 136G2 is fed with RS pulses, (i.e., a train of pulses remaining in its significant state during each digit reading time).

Thus, this gate 136G2 is enabled by the RS pulses during each digit reading and, if any digits during these periods are found on track 5, these digits appear as pulses on the other terminal of this gate, thereby producing positive-going pulses at the output of the associated inverter 136A2. These positive-going pulses are applied to the $h$ input of the digit sense multiply register flip flop 136FF2, and set this flip flop each time one of these pulses is gated to this flip flop. The $a$ output of this flip flop is applied to the capacitor 136C1 input of a pulse gate including resistor 136RS1 and diodes 136D1 and 136D2. The D-C input 136B7 of this pulse gate is supplied from the output of the phase 5 gate diodes 133D18 to 133D21 of the multiplier phase decoder. Since this positive voltage level signal from the output of the phase 5 gate of the multiplier phase decoder is applied only during the operation of the phase 5 gate, it is only during this period that transitions applied to the capacitive input 136C1 of this pulse gate are forwarded via buses 136T2 and 136T3. That is to say, pulses are forwarded by this gate via buses 136T2 and 136T3 only upon resetting of the digit sense multiplier register flip flop 136FF2, and this resetting takes place only upon the occurrence of each H pulse on the bus 136B5.

Thus, pulses can be forwarded from buses 136T2 and 136T3 only if the digit sense multiplier register flip flop 136FF2 has first been set, and then is reset by the receipt of an H pulse. This setting, however, only takes place if at least one digit has been detected in the previous scan of the multiplier quotient register.

If, then, during the preceding period, at least one digit has been detected and the digit sense multiply register set, the occurrence of the H pulse at the end of this period will cause the emisson of pulses from buses 136T2 and 136T3, which pulses will reset the 4 and 8 flip flops 132FF2 and 132FF1 of the phase control counter. In addition, the receipt of an H pulse at gate 130G2 provides a pulse at the toggle or complement input of the No. 1 flip flop 132FF4 of phase control counter and will cause the No. 1 flip flop of the phase control counter to be reset, which in turn will set the No. 2 flip flop 132FF3 of the phase control counter. Thus, at the termination of a word period in which digits have been detected in the multiplier quotient register, the multiply divide phase control counter will be forced back into its phase 2 indication, and phases 2, 3, 4 and 5 of the multiplication program will be repeated, successively, until the multiplication is completed, i.e., until the multiplier quotient register is found to have been exhausted by the detector circuit including the digit sense multiplier register flip flop 136FF2 and the gate 136G2.

When this circuit no longer finds digits written in the multiplier quotient register, it then does not reset the multiply divide phase control counter to phase 2, and the phase control counter is free to continue traversing its successive states upon receipt of successive H pulses until it reaches its zero state. At this time, the conjunction of an H pulse input on bus 132L11 to the gate 132G1, along with the conjunction of negative voltage level pulses from the b output of the 4 stages of 132FF1 to 132FF4 of the phase control counter, will cause a positive-going pulse at the PHASE COUNTER ZERO bus 132R11, thereby resetting the multiply flip flop 130FF1, and resetting the digit sense flip flop 159FF2 and causing a negative voltage level on input bus 132R10. This voltage on bus 132R10 along with a negative voltage level input from the newly reset multiply flip flop, will disenable gate 130G1, causing a positive voltage level pulse to be applied to the upper terminal of the gate 130G2, thereby terminating the transmission of the H pulses from bus 130L4 to the toggle or complement input of the No. 1 flip flop 132FF4 of the phase control counter, and leaving the phase control counter in its zero state ready for the receipt of subsequent depressions and releases of the multiply or divide key.

As a result of the multiplication previously described, the product ("114") has been computed, the product being the numerical value of the numerator of the problem under consideration which is now stored in the accumulator register, and displayed on the screen of the display tube (to be explained later).

Also, the No. "38" is stored in the T1 register, and in the entry register, and is displayed in the corresponding places on the screen of the display tube.

Transfer numerator from accumulator register to storage

Thus, the value of the numerator as now found in the accumulator will be transferred to the T1 storage register by depression and release of the T1 key thereby effectively erasing the "38" now appearing therein and replacing the "38" with "114" in the manner described hereinabove.

After this transfer, "114" will appear in the T1 storage register, the T2 storage register will be blank, the accumulator register will contain "114" and the entry register will contain the number "38".

Digit entry (3)

The calculation of the denominator of this operation is begun by depression and release of the digit 3 entry key 121K3 which, as described above, enters the numeral "3" into the lowest order position of the entry register having first erased the contents of the entry register.

Transfer from entry register to accumulator register

In further preparation for carrying out this operation, the first factor key is depressed and released, causing the accumulator register to be cleared and the contents of the entry register, viz, the numeral "3" to be entered therein.

Digit entry (5)

The No. 5 digit entry key 120K5 is then depressed and released, clearing the entry register and entering the No. "5" therein.

At this point, the number "114" is stored in the T1 storage register, the T2 storage register is blank, the accumulator contains the number "3" and the entry register contains the number "5."

Subtraction

The subtract key 125K3 is now depressed and released.

Depression and release of the subtract key results in the "unlocking" of the function timing flip flop 126FF1, the subsequent receipt of the H pulse then causing the setting of the function timing flip flop, and the production of a positive voltage level signal at the output of the subtract gate at bus 127R13.

This positive voltage level pulse is inverted in inverter 128A3 to a negative voltage level and applied to the upper input of the gate 129G4 of the accumulator sign control. The lower input of this gate is maintained at a negative voltage level by the accumulator sign flip flop 128FF2. This accumulator sign flip flop is set because of the presence in the accumulator of a positive number, viz, "3."

Thus, the output of the inverter 129A6 associated with gate 129G4 produces a significant positive voltage level signal upon the SUBTRACT bus 129R5.

As a result of the appearance of this significant signal upon the SUBTRACT bus 129R5, the number "3" from the accumulator is entered into the up counter as hereinbefore described, and is then transferred to the down counter.

As a further result of the appearance of the significant signal upon the SUBTRACT bus 129R5, the 5 counts stored in the entry register are fed to the ADVANCE DOWN COUNTER bus 146R4 and 153L6, thus causing the down counter to go successively to 2, 1, 0, 9 and 8. In passing from the zero state to the 9 state, however, the borrow flip flop 152FF2 is set. This is accomplished by sensing the transition upon the a output of the number 8 flip flop 154FF1 of the down counter. This transition is applied to the input of a pulse gate composed of diode 152D2, registor 152RS1 and capacitor 152C2. The other input of this gate is currently being held at a positive voltage level by gate 143G4, and its associated inverter 143A4, which voltage is applied to bus 152L7.

At this point, the down counter is now set to 8, and the borrow flip flop 152FF2 is in its set state. This introduction of the 5 count from the entry register into the down counter took place during the W4 time period. The subsequent W1 time is not the occasion of any significant portion of the present operating cycle.

During the next succeeding W2 time the 8 from the down counter is written into the lowest order of the accumulator (on the drum), as previously described.

At the commencement of the W3 time a significant positive voltage level signal appears upon the SENSE BOR bus 150L4, thereby, since the borrow flip flop is set, altering the status of the up counter to 9. During the W3 period, an "attempt" is made to read the next order on the accumulator register into the up counter. However, in the present problem, since the number in the accumulator register was a one-digit number, nothing can be read into the up counter and, consequently, the up counter remains in its "9" status. At the end of the W3 period, the contents of the up counter are transferred to the down counter and the up counter is reset.

During the W4 period, the contents of the corresponding order of the entry register are read on to the advance down counter bus. However, in the present problem, only a one-digit number was stored in the entry register and, consequently, the contents of the down counter remain undisturbed, i.e., set to "9."

During the next W2 period the "9" from the down counter is read into the accumulator register. This process continues until, were the progress of the operation of the calculator instantaneously halted, the contents of the accumulator register would show as all "9"'s except for the "8" in the lowest order position.

SUBTRACT-COMPLEMENT

Now, the machine operates to convert this entry in the accumulator register into the tens complement of the lowest order digit and the 9's complement of the digits in all the other orders.

In so doing, considering first the complement flip flop 128FF1, the upper gate or $j$ input thereof is supplied from the output of the gate 128G1. There were two inputs to gate 128G1, the first of these inputs is supplied directly from the borrow flip flop along BORROW bus 152R7 and, consequently, is at a negative voltage level whenever the borrow flip flop 152FF2 is set, as now, while the second input is supplied from the subtract gate composed of diode 127D8 and resistor 127RS8, through the gate 128G2, and is at a negative voltage level in the subtract operation, whenever the subtract button has been depressed and released and the subsequent receipt of an H pulse has caused the output of the subtract gate to go to a positive voltage level. Thus, since its two inputs are at a negative voltage level the output on the gate 128G1 is a negative voltage level and, consequently, the input to the upper gate or $j$ input of the complement flip flop 128FF1 is a negative voltage level.

The signal applied to the lower gate or $e$ input of the complement flip flop is the inverse of the potential applied to the upper gate or $j$ input, a positive voltage level, due to the presence of inverter 128A1.

Thus, at the occurrence of the next succeeding H pulse on bus 128L6, the just previously described inputs to the complement flip flop will be transferred to the outputs thereof. As can be seen, the $a$ output of the complement flip flop 128FF1 is connected to the toggle or complement input of the accumulator sign flip flop 128FF2 but, since the transition is negative going, in this case, the accumulator sign flip flop will not be complemented.

As a result of the transfer of inputs to outputs on the complement flip flop, the $b$ output thereof will go to a negative voltage level while the $a$ output thereof will go to a positive voltage level.

The appearance of these respective complement signals on busses 128R5 and 128R6 causes the associated program gates to carry out the following operations.

The gate 143G5 is so operated as to bring the output of its associated inverter 143A5 to a positive voltage level during the W3 time period. Concomitantly, the output of the inverter 143A8 goes to a negative voltage level. This negative voltage level signal is applied to the input terminal 146L2 of the gate 146G2. As hereinbefor pointed out, the data bits from the track 4 read head are fed to the 146L2 input of this gate. This is due to the read command from the gate 141G3, and the operation of the W3 read gate 144G3. The third input to gate 146G2 is placed in its enabling state after the termination of the first bit from the read head, the trailing edge of which sets the read delay flip flop 146FF2. That is, after the cessation of the trailing edge of the first bit read from the read head, the subsequent bits are fed through the gate 146G2 to the ADVANCE DOWN COUNTER bus 146R4. Due to previous operations, the down counter is now in its zero state. Upon the injection of 8 pulses read from the read head (9 pulses read from the read head less the one bit suppressed by the operation of the read delay flip flop) the down counter will be counted down to read 2. It is important to note that in the process of counting the down counter down from zero to "2" a transition is taken through the "9" defining state of the counter which uniquely produces an output at the $a$ terminal of the No. 8 flip flop 154FF1 of the down counter, thereby setting the borrow flip flop 152FF1 in the manner described hereinabove. Due to the concatenation of signals provided to the program gates, the SENSE BORROW bus 150L4 will be so signalled as to set the up counter to a count of 9 at the commencement of the W2 period. During the W2 time the contents of the down counter, viz., "2," are written into the lowest order of the accumulator register.

At the termination of the W2 period, the contents of the up counter, viz., "9," are broadsided into the down counter and the up counter is reset.

In the next succeeding W3 period, the contents of the second lowest order of the accumulator register, viz., "9," are read onto th ADVANCE DOWN COUNTER bus 153L6, thereby counting the contents of the down counter to zero. As will be remembered, the contents of the down counter were previously set to "9" by transfer from the up counter.

At the beginning of the next succeeding W2 period, the up counter is again set to "9" because of the condition of the borrow flip flop. During tde W2 period, the contents of the down counter (zero) are read into the second lowest order of the accumulator register. At the end of the W2 period, the contents of the up counter, viz., "9," are broadsided into the down counter, and the up counter is reset. In the particular problem under consideration, this cycle is repeated throughout the entire word stored in the accumulator register, i.e., until all of the orders except the lowest order, have been 9's complemented, the lowest order having been 10's complemented.

Now, the complementing of the contents of the accumulator register having been accomplished, and the output of the subtract gate having returned to a negative voltage level, its quiescent state, at the time of the previous H pulse, which initiated the complementing action, the arrival of an H pulse at the W or $c$ input of the complement flip flop 128FF1 carried forward the input of the complement flip flop to the corresponding output terminals thereof. As hereinbefore described, the input conditions of the complement flip flop are established by the gate 128G1. At the time of the previous H pulse which commenced the complementing operation, the output of the subtract gate returned to a negative voltage level and, thus, by means of an intermediate inverter 128A4, the input of the gate 128G1 went to a positive voltage level, thereby "closing" this gate, and imposing a positive voltage level signal upon the upper gate or $j$ input terminal of the complement flip flop 128FF1. The lower gate or $e$ input terminal of the complement flip flop was, by the same action, taken to a negative voltage level by inverter 128A1. Thus, at the arrival of the H pulse presently being considered on bus 128L6, the lower gate or $e$ and upper gate or $j$ input terminals of the complement flip flop are at a positive voltage level and at a negative voltage level, respectively. The arrival of this H pulse transfers this configuration to the output terminals *a* and *b* of the complement flip flop 128FF1. Thus, the output terminals of this flip flop are now in the following condition: *a* output is at a positive voltage level and *b* output is at a negative voltage level. The positive-going transition on the *a* output tied to the toggle complement input of the accumulator sign flip flop 128FF2, causes the accumulator sign flip flop to be complemented, thereby changing the condition of the output terminals of this flip flop to the following: *a* output is at a positive voltage level and *b* output is at a negative voltage level. The negative voltage level signal appearing at the *b* output of the accumulator sign flip flop causes the operation of the lamp driver circuit including transistors 129Q1 and 129Q2, and resistors 129RS1 and 129RS2, thereby lighting the negative indicator lamp 129LT1.

The difference "3" minus "5" is now stored in the accumulator, the negative sign being indicated by the lighted condition of the negative indicator lamp.

Addition

It is now desired, in accordance with the problem stated, to add the number 7 to this negative result appearing in the accumulator. Therefore, the number 7 digit entry key 120K7 is now depressed and released thereby entering the digit "7" into the entry register.

Immediately thereupon, the add function key 125K4 is depressed and released. The depression and release of the add function key sets the add flip flop 125FF4 and "unlocks" function timing flip flop 126FF1, as hereinbefore described. This time, however, unlike the previous additions described in this discussion, the significant positive voltage level signal does not appear upon the ADD bus 129R3.

Inspection of the denominator of the problem, in view of the common and well known rules of algebra, will show why it is now desired and, in fact, happens that the calculator is put into the subtract, rather than the add, operation.

This is accomplished in the calculator as follows. Because of the current condition of the accumulator sign flip flop 128FF2 (reset) the two gates 129G2 and 129G3 are enabled. It will be noted from tracing the circuit that the other terminal of each of these gates (not connected to the accumulator sign flip flop) one connected to the outputs of the add and subtract gates respectively. It will be noted, additionally, that the outputs of these two gates are connected to the ADD and SUBTRACT buses 129R3 and 129R5. It should be particularly noted that, with respect to these two gates, gate 129G3 having its output connected to the SUBTRACT bus 129R5 has one input connected to the add gate, while gate 129G2 which has its output connected to the ADD bus 129R3 has one of its inputs connected to the subtract gate. Thus, when there is a negative number in the accumulator, as at present and, thus, only the two gates of the accumulator sign control are enabled by the accumulator sign flip flop 128FF2, the depression and release of the add button, as now, and the setting of the add flip flop 125FF4, will result in the energization of the SUBTRACT bus 129R5 and not the energization of the ADD bus 129R3.

Thus, having been "notified" to subtract, the calculator will proceed to subtract "7" from "—2". The calculator will enter the digit "2" into the down counter. Then, the calculator will "debit" the down counter with the digit "7," setting the borrow flip flop as the count passes from zero to "9." The result of this "debiting" will be to leave the tens complement of the "answer" in the accumulator lower order, viz., "5." Additionally, at the end of the first order subtraction the borrow flip flop will be left in its set condition. Thereafter, through succeeding higher orders, the calculator will inject "9"'s into the successive orders of the accumulator as described hereinabove. Having performed this quasi-subtraction, the machine will then proceed to complement according to its laws, i.e., take the tens complement of the lowest order and the 9's complement of all the other orders in succession. Upon the occurrence of the H pulse at the end of this complementing operation, the complement flip flop 128FF1 will be reset, thereby enabling the accumulator sign control gates 129G1 and 129G4, since a positive number will now be stored in the accumulator and, of course, extinguishing the negative indicator light 129LT1.

The numerical value of the denominator of the problem ("5") now exists in the accumulator register, and the numerical value of the numerator of the problem now exists in the T1 register.

Transfer from accumulator register to storage

To continue with the solution of the problem, the T2 function key 124K2 is depressed and released, thereby storing the contents of the accumulator in the T2 storage register in the manner described hereinabove in connection with the T1 storage register.

Recall from storage to entry register

The R1 function key 124K3 is then depressed and released, thereby inserting the contents of the T1 storage register into the entry register.

Transfer from entry register to accumulator register

The first factor function key is depressed and released, thereby inserting the contents of the entry register into the accumulator register in the manner hereinbefore described.

Recall from storage register to entry register

The R2 function key 124K4 is depressed and released, thereby inserting the contents of the T2 storage register into the entry register in a manner substantially described hereinabove in connection with the T1 storage register.

Now, the numerical value of the numerator of the problem is stored in the accumulator register, viz., the number "114."

Also, the numerical value of the denominator of the problem is stored in the entry register, viz., the number "5." However, in the particular calculator under consideration, no zero suppression means have been provided for this particular case and, therefore, due to subtraction and complementing, and the carrying forward of the result in the form so produced, the contents of the entry register will actually read "5" in the lowest order position and zero, rather than blank, in the remaining orders.

DIVISION

Now, in order to complete the solution of the present problem, the division key 130K2 is depressed and released.

Before describing the operation of division in detail, with reference to the specific circuit, the division program will be described in terms of the phases of the phase control counter.

Considering, then, that the number "114" stands in the accumulator register, and the number "5" stands in the entry register, the first four phases of the phase counter operation constitute an alignment test. In the first phase, the contents of the entry register (5) are subtracted from the contents of the accumulator register (114). This operation will not result in the contents of the accumulator being negative and, therefore, the calculator proceeds to phase 2, wherein the contents of the entry register are restored to the number in the accumulator register, leaving the original number in the accumulator register (114). The program then proceeds to phase 3 wherein the contents of the entry register are shifted to the left, leaving the number "50" now stored in the entry register.

The program now returns to phase 1 and this new entry register content (50) is subtracted from the content of the accumulator register (114). In the present problem the result of this second subtraction will also be that the contents of the accumulator register do not go negative and, therefore, the program will proceed to phase 2, wherein the amount in the entry register (50) is restored to the accumulator register. The program will then proceed to phase 3, wherein the contents of the entry register are again shifted to the left, leaving "500" in the entry register.

The program will now proceed according to the jump instruction of phase 3 to return to phase 1.

In phase 1 the new contents of the entry register (500) will be subtracted from the contents of the accumulator register, this time producing a negative content in the accumulator register.

Since, in this test, a negative content is produced in the accumulator register, the program will now jump to phase 4.

Phase 4 consists in the restoration of the contents of the entry register to the accumulator register for the last time. That is to say, in phase 4, the "500" in the entry register which was subtracted from the accumulator register to produce a negative result in the accumulator register is now restored, leaving 114 in the accumulator register.

The program now proceeds to phase 5, the first computational phase, as distinct from test phase.

In phase 5, the contents of the entry register are shifted to the right. It will be seen that the method carried out hereinbefore is precisely the method employed in "pencil and paper" division, and that in this phase (5) the result of having "over-tested" is remedied by returning to the next rightmost column to continue subtraction.

Before considering phase 6 of the division program it is necessary to consider the location of the various terms of the division within the calculator itself, and the placement of the results at the termination of the division operation. The dividened is originally entered in the accumulator register, and the divisor is originally entered in the entry register. During the course of the division operation, the quotient will be built up in the multiplier quotient register.

At the termination of the division operation, yet to be described, the quotient will be transferred from the multiplier quotient register into the accumulator register, and the contents of the accumulator register will be transferred to the entry register, this number constituting the remainder.

Returning, then, to phase 6, this phase consists in shifting the multiplier quotient register to the left. In the first order of division there will be nothing in the multiplier quotient register to be shifted to the left, but this operation, which will be necessary in every succeeding operation, is carried through at this point as a matter of uniformity of operation and simplicity of mechanism.

Having shifted the "contents" of the multiplier quotient register to the left during phase 6, the program now proceeds to phase 7.

In phase 7, the contents of the entry register are subtracted from the accumulator register (i.e., the "50" in the entry register is subtracted from the 114 in the accumulator register), leaving "64" in the accumulator register.

In phase 8 of the program a single count of "1" is added to the contents of the multiplier quotient register and the phase 8 program forces a return to phase 7 wherein, in the present problem, "50" is again subtracted from the contents of the accumulator register, leaving 14 in the accumulator register.

Again, the program proceeds to phase 8, wherein a second count is added to the contents of the multiplier quotient register, leaving a "2" in one order of the multiplier quotient register.

Immediately, according to the phase 8 program, the phase 7 operation is repeated again subtracting "50" from the contents of the accumulator register. On this subtraction, however, since the content of the accumulator register was "14" before the subtraction, the result in the accumulator register is a negative number.

Since, now, during phase 7 the result in the accumulator register is a negative number, the phase 7 branch instruction is carried out, and the phase 4 operation is commenced.

This phase 4 operation consists of adding the contents of the entry register (50) into the accumulator register, leaving "14" in the accumulator register.

Having completed phase 4 the division program now proceeds with phase 5. In phase 5, the contents of the entry register are shifted to the right, leaving "5" therein.

The calculator now proceeds to phase 6, wherein the contents of the multiplier quotient register are shifted to the left, leaving the numeral "2" in the second lowest order of the multiplier quotient register.

The calculator proceeds to phase 7, subtracting the contents of the entry register (5) from the contents of the accumulator register (14); continues with phase 8, adding a count of "1" to the lowest order of the multiplier quotient register; returns to phase 7, subtracting the contents of the entry register (5) from the contents of the accumulator register (9); returns to phase 8, adding "1" count to the lowest order of the multiplier quotient register, thereby leaving the number "22" in the multiplier quotient register; returns to phase 7, subtracting the contents of the entry register (5) from the contents of the accumulator register (4) and producing a negative result in the accumulator register.

This production of a negative result in the accumulator register causes a jump to phase 4 of the division program.

In phase 4 of the division program the contents of the entry register (5) are restored to the accumulator register, leaving "4" in the accumulator register.

At this point the number "22" stands in the multiplier quotient register, the number "4" stands in the accumulator register, and the number "5" stands in the entry register.

The division program proceeds with phase 5.

In phase 5, the shifting of the number "5" in the entry register to the right will cause an overflow signal, resulting in a jump to phase 9 of the program.

Phases 9 and 10 of the division program consist merely in transferring the contents of the accumulator register to the entry register, i.e., displaying the remainder in the entry register; and transferring the contents of the multiplier quotient register to the accumulator register, thereby displaying the quotient in the accumulator register.

In the particular problem under consideration, the accumulator register will contain the number "22" and the entry register will contain the remainder "4."

It is to be noted that the entry register will not contain the decimal remainder, but will contain the remainder, i.e., the numerator of the fractional remainder which fractional remainder will be $\frac{4}{5}$.

Having described broadly the various phases of operation of the division program, a detailed discussion of carrying out these same phases in terms of calculator operation will now be provided.

The divide function key 130K2 is depressed and released, thereby setting the divide flip flop 130FF2.

The negative voltage signal level appearing upon the $a$ output of the divide flip flop is tied via DIV bus 130R4 directly to the upper set or $h$ input of the clear quotient register flip flop 140FF1. The appearance of this negative voltage level, or transition thereto, however, does not alter the condition of this flip flop at this time.

The positive voltage level signal at the $b$ output of the divide flip flop 130FF2 is tied to the DIVIDE bus 130R9, and provides a significant positive voltage level divide signal.

This divide signal on DIVIDE bus 130R9 is tied to the upper input of the phase counter control gate 130G1 and, directly upon its appearance, causes a negative voltage level enabling signal to be applied to the upper input terminal of the advance phase counter gate 130G2.

At the commencement of the division operation, however, the multiplier (157FF1 to 157FF4) is in its zero condition and, therefore, a negative voltage signal level is supplied to the 130L5 input of the advance phase counter gate 130G2.

Thus, immediately upon the appearance of the next succeeding H pulse on bus 130L4, this pulse will be passed through the advance phase counter gate to the toggle or complement input of the No. 1 flip flop 132FF4 of the phase control counter, thereby advancing this counter to its No. 1 state.

Since this counter is advanced to its No. 1 state, and a significant positive voltage level signal is present on the DIVIDE bus 130R9, the phase 1 gate composed of diodes 135D17 to 135D20 of the divide phase decoder is enabled.

The enabling of this phase 1 gate supplies a significant positive voltage level signal to the SUBTRACT bus 135R5.

At this point it should be recalled that the first four steps of the divide program, i.e., 1, 2, 3 and 4, constitute an alignment test preliminary to the actual division.

Keeping in mind that this is an alignment test, then, the appearance of the subtract signal on the SUBTRACT bus 135R5 causes the subtraction of the contents of the entry register (5) from the contents of the accumulator (114) as hereinbefore described. This subtraction will, of course, not result in a negative content in the accumulator register.

Since, however, the contents of the accumulator register did not become negative, the program proceeds with phase 2 at the time of the next H pulse.

The next H pulse passing through the advance phase counter gate 131G1 advances the phase control counter, therefore disenabling the phase 1 gate and enabling the phase 2 gate composed of diodes 135D13 to 135D16.

The opening of the phase 2 gate puts a significant positive voltage level signal upon the ADD bus 135R3. This bus has the same function and is the same bus as the ADD buses 129R1 and 129R3 of the addition operation. The resulting addition restores the immediately previously subtracted quantity (5) stored in the entry register to the amount in the accumulator register by normal addition, leaving "114" in the accumulator register. At the time of the next H pulse, the phase control counter is advanced, thereby disenabling the phase 2 gate, and enabling the phase 3 gate composed of diodes 135D9 to 135D12. The opening of the phase 3 gate produces a significant positive voltage level pulse upon the SL(E) bus 135R4.

The appearance of this significant shift left entry register signal, shifting the contents of the entry register to the left, will result effectively in the subtraction of "50" from the "114" in the accumulator register at the time of the next "test," though the zero of this "50" will not appear but a blank will take its place.

The significant positive voltage level output of the phase 3 gate is, however, also applied to bus 131L1 which bus is the D-C input of a resetting network adapted to reset the phase control counter to phase 1. Thus, at the time that the phase 3 gate opens, this resetting network is conditioned, via bus 131L1, resetting the phase control counter to phase 1. However, the A-C input 131L4 to the network is not energized by an H pulse until the end of this shift left entry cycle, phase 3.

At the end of phase 3, occurrence of the H pulse terminating this phase causes the diode network composed of diodes 131D1 to 131D10 to force the phase control counter back to its 1 indication. This is accomplished providing positive going transitions through diodes 131D4, 131D5, 131D9 and 131D11 to buses 131R1, 131R3, 131R5 and 131R7, thereby resetting flip flops 132FF1, 132FF2, 132FF3 and setting flip flop 132FF4.

This 1 indication of the phase control counter will cause the phase 1 gate to be enabled and will, again, cause a significant positive voltage level signal to appear upon the SUBTRACT bus 135R5.

This subtraction constitutes the reinitiation of phase 1 of the division program, but this time, the "50" which is effectively stored in the entry register will be subtracted from the contents of the accumulator register.

Since, however, the content of the accumulator register was "114," the "50" now subtracted therefrom in phase 1 will not result in a negative accumulator content and, therefore, the appearance of the next H pulse will cause the phase control counter, via the advance phase counter gate 130G2, to go to the phase 2 state.

As before, the phase 2 operation will cause the contents of the entry (this time "50") to be returned to the accumulator register, leaving "114" in the accumulator register.

Upon the occurrence of the next H pulse (phase 3) the contents of the entry register will be left-shifted, thereby effectively leaving "500" in the entry register.

Again, as before, the presence of the phase 3 gate significant positive voltage level output upon the SL(E) bus 131L5 in conjunction with the appearance of the H pulse at bus 131L4, will cause the phase control counter to be forced back to its 1 condition in the manner previously described.

Again, as before, the "opening" of the phase 1 gate will cause a significant positive voltage level signal to appear upon the SUBTRACT bus 135R5, initiating the phase 1 operation.

In this repetition of the phase 1 operation, however, the calculator will subtract the contents of the entry register (500) from the contents of the accumulator register (114), thereby producing a negative content in the accumulator register. This appearance of a negative quantity in the accumulator register will initiate a jump to phase 4 as follows.

In the course of the previous subtraction (phase 1) because the result was negative, the borrow flip flop 152FF2 remained in its set condition at the termination of the subtraction. The a output of the borrow flip flop is applied to one input terminal of the jump to phase 4 gate 131G1 along bus 131L6, thereby enabling the jump to phase 4 gate to produce a significant output upon occurrence of the H pulse on bus 131L7. This is accomplished by providing an output on buses 131R1, 131R4 and 131R5 due to the output of gate 131G1 and inverter 131A1 in conjunction with an H pulse on bus 131L7. These output signals reset the 2 and 8 flip flops of the phase control counter, set the 4 flip flop thereof, the 1 flip flop being reset by the H pulse at gate 130G2. Thus, upon occurrence of the H pulse, a significant positive voltage level signal is produced by the output of the inverter 131A1 associated with the jump to phase 4 gate 131G1. The network associated with the output of inverter 131A1, which network also requires, and has, a significant positive voltage level signal upon bus 131L1, functions to force the 2 and 8 flip flops 132FF3 and 132FF1 of the phase control counter, respectively, into their reset states. In addition, the concomitant H pulse fed through the advance phase counter gate 130G2 serves to reset the No. 1 flip flop 132FF4 of the phase control counter. Thus, the phase control counter is forced into its phase 4 state. The output of the phase 4 divide gate composed of diodes 135D5 to 135D8 occasioned by the phase control counter going into its 4 state causes a significant positive voltage pulse upon the ADD bus 135R3, thereby causing the addition of the contents of the entry register into the accumulator register, i.e., restoring the contents of the accumulator register to 114 in this particular problem.

It should be noted at this point that, in the operation of subtraction during division, the complementing step which takes place in normal subtraction does not take place. That is to say, the operation of gate 128G1 does not take place as in normal subtraction due to the presence of a positive voltage level signal at the output of inverter 128A4. This positive voltage level signal occurs due to the potential applied at the output of inverter 128A4 which is applied, not from the SUBTRACT bus 129R5, but from the $a$ output of the subtract flip flop 125FF3. Then, since the subtraction which takes place during the division opration is not a result of depressing and releasing the subtract key, thereby setting the subtract flip flop, this gate 128G1 will remain disenabled therby preventing the complementing operation which characterizes normal subtraction during the division operation. The effect of this may be seen by considering the present step of the division operation. The subtraction of the effctive "500" stored in the entry register from the "114" stored in the accumulator register will result in the three lowest orders of the accumulator register reading "614" and the remaining orders of the accumulator register reading 9's. This number is the number which would usually be provided by such a subtraction, which would then have to be complemented by the complementing action of normal subtraction. Here, however, in division, the number "500" in the entry register is restored in phase 4, as described above, and will return the count in the accumulator register to "114."

Having completed phase 4, the next H pulse, via the advance phase counter gate 130G2, advances the phase control counter to its phase 5 indication. This will result in the output of the inverter 135A1 associated with the phase 5 division gate composed of diodes 135D1 to 135D4, causing a significant positive voltage level signal upon the SR(E) bus 135R1. This signal upon the SR(E) bus will cause the contents of the entry register to be shifted to the right.

This shift to the right takes place as follows:

The shift right entry register signal is inverted in inverter 135A2 and then applied to the 147L2 input of the gate 147G1. Then, the occurrence of a W2 signal on bus 147L1, applied to the other input of this gate 147G1, causes a significant negative voltage level signal to be applied through inverters 147A1 and 147A5 to the common input 149L2 of the gate pair 149G1 and 149G2. This gate pair controls writing by write head 2 upon track 4, as energized by bit signals from the write flip flop 148FF1. In this case, these bit signals from the write flip flop will be applied to track 4 through write head 2 during the W4 period, as conditioned by the gate 147G1. The positive voltage level signal at the output of the inverter 147A1 associated with the gate 147G1 is also applied to the AND gate 147G3, thereby opening the bit write control gate 148G1. Thus, the contents of the down counter, if any, are written into track 4. However, the first write out from the down counter in any shift right entry register cycle results in no writing because, inter alia, there is nothing in the down counter to write.

If there were, however, a significant digit present in the lowest order of the entry register, then this would result in effective cancellation of the shift right entry register cycle, the division program then jumping to phase 9.

In the present portion of the computation being considered, there is a blank in the first order of the entry register and, consequently, the shift right entry register cycle continued.

The first write out during the shift right entry cycle results in no write out because nothing as yet has even been read into the up counter, and the track 4 write head 2 is over "dead time." In the next succeeding W4 time the track 4 read head reads the contents of the lowest order of the entry register. At this time, if there is a significant digit entered therein, the shift right entry register cycle will be terminated. However, in the problem under consideration, the shift right entry register cycle continues. That is to say, a blank is read into the up counter from the lowest order of the entry register.

At the end of the W4 period, the blank is "transferred" from the up counter to the down counter, and the up counter reset. No significant portion of this cycle takes place during W1 time.

At the next W2 time, the signal to write is again transmitted to the track 4 write head 2, but this write head is over "dead time," and so no writing takes place.

Going to the next W4 time, the contents of the second lowest order of the entry register are read into the up counter (in the particular problem being considered, there is a blank in this order also).

Again, at the end of the W4 period, the up to down/ reset up cycle takes place.

In the next W2 time track 4 write head 2 is located at the lowest order digit of the entry register. The concomitant W2 signal to write, however, does not succeed in writing anything into this lowest order of the entry register because the quantity just previously shifted from the up counter to the down counter was a blank.

This process continues, the next extraction being a "5" from the third lowest order of the entry register, this "5" being entered into the second lowest order of the entry register at the next W2 time. Thus, in the present problem, the contents of the entry register have been shifted to the right by one order. That is to say, phase 5 has been completed.

The occurrence of the next H pulse, via the advance phase counter gate 130G2 causes the phase counter to advance to its phase 6 indication.

The receipt of this phase 6 indication upon the inputs of the phase 6 counter gate composed of diodes 134D17 to 134D20 causes a significant positive voltage level signal upon the SL(M/Q) bus 134R5.

This signal causes the contents of the multiplier quotient register to be shifted left in the manner described hereinabove in connection with the operation of multiplication.

At the termination of this left-shifting of the multiplier quotient register, the occurrence of the next H pulse, via the advance phase counter gate 130G2, causes the phase control counter to advance to its phase 7 state. This advance to the phase 7 state causes the phase 7 gate composed of diodes 134D13 to 134D16 to impose a significant positive voltage level signal upon the SUBTRACT bus 134R4.

Upon energization of the SUBTRACT bus 134R4 in phase 7, the contents of the entry register (50) are subtracted from the contents of the accumulator register (114) in the manner described in connection with the description of phase 1 hereinabove.

This subtraction does ont result in a negative entry in the accumulator register and, therefore, at the termination of this subtraction, the occurrence of the next H pulse, via the advance phase counter gate 130G1, will cause the the phase control counter to advance to its phase 8 state. This will cause the phase 8 gate, composed of diodes 134D9 to 134D12, of the divide phase decoder, and its associated inverter 134A3, to place a significant positive voltage level signal upon the add one to quotient register (+1QREG) bus 134R3.

This signal is tied, inter alia, to bus 142L1. Bus 142L1 is the input terminal of a pulse gate composed of diode 142D1, capacitor 142C1, resistor 142RS1 and diodes 142D2 and 142D3, biased for noise suppression, or standoff, and the two outputs of this gate are connected to set the write delay flip-flop 146FF1 via bus 142R2, and via the SET ONE FF bus 142R3 to set the 1 flip-flop 152FF1 of the up counter respectively. Then, at the end of the next W2 time, the UP TO DOWN/RESET UP bus 143R1 is pulsed, thereby transferring the "1" entered into the up counter by the action of the SET ONE FF bus 142R3 to the down counter, and resetting the up counter.

No significant action takes place during the W3 time period. During the W4 time, the "1" now standing in the down counter is written into track 5, i.e., into the lowest order of the multiplier quotient register. It should be noted at this point that, had there been a digit already present in the lowest order of the multiplier quotient register, this would have been entered into the up counter in addition to the "1" entered in the up counter by the action of the SET ONE FF bus 142R3 during the W1 time period when the first RS signal is sensed, thereby subsequently causing the re-entry of this digit from the lowest order of the multiplier quotient register augmented by "1" back into the lowest order of the multiplier quotient register. This is accomplished by producing a significant voltage level on bus 139L3 to enable OR gate 139G1 and thereby, in conjunction with an RS signal, enable AND gate 145G2 thereby enabling AND gate 146G1 to provide a significant signal on the bus 146R1 and advance the up counter.

The significant positive voltage signal on the +1QREG bus 134R3 is, however, also applied to bus 131L2, i.e., to a network comprising diodes 131D2, 131D6 and 131D10 which is adapted, in conjunction with the next occurring H pulse on bus 131L4, to reset the phase control counter to its phase 7 state, by placing a positive-going voltage pulse on buses 131R1, 131R4 and 131R6 to set the 2 and 4 flip flops 132FF2 and 132FF3 while resetting flip flop 132FF1. The 1 flip flop 132FF4 is set by the incoming signal on bus 130R10 obtained from gate 130G2 at the next H pulse. Thus, on the next occurrence of an H pulse, the phase control counter is reset to its phase 7 state, and the phase 7 gate of the divide phase decoder again provides a significant positive voltage level signal upon the SUBTRACT bus 134R4. This causes a repetition of phase 7, as described above, in which the number standing in the entry register (50) is subtracted from the number now standing in the accumulator register (64), resulting in a positive quantity remaining in the accumulator register (14). Upon the occurrence of the next H pulse the phase control counter advances to its phase 8 state and a one count is added to the lowest order of the multiplier quotient register described hereinabove.

Thereupon, as described hereinabove, in connection with phase 8, the phase control counter is forced back to its phase 7 state, and again the contents of the entry register (now 50) are subtracted from the contents of the accumulator register (now 14), resulting in a negative quantity stored in the accumulator register. This negative quantity is represented in the acumulator register as "4" in the lowest order, "6" in the second lowest order and "9" in each succeeding higher order.

The occurrence of this negative quantity in the accumulator register causes a jump to the 4 state of the phase control counter in the manner described hereinabove in connection with phase 1.

Phase 4 then takes place, the contents of the entry register (50) being added to the contents of the accumulator register, with the result that the quantity "14" is restored to the accumulator register.

Now, upon the occurrence of the next H pulse, as described hereinabove, the phase control counter is advanced to phase 5, thereby subsequently causing the contents of the entry register to be shifted to the right.

It should be noted at this point, that in the present problem, the only digit in the entry register (5) is now in the lowest order of the entry register.

Upon the occurrence of the next H pulse, the phase control counter advances to phase 6, resulting in the shift of the contents of the multiplier quotient register to the left as described hereinabove.

At the completion of this operation, and the occurrence of the next H pulse, phase 7 commences, wherein the contents of the entry register is subtracted from the contents of the accumulator register, leaving a positive balance of "9."

Since the balance of "9" is positive, the next transfer will be to phase 8, wherein a one count will be added to the lowest order of the multiplier quotient register as described hereinabove, and the program will jump to the 7 phase.

In the 7 phase the contents of the entry register (5) will again be subtracted from the contents of the accumulator register (now 9), again leaving a positive quantity in the accumulator register, and allowing a shift to phase 8.

In phase 8, again, a count of "1" will be added to the lowest order of the multiplier quotient register (leaving "2" therein), and a jump to phase 7 will take place.

In phase 7 the contents of the entry register (5) will again be subtracted from the contents of the accumulator register (now 4), resulting in a negative number in the accumulator register, which negative number will be carried in the accumulator register as a 9 in each place of the accumulator register.

As a result of this negative content in the accumulator register, a jump to phase 4 will take place in the manner described hereinabove.

In phase 4, the contents of the entry register (5) will be added to the contents of the accumulator register, leaving a "4" therein.

Upon the occurrence of the next H pulse the phase control counter will advance to its phase 5 indication, causing a significant positive voltage level signal to appear upon the SR(E) bus 135R1.

The occurrence of this signal will set the first digit gate flip flop 136FF1. The *a* output of the first digit gate flip flop will provide a negative voltage level signal (enabling signal) upon the upper input of the overflow gate 136G1. The W4 timing signal on bus 136B4 is also connected to an input of the overflow gate 136G1, and will enable this gate during the W4 time period.

Also, the RS timing signal is connected to an input of gate 136G1 via bus 136B2 and, in conjunction with the W4 signal, will permit this gate to enable only during the RS time period. The bits from the track 4 read amplifier are applied directly to an input of the overflow gate 136G1 along bus 136B1.

From this, it may be seen that only bits occurring during the lowest order digit time of the entry register will be allowed to pass through this gate 136G1.

Thus, it may be seen that the occurrence of the first bit, if any, during the lowest order period of the entry register time will be passed from the output of the associated inverter 136A1 to the *h* input of the entry register digit overflow flip flop 136FF3, thereby setting the entry register digit overflow flip flop, and producing a negative voltage level overflow signal at bus 136T1 and, therefore, at bus 131L3. Bus 131L3 is the capacitive input via capacitor 131C1 of a pulse network adapted to adapted to jump the phase control counter to its phase 9 indication, but this jump to phase 9 takes place only upon receipt of a positive-going transition and, since the most recent transition was negative-going, the phase control counter is not reset to phase 9 at this time.

Thus, the right-shifting of the contents of the entry register is carried out during this phase 5 time.

At the end of the phase 5 time, the occurrence of an H pulse at the 136B5 input of the entry register digit overflow flip flop 136FF3 causes that flip flop to be reset, thereby producing a positive-going transition at bus 136T1 and bus 131L3, and forcing the phase counter to its 1110 state, i.e., the state in which the number 1 flip flop is reset, the number 2 flip flop is set, the number 4 flip flop is set, and the number 8 flip flop is set. Actually, phase 9 is represented in the phase counter by a binary 14. This is accomplished by the setting of the 8 flip flop 132FF1 by the pulse on bus 131R2. The remaining flip flops previously contained a count of "5," i.e., the flip flops 132FF2 and 132FF4 were set and flip flop 132FF3 was reset. The succeeding pulse on bus 132L9 at the next H time resets flip flop 132FF4 and thereby sets flip flop 132FF3. Since flip flop 132FF2 was already set, a binary "14" is provided in the phase control counter.

The phase counter, then, being set to such a state as will enable the phase 9 gate composed of diodes 134D5 to 134D8 in the divide phase decoder, phase 9 proceeds by the transfer of the contents of the accumulator register into the entry register in a manner analogous to the transfers described hereinabove along the A to E bus 134R2.

At the termination of phase 9 the then-occurring H pulse causes the phase control counter to advance to its 1111 state (binary 15), thereby enabling the phase 10 gate composed of diodes 134D1 to 134D4 of the divide phase decoder and initiating the operation of transferring the contents of the multiplier quotient register to the accumulator register in a manner analogous to the transfers described hereinabove along the Q to A bus 134R1.

At this time, then, the operation of division is completed, the quotient standing in the accumulator register and the remainder standing in the entry register.

DESCRIPTION OF THE DISPLAY CIRCUIT

The display circuit described herein displays information contained in various storage registers of a memory unit, certain of these storage registers serving to indicate the solutions to various arithmetical operations developed in a calculating device.

Basic circuit description

Integers to be displayed on the cathode ray tube are entered into an entry counter in the form of information or "bit" pulses. This information is then modified by the following steps: (a) encoding into decimal notation by a diode array (b) decoding into a seven count notation by a diode array (c) transfer to a seven stage shift register. The output signals generated by the shift register controls the "unblanking" of the various segments required to generate a given character.

The unblanking operation is accomplished by means for controlling the voltage levels at the grid of the cathode ray tube which in turn controls the brightness of the characters to be displayed. Concurrently with the development of the unblanking signals, character generation and positioning signals are developed as follows: Horizontal and vertical "staircase" waveforms are produced to establish the relative positioning of the characters on the cathode ray tube display. A segment (stroke) timing generator is provided to: (a) develop the segments used in the formation of each character in the display and (b) control the directing of the individual segments to either the horizontal or the vertical deflection amplifiers as required. A sine wave oscillator is provided to generate the individual segments for each character. Positioning of the segments in the manner required to form each character is accomplished by a "weighting" or current summing circuit such that each segment is assigned a vertical and horizontal voltage to establish the position of each said segment in each character. The segments (as produced by the sine wave oscillator) and the segment positioning voltages are mixed together before being applied to the deflection amplifiers. The deflection amplifiers mix the "staircase" waveforms with the segment development signals and apply the resultant waveforms to the cathode ray tube.

Detailed circuit description

In addition to the introduction of integers in the form of information or "bit" pulses, the display unit is designed to operate with the following timing signals: (a) positive and negative pulses applied at the beginning of each digit interval (the time required to display each character) herein referred to as the RS signal or RS time period; (b) a series of seven negative "segment timing" pulses evenly spaced throughout the RS time period herein referred to as the track 6 timing signals, (c) a positive-going transition signal applied at the beginning of every fourth RS time period herein referred to as the W1 signal and (d) a negative-going transition signal applied at the beginning of each display period (a display period is that period of time required to display each of the 25 characters on the cathode ray tube) herein referred to as the H2 signal.

Positive RS pulses are applied to the input (161L2) of a diode (161D3) such that, during the RS time period, this input will be a negative voltage level. Negative information bit pulses applied to the input labelled track 4 read amp (161L1) of a diode (161D2) concurrently with the positive input on bus 161L2 will produce negative pulses at the junction of diodes 161D2 and 161D3. These negative information pulses are applied to the base of transistor 161Q3 through resistor 161RS6 in parallel with capacitor 161C2, thereby causing transistor 161Q3 to develop positive output pulses at the collector thereof.

Resistor 161RS4 develops the voltages occurring at the junction of diodes 161D2 and 161D3, resistor 161RS9 is a base bias resistor and resistor 161RS11 is the load resistor for transistor 161Q3.

The positive output pulses produced at the collector of transistor 161Q3 are applied to the complementing input (160L2) of the No. 1 flip flop (160FF4) of the entry counter, thereby setting the No. 1 flip flop (it is assumed that all flip flops in the entry counter have been reset prior the application of the information pulses to the entry counter). The application of a second information bit to the complementing input (160L2) of the No. 1 flip flop (160FF4) will reset the No. 1 flip flop causing a positive-going transition signal to be developed at the FF· output thereof. This positive-going transition signal is applied to the complementing input of the No. 2 flip flop (160FF3), setting the No. 2 flip flop. In a similar manner, succeeding information bit pulses applied to the input (160L2) of the entry counter will count an integer into the entry counter as indicated by the states of the various flip flops.

The signal developed at the FF· output of the No. 1 flip flop (160FF4) is applied to the base of transistor 160Q7 through resistor 160RS8. The signal developed on the FF· output of the No. 1 flip flop is applied to transistor 160Q6 through resistor 160RS11. The signal developed on the FF. output of the No. 2 flip flop (160FF3) is applied to transistor 160Q5 through resistor 160RS7. The signal developed on the FF· output of flip flop No. 2 is applied to transistor 160Q5 through resistor 160RS10. The signal developed on the FF. output of flip flop No. 4 (160FF2) is applied to the base of the transistor 160Q3 through resistor 160RS6. The signal developed on the FF· output of the No. 4 flip flop is applied to the base of the transistor 160Q2 through resistor 160RS9. The signal developed at the FF. output of No. 8 flip flop (160FF1) is applied to the base of the transistor 160Q1 through resistor 160RS5. The resistors numbered 160RS12 through 160RS18 are bias resistors for the above mentioned transistors.

The information stored in the entry counter is applied to the input of a diode encoder (FIG. 121) as follows: the signal developed on the collector of transistor 160Q7 is applied to the input (162L4) of the encoder. This input is connected to four diodes numbered 162D6, 162D12, 162D15, and 162D17. The signal developed on the collector of transistor 160Q6 is applied to the input (162L5) of the encoder, this input being connected to two diodes numbered 162D8 and 162D14. The signal developed at the collector of transistor 160Q5 is applied to the input (162L3) of the encoder, this input being connected to five diodes numbered 162D4, 162D10, 162D11, 162D13, and 162D22. The signal developed at the collector of transistor 160Q3 is applied to the input (162L1) of the encoder, this input being connected to four diodes numbered 162D1, 162D7, 162D9, and 162D19. The signal developed at the collector of transistor 160Q2 is applied to the input (162L6) of the encoder, this input being connected to two diodes numbered 162D16 and 162D21. The signal developed at the collector of transistor 160Q1 is applied to the input (162L2) of the encoder, this input being connected to three diodes numbered 162D2, 162D3, and 162D5.

The output of the encoder (FIG. 121) is applied to the input of the decoder (FIG. 122) when a negative pulse is applied to the input (162R1) of the encoder.

This negative pulse is developed when the input bus designated RS 165L2 (FIG. 124) receives a negative transition thereon. This negative transition is applied to the input diode 165D2 and, in conjunction with resistor 165RS2, produces a negative transition at the junction of the said diode and resistor. This negative transition is applied to the base of transistor 165Q2 through the resistor 165RS4 and the capacitor 165C2 in shunt therewith.

A positive transition signal will be developed on the output (165R2) of the transistor 165Q2 at the junction of the collector and the collector load resistor 165RS8 thereof. This positive transition is applied to the input (167B5) of a one shot 167N2 (FIG. 126), developing a negative pulse on the base of the transistor 167Q5, this negative pulse being developed on the emitter of transistor 167Q5 and at the output thereof (167T4). As a result, a negative pulse will be applied to the enabling input (162R1) of the encoder previously mentioned (FIG. 121).

This negative pulse is applied to resistors 162RS1 to 162RS12, thereby enabling this encoder. The outputs of this encoder, 162R2 through 162R13 inclusive, are applied to the inputs, 163L1 through 163L12 inclusive, of the decoder (FIG. 122).

The negative voltage level applied to the input 162L1 of the encoder (FIG. 121) develops a negative pulse at the output thereof (162R2) when the enabling pulse is applied to the enabling input 162R1 of the encoder. This negative pulse is applied to the input (163L3) of the decoder (FIG. 122), producing a negative pulse at the inputs to the diodes 163D3 and 163D20. The negative pulse at the input of the diode 163D3 is applied to the base of the transistor 163Q1 through the said diode and the resistor 163RS1. A positive pulse will be developed at the collector of the transistor 163Q1 on the output thereof (163R1).

The negative pulse at the input to diode 163D20 is applied to the base of the transistor 163Q6 through the said diode and the resistor 163RS6. In a similar manner, when a negative pulse is developed on the input to any of the diodes numbered 163D1 through 163D25 inclusive, a positive pulse is developed on the output of the associated transistor.

Positive pulses developed on the outputs 163R1 through 163R7 of the decoder, are applied to the inputs 164L1 through 164L7 "inclusive" of the shift register flip flops 164FF1 to 164FF7, inclusive (FIG. 123). Positive pulses developed at the inputs to the shift register are applied to the FF. or *b* inputs of the appropriate flip flop therein, these positive pulses setting the appropriate flip flops.

The flip flops in the shift register (FIG. 123) numbered 0, 1, 2, 3, 4, 5, and 6 represent the segments of the character to be generated. This information, then, will provide the unblanking information for the display.

The signals for the transfer or W input (164R2) of the shift register are developed at the output of the read amplifier of track 6, 167RA1 (FIG. 126). A negative transition, applied to the base of transistor 167Q1 from the output of the TK6 read amplifier through resistor 167RS1 and capacitor 167C1 produces a positive transition at the collector of transistor 167Q1 at the junction of the collector load resistor 167RS3 and the input to the one shot circuit 167N1. The positive transition signal developed at the input to the one shot circuit 167N1 produces a negative transition at the output thereof, this negative transition being applied to the base of the transistor 167Q2 through the resistor 167RS4. The capacitor 167C2, tied to the base of the transistor 167Q2, suppresses noise appearing at the base of the said transistor.

The previously mentioned negative transition applied to the base of the transistor 167Q2 produces a positive transition at the collector thereof at the junction of the collector load resistor 167RS6 and the resistor 167RS8. This positive transition is applied to the base of the transistor 167Q3 and, thereby, produces a negative transition at the collector thereof. The resistor 167RS11 is the collector load resistor for the transistor 167Q3. The negative transition is applied to the base of the transistor 167Q6 through the resistor 167RS12 and the capacitor 167C3 in shunt therewith to produce a positive transition at the collector of the transistor 167Q6.

The resistor 167RS14 is a collector load resistor, and, in association with the diode 167D4, clamps the collector at a negative (−6) voltage level. Therefore, the positive transition produced at the collector of transistor 167Q6 will be about a 6-volt transition rather than a 12-volt transition.

The positive transition developed at the output 167T1 (FIG. 126) is applied to the input 164R2 (FIG. 123) of the transfer input W(164R2) of the shift register. The transfer input provides seven shift pulses for each integer.

The FF· or *a* output and the FF. or *b* output of the flip flop 164FF7 (FIG. 123) is applied to the upper or *j* and lower or *e* gate inputs (G) of the flip flop 164FF6. Thus, on the application of a shift pulse the information stored in flip flop 164FF7 (No. 6) is transferred to flip flop 164FF6 (No. 5). Similarly, the information in flip flop 164FF6 (No. 5) is transferred to flip flop 164FF5 (No. 4). Also, the information in flip flop 164FF5 is transferred to flip flop 164FF3; the information in flip flop 164FF3 is transferred to flip flop 164FF2, and the information in flip flop 164FF2 is transferred to the flip flop 164FF1.

The first shift pulse will transfer a zero into the flip flop 164FF7 because the left-hand reset or *j* input (G) is connected to ground and the right-hand set or *e* input is connected to −6 volts.

As the information contained in the shift register is shifted forward to the output (the FF. or *b* output) (164R1) of the "0" flip flop (164FF1), the voltage level at this output will vary from positive to negative in accordance with the information contained in the shift register. This output signal of alternating positive and negative voltage levels on the shift register output (164R1) is transferred to an input (167B4) of a diode (167D3).

The negative pulses produced at the output of the one shot circuit 167N1 are applied to the input of diode 167D1. During the RS time period, a negative voltage level is applied to the input (165L1) of a diode 165D1 and, in conjunction with the negative voltage level at one terminal of resistor 165RS1, a negative voltage level is developed at the junction of diode 165D1 and resistor 165RS1. This negative voltage level is applied to the base of transistor 165Q1 through the shunted capacitor 165C1 and resistor 165RS3. Transistor 165Q1 is then turned "on" developing a positive voltage level at the output thereof.

Resistor 165RS5 is used for biasing whereas resistor 165RS7 is the load resistor for transistor 165Q1.

The positive voltage level developed at the collector of transistor 165Q1 is applied to the base of transistor 165Q3, turning transistor 165Q3 "off" and producing a positive voltage level at the emitter (165R1) thereof, resistor 165RS9 being the load resistor for transistor 165Q3. The positive voltage level on the emitter (165R1) of transistor 165Q3 is applied to the input (167B3) of the diode 167B2. During the interval between the negative pulses produced at the output of the one shot 167N1

(segment time periods), a positive voltage level will be developed on the input to diode 167D1. During those segment time periods, when a positive voltage level is developed on the input (167B4) of the diode 167D3, the junction of diodes 167D1, 167D2 and 167D3 will be at a positive voltage level. This positive voltage level will be applied to the base of transistor 167Q4 through resistor 167RS7, turning transistor 167Q4 "off" and developing a negative voltage level on the collector (167T3) thereof.

During those segment time periods wherein a negative voltage level is developed on the input (167B4) of the diode 167D3, the junction of diodes 167D1, 167D2 and 167D3 will be at a negative voltage level, this negative voltage level being applied to the base of transistor 167Q4 through resistor 167RS7, turning transistor 167Q4 "on" and producing a positive voltage level on the collector (167T3) thereof. Resistor 167RS9 is a biasing resistor for transistor 167Q4. Positive and negative voltage levels, developed at the output of the shift register (FIG. 123), will cause transistor 167Q4 to be alternately turned "on" and "off," the periods when transistor 167Q4 is turned "off" allowing the segment generated during the particular segment time period to be displayed on the cathode ray tube.

The positive "unblanking" signal developed at the collector of 167Q4 is applied to the input (173L1) of the base of transistor 173Q1 through resistor 173RS2 turning transistor 173Q1 "on" and developing a positive-going transition signal at the output (173R1) of the collector thereof. Resistor 173RS1 is the load resistor for transistor 167Q4. Resistor 173RS3 is a biasing resistor, and resistor 173RS14 is the load resistor for transistor 173Q1. The positive-going transition signal developed at the collector output (173R1) of the transistor 173Q1 is applied to the input (174L1) of the input of the cathode ray tube (174R5) through capacitor 174C3. Resistor 174RS13 in conjunction with capacitor 174C3 serves as a differentiator for the positive-going transition sigals developed at the input (174L1). The positive pulses produced at the output (167T2) of the collector of transistor 167Q6 are applied to the T or $d$ input (170L2) of the #1 flip flop 170FF1.

All of the flip flops 170FF1 to 170FF4 inclusive (Numbers 1, 2, 4 and 8) of the segment timing generator are in the set state at this time. Therefore, upon the application of the first positive pulse thereto, the #1 flip flop 170FF1 will be reset and thereby produce a positive voltage level on the FF· or $a$ output (170R1) thereof and a negative voltage level on the FF. or $b$ output (170R2) thereof. Upon the application of the second positive pulse thereto, the #1 flip flop 170FF1 will be set, producing a negative voltage level on the FF· or $a$ output (170R1) thereof and a positive-going transition signal on the FF. or $b$ output (170R2) thereof. This positive-going transition signal developed on the FF. or $b$ output of the #1 flip-flop 170FF1 is applied to the T or $d$ input of the #2 flip flop 170FF2, resetting the #2 flip flop and developing a positive voltage level at the FF· or $a$ output (170R4) thereof and a negative voltage level on the FF. or $b$ output (170R5) thereof. This sequence is then continued with the following result:

The #1 flip flop changes states upon the application of each positive pulse to the input thereof. The #2 flip flop 170FF2 changes states upon the application of every second positive pulse to the #1 flip flop. The #4 flip flop 170FF3 changes states upon the application of every 4th positive pulse to the #1 flip flop (Refer to FIG. 158).

Whenever the #2 flip flop 170FF2 is reset, a positive-going transition signal will be developed at the FF· or $a$ output 170R4 thereof. This positive-going transition signal is applied to the T or $d$ input of the #8 flip flop 170FF4, resetting the #8 flip flop. Therefore, the set states of the #4 flip flop 170FF3 and the #8 flip flop 170FF4 will be displaced by one-half of the cycle produced by the #2 flip flop 170FF2. At the end of the RS time period, the negative going transition signal developed at the emitter output (165R1) of transistor 165Q3 is applied to the input (166L1) at the base of transistor 166Q1 through resistor 166RS1, turning transistor 166Q1 "on" and developing a positive-going transition signal at the collector thereof.

Resistor 166RS3 is a biasing resistor and resistor 166RS6 is a load resistor for transistor 166Q1.

The previously mentioned positive-going transition signal is applied to the one shot 166N1, producing a positive-going transition signal at the output thereof. This positive-going transition signal is applied to the base of transistor 166Q4 through resistor 166RS11, turning Transistor 166Q4 "off" and developing a negative-going transition signal at the collector output (166R2) thereof.

Resistor 166RS13 is a biasing resistor and resistor 166RS16 is a load resistor for transistor 166Q4.

The negative going transition signal developed at the collector output (166R2) of transistor 166Q4 is applied to the "setting" inputs of each of the flip flops (1 to 4 and 8) of the segment timing generator. This is accomplished as follows: The input 170L1 is connected through diodes 170D1 to 170D4 to each of the FF. or $b$ outputs of the flip flops 170FF1 to 170FF4 in the segment timing generator. The connection of the FF. or $b$ output of the #1 flip flop 170FF1 is made through the diode 170D1. The connection to the FF. or $b$ output of the #2 flip flop 170FF2 is made through the diode 170D2. The connection to the FF. or $b$ output of the #4 flip flop 170FF3 is made through the diode 170D3 and the connection to the FF. or $b$ output of the #8 flip flop 170FF4 is made through the diode 170D4. A positive voltage level applied to each of these FF. or $b$ inputs of the above named flip flops will force these flip flops to a set state.

The negative pulse developed at the output of the one shot 166N1 is transferred to the output (166R1) through diode 166D4. This negative pulse is applied to the input (168L3) of the base of transistor 168Q1 through resistor 168RS3, turning transistor 168Q1 "on" and developing a positive pulse at the collector thereof.

Resistors 168RS1, 168RS5, 168RS3 and 168RS6 are biasing resistors; resistor 168RS8 is the load resistor for transistor 168Q1; and resistor 168RS9 is a current limiting resistor which serves to limit the discharging current of capacitor 168C2 through diode 168D1 and transistor 168Q1.

The positive pulse developed at the collector of transistor 168Q1 causes capacitor 168C2 to be discharged by a fractional amount. A positive "step" voltage will thereby be developed at the junction of diode 168D1 and capacitors 168C2 and 168C3 as a result of the application of the positive pulse at the collector of transistor 168Q1. This positive going transition or "step" will be developed at the output (168R3) through capacitor 168C3. Succeeding positive pulses produced at the collector of transistor 168Q1 will serve to further discharge capacitor 168C2 and thereby develop the characteristic "staircase" waveform as indicated in FIG. 159.

The reset signal for the vertical staircase generator will also step the horizontal staircase generator at the same time. This signal is developed as follows: The W1 signal, as previously mentioned, is applied to the input (166L2) at the base of transistor 166Q2 through diode 166D2 and resistor 166RS4. The W1 signal is at a positive voltage level during the W1 time period. A negative-going transition signal developed on the input (166L1), as previously described, occurs at the end of each RS time period. However, only one of every four of these negative-going transition signals, occurring at the end of each RS time period, is passed through diode 166D1 and appears at the junction of diode 166D1 and diode 166D2. This negative-going transition signal, occurring at the end of every fourth RS time period, is developed at the junction of diodes 166D1 and 166D2 as a result of the W1 signal remaining at a positive voltage level, as applied to the input of diode 166D2.

When the W1 signal is negative, this negative voltage level will be passed through diode 166D2 and appear at the junction of diodes 166D1 and 166D2, thereby preventing the remaining negative-going transition signals, occurring at the end of the RS time period, from being developed at the junction of diodes 166D1 and 166D2. The RS negative-going transition signal, as now produced at the end of an RS time period at the junction of diodes 166D1 and 166D2, is applied to the base of transistor 166Q2 through transistor 166RS4, turning transistor 166Q2 "off" and thus developing a positive-going transition signal at the collector thereof.

Resistor 166RS7 is a biasing resistor, whereas resistor 166RS9 is the load resistor for transistor 166Q2.

The positive-going transition signal developed at the collector of transistor 166Q2 is applied to the input of a one shot circuit 166N2, causing a negative-going transition signal to be developed at the output thereof. This negative-going transition signal is applied to the base of transistor 166Q5 through resistor 166RS12, turning transistor 166Q5 "on" and producing a positive-going transition signal at the collector thereof.

Resistor 166RS14 is a biasing resistor, whereas resistor 166RS17 is the load resistor for transistor 166Q5.

The positive-going transition signal developed at the collector of transistor 166Q5 is passed through diode 166D2 and developed at the output (166R3) thereat. This positive-going transition signal is applied to an input (168L2) of a one shot circuit 168N1 through resistor 168RS4, causing the one shot circuit 168N1 to produce a negative pulse at the output thereof. Resistor 168RS2, in conjunction with diode 166D2, forms a decoupling circuit for the signals developed at the collector of transistor 166Q5. The negative pulse developed at the output of the one shot circuit 168N1 is applied to the upper terminal of capacitor 168C2 (the junction of diode 168D1, capacitor 168C3 and capacitor 168C2), causing a charge to be developed on capacitor 168C2. Resistor 168RS10 is a current limiting resistor which serves to limit the charging current generated as a result of the charging of capacitor 168C2.

Capacitor 168C2 is, therefore, recharged by the development of signals originating with the negative-going transition signal occurring at the end of the RS time period following within each W1 time period. Resistor 168RS7, one terminal of which is connected to a —12 volt supply, and capacitor 168C1, one end of which is connected to ground (zero volts), serve to establish a stabilized —12 volt supply. This stabilized —12 volt supply is developed at the junction of resistor 168RS7 and capacitor 168C1 and is indicated on FIG. 127 by the output terminal with a circle containing the notation —12 V'. The negative-going transition signal developed at the output (168R2) of the one shot circuit 168N1 at the end of the RS time period is applied to the input (169L1) at the base of transistor 169Q1 through the resistor 169RS2, turning transistor 169Q1 "on" and developing a positive-going transition signal at the collector thereof. This positive-going transition signal causes capacitor 169C1 to be discharged by a fractional amount through diode 169D1, transistor 169Q1, and resistor 169RS7. A positive-going "step" will, therefore, be developed at the junction of diode 169D1 and capacitor 169C1. Resistor 169RS7 is a current limiting resistor to limit the discharge current of capacitor 169C1, through diode 169D1, and transistor 169Q1.

The positive-going "step" signal developed at the junction of diode 169D1, and capacitor 169C1 is developed at the output (169R1) through capacitor 169C2. Resistors 169RS4, 169RS5, 169RS2, and 169RS1 are biasing resistors whereas resistor 169RS6 is a load resistor for transistor 169Q1.

Capacitor 169C1 is discharged, therefore, in positive voltage increments or "steps" occurring at the end of the RS time period within every W1 time period. A series of 25 positive "steps" are thereby developed at the output (169R1). A negative-going transistor signal is applied to the input (166L3) of the base of transistor 166Q3 through diode 166D3 and resistor 166RS5 at the beginning of each H time period. Transistor 166Q3 will thereby be turned "on," developing a positive-going transition signal at the collector thereof. Resistor 166RS2 and diode 166D3 form a decoupling circuit for the H signals being applied to the input (166L3). Resistor 166RS8 is a biasing resistor whereas resistor 166RS10 is the load resistor for transistor 166Q3.

The positive-going transition signal developed at the collector of transistor 166Q3 is applied to the input of a one shot circuit 166N3 and, thus, develops a negative pulse at the output thereof. This negative pulse is applied to the base of transistor 166Q6 through resistor 166RS15, turning transistor 166Q6 "on" and developing a positive pulse at the output thereof. This positive pulse is developed at the output (166R4) through diode 166D6. Resistor 166RS18 is a biasing resistor, whereas resistor 166RS19 is the load resistor for transistor 166Q6.

The positive pulse developed at the collector output (166R4) of transistor 166Q6 through diode 166D6 is applied to the input (169L2) of a one shot circuit 169N1, thereby producing a negative pulse at the output thereof. Resistor 169RS3, in conjunction with diode 166D6, forms a decoupling network for the signals produced at the collector of transistor 166Q6. The negative pulses developed at the output of the one shot circuit 169N1 will recharge capacitor 169C1 through diode 169D2 and resistor 169RS8. Resistor 169RS8 is a current limiting resistor which serves to limit the charging current as a result of the charging of capacitor 169C1. Capacitor 169C1 will, therefore, be charged at the beginning of each H time period.

The three-step positive staircase waveform developed at the output (168R3) is applied to the input (172L1) labelled A of the vertical amplifier circuit 172A1. The 25-step positive staircase waveform developed at the output (169R1) is applied to the input (172L3) labelled A of the horizontal amplifier circuit 172A2. These staircase waveforms are then mixed in the vertical and horizontal amplifiers with the segment generating and positioning signals which are developed as follows.

The individual segments or strokes are created by the sweep oscillator comprised of transistor 171Q1, resistors 171RS2, 171RS7, 171RS13, and 171RS14, and capacitors 171C1, 171C2, and 171C6 and the coil 171L1. The sine wave signal developed at the collector of transistor 171Q1 (sine wave oscillator circuit) is applied to the inputs of two "signal directing" circuits, one of which is comprised of resistors 171RS5, 171RS6, 171RS10, and 171RS12 and diodes 171D4 and 171D7 and capacitor 171C4, the other "signal directing" circuit being comprised of resistors 171RS3, 171RS4, 171RS8, and 171RS11 and diodes 171D5 and 171D6 and capacitor 171C3.

When the display cycle reaches the point wherein the No. 8 flip flop 170FF4 of the segment timing generator (FIG. 129) is reset, the FF. or $b$ output (170R9) thereof will be at a negative voltage level. This negative voltage level is applied to the input 171L4 of the first mentioned "signal directing" circuit through diode 171D4. This negative voltage level is thereby applied to the junction of resistor 171RS5 and diode 171D7, allowing the sine wave signals produced at the collector of transistor 171Q1 to be developed at the output (171R2) as a result of passing through register 171RS5, diode 171D7, capacitor 171C4, and transistor 171RS12.

Since the No. 8 flip flop 170FF4 of the segment timing generator (FIG. 129) is reset as previously mentioned, a positive voltage level is developed at the FF· or $a$ output (170R8) thereof. The positive voltage level is applied to the input 171L5 of the second mentioned "signal directing" circuit through diode 171D5, thus establishing a positive voltage level at the junction of resistor 171RS3 and diode 171D6. This positive voltage level will prevent the sine wave signal developed at the collector of transistor 171Q1 from passing through resistor 171RS3, diode 171D6, capacitor 171C3, and resistor 171RS11 and being developed at the output (171R4). Therefore, the reset state of the No. 8 flip flop 170FF4 of the segment timing generator (FIG. 129) will direct the sine wave signals produced at the collector of transistor 171Q1 to the output (171R2) while inhibiting the development of these sine wave signals at the output 171R4.

Conversely, the set state of the No. 8 flip flop 170FF4 will cause the previously mentioned sine wave signals to be directed to the output (171R4) while inhibiting the development of these sine wave signals at the output (171R2). Resistors 171RS6, 171RS10, 171RS4, and 171RS8 aid in the proper functioning of the "signal directing" circuits.

The circuit appearing in FIG. 130 comprising resistor 171RS9, one end of which is connected to a −12 volt supply, and capacitor 171C5, one end of which is connected to ground (zero volts), performs a voltage stabilizing function wherein a stabilized −12 volts is established at the junction of resistor 171RS9 and capacitor 171C5. This stabilized voltage appears at the output of resistor 171RS9 and capacitor 171C5 as indicated by the circled quantity −12 v'. This source of a stabilized −12 volts is provided for the sine wave oscillator and is connected to the points indicated by the circled quantity −12 v'.

The inputs (171L1), (171L2) and (171L3) of diodes 171D1, 171D2, and 171D3, respectively, receive signals from the segment timing generator for the purpose of controlling the output of the sine wave oscillator. Signals developed at the outputs (170R1), (170R5), (170R6) and (170R4) are applied to the inputs (173L3), (173L4), (173L5) and (173L6), respectively. These signals constitute the segment timing signals developed in the segment timing generator (FIG. 129) and are "weighted" (assigned relative voltage levels) by two "weighting" circuits or "circuit summing" circuits, one of which is comprised of resistors 173RS4, 173RS9, 173RS5, 173RS10, 173RS6, 173RS11, 173RS15, and 173RS17, and diodes 173D1, 173D2, and 173D3.

The other segment "weighting" circuit is comprised of resistors 173RS7, 173RS12, 173RS8, 173RS13, 173RS16, and 173RS18, and diodes 173D4 and 173D5. The segment "weighting" voltages developed by the first mentioned "weighting" circuit are devloped at the output (173R2). The segment weighting voltages generated by the second mentioned weighting circuit are developed at the output (173R3).

The segment "weighting" voltages developed at the output (173R2) are applied to the input (172L2) labelled B of the vertical deflection amplifier 172A1. The segment "weighting" voltages developed at the output (173R3) are applied to the input (172L4) labelled B of the horizontal deflection amplifier 172A2.

The positive-going "staircase" waveforms applied to inputs (172L1) and (172L3), and the segment generating and "weighting" voltages applied to the inputs (172L2) and (172L4), as previously described, are mixed in the deflection amplifiers 172A1 and 172A2 in a manner which generates the required character shape and positioning as viewed on the cathode-ray tube. A character slant adjust circuit is provided by the circuit comprised of transistor 172Q1, resistors 172RS1 and 172RS2 and capacitors 172C1 and 172C2. The output labelled C of the vertical deflection amplifier 172A1 is connected to the base of transistor 172Q1. The signal developed across the emitter resistor 172RS1 of transistor 172Q1 is applied to the input labelled C of the horizontal deflection amplifier 172A2 through capacitor 127C1 and transistor 172RS2 and capacitor 172C2.

The vertical deflection signals produced by the vertical deflection amplifier 172A1 are applied to the cathode-ray tube through the outputs (172R1) and (172R2). The horizontal deflection signals produced by the horizontal deflection amplifier 172A2 are transfered to the cathode-ray tube through the outputs (172R3) and (172R4). The voltages necessary for the proper operation of the display circuit are generated by the power supply illustrated in FIGS. 133 and 134. 117 volts AC is applied to the inputs (174L2) and (174L3) of the transformer 174T1. The transformer 174T1 provides the following voltages for operation of the display circuit: 30 volts RMS at 120 milliamps across the secondary winding indicated by the outputs (174R1) and (174R2), 90 volts RMS at 50 milliamps across the secondary winding indicated by the outputs (174R3) and (174R4), 1,700 volts RMS at 3 milliamps across the secondary winding indicated at one end by the junction of resistor 174RS1 and diode 174D1 and the other end by a ground connection and 6.3 volts (for the operation of the filament in the cathode-ray tube) across the secondary winding indicated by the outputs (174R7) and (174R8).

Further control of the cathode-ray tube display is developed by the voltages and signals appearing at the outputs (174R5) and (174R6) of the circuitry comprised of resistors 174RS1 through 174RS12 and resistors 174RS14 through 174RS23, diodes 174D1 through 174D14, and capacitors 174C1, 174C2 and 174C4. The 30 volts RMS developed at the output (174R1) and (174R2) is applied to the inputs (175L1) and (175L2) of a minus 12 volt DC power supply comprised of transistors 175Q1 and 175Q4 and resistors 175RS1, 175RS4 and 175RS8 and diodes 175D1 and 175D2 and capacitors 175C1 and 175C4. A minus 12 volts is produced at the emitter of transistor 175Q4 serving as the output for the power supply circuit. The 30 volts RMS developed at the outputs (174R1) and (174R2) is also applied to a plus 12 volt DC power supply circuit comprised of the transistor 175Q3, resistors 175RS5, 175RS2 and 175RS6, and diodes 175D5 and 175D6 and capacitors 175C2 and 175C5. An additional voltage supply circuit to develop a minus 90 volts DC is comprised of the transistors 175Q2 and 175Q5 and resistors 175RS3, 175RS7, 175RS9 and 175RS10 and diodes 175D3 and 175D4 and capacitors 175C3 and 175C6. The 90 volt RMS developed at the outputs (174R3) and (174R4) is applied to the inputs (175L3) and (175L4) of the minus 90 volt DC supply. An additional cathode-ray tube control voltage is developed at resistor 175RS10 and is produced at the output (175R4).

SHIFT LEFT ACCUMULATOR KEY

The depression and release of the shift left accumulator key 125K2 will produce a positive pulse at the output thereof. The positive pulse is applied to the FF. output (125R4) of the shift left flip flop 125FF2 through diode 125D2, setting the shift left flip flop 125FF2.

The positive voltage level developed at the FF. output (125R4) of the shift left flip flop 125FF2 is applied to the input (126L7) of an OR gate 126G1 enabling this OR gate and producing a positive pulse at the output thereof. This positive pulse is appled to the input of an inverter 126A1 causing a negative pulse to be developed at the output thereof, unlocking the function timing flip flop.

The negative voltage level developed at the FF· output (125R3) of the shift left flip flop 125FF2 is applied to the input of a diode 127D7.

The negative voltage level produced at the FF. output of the function timing flip flop 126FF1 as a result of the function timing flip flop being reset at this time, is applied to the base of transistor 126Q1, turning transistor 126Q1 "on" and developing a negative voltage level at the emitter thereof. This negative voltage level is applied to the input of an inverter 126A2, causing a positive voltage level to be developed at the output thereof. This positive voltage level is applied to the base of transistor 126Q2, turning transistor 126Q2 "off" and developing a positive voltage level at the emitter output (126R5)

thereof. This positive voltage level is applied to the input (127L9) of resistor 127RS7. Therefore, the junction of resistor 127RS7 and diode 127D7 will be at a positive voltage level.

The positive-going transition signal occurring at the end of the first H pulse (after operation of the shift left accumulator key), is applied to the T or d input (126L12) of the function timing flip flop 126FF1, setting the function timing flip flop and developing a positive voltage level at the FF. output thereof. This positive voltage level is applied to the base of transistor 126Q1, turning transistor 126Q1 "off" and developing a positive voltage level at the emitter thereof. This positive voltage level is applied to the input of an inverter 126A2, causing a negative voltage level to be developed at the output thereof. This negative voltage level is applied to the base of transistor 126Q2, turning transistor 126Q2 "on" and developing a negative voltage level at the emitter output (126R5) thereof.

Resistor 126RS1 serves to reduce the power dissipation developed in transistor 126Q2.

The negative voltage level developed at the emitter output (126R5) of transistor 126Q2 is applied to the input (127L9) of resistor 127RS7, causing the junction of resistor 127RS7 and diode 127D7 to develop a negative voltage level thereat. This negative voltage level is applied to the input of an inverter 127A7, causing a positive voltage level to be developed at the output labelled SL(A) bus (127R12).

This positive voltage level is applied to the set input labelled SL(A) bus (159L1) of the ACC SL DELAY flip flop 159FF1, setting the ACC SL DELAY flip flop.

At the beginning of the H time period, a positive-going transition signal is developed on reset input labelled H bus (159L2) of the ACC SL DELAY flip flop 159FF1, resetting the ACC SL DELAY flip flop and causing a positive-going transition signal to be developed at the FF· output (159R1) thereof. This positive-going transition signal is applied to the input (158L1) of capacitor 158C1. Diode 158D1 is a —6 volt clamp.

Previous to the application of this positive pulse, a negative voltage level had been established at the side of capacitor 158C1 connected to the input (158L1) while the other side connected to the junction of resistor 158RS1 and diode 158D3 was maintained at a positive level as established by the AND gate 158G2 and resistor 158RS1 as follows: The positive voltage level developed on the input labelled MULT BUS (158L2) (positive voltage level when not in mult) is applied to an input of the AND gate 158G2, causing a positive voltage level to be developed at the output thereof. This positive voltage level is then developed at the junction of resistor 158RS1 and diode 158D3, thereby establishing the charge on capacitor 158C1. Upon the application of the positive-going transition signal to the side of capacitor 158C1 connected to the input (158L1), a positive-going transition signal will be developed at the junction of resistor 158RS1 and diode 158D3 and will be produced at the output labelled SET READ DEL FF bus (158R1) of the diode 158D3. This positive-going transition signal is applied to a set input labelled SET READ DEL FF bus (146L12) of the read delay flip flop 146FF2, setting the read delay flip flop and causing a negative voltage level to be developed on the FF· output thereof.

The positive voltage level developed on the input labelled SL(A) bus (142L3) is applied to an input of the OR gate 142T3, causing a positive voltage level to be produced at the output thereof. This positive voltage level is applied to the input of the inverter 142A3, causing a negative voltage level to be developed at the output (142R1) thereof.

This negative voltage level is applied to the input (143L2) of the AND gate 143G1, and together with the positive-going transition signal produced at the input labelled W2 bus (143L1) (at the end of the first W2 time period), the AND gate 143G1 will be disenabled. A positive-going "reset" signal is subsequently developed at the output labelled RESET READ DELAY FF bus (153R5) as previously described.

This positive-going transition signal is applied to the FF· output of the read delay flip flop 146FF2 via bus 146L4 labelled RESET READ DELAY FF, resetting the read delay flip flop. This positive-going transition signal is also applied to a reset input of the write delay flip flop 146FF1, setting the write delay flip flop and developing a positive voltage level on the FF. output thereof labelled WRITE DELAY bus (146R5).

The positive voltage level developed on the SL(A) bus (127R12) is applied to the input (141L5) of the OR gate 141G3, causing a positive voltage level to be developed at the output thereof. This positive voltage level is applied to the input of an inverter 141A3, causing a negative voltage level to be produced at the output thereof labelled READ A BUS (141R3).

This negative voltage level is applied to the input (144L6) of an AND gate 144G3 and, together with the negative voltage level applied to the input labelled W3 bus (144L5) (during the first W3 time period), the AND gate 144G3 will be enabled, producing a negative voltage level at the output thereof.

This negative voltage level is applied to the input of an inverter 144A3, causing a positive voltage level to be developed at the output thereof. This positive voltage level is applied to the input labelled READ COM bus of the inverter 144A9, causing a negative voltage level to be developed at the output (144R1) thereof.

This negative voltage level is applied to the input (145B1) of the AND gate 145G1. Concurrently, with the application of negative pulses (produced by the track 4 read head 145RA1) to an input of the AND gate 145G1 through resistor 145RS1 and the negative voltage level developed on the RS bus (145B6) (during the RS time period), the AND gate 145G1 will be enabled, causing a series of negative pulses to be developed at the output thereof. These negative pulses are applied to the input of the inverter 145A1, causing a series of positive pulses to appear at the output thereof. This series of positive pulses is applied to the input of the one shot circuit 145N1, causing a series of positive pulses to appear at the output thereof. This series of positive pulses is applied to the input of the inverter 145A3, causing a series of negative pulses to appear at the output (145T2) thereof. This series of negative pulses is applied to the input (146L5) of the AND gate 146G1.

Since the comp flip flop 128FF1 is reset, a negative voltage level will be developed at the FF. output thereof. This negative voltage level is applied to the input of the inverter 128A7, causing a positive voltage level to be developed at the output (128R6) thereof. This positive voltage level is applied to the input (140L5) which is connected to the output (140R3). The positive voltage level developed at the output (140R3) is applied to the input (143L10) of the AND gate 143G5, causing a positive voltage level to appear at the output thereof. This positive voltage level is applied to the input of the inverter 143A5, causing a negative voltage level to appear at the output labelled ENABLE SET BORROW FF bus (143R2).

This negative voltage level is appiled to the input labelled ENABLE SET BORROW FF bus (146L3) of the AND gate 146G1.

The first of the series of negative pulses applied to the input (146L5) is applied to the set input of the read delay flip flop 146FF2, causing the read delay flip flop to be set and thereby develop a negative voltage level at the FF· output thereof.

This negative voltage level is then applied to the input designated RESET READ DELAY FF bus (146L4) of the AND gate 146G1. Therefore, the AND gate 146G1 will not be enabled until the arrival of the second information pulse on the input (146L5). A series of negative pulses is thus developed at the output of the AND gate 146G1.

These negative pulses are applied to the input of the inverter 146A2, causing a series of positive pulses to appear at the output designated ADVANCE UP COUNTER (146R1) through diode 146D2.

This series of positive pulses is applied to the complementing input designated ADVANCE UP COUNTER bus (152L3) of the #1 flip flop 152FF1 of the up counter (FIG. 111), thereby entering a digit into the up counter.

The positive voltage level applied to the input labelled SL(A) bus (141L5) of the OR gate 141G1 will cause a positive voltage level to be developed at the output thereof. This positive voltage level is applied to the input of the inverter 141A1, causing a negative voltage level to be developed at the output labelled WRITE A bus (141R1) thereof.

This negative voltage level is applied to the input (144L12) of an AND gate 144G6, and, together with the negative voltage level developed at the input labelled W2 bus (144L3) (during the second W2 time period), the AND gate 144G6 is enabled. A positive voltage "write command" signal is subsequently produced on the output designated WRITE COMMAND bus (144R2) as previously described.

This positive voltage level is applied to the input designated WRITE COMMAND bus (147L5) of an OR gate (147G3), causing a positive voltage level to be produced at the output thereof. This positive voltage level is applied to the input of the inverter 147A3, causing a negative voltage level to be developed at the output (147R2) thereof. This negative voltage level is applied to the input (148B5) of the AND gate 148G1, and, together with the negative pulses produced by the track 3 read head 148RA1 through resistor 148RS1 and the negative voltage level developed at the input (148B4) (Note: This input will be negative when the down counter has a count in it or when the write flip flop is set), the AND gate 148G1 will be enabled, thereby developing a series of negative pulses at the output thereof.

This series of negative pulses is applied to the input of the inverter (148A1), causing a series of positive pulses to be developed at the output thereof. The first of these positive pulses is applied to two inputs, one being the complementing input of the write flip flop 148FF1, causing the write flip flop to change states and subsequently write a single bit into the accumulator register representing a zero.

Additionally, this first bit is applied to the input of the one shot circuit 148N1, causing a positive pulse to be developed at the output thereof. This positive pulse is applied to the input of the inverter 148A2, causing a negative pulse to be developed at the output designated RESET WRITE DELAY FF bus (148T1). This negative pulse is applied to the reset input designated RESET WRITE DELAY FF bus (146L6) of the write delay flip flop 146FF1. The positive-going trailing edge of this negative pulse will reset the write delay flip flop, causing a negative voltage level to be produced at the FF output labelled WRITE DELAY bus (146R5) thereof.

This negative voltage level is applied to the input labelled WRITE DELAY bus (155L8) and is applied to an input of the OR gate 155G1. Since the other inputs to the AND gate 155G1 are negative, all inputs will now be negative, producing a negative voltage level at the output thereof. This negative voltage level is applied to the input of the inverter 155A5, causing a positive voltage level to be produced on the output (155R1). This positive voltage level is applied to the input (148B4) of the AND gate 148G1, disenabling this AND gate. Therefore, only one pulse will be developed at the output of the AND gate 148G1 and subsequently, a single bit is written in the accumulator register representing a zero.

The positive voltage level developed on the input labelled SL(A) bus (142L3) of the OR gate 142G3 will enable this OR gate, causing a positive voltage level to be produced at the output. This positive voltage level is applied to the input of the inverter 142A3, causing a negative voltage level to be developed at the output (142R1) thereof.

This negative voltage level is applied to the input (143L2) of an AND gate 143G1, and, together with the positive-going transition signal produced at the input labelled W2 bus (143L1) (at the end of second W2 time period), the AND gate 143G1 is disenabled. A positive-going "transfer and reset" signal is subsequently developed at the output designated RESET READ DELAY FF bus (153R5) and the output 153R6 as previously described.

This positive-going transition signal is applied to three inputs, the first of which is the input (151L2) of the up counter (FIG. 110). The positive-going transition signal applied to the input (151L2) is passed through capacitor 151C1 and diode 151D9 to the reset inputs of the flip flops of the up counter, reseting these flip flops.

The second input this positive-going transition signal is applied to is the junction (154L1) of the transfer inputs of the #8 flip flop 154FF1 and the #4 flip flop 154FF2, causing the voltage levels appearing at the gate inputs of these flip flops (representing the integer stored in the up counter) to be transferred to the outputs thereof.

The third input this positive-going transition signal is applied to is the junction (155L1) of the transfer inputs of the #2 flip flop 155FF2 and the #1 flip flop 155FF1 of the down counter, transferring the voltage levels appearing at the gate inputs of these flip flops to the outputs thereof. The integer stored in the up counter is thereby transferred to the down counter and the up counter is rest.

The positive voltage level developed on the input labelled SL(A) bus (141L5) of the OR gate 141G1 will enable this OR gate and develop a positive voltage level at the output. This positive voltage level is applied to the input of the inverter 141A1, causing a negative voltage level to be developed on the output labelled WRITE A BUS (141R1) thereof.

This negative voltage level is applied to the input (144L12) of the AND gate 144G6, and, together with the negative voltage level developed on the input labelled W2 bus (144L3) (during the third W2 time period), the AND gate 144G6 will be enabled, developing a negative voltage level at the output thereof and subsequently developing a typical write function as previously described.

The integer in the down counter will therefore be written into the tens position of the accumulator register. This completes the shift left accumulator operation.

SHIFT RIGHT ACCUMULATOR KEY

Upon the depression and release of the shift right accumulator key 125K1, a positive pulse is produced at the output thereof. This positive pulse is passed through diode 125D1 to the FF. output of the shift right flip flop 125FF1, setting the shift right flip flop and causing a negative voltage level to be developed on the FF output (125R1) thereof. This negative voltage level is applied to the input (127L6) of the diode 127D6. The junction of diode 127D6 and resistor 127RS6 will be at a positive voltage level until a negative voltage level is developed on the input (127L10) as previously described. At the time a negative voltage level is developed on the input (127L10), a negative voltage level will be developed at the junction of diode 127D6 and resistor 127RS6. This negative voltage level is applied to the input of the inverter 127A6, causing a positive voltage level to be developed at the output labelled SR(A) bus (127R11) thereof. This positive voltage level is applied to the input labelled SR(A) bus (141L16) of the OR gate 141G3, enabling this OR gate and developing a positive voltage level at the output thereof. This positive voltage level is applied to the input of the inverter 141A3, causing a negative voltage level to be developed at the output labelled READ A bus (141R3). This negative voltage level is applied to the input (144L6) of the AND gate 144G3. The negative voltage level developed on the input (144L6), together with the negative voltage level developed on the input labelled W3 bus (144L5) (occurring during the second W3 time period), will enable the AND gate 144G3, causing a negative voltage level to be developed at the output and subsequently developing a typical read signal as previously described. An integer stored in the tens position of the accumulator is thereby transferred into the up counter.

The positive voltage level applied to the input labelled SR(A) bus (142L13) of the OR gate 142G1, enabling this OR gate and producing a positive voltage level at the output thereof. This positive voltage level is applied to the input of the inverter 142A1, causing a negative voltage level to be produced at the output (142R4) thereof.

This negative voltage level is applied to the input (143L4) of the AND gate 143G2 and, together with the negative voltage level applied to the input labelled W3 bus (143L3) (occurring at the end of the second W3 period), the AND gate 143G2 will be enabled, causing a negative voltage level to be developed at the output and subsequently producing a typical "broadside" signal as previously described. The integer stored in the up counter is thereby transferred to the down counter.

The positive voltage level applied to the input labelled SR(A) bus (127R11) is applied to the input of the inverter 127A13, causing a negative voltage level to be developed on the output (127R10) thereof.

This negative volatge level is applied to the input (147L3) of the AND gate 147G2 and, together with the negative voltage level developed on the input labelled W1 bus (147L4) (during the third W1 period), the AND gate 147G2 will be enabled, developing a negative voltage level at the output thereof.

This negative voltage level is applied to the input of the inverter 147A2, causing a positive voltage level to be developed at the output thereof. This positive voltage level is applied to an input of the OR gate 147G3, causing a positive voltage level to be developed at the output thereof. This positive voltage level is applied to the input of an inverter 147A3, causing a negative voltage level to be developed at the output (147R2) thereof.

This negative voltage level is applied to the input (148B5) of an AND gate 148G1 and, together with negative pulses (developed by the track 3 read head 148RA1) applied to an input of the AND gate 148G1 through resistor 148RS1 and the negative voltage level developed on the remaining input (148B4) (this input will be at a negative voltage level when the down counter has a count in it or when the write delay flip flop is set), the AND gate 148G1 will be enabled, causing a series of negative pulses to be produced at the output thereof.

This series of negative pulses is applied to the input of the inverter 148A1, causing a series of positive pulses to appear at the output thereof. This series of positive pulses is applied to two inputs, the first of which is the complementing input of the write flip flop 148FF1. The write flip flop will be caused to change states in step with the applied series of positive pulses and, as previously described, will write this information into the accumulator regristor of track 4.

The positive voltage level developed at the output of the inverter 147A2, as previously described, is applied to the input of the inverter 147A5, causing a negative voltage level to appear at the output (147R1) thereof. This negative voltage level is applied to the input (149L2) of the AND gate 149G1 and the AND gate 149G2. The alternating positive and negative signals applied to the inputs (149L1) and (149L3) will cause the AND gates 149G1 and 149G2 to be alternately enabled and disenabled. The output voltage levels thus produced will cause the track 4 write head No. 2 149WA1 to write the integer stored in the down counter into the units position of the accumulator register of track 4. The integer initially stored in the tens position of the accumulator register is thereby transferred (shifted right) to the units position of the accumulator register.

CLEAR ENTRY KEY

Depression of the clear entry key 126SW1 will develop a positive voltage level on the output designated CLEAR ENTRY bus (126R2). This positive voltage level is applied to the input designated CLEAR ENTRY bus (139L5) of the OR gate 139G2, enabling this OR gate and causing a positive voltage level to be developed at the output thereof. This positive voltage level is applied to the input of the inverter 139A2, causing a negative voltage level to be developed at the output designated WRITE DRIVER TRACK 5 bus (139R2). This negative voltage level is applied to the input designated WRITE DRIVER TRACK 5 bus (149L5) of the AND gate 149G5 and 149G6. However, only one of these AND gates will be enabled as a result of the voltage levels appearing at the output of the write flip flop 148FF1. The track 5 write head 149W3 will therefore be turned on in one direction only and erase the entire contents of the track 5 storage register.

In addition, the positive voltage level developed on the output designated CLEAR ENTRY bus (126R2) is applied to the input designated CLEAR ENTRY bus (141L13) of the OR gate 141G2, enabling this OR gate and developing a positive voltage level at the output thereof. This positive voltage level is applied to the input of the inverter 141A2, causing a negative voltage level to be developed on the output labelled WRITE E bus (141R2).

This negative voltage level is applied to the input (144L14) of the AND gate 144G7 and, together with the negative voltage level developed on the input labelled W3 bus (144L5) (during the W3 time period), the AND gate 144G7 will be enabled, thereby developing a negative signal level at the output thereof.

This negative signal level is applied to the input of the inverter 144A7, causing a positive voltage level to be developed at the output designated WRITE COMMAND bus (144R2). This positive voltage level is applied to the input designated WRITE COMMAND bus (147L5) of the inverter 147A4, causing a negative voltage level to be developed at the output (147R3) thereof. This negative voltage level is applied to the input (149L4) of the AND gates 149G3 and 149G4. However, only one of these AND gates will be enabled as a result of the voltage levels appearing at the output of the write flip flop 148FF1. Only one side of the TK4 write head No. 1 149WA2 therefore will be turned on. Thus, a single erasing signal will be produced during each W3 period, thereby erasing the entry register. This completes the clear entry key operation.

CLEAR KEY OPERATION

The depression of the clear key 129SW1 will develop a positive voltage level at the output designated CLEAR BUS (129R6). The positive voltage level developed on the output designated CLEAR bus (129R6) is applied to the input designated CLEAR bus (141L2) of the OR gate 141G1, enabling this OR gate and developing a positive voltage level at the output thereof. This positive voltage level is applied to the input of the inverter 141A1, causing a negative voltage level to be developed on the output labelled WRITE A bus (141R1).

This negative voltage level is applied to the input (144L12) of the AND gate 144G6 and, together with the negative voltage level developed on the input labelled W2 bus (144L3) (during the W2 time period), this AND gate (144G6) is enabled, thereby developing a negative voltage level at the output thereof.

This negative voltage level is applied to the input of the inverter 144A6, causing a positive voltage level to be developed at the output designated WRITE COM- MAND bus (144R2). This positive voltage level is applied to the input designated WRITE COMMAND bus (147L5) of the inverter 147A4, causing a negative voltage level to be developed at the output (147R3) thereof. This negative voltage level is applied to the input (149L4) of the AND gate 149G3 and the AND gate 149G4. However, only one of these AND gates will be enabled as a result of the voltage levels appearing at the output of the write flip flop 148FF1. Only one side of the track 4 write head No. 1 149WA2 will therefore be turned on, thereby erasing the contents of the accumulator register.

Also, the positive voltage level applied to the input designated CLEAR bus (141L2) is applied to an input of the OR gate 141G2, enabling this OR gate and developing a positive voltage level at the output thereof. This positive voltage level is applied to the input of the inverter 141A2, causing a negative voltage level to be developed at the output labelled WRITE E bus (141R2).

This negative voltage level is applied to the input (144L14) of the AND gate 144G7 and, together with the negative voltage level developed on the input labelled W3 bus (144L5) (during the W3 time period), the AND gate 144G7 will be enabled, thereby developing a negative voltage level at the output.

This negative voltage level is then applied to the input of the inverter 144A7, causing a positive voltage level to appear at the output designated WRITE COMMAND bus (144R2). This positive voltage level is applied to the input designated RIGHT COMMAND bus (147L5) of the inverter 147A4, causing a negative voltage to be developed at the output (147R3) thereof. This negative voltage level is applied to the input (149L4) of two AND gates 149G3 and 149G4.

However, only one of these AND gates will be enabled due to the voltage levels appearing at the output of the write flip flop 148FF1. One side of the track 4 write head No. 1 149WA2 will therefore be energized, thereby erasing the contents of the entry register.

The positive voltage level developed at the output of the clear key 129SW1 is produced at the output labelled CLEAR' bus (129R7) through resistor 129RS4.

This positive voltage level is applied through diode 129D1 to the input (129L4) and to the FF. input (128R4) of ACC SIGN flip flop 128FF2, setting the ACC SIGN flip flop.

The capacitor 129C1 is used for noise suppression generated by the clear key 129SW1.

Also, the positive voltage level developed on the output CLEAR' bus (129R7), is applied to the FF. input labelled CLEAR' bus (140L1) of the CLEAR Q REG flip flop 140FF1 through diode 140D1, setting the CLEAR Q REG flip flop. The positive voltage level developed at the FF. output (140R1) of the CLEAR Q REG flip flop 140FF1 is applied to the input (139L6) of the OR gate 139G2, enabling this OR gate and developing a positive voltage level at the output thereof. This positive voltage level is applied to the input of the inverter 139A2, causing a negative voltage level to be developed on the output designated WRITE DRIVER TRACK 5 bus (139R2). This negative voltage level is applied to the input designated WRITE DRIVER TRACK 5 bus (149L5) of the AND gates 149G5 and 149G6. However, only one of these AND gates will be enabled due to the voltage levels appearing at the output of the write flip flop 148FF1. Therefore, one side of the track 5 write head 149WA3 will be turned on, causing the track 5 storage register to be erased.

Also, the positive voltage level produced on the output bus labelled CLEAR' (129R7) is applied to the FF·outputs of the MULT flip flop 130FF1 through diode 130E6 and the DIV flip flop 130FF2 through diode 130D7 via the bus designated CLEAR'BUS (130L1), resetting the MULT and DIV flip flops.

CLEAR TRACK 4 KEY

Depression of the clear track 4 key 147SW1 will develop a positive voltage level at the junction of resistors 147RS2, 147RS1 and capacitor 147C1. Ths positive voltage level is applied through diode 147D1 to the input of the inverter 147A4, causing a negative voltage level to be developed at the output (147R3) thereof. This negative voltage level is supplied to the input (149L4) of the AND gates 149G3 and 149G4. However, only one of these AND gates will be enabled due to the voltage levels appearing at the outputs of the write flip flop 148FF1. Therefore, only one side of the track 4 write head No. 1 149WA2 will be turned on, erasing the entire contents of track 4.

All values of capacitance, where not otherwise provided, are in micromicrofarads. Typical values of circuit components used in the preferred embodiment of the invention, other than the circuit values provided in the drawings are as follows:

The capacitor C4 in one shot type I (FIG. 55) is optional.

The diode D1 in one shot type II (FIG. 57) is a type 1N662 while transistors Q1 and Q2 are type 2N1305.

The diode D1 in one shot type III (IG. 57) is a type 1N662 and transistor Q1 is a type 2N1305.

The diodes D1 and D2 in one shot type IV (FIG. 57) are type 1N662.

The diodes in the typical gate circuit of FIG. 69 are type 1N662.

In addition to the above, circuit elements provided in the drawings have values as follows:

| Resistor No.: | Resistance (in ohms) |
| --- | --- |
| 120RS1 | 68 |
| 120RS2 | 68 |
| 121RS1 | 68 |
| 121RS2 | 68 |
| 121RS3 | 68 |
| 122RS1 | 47K |
| 122RS2 | 10K |
| 122RS3 | 2.2K |
| 122RS4 | 330 |
| 122RS5 | 12K |
| 122RS6 | 12K |
| 122RS7 | 12K |
| 122RS8 | 12K |
| 126RS1 | 220 |
| 127RS1 | 3.3K |
| 127RS2 | 3.3K |
| 127RS3 | 3.3K |
| 127RS4 | 3.3K |
| 127RS5 | 3.3K |
| 127RS6 | 3.3K |
| 127RS7 | 3.3K |
| 127RS8 | 3.3K |
| 128RS1 | 3.3K |
| 129RS1 | 1K |
| 129RS2 | 10K |
| 129RS3 | 47K |
| 129RS4 | 47 |
| 130RS1 | 12K |
| 130RS2 | 47K |
| 130RS3 | 68 |
| 130RS4 | 18K |
| 130RS5 | 47K |
| 130RS6 | 68 |
| 130RS7 | 18K |
| 130RS8 | 12K |
| 131RS1 | 18K |
| 131RS2 | 18K |
| 131RS3 | 12K |
| 131RS4 | 18K |
| 131RS5 | 150K |
| 131RS6 | 150K |
| 131RS7 | 150K |

| Resistor No.: | Resistance (in ohms) |
|---|---|
| 133RS1 | 10K |
| 133RS2 | 12K |
| 133RS3 | 12K |
| 133RS4 | 12K |
| 133RS5 | 12K |
| 133RS6 | 68K |
| 133RS7 | 150 |
| 134RS1 | 12K |
| 134RS2 | 12K |
| 134RS3 | 12K |
| 134RS4 | 10K |
| 134RS5 | 12K |
| 135RS1 | 12K |
| 135RS2 | 12K |
| 135RS3 | 12K |
| 135RS4 | 12K |
| 135RS5 | 10K |
| 136RS1 | 47K |
| 137RS1 | 47K |
| 142RS1 | 47K |
| 142RS2 | 10K |
| 142RS3 | 1K |
| 145RS1 | 1.5K |
| 145RS2 | 1.5K |
| 145RS3 | 10K |
| 145RS4 | 1K |
| 145RS5 | 12K |
| 145RS6 | 12K |
| 145RS7 | 12K |
| 146RS1 | 12K |
| 146RS2 | 10K |
| 147RS1 | 47K |
| 147RS2 | 47 |
| 148RS1 | 1.5K |
| 150RS1 | 12K |
| 151RS1 | 2.2K |
| 151RS2 | 330 |
| 151RS3 | 12K |
| 151RS4 | 12K |
| 152RS1 | 12K |
| 152RS2 | 2.2K |
| 152RS3 | 330 |
| 152RS4 | 12K |
| 152RS5 | 12K |
| 152RS6 | 12K |
| 152RS7 | 12K |
| 153RS1 | 27K |
| 153RS2 | 470 |
| 153RS3 | 220K |
| 153RS4 | 100K |
| 153RS5 | 15K |
| 153RS6 | 15K |
| 154RS1 | 12K |
| 154RS2 | 12K |
| 154RS3 | 12K |
| 154RS4 | 12K |
| 154RS5 | 10K |
| 154RS6 | 10K |
| 154RS7 | 10K |
| 154RS8 | 10K |
| 154RS9 | 12K |
| 155RS1 | 12K |
| 155RS2 | 12K |
| 155RS3 | 12K |
| 155RS4 | 12K |
| 155RS5 | 10K |
| 155RS6 | 10K |
| 155RS7 | 10K |
| 155RS8 | 10K |
| 157RS1 | 47K |
| 157RS2 | 47K |
| 157RS3 | 47K |
| 157RS4 | 47K |
| 157RS5 | 22K |
| 158RS1 | 33K |
| 158RS2 | 12K |
| 159RS1 | 47K |
| 159RS2 | 47K |
| 160RS1 | 6.8K |
| 160RS2 | 6.8K |
| 160RS3 | 6.8K |
| 160RS4 | 6.8K |
| 160RS5 | 10K |
| 160RS6 | 10K |
| 160RS7 | 10K |
| 160RS8 | 10K |
| 160RS9 | 10K |
| 160RS10 | 10K |
| 160RS11 | 10K |
| 160RS12 | 33K |
| 160RS13 | 33K |
| 160RS14 | 33K |
| 160RS15 | 33K |
| 160RS16 | 33K |
| 160RS17 | 33K |
| 160RS18 | 33K |
| 161RS1 | 12K |
| 161RS2 | 6.8K |
| 161RS3 | 22K |
| 161RS4 | 12K |
| 161RS5 | 3.3K |
| 161RS6 | 6.8K |
| 161RS7 | 6.8K |
| 161RS8 | 22K |
| 161RS9 | 22K |
| 161RS10 | 820 |
| 161RS11 | 1K |
| 162RS1 | 5.6K |
| 162RS2 | 5.6K |
| 161RS3 | 5.6K |
| 162RS4 | 5.6K |
| 162RS5 | 5.6K |
| 162RS6 | 5.6K |
| 161RS7 | 5.6K |
| 162RS8 | 5.6K |
| 161RS9 | 5.6K |
| 162RS10 | 5.6K |
| 162RS11 | 5.6K |
| 162RS12 | 5.6K |
| 163RS1 | 12K |
| 163RS2 | 12K |
| 163RS3 | 12K |
| 163RS4 | 12K |
| 163RS5 | 12K |
| 163RS6 | 12K |
| 163RS7 | 12K |
| 163RS8 | 33K |
| 163RS9 | 33K |
| 163RS10 | 33K |
| 163RS11 | 33K |
| 163RS12 | 33K |
| 163RS13 | 33K |
| 163RS14 | 33K |
| 165RS1 | 12K |
| 165RS2 | 12K |
| 165RS3 | 6.8K |
| 165RS4 | 6.8K |
| 165RS5 | 22K |
| 165RS6 | 22K |
| 165RS7 | 2.2K |
| 165RS8 | 2.7K |
| 165RS9 | 10K |
| 166RS1 | 6.8K |
| 166RS2 | 12K |
| 166RS3 | 22K |
| 166RS4 | 8.2K |
| 166RS5 | 6.8K |
| 166RS6 | 2.2K |

| Resistor No.: | Resistance (in ohms) |
|---|---|
| 166RS7 | 33K |
| 166RS8 | 22K |
| 166RS9 | 10K |
| 166RS10 | 2.2K |
| 166RS11 | 10K |
| 166RS12 | 6.8K |
| 166RS13 | 22K |
| 166RS14 | 22K |
| 166RS15 | 6.8K |
| 166RS16 | 2.2K |
| 166RS17 | 2.2K |
| 166RS18 | 22K |
| 166RS19 | 2.2K |
| 167RS1 | 8.2K |
| 167RS2 | 22K |
| 167RS3 | 1K |
| 167RS4 | 3.3K |
| 167RS5 | 10K |
| 167RS6 | 2.2K |
| 167RS7 | 6.8K |
| 167RS8 | 10K |
| 167RS9 | 22K |
| 167RS10 | 22K |
| 167RS11 | 2.2K |
| 167RS12 | 6.8K |
| 167RS13 | 22K |
| 167RS14 | 3.9K |
| 168RS1 | 2.2K |
| 168RS2 | 2.2K |
| 168RS3 | 4.7K |
| 168RS4 | 470 |
| 168RS5 | 56K |
| 168RS6 | 1.2K |
| 168RS7 | 470 |
| 168RS8 | 56K |
| 168RS9 | 220 |
| 168RS10 | 10 |
| 169RS1 | 180 |
| 169RS2 | 1.2K |
| 169RS3 | 2.2K |
| 169RS4 | 56K |
| 169RS5 | 1.2K |
| 169RS6 | 56K |
| 169RS7 | 820 |
| 169RS8 | 10 |
| 171RS1 | 2.2K |
| 171RS2 | 220 |
| 171RS3 | 4.7K |
| 171RS4 | 6.8K |
| 171RS5 | 4.7K |
| 171RS6 | 6.8K |
| 171RS7 | 2.2K |
| 171RS8 | 470 |
| 171RS9 | 47 |
| 171RS10 | 680 |
| 171RS11 | 470 |
| 171RS12 | 330 |
| 171RS13 | 6.8K |
| 171RS14 | 6.8K |
| 172RS1 | 5K |
| 172RS2 | 10K |
| 173RS1 | 2.2K |
| 173RS2 | 6.8K |
| 173RS3 | 15K |
| 173RS4 | 1.8K |
| 173RS5 | 3.3K |
| 173RS6 | 3.3K |
| 173RS7 | 3.3K |
| 173RS8 | 3.3K |
| 173RS9 | 3.3K |
| 173RS10 | 6.8K |
| 173RS11 | 6.8K |
| 173RS12 | 6.8K |
| 173RS13 | 6.8K |

| Resistor No.: | Resistance (in ohms) |
|---|---|
| 173RS14 | 22K |
| 173RS15 | 500 |
| 173RS16 | 1K |
| 173RS17 | 330 |
| 173RS18 | 330 |
| 174RS1 | 820K |
| 174RS2 | 820K |
| 174RS3 | 820K |
| 174RS4 | 820K |
| 174RS5 | 820K |
| 174RS6 | 820K |
| 174RS7 | 820K |
| 174RS8 | 820K |
| 174RS9 | 820K |
| 174RS10 | 820K |
| 174RS11 | 820K |
| 174RS12 | 820K |
| 174RS13 | 100K |
| 174RS14 | 150K |
| 174RS15 | 560K |
| 174RS16 | 500K |
| 174RS17 | 820K |
| 174RS18 | 2.2M |
| 174RS19 | 820K |
| 174RS20 | 250K |
| 174RS21 | 820K |
| 174RS22 | 1M |
| 174RS23 | 220K |
| 175RS1 | 18K |
| 175RS2 | 18K |
| 175RS3 | 27K |
| 175RS4 | 33K |
| 175RS5 | 82 |
| 175RS6 | 33K |
| 175RS7 | 220K |
| 175RS8 | 3.3K |
| 175RS9 | 33K |
| 175RS10 | 20K |

| Capacitor No.: | Capacitance |
|---|---|
| 122C1 | $\mu f$ .001 |
| 122C2 | $\mu f$ .001 |
| 122C3 | $\mu f$ 20 |
| 122C4 | $\mu f$ .001 |
| 122C5 | $\mu f$ .001 |
| 123C1 | $\mu\mu f$ 220 |
| 129C1 | $\mu f$ 0.1 |
| 131C1 | $\mu f$ .001 |
| 131C2 | $\mu f$ .022 |
| 131C3 | $\mu f$ .022 |
| 131C4 | $\mu f$ .022 |
| 133C1 | $\mu\mu f$ 1500 |
| 136C1 | $\mu\mu f$ 2200 |
| 137C1 | $\mu\mu f$ 150 |
| 142C1 | $\mu f$ .022 |
| 145C1 | $\mu f$ .001 |
| 145C2 | $\mu f$ .001 |
| 145C3 | $\mu f$ .001 |
| 145C4 | $\mu\mu f$ 330 |
| 146C1 | $\mu\mu f$ 680 |
| 147C1 | $\mu f$ .047 |
| 148C1 | $\mu\mu f$ 430 |
| 150C1 | $\mu\mu f$ 560 |
| 150C2 | $\mu\mu f$ 3300 |
| 151C1 | $\mu f$ .022 |
| 151C2 | $\mu\mu f$ 1500 |
| 152C1 | $\mu f$ .001 |
| 152C2 | $\mu\mu f$ 470 |
| 152C3 | $\mu f$ .001 |
| 152C4 | $\mu f$ .001 |
| 153C1 | $\mu f$ .001 |
| 153C2 | $\mu\mu f$ 3300 |
| 153C3 | $\mu\mu f$ 1500 |
| 154C1 | $\mu\mu f$ 680 |
| 154C2 | $\mu\mu f$ 680 |

| Capacitor No.: | Capacitance | |
|---|---|---|
| 154C3 | µµf | 680 |
| 154C4 | µµf | 680 |
| 154C5 | µµf | 1500 |
| 155C1 | µµf | 680 |
| 155C2 | µµf | 680 |
| 155C3 | µµf | 680 |
| 155C4 | µµf | 680 |
| 157C1 | µf | .001 |
| 157C2 | µf | .001 |
| 157C3 | µf | .001 |
| 157C4 | µf | .001 |
| 157C5 | µµf | 2200 |
| 158C1 | µf | .001 |
| 159C1 | µf | .001 |
| 161C1 | µµf | 330 |
| 161C2 | µµf | 330 |
| 165C1 | µµf | 330 |
| 165C2 | µµf | 330 |
| 167C1 | µµf | 100 |
| 167C2 | µf | .001 |
| 167C3 | µf | 500 |
| 168C1 | µf | 200 |
| 168C2 | µf | 0.15 |
| 168C3 | µf | 0.47 |
| 169C1 | µf | 0.47 |
| 169C2 | µf | 0.47 |
| 171C1 | µf | .01 |
| 171C2 | µµf | 680 |
| 171C3 | µµf | 330 |
| 171C4 | µµf | 330 |
| 171C5 | µf | 100 |
| 171C6 | µf | .033 |
| 172C1 | µµf | 62 |
| 172C2 | µf | .01 |
| 174C1 | µf | 0.5 |
| 174C2 | µf | 0.5 |
| 174C3 | µf | .005 |
| 174C4 | µf | 0.5 |
| 175C1 | µf | 100 |
| 175C2 | µf | 100 |
| 175C3 | µf | 15 |
| 175C4 | µf | 100 |
| 175C5 | µf | 100 |
| 175C6 | µf | 30 |

| Inductor No. | Inductance |
|---|---|
| 171L1 | millihenry 1 |

Cathode Ray Tube: 5DEP1

All transistors are type 2N1305 except the following:

| Transistor No.: | Transistor type |
|---|---|
| 172Q1 | 2N1304 |
| 173Q1 | 2N398A |
| 175Q2 | 2N398A |
| 175Q3 | 2N1304 |
| 175Q4 | 2N669 |
| 175Q5 | 2N669 |

Magnetic drum: Bryant-Utility Magnetic Memory Drum Model C-105.

All diodes are type 1N1662 except as follows:

| Diode No.: | Diode type |
|---|---|
| 146D4 | 1N192 |
| 171D4 | 1N192 |
| 171D5 | 1N192 |
| 174D1 | D1-56 |
| 174D2 | D1-56 |
| 174D3 | D1-56 |
| 174D4 | D1-56 |
| 174D5 | D1-56 |
| 174D6 | D1-56 |
| 174D7 | D1-56 |
| 174D8 | D1-56 |
| 174D9 | D1-56 |
| 174D10 | D1-56 |
| 174D11 | D1-56 |
| 174D12 | D1-56 |
| 174D13 | D1-56 |
| 174D14 | D1-56 |
| 175D1 | D1-56 |
| 175D2 | D1-56 |
| 175D3 | D1-56 |
| 175D4 | D1-56 |
| 175D5 | D1-56 |
| 175D6 | D1-56 |

The following list sets forth the components of the circuit diagram (FIGS. 79 to 134) which are included in the various blocks of the logic diagram (FIGS. 14 to 44) and is to be utilized to locate and identify the contents of the various blocks of the logic diagram on the circuit diagram.

BLOCK DIAGRAM TO CIRCUIT DIAGRAM CONVERSION LIST

E/U-1.0 (FIG. 14): FIG. 79: All. FIG. 80: All. FIG. 81: All.
E/U-2.1 (FIG. 14): FIG. 82: 123FF2.
E/U-2.2 (FIG. 14): FIG. 82: 123FF1.
E/U-2.3 (FIG. 14): FIG. 82: 123G1. FIG. 82: 123A1.
E/U-2.4 (FIG. 14): FIG. 82: 123RS1.
E/U-2.5 (FIG. 14): FIG. 82: 123C1.
E/U-3.1 (FIG. 15): FIG. 85: 126FF1.
E/U-3.2 (FIG. 15): FIG. 85: 126FF2.
E/U-3.3 (FIG. 15): FIG. 85: 126A3, 126G2.
E/U-3.4 (FIG. 15): FIG. 85: 126A2.
E/U-3.5 (FIG. 15): FIG. 85: 126G1, 126A1.
E/U-4.1 (FIG. 16): FIG. 83: All. FIG. 84: All. FIG. 86: All, except 127A13. FIG. 87: 128D1, 128RS1, 128A2.
E/U-4.2 (FIG. 16): FIG. 89: 130FF1, 130FF2, 130K1, 130K2, 130D1, 130D2, 130RS3, 130RS4, 130RS6, 130RS7, 130D4, 130D5, 130RS2, 130RS5, 130D6, 130D7.
E/U-4.3 (FIG. 16): FIG. 88: 129RS3, 129RS4, 129C1.
E/U-4.4 (FIG. 16): FIG. 88: 129SW1.
E/U-4.5 (FIG. 16): FIG. 86: 127A13.
E/U-4.6 (FIG. 15): FIG. 85: 126SW1.
E/U-4.7 (FIG. 16): FIG. 88: 129D1.
C/U-1.1 (FIG. 17): FIG. 87: 128A3.
C/U-1.2 (FIG. 17): FIG. 87: 128A5.
C/U-1.3 (FIG. 17): FIG. 87: 128G2, 128A4.
C/U-1.4 (FIG. 17): FIG. 87: 128G1.
C/U-1.5 (FIG. 17): FIG. 87: 128FF2.
C/U-1.6 (FIG. 17): FIG. 87: 128FF1.
C/U-1.7 (FIG. 17): FIG. 87: 128A1.
C/U-1.8 (FIG. 17): FIG. 88: 129Q1, 129Q2, 129RS1, 129RS2.
C/U-1.9 (FIG. 17): FIG. 88: 129G1, 129A3.
C/U-1.10 (FIG. 17): FIG. 88: 129G2, 129A4.
C/U-1.11 (FIG. 17): FIG. 88: 129G3, 129A5.
C/U-1.12 (FIG. 17): FIG. 88: 129G4, 129A6.
C/U-1.13 (FIG. 17): FIG. 88: 129A7.
C/U-1.14 (FIG. 17): FIG. 88: 129A8.
C/U-1.15 (FIG. 17): FIG. 88: 129LT1.
C/U-2.1 (FIG. 18): FIG. 93: All, except 134A6. FIG. 94: All, except 135A2.
C/U-2.2 (FIG. 18): FIG. 94: 135A2.
C/U-2.3 (FIG. 19): FIG. 90: All, except 131G1, 131A1. FIG. 91: All, except 132A9.
C/U-2.4 (FIG. 19): FIG. 90: 131G1, 131A1.
C/U-2.5 (FIG. 19): FIG. 91: 132A9.
C/U-2.6 (FIG. 19): FIG. 89: 130G2.

C/U-2.7 (FIG. 19): FIG. 89: 130G1, 130A2.
C/U-2.8 (FIG. 20): FIG. 92: All, except 133RS6, 133C1, 133D22, 133RS7.
C/U-2.9 (FIG. 20): FIG. 93: 134A6.
C/U-2.10 (FIG. 21): FIG. 115: All. FIG. 116: All. FIG. 117: 158G1, 158A1.
C/U-2.11 (FIG. 21): FIG. 117: 158G3.
C/U-2.12 (FIG. 22): FIG. 98: 139G1, 139A1.
C/U-2.13 (FIG. 22): FIG. 99: 140FF1.
C/U-2.14 (FIG. 22): FIG. 98: 139G2, 139A2.
C/U-2.15 (FIG. 22): FIG. 98: 139G3, 139A3.
C/U-2.16 (FIG. 22): FIG. 99: 140G1, 140A1.
C/U-2.17 (FIG. 22): FIG. 99: 140G2, 140A2.
C/U-2.18 (FIG. 26): FIG. 118: 159FF1.
C/U-2.19 (FIG. 26): FIG. 118: 159FF2.
C/U-2.20 (FIG. 26): FIG. 117: 158G2.
C/U-2.21 (FIG. 26): FIG. 117: 158C1, 158RS1, 158D3.
C/U-2.22 (FIG. 26): FIG. 117: 158G4, 158A2.
C/U-2.23 (FIG. 26): FIG. 118: 159C1, 159RS2, 159D2.
C/U-2.24 (FIG. 30): FIG. 95: 136FF1.
C/U-2.25 (FIG. 30): FIG. 95: 136G1, 136A1.
C/U-2.26 (FIG. 30): FIG. 95: 136FF3.
C/U-2.27 (FIG. 30): FIG. 95: 136FF2.
C/U-2.28 (FIG. 30): FIG. 95: 136RS1, 136C1, 136D1, 136D2.
C/U-2.29 (FIG. 30): FIG. 95: 136G2, 136A2.
C/U-2.30 (FIG. 22): FIG. 99: 140D1.
C/U-2.31 (FIG. 19): FIG. 91: 132G1, 132A10.
C/U-3.1 (FIG. 23): FIG. 100: 141G3, 141A3.
C/U-3.2 (FIG. 23): FIG. 100: 141G4, 141A4.
C/U-3.3 (FIG. 23): FIG. 103: 144G1.
C/U-3.4 (FIG. 23): FIG. 103: 144G3.
C/U-3.5 (FIG. 23): FIG. 103: 144G2.
C/U-3.6 (FIG. 23): FIG. 103: 144G4.
C/U-3.7 (FIG. 23): FIG. 103: 144A1, 144A2, 144A3, 144A4.
C/U-3.8 (FIG. 23): FIG. 103: 144A9.
C/U-4.1 (FIG. 24): FIG. 100: 141G1, 141A1.
C/U-4.2 (FIG. 24): FIG. 100: 141G2, 141A2.
C/U-4.3 (FIG. 24): FIG. 103: 144G5.
C/U-4.4 (FIG. 24): FIG. 103: 144G6.
C/U-4.5 (FIG. 24): FIG. 103: 144G8.
C/U-4.6 (FIG. 24): FIG. 103: 144G7.
C/U-4.7 (FIG. 24): FIG. 103: 144A5, 144A6, 144A7, 144A8.
C/U-5.1 (FIG. 25): FIG. 101: 142G3, 142A3.
C/U-5.2 (FIG. 25): FIG. 101: 142G1, 142A1.
C/U-5.3 (FIG. 25): FIG. 101: 142G2, 142A2.
C/U-5.4 (FIG. 25): FIG. 102: 143G1.
C/U-5.5 (FIG. 25): FIG. 102: 143G2.
C/U-5.6 (FIG. 25): FIG. 102: 143G3.
C/U-5.7 (FIG. 25): FIG. 102: 143A1, 143A2, 143A3.
C/U-5.8 (FIG. 25): FIG. 102: 143A7.
A/U-1.1 (FIG. 27): FIG. 109: 150N1, 150D5, 150D6, 150FF2, 150D2, 150D4, 150D1, 150G1. FIG. 110: All. FIG. 111: 152D4, 152D5, 152FF1.
A/U-1.2 (FIG. 27): FIG. 109: 150N1.
A/U-1.3 (FIG. 27): FIG. 109: 150C2. FIG. 111: 152RS7.
A/U-2.1 (FIG. 35): FIG. 112: 153G1, 153G2, 153G3, 153A2, 153A3, 153A4, 153A7, 153A8, 153A9, 153A5. FIG. 113: All. FIG. 114: All.
A/U-3.1 (FIG. 36): FIG. 105: 146G1, 146A2.
A/U-3.2 (FIG. 36): FIG. 105: 146G2, 146A3.
A/U-3.3 (FIG. 36): FIG. 105: 146G3, 146A4.
A/U-3.4 (FIG. 37): FIG. 102: 143G4, 143A4.
A/U-3.5 (FIG. 37): FIG. 102: 143G5, 143A5.
A/U-3.6 (FIG. 37): FIG. 102: 143A8.
A/U-4.1 (FIG. 31): FIG. 109: 150FF1.
A/U-4.2 (FIG. 31): FIG. 109: 150RS1, 150C1.
A/U-4.3 (FIG. 31): FIG. 111: 152RS5, 152C4, 152D6.
A/U-4.4 (FIG. 31): FIG. 111: 152C3, 152RS6, 152D3.
A/U-5.1 (FIG. 31): FIG. 111: 152FF2.
A/U-5.2 (FIG. 31): FIG. 111: 152RS1, 152C2, 152D2.
A/U-6.1 (FIG. 31): FIG. 112: 153C2, 153D1, 153RS3, 153RS4, 153RS5, 153A6, 153D2, 153RS6, 153C3.
A/U-6.2 (FIG. 31): FIG. 112: 153C1, 153RS1, 153RS2, 153A1, 158N1, 158N2.
M/U-2.1 (FIG. 32): FIG. 104: 145RA1, 145RS1.
M/U-2.2 (FIG. 32): FIG. 104: 145RA2, 145RS2.
M/U-2.3 (FIG. 32): FIG. 104: 145G1, 145A1.
M/U-2.4 (FIG. 32): FIG. 104: 145G2, 145A2.
M/U-2.5 (FIG. 32): FIG. 104: 145N1, 145C4, 145A3.
M/U-3.1 (FIG. 29): FIG. 106: 147G1, 147A1.
M/U-3.2 (FIG. 29): FIG. 106: 147G2, 147A2.
M/U-3.3 (FIG. 29): FIG. 106: 147A4.
M/U-3.4 (FIG. 29): FIG. 106: 147G3, 147A3.
M/U-3.5 (FIG. 29): FIG. 107: 148G1, 148A1.
M/U-3.6 (FIG. 29): FIG. 107: 148RA1, 148RS1.
M/U-5.2 (FIG. 34): FIG. 97: 138RA2.
M/U-5.3 (FIG. 34): FIG. 96: All. FIG. 97: All, except 138RA1, 138RA2. FIG. 98: All, except 139G1, 139G2, 139G3, 139A1, 139A2, 139A3.
D/U-1.1 (FIG. 40): FIG. 119: 160FF1.
D/U-1.2 (FIG. 40): FIG. 119: 160FF2.
D/U-1.3 (FIG. 40): FIG. 119: 160FF3.
D/U-1.4 (FIG. 40): FIG. 119: 160FF4.
D/U-1.5 (FIG. 40): FIG. 120: 161D2, 161D3, 161RS4, 161C2, 161RS6, 161RS9, 161RS11, 161Q3.
D/U-1.6 (FIG. 40): FIG. 120: 161N1.
D/U-1.7 (FIG. 40): FIG. 126: 167N2.
D/U-2.1 (FIG. 38): FIG. 124: 165D2, 165RS2, 165C2, 165RS4, 165RS6, 165RS8, 165Q2. FIG. 126: 167N2, 167Q5.
D/U-2.2 (FIG. 38): FIG. 121: 162RS1, 162D1.
D/U-2.3 (FIG. 38): FIG. 121: 162D2, 162RS2.
D/U-2.4 (FIG. 38): FIG. 121: 162D3, 162D4, 162RS3.
D/U-2.5 (FIG. 38): FIG. 121: 162D5, 162D6, 162RS4.
D/U-2.6 (FIG. 38): FIG. 121: 162D7, 162D8, 162RS5.
D/U-2.7 (FIG. 38): FIG. 121: 162D9, 162D10, 162RS6.
M/U-3.7 (FIG. 29): FIG. 106: 147A5.
M/U-3.8 (FIG. 29): FIG. 106: 147SW1, 147RS2, 147RS1, 147C1, 147D1.
M/U-3.9 (FIG. 29): FIG. 107: 148FF1.
M/U-3.10 (FIG. 29): FIG. 107: 148N1, 148C1, 148A2.
M/U-3.11 (FIG. 33): FIG. 108: 149G1.
M/U-3.12 (FIG. 33): FIG. 108: 149G2.
M/U-3.13 (FIG. 33): FIG. 108: 149G3.
M/U-3.14 (FIG. 33): FIG. 108: 149G4.
M/U-3.15 (FIG. 33): FIG. 108: 149G5.
M/U-3.16 (FIG. 33): FIG. 108: 149G6.
M/U-3.17 (FIG. 33): FIG. 108: 149WA1.
M/U-3.18 (FIG. 33): FIG. 108: 149WA2.
M/U-3.19 (FIG. 33): FIG. 108: 149WA3.
M/U-4.1 (FIG. 32): FIG. 102: 143G6, 143A6.
M/U-4.2 (FIG. 32): FIG. 104: 145C1, 145RS5, 145D1.
M/U-4.3 (FIG. 28): FIG. 92: 133RS6, 133D22, 133C1, 133RS7.
M/U-4.4 (FIG. 28): FIG. 105: 146FF1.
M/U-4.5 (FIG. 28): FIG. 105: 146FF2.
M/U-4.6 (FIG. 28): FIG. 105: 146D1.
M/U-4.7 (FIG. 28): FIG. 105: 146C1.
M/U-4.8 (FIG. 28): FIG. 105: 146A1.
M/U-4.9 (FIG. 28): FIG. 105: 146RS1.
M/U-5.1 (FIG. 34): FIG. 97: 138RA1
D/U-2.8 (FIG. 39): FIG. 121: 162D11, 162D12, 162RS7.

145

D/U-2.9 (FIG. 39): FIG. 121: 162D13, 162D14, 162RS8.
D/U-2.10 (FIG. 39): FIG. 121: 162D15, 162D16, 162RS9.
D/U-2.11 (FIG. 39): FIG. 121: 162D17, 162D18, 162RS10.
D/U-2.12 (FIG. 39): FIG. 121: 162D19, 162D20, 162RS11.
D/U-2.13 (FIG. 39): FIG. 121: 162D21, 162D22, 162RS12.
D/U-2.14 (FIG. 41): FIG. 122: 163D1, 163D2, 163D3, 163D4, 163RS1, 163RS8, 163Q1.
D/U-2.15 (FIG. 41): FIG. 122: 163D5, 163D6, 163D7, 163D8, 163RS2, 163RS9, 163Q2.
D/U-2.16 (FIG. 41): FIG. 122: 163D9, 163D10, 163D11, 163RS3, 163RS10, 163Q3.
D/U-2.17 (FIG. 41): FIG. 122: 163D12, 163D13, 163RS4, 163RS11, 163Q4.
D/U-2.18 (FIG. 41): FIG. 122: 163D15, 163D16, 163D17, 163D14, 163RS5, 163RS12, 163Q5.
D/U-2.19 (FIG. 41): FIG. 122: 163D18, 163D19, 163D20, 163D21, 163RS6, 162RS13, 163Q6.
D/U-2.20 (FIG. 41): FIG. 122: 163D22, 163D23, 163D24, 163D25, 163RS7, 163RS14, 163Q7.
D/U-3.1 (FIG. 42): FIG. 123: 164FF1.
D/U-3.2 (FIG. 42): FIG. 123: 164FF2.
D/U-3.3 (FIG. 42): FIG. 123: 164FF3.
D/U-3.4 (FIG. 42): FIG. 123: 164FF4.
D/U-3.5 (FIG. 42): FIG. 123: 164FF5.
D/U-3.6 (FIG. 42): FIG. 123: 164FF6.
D/U-3.7 (FIG. 42): FIG. 123: 164FF7.
D/U-3.8 (FIG. 42): FIG. 126: 167RS4, 167C2, 167RS5, 167RS6, 167RS8, 167RS10, 167RS11, 167Q3, 167C3, 167RS12, 167RS13, 167RS14, 167Q6, 167D4, 167Q2.
D/U-3.9 (FIG. 42): FIG. 126: 167N1.
D/U-3.10 (FIG. 42): FIG. 126: 167RA1, 167C1, 167RS1, 167RS2, 167RS3, 167Q1.
D/U-4.1 (FIG. 42): FIG. 125: 166D3, 166RS2, 166RS5, 166RS10, 166RS8, 166Q3, 166N3, 166RS15, 166RS18, 166RS19, 166D6, 166Q6.
D/U-4.2 (FIG. 42): FIG. 125: 166RS1, 166RS3, 166RS6, 165Q1.
D/U-4.3 (FIG. 42): FIG. 125: 166N1.
D/U-4.4 (FIG. 42): FIG. 125: 166RS11, 166RS13, 166RS16, 166Q4.
D/U-4.5 (FIG. 42): FIG. 125: 166D1, 166D2, 166RS4, 166RS7, 166RS9, 166Q2.
D/U-4.6 (FIG. 42): FIG. 125: 166N2, 166RS12, 166RS14, 166RS17, 166D2, 166Q5.
D/U-4.7 (FIG. 43): FIG. 127: All.
D/U-4.8 (FIG. 43): FIG. 128: All.
D/U-4.9 (FIG. 43): FIG. 129: 170FF1, 170D1.
D/U-4.10 (FIG. 43): FIG. 129: 170FF2, 170D2.
D/U-4.11 (FIG. 43): FIG. 129: 170FF3, 170D3.
D/U-4.12 (FIG. 43): FIG. 129: 170FF4, 170D4.
D/U-4.13 (FIG. 44): FIG. 132: 173D1, 173RS4, 173RS9, 173D2, 173RS5, 173RS10, 173D3, 173RS6, 173RS11, 173RS15, 173RS17.
D/U-4.14 (FIG. 44): FIG. 132: 173D4, 173RS7, 173RS12, 173D5, 173RS8, 173RS13, 173RS16, 173RS18.
D/U-5.1 (FIG. 42): FIG. 126: 167D1, 167D2, 167D3, 167RS7, 167RS9, 167Q4.
D/U-5.2 (FIG. 44): FIG. 130: 171D1, 171D2, 171D3, 171RS1.
D/U-5.3 (FIG. 44): FIG. 130: 171RS9, 171C5, 171RS2, 171C1, 171C2, 171L1, 171Q1, 171RS7, 171C6, 171RS13, 171RS14.
DU-5.4 (FIG. 44): FIG. 130: 171D5, 171RS3, 171D6, 171RS4, 171C3.
D/U-5.5 (FIG. 44): FIG. 130: 171D4, 171RS5, 171D7, 171RS6, 171C4.
D/U-5.6 (FIG. 44): FIG. 130: 171RS12, 171RS10.
D/U-5.7 (FIG. 44): FIG. 130: 171RS11, 171RS8.
D/U-5.8 (FIG. 44): FIG. 130: 171RS1.
D/U-6.1 (FIG. 44): FIG. 131: 172A1.
D/U-6.2 (FIG. 44): FIG. 131: 172A2.
D/U-6.3 (FIG. 44): FIG. 131: 172Q1, 172RS1, 172C1, 172RS2, 172C2.
D/U-7.0 (FIG. 44): C.R.T. (Not shown in circuit diagram.)
D/U-8.0 (FIG. 42): FIG. 132: 173RS1, 173RS2, 173RS3, 173RS14, 173Q1.

Though the invention has been disclosed with respect to a single preferred embodiment of the invention, many alterations and variations thereof will become immediately apparent to those skilled in the art. For example, any type of single digit storage device capable of performing the operation of the device utilized herein could be used. Rather than using an up and down counter, two up counters, or two down counters, or a down and an up counter could be used with but minor changes in circuitry. Also, the counters could be composed of any device capable of indicating a count. A host of other variations could also be made. It is therefore the intention that the appended claims be interpreted as broadly as possible in view of the prior art to include the above-mentioned variations and all other variations apparent to those skilled in the art.

What is claimed is:

1. An electronic calculating device comprising:
    (a) a memory device including a quotient register, a dividend register and a divisor register;
    (b) means for repeatedly shifting a divisor in said divisor register to the left until the divisor and the dividend in said dividend register are aligned;
    (c) means for repeatedly subtracting the divisor from the dividend until an overdraft occurs;
    (d) means for restoring the said overdraft and effecting a one order right shift of said divisor;
    (e) means responsive to each subtraction operation in which an overdraft does not occur for entering a count into said quotient register of said memory device;
    (f) means for entering the contents, if any, of said dividend register into said divisor register upon the occurrence of a shift which shifts the least significant digit of the divisor to the right beyond the capacity of said divisor register; and
    (g) means for transferring the contents of said quotient register into the dividend register of said memory device.

2. An electronic calculating device comprising:
    (a) a memory means including a quotient register, a dividend register, and a divisor register;
    (b) means for repeatedly shifting a divisor in said divisor register to the left order-by-order until the divisor is larger than the dividend in said dividend register;
    (c) means responsive to the larger divisor for shifting the divisor one order to the right;
    (d) means for repeatedly subtracting the divisor from the dividend until an overdraft occurs;
    (e) means for restoring said overdraft and effecting another right shift of said divisor;
    (f) means responsive to each subtraction operation in which an overdraft does not occur for entering a count into said quotient register of said memory device;
    (g) means for entering the contents, if any, of said dividend register into said divisor register upon the occurrence of a shift which shifts the least significant digit of the divisor to the right beyond the capacity of said divisor register; and
    (h) means for transferring the contents of said quotient register into the dividend register of said memory device.

3. An electronic calculating device comprising:
    (a) an up counter;

(b) a down counter;
(c) a memory device including a dividend register, a divisor register, and a quotient register;
(d) means for aligning a divisor in said divisor register with a dividend in said dividend register;
(e) means for performing division operations including:
  (1) means for entering a digit of the dividend from said divided register into said up counter,
  (2) means for broadsiding the digits from said up counter into said down counter,
  (3) means for repeatedly debiting the coordinal digits of the divisor from the dividend in the down counter,
  (4) means for repeating the operation for successive digits until an overdraft occurs,
  (5) means for restoring the overdraft by entering digit of the remaining contents of the dividend register into said up counter, then entering the coordinal digit of the contents of said divisor register into said up counter, thereby obtaining a sum in said up counter, broadsiding said sum into said down counter, and then entering the said sum into said dividend register and repeating the operation for successive digits,
  (6) means for shifting the contents of the divisor register one order to the right by entering the contents of said divisor register one digit at a time into said up counter, broadsiding said digits individually into said down counter, and writing the contents of said down counter individually back into said divisor register one ordinal space to the right;
(f) means for terminating the division operation by shifting the least significant digit of the divisor off the right end of said divisor register;
(g) means for transferring any remaining dividend from the dividend register to the divisor register by entering the contents of the dividend register into said up counter one digit at a time, broadsiding the digits individually from said up counter into said down counter, and writing the contents of said down counter individually into the divisor register; and
(h) means for transferring the contents of said quotient register into the dividend register by entering the most significant digit of the quotient register into said up counter, broadsiding said digit into said down counter and writing said contents into said dividend register, and repeating the operation for successive digits.

4. An electronic calculator comprising:
(a) a quotient register;
(b) a dividend register;
(c) a divisor register;
(d) an up counter;
(e) a down counter;
(f) means for substantially instantaneously condition-in the said down counter to represent a digit in said up counter;
(g) a phase control means including at least four flip-flops and a plurality of decoding gates for controlling sequential entry of digits from said dividend register into said up counter, debiting digits in said divisor register from said down counter, and writing the difference between the digits of said dividend and said divisor into said dividend register;
(h) an overdraft sensing means;
(i) a first means responsive to said phase control means to shift a divisor in said divisor register to the left until the divisor causes an overdraft in the dividend register;
(j) a second means responsive to said phase control means and said overdraft sensing means for shifting the divisor one order to the right;
(k) means responsive to each successful subtraction operation for accumulating a single count in said quotient register; and
(l) a third means responsive to said control means to repeatedly subtract the divisor from the dividend.

5. An electronic calculator comprising:
(a) a quotient register;
(b) a dividend register;
(c) a divisor register;
(d) an up counter;
(e) a down counter;
(f) means for substantially instantaneously conditioning the said down counter to represent a digit in said up counter;
(g) a phase control means including at least four flip-flops and a plurality of decoding gates for controlling sequential entry of digits from said dividend register into said up counter, debiting digits in said divisor register from said down counter, and writing the difference between the digits of said dividend and said divisor into said dividend register;
(h) an overdraft sensing means;
(i) a means responsive to said phase control means and said overdraft sensing means for shifting the divisor one order to the right;
(j) means responsive to each successful subtraction operation for accumulating a single count in said quotient register; and
(k) a second means responsive to said control means to repeatedly subtract the divisor from the dividend.

6. A calculator as set forth in claim 4 further including:
means responsive to said phase control means and said end of operation signal to transfer the contents of said dividend register into said divisor register.

7. A calculator as set forth in claim 6 further including:
means responsive to said phase control means and said end of operation signal to transfer the contents of said quotient register into said dividend register.

8. A calculator as set forth in claim 7 further including:
means for displaying the quotient subsequent to the transfer thereof into said dividend register.

9. An electronic calculator comprising:
(a) an entry register adapted to store the divisor in the process of a division operation;
(b) an accumulator register adapted to store the dividend in the process of division;
(c) an auxiliary register occupying a separate recirculating memory and adapted to store the quotient during the process of division;
(d) an up counter;
(e) a down counter;
(f) a division program control means including at least four flip-flops and a plurality of decoding gates for controlling sequential entry of digits from said accumulator register into said up counter, debiting digits in said entry register from said down counter, and writing the resulting difference into said auxiliary register of said recirculating memory;
(g) means for terminating operation of said division program control means when said divisor can no longer be subtracted from the contents of said accumulator register;
(h) means for entering any remaining digits in said accumulator register into said entry register upon operation of said terminating means and thereby clearing said accumulator register;
(i) means for transferring the contents of said auxiliary register into said empty accumulator register; and (j) means for simultaneously displaying the contents of said accumulator register and said entry register.

References Cited

UNITED STATES PATENTS

| | | | |
|---|---|---|---|
| 3,028,086 | 4/1962 | Sierra | 235—160 |
| 3,031,139 | 4/1962 | Spingies et al. | 235—160 |
| 3,159,740 | 12/1964 | Broce | 235—169 |
| 3,265,875 | 8/1966 | Richards | 235—160 |
| 3,330,946 | 7/1967 | Scuitto | 235—160 |
| 3,353,008 | 11/1967 | Kitz et al. | 235—160 |

MALCOLM A. MORRISON, Primary Examiner

DAVID H. MALZAHN, Assistant Examiner

U.S. Cl. X.R.

235—159